(12) United States Patent
Mann et al.

(10) Patent No.: US 11,030,556 B1
(45) Date of Patent: Jun. 8, 2021

(54) DIGITAL PROCESSING SYSTEMS AND METHODS FOR DYNAMIC OBJECT DISPLAY OF TABULAR INFORMATION IN COLLABORATIVE WORK SYSTEMS

(71) Applicant: MONDAY.COM, Tel Aviv (IL)

(72) Inventors: Roy Mann, Tel Aviv (IL); Dar Bentov, Tel Aviv (IL); Shirley Baumer, Tel Aviv (IL)

(73) Assignee: Monday.com, Tel Aviv (IL)

( * ) Notice: Subject to any disclaimer, the term of this patent is extended or adjusted under 35 U.S.C. 154(b) by 0 days.

(21) Appl. No.: 17/143,462

(22) Filed: Jan. 7, 2021

Related U.S. Application Data

(63) Continuation of application No. PCT/IB2020/000974, filed on Nov. 17, 2020, which
(Continued)

(51) Int. Cl.
*G06Q 10/06* (2012.01)
*G06F 3/0482* (2013.01)
(Continued)

(52) U.S. Cl.
CPC ... *G06Q 10/063114* (2013.01); *G06F 3/0482* (2013.01); *G06F 3/04817* (2013.01); *G06F 16/26* (2019.01); *G06Q 10/063118* (2013.01)

(58) Field of Classification Search
CPC ............ G06F 1/00–21/00; G06Q 10/00–50/00
(Continued)

(56) References Cited

U.S. PATENT DOCUMENTS 5,479,602 A * 12/1995 Baecker .............. G06F 3/04817
715/838
6,169,534 B1 * 1/2001 Raffel .................... G06Q 10/10
345/473
(Continued)

FOREIGN PATENT DOCUMENTS

WO WO 2004/100015 A2 11/2004
WO WO-2004100015 A2 * 11/2004 ............. G06F 40/14

OTHER PUBLICATIONS

International Search Report in PCT/IB2020/000658, dated Nov. 11, 2020 (6 pages).
(Continued)

*Primary Examiner* — Alan S Miller
(74) *Attorney, Agent, or Firm* — Finnegan, Henderson, Farabow, Garrett & Dunner, LLP

(57) ABSTRACT

Systems and methods for converting data from tablature into moving objects are disclosed. A system may include at least one processor configured to maintain a table, the table having vertical rows and horizontal rows, and a cell at an intersection of each vertical row and horizontal row, wherein each cell contains a value. The processor may receive a selection of a row of cells for alternative display, and in response to the received selection, display data from the selected row of cells in a dynamic manner, wherein the value from each cell in the selected row is represented by a moving object, wherein at least one of a size of the moving object and a color of the moving object relates to data contained in an associated cell of each cell in the selected row, and wherein during display, the moving objects are configured to move relative to each other.

20 Claims, 140 Drawing Sheets

Related U.S. Application Data is a continuation-in-part of application No. PCT/IB2020/000658, filed on Aug. 7, 2020.

(60) Provisional application No. 63/019,396, filed on May 3, 2020, provisional application No. 63/018,593, filed on May 1, 2020, provisional application No. 62/975,716, filed on Feb. 12, 2020, provisional application No. 62/961,547, filed on Jan. 15, 2020, provisional application No. 62/937,195, filed on Nov. 18, 2019.

(51) Int. Cl.
*G06F 3/0481* (2013.01)
*G06F 16/26* (2019.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,522,347 B1* | 2/2003 | Tsuji | ...................... | G06Q 30/02 345/419 |
| 6,661,431 B1* | 12/2003 | Stuart | .................... | G06Q 30/02 715/733 |
| 7,489,976 B2* | 2/2009 | Adra | ...................... | G06Q 10/00 700/29 |
| 7,685,152 B2* | 3/2010 | Chivukula | .............. | G06F 40/18 707/999.102 |
| 8,375,327 B2* | 2/2013 | Lorch | ................. | G06F 3/04817 715/810 |
| 9,342,579 B2* | 5/2016 | Cao | ........................ | G06F 16/287 |
| D910,077 S * | 2/2021 | Naroshevitch | ............... | D14/492 |
| 2001/0032248 A1* | 10/2001 | Krafchin | ............... | G06Q 10/107 709/206 |
| 2002/0082892 A1* | 6/2002 | Raffel | ............ | G06Q 10/063118 705/7.26 |
| 2005/0171881 A1* | 8/2005 | Ghassemieh | .......... | G06Q 40/00 705/35 |
| 2005/0257204 A1* | 11/2005 | Bryant | ...................... | G06F 8/38 717/163 |
| 2007/0174760 A1 | 7/2007 | Chamberlain et al. | | |
| 2008/0004929 A9* | 1/2008 | Raffel | ............. | G06Q 10/06316 705/7.11 |
| 2008/0148140 A1* | 6/2008 | Nakano | ................. | G06F 3/0482 715/215 |
| 2008/0216022 A1* | 9/2008 | Lorch | ................. | G06F 3/04817 715/847 |
| 2011/0066933 A1 | 3/2011 | Ludwig | | |
| 2011/0208732 A1* | 8/2011 | Melton | ................. | G06F 16/955 707/728 |
| 2012/0311496 A1* | 12/2012 | Cao | ....................... | G06F 16/287 715/821 |
| 2017/0091337 A1* | 3/2017 | Patterson | ............... | G06Q 50/01 |
| 2018/0329930 A1* | 11/2018 | Eberlein | ............... | G06F 16/212 |

OTHER PUBLICATIONS

Written Opinion of the International Searching Authority in PCT/IB2020/000658, dated Nov. 11, 2020 (6 pages).

* cited by examiner

| Budget | Current Spending | Current Progress | Relative Spending |
|---|---|---|---|
| 5,000 | 4,500 | 91% | On target |
| 6,000 | 3,000 | 10% | Too fast |
| 3,000 | 4,000 | 80% | Over budget |

340

347

TITLE

| Budget | Current Spending | Current Progress | Relative Spending | Manager |
|---|---|---|---|---|
| 0 | 0 | 0% | On target | |
| 0 | 0 | 0% | On target | |
| 0 | 0 | 0% | On target | |

341, 342, 343, 344, 345

346

348

3410

3417

PROJECT A

| Budget | Current Spending | Current Progress | Relative Spending |
|---|---|---|---|
| 5,000 | 4,500 | 91% | On target |
| 6,000 | 3,000 | 10% | Too fast |
| 3,000 | 4,000 | 80% | Over budget |
| 5,500 | 3,000 | 80% | On target |

| Project | Person | Task Details | Status | Due Date | Timeline |
|---|---|---|---|---|---|
| Task 1 | 👤 | | In Progress | July 4 | Jun 17 – Jul 4 |
| Task 2 | 👤 | | Waiting | July 31 | Jun 1 – Jul 31 |
| Task 3 | 👤 | | Done | July 25 | May 6 – Jul 25 |
| 516 | 512 | 514 | 502 | 506 | 510 |

900B — 902 (Status 504) — 904 (Due Date 508)

FIG. 9B

| | Due Date 1 | Due Date 2 | Status |
|---|---|---|---|
| | ! Jun 23 | ○ Jun 26 | |
| | ! Jun 24 | ◐ Jun 28 | |
| | ● Jun 27 | ◐ Jun 30 | |
| | ✓ Jun 16 | ✓ Jun 13 | Done |
| | ✓ Jun 16 | ✓ Jun 29 | Done |
| | ✓ Jun 23 | ✓ Jun 26 | Done |

FIG. 10A

1. If "Due Date 1" is met and "Status" is NOT yet "Done" Then add ! to the cell containing the date.

2. If "Status" is "Done" Then add ✓ to cells containing dates in the row.

3. If "Due Date 2" is met and "Status" is NOT yet "Done" Then add ! to the cell containing the date.

FIG. 10B

Notifications

△ 1620
When a group contains more items than value notify someone

Add to Board

△ 1621
When all items in this group have the status of something notify someone

Add to Board

△ ▦ 1622
When date arrives and status is something notify someone

Add to Board

△ ▦ 1623
When date has passed and status is something notify someone every time period Add to Board △ ⊙ 1624
When status is something notify someone every time period Add to Board △ ⊙ 1625
Every time period notify someone Add to Board △ 1626
When a column changes notify someone Add to Board △ ▦ 1627
When date arrives notify someone Add to Board △ ▤ 1628
When a status changes to something notify someone Add to Board △ 1629
When any update is posted notify someone Add to Board △ 1630
When any update is posted and contact keywords notify someone Add to Board △ 1631
When an update is posted in this item notify someone Add to Board △ ▤ 1632
When status changes from something to something else notify someone Add to Board △ + 1633
When a new item is created notify someone Add to Board △ → 1634
When an item moves to group notify someone after some time Add to Board △ 1635
When an update is posted in this item and contains keywords notify someone Add to Board △ 1636
When an item is created in this group notify someone Add to Board △ 1637
When a number is greater than a value notify someone Add to Board

FIG. 16

Board Permissions — 1820

Choose what all subscribed members on this board can do:

Edit everything

Edit content

Edit row assigned to them in the <u>Person</u> column — 1821

At least one person column needs to be selected

Person — 1822

☐ Person Column 2

☐ Person Column 3

1800

| Feature | No one | Only admins | Anyone |
|---|---|---|---|
| Upload files Across the system | ○ | ○ | ✓ |
| Broadcast boards on the web | ○ | ○ | ✓ |
| Create Main boards | ○ | ○ | ✓ |
| Create Private boards | ○ | ○ | ✓ |
| Create Shareable boards | ○ | ○ | ✓ |
| Create Integrations ▼ | ○ | ✓ | — |
| Third-party App "XXX" | ○ | ✓ | ○ |
| Third-party App "YYY" | ○ | ○ | ✓ |

| Project 1 | Person | Task Details | Status | Due Date | Timeline |
|---|---|---|---|---|---|
| Task 2 | 👤 | | Stuck | July 31 | Jun 1 – Jul 31 |

6202

| Project 2 | Person | Task Details | Status | Due Date | Timeline |
|---|---|---|---|---|---|
| Task 6 | 👤 | | Stuck | August 31 | Jul 1 – Aug 31 |
| Task 8 | 👤 | | Stuck | August 31 | Jul 4 – Aug 31 |

6204

| Project 3 | Person | Task Details | Status | Due Date | Timeline |
|---|---|---|---|---|---|
| Task 9 | 👤 | | Stuck | Sep 1 | Aug 1 – Sep 1 |
| Task 13 | 👤 | | Stuck | Sep 7 | Aug 1 – Sep 7 |
| Task 25 | 👤 | | Stuck | Oct 30 | Sep 1 – Oct 30 |

| Project 1 | Person | Task Details | Status | Due Date | Timeline |
|---|---|---|---|---|---|
| Task 2 | 👤 | | Stuck | July 31 | Jun 1 – Jul 31 |

6202

| Project 2 | Person | Task Details | Status | Due Date | Timeline |
|---|---|---|---|---|---|
| Task 6 | 👤 | | Stuck | August 31 | Jul 1 – Aug 31 |
| Task 8 | 👤 | | Stuck | August 31 | Jul 4 – Aug 31 |

6204

| Project 3 | Person | Task | | | Timeline |
|---|---|---|---|---|---|
| Task 9 | 👤 | | | | Aug 1 – Sep 1 |
| Task 13 | 👤 | | Stuck | Sep 7 | Aug 1 – Sep 7 |
| Task 25 | 👤 | | Stuck | Oct 30 | Sep 1 – Oct 30 |

User 1
Title

Send email | Ask for an update

| Maintenance Workers | Daily Status | Time Tracking | Overtime Threshold | Project (Address) |
|---|---|---|---|---|
| Ralph | Working | 3h 28m 58s | 8h | 11372 Nelson Ave |
| John | Absent | 5h 0m 0s | 8h | 305 Lake Street |
| Sam | Working | 8h 13m 33s | 8h | 4555 Fordham Drive |
| Jordan | On Break | 56m 37s | 8h | 11372 Nelson Ave |
| +Add | | | | |

Aggregate Time:
11372 Nelson Ave
4555 Fordham Drive 12h 39m 8s

| ● Mark Johnson Podcast: Episode 24 | Person | Location | Country | Deadline | World Clock |
|---|---|---|---|---|---|
| News Update -- 7504a | Andrea -- 7510a | ⦿ Seattle, WA, USA -- 7512a | 🇺🇸 USA | Oct 9 | ☀ 04:45 PM |
| Fun Fact of the Day -- 7504b | Ben -- 7510b | ⦿ Green Bay, WI, USA -- 7512b | 🇺🇸 USA | Oct 10 | ☀ 06:45 PM |
| Book Guest -- 7504c | Charlie -- 7510c | ⦿ Unavailable -- 7512c | | | Unavailable |
| Prepare Interview Questions -- 7504d | Diane -- 7510d | ⦿ London, UK -- 7512d | 🇬🇧 GB | Oct 17 | ☾ 12:45 AM |
| Record Interview with Guest -- 7504e | Erin -- 7510e | ⦿ New York, NY, USA -- 7512e | 🇺🇸 USA | Oct 31 | ☾ 07:45 PM |
| Record Sponsors Reads -- 7504f | Franklin -- 7510f | ⦿ Boise, ID, USA -- 7512f | 🇺🇸 USA | Oct 31 | ☾ 05:45 PM |
| Combine and Edit Recordings -- 7504g | George -- 7510g | ⦿ New York, NY, USA -- 7512g | 🇺🇸 USA | Nov 7 | ☾ 07:45 PM |
| Publish -- 7504h | Henry -- 7510h | ⦿ San Diego, CA, USA -- 7512h | 🇺🇸 USA | Nov 10 | ☾ 04:45 PM |
| + Add | | | | | |

7502, 7504, 7510, 7512, 7514, 7516, 7518, 7520, 7522

7600

| ● Mark Johnson Podcast: Episode 24 | Person | Location | Country | Deadline | World Clock |
|---|---|---|---|---|---|
| News Update | Andrea | ⊙ Seattle, WA, USA | USA | Oct 9 | 04:45 PM |
| Fun Fact of the Day | Ben | ⊙ Green Bay, WI, USA | USA | Oct 10 | 06:45 PM |
| Record Interview with Guest | Erin | ⊙ New York, NY, USA | USA | Oct 31 | 07:45 PM |
| Record Sponsors Reads | Franklin | ⊙ Boise, ID, USA | USA | Oct 31 | 05:45 PM |
| Combine and Edit Recordings | George | ⊙ New York, NY, USA | USA | Nov 7 | 07:45 PM |
| Publish | Henry | ⊙ San Diego, CA, USA | USA | Nov 10 | 04:45 PM |
| +Add | | | | | |

| Mark Johnson Podcast: Episode 24 | Person | Location | Country | Deadline |
|---|---|---|---|---|
| News Update | Andrea | ⊙ Seattle, WA, USA | 🇺🇸 USA | Oct 9 |
| Fun Fact of the Day | Ben | ⊙ Green Bay, WI, USA | 🇺🇸 USA | Oct 10 |
| Book Guest | Charlie | ⊙ Unavailable | | Oct 11 |
| Prepare Interview Questions | Diane | ⊙ I ⊗ | 🇬🇧 GB | Oct 17 |
| Record Interview with Guest | Erin | ⊙ London, UK | A | Oct 31 |
| Combine and Edit Recordings | George | ⊙ Boise, ID USA | A | Nov 7 |
| Publish | Henry | ⊙ Unavailable | A | Nov 10 |
| + Add | | ⊙ New York, NY, USA | | |
| | | ⊙ Seattle, WA, USA | | |

| Dinner Party | 8102 | 8104 Status | 8108 Priority 8108b | 8106 Weight |
|---|---|---|---|---|
| Choose Theme | | | Medium | 2 |
| Reserve Venue | | | High | 3 |
| Create Playlist | | | | 1 |
| Hire Catering | | | High | 3 |
| Approve Menu | | Medium | Medium | 2 |
| Decorate | | Overdue | Medium | 2 |
| Pick up Flowers | | | | 1 |

8102b points to the rows. 8102b label at left.

8202 — Choose which "Status" columns will add llamas to your farm

Dinner Party Checklist

8204 — ≡ Priority

8206 — ≡ Status

Choose how often to replace your llamas with newly fresh ones

8402 — Every [ 1 ] [ Months ▼ ] — 8404

Starting at [ May 4, 2020 ▼ ] — 8406

Choose a "Number" column to change the size of your llamas e.g. Longer tasks = bigger llamas Dinner Party Checklist — 8408

[ 123   Weight                          ▲ ] — 8410

FIG. 84

Corona pandemic in the world ☆

Add board description

⊞ Main Table ⌄

| In | Infected | Country Status | Last To Travel To | Location | Files | Deaths | Recovered | Timeline |
|---|---|---|---|---|---|---|---|---|
| China | 81,496 | Cops in the Street | 🔘 | China | 🗎🗎🗎 | 3,153 | 72,819 | Mar 3t-Apr 19 |
| Italy | 59,138 | In Closure | 🔘🔘🔘 | Italy | 🗎🗎🗎 | 5,476 | 7,024 | Apr 19-21 |
| USA | 35,345 | Fully Closed | 🔘 | USA | 🗎🗎🗎 | 473 | 0 | · |
| Spain | 33,089 | Cops in the Street | 🔘🔘 | Spain | 🗎🗎🗎 | 2,206 | 3,355 | · |
| Germany | 27,289 | Closed | 🔘🔘 | Germany | 🗎🗎🗎 | 115 | 422 | · |
| Iran | 23,049 | Fully Closed | 🔘 | Iran | 🗎🗎🗎 | 1,812 | 8,376 | · |
| France | 16,937 | In Closure | 🔘🔘🔘 | France | 🗎🗎🗎 | 674 | 2,207 | · |
| Korea, South | 8,961 | In Closure | 🔘 | Korea, South | 🗎🗎🗎 | 111 | 3,166 | · |
| Switzerland | 8,547 | In Closure | 🔘 | Switzerland | 🗎🗎🗎 | 118 | 131 | · |
| United Kingdom | 5,748 | In Closure | 🔘🔘 | United Kingdom | 🗎🗎🗎 | 290 | 140 | · |
| Netherlands | 4,763 | In Closure | 🔘🔘 | Netherlands | 🗎🗎🗎 | 2,104 | 3 | · |
| Austria | 3,967 | In Closure | 🔘 | Austria | 🗎🗎🗎 | 21 | 9 | · |
| Belgium | 3,743 | In Closure | 🔘 | Belgium | 🗎🗎🗎 | 88 | 401 | · |

FIG. 106A

Vehicle Planner

| Main Table ∨ | | | | | |
|---|---|---|---|---|---|
| Rides | Driver | Vehicle | Date | Ride Duration | Distance |
| Tel Aviv – Haifa | | Taxi – Mazda | Jul 12 | 2 Hours | 150 KM |
| Jerusalem – Tel Aviv | | Taxi – Skoda | Jul 12 | 2 Hours | 100 KM |
| Eilat – Beer Sheva | | Taxi – Ford | Jul 13 | 4 Hours | 175 KM |
| Jaffa – Tel Aviv | | Motorcycle | Jul 13 | 1 Hour | 40 KM |
| Tel Aviv – Holon | | Van – Mercedes | Jul 13 | 1 Hour | 30 KM |
| Nahariya – Tel Aviv | | Taxi – Ford | Jul 13 | 2 Hours | 240 KM |
| Kiryat Shmona – Jerusalem | | Taxi – Mazda | | 5 Hours | 200 KM |
| Deliveries | Driver | Vehicle | Date | Ride Duration | Distance |
| Groceries to Tel Aviv | | Taxi – Mazda | Jul 14 | 1 Hour | 50 KM |
| Furniture to Haifa | | Van – Mercedes | Jul 12 | 2 Hours | 120 KM |

DIGITAL PROCESSING SYSTEMS AND METHODS FOR DYNAMIC OBJECT DISPLAY OF TABULAR INFORMATION IN COLLABORATIVE WORK SYSTEMS

CROSS-REFERENCE TO RELATED APPLICATIONS

This application is a continuation of PCT International Application No. PCT/IB2020/000974, filed Nov. 17, 2020, which claims the benefit of priority of U.S. Provisional Patent Application No. 62/937,195, filed Nov. 18, 2019, U.S. Provisional Patent Application No. 62/961,547, filed Jan. 15, 2020, U.S. Provisional Patent Application No. 62/975,716, filed Feb. 12, 2020, U.S. Provisional Patent Application No. 63/018,593, filed May 1, 2020, U.S. Provisional Patent Application No. 63/019,396, filed May 3, 2020. This application is also a continuation-in-part of International Patent Application No. PCT/IB2020/000658, filed on Aug. 7, 2020. The contents of all the above-listed applications are incorporated herein by reference in their entireties.

TECHNICAL FIELD

The present disclosure relates generally to systems, methods, and computer-readable media for enabling and optimizing workflows in collaborative work systems. Disclosed systems and methods may involve automatically rendering displays and managing tablature across multiple computing devices.

BACKGROUND

Operation of modern enterprises can be complicated and time consuming. In many cases, managing the operation of a single project requires integration of several employees, departments, and other resources of an entity. To manage the challenging operation, project management software applications may be used. Such software applications may enable organizing, planning, and management of resources by providing project-related information in order to optimize the time and resources spent on each project. In many organizations, project management tools may be divided among many different systems with no way (or limited ways) to integrate them. For example, documents, chats, email, calendars, GANTT charts, location tracking, time management, control systems, cost management, capacity management, CRMs, process/order/delivery scheduling, and other functions of an organization may be confined to non-integrated standalone systems or systems that are only partially integrated. It would be useful to improve these software applications to increase operation management efficiency and overall efficiency of computer systems.

Accordingly, various aspects of this disclosure address this issue by providing a platform that integrates many different project management computer operations in a way that improves the efficiency and operation of computer systems, and provides new types of outputs, analytics and/or visualizations previously unavailable and not achievable through manual processes. Some aspects of this disclosure provide systems and methods for managing resources and rendering new information on graphical user interfaces (GUIs) to provide additional, meaningful information, and aggregated displays that may be interactive that enable viewing and altering underlying information in ways not previously achievable. In particular, various embodiments of the present disclosure improve the functionality of computers and networks to increase operation management efficiency and improve computing processes in prior systems through unconventional and interactive displays on GUIs. Further, various embodiments of this disclosure may allow for the organizing, planning, and managing of resources in order to optimize the time and resources spent related to a process.

A helpful feature of management applications may be the ability to provide information regarding one or more processes in real time. It may be desirable to be able to visually represent aspects of a project in order to facilitate project management. While project overview tools may be provided in current project management software, these tools generally do not allow direct manipulation of the underlying data. Further, there may be no convenient way to view the status of multiple tasks spread across multiple projects.

When working on projects or processes that have a location component, it may be difficult to visualize the location and/or relative location of the items that are part of the process. While mapping software might be available, this software typically might not be a part of the project management software. The mapping software thus may require continual manual updates of the information. Since the mapping software may be part of a separate system, it might not be possible to view data aside from location data without performing a cumbersome import process from the project management system. Finally, real-time changes to project management data might not be viewed in the mapping system until some importing/synchronization has taken place. Thus, the process of process management with location related entities may become cumbersome, involving multiple software applications and people while still not enabling real time knowledge sharing and actions based on real time information.

When working on multiple projects, it may be difficult to understand which team members are busy or available. Companies lose money when their teams are underutilized when they pay employees and contractors but don't utilize these resources to the full extent possible. The same is true for non-human resources such as vehicle fleets or machinery. These too may be underutilized if their allocation versus capacity is not properly managed. Resources may also be over-utilized due to incorrect allocation leading to stress, burnout, or overbooking. Further, resource availability may vary due to weekends, holidays, maintenance, and so forth.

Typically, while tasks or allocations of resources may be tracked in one place, the reporting may occur in spreadsheets that may lack the ability to provide real time information about each resource thus requiring continual manual updates of the information. The spreadsheets may not provide a visual resource view that is easy to understand and that shows the state of capacity and utilization of the resources. It may also be necessary to hire a person whose position may be dedicated to managing resource tracking and allocation. This person may need to report to other people who are responsible for allocating tasks or items to each resource. Thus, the process of resource management becomes cumbersome, involving multiple data sources, software applications and people while still not enabling real time knowledge sharing and actions based on real time information.

SUMMARY

Embodiments consistent with the present disclosure provide systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with disclosed embodiments, systems, methods, and computer readable media for automatically applying changed templates across user-facing applications. Systems, methods, devices, and non-transitory computer readable media may include at least one processor that is configured to store a customized template in a repository. The at least one processor may integrate the customized template into the user-facing applications, wherein the integrated customized template enables tailoring of data associated with the user-facing applications into which the template is integrated. The at least one processor may further be configured to update the customized template, push the updated customized template to the user-facing applications in which the customized template was integrated, and enable, via the pushed update, a simultaneous change in tailoring of data within each of the user-facing applications in which the customized template was integrated.

This disclosure provides systems and methods for collaborative work systems. In an aspect, this disclosure provides for systems, methods, devices, and non-transitory computer readable mediums for relationship recognition in tablature. Systems, methods, devices, and non-transitory computer readable mediums may include at least one processor that is configured to identify a first column heading selection for a first column in a table and identifying a second column heading selection for a second column in the table; define a column combination based on the identified first column heading selection and identified second column heading selection; analyze a plurality of predefined column heading combinations contained in a memory to determine when the defined column combination corresponds to a predefined column heading combination from among the plurality of predefined column heading combinations contained in the memory; associate a predefined logical combination rule with the first column and the second column in the table based on a determination that the defined column combination corresponds to the predefined column heading combination; monitor entries in the first column and the second column for a triggering event when the predefined logical combination rule is triggered; and alter a display in the table using the predefined logical combination rule based on the triggering event.

Embodiments consistent with the present disclosure provide systems and methods for generating and transmitting over a network, electronic notifications associated with tablature. These embodiments may involve at least one processor configured to present a table with cells defined by horizontal rows and vertical rows, wherein one of said horizontal rows and vertical rows defines items and another of said horizontal rows and vertical rows defines persons, and wherein a responsibility cell at an intersection of a vertical row and a horizontal row associates at least one particular person with a particular item. The at least one processor may further configured to receive an input, associated with the responsibility cell, of at least one address linked to an account of at least one person associated with the item, receive a change made in an item row, and in response to the change in the item row, automatically access the at least one address in the responsibility cell, and automatically send a notification via the link to the at least one address.

Some embodiments consistent with the present disclosure provide security systems and methods for regulating permission access in tablature. These embodiments may involve at least one processor configured to maintain a table having a plurality of rows and columns, receive a first customized access permission that regulates access to information in a particular column, and receive a second customized access permission that regulates access to information in a particular row. The at least one processor may be further configured to regulate an ability to access information in a particular cell of the table when the particular cell is in at least one of the particular column or the particular row, and output a signal to display the table with the particular cell regulated.

Consistent with some embodiments of the present disclosure provide systems and methods for rendering static and dynamic data in tablature. These embodiments may involve at least one processor configured to output a signal for rendering a table containing a plurality of cells, wherein at least a first cell is enabled to contain static data and at least a second cell is enabled to contain dynamic data. The at least one processor may be further configured to provide access to a menu of values for inclusion in at least the second cell, wherein the menu of values identifies dynamic data values associated with selectable animations. The at least one processor may be further configured to enable selection of a dynamic data value to specify an associated selectable animation for inclusion in the second cell and cause the associated selectable animation in the second cell to dynamically display while the first cell displays static data.

Some embodiments consistent with the present disclosure provide systems and methods for enabling display of graphs in tablature. These embodiments may involve at least one processor configured to display a table of items including a plurality of cells, wherein at least some of the plurality of cells include item-associated alphanumeric data, and wherein at least one of the plurality of cells includes an item-associated variable time-based graphic representing item progress. The at least one processor may be further configured to access an indicator of a current point in time, determine an extent of progress at the current point in time, and alter, in a display of the table, the item-associated variable time-based graphic to correspond to the current point in time to thereby reflect, within the at least one of the plurality of cells adjacent to at least one cell containing the item-associated alphanumeric data, a graphical indication of the extent of progress at the current point in time.

Embodiments consistent with the present disclosure provide systems and methods for automating tablature. These embodiments may involve at least one processor configured to maintain a plurality of logical templates, each logical template of the plurality of logical templates including predefined requirements and user-definable requirements, enable formation of a table having a plurality of horizontal and vertical rows, enable selection of a logical template, enable input for the user-definable requirements into the selected logical template, and enable association of the selected logical template with a row. The at least one processor may be further configured to execute logic operations defined by the selected logical template to operate on the row in response to the association of the selected logical template with the row.

Embodiments consistent with the present disclosure provide systems and methods for enabling communications via tablature for an application. These embodiments may involve at least one processor configured to generate a table containing cells for holding values and enable association of a communications rule with a specific cell of the table, wherein the communications rule includes a trigger that automatically activates when a specific value in the specific cell meets a criterion. The at least one processor may be further configured to trigger the communications rule when the specific value in the specific cell meets the criterion and communicate, upon triggering of the communications rule, a message relating to the specific value in the specific cell meeting the criterion.

Embodiments consistent with the present disclosure provide systems and methods for organizing status-based tasks in tablature. These embodiments may involve at least one processor configured to maintain a plurality of task tables for a plurality of entities, wherein each task table of the plurality of task tables contains a plurality of tasks, each task being defined by a row of cells. The at least one processor may be further configured to configure a cell associated with each task in each task table to maintain a status value, and output a signal to display an aggregate table consolidating, from the plurality of task tables of the plurality of entities, a list of tasks that share a common status value.

Consistent with some disclosed embodiments, systems, methods, and computer readable media for project time tracking are disclosed. The embodiments may include maintaining a plurality of timers for a plurality of individuals working on a plurality of projects. The plurality of timers reflecting current work time of each individual may be simultaneously run. At least one common project being worked on by the plurality of individuals may be identified for aggregate real time work tracking, and a joint work tracking clock may be displayed. The joint work tracking clock may run faster than real time when multiple individuals simultaneously work on at least one project.

Consistent with some disclosed embodiments, systems, methods, and computer readable media for enabling automatic time zone updates in tablature are disclosed. The embodiments may include maintaining a data structure containing information related to a plurality of tasks assigned to a plurality of geographically disbursed individuals. The data structure may include indications of tasks, identities of the plurality of geographically disbursed individuals, and geographical locations associated with the plurality of geographically disbursed individuals. At least one task assigned to a particular individual from the plurality of geographically disbursed individuals may be retrieved from the data structure and displayed in each of a plurality of tables, together with a display of a subgroup of the plurality of tasks assigned to others of the plurality of geographically disbursed individuals. For each task of the plurality of tasks in each of the plurality of tables, an indication identifying an assigned individual may be retrieved from the data structure and displayed. For each individual assigned to each task in each table, an indication identifying an assigned current geographical location may be retrieved from the data structure and displayed. An indication that the assigned current geographical location of the particular individual has changed to a new location may be received, via a computing device of the particular individual. The new location associated with the tasks of the particular individual may be retrieved from the data structure, and displayed in the plurality of tables.

Consistent with disclosed embodiments, systems and methods for converting data from tablature into moving objects are disclosed. The embodiments may include maintaining a table having vertical rows and horizontal rows. A cell at an intersection of each vertical row and horizontal row may contain a value. A selection of a row for alternate display may be received. In response to the received selection, the selected row of cells may be displayed in a dynamic manner. The value from each cell in the selected row may be represented by a moving object. The size of the moving object and/or a color of the moving object may be based on data contained in an associated cell of each cell in the selected row. During the display, the moving objects may be configured to move relative to each other.

Consistent with some embodiments, this disclosure presents various mechanisms for process management systems. Such systems may involve software that enables multiple users to work collaboratively. By way of one example, workflow management software may enable various members of a team to cooperate via a common online platform.

The process management system as disclosed herein may feature a dashboard view for providing an overview of the items (such as tasks or inventory) tracked within groups (such as projects). In some implementations, the dashboard may feature widgets for providing specific graphical representations of items and groups. As described herein, a widget may include a graphical indicator in the shape of a battery for providing an aggregated view of the status labels associated with multiple items in multiple groups. The battery widget advantageously may enable a visualization of the total portion of each aggregated status label while illustrating how "full" the battery is.

In some implementations, the table data that is used to generate the battery view may be displayed under the battery. Further, the source table data may be directly edited in the battery widget view to add or modify process management data and may enable immediate visualization in the battery widget of the changes made, without having to switch to a separate source table editing view. In some implementations, to enhance the visual impact of the battery widget, multiple customizations are provided for users to customize and input the title, label key, completion label, and weighting of the selected status columns, amongst other customizations as described herein.

Various embodiments are described herein with reference to a system, method, device, or computer readable medium. It is intended that the disclosure of one is a disclosure for all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for each of discussion only, and one or more aspects of one-embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform operations comprising: maintaining for presentation, in a first table form, a first group of items associated with a first project, wherein at least a first item from the first group of items is assigned to an entity and has an associated first status, maintaining for presentation, in a second table form, a second group of items associated with a second project, wherein at least a second item from the second group of items is assigned to the entity and has an associated status different from the first status, and enabling display of a graphical indicator aggregating the associated statuses of the at least a first item and the at least a second item, wherein a first graphical element of the graphical indicator represents the at least a firm item and a second graphical element of the graphical indicator represents the at least a second item, enabling selection of the first graphical element to thereby cause the at least a first item to appear in a form other than the first table form, and enabling selection of the second graphical element in order to cause the at least second item to appear in a form other than the second table form.

This disclosure presents various mechanisms for process management systems. Aspects of this disclosure may be used to track geographically disbursed activities. The system may therefore enable a specific person or object to be associated with a location, and the system may then allow items to be managed via a map interface. For example, if a team has individuals located in different offices, the offices may appear on a map, and interaction with the office location on the map via a GUI may enable items associated with that location to be managed via the map interface. Similarly, real estate holdings of a property management company might be displayed on a map, which may enable a one or more users to manage each property via the map interface.

A user may add a column of which the data type is location. The user may change the view of the process management board to a map view. The map view may show the location data from the board, on a map. In the map view, a user can filter the data that may be displayed, based on other data columns that exist on the board. For example, a user may filter the map display to show location, by a rating column, by a status column, by labels on the board, by numbers on the board or any data type on the board.

This disclosure presents various mechanisms for process management systems. Aspects of this disclosure may provide users with a platform providing a centralized resource utilization view that also allows disbursement of items or tasks in real-time, for a large number of resources in one place and at the same time, without having to check each resource individually, where each resource may be assigned to multiple projects, tasks or items that are not necessarily related to one another. Aspects of this disclosure may allow a view and management of everything each resource is involved in, in one place.

In some implementations, the centralized view may allow a unique visualization of the workload per period of time for each resource. This may be achieved by defining a resource unit capacity for each resource, assigning resources to items, assigning resource units to each item, aggregating the resource utilization per period, and displaying the utilization of each resource as a visual indicator of the current workload.

In addition to displaying of numerical values for the utilization of each resource in the resource view, aspects of this disclosure may provide a visual display of utilization information that is easy to grasp with a quick glance. The visualization may include a visual resource utilization indicator that varies based on different utilization of capacity to provide a clear indication of the load on each resource.

Each resource may have different work or available capacity. For example, workers may have different availability, some working full time and others working part-time; trucks may have different space for storage; tables may have different numbers of seating capacities, etc. To overcome this issue, in some implementations, a settings component may allow users to set a selected unit capacity and resource availability for each resource. In some implementations, the platform may use and display a pre-defined unit capacity value per time period.

Some aspects of this disclosure may enable real time knowledge of which resources are available and which are overloaded, further allowing movement or extension of existing tasks or assignment of new tasks, projects, or other items, to an appropriate resource. In some implementations, the underlying data that is used to generate the resource view may be displayed alongside a resource utilization indicator. Further, the source data may advantageously be directly edited in the resource view to add or modify process management data and enable immediate visualization in the resource view of the changes made, without having to switch to a separate source data editing view.

In some embodiments, all aspects of resource management may be enabled in one platform thus preventing inaccuracies and inefficiencies associated with usage of multiple tools. Further, the platform may also provide "smart suggestions" of resources that are available and/or most suitable for a certain item/task.

In some implementations, aspects of this disclosure may provide a notification or report to different users on changes made in the assignment of items that impacted the status of capacity of a resource. Such notifications or reports may be allocated to the resource itself, to other managers, to a team, or to other users.

The details of one or more implementations are set forth in the accompanying drawings and the description below. Other features will be apparent from the description and drawings, and from the claims.

The forgoing summary provides just a few examples of disclosed embodiments to provide a flavor for this disclosure and is not intended to summarize all aspects of the disclosed embodiments. Moreover, the following detailed description is exemplary and explanatory only and is not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3D is an exemplary layout of yet another customized template and an integrated sub-template, consistent with some embodiments of the present disclosure.

FIG. 5A illustrates an example of a table that includes multiple columns, consistent with some embodiments of the present disclosure.

FIG. 7A illustrates an example of a table with an altered display, consistent with some embodiments of the present disclosure.

FIG. 7B illustrates an example of a table with another altered display, consistent with some embodiments of the present disclosure.

FIG. 7C illustrates an example of a table with yet another altered display, consistent with some embodiments of the present disclosure.

FIG. 9A illustrates an example of a table that presents two linked columns, consistent with some embodiments of the present disclosure.

FIG. 9B illustrates another example of a table that presents two linked columns, consistent with some embodiments of the present disclosure.

FIG. 10A illustrates an example of a table with linked data columns, consistent with some embodiments of the present disclosure.

FIG. 10B illustrates an example user interface for configuring predefined logical combination rules, consistent with some embodiments of the present disclosure.

FIG. 16 illustrates an example of a logical rule notification interface, consistent with some embodiments of the present disclosure.

FIG. 25 illustrates an example of a role management user interface consistent with some embodiments of the present disclosure.

FIG. 26 illustrates an example of a table that includes multiple columns and rows, consistent with some embodiments of the present disclosure.

FIG. 33 illustrates another example of an interface containing various cells including cells with item-associated alphanumeric data, consistent with some embodiments of the present disclosure.

FIG. 38 illustrates an example of a table that includes multiple columns, consistent with some embodiments of the present disclosure.

FIG. 61 illustrates an example of a table that includes multiple columns and rows, consistent with some embodiments of the present disclosure.

FIG. 62A illustrates an example of an aggregate table that consolidates multiple tables, consistent with embodiments of the present disclosure.

FIG. 62B illustrates an example of a user interface for sending a notification, consistent with some embodiments of the present disclosure.

FIG. 70 illustrates a second view of an example of a user interface that may enable project time tracking, consistent with some embodiments of the present disclosure.

FIG. 75 illustrates an exemplary user interface that may depict automatic time zone updates, consistent with some embodiments of the present disclosure.

FIG. 76A illustrates a first view of an example user interface that may display a first subgroup of tasks, consistent with some embodiments of the present disclosure.

FIG. 78 illustrates a user interface and a selection of a geographic location, consistent with some embodiments of the present disclosure.

FIG. 81 illustrates an example user interface that may display a table containing tasks, consistent with some embodiments of the present disclosure.

FIG. 82 illustrates an example user interface that may enable user selection of one or more rows for alternative display, consistent with some embodiments of the present disclosure.

FIG. 84 illustrates an example user interface that may enable a user to define a display time criterion, consistent with some embodiments of present disclosure.

FIG. 105 illustrates an example of a graphical user interface for presenting a process management board view consistent with some embodiments of this disclosure.

FIG. 106A illustrates an example of a graphical user interface for presenting a process management board view consistent with some embodiments of this disclosure.

FIG. 106B illustrates another example of a graphical user interface for presenting a map view consistent with some embodiments of this disclosure.

FIGS. 107A-107C illustrate examples of graphical user interfaces for presenting a map view consistent with some embodiments of this disclosure.

FIG. 108 is a diagram of an example process for presenting a map view consistent with some embodiments of this disclosure.

FIG. 109 is a block diagram of an exemplary process for altering tablature via geographical interfaces, consistent with some embodiments of the present disclosure.

FIG. 110A is a high level network diagram of an exemplary system for process management consistent with some embodiments of the present disclosure.

FIGS. 110B-110C are block diagrams of user device implementations consistent with some embodiments of the present disclosure.

FIG. 111 illustrates an example graphical user interface for presenting a process management board view consistent with some embodiments of the present disclosure.

FIG. 112A illustrates another example graphical user interface for presenting a process management board view consistent with some embodiments of the present disclosure.

FIGS. 112B-112C illustrate an example graphical user interface for presenting a process management resource utilization view consistent with some embodiments of the present disclosure.

FIG. 112D illustrates an example graphical user interface for presenting resource unit capacity settings consistent with some embodiments of the present disclosure.

Figure 113:
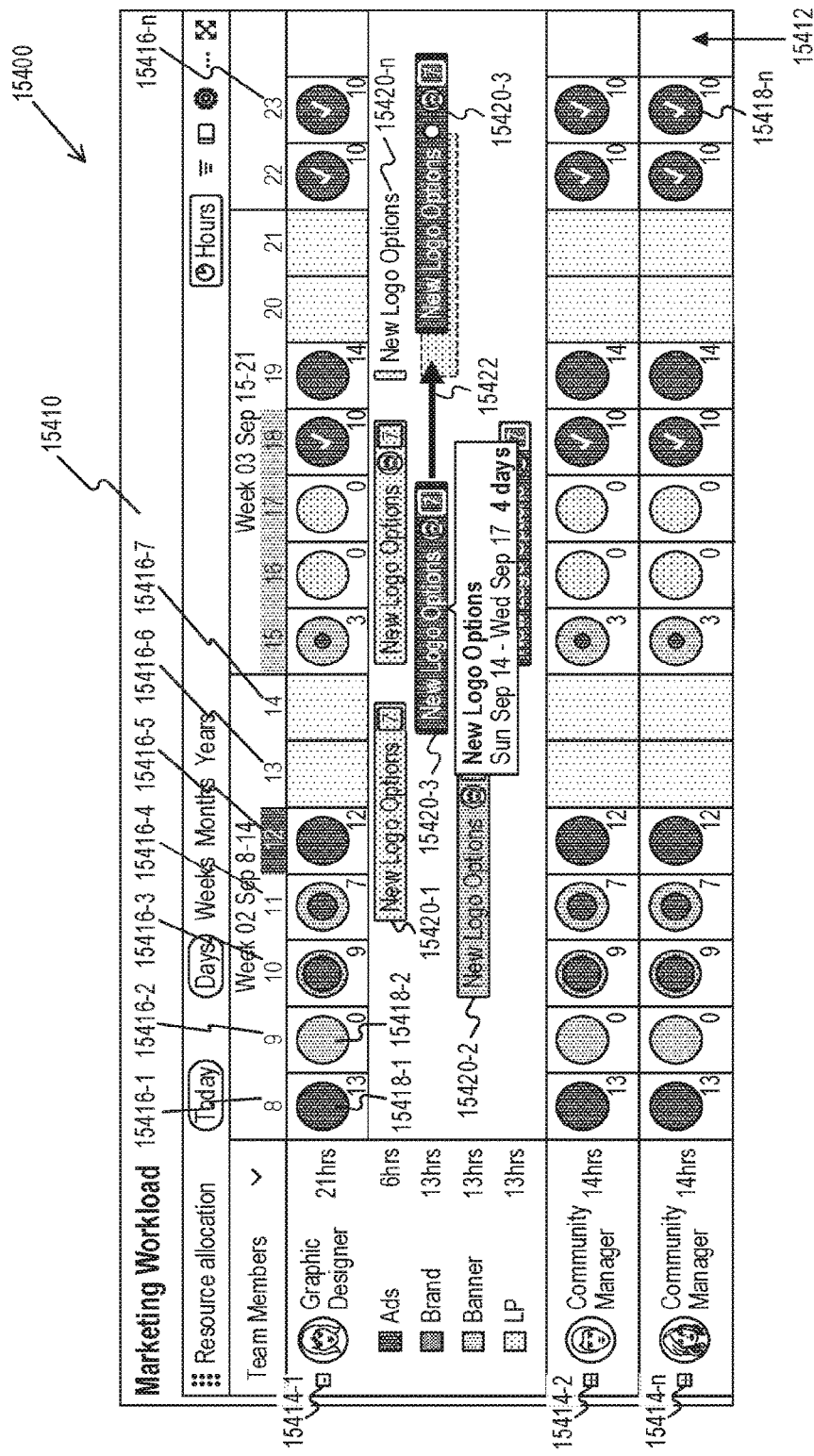

FIG. 113 illustrates another example graphical user interface for presenting a process management resource utilization view consistent with some embodiments of the present disclosure.

Figure 114:
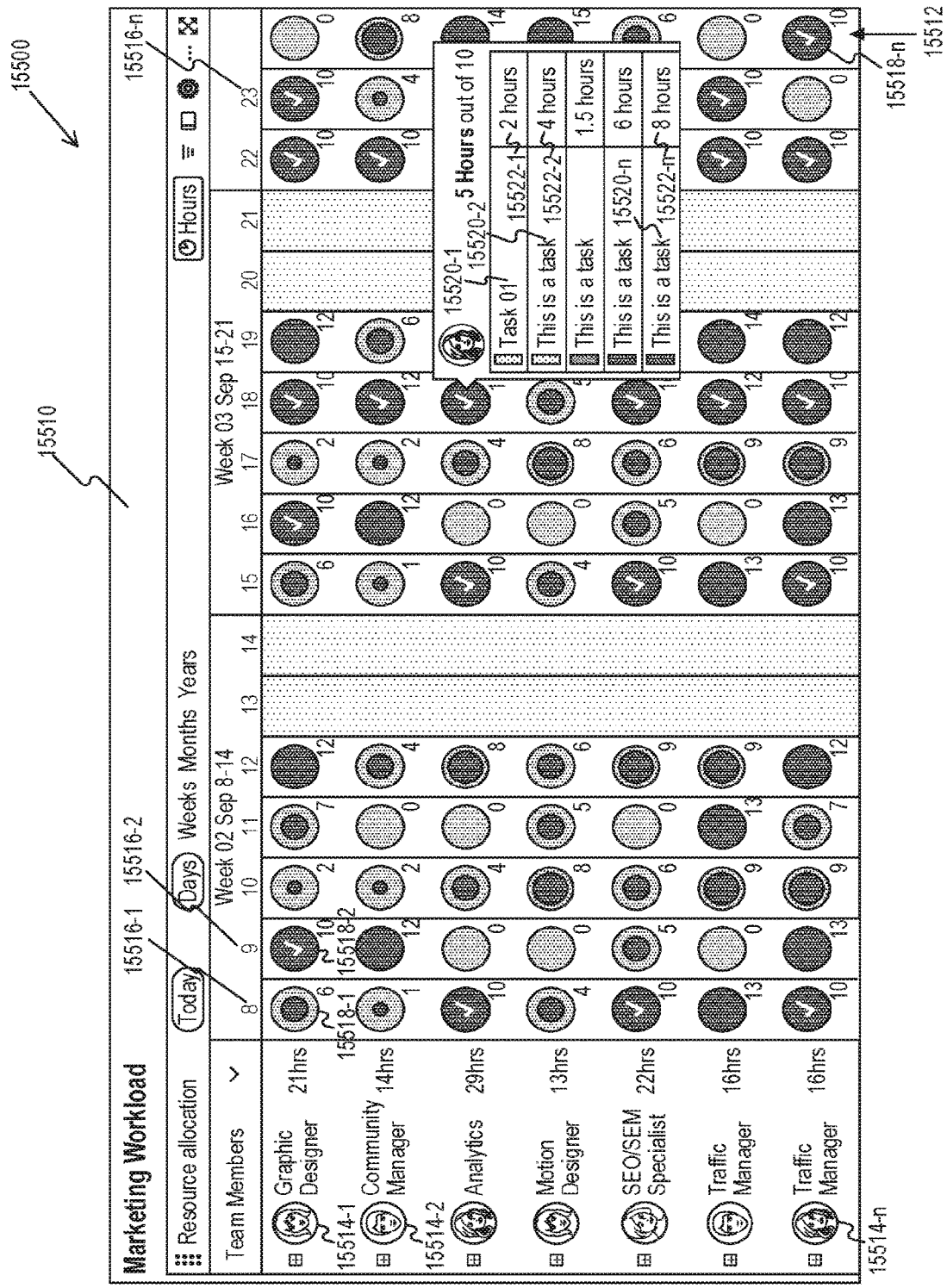

FIG. 114 illustrates a further example graphical user interface for presenting a process management resource utilization view consistent with some embodiments of the present disclosure.

Figure 115A:
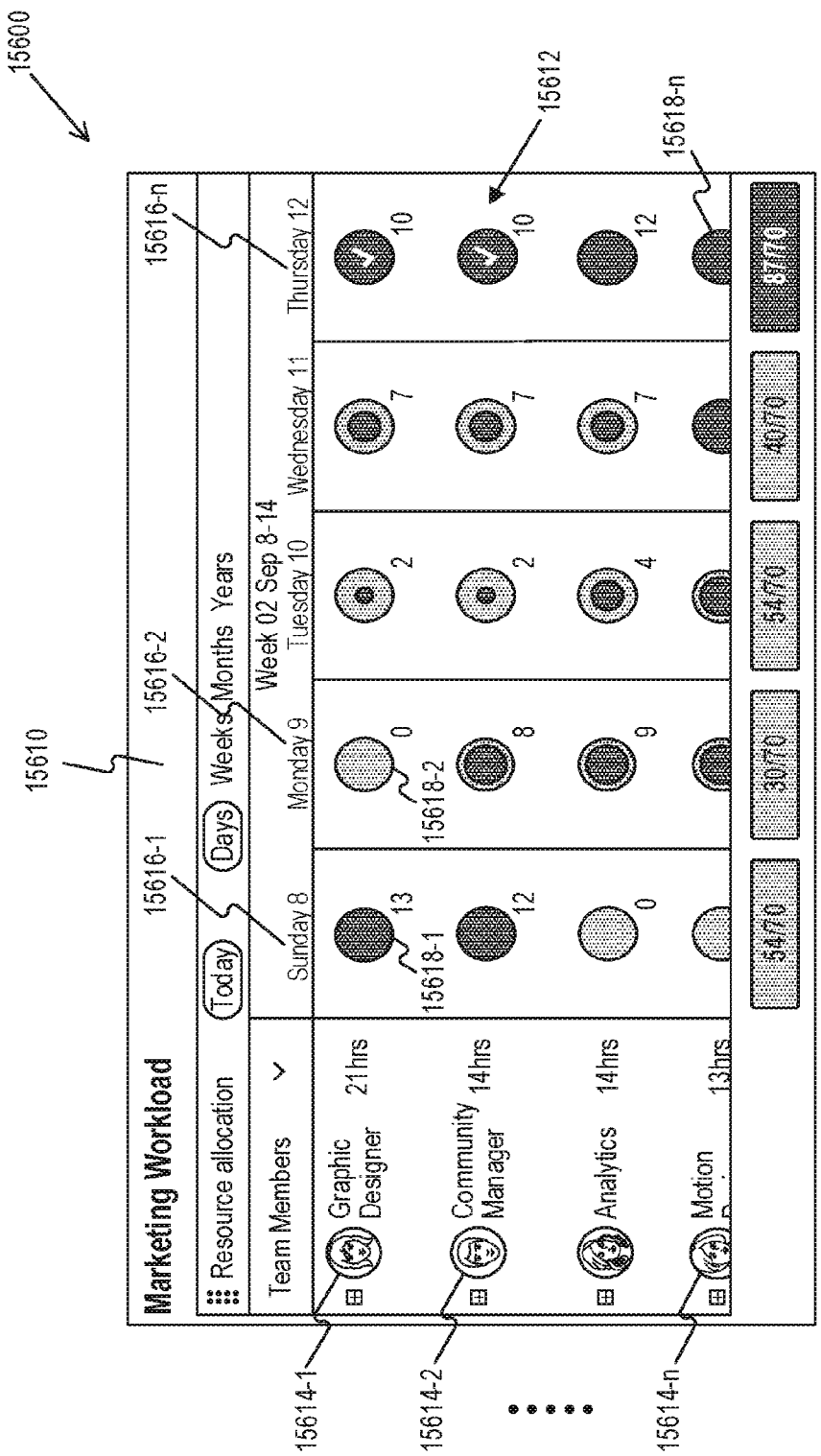
Figure 115B:
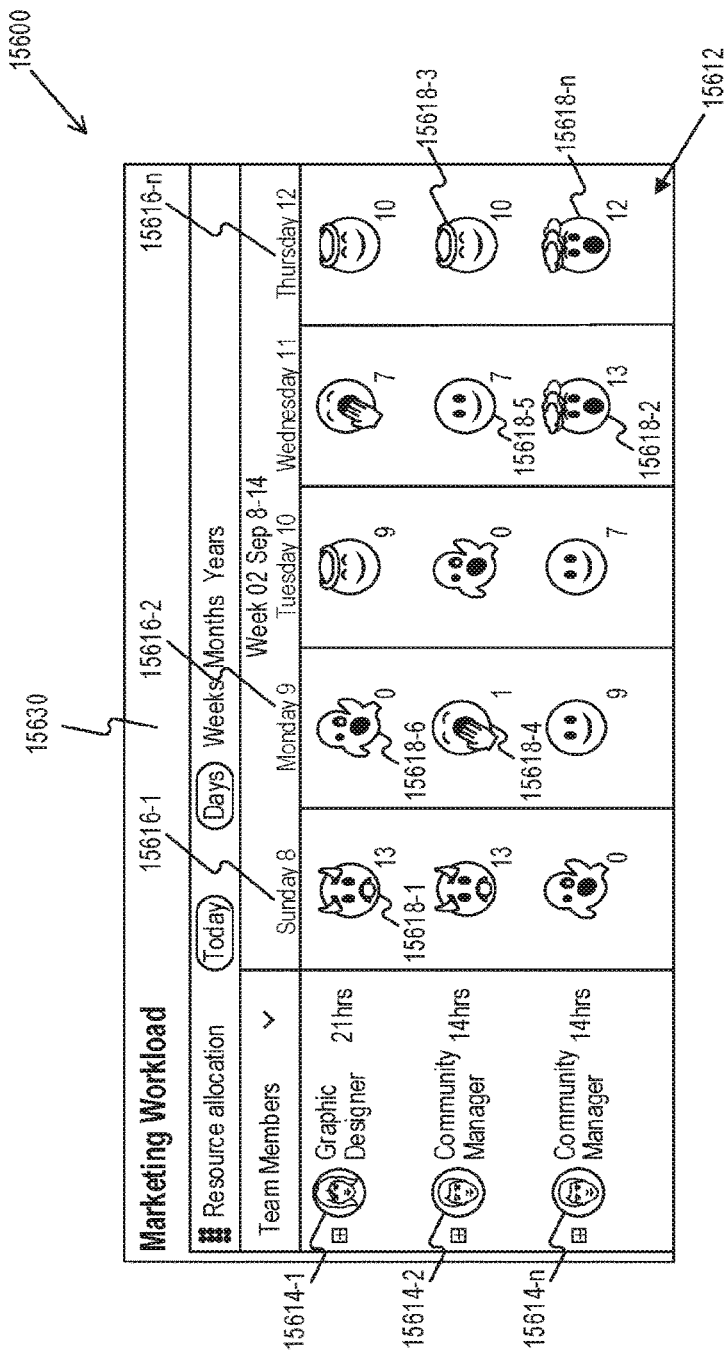

FIGS. 115A and 115B illustrate another example graphical user interface for presenting a process management resource utilization view consistent with some embodiments of the present disclosure.

FIG. 116A illustrates a further example graphical user interface for presenting a process management board view consistent with some embodiments of the present disclosure.

FIGS. 116B-116E illustrate yet another example graphical user interface for presenting a process management resource utilization view consistent with some embodiments of the present disclosure.

Figure 117:
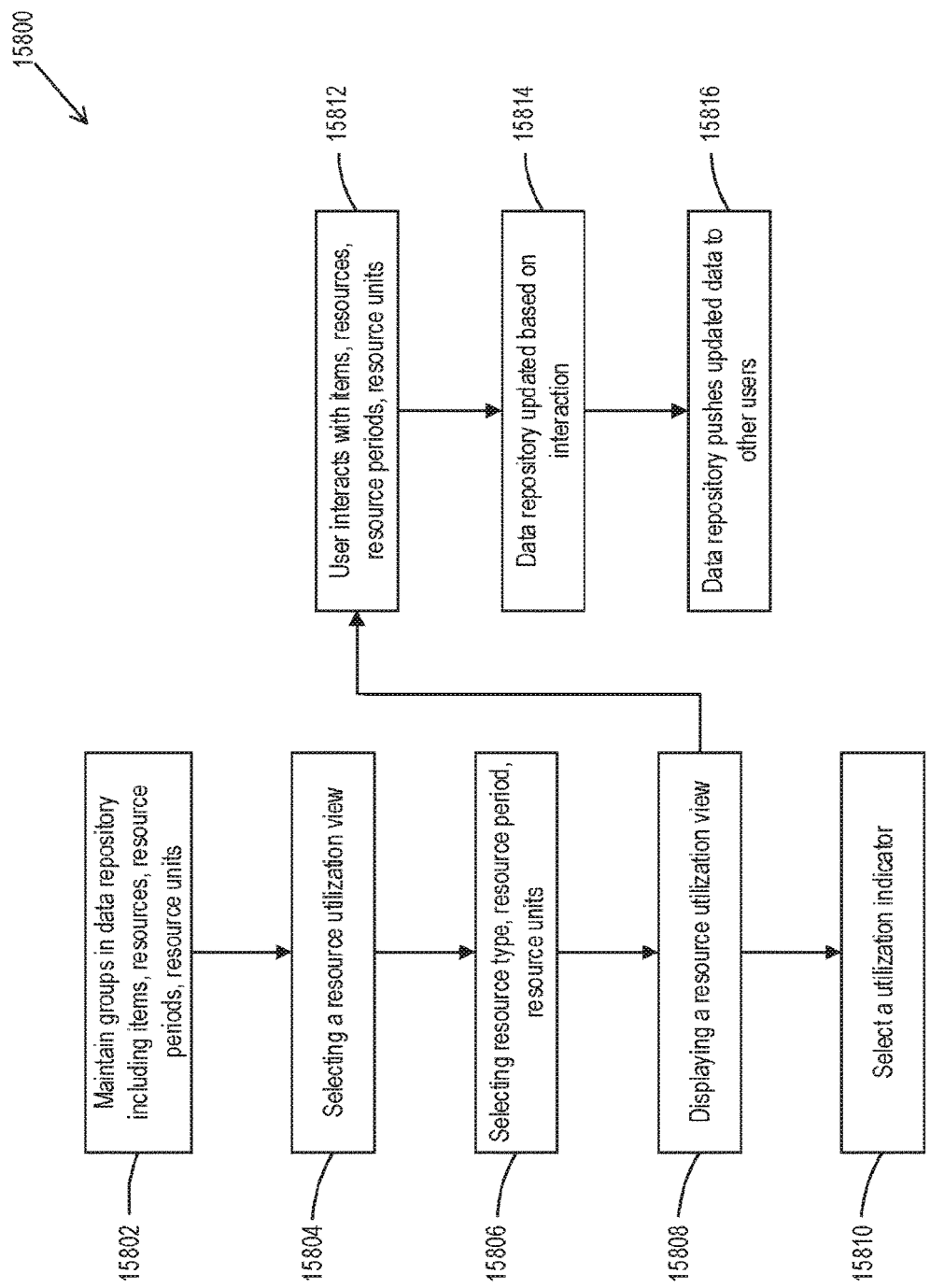

FIG. 117 is a block diagram of an example process for displaying a resource utilization view consistent with some embodiments of the present disclosure.

Figure 118:
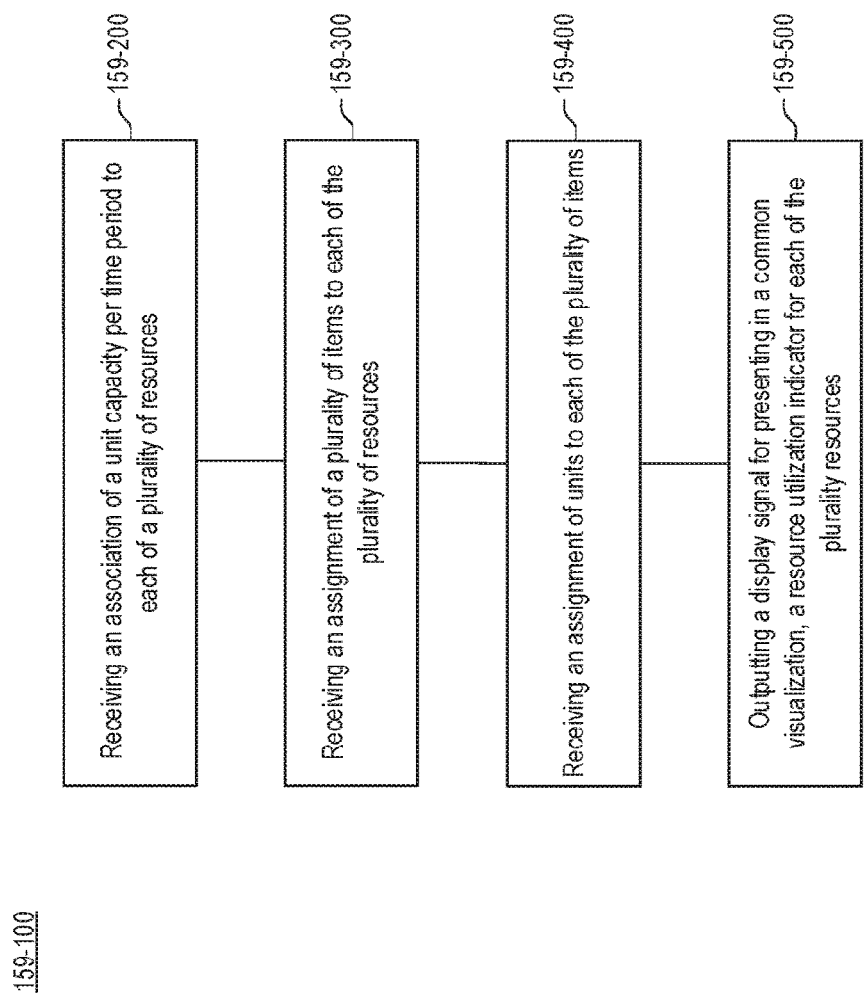

FIG. 118 is a block diagram of an exemplary process for managing resource utilization, consistent with some embodiments of the present disclosure.

DETAILED DESCRIPTION

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit.

Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Figure 1:
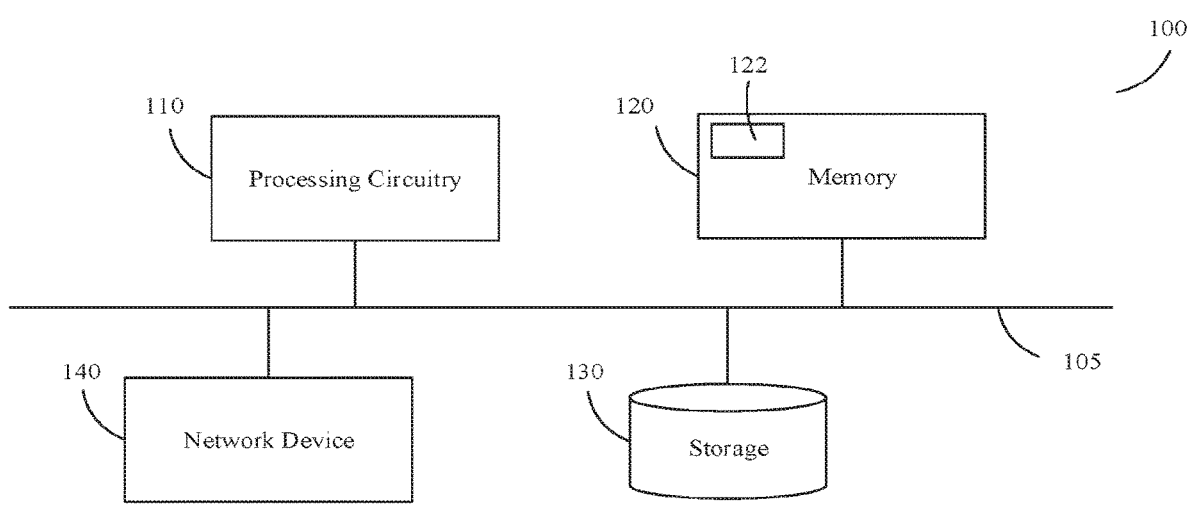
FIG. 1 is a block diagram of an exemplary computing device which may be employed in connection with some embodiments of the present disclosure.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
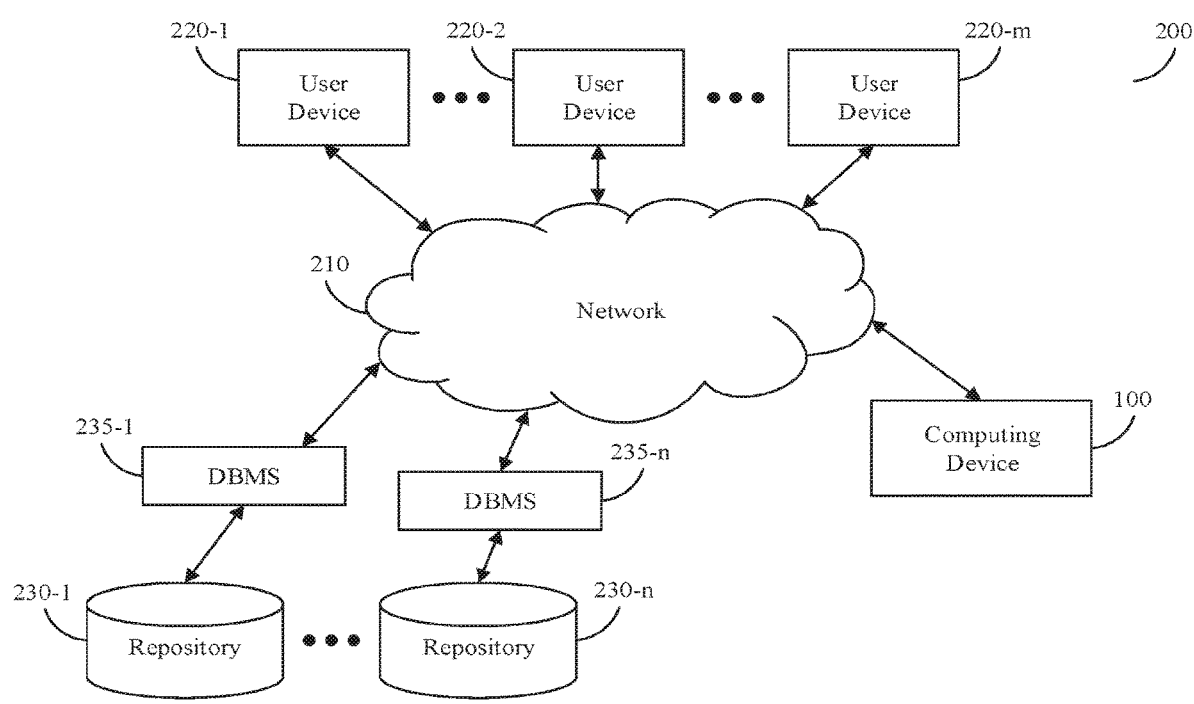
FIG. 2 is a block diagram of an exemplary computing architecture for collaborative work systems, consistent with some embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may provide a technical solution to the challenging technical problem of collaborative work systems. Disclosed embodiments include methods, systems, devices, and computer-readable media. For ease of discussion, a system is described below with the understanding that the disclosed details may equally apply to methods, devices, and computer-readable media.

Some disclosed embodiments may involve a system for automatically applying changed templates across user-facing applications. As discussed later in greater detail, a user may customize computer applications (user-facing applications as described later in greater detail) by integrating predesigned templates, such as those designed by others, into the computer applications. Over time, the author of the template may update the template, making changes to it. Embodiments of this disclosure involve how those updates are disseminated to users who have already integrated the template into their computer applications.

Some embodiments may involve the use of at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Other aspects of disclosed embodiments may be implemented over a network (e.g., a wired network, a wireless network, or both).

As another example, some aspects of such methods may be implemented as operations or program codes in a non-transitory computer-readable medium. The operations or program codes can be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Other aspects of disclosed embodiments may involve non-electronic means. In a broadest sense, the disclosed embodiments are not limited to particular physical and/or electronic instrumentalities, but rather may be accomplished using many differing instrumentalities.

Some embodiments may be implemented via a computing device 100 of FIG. 1, where the at least one processor may be implemented as the processing circuitry 110. In other embodiments, the non-transitory computer readable medium may be implemented as the memory portion 122 of the memory 120 that may contain the instructions to be executed by the processing circuitry 110. The instructions may cause the processing circuitry 110 corresponding to the at least one processor to perform operations consistent with the disclosed embodiments.

Aspects of this disclosure may include storing a customized template in a repository. A customized template, as used herein, may refer to a group of one or more building blocks that may be combined to form one or more specific structures. The building blocks may include columns, rows, tables, communication components, charts, texts, images, workspaces, board views, dashboards, widgets, actions, triggers, listeners, authentications or any other user interface elements that can accept user input or output information. Actions, for example, may generate duplications, generate assignments, archive, or any other action. In some embodiments, actions may be triggered when a condition is met, such as when a date passes or when something is assigned. A structure may take the form of an entire board, a dashboard, a table, a column, or any other combinations of one or more building blocks. The structures may also include other visible aspects such as a table cell, a table border line, a table header, or any table elements. For example, a customized template may include a table having horizontal and vertical rows (e.g., rows and columns), a single column, a combination of columns, an entire board, a dashboard, a widget, or any combination thereof. Various rows or columns of the table may be defined to represent different projects, tasks, objects or other items, as well as characteristics of such items. For example, a horizontal row may represent an item and a vertical row may represent a status (a characteristic associated with the item.). In some embodiments, the items in the table may be unifying rows or columns that represent projects, tasks, property, people, or any object, action, or group of actions that may be tracked.

In further examples, a customized template may include one or more structures for specific applications such as marketing, content production, project management, sales & customer management, freelancing, design, software development, human resources management, manufacturing, office operations, startup planning, education, real estate, venture capital, or any other category of activities that involve tracking of different metrics and tasks.

As a simple example, a customized template may be a single column. A single column may indicate any information specified by the user or system, including but not limited to, task status, name, email, position, task, performance metric, or any static or dynamic information indicating an aspect of a task. The single column may include at least one cell and may be contained within a table. The template may further include a column title and labels that may be used to populate the cells under the column (e.g., done, waiting, in progress, completed).

Figures 3A, 3B:
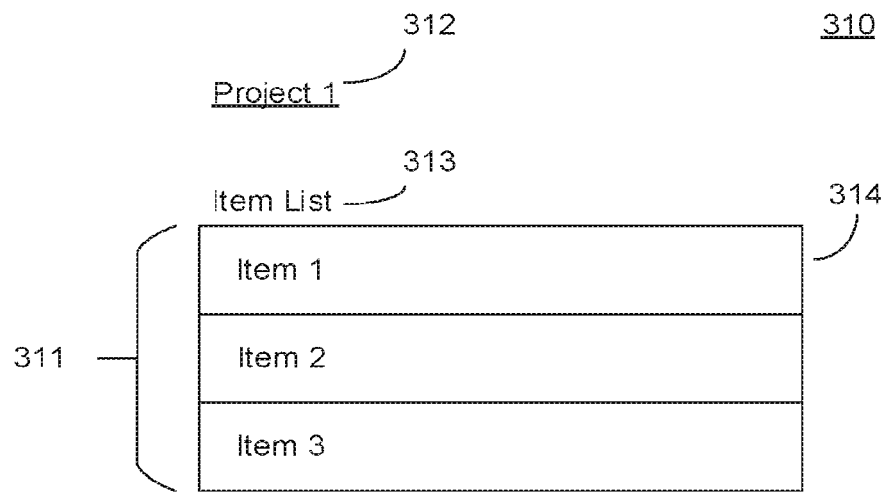
FIG. 3A is an exemplary layout of a customized template including a single column, consistent with some embodiments of the present disclosure.
FIG. 3B is an exemplary layout of another customized template including a plurality of columns, consistent with some embodiments of the present disclosure.

Byway of example, FIG. 3A illustrates one example of a customized template 310 including a single column 311. The basic customized template 310 may also include a template title 312 and a table or column title 313. In some embodiments, the single column 311 may include one or more rows of cells 314, each of which may include any combination of a number, text, symbol, mark, character, date, time, icon, avatar, hyperlink, picture, video, animation, or any other visible information.

In some embodiments, a customized template may include a plurality of columns with linkages between at least two of the plurality of columns. Each of the plurality of columns may indicate any information specified by the user or system similar to the single column described above. The combination of the plurality of columns may indicate a relationship between the cells of the row as described herein. The linkages (may be referred to as predefined logical combination rules, logical sentence structures, or automations herein) may refer to rules that associate at least two of a plurality of columns with each other. In some embodiments, the rules may include a mathematical function that determines the value of a column based on values of one or more columns (e.g., a column may be customized to display a due date determined by adding 50 days to the date indicated in another column). In other embodiments, the rules may include conditional functions that determine the appearance of a column based on the value of the column itself and/or the values of one or more other columns (e.g., a column may turn red when a due date specified therein has passed). In further embodiments, the rules may include computer-readable instructions that perform certain actions using third-party services (e.g., the template may control a smart light bulb when the value of a column meets a predetermined condition), change the appearances of one or more columns, and/or change the values of one or more columns (e.g., a column may be linked to another column to display the same information). Additional embodiments of linkages or rules are also possible as described herein.

Figure 3C:
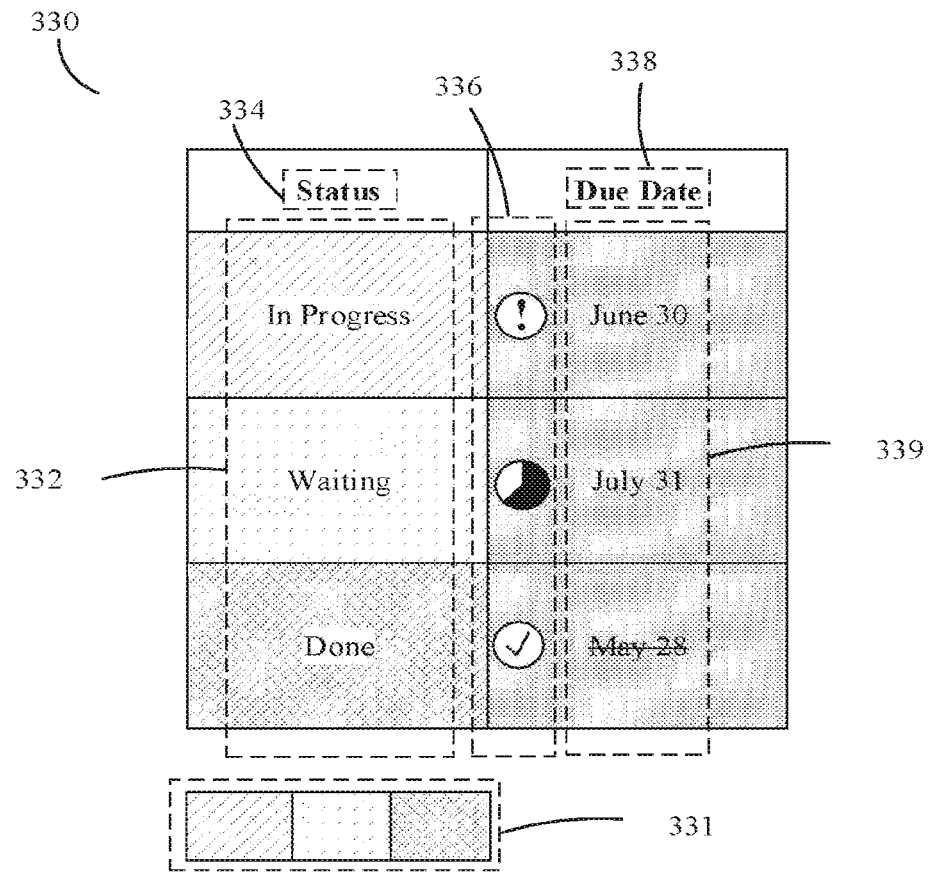
FIG. 3C is an exemplary layout of another customized template, consistent with some embodiments of the present disclosure.

For example, FIG. 3C illustrates an example embodiment of at least two columns that are linked to create additional information such as due dates. The columns may provide additional indicators of the status of an item such as changing color or presenting an indicator based on the current point in time relative to the due date. In some embodiments, the rules for linking columns may be configured by logical combination rules or automations as further described herein.

In further embodiments, aspects of this disclosure may also include storing rules that associate at least two customized templates together. The rules may include logical combination rules described herein or any other logical associations between cells, columns, rows, tables, dashboards, widgets, templates, and any other data structure. The rules may act on columns of more than one table, including tables of different users. For example, a first customized template may include a customized template for a Budget column and a second customized template may include a customized template for a Status column. A rule may include associating both the customized Budget column template and the customized Status column template to create a unique rule template that associates at least two customized templates. Other examples of rules are further described herein.

In some other embodiments, the customized templates may also include a plurality of columns and a display aggregation of the plurality of columns. A display aggregation may include displaying the plurality of columns together such as in a table, a board, a dashboard, a marketplace, or any visual display of the plurality of columns. Additionally or alternatively, the display aggregation may include more than one table, each displaying a subset of the plurality of columns. In some embodiments, the display aggregation may be configured for display on a user's device, such as a desktop, laptop, smartphone, tablet, smart watch, or any electronic device configured to present information.

By way of example, FIG. 3B illustrates one example of a multi-column customized template 320 including a budget column 321, a current spending column 322, a current progress column 323, and a relative spending column 324. The budget column 321 may indicate predetermined budgets for different projects; the current spending column 322 may indicate the amounts currently spent for the corresponding project in the same row; the current progress column 323 may indicate the current progress for the corresponding project; and the relative spending column 324 may indicate how the current spending compares to the budget relative to the current progress. For example, the information in the first row may indicate that the current spending of $4,500 is on target because it roughly equates to the current progress of 91%. On the other hand, the information in the second row may indicate that the current spending of $3,000, although being only half of the budget, is too much because it exceeds the current progress of 10%. In this example, the columns 321 through 324 may be grouped by a linkage that may associate the relative spending column 324 to the budget column 321, the current spending column 322, and the current progress column 323. In some embodiments, one or more of the columns may also be associated with one or more columns of another customized template, where the current spending, for example, may be a sum of expenses recorded in the other customized template.

Turning back to storing the customized template in the repository, the repository may include any data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Sor, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Data structures may be implemented via a storage device that may be used for storing electronic information. The repository may be collocated with the at least one processor or located in different locations as a remote database or a distributed database. The repository may also be accessible by other users through any computer network setup, such as a remote or cloud database, a server, a network-connected local memory, or any other networked database that can support multiple input and output accesses by a plurality of users.

Furthermore, the repository may serve as a network database or a marketplace, where the customized templates can be shared by original authors and other users. The repository may present a number of options for sharing the customized templates. A customized template may be shared via a repository associated with a marketplace or other sharing mechanism, where templates are available for selection and/or purchase. The templates may be shared with or without conditions, where, for example, a condition may be a payment for using the template. Other conditions may include restrictions on modification, where, for example, the users that receive the template may be restricted from modifying the template. The customized templates may be useful for maintaining uniformity across different users working towards the same goal, and the original author may lock portions of the template so that the users are not able to deviate substantially from the template. For example, a customized template may be locked so that users may not add or remove columns or modify rules that are configured for specific workflows.

In conventional systems, devices, or methods, the customized template may be hard-coded to a particular application, or the customized templates, integrated into a user-facing application, may operate independently of the original customized template. When the original author of the customized template needs to update the hard-coded customized template, such update may be complicated and may require many resources and steps to effectuate the update across all users that integrated the customized template.

In the disclosed embodiments, the customized templates may be freely updatable by the original author, where subsequent updates after the initial creation are automatically disseminated to the members who may have integrated the customized templates into their own user-facing applications, as enabled by the disclosed embodiments. In this way, when the original author makes updates to the customized template, the updates may be passed to every secondary user of the customized template, so that all the integrated templates may be reconfigured based on a single update by the original author. In other embodiments, automatic updates to the customized templates used by secondary users may be disabled on an individual level or partially enabled. In yet other embodiments, secondary users may view the update to the customized template and select parts or all of the update to apply to their own board.

By way of example, FIG. 1 illustrates an example of memory 120 that may serve as a repository to store the customized template in a user device. The repository may be collocated with at least one processing circuitry 110 or located in different locations as a remote database or a distributed database as illustrated in FIG. 2. The repository may also be accessible by other users through any computer network setup such as network 210, which may be a remote or cloud database, a server, a network-connected local memory, or any other networked database that can support multiple input and output accesses by a plurality of user devices 220-1 to 220-*m*.

Consistent with disclosed embodiments, at least one processor may be configured to integrate the customized template into user-facing applications. Once the customized template is stored in the repository and the user has met the criteria for accessing the customized template, a user may be enabled to integrate the customized template into his or her own user-facing application. As used herein, user-facing applications may refer to any computer application employed by a computer user. Customized templates may be associated by the user with the computer application so as to tailor or adapt the computer application to suit the user's needs. Such as adaptions may include adding, removing, or modifying placeholder values, linkages, rows, columns, or any other building blocks included in the customized template.

In some embodiments, the repository may be configured to allow access by only a subset of users that meet certain criteria such as payment for the access or membership, having sufficient authorization, or any other criteria that can be used as a condition for limiting access.

For example, once a customized template is stored in a repository in network 210 of FIG. 1, a user of computing device 100 may download and integrate the customized template to the computing device 100 for their own user-facing application. In some embodiments the network 210 may require the user of computing device 100 to provide an authentication to authorize the download of the customized template from the network 210 or from the repository 230-1.

In some embodiments, integrating the customized template may refer to retrieving or accessing a copy of the customized template in a manner enabling the template to be used in conjunction with the user-facing application. Integrating may occur, for example by storing the customized template with the user-facing application so that the two can be used together, or linking the two to enable usage of the template with the computer application, regardless of the location of each.

According to some embodiments, integrating the template that may enable tailoring of data associated with the user-facing applications into which the template is integrated. The tailoring of data may refer to modifying the integrated customized template to suit the user's specific application (i.e., the user-facing application). More specifically, the user may modify the customized template by replacing any existing values stored in the customized template, adding more rows to the columns therein, removing a portion of the template that is not needed, or performing any other processes or activities that may manipulate the building blocks or the values of the building blocks in the customized templates. In other embodiments, integrating the customized template may occur simply by linking the customized template (as customized by the original template author) with a user-facing application. In such situations, the user-facing application when used with the customized template may function the same or substantially the same for all users of the combination.

In an example embodiment, the customized template may involve a table that has a plurality of columns, while the integrated customized template may include at least one column that is a subset of the plurality of columns of the customized template, or vice versa. In this way, a user may be enabled to select particular columns from a customized template for their own user-facing application. In some embodiments, the original author of the customized template may also place restrictions on the customized template at the time of creation, so that only some portions of the customized template may be restricted from being modified or removed, or some building blocks may be restricted from being added to the customized template. Such restrictions may be added or removed by the original author or any other authorized user in subsequent updates.

Consistent with the disclosed embodiments, integrating the customized template into the user-facing applications may generate a link between the customized template in the repository and the integrated customized template, so that future updates to the customized template may be disseminated to the integrated customized template. The link may be implemented, in some embodiments, as a record of user accounts that integrated the customized template or a record of unique template identifier for the integrated customized template.

By way of example, FIG. 3D illustrates one example of a customized project management template 340 and an integrated project management template 3410. The customized project management template 340 may include columns 341 through 344 that are similar to the budget column 321, the current spending column 322, the current progress column 323, and the relative spending column 324 of FIG. 3B described above. The customized project management template 340 may also include an optional column 345 that users may choose to use or remove in their integrated templates. If the user decides to not include optional column 345 to integrate to their user device, the user would subsequently download integrated project management template 3410 without optional column 345 instead of the full customized project management template 340. Or, the user might simply disable the optional column 345. The number of rows shown in the customized project management template 340 is only exemplary, and the customized project management template 340 may also include a row insertion button 346 for adding more rows. In some embodiments, the customized project management template 340 may further include other placeholder values such as a generic title 347 and generic value 348.

The integrated project management template 3410 may also have similar elements as the customized project management template 340, such as the columns 3411 through 3414 and the row insertion button 3416. The integrated project management template 3410 may also include a specific title 3417 and specific values 3418 that the user entered in order to integrate the template into his or her user-facing application. In some embodiments, however, the integrated project management template 3410 may be restricted from adding more columns besides the optional column 345 or removing any of the columns 3411 through 3414. In further embodiments, the integrated project management template 3410 may allow a user to modify the values or linkages in columns 3411 through 3413, but not necessarily in column 3414. These are just a few examples of how an integrated customized template may allow tailoring of data. Any alteration, modification, or option selection associated with the customized template may be considered a tailoring of data, consistent with disclosed embodiments.

Aspects of this disclosure may also include updating the customized template. For example, an original author, a current template owner, persons authorized by the original author or current owner, or any other authorized user or other authorized individual may update the customized template by adding, modifying, or removing building blocks to and from the customized template. Updating the customized template may be substantially similar to creating the customized template in the first place except that updating the template begins with existing building blocks as opposed to adding building blocks from a clean slate. In some embodiments, updating the customized template may also involve adding, modifying, or removing rules that associate different building blocks with one another. Still further, updating the customized template may involve changing permissions so that users are able to modify different aspects of the template as they integrate the customized templates into their applications.

By way of example, updating the customized template may include adding, removing, or modifying a linkage between a first column of the customized template and a second column of the customized template. This may occur by modifying a rule in the template. For example, a rule may be modified to change a color of a second column based on a value in the first column. Or a rule may add descriptive text to the second column based on information in the first column. There are an unlimited number of cause-effect functions that could be linked from column to column in accordance with disclosed embodiments. In another example, the update may include a display aggregation of the plurality of columns, such as altering the appearance of visible items (e.g., table border, font type, font size, layout, arrangement of the columns) of the customized template.

Once the original author or other authorized user has completed the update to the customized template, the updated customized template may be stored in the repository. In some embodiments, the data record previously associated with the customized template and stored in the repository above may be overwritten with a data record associated with the updated customized template. In other embodiments, a computing device may determine the difference between the existing data record and the updated data record and selectively overwrite the existing data record to reflect the differences. Furthermore, the computing device may store the updated customized template automatically at a predetermined interval, thereby preventing any loss of data due to unexpected crashes or the user's negligence in saving the changes periodically.

Turning to FIG. 3D for example, updating the customized project management template 340 may include adding or removing any number of rows or columns, changing the placeholder values or titles, or modifying any other aspect of the customized project management template 340 that could not be modified while integrating the customized project management template 340. These updates may occur via computing device 100 in FIG. 2, which may update the customized template in a repository located in the computing device 100, in the network 210, remote repository 230-1, or any combination of data structures, regardless of where they are located.

Aspects of this disclosure may also include pushing the updated customized template to the user-facing applications in which the customized template was integrated. An address of every user who linked to or downloaded the customized template may be stored in a data structure, and the update may be pushed (e.g., sent) to those users. Alternatively, if the customized template is stored in a central location to which users link, when the user links to the customized template containing updates, the updates may be considered "pushed" to the user, even though the updates may ultimately reside in a remote location.

Pushing the update may include an automatic update to all user-facing applications that contain the customized template as soon as the update has been made. In some embodiments, pushing the updated customized template to the user-facing applications may occur within a predetermined time after storing the updated customized template in the repository. In other embodiments, pushing the update may include sending a notification to every user device associated with the customized template, informing the users that an update has been made and enabling selection via the user device of whether accept or reject the pushed update or reject the update. Such an acceptance or rejection may occur, for example, in response to an input by the user. If the user decides to reject the pushed update, the user device might not download the pushed update, or might manipulate a setting that prevents application of the update. Alternatively, if the user accepted the pushed update so that the user device integrated the updated customized template, the user may decide to revert to the previous version of the customized template prior to integrating the updated customized template. If the user device is not connected to the network or to the repository, the user device may receive the pushed update or the notification relating to the update as soon as the user device is connected to the network or to the repository. A record may be kept of all user devices that implement the pushed update into the integrated customized template.

In FIG. 1, the computing device 100 may push the data record of the updated customized template to user devices 220 that have integrated the previous version of the customized template. Under this push communication scheme, changes to the customized template may be disseminated to the user device 220 in real-time or near real-time as the original author or other authorized person stores the updated customized template. In alternative embodiments, the computing device may transmit the updated customized template to user device 220 upon a request from the user device 220 under a pull communication scheme as opposed to the push communication scheme.

In FIG. 2, the computing device 100 may keep a record of the user devices 220 that integrated the customized template by, for example, recording identifying information of the user devices 220 as each user device 220 integrates the customized template. The identifying information may include the IP address, MAC address, the user ID associated with the user device 220, or any other comparable information that can be used to identify a particular user account, a user device 220, or a board that previously integrated the customized template.

In some embodiments, individual user device 220 may choose to reject or postpone the updated customized template from updating the integrated customized template associated with the user device 220. More specifically, the user device 220 may be configured to accept a user input in response to the pushed update, where the user device 220 may reject the updated customized template in response to an input. Any rejected update may be pushed to the user device 220 at another time in the future, where the user device 220 may choose to reject or postpone the pushed update again.

Aspects of this disclosure may also include enabling, via the pushed update, a simultaneous change in tailoring of data within each of the user-facing applications in which the customized template was previously integrated. The changes may involve updating the previously integrated customized templates to adopt the updated customized templates. The changes may also involve altering the data values within the previously integrated customized template to match the structure and format of the updated customized template. The change in tailoring of the data may involve any alteration in which data is displayed, presented, or manipulated as a result of the update. The change may be simultaneous in that multiple users may receive the update at or about the same time. Of course, if some users are disconnected from a network, the update might not immediately take effect, although such users would still be said to be enabled to simultaneously change the tailoring of their data.

In some embodiments, the simultaneous change in tailoring of data may include a recalculation of data within each of the user-facing applications in which the customized template was previously integrated. Any change in the updated customized template may trigger the integrated customized templates to recalculate the data stored therein, thus ensuring that the data stored in the integrated customized templates are consistent with the rules specified by the updated customized template.

In further embodiments, the tailoring of data may result in a display of the updated customized template. For example, upon update, a new or modified presentation may appear on a user device, presenting data in a new or modified way. If the user had previously accessed the integrated customized template on a user device, the manipulation of data may prompt the user device to display the updated customized template so that the user may continue accessing the integrated customized template in the updated form. Additionally or alternatively, this display of the updated customized template may allow the user using the user device that received the updated customized template to review any changes that may be in order and accept or reject the changes as desired.

By way of example, in FIG. 2, the computing device 100 may achieve the simultaneous change across multiple user devices 220 using the push communication scheme, where the updated customized templates may be pushed to each user device 220 upon any changes to the customized template. More specifically, any changes to the customized template may be stored in the repository (located in the computing deice 100, network 210, or remote repository 230-1) automatically in real time or at a predetermined interval after the change is made, which may keep the integrated customized templates in sync with the customized template at all times in real-time or near real-time. For example in FIG. 3D, if the change to original customized template 340 includes providing additional data values for column 344, such as "Too fast" or "Over budget," the update could result in a simultaneous change in the updated customized template 3410 to tailor the data values as shown in column 3414 to include the data entries of "Too fast" and "Over budget." In another example, if the change to the original customized template 340 included removing column 345, the updated customized template would then also remove the column in any user device containing the original customized template 340 to result in the updated customized template 3410. In yet another example, any changes to the original customized template 340 may result in displaying the updated customized template 3410 on a user device 220 containing the customized template so that the user may see a preview of the updated customized template and how it may alter or tailor the user's data or current customized template. In this way, the user may decide whether to accept or reject the updated customized template based on the preview.

In some embodiments, the tailoring of data may also result in a display of an authentication input field to each of the user-facing applications. An authentication input field may include a field that enables a user to enter authentication credentials. The display of the authentication input field may be presented in response to a pushed update or may be presented when a user device attempts to access the updated customized template. Consistent with disclosed embodiments, at least one processor may be further configured to identify an authentication for the authentication input field, which may include enabling a user input of credentials into the authentication input field, thereby allowing the user to input authentication data before being able to accept or reject the pushed update. In some embodiments, the authentication data may include a combination of a user ID and a password, a personal identification number (PIN), a payment key, a hardware key, an RFID input, or any other information that can uniquely identify a particular user. The authentication data may be given to a user as a result of payment or any other verification process to give the user access to future updates to the customized template.

In some embodiments, the at least one processor may be configured to compare the identified authentication with predefined authentication inputs contained in the repository to determine whether the identified authentication corresponds to a predefined authentication input contained in the repository. For example, the predefined authentication inputs in the repository may be based on users who may be verified subscribers to the customized template. The verified subscribers may be based on account creation or payment in exchange of the authentication data so that the verified subscribers have access to all pushed updates while non-verified users may be excluded from all pushed updates.

For example in FIG. 2, the predefined authentication inputs may be stored in a repository in an encrypted state, where a user device 220 and/or the computing device 100 may be required to use hash functions to compare the user input with the predefined authentication inputs. The encryptions may involve, for example, using pseudo-random encryption keys of different lengths (e.g., 128-, 256-, 1024-, 2048-bit, or any longer bit length keys) and algorithms such as advanced encryption standard (AES), transport layer security (TLS), secure socket layer (SSL), or any other standard encryption algorithms. In an exemplary scenario, an owner of a customized template may store the customized template in a repository located on the owner's computing device 110 or in a remote repository 230-1. In order for other user devices 220 to access the customized template, they may receive authentication data from the owner, in order to access the customized template. The authentication data may be unique to the user device 220 that receives the authentication data so that other user devices cannot access the customized template.

Figure 4:
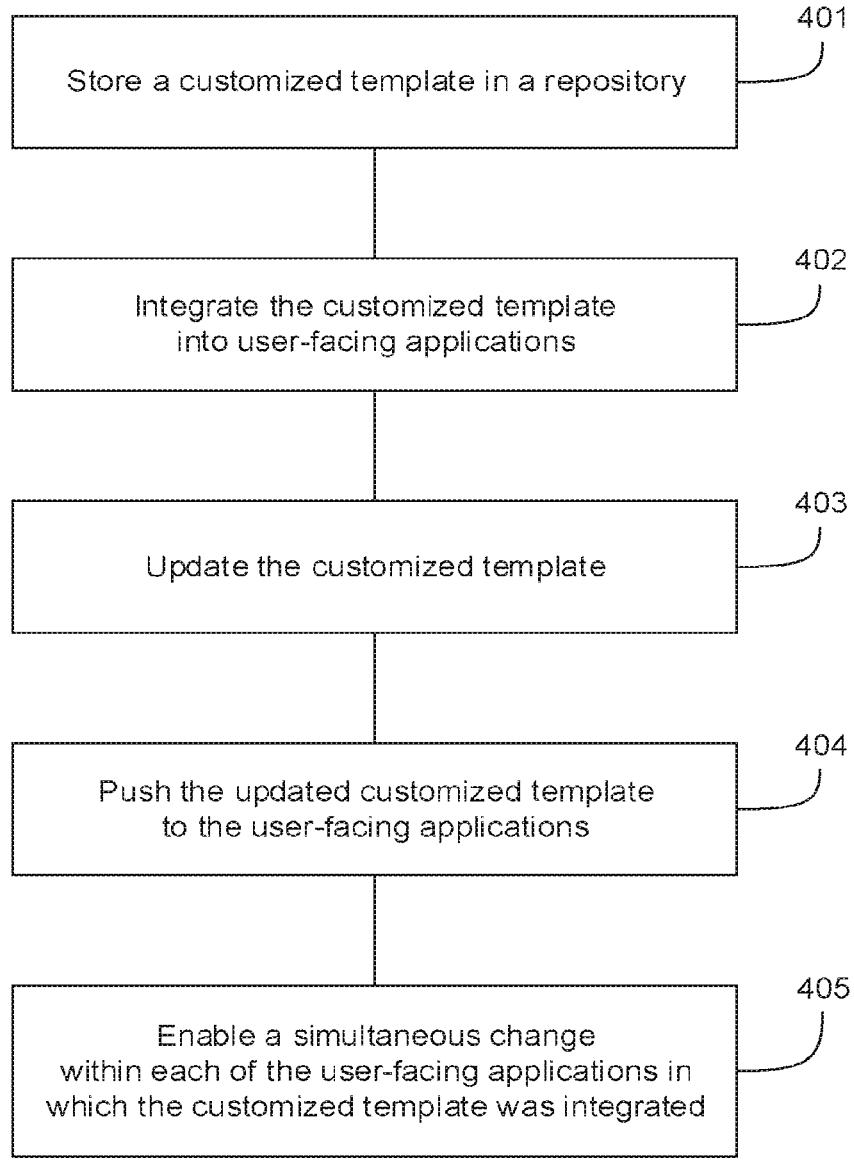
FIG. 4 is a block diagram of an exemplary process for automatically applying changed templates across user applications, consistent with some embodiments of the present disclosure.

FIG. 4 illustrates a flowchart of an exemplary computerized process 400 for automatically applying changed templates across user-facing applications that may be performed by the various disclosed embodiments. The computerized process 400 may be performed by the computing device 100 and/or any of the user devices 220, where the updates are pushed to the other user devices 220. In some embodiments, the computerized process 400 may include the following operations.

Block 401: Storing a customized template in a repository. In some embodiments, a first user (e.g. an author) may create and store a customized template using a computing device 100 or any of the user devices 220 (e.g., user device 220-1). The customized template may be stored in any of data repositories 230.

Block 402: Integrating the customized template into user-facing applications. Once the customized template is stored in data repository 230, a second user may access the data repository 230 using another one of the user devices 220 (e.g., user device 220-2), thereby allowing the computing device 100 to integrate the customized template into a user-facing application specific for that user.

Block 403: Updating the customized template. In some embodiments, the first user may use the computing device 100 or the user device 220-1 to update the customized template in a manner consistent with the disclosed embodiments.

Block 404: Pushing the updated customized template to the user-facing applications. The updates to the customized template made above at step 403 may then be pushed to the second user's user-facing application. In some embodiments, the updates may be pushed to the user device 220-2 or any other user device associated with the second user.

Block 405: Enabling a simultaneous change within each of the user-facing applications in which the customized template was integrated. Once the updated customized templates are pushed to individual user-facing applications, the respective user-facing applications may simultaneously be changed to adopt the update, so that the updates made to the customized template at step 403 are simultaneously applied to the integrated customized templates.

Aspects of this disclosure may provide a technical solution to the challenging technical problem of project management and may relate to a system for relationship recognition in tablature with the system having at least one processor in collaborative work systems, including methods, systems, devices, and computer-readable media. For ease of discussion, example methods are described below with the understanding that aspects of the example methods apply equally to systems, devices, and computer-readable media. For example, some aspects of such methods may be implemented by a computing device or software running thereon. The computing device can include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes can be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Tablature as used herein refers to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays. Altering tablature displays, as used herein, may refer to any procedure or process of changing a visual presentation form of a display of a table in a collaborative work system. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

By way of one example, the collaborative work system may utilize workflow management software that enables members of a team to cooperate via a common online platform (e.g., a website). Aspects of this disclosure may display a table with items on a screen of a computing device. A table may be presented, for example, via a display screen associated with a computing device such as a PC, laptop, tablet, projector, cell phone, or personal wearable device. A table may also be presented virtually through AR or VR glasses. Other mechanism of presenting may also be used to enable a user to visually comprehend presented information. Aspects of this disclosure may enable a user (e.g., an individual operating the computing device) to establish a relationship between two columns of the table based on their column headings, may associate a logical rule with the two columns, and may monitor entries in the two columns and alter a display in the table when the logical rule is triggered.

Consistent with disclosed embodiments, at least one processor may carry out operations that may involve identifying a first column heading selection for a first column in a table. A user may be an individual or a portion of the general population. A "table" as used herein includes those items described earlier in connection with the term "tablature," and may include a form, a sheet, a grid, a list, or any data presentation in horizontal and vertical dimensions (e.g., horizontal rows and vertical columns, horizontal rows and vertical rows, or horizontal columns and vertical columns). The table may be presented on a screen of a computing device (e.g., a personal computer, a tablet computer, a smartphone, or any electronic device having a screen).

Figure 5A:
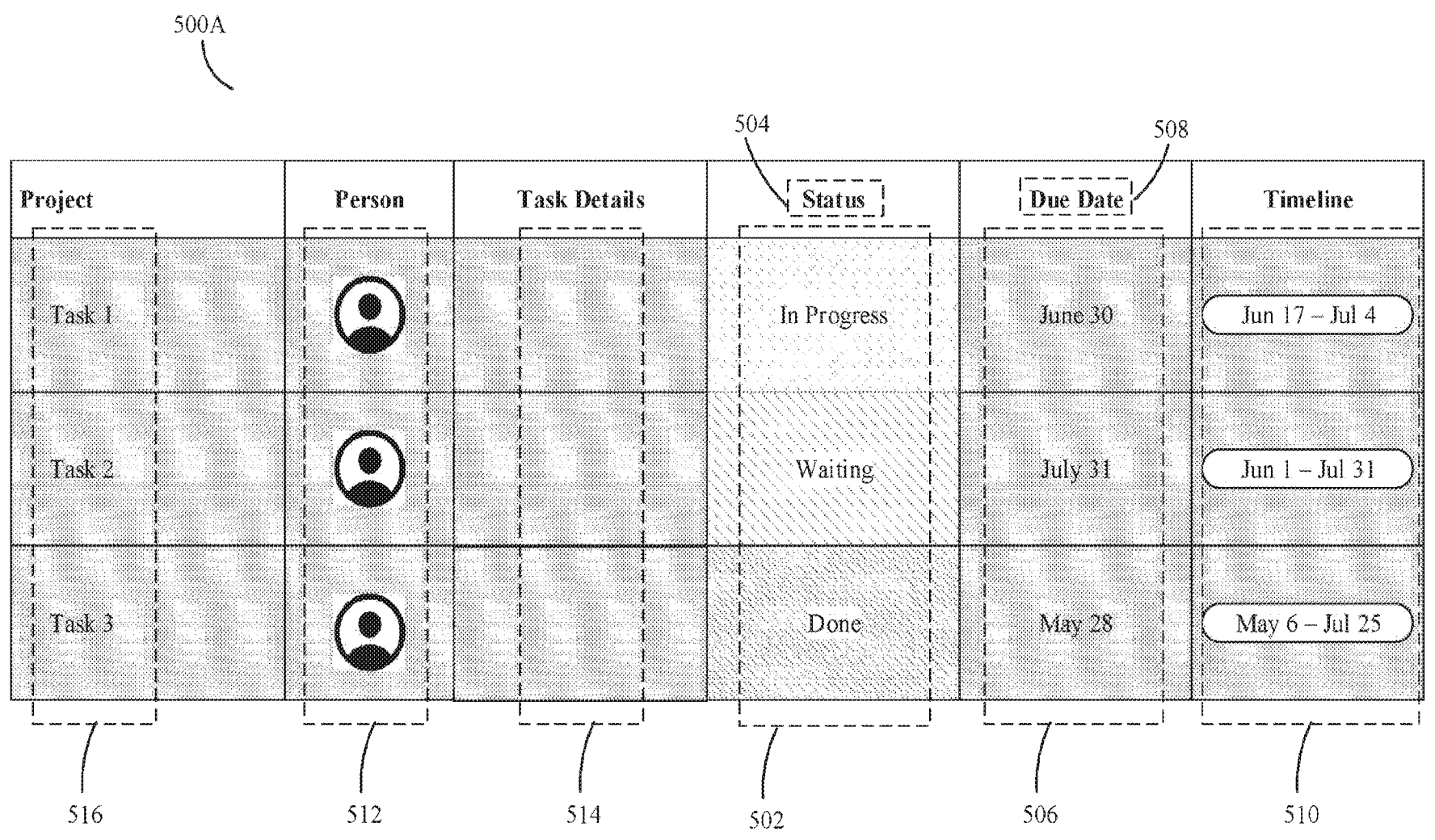

By way of example, FIG. 5A illustrates an example of a table 500A that includes multiple columns, consistent with embodiments of the present disclosure. In some embodiments, the table 500A may be displayed using a computing device (e.g., the computing device 100 illustrated in FIG. 1) or software running thereon. The table 500A may be associated with a project to display and may include, in the multiple columns, tasks included in the project, persons assigned to the tasks, details of the tasks, statuses of the tasks, due dates of the tasks, and timelines of the tasks. In FIG. 5A, the table 500A includes a first column 502 that has a first column heading 504 ("Status").

Any column of the table may display cells of a single datatype or of multiple datatypes. A single datatype column may be one where all cells are uniform in at least one aspect or characteristic. The characteristic may be numeric values only, characters only, alphanumeric values, graphic elements only, closed lists of elements, formatting, a specific value range, or any constraint on the format or type of column data. In some embodiments, the first column may be at least a portion of a single datatype (e.g., texts) column-oriented data structure. A single datatype column-oriented data structure may be a digital data structure of a table that includes columns where all cells of the columns may be programmed to include a single category of data.

For example, in FIG. 5A, a first column 502 may be a status column type of table 500A. Other columns with other characteristics in FIG. 5A include a due date column type (including a column 506), a timeline column type (including a column 510), a person column type (including a column 512), and text column types such as columns 514 and 516.

In some embodiments, a computing device that implements the operations may provide a user interface that includes an interactive element for identifying a first column heading selection. Identifying may occur in a computing device in response to a user selection of a column or column heading. Upon the user selection, the column heading may be identified as a column by the computing device. The user interface may be a web page, a mobile-application interface, a software interface, or any graphical interface that enables interactions between a human and a machine. The user interface may include, in some embodiments, a column store where a user may select from a plurality of different column types to add to a table. The interactive element included in the user interface may be, for example, a mouse cursor, a touchable area (as on a touchscreen), an application program interface (API) that receives a keyboard input, or any hardware or software component that can receive user inputs. Column headings may be associated with each of the columns or rows within a table. The column heading may be a default text or may be customized by a user. The user may select (e.g., using a mouse cursor) a first column heading on the user interface displayed on the user device to add to the user's table, and the user's selection may be transferred over the network back to the computing device. The column heading may be a default in the user interface such as in a column store, but in response to a user selection, the column type associated with the column heading may be added to the table where the user may then customize the default column heading. The column heading may also be selected in a table if the column has already been added to the table.

In some embodiments, the computing device (e.g., the computing device 100 in FIG. 2) may provide the user interface (e.g., a web page or a column store) to a user device (e.g., any of the user device 220-1, 220-2, or 220-m in FIG. 2) over a network (e.g., the network 210 in FIG. 2). The user may select the first column heading 504 on the user interface displayed on the user device, such as a column store, and add a column type associated with the first column heading into the table such as in table 500A in FIG. 5A, and the user's selection may be transferred over the network 210 back to the computing device 100 and may be displayed on the user device 220-1, 220-2, or 220-m as shown in FIG. 2.

Figure 5B:
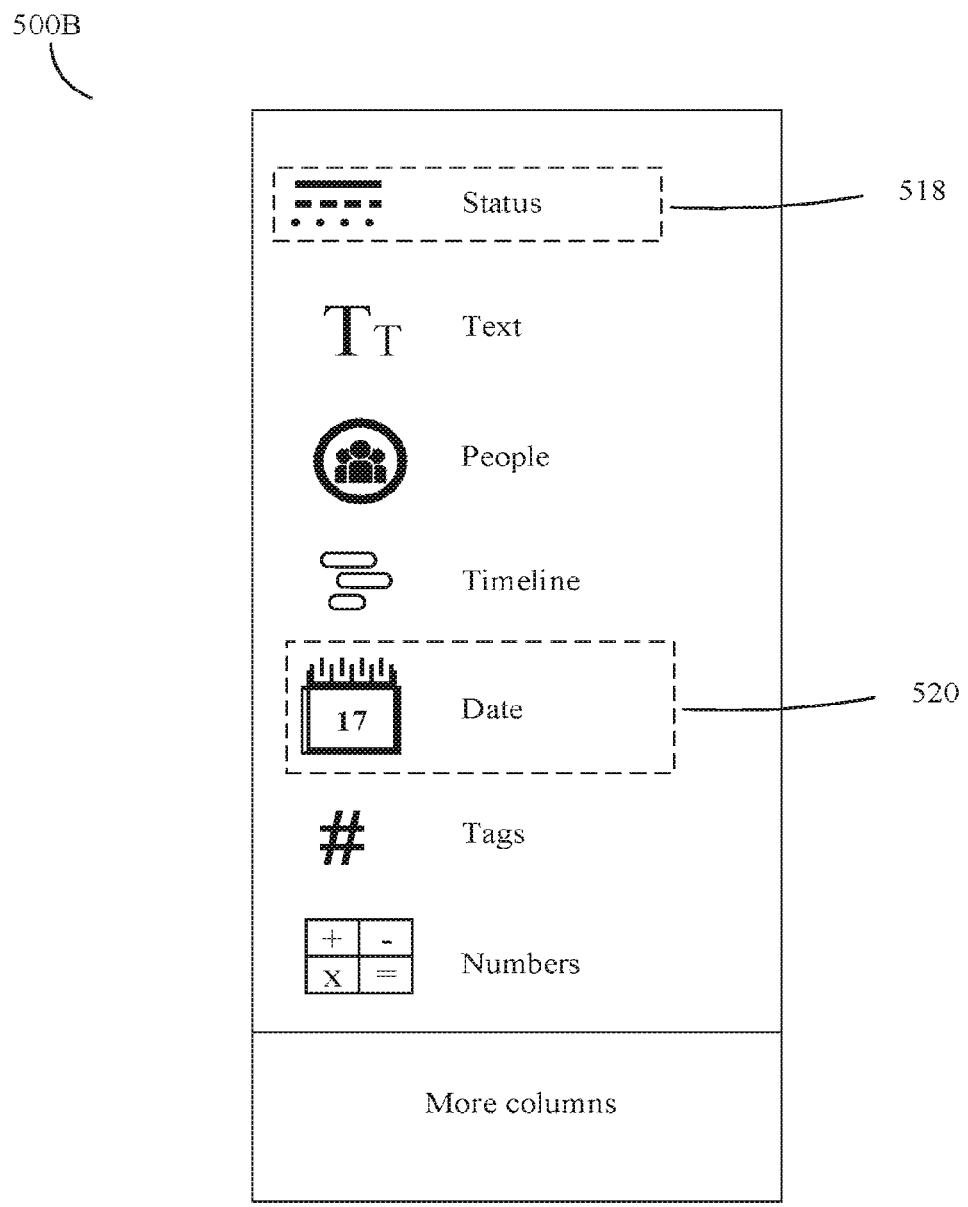
FIG. 5B illustrates an example of a user interface that enables selecting a column, consistent with some embodiments of the present disclosure.

In some embodiments, the user interface provided by the computing device may enable the user to select the first column heading automatically. By way of example, FIG. 5B illustrates an example of a user interface 500B that enables selecting a column, consistent with embodiments of the present disclosure. For example, the user interface 500B may be a menu (e.g., a context menu) that may be prompted in response to a user input (e.g., a click or a finger tap on a button associated with the table). The generation of the user interface 500B may be achieved by an application running on the computing device (e.g., the computing device 100 in FIGS. 1-2). The application may generate a user interface (e.g., the user interface 500B) for rendering on a display of a user device (e.g., the user device 220-1, 220-2, or 220-m in FIG. 2). The user device may interact with the user interface using one or more physical elements (e.g., a mouse, a touchscreen, a touchpad, a keyboard, or any input/output device) that are associated with the user device. In response to receiving inputs from the physical elements, the application may generate and render the user interface on the display of the user device.

By way of example, in FIG. 5B, the user interface 500B may include multiple selection items corresponding to different operations or functions for adding columns, including a command 518 ("Status") and a command 520 ("Date"). The user interface 500B may receive a user selection of the one or more of the selection items. For example, the user selection may be received by a click through one or more of the selection items. In some embodiments, if the user invokes the user interface 500B and selects the command 518, the computing device may insert a new column of a status datatype to the table and automatically select its column heading without user intervention. In some embodiments, if the user invokes the user interface 500B and selects the command 520, the computing device may insert a new column of a date datatype to the table and automatically select its column heading without user intervention.

Consistent with disclosed embodiments, the operations may also involve identifying a second column heading selection for a second column in the table. Identifying may occur in a computing device in response to a user selection of a column or column heading as described herein. Upon the user selection, the column heading may be identified as a column by the computing device. In some embodiments, the second column may include data of a datatype different from the datatype of data in the first column as described herein. For example, if the first column is a status datatype, then the second column that is selected may be a date datatype. The second column may also be added to the table by selecting a column type in a column store by selection a second column heading in the column store or user interface. The second column may then be added to the user's table which may have a second default column heading that may then be later customized by a user as described herein. If the second column has already been added to the table, the user may also select the second column heading directly in the table.

By way of example, in FIG. 5A, the table 500A includes a second column 506 that has a second column heading 508 ("Due Date"). In FIG. 5A, the first column 502 includes three rows, each row including one or more words indicative of a status of each task of the project. The second column 506 includes three rows, each row including a date indicative of a due date of each task of the project. In some embodiments, the computing device that implements the method may enable the user to select the second column heading in the table or through a user interface such as a column store in a manner similar to that of enabling the user to select the first column heading in the table as described above.

In some embodiments, the computing device may enable the user to select the second column heading for the second column (e.g., the second column 506) from the same table where the first column (e.g., the first column 502) is selected from. In response to the user selection, the computing device may identify the second column. In some embodiments, although not illustrated in FIG. 5A, the computing device may identify a second column heading by enabling the user to select the second column heading for the second column from a table different from the table where the first column is selected from. In a broadest sense, the computing device may enable the user to select the first column heading and the second column heading for the first column and the second column, respectively, from any table or tables to which the user has access.

In some embodiments, the first column and the second column may be presented next to each other, such as the first column 502 and the second column 506 in FIG. 5A. In some embodiments, the first column and the second column may be separate from each other. For example, the first column and the second column may be selected from different tables. In another example as shown in FIG. 10A, a first column could be Due Date 1 column 1010 and a second column could be Status column 1030. It should be noted that the first and second columns may be selected in various ways in the table if the columns have been added or through a user interface such as a column store to add new columns into a table, and this disclosure does not limit such implementations to the examples described herein.

In some embodiments, the computing device may provide a user interface to enable the user to select the second column heading automatically such that the computing device may identify a second column. With reference to FIG. 5B for example, the user interface 500B includes the command 518 and the command 520. In some embodiments, when the user invokes the user interface 500B and selects the command 518, the computing device may insert a first new column of a status datatype to the table and automatically select its column heading without user intervention. Then, when the user invokes the user interface 500B and selects the command 520, the computing device may insert a second new column of a date datatype to the table and automatically select its column heading without user intervention. By doing so, the computing device may enable the user to automatically select the first column heading and the second column heading.

Consistent with disclosed embodiments, the at least one processor may further be configured to define a column combination based on the identified first column heading selection and identified second column heading selection. Defining a column combination may include associating, in any way, two or more columns. Defining a combination may include, for example, causing to be stored in memory an association between two or more columns. The association may take the form of a link between columns and/or may include a code, designator, or indicator associating two or more columns with each other. A column combination may include a combination of any types of columns and any number of columns. By selecting a column heading or any part of that column heading's column, that particular column associated with the column heading may also be selected. By selecting column headings, the computing device may identify and select particular columns in order to define a column combination. For example, a computing device may identify a first column heading selection in response to a user selection of a first column heading such as "Status." The computing may identify a second column heading selection in response to a user selection of a second column heading such as "Date." By identifying both first and second column heading selections, the computing device may define a column combination of both the "Status" and "Date" columns.

Consistent with disclosed embodiments, the at least one processor may be configured to analyze a plurality of predefined column heading combinations contained in a memory to determine when the defined column combination corresponds to a predefined combination from among the plurality of predefined column heading combinations contained in the memory. "Analyzing," as used herein, may include processes or procedures of examining, determining, or checking differences or similarities between aspects of two objects (e.g., computer data objects). When the two objects are computer data objects, the aspects may include, for example, contents (e.g., numeric values, character values, or any data value), datatypes, formats, quantities, or any characteristic of the two objects. As an example, when the two objects are computer data objects (e.g., two sets of structured data), the analyzing may be implemented as processes or procedures of examining or checking bits (e.g., binary bits) of the two computer data objects to determining their differences or similarities of their contents or datatypes.

Analyzing may occur in response to a selection of two columns or may occur upon the entry of a column into a table.

The defined column combination may include an implementation of a specific combined group of data, such as a pair of textual strings stored in a computer memory or a combined group of columns as described herein. The defined column combination may be a result of a manual selection within a table or may be a combination of a newly added column to a table that may contain a preexisting column within the table to perform a lookup of different combinations that may be stored in a computer memory. The predefined column heading combinations may be predetermined combinations of column headings, such as predetermined pairs of textual strings that include combinations of various column headings stored in the computer memory. To determine when the defined column combination corresponds to one of the predefined column heading combinations, the computing device may determine that the defined column combination corresponds to the predefined column heading combination if the analysis indicates that the defined column combination is the same (e.g., having the same value or the same datatype) as the predefined column heading combination, and may determine that the defined column combination does not correspond to the predefined column heading combination if determined otherwise. In response to determining that a defined column combination corresponds to one of the predefined column heading combinations, the system may alter a display of a default column heading to provide additional meaningful data.

By way of example, in FIG. 5A, the defined column combination of the first column heading 504 and the second column heading 508 may be implemented as a pair of datatypes, in which the first column heading 504 may be associated with a datatype of status (e.g., "in progress," waiting," "done," or "delayed"), the second column heading 508 may be associated with a datatype of dates, and the pair may be represented as a defined column combination of "datatype of status and datatype of dates." If one of the predefined column heading combinations is also a combination of "datatype of status, and datatype of dates," then the computing device may determine that the defined column combination corresponds to the predefined column heading combination. In response to determining that the defined column combination of columns corresponds to one of the predefined column heading combinations, the system may alter the display of a default "Date" column heading for a date column with a different column heading such as "Due Date" in the second column heading 508 to indicate additional information that the data in the second column 506 are related to due dates.

Consistent with disclosed embodiments, the computing device may execute operations that may further involve associating a predefined logical combination rule with the first column and the second column in the table upon determination that the defined column combination corresponds to a predefined combination contained in the memory. "Associating," as used in this context, may refer to processes or procedures of establishing a relationship or connection between at least one thing and at least one other thing. The relationship or connection may be established by linking the two or more things, or by assigning a common code, address, or other designation to the two or more things. In this example, the two or more things may be a column combination on the one hand and a predefined logical rule on the other. The relationship or connection may be implemented as a data structure stored in a memory. For example, if the plurality of objects are data objects stored in the memory, associating them may be implemented as processes or procedures to link them or represent them using a data structure (e.g., members of a single class). In some embodiments, at least one of the plurality of data objects or columns may store an indicator (e.g., a flag, a pointer, or a shading) for representing that specific data object(s) are associated in some way.

The predefined logical combination rule may represent an operation predetermined to be performed whenever an associated combination of columns is identified. The logical combination rule may take the form of an If-Then statement (e.g., if the combination of column A occurs with column B in a common table or within related tables, then perform C.) In addition to or as an alternative to an If-Then the logical combination rule may employ connectives such as OR, XOR, NOT, or AND, or any logical expression. In some embodiments, the rule may be implemented as program codes or as logical combination statements containing no-code as described herein. By associating the predefined logical combination rule with a first column and a second column, the first column and second column become related according to the relationship defined by the predefined logical combination rule. For example, a predefined logical combination rule may be stored in memory for a defined column combination such as a status column and a date column. This predefined logical combination rule may include a relationship such as comparing value entries in a status column with value entries in a date column against a current date such that if the value entry in the status column is anything other than "Done" beyond a specific date, an overdue indication is presented. Upon recognition of a defined column combination of status and date columns in a table, this predefined logical combination rule may then be associated with these particular columns of the defined column combination in the table as is discussed below.

Logical combination rules may apply to any column type and may apply to an infinite number of combinations of columns of any column type, such as a Task column, a Person column, a Date column, a Contact column, a Time Tracking column, a Location column, a World Clock column, a File column, or any other column type associated with the table. The types and number of columns that may be subject to a predefined logical combination rule, and the action initiated as a result of that rule are limitless. The table below presents a few additional non-limiting examples of actions triggered by conditions in at least two columns (of course, actions can be triggered by conditions in more than two columns).

| First Column | Second Column | Predefined Logical Combination Rule |
| --- | --- | --- |
| Person | Hours | If Person's Hours exceed a threshold, notify a specific person |
| Hours | Hourly budget | If total Hours exceed the Hourly Budget change color of cell |
| Budget ($) | Amount invested | If Amount Invested exceeds Budget send SMS to controller |
| Unit Volume Sales | Monthly Forecast | If Unit Volume Sales is less than 50% of Monthly forecast by mid-month, send email containing specific text to sales team |
| Sales Amount | Person | If Sales Amount for any Person exceeds $500,000 in a month, add Person to President's Club Board |
| Person | Hours of Tasks Assigned | If Hours of Tasks Assigned for any Person exceeds 160 hours in a prospective four weeks, re-assign an associated task to |

-continued

| First Column | Second Column | Predefined Logical Combination Rule |
|---|---|---|
| Time Zone | Video Call | another<br>If a Notification is slated for transmission to a Time Zone where the current time is between 1 am and 5 am, disable Video Call |
| GPS Location | Assigned Destination | If a driver is at an Assigned Destination at an Assigned time, determine from driver's GPS Location an expected time of arrival, and notify a supervisor |
| Current Commodity Price | Target Commodity Price | If a Current Commodity Price derived from a third-party application falls below a Target Commodity Price, place an order with a vendor for 500 shares |

Using FIG. 5A as a nonlimiting example, when the computing device determines that the defined column combination of the first column heading 504 and the second column heading 508 correspond to a predefined combination of (datatype of status, datatype of dates) contained in a memory 120 as shown in FIG. 1, the computing device may associate a predefined logical combination rule with the defined column combination by storing the predefined logical combination rule with or between the particular columns of the defined column combination in the memory such that when data is altered in one column, the predefined logical combination rule may be executed to alter data or create new data in the other column. For example, the predefined logical combination rule may cause the computing device to perform an operation (e.g., altering the display in the table) when a task (e.g., task 1, task 2, or task 3) is overdue, determined based on a current date, the status of a task in the first column 502, and a due date in the second column 506.

In some embodiments, the predefined logical combination rule between the first column and second column is enabled to be altered. Enabling the rule to be altered may include for example, providing an interface that allows a user to change parameters of the rule. For example, a user may be enabled to alter a predefined logical combination rule by deleting and replacing the predefined logical combination rule, or changing an existing predefined logical combination rule to alter operations and/or to implicate other columns. The predefined logical combination rules may be displayed and may be altered in any location such as in a board, in a dashboard view, in a widget, or any other location described herein.

Figure 6A:
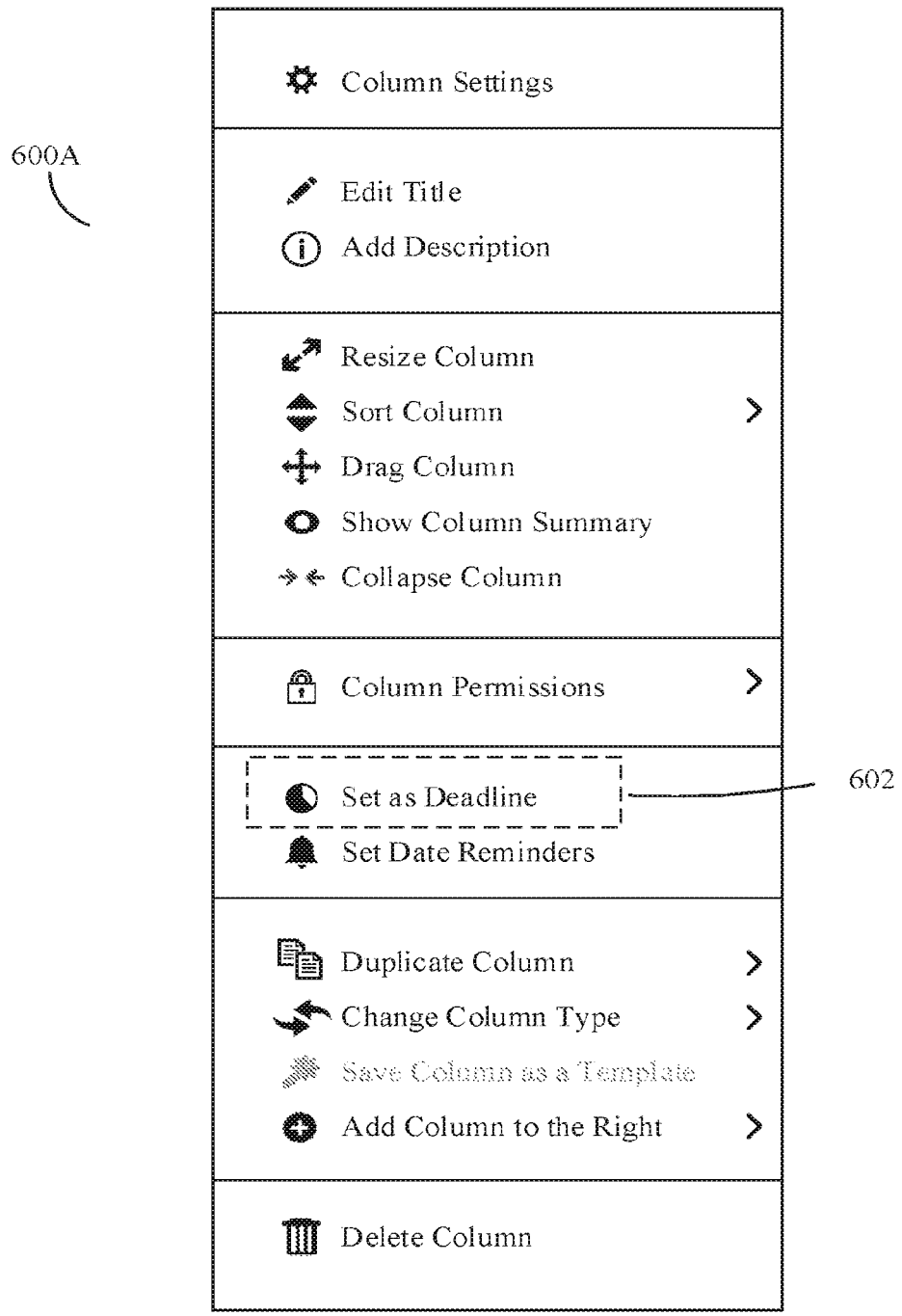
FIG. 6A illustrates an example of a user interface that enables altering a predefined logical combination rule, consistent with some embodiments of the present disclosure.

FIG. 6A illustrates an example of a user interface 600A that enables altering a predetermined logical combination rule, consistent with embodiments of the present disclosure. For example, the user interface 600A may be a menu (e.g., a context menu) that may be prompted in response to the selection of specific columns in a table or in response to adding new columns to a table. The generation of the user interface 600A may be achieved by an application running on the computing device (e.g., the computing device 100 in FIGS. 1-2). The application may generate a user interface (e.g., the user interface 600A) for rendering on a display of a user device (e.g., the user device 220-1, 220-2, or 220-m in FIG. 2). The user device may interact with the user interface using one or more physical elements (e.g., a mouse, a touchscreen, a touchpad, a keyboard, or any input/output device) that are associated with the user device. In response to receiving inputs from the physical elements, the application may generate and render the user interface on the display of the user device.

For example, the computing device may generate a web page which may be retrieved by the user device and rendered for display thereon. The web page may include the table (e.g., the table 500A in FIG. 5A). The user may interact with the table by, for example, scrolling through the table (e.g. displaying different rows of data), clicking on a cell of a column to update or input data therein, or any combination of any interaction. When the user interacts with the table, the user interface 600A may be invoked by a user operation. As an example, the user may be enabled to invoke the user interface 600A by selecting (e.g., using an on-screen cursor, or applying a finger tap on a touchscreen) a column heading (e.g., the first column heading 504 or the second column heading 508 in FIG. 5A) of the table 500A and click a mouse button (e.g., a "right click"). In response to the selection of a column heading, the computer system may then identify a column heading selection.

By way of example, in FIG. 6A, the user interface 600A may include multiple selection items corresponding to different operations or functions associated with the selected column, including a command 602 ("Set as Deadline"). The user interface 600A may receive a user selection of the one or more of the selection items for the computing system to identify column heading selections. For example, the user selection may be received by a click through one or more of the selection items. It should be noted that the user may select more than one selection items at a time. In some embodiments, if the user invokes the user interface 600A with respect to the first column heading 504 or the second column heading 508 in FIG. 5A and selects the command 602, the computing device may be enabled to alter the predefined logical combination rule between the first and second columns.

Figure 6B:
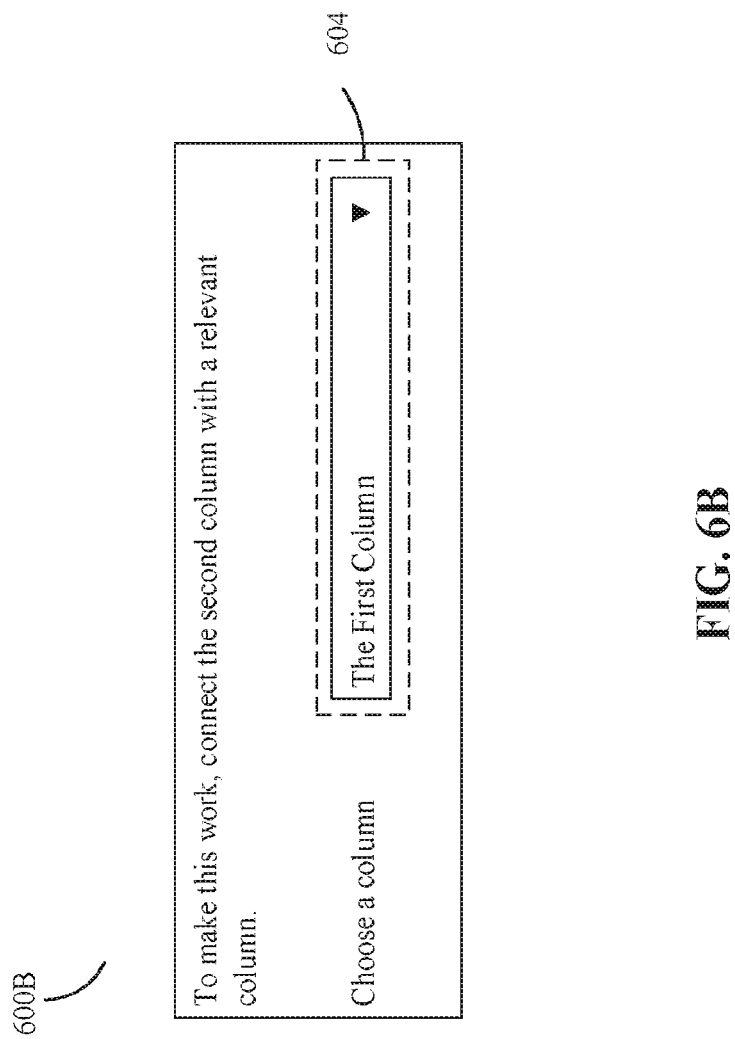
FIG. 6B illustrates an example of another user interface that enables altering a predefined logical combination rule, consistent with some embodiments of the present disclosure.

FIG. 6B illustrates an example of another user interface 600B that enables altering a predetermined logical combination rule, consistent with embodiments of the present disclosure. For example, the user interface 600B may be a pop-up window after the user selects the command 602 as illustrated in FIG. 6A. The user interface 600B includes an interactive item 604. By way of example, the interactive item 604 in FIG. 6B may be a drop-down menu. As an example, if the user invokes the user interface 600A in FIG. 6A with respect to the second column heading 508 and selects the command 602, the user interface 600B may prompt the user to select a relevant column, such as the first column 502 in FIG. 5A or any column that has been associated with (e.g., forming a defined column combination of) the second column 506. If the user selects the first column in the user interface 600A, for example, then the computing device may alter (e.g., creating or redefining a preexisting rule) the predefined logical combination rule between the first column and second columns.

Figure 6C:
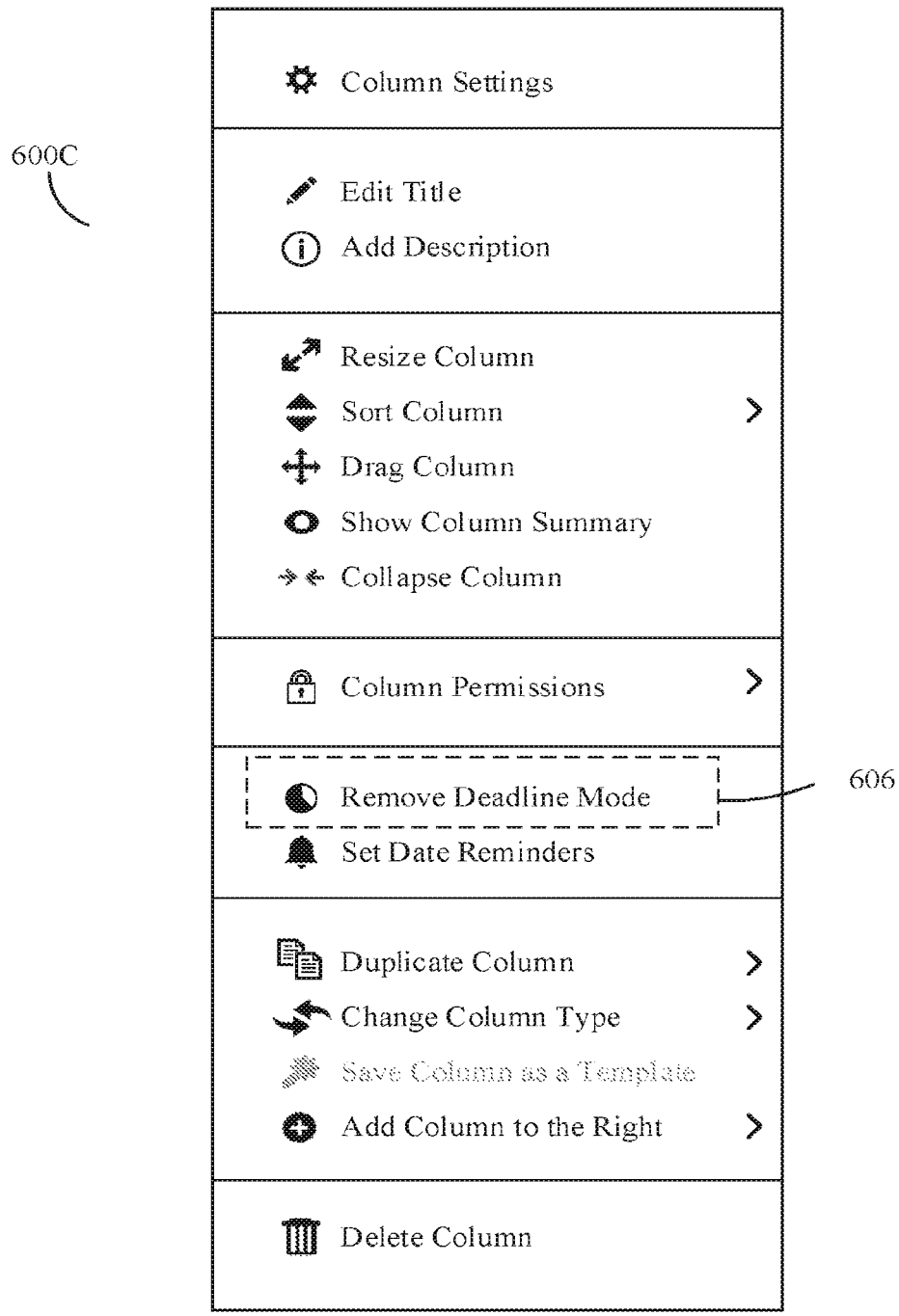
FIG. 6C illustrates an example of a user interface that enables cancelling a predefined logical combination rule, consistent with some embodiments of the present disclosure.

In some embodiments, after creation of the predefined logical combination rule, the predefined logical combination rule is enabled to be cancelled. Enabling cancellation may involve presenting to a user an interface where cancelling may occur. "Cancelling," as used herein, may refer to processes or procedures of removing, deleting, destroying, erasing, nullifying, negating, or any manner of neutralizing effectiveness of a rule or a command. FIG. 6C illustrates an example of a user interface 600C that enables to cancel a predetermined logical combination rule, consistent with embodiments of the present disclosure. For example, the user interface 600C may be a menu (e.g., a context menu). In some embodiments, if the table 500A is displayed on a web page, similar to the user interface 600A, the user may be enabled to invoke the user interface 600C by selecting a column heading of the table 500A and click a mouse button.

By way of example, similar to the user interface 600A in FIG. 6A, the user interface 600C includes multiple selection items, including a command 606 ("Remove Deadline Mode"). In some embodiments, if the user invokes the user interface 600C with respect to the second column heading 508 that is associated with the first column heading 504 in FIG. 5A and selects the command 606, the computing device may enable the user to cancel the predefined logical combination rule, such as deleting the predefined logical combination rule between the first column and second columns.

Consistent with disclosed embodiments, at least one processor may be configured to monitor entries in the first column and the second column for a triggering event when the predefined logical combination rule is triggered. Monitoring, as used herein, may refer to processes or procedures of inspecting, checking, or keeping track of statuses or changes of an object. For example, if the object is a computer data object stored in the memory, monitoring the computer data object may be implemented as inspecting it (e.g., continuously or periodically) to determine whether there is any change in the memory space where it is stored. The entries in the first column and the second column may be contents of the cells thereof. Monitoring may further include monitoring the entries in the first column and the second column as they have been related by a predefined logical combination rule to determine whether the predefined logical combination rule has been triggered. The triggering event may include a situation where the conditions of the predefined logical combination rule have been satisfied. The "triggering," as used herein, may refer to invoking a rule to be implemented when the condition of the rule is satisfied and may be defined as a triggering event.

By way of example, in FIG. 5A, the entries of the first column 502 includes statuses "in progress," "waiting," and "done," and the entries of the second column 506 includes dates "June 30," "July 31," and "May 28."

As an example, when the predefined logical combination rule states that the computing device will perform an operation when an item or task (e.g., task 1, task 2, or task 3) is overdue determined based on a current date, a due date, and a status of the task, the computing device may monitor the statuses in the first column 502 and the dates in the second column 506. If a current date passes a due date and the corresponding status is not "done," the computing device may determine that the predefined logical combination rule is triggered. In such a manner, the computing device may have monitored the first column and the second column for a triggering event as a result of the predefined logical combination rule being invoked.

Consistent with disclosed embodiments, at least one processor may be further configured to alter a display in the table using the predefined logical combination rule based on the triggering event. Altering as used herein, may refer to processes or procedures of modifying, adding, removing, or any way of changing an object. The "display" in the table may include a visual representation in the table as described herein. In some embodiments, the display of the table may be altered by one or more of adding or changing data in the table, changing a visual effect of a visual object in the table, adding a visual object or indication to the table. The visual effect may include a change in a color, a font, a typeface, a strikethrough, a shape, a size, a column-row arrangement, or any characteristic in visual presentation. The visual object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

In some embodiments, the predefined logical combination rule may be configured to trigger a display change in the table in response to two differing value entries in two differing columns. A display change may include the addition, subtraction, or modification of data of the cells in the column or the column heading. Value entries may include the data or value entry contained in each of the cells associated with a column or row. Columns with different characterizations such as a status column and a date column may contain differing values associated with a specific item or column. The predefined logical combination rule may be triggered when specific values in each column meet a threshold, such as when an item's status is "In Progress" and the current date is after the specific date in the "Due Date" because this is a threshold that indicates that the item is overdue. As a result, a predefined logical combination rule that is triggered may alter a display of data in the table to indicate that the specific item is overdue by adding an overdue indication through text, graphics, or shading within one of the existing columns or by adding a new column of data to indicate the overdue indicator as described herein.

For example, in FIG. 5A, the two differing columns may be the first column 502 that include statuses and the second column 506 that include due dates. The two differing value entries may be a value entry (e.g., representing a status) in the first column 502 and a value entry (e.g., representing a date) in the second column 506. Based on the first column 502 and the second column 506, the computing device may determine whether an item or task (e.g., task 1, task 2, or task 3) is overdue on a current date. For example, if the current date is past a due date but a status of the task is not "done," the computing device may determine that the task is overdue. In some embodiments, the predefined logical combination rule may trigger a display change in the table when the task is overdue.

In some embodiments, the computing device may alter the display in the table by establishing a third column for storing data associated with a trigger of the predefined logical combination rule. Establishing a third column may include creating a new, independent column within a table, or may include presenting new information within the first or second columns in a table.

Figures 7A, 7B, 7C:
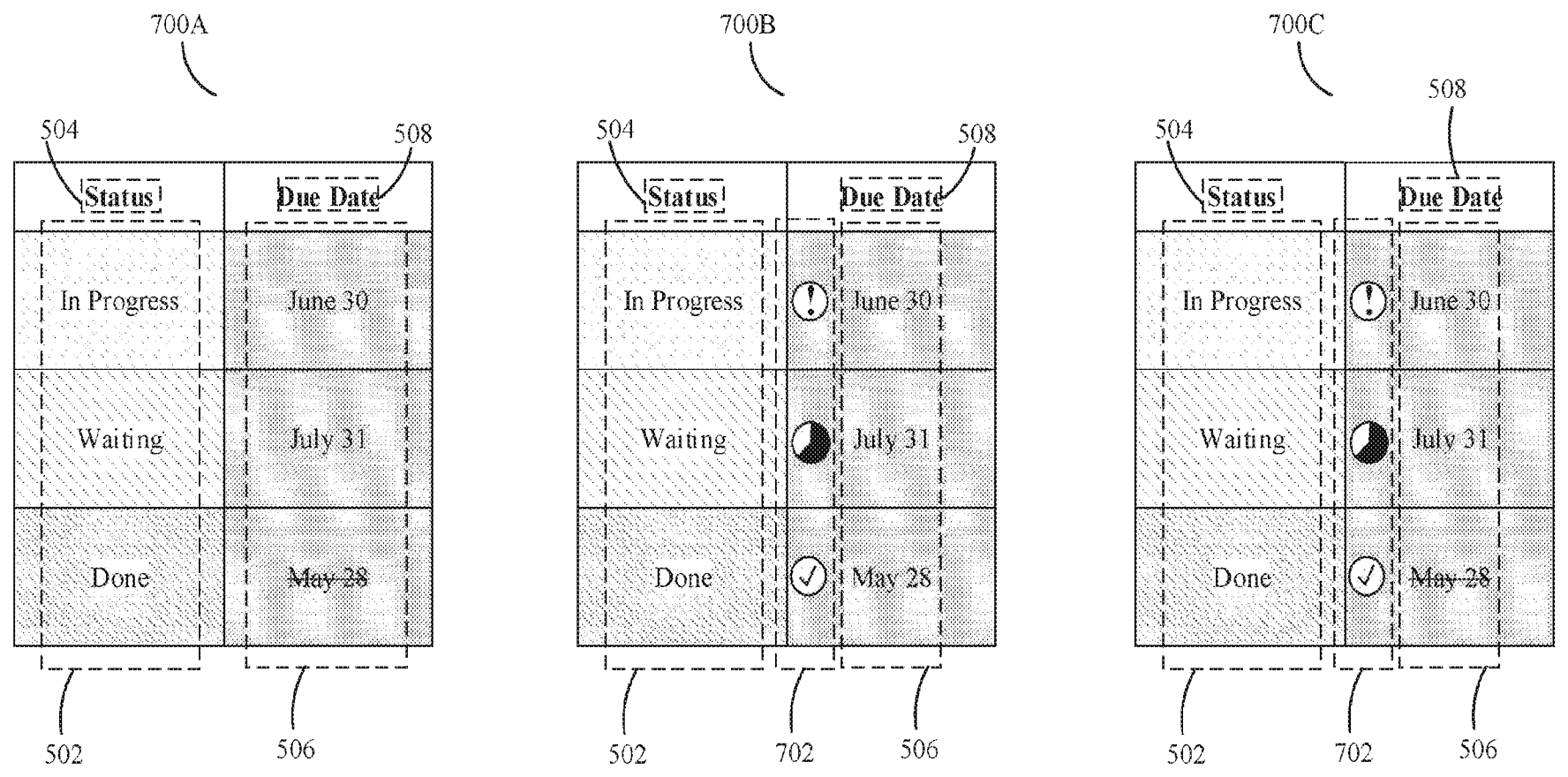

By way of example, as shown in FIGS. 7B and 7C, the computer device may establish a third column 702 for storing data (e.g., the symbols included in the third column 702) associated with a trigger of the predefined logical combination rule. For example, the trigger may be that "a task is overdue" and present an exclamation mark as a graphical indicator of a task being overdue. In other logical combination rules, the trigger may result in an indicator that graphically presents the remaining time for a task, an indicator that a task is done, or any other graphical, alphanumeric, or combination of graphical and alphanumeric indication regarding the item or task. In some embodiments, the third column may be established as an independent column (e.g., added as a new column of the table). In some embodiments, the third column may be established as a part of another column, such as the third column 702 being a part of the second column 506 in FIGS. 7B and 7C.

In some embodiments, the computing device may alter the display in the table by altering a display of the second column. Altering the display of the second column may include altering the presentation of data in the cells of the second column or may include altering the display of the column heading. In some embodiments, the computing device may alter the display of the second column by changing a visual effect of a visual object in the table as described herein. Altering a display may include any change of display described herein.

By way of example, FIG. 7A illustrates an example of a table 700A with an altered display, consistent with embodiments of the present disclosure. The table 700A may be a part of the table 500A in FIG. 5A. As an example, in FIG. 7A, the current date may be July 20, and the table 700A indicate that task 1 has a due date on June 30 with a status "in progress" (i.e., task 1 is overdue), task 2 has a due date on July 31 with a status "waiting" (i.e., task 2 is not overdue), and task 3 has a due date on May 28 with a status "done." As shown in FIG. 7A, the computing device may alter the display in the table by altering the display of the second column 506, such as by changing a visual effect (e.g., adding a strikethrough line) of a visual object (e.g., the texts "May 28") to indicate that task 3 is completed in time.

In some embodiments, the computing device may alter the display of the second column by adding a visual object to the second column. By way of example, FIG. 7B illustrates an example of a table 700B with an altered display, consistent with embodiments of the present disclosure. The table 700B may be similar the table 700A in FIG. 7A. Compared with the table 700A, in FIG. 7B, the computing device may alter the display of the second column 506 by adding visual objects (e.g., a check-mark symbol near the text "May 28," a clock-like symbol near the text "July 31," and an exclamation-mark symbol near the text "June 30," respectively) to indicate that task 3 is completed in time, that task 2 is neither completed nor overdue, and that task 1 is overdue, respectively.

In some embodiments, the computing device may alter the display of the second column by changing a visual effect of a visual object in the table and adding a visual object to the table. By way of example, FIG. 7C illustrates an example of a table 700C with an altered display, consistent with embodiments of the present disclosure. The table 700C may be similar the table 700A in FIG. 7A and the table 700B in FIG. 7B. In FIG. 7C, the computing device may alter the display of the second column 506 by applying both the display changes in the tables 700A and 700B, in which a strikethrough line is added to the text "May 28," and symbols are added as the third column 702 to the table.

In some embodiments, the computing device may alter the display in the table by altering a display of the first column and a display of the second column. The altering of a display of a first column may include altering of the presentation of data in the cells of the column or a presentation of the display of the column heading as described herein in other exemplary embodiments. Altering may further include altering the display of a second column in a similar manner.

For example, the first column and the second column may be the first column 502 and the second column 506 in FIG. 5A, respectively. In such cases, the computing device may alter the display of the first column by changing a background color of a cell in the first column, changing a text in the cell of the first column to be bold, adding a symbol or a mark to the cell of the first column, or any combined operation of changing a visual effect of a visual object in the first column or adding a visual object to the first column. The computing device may alter the display of the second column (e.g., in the manners as described in FIGS. 7A to 7C). As another example, the first column and the second column may be the third column 702 and the second column 506 in FIGS. 7B and 7C, respectively. In such cases, the computing device may alter the display of the first and second columns in a manner as described in FIGS. 7B to 7C.

In some embodiments, the computing device may alter the display in the table by displaying an aggregation of entries in the first column and the second column where the predefined logical combination rule is triggered. Displaying an aggregation of entries may include displaying summary information that is representative of data contained within each of the columns such that specific data may be represented as a proportion of all of the data contained within each column. Such displaying of an aggregation of entries may be presented in any graphical manner such as a bar or with any alphanumeric text such that it presents a summary indication of the data contained in each column. The summary information may also be presented as a combination of both graphical and alphanumeric indications.

Figure 8:
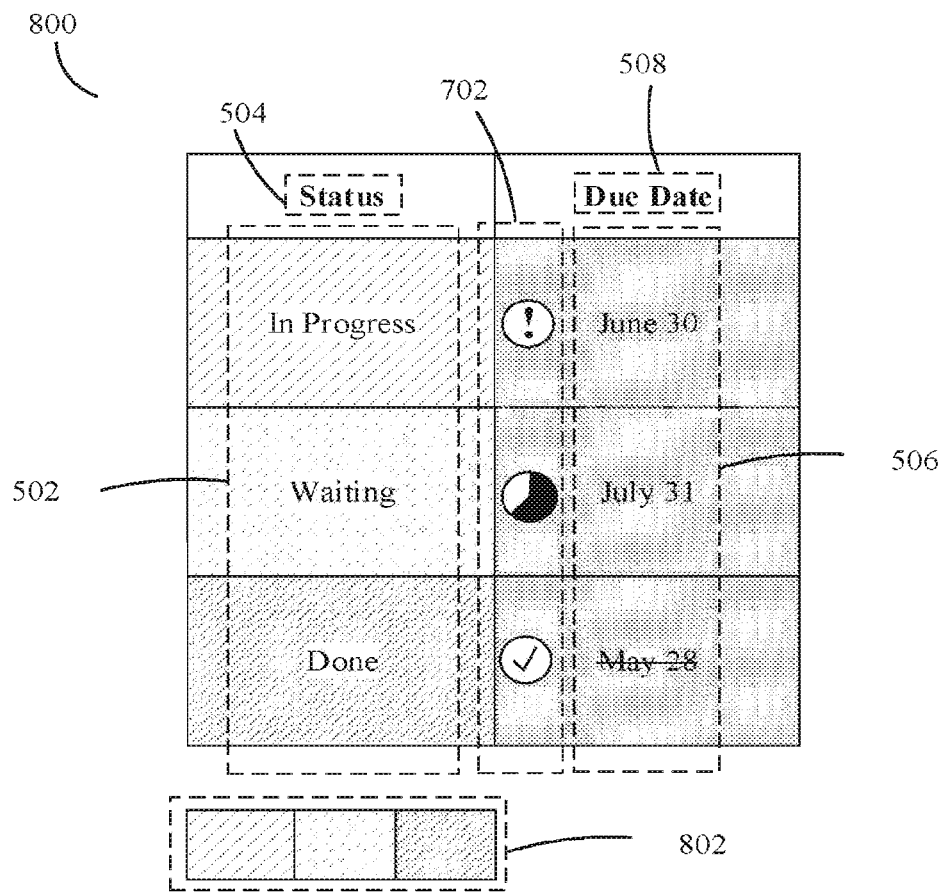
FIG. 8 illustrates an example of a table with an aggregation of entries, consistent with some embodiments of the present disclosure.

By way of example, FIG. 8 illustrates an example of a table 800 with an aggregation of entries, consistent with embodiments of the present disclosure. The table 800 may be similar to the table 700C in FIG. 7C. The table 800 includes the first column 502 and the second column 506 where the predefined logical combination rule is triggered. For example, the predefined logical combination rule may trigger a display change (e.g., adding a strikethrough line to the text "May 28" and the third column 702) in the table when a task is overdue.

The aggregation of entries may be any summary indicator of the data contained in the columns through a graphical indication such as a bar, a circle, a pie chart, or any alphanumeric indication such as fractions or any visible collection indicative or combination of both graphical and alphanumeric indications of the entries. By way of example, in FIG. 8, the aggregation may be an aggregation 802 that is a bar chart. The aggregation 802 may correspond to the first column 502 for displaying a summary graphical information of the statuses of all tasks labeled (e.g., indicated by a text) in the first column 502. In FIG. 8, the aggregation 802 is displayed under the first column 502.

By way of example, in FIG. 8, the aggregation 802 is divided into portions. The number of the divided portions of the aggregation 802 may correspond to the number of the tasks, such as three as illustrated in FIG. 8. The portions of the aggregation 802 may display patterns or colors corresponding to or the same as the patterns or colors of the cells in the first column 502, respectively. For example, in FIG. 8, the cell associated with task 1 with the status "in progress," the cell associated with task 2 with the status "waiting," and the cell associated with task 3 with the status "done" in the first column 502 may have a first shaded patter, a second shaded pattern, and a dotted pattern in the background, respectively. Correspondingly, the aggregation 802 may have three portions having the first shaded patter, the second shaded pattern, and the dotted pattern, respectively. In such a way, the aggregation 802 may perceivably display the number of different statuses of the tasks in the project.

In some embodiments, the length of the divided portions of the aggregation 802 may be proportional to the number of their corresponding statuses in the first column 502 as a proportion to the total number of status entries within the column. As an example, in FIG. 8, the first column 502 displays three status types, each status type including one status. Accordingly, the number of statuses in each status type takes up one third of the total number of statuses in FIG. 8. Correspondingly, the aggregation 802 may display one third of length of the first shaded pattern, one third of length of the second shaded pattern, and one third of length of the dotted pattern to represent such a relationship of the status types.

In some embodiments, the computing device may alter the display of the first column and the display of the second column by presenting an indication that the first column and the second column are linked. Presenting an indication may include any graphical or alphanumeric indication as described herein. For example, graphical indicators may include icons, symbols, colors, shadings, or any other non-alphanumeric indications. Alphanumeric indications may include indicators such text, numbers, fractions, or any other non-graphical indicators. Presenting an indication may also include a combination of both graphical and alphanumeric indicators.

Figure 9A:
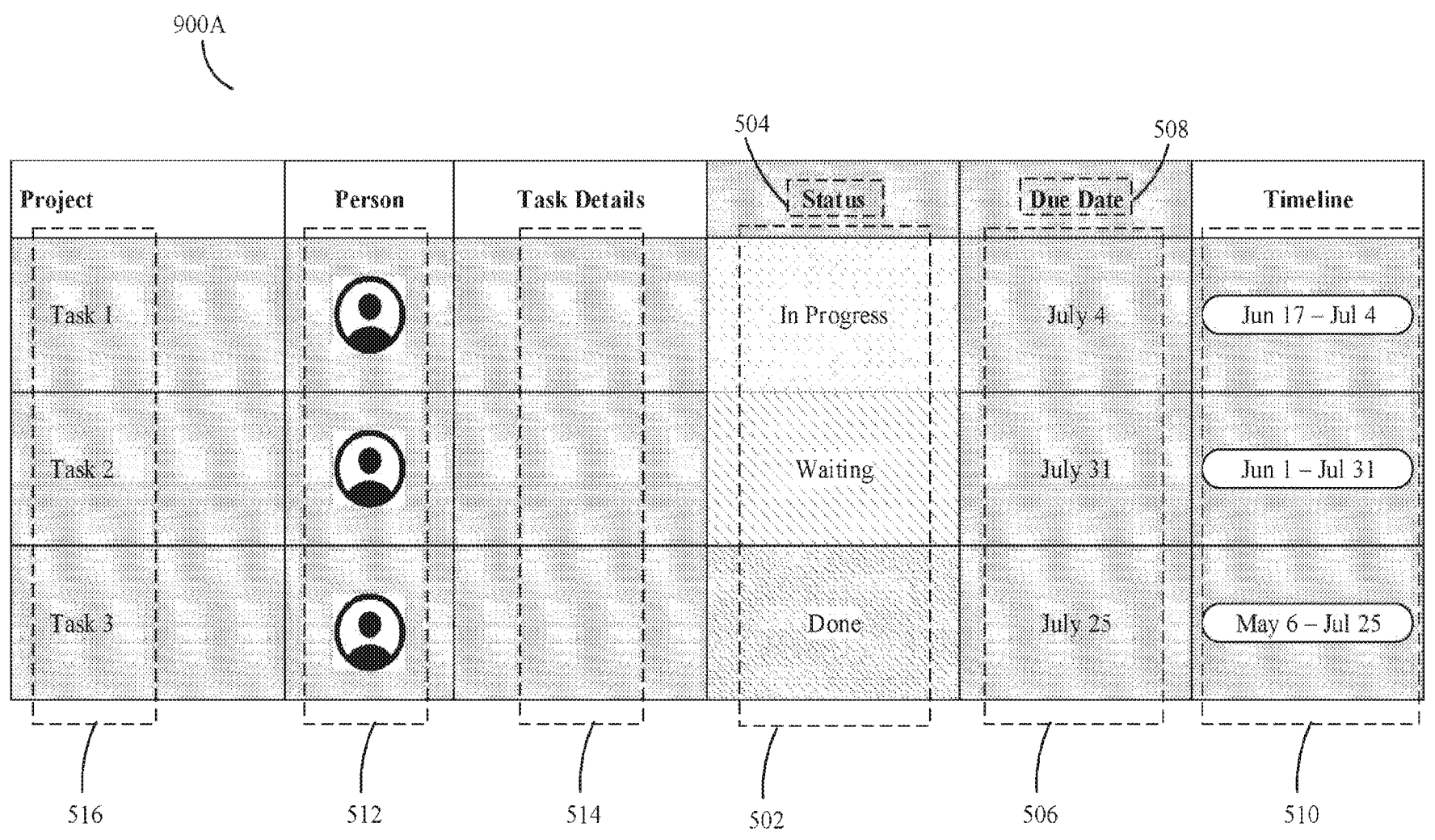

By way of example, FIG. 9A illustrates an example of a table 900A that presents two linked columns through a graphical indicator such as color or shading, consistent with embodiments of the present disclosure. The table 900A may be similar to the table 500A in FIG. 5. In FIG. 9A, the computing device may present the indication that the first column 502 and the second column 506 are linked by changing a background color (e.g., from white to gray) of the first column heading 504 and the second column heading 508.

In some embodiments, the indication is graphical such as an icon. By way of example, FIG. 9B illustrates another example of a table 900B that presents two linked columns, consistent with embodiments of the present disclosure. The table 900B may also be similar to the table 500A in FIG. 5. In FIG. 9B, the computing device may present the indication that the first column 502 and the second column 506 are linked by adding to display a first icon 902 near the first column heading 504 and a second icon 904 near the second column heading 508.

In some embodiments, the computing device may present the indication that the first column 502 and the second column 506 are linked by presenting a plurality or combination of indications, including the indications as described in FIGS. 9A and 9B. It should be noted that the display of the first column and the display of the second column may be altered by various manners of presenting indications, and this disclosure does not limit such manners to the example embodiments described herein.

In some embodiments, after presenting an indication that the first column and the second column are linked, the computing device may automatically determine whether to maintain the indication after one of the column types or column headings has been updated. The processor may be configured to further execute operations that include enabling replacement of the identified first column heading for the first column with an updated column heading for the first column. By replacing the column heading or column type, the system may then analyze the updated column heading or updated column type with the predefined column heading combinations as previously executed and described herein. Replacement of a column heading may include substituting, modifying, adding, or subtracting from the preexisting column heading. Presenting may include displaying in any manner as described herein. Indications may include any indicator such as graphical, alphanumeric, or a combination thereof as described herein.

In some embodiments, the computing device may replace with an updated heading (not shown) the first column heading (e.g., the first column heading 504 in FIGS. 9A to 9B) for the first column (e.g., the first column 502 in FIGS. 9A to 9B). For example, the updated column heading may provide for different content (e.g., different texts or values) or a different datatype, column type, or format compared to the first column heading. In some embodiments, the computing device may provide a user interface (not shown), such as a menu, to enable the user to replace the first column heading with a selection from a plurality of different column headings or column types. For example, if the table is displayed on a web page, the user may click on the first column heading to invoke the user interface for replacing it.

After enabling replacement the first column heading, the computing device may analyze a plurality of predefined column heading combinations contained in the memory to determine when the updated defined column combination corresponds to a predefined column heading combination from among the plurality of predefined column heading combinations contained in the memory. In some embodiments, the analyzing of the updated defined column combination with the predefined column heading combinations may be implemented in a way similar to analyzing the defined combination of the first column heading and the second column heading with the predefined column heading combinations contained in the memory to determine when the defined column combination corresponds to a predefined combination contained in the memory, as described herein, the details of which will not be repeated hereinafter.

After analyzing the updated combination with the predefined column heading combinations, the computing device may disassociate the predefined logical combination rule with the first column and the second column in the table upon determination that the updated defined combination does not correspond to any predefined combination contained in the memory. "Dissociating," as used herein, may refer to processes or procedures of decoupling, separating, or breaking up associated objects. For example, if the predefined logical combination rule is dissociated with the first column and the second column, the computing device will no longer apply the predefined logical combination rule to either of the first column and the second column.

After dissociating the predefined logical combination rule with the first column and the second column, the computing device may further alter the display in the table including unlinking the first column and the second column. In some embodiments, the computer device may further alter the display in the table to unlink the first column and the second column by removing the indication that the first column and the second column are linked.

Using FIG. 9A as an example, the computing device may remove the indication by changing the color (e.g., from gray to white) of the first column heading 504 and the second column heading 508. Using FIG. 9B as an example, the computing device may remove the indication by removing from display the first icon 902 and the second icon 904.

In some embodiments, the computing device may send a notification when the predefined logical combination rule is triggered. The notification may include an email, a text message, a phone call, an application push notification, a prompt, or any combination of any form of notifications. The notification may be sent, for example, to an email address, a phone number, a mobile application interface, within the application, or any combination of any device or user interface to which the user has access. By doing so, in some exemplary embodiments, the user may be notified of the statuses of the tasks of a project in real time.

For example, the predefined logical combination rule may state that, when a task (e.g., task 3 as illustrated in FIG. 5) is overdue, not only a display a change (e.g., adding a strikethrough line to the text "May 28" and the third column

702, as shown in FIG. 7C) but also send a notification to a particular person or persons. Consistent with embodiments of the present disclosure, a computing device (e.g., the computing device 100) may alter the display of a table in accordance with one or mom established rules. In some embodiments, such rules may be configured automatically. In some embodiments, such rules may be configurable by a user in manners described herein.

By way of example, FIG. 10A illustrates an example of a table 1000A with associated data columns, consistent with embodiments of the present disclosure. The table 1000A includes seven rows (including a row of column headings) and three columns 1010 (representing a first due date of tasks of a project), 1020 (representing a second due date of the tasks), and 1030 (representing a status of the tasks), which include cells. In FIG. 10A, all cells of each column (except the cells in the column headings) may include data of a single datatype. In some embodiment, some of the columns may be of the same datatype. For example, in FIG. 10A, all cells of the column 1010 are of a first datatype (e.g., dates), all cells of the column 1020 are of a second datatype (e.g., dates), and all cells of the Status column 1030 are of a third datatype (e.g., texts). In FIG. 10A, the columns 1010, 1020, and 1030 are associated with one or more predefined logical combination rules, as indicated by the chain-like symbols in their cells of column headings.

Consistent with embodiments of the present disclosure, the computing device may enable the user to configure the one or more predefined logical combination rules or templates associated with the columns 1010, 1020, and 1030. By way of example, FIG. 10B illustrates an example user interface 1000B for configuring predefined logical combination rules, consistent with embodiments of the present disclosure. For example, the user interface 1000B may be a pop-up window. In some embodiments, the user interface 1000B may be invoked by a user selection of another user interface (e.g., a menu) associated with a table (e.g., the table 1000A).

The user interface 1000B includes multiple logical combination rules, including rules 1, 2, and 3. With reference to a row 1040 of FIG. 10A, as an example, rule 1 states that when a status of a task (e.g., the task associated with the row 1040) is not "done" and its Due Date 1 (e.g., June 24) is already crossed, the computing device may automatically add a first symbol (e.g., a circled exclamation symbol) to a cell (e.g., the cell 1050) that contains its Due Date 1 for indicating that the task is overdue. As another example, a default rule (not shown in FIG. 10B) may state that when the status of the task (e.g., the task associated with the row 1040) is "in progress" and its Due Date 2 (e.g., June 28) is not yet crossed, the computing device may automatically add a second symbol (e.g., a clock-like symbol) to a cell (e.g., the cell 1060) that contains its Due Date 2 for indicating that the task is in progress.

In some embodiments, with reference to FIG. 10B, the user interface 1000B may enable the user to configure the predefined logical combination rules by selecting one or more of the rules 1, 2, and 3. The selected rule may be automatically applied by the computing device to alter the display of the table 1000A based the conditions stated in the selected rules.

In some embodiments, the user interface 1000B may enable the user to configure parameters of the rules. By way of example, the parameters of the rules 1, 2, and 3 may include the column headings (e.g., "Due Date 1," "Due Date 2," and "Status") that provide inputs and implement outputs of the rules. The parameters of the rules 1, 2, and 3 may also include logical operands (e.g., AND, OR, NOT, or any logical operand) that associate the inputs of the rules. The parameters of the rules 1, 2, and 3 may further include operations the computing device will perform, such as adding symbols to a designated location of the table. The user interface 1000B may enable the user to change, add, or remove any of the parameters to configure the rules. In some embodiments, the user interface 1000B may further enable the user to add an entirely new rule or delete an existing rule. It should be noted that various implementations may be used to enable the user to configure the predefined logical combination rules, and this disclosure does not limit those implementations to the examples described herein.

Figure 11:
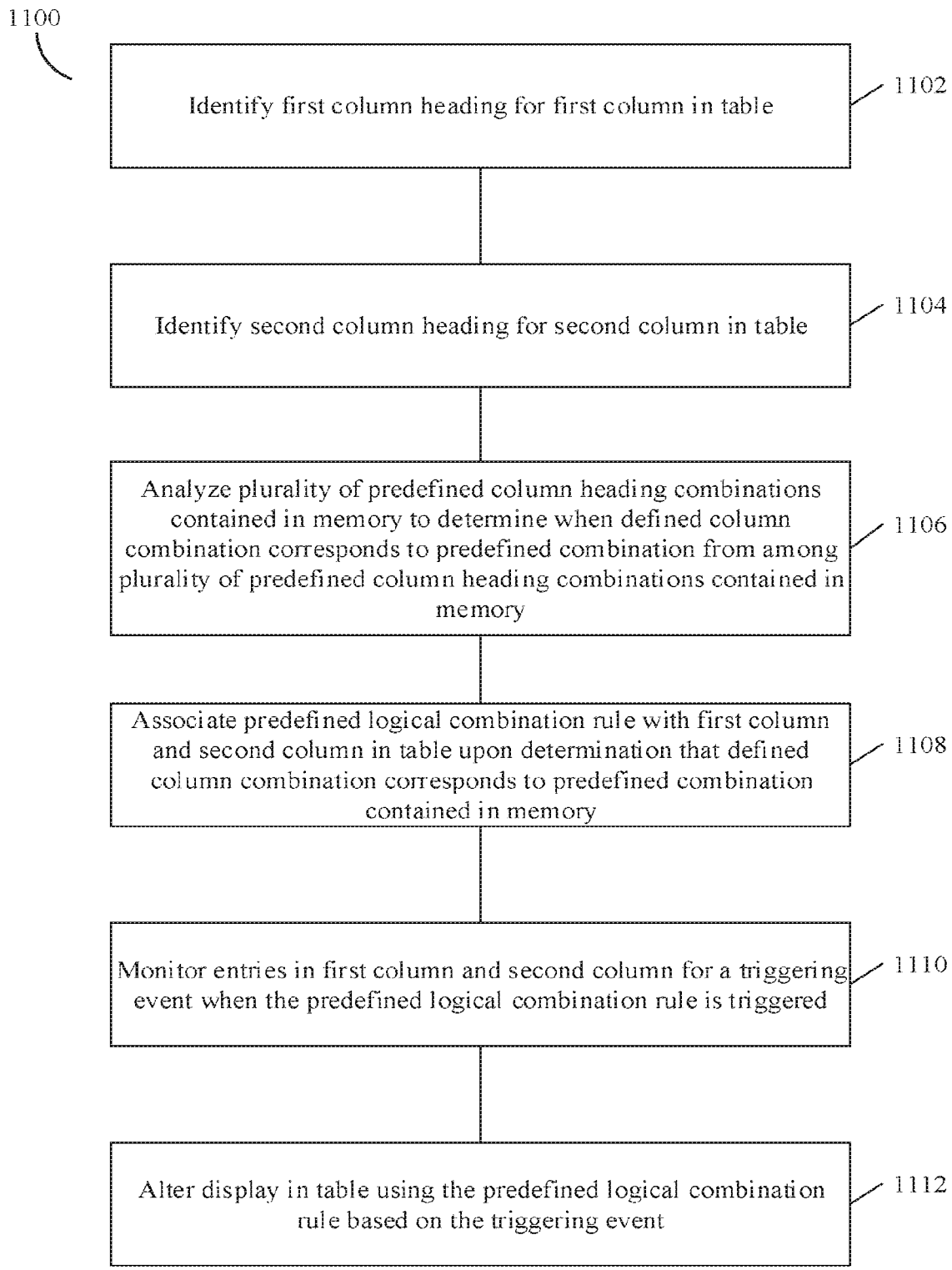
FIG. 11 is a block diagram of an exemplary process for relationship recognition in tablature, consistent with some embodiments of the present disclosure.

By way of example, FIG. 11 illustrates a block diagram of an example process 1100 for altering tablature displays, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 1100 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 5A to 9B by way of example. In some embodiments, some aspects of the process 1100 may be implemented as software (e.g., program codes or instructions) that is stored in a memory (e.g., the memory 120 in FIG. 1) or a non-transitory computer-readable medium. In some embodiments, some aspects of the process 1100 may be implemented as hardware (e.g., a specific-purpose circuit). In some embodiments, the process 1100 may be implemented as a combination of software and hardware.

FIG. 11 includes block 1102 to 1112. At the block 1102, the method may include identifying a first column heading (e.g., the first column heading 504 in FIG. 5) for a first column (e.g., the first column 502 in FIG. 5A) in a table (e.g., the table 500A in FIG. 5A) in response to a user (e.g., an individual or a portion of the general public) select.

At the block 1104, the method may include identifying a second column heading (e.g., the second column heading 508 in FIG. 5A) for a second column (e.g., the second column 506 in FIG. 5A) in the table in response to a user selection.

At the block 1106, the method may include analyzing a plurality of predefined column heading combinations contained in a memory (e.g., the memory 120 in FIG. 1) to determine when the defined column combination corresponds to a predefined combination from among the plurality of predefined column heading combinations contained in the memory.

At the block 1108, the method may include associating a predefined logical combination rule with the first column and the second column in the table upon determination that the defined column combination corresponds to a predefined combination contained in the memory. In some embodiments, the predefined logical combination rule may be configured to trigger a display change (e.g., as illustrated in FIGS. 7A to 9B) in the table in response to two differing value entries (e.g., the value entries of the cells in the first column 502 and of the cells in the second column 506 in FIG. 5A) in two differing columns (e.g., the first column and the second column).

At the block 1110, the method may include monitoring entries (e.g., data associated with texts "in progress," "waiting," and "done" in FIG. 5A) in the first column and the second column for a triggering event when the predefined logical combination rule is triggered.

At the block 1112, the method may include altering a display (e.g., as illustrated in FIGS. 7A to 9B) in the table when the predefined logical combination rule is triggered. In some embodiments, the processor is enabled to alter (e.g., by way of the operations described in association with FIGS. 5A to 6B) the predefined logical combination rule between the first and second columns. In some embodiments, after creation of the predefined logical combination rule, the predefined logical combination rule is enabled to be cancelled.

In some embodiments, the method may include altering the display in the table by establishing a third column (e.g., the third column 702 in FIGS. 7B and 7C) for storing data (e.g., the symbols included in the third column 702) associated with a trigger (e.g., that "a task is overdue" as described herein) of the predefined logical combination rule. In some embodiments, the processor may alter the display in the table by displaying an aggregation (e.g., the aggregation 802 in FIG. 8) of entries in the first column and the second column where the predefined logical combination rule is triggered. For example, the processor may display the aggregation in the manners as described in association with FIG. 8.

In some embodiments, at the block 1112, the method may include altering the display in the table by altering a display of the second column (e.g., the second column 506 in FIG. 5A). For example, the processor may add a visual object to the second column, change a visual effect of a visual object in the table, or both, as described in association with FIGS. 7A to 7C. In some embodiments, the processor may alter the display in the table by altering a display of the first column and a display of the second column, such as by way of the example operations described in association with FIGS. 7B and 7C. In some embodiments, the processor may alter the display of the first column and the display of the second column by presenting an indication that the first column and the second column are linked, such as by way of the example operations described in association with FIGS. 9A and 9B. In some embodiments, the indication may include an icon (e.g., the first icon 902, the second icon 904, or both).

Consistent with embodiments of the present disclosure, the method (e.g., the operations as described in association with FIGS. 9A and 9B) may include presenting an indication that the first column and the second column are linked. The method may include enabling replacement (e.g., by way of changing contents, values, formats, or datatypes thereof) the first column heading (e.g., the first column heading 504 in FIGS. 9A to 9B) for the first column (e.g., the first column 502 in FIGS. 9A to 9B) with an updated column heading for the first column in response to a user input (e.g., by way of a menu). The method may also include analyzing, in a way similar to block 1106, a plurality of predefined column heading combinations contained in the memory to determine when the updated defined column combination corresponds to a predefined column heading combination from among the plurality of predefined column heading combinations contained in the memory. The method may further include disassociating (e.g., decoupling or removing a relationship between) the predefined logical combination rule with the first column and the second column in the table upon determination that the updated combination does not correspond to any predefined combination contained in the memory. The method may further include altering the display in the table, in which the altering the display in the table may include unlinking the first column and the second column. For example, the method may include unlinking the first column and the second column by removing the indication (e.g., as illustrated and described in FIGS. 9A and 9B) that the first column and the second column are linked.

Consistent with embodiments of the present disclosure, the method may further include sending a notification (an email, a text message, a phone call, an application push notification, or any combination of any form of notifications) when the predefined logical combination rule is triggered. For example, the method may include sending the notification after performing the block 1112.

Some disclosed embodiments may be used for generating and transmitting, over a network, electronic notifications associated with tablature. Electronic notifications, as used herein, refers to any alert, message or other information sent electronically. Electronic notifications may be in the form of a visual display or a sound. As used herein, generating and transmitting electronic notifications may refer to producing electronic notifications and sending them notifications via a network. Electronic notifications may be said to relate to tablature when they advise on or relate to information contained within a tablature, which, as used herein, may refer to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays.

Figure 12:
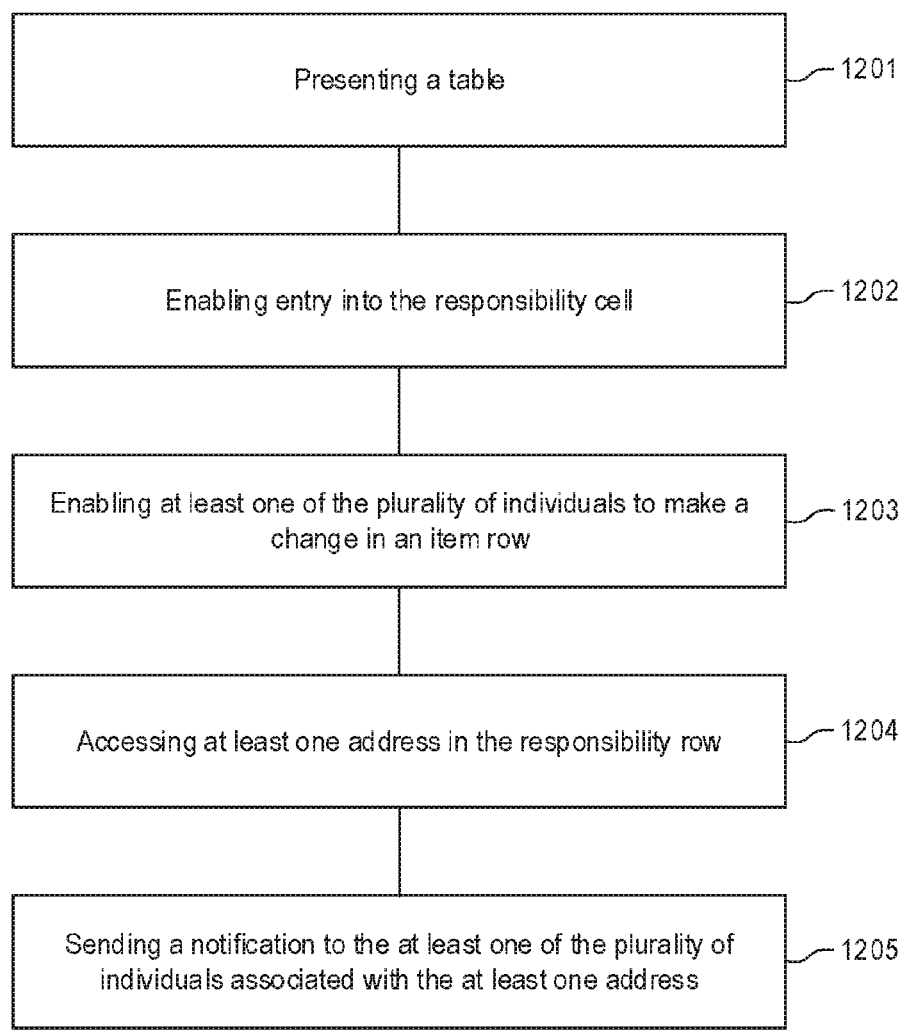
FIG. 12 is a block diagram of an exemplary method for sharing responsibility in a collaborative work system, consistent with some embodiments of the present disclosure.

FIG. 12 illustrates a block diagram of a method 1200 for generating and transmitting, over a network, electronic notifications associated with tablature. This may occur, for example, in a collaborative work system. Method 1200 may be performed by the computing device 100 in conjunction with computing architecture 200 as depicted and described above with references to FIG. 1 and FIG. 2. Method 1200 may begin at block 1201 by causing a table to be presented, such as on one of the user devices 220. Causing a table to be presented may include, for example, rendering images. This may occur by sending/receiving network packets, verifying connections, activating a graphical user interface (GUI), verifying updates, encrypting communications, or any other actions performed to make a table accessible to an end user. At block 1202, an input of at least one address linked to an account of at least one person associated with an item may be received in a responsibility cell of the table. Inputs may include instructions to DBMS 235 and respective repositories 230, instructions for user device 230, or any other elements of the computing architecture 200 to receive input from user devices 230. The at least one address may include an email address, a phone number, a text message address, or a communications application address that links to an account that may be associated with an entity such as a person. At block 1203, a change may be received in an item row. The change may include an alteration or addition of data to any cell in the item row. At block 1204, at least one address in the responsibility cell may be accessed, which may be performed, for example, by computing device 100 in communication with DBMS 235, respective repositories 230, or any other elements of the computing architecture 200. At block 1205, a notification may be sent via the link to the at least one address. For example, if the link identifies a particular individual's computing device, a notification may be sent to that device. Such devices may correspond, for example, to one or more user devices 230, and a notification may be sent utilizing computing architecture 200.

As described above, disclosed embodiments may involve presenting a table with cells defined by horizontal rows and vertical rows. A table may be in a form of a board, an array, a grid, a datasheet, a set of tabulated data, a set of comma separated values (CSV), a chart, a matrix, or any other two-dimensional or greater systematic arrangement of data. A horizontal row may be viewed as a range of cells, nodes, or any other defined length of data types that fully or partially extends across the table. A horizontal row may be referred to as an item row herein. A vertical row (or a column) may be viewed as a range of cells, nodes, or any other defined length of data types that extends transverse to the direction of a row in a table.

One of said horizontal rows and vertical rows may define items. That is, as a whole, either the horizontal rows may define items, or the vertical rows may define items. In many implementations, it may be most logical to present items horizontally, and characteristics of the items (such as status, responsible person, due date, etc.) in vertical or otherwise transverse rows (e.g., columns). However, such a format is a matter of aesthetic design and both alternatives are within the scope of this disclosure. An item may contain a task, a client identification, an opportunity, time, date, status information, or any other type of data that defines or provides additional information about an item, as defined by transverse rows. An item may be defined by a user of a board based on the user's preferences and needs. Another of said horizontal rows and vertical rows may define persons. That is, if the horizontal rows define items, then at least one vertical row may be reserved for the identification of a person (or vice versa). A person may be any entity associated with an item in the table, such a person who designated as being responsible in some way, or who otherwise has some relationship to information in the table. Such a person could be the table author, a team member, a third party, or any other entity. A person may be defined by linking to an existing or a new user, linking to contact information, linking to a group of people, or any other type of identification that clearly defines a specific person, a group of people, an organization, or any other entity.

An intersection of a vertical row and a horizontal row may define a responsibility cell that associates at least one particular person with a particular item. A responsibility cell may be used as a means of assigning particular person or a group of people to a specific item. By way of just a few non-limiting examples, a sales opportunity item may be assigned to one or many particular sales agents, a particular client may be assigned to a specific office based on location, a status update item may be assigned to a particular supervisor, or a task may be assigned to a particular team member. The relationship between items and persons may depend on the particular use case. For example, assignments in a hospital, a real estate firm, an R&D team, a product sales organization, a manufacturer, a transportation company, or any other field of endeavor may differ from each other. This disclosure is intended to cover any case where an item in any context is assigned responsibility to a person or entity for any reason.

Figure 13:
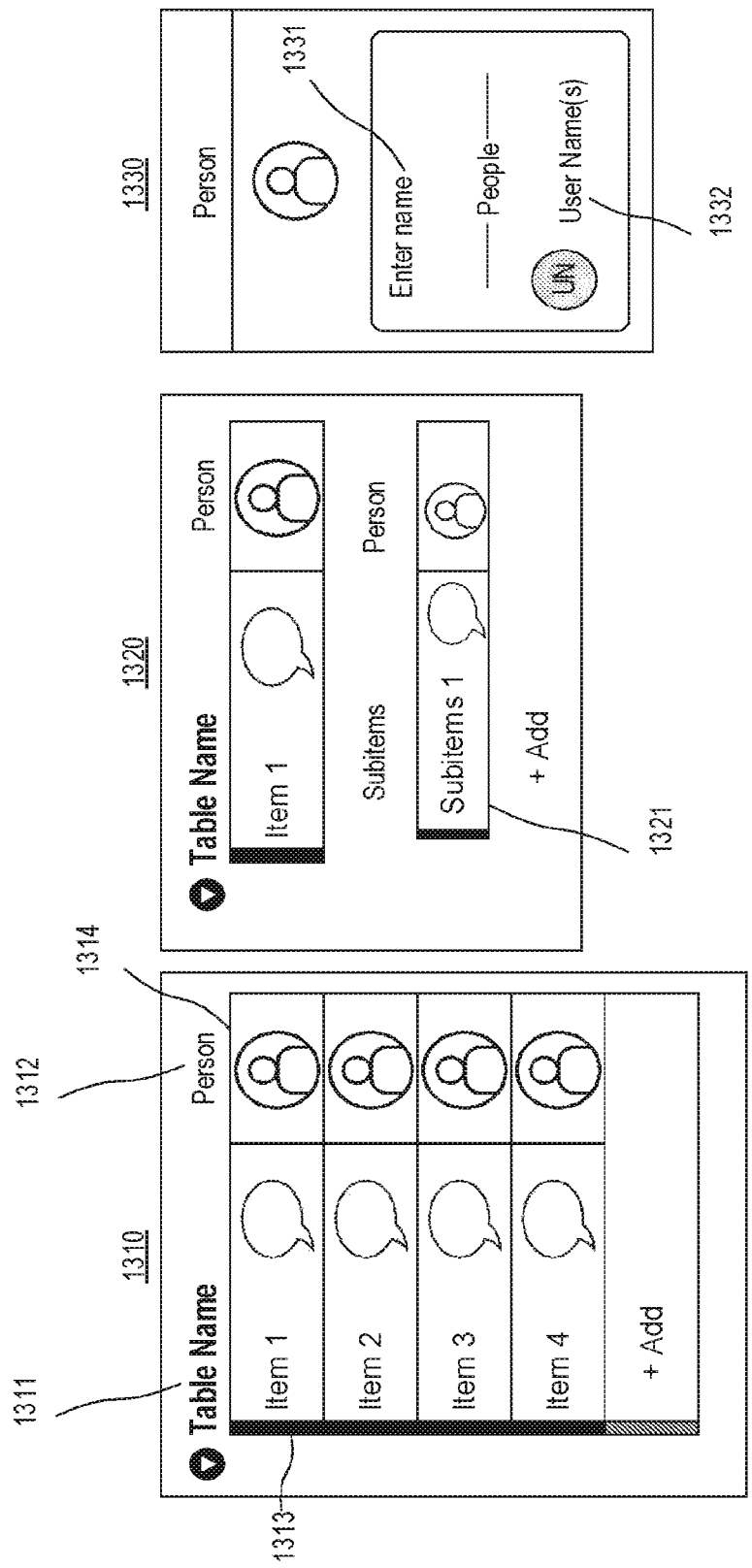
FIG. 13 illustrates an example of a user interface with responsibility cells, consistent with some embodiments of the present disclosure.

By way of example, FIG. 13 illustrates table 1310, which includes vertical rows 1311 and 1312, and horizontal rows 1313. Vertical rows 1312 and horizontal rows 1313 may intersect to create responsibility cells 1314 associated with each of the horizontal rows 1313.

Some embodiments of this disclosure may also include a drop-down menu associated with the responsibility cell. A drop-down menu may be a graphical control element which may be synonymous to a list box, drop menu, pull-down list, picklist or another graphical control element that allows the user to choose values from a list. When a drop-down list is inactive, it may display one value. When activated, it may display (drops down) a list of additional values, from which a user may pick. When the user selects a value from the list, the drop-down list may revert to its inactive state, and may display the changed value. A drop-down menu may display as a drop down, may appear over the value, or be in any other acceptable format for the graphical user interface.

In one exemplary embodiment a drop-down menu may be used to enable selection of one or more persons from a predetermined set of available individuals. The predetermined set of available individuals may be a default established by a user or owner of a board. The predetermined set of available individuals may also be predetermined by the individuals who are subscribed to the board, individuals sharing domain name with the user or owner of the board, or may include any other filtered selection of individuals. This exemplary embodiment may be used by the user to find team members based on who is subscribed to the board, association with a certain department, work location, or any other filtered selection that may assign the team members to an item. Furthermore, in some embodiments, the predetermined set of available individuals may be determined by permission settings. For example, available individuals may only include users who may have access to a selected table. This may be further configured based on levels of access. For example, available individuals in a drop-down menu may display only users with editing access but exclude users with view-only access that do not have editing access. Further, this may be configured based on users who have a specific type of access to a specific cell in addition to general access to the table.

Consistent with earlier embodiments, once a selection is made, the selection may propagate to multiple items. For example, if an item has a sub-item, an assignment may apply to the sub-items associated with the item. In one example, the responsibility cell of the item may automatically apply to sub-items associated with the item. Sub-items may be similar to items but may include an additional association with particular items in a board. The items that the sub-items are associated with may be parent items. A parent item may itself be a sub-item. A parent item may share permission and notification settings with associated sub-items. This association may be established by a rule or may automatically be established when a sub-item is created. For example, a sub-item may be generated adjacent the item that the sub-item is associated with such that responsibilities or alterations made to the item may automatically be applied to the sub-item. This may be useful, for example, in complex tasks involving multiple steps or when bulk assignment of items/tasks is needed.

By way of example, FIG. 13 illustrates a table with associated horizontal rows and vertical rows. Table 1310 illustrates an exemplary view of a table 1311 with cells defined by horizontal rows 1312 and vertical rows 1313. Specifically, 1311 illustrates a table name, which may serve as the heading an item column. 1312 illustrates a person column, and 1313 illustrates and item row. The intersection of person column 1312 and item row 1313 is an example of a responsibility cell 1314. 1320 illustrates an expanded view of vertical row 1313. Expanded view 1320 may show one or more sub-items 1321, which may inherit properties of the main item. 1330 illustrates an exemplary view of a drop-down menu, which may be displayed if a user attempts to edit the responsibility cell 1314. 1331 illustrates a fillable field or an input field that may act as a search bar which enables selection of one or more persons from a predetermined set of available individuals in order to assign an individual to a responsibility cell 1314. When the responsibility cell 1314 associated with Item 1 is changed, such as by selecting a person from the predetermined set of available individuals, the selection may automatically apply to the sub-item 1321 that may be associated with Item 1.

Additional aspects of this disclosure may involve receiving an input, associated with the responsibility cell, of at least one address linked to an account of the at least one person associated with the item. Receiving an input may include receiving a manual or automatic data input from a computing device. The input of an address may include a direct address input, such as by typing an email address into the cell, or it may include an indirect address input through the selection of an individual whose address is already stored in the system. Thus, when an individual is selected whose address is already stored in the system, the selection of the individual may constitute an input, associated with the responsibility cell, of at least one address. The address itself need not appear in the responsibility cell to be considered "input." Rather, the input of a selection of an individual who is linked to an address stored elsewhere is considered an input of an address into the responsibility cell. The at least one address may include an email address, a phone number, a text message address, a communications application address, or a link to an associated account of a system user. The at least one address also include a username within the system, email, phone number, messenger ID, communication application address, and/or any other means of communication with the user. In some embodiments, the responsibility cell may simply hold a name of a person. In other embodiments it may include any string of text. The entered string may be utilized to match with information available about a user associated with the responsibility cell. The entered string may include a combination of characters, including but not limited to letters, numbers, and symbols. For example, the string of text may be associated with an address that may also be associated with a user linked to the responsibility cell. Alternatively, a string of numbers may be be associated with a phone number or an employee ID associated with a user. The address may be any information associated with a person to enable contact or a communication with the person. For example, the address may include a name, a phone number, a mail address, an email address, an extension, a department, or any other identifying information associated with the person.

By way of example, with reference to FIG. 13, if a user enters a string of text into an input field 1331, a search for matching information may be performed and alternative options may appear in section 1332. For example, if "Bob" is typed in field 1331, field 1332 may display all people named Bob in the system. Alternatively, the search and display may be limited to individuals working on a project with which the table is associated. In yet another embodiment, the more likely candidates for "Bob" may appear first (e.g., those Bobs associated with the project), followed by other Bobs who are subscribers to the platform or who are recognized guests or affiliates.

Figure 14:
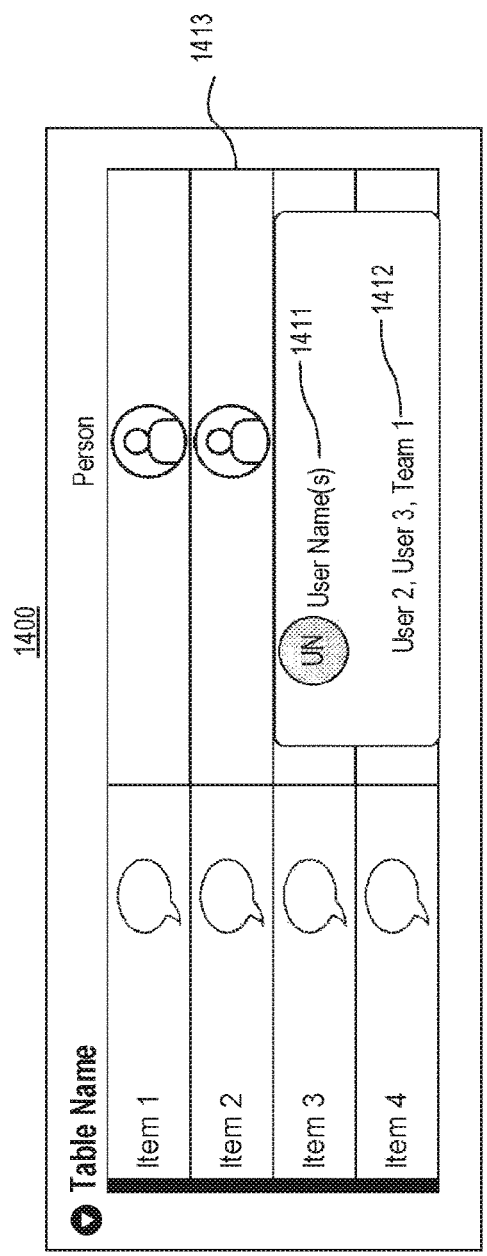
FIG. 14 illustrates another example of a user interface with a drop-down menu for assigning responsibilities, consistent with some embodiments of the present disclosure.

FIG. 14 depicts an alternative exemplary embodiment of a drop-down menu for a responsibility cell 1413, which may be displayed if a user attempts to edit responsibility cell in a table 1400. A user may already be assigned to a responsibility cell and may be shown as an assigned responsible person 1411. Available individuals 1412 may be shown as additional users and/or teams that may be assigned to responsibility cell 1413.

Furthermore, disclosed embodiments may involve receiving a change made in an item row. Changes made in an item row may include adding information, deleting information, or altering existing information that is contained in a cell associated with any item row. Receiving changes may be performed by certain users who are assigned permissions to make such changes. Users may be assigned permissions based on the column they are associated with or based on permissions placed on the users individually. Permissions may be granular to a particular item level, where each item may have its own permission. Permissions may also be general in that they may affect the permissions for accessing an entire table. Associated sub-items to each of the items in a table may also inherit the same permissions that are applied to the table as described above.

A change to an item row may include, for example, a status change for an item or a modification based on a messaging vertical row. By way of non-limiting examples, a status change, may include a change from "in progress" to either "stuck" or "done." Or a status change may be a change from "for sale" to "under contract" or "sold;" or "unassigned" to "assigned;" A status change may also include a change from an empty status cell to a populated status cell. For example, a change may include populating the status cell with the status "Working on it" when the status cell was previously empty. A status change may also include removing a status and leaving the status cell empty. For example, a change may include removing "Stuck" from the status cell to leave the status cell empty.

An item row may also contain a cell that may include information associated with messaging in a messaging vertical row. For example, a messaging vertical row may be a column dedicated to information about a messaging text thread. The messaging vertical row may be a column containing cells that each may include a conversation thread associated with an item row. A conversation thread may be located at the intersection of the messaging vertical row and an item row to associate that conversation thread to the item row. The messaging vertical row may include a cell that may be enabled to access a conversation thread that is continually added to, each time an individual adds a message to the thread associated with the item row.

Figure 15:
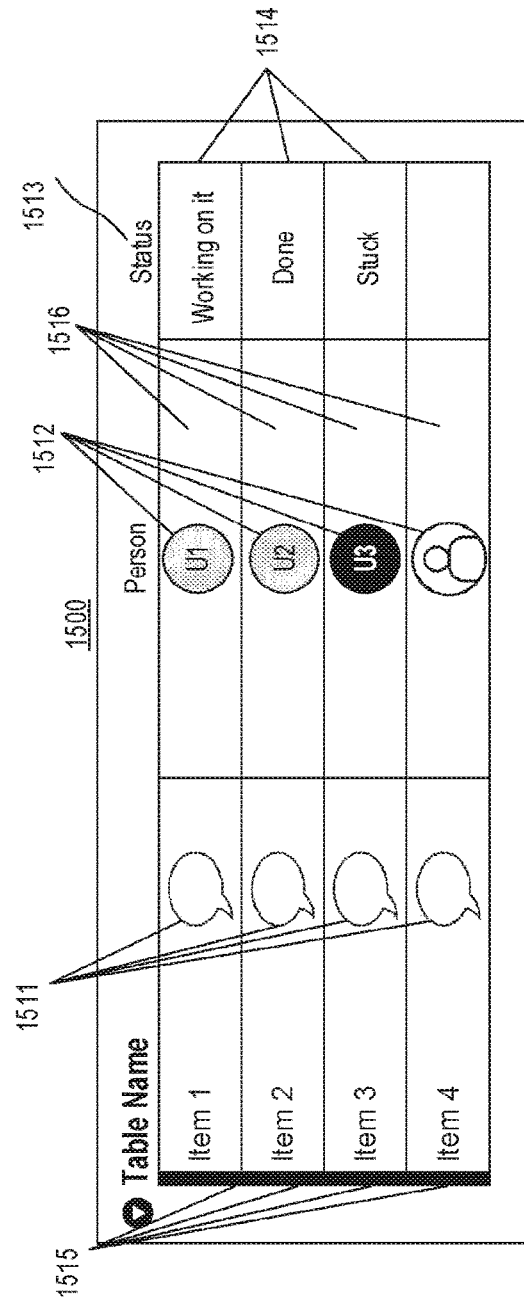
FIG. 15 illustrates a further example of a user interface for assigning responsibilities to items, consistent with some embodiments of the present disclosure.

FIG. 15 illustrates exemplary view of table 1500. The table 1511 includes messaging functionality, where users may provide comments or ask questions about an item in a messaging vertical row containing messaging threads 1511. Each element of the messaging vertical row 1500 may be associated with an associated element of the item rows 1515. Each item row 1515 may include a cell that may be enabled to access a respective conversation thread 1511, reflected as conversation icons. A user may click on the icons in vertical row 1515 to access the conversation, either through a pop-up or other similar mechanism. Users may link other users 1512 to the messaging row 1511. When other users 1512 are linked, they may receive a notification even if they are not listed or subscribed to the table otherwise. Other users 1512 are shown in an exemplary embodiment in FIG. 15 to illustrate how they may be linked to assignments in the responsibility cells 1516 associated with each of the items 1515. By the way of this example, item 1 is assigned to person U1, item 2 is assigned to person U2, and Item 3 is assigned to person U3 (the U1-U3 designations my of course be replaced with names and/or images of the specific assigned persons). While not shown, multiple users may be assigned to same item, which may result in multiple indications associated with the multiple users in the responsibility cell 1516. Table 1500 may contain a status column 1513 that may contain an indication of the current status of the associated item. Indications of status 1514 may be changed by adding, removing, or altering such statuses, and such status changes may result in sending a notification to users in a responsibility cell 1516.

Consistent with disclosed embodiments in response to the change in the item row, the system may automatically access at least one address in the responsibility row, and automatically send a notification via the link to the at least one address. Where a responsibility cell associates a plurality of persons with an item, in response to a change in the item row, the notification may be sent to the plurality of persons in the responsibility cell. Each item, row, and/or column may be configured to send a notification to every user associated with the item via the responsibility cell when any change is made to that particular item. A notification may be sent to a single individual or multiple individuals identified within the responsibility cell. If there are multiple individuals in the responsibility cell, the same notification may be sent to each of the individuals, or different notifications may be sent depending on implementation. The notification may include any information related to the change made to the item or information pertaining to the fact that a change was made to the item. The notification may be sent through the table or through a third-party application such as email, text, or third party communications vehicle (e.g., Whatsapp™ or Slack™). The notification may include information about the change that was made, such as a status change from "Stuck" to "Done." Or, by way of another example, if someone added a comment in the communication thread associated with an item, the person in the responsibility cell might receive an automatic notification that might include the comment itself, or a notice that a new comment was made, and/or a link to a table in which the comment was made. The latter alternative might provide the responsible person with context for the comment. Of course, depending on implementation, some or all changes to an item row might trigger a notification to the person responsible for that item. By way of another example, if the responsibility cell itself is changed such as by adding another person to the cell, all those previously associated with the responsibility cell might receive a notification. The notification may be customized by the user and may be sent automatically in response to a change made to the row. The notification may also be sent periodically in batches regarding changes made in a period of time. For example, it may be overwhelming on an active item to receive many notifications in a particular time period. For particularly active items, the notifications might be batched and sent in batches. Or, an individual with responsibility for multiple items in the same table or across multiple tables, may receive periodic notifications batching changes to multiple items. When a change is made to an item row, the responsibility cell may be automatically accessed to determine the individuals that should receive a notification.

Table 1500 in FIG. 15 contains a status column 1513 identifying the current status of associated items. When a change is made to the item, the system may retrieve an address associated with a corresponding responsibility cell 1516 to access a link to transmit a notification regarding the change. While not shown, multiple users may be assigned to same item, which may result in multiple indications associated with the multiple users in a responsibility cell 1516 when a change is made to the particular item.

In some embodiments, a table may be configured to access a communications rule for sending the notification. A communications rule may include any logical rule associated with sending a communication. The logical rule may be presented as an automation or logical sentence structure as described herein. The communications rule may monitor the table for certain conditions to trigger the activation of the communications rule and send the notification. Owners or users of a board may generate and customize communication rules incorporating their preferences for receiving or sending notifications relating to the table, group of items, or individual items. For example, a user may specify to only send notifications by email regarding certain items and to send a text message for other items. For example, the user may specify to send alerts regarding a commentary thread by email, but specify to send text messages regarding status changes. Additionally, the user may customize the system to send summary notifications for certain items such as sending only a single notification with the summary of changes made to an item for a predefined period of time on a periodic basis. For example, user may set up his or her notification to be sent at specific times (e.g., only on Mondays at 9 am).

By way of example, FIG. 16 illustrates a view of a notification customization board 1600. Board 1600 shows a visual approach to software where users do not need to have any knowledge of coding to setup specific rules for notifications. These exemplary automations or logical rules may enable a user to configure a communications rule for any of the tables. The user may also enable multiple communications rules for a single table, or may enable one or more communications rules applicable to a plurality of tables. Exemplary rules 1620-1637 may be predefined or defined by a user. Even if predefined, users may be enabled to create their own rules following a similar format. For example, a user may customize a rule following the format of when X happens, do Y. Such custom rules may be saved and assigned to specific item and/or tables within the system.

In some disclosed embodiments the input of an address (either directly or indirectly) into the responsibility cell causes an avatar to be displayed for the at least one person associated with the entered address. The avatar may be an icon pre-selected by the person to be added to the responsibility cell or may be an actual or simulated image of that person. More generally, an avatar may include an indication of an individual, such as a graphic, an icon, alphanumeric text, initials, or any other visible information identifying an individual or entity. It may be obtained from general memory or may be obtained from memory associated specifically with another row or cell and duplicated in the current cell. Other information used in another row may be associated with a current row as well. For example, if contact information or local time information exists in another row for the person, that information might be migrated or otherwise linked to the current row. Such contact information and local time information may appear normally in the new cell or an associated cell or might be accessible in response to a mouseover (movement or click) on the avatar. An avatar may include an overlaid status indicator. A status indicator may show an availability of a user, such as working from home, traveling, unavailable, in the office, or any other indication of availability or work location. A local time may be based on an individual's computing device or preselected for a specific time zone in the table. The local time may be displayed in relation to GMT (Greenwich Mean Time) time zones and may follow the UTC (Coordinated Universal Time) standard. Time may be display in a 24 h format or a 12 h format with an AM/PM indicator. A DST (Daylight Saving Time) indicator may also be shown, based on the country. A mouseover event as used herein may refer to an event where user hovers a cursor above, clicks on, touches, or otherwise selects a specific cell or interactive element in a table. A cursor may not be present if the user is using a touch screen and a touch may be considered a mouseover event in a such situation. A mouseover event does not necessarily imply a use of a mouse and may happen with trackpads, touchscreens, trackballs, or other means of controlling a user interface. Contact information may include an email address, a phone number, a text message address, a communications application address, a physical address, or any other information providing means for contacting specific user.

Figure 17:
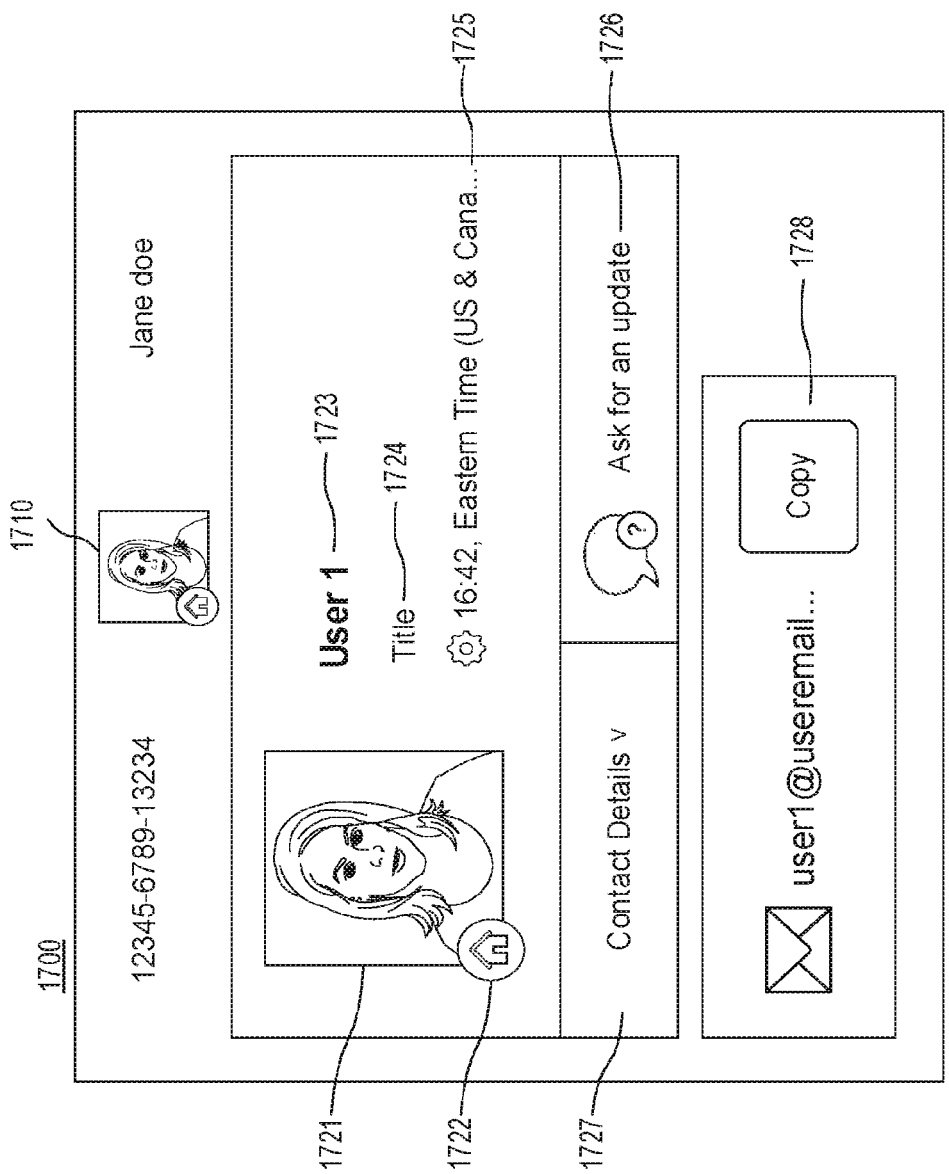
FIG. 17 illustrates an example of a user interface presenting additional information associated with a responsible entity, consistent with some embodiments of the present disclosure.

FIG. 17 depicts an example of a table view 1700. Person 1710 may be associated with an entered address. 1721 shows an avatar that may be associated with that person. Field 1722 shows status of the person, in this example, a house icon to reflect "working from home." Field 1723 shows the username of the person associated with an address. Field 1724 shows title of the person (e.g., position and department within the company or other additional information). Field 1725 shows time zone and current time for the selected person. Field 1726 shows a quick link to a messaging row which may automatically tag a person to the message. Field 1727 may enable access to a drop-down panel which can be used to view additional contact information associated with the person.

In some embodiments, users may be enabled to reallocate the at least one person linked to a responsibility cell to another responsibility cell. Users may also be removed from the responsibility cells. Reallocation and removal permissions may be controlled by an owner of the table/board and may be achieved with a simple drag and drop or any other similar means. Permission settings for a particular item may be automatically applied to the at least one person in the responsibility cell associated with the particular item. Permission settings may be any permissions associated with a specific item that may be defined by a user or predefined by the system. The permission settings may be assigned to a whole board or to individual items. Permission settings for the item may be automatically applied to the at least one person in the responsibility cell associated with the item. When a person is reallocated from one responsibility cell to another responsibility cell, the permission settings for the item row may apply to the new responsibility cell, which in turn may automatically apply to the person as a result of the reallocation to the new responsibility cell.

Figure 18:
FIG. 18 illustrates an example of a user interface for selecting board permission settings consistent with some embodiments of the present disclosure.

FIG. 18 shows an exemplary permissions view 1800. Board permissions screen 1820 may list available options to assign permissions. Granular permission assignment may be provided to edit rows to all users within a person column 1821. The permissions screen 1820 may include an exemplary selection menu 1822 where multiple columns may be selected at once.

Consistent with disclosed embodiments, the system may be configured to associate a sub-item row with the item row. Sub-items may be associated via a user interface and the association may also be changed from one item to another via a drag-and-drop interaction. The system may be further configured to enable a change in the sub-item row. Enabling the change may be performed via user permissions as described earlier. The system may be configured to send a notification to the at least one person when a change is made in the sub-item row consistent with earlier disclosure.

Figure 19:
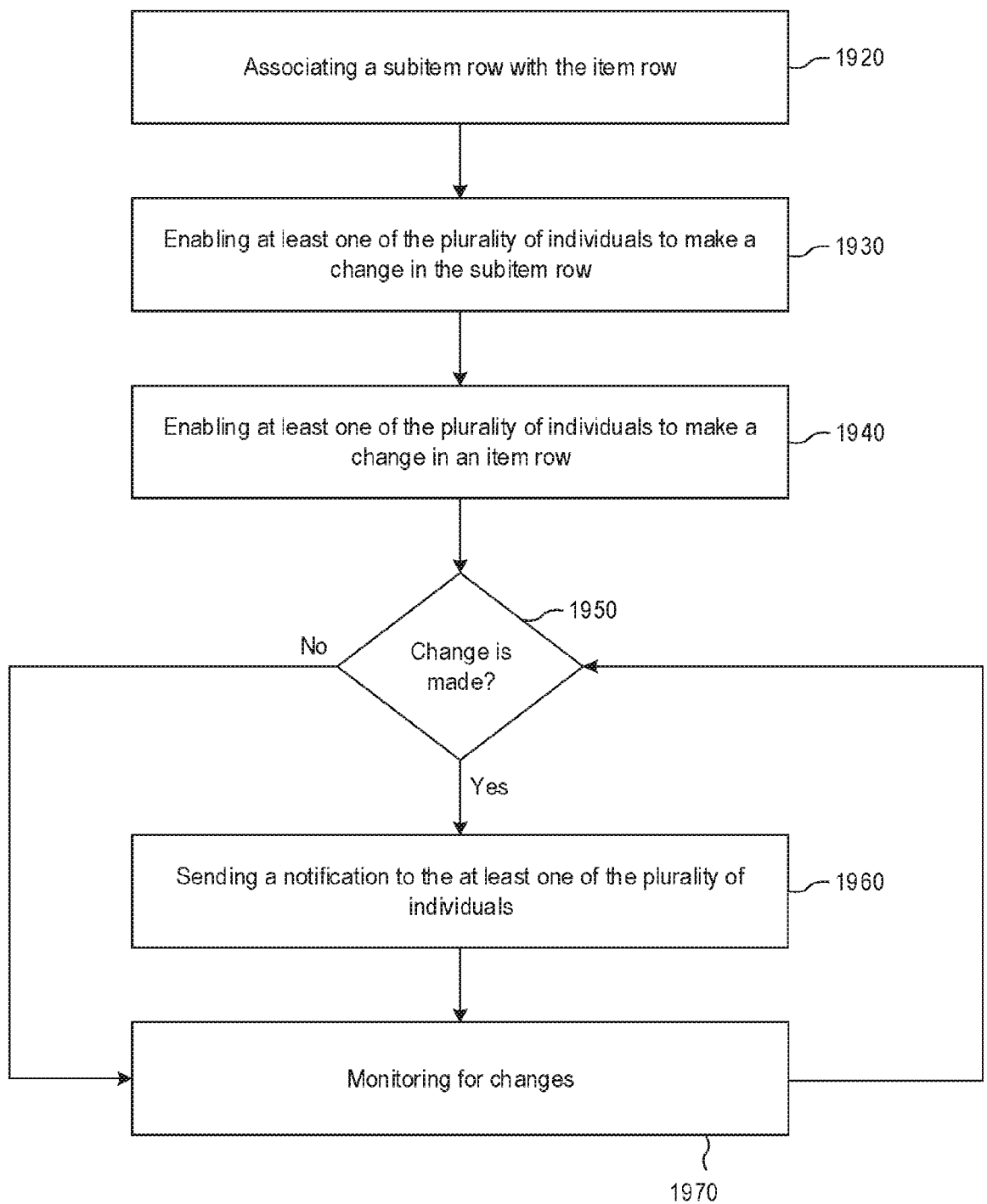
FIG. 19 is a flow chart of an exemplary process for sending notifications based on changes in a sub-item rows, consistent with some embodiments of the present disclosure.

By way of example, FIG. 19 illustrates a flow chart of one example of a method for sending notifications for sub-items 1900. At step 1920, method may begin by associating a sub-item row with an item row. The association may be removed in the future and the sub-item row may then become an independent item row. Alternatively, the sub-item row may be reallocated to a different item row, thereby changing association to a different item row. At step 1930, the method may continue by enabling a change to the sub-item row. Sub-item rows may inherit edit permissions from the parent item row or have their own individual permissions. Permission inherency may flow both ways. At step 1940, the method may continue by enabling at least one of the plurality of individuals to make a change in an item row. Step 1950 shows a determination process of whether changes are made. When changes are made, the method may continue to 1960 to send notifications to the at least one address linked to appropriate users consistent with embodiments described herein. If no changes are made or if all notifications have already been sent, the method may idle at step 1970 to monitor for any future changes.

Some disclosed embodiments may be used for restricting permission access via tablature. "Permission access," as used herein, refers to approval, consent, authorization, or any other means of controlling or regulating an ability to view, change, link, or otherwise interact with or see specific data. Permissions may be granted, revoked, or otherwise restricted. As used herein, restricting permissions may refer to configuring access to data, to impose such a limitation. Permissions may be said to relate to tablature when they apply to or otherwise relate to information contained within a tablature, which, as used herein, may refer to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual display mechanisms.

Some embodiments may include maintaining a table having a plurality of rows and columns. A table may be in a form of a board, an array, a grid, a datasheet, a set of tabulated data, a set of comma separated values (CSV), a chart, a matrix, or any other two-dimensional or greater systematic arrangement of data. A horizontal row may be viewed as a range of cells, nodes, or any other defined length of data types that fully or partially extends across the table. A horizontal row may be referred to as an item row herein. A vertical row (or a column) may be viewed as a range of cells, nodes, or any other defined length of data types that extends transverse to the direction of a row in a table. Maintaining the table, as used herein, refers to storing the table in a repository so that it may be accessed for presentation on a computing device or display. The stored table may be a form of table (e.g., row/column headings), data for inclusion in a form of table, or both. The table may be accessible to all users who have permission to access the table. The system may also restrict access to the table to users who do not have permission to access the table. Permissions may be changed at any time by the owner of the table or by users who are authorized by the owner of the table. For example, if one user is removed from the table by the owner of the table, the user may lose access to data associated with that table. Similarly, if a new user is added to the table, the new user may gain access to data associated with that table.

Some disclosed embodiments may include receiving a first customized access permission that regulates access to information in a particular column, and receiving a second customized access permission that regulates access to information in a particular row. Although both horizontal and vertical presentations may be referred to as rows, to avoid confusion, in this example a column refers to a vertical presentation and a row refers to a horizontal presentation. A first and a second customized access permission may be received from a user, administrator, or table author or owner (collectively "user" as a shorthand) who enters and sends the customized access permissions to a processor for storage in memory such as a repository. Thus, permissions may be restricted, granted, or otherwise changed by a user provided with an ability to grant access permissions that regulate access to information The system may establish an ability to grant access permissions through, for example, the provision of code that sends a signal to a user interface enabling a user to toggle permissions for other user accounts (e.g., subscribers) to access the table on a per row or per column basis. Upon receipt, a user's customized access permissions may be stored along with account information of authorized users in a repository so that the system may perform a look up of accounts attempting to generally access or perform certain actions on a particular table. If the system matches the account information in the repository, the system may be said to grant an access permission to access or modify data in a particular table. In order to access data in a particular cell, the system may perform a look up for whether a user account attempting to access the data has permissions for both the row and the column in which the particular cell resides, before granting permission for the user account to access the data within the particular cell.

Row and column access permissions may regulate access to information in a particular column or row. Regulating access to information may include customizing or otherwise controlling certain interactions with information contained in a particular cell or a particular table. Regulating may include granting, restricting, or denying access to a particular cell of a particular table. Access to information may include adding data, altering data, removing data, viewing data, sharing data, or any other interaction with the data or information in particular cells of particular tables. For example, row and column access permissions may affect permissions for any combination of integrating (e.g., with third-party applications or other tables), reading, writing, and accessing based on a role or a subscriber profile. An integration permission, as used herein, may refer to an ability of someone to access and integrate third-party applications or other tables to a particular table (or a particular row/column/cell), or generally share access to the contents of a particular table or its subcomponents (e.g., a row, a column, or a particular cell). A read permission, as used herein, may refer to an ability of someone to view or generally read the contents of a particular table or its subcomponents. A write permission, as used herein, may refer to an ability of someone to edit or generally write or modify the contents of a table or its subcomponents.

A role permission, as used herein, may refer to an ability of someone to modify a subscriber profile's ability to access a particular table or set of data by granting or revoking authorization to access the particular table based on a secondary user's role or subscriber profile in relation to the particular table. A subscriber profile, as used herein, may refer to a certain user account with a specific role, which may determine a certain level of access to information in a particular table. For example, a subscriber to a table may have a member role, which corresponds to a member level of access to the table. The subscriber profile may be based on an association of a common company, such that subscriber profiles from the same company may be part of a collaborative work system. A role, as used herein, may refer to an administrator (admin) role, an owner role, a member role, a visitor role, or any other function assigned to a particular user. Each subscriber profile in relation to a particular board may be assigned a specific role as a default or may be configured by an admin.

Each role may be customized, for example, by an admin through permission settings for particular tables. The admin may be an owner of a table, and the admin may add new owners as joint owners of the same table or new members as teammates. The admin may also control permissions to access a table. The relationship between roles and permissions may depend on a particular use case. For example, roles in a hospital, a real estate firm, an R&D team, a product sales organization, a manufacturer, a transportation company, or any other field of endeavor may differ from each other. This disclosure is intended to cover any case where a role or a set of permissions in any context is assigned to a person or entity for any reason.

Some disclosed embodiments may involve regulating an ability to access information in a particular cell of the table when the particular cell is in at least one of the particular column or the particular row. As used herein, regulating an ability to access information may refer to limiting or granting access or otherwise controlling access to a set or a portion of a set of data. In some embodiments, all data in all cells may be restricted in some way by default unless through regulating, access is granted. In other embodiments, an ability to alter, access or link to data in all cells may be granted by default, unless through regulating, access is restricted. In yet other embodiments some cell permissions in a table may be granted by default and others may be restricted by default, and those default setting might control the associated cells unless through regulating, the default permissions are changed.

Thus, in some embodiments, initially restricted access to a particular cell may be broadened through a change in permissions. Broadening access may refer to granting additional access to otherwise allowing additional access to a set or a portion of a set of data. A particular cell, as used herein, may refer to a cell at an intersection of a row and a column or any other specific cell in a table. Access to data contained within a particular cell may be modified consistent with embodiments of the present disclosure. When a user account is not granted permission in a row or column permission setting for a particular cell at an intersection of a row and a column, the system may restrict an ability to access information in the particular cell of the table. The system may perform a look up of authorized user accounts in a repository on a per row and on a per column basis to determine whether a user account attempting to access a particular cell is authorized to do so. For example, if a user account attempting to access data in a particular cell has a row permission but lacks a column permission, or vice versa, the system may recognize that the user account lacks the necessary authorization to access that particular data in the particular cell. Similarly, if the user account attempting to access the data in the particular cell lacks permissions to access both the row and columns in which the particular cell resides, the system would recognize that the user account lacks the necessary authorization to access that particular data in the particular cell and deny access to the user account. In order for the user account to access the data in the particular cell, the system would have to determine and verify that the user account has both row and column permissions granted for the particular cell before granting access to the particular cell. The owner or administrator of the table may reconfigure and further grant or customize these permissions according to the owner's preference at any point in time.

Some embodiments may involve outputting a signal to display the table with the particular cell regulated. In order for a table to render, a display must receive a signal that sends information to the display. That signal may be output by a processor or group of processors that first checks permissions for the table. If permissions exist, the output signal sent for display may reflect the permissions. For example, if regulation prevents a particular user account from viewing information in a particular cell of a table, the output signal may omit data for that cell. Or, if a permission restricts changing data in a cell or linking another table to a cell, the output signal might contain information that prevents certain user actions.

Regulations for a particular cell may be derived from information relating to a table other than a current table being accessed by a user. For example, tables may be linked together such that certain information from a first table carries over, through linkage, to a cell in a second table. If, for example, a restriction is placed on a particular row, column, or cell in the first table, when an unauthorized user attempts to access a second table that shares the information in the particular row, column or cell of the first table, the restriction may carry forward, and the restriction may be applied to the second table.

Figure 20:
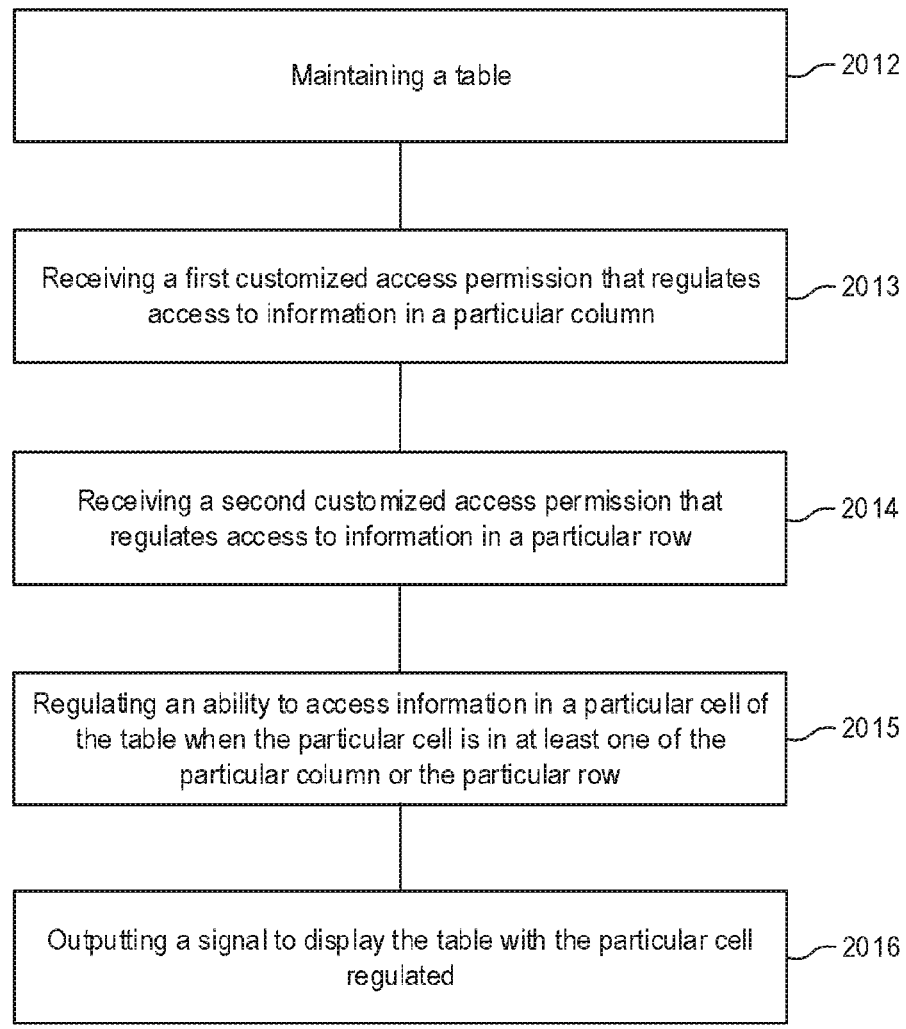
FIG. 20 is a block diagram of an exemplary method for restricting permission access via tablature in collaborative work systems, consistent with some embodiments of the present disclosure.

FIG. 20 illustrates a block diagram of a security method 2000 for regulating permission access in tablature. This may occur, for example, in a collaborative work system. Method 2000 may be performed by the computing device 100 in conjunction with computing architecture 200 as depicted and described above with references to FIG. 1 and FIG. 2. Method 2000 may begin at block 2012 for maintaining a table having a plurality of rows and columns. The table may be maintained in a repository as previously discussed. Causing at table to be maintained may include storing the table in a repository and/or enabling the table in the repository to be updated as information associated with the table changes. The maintained table may be presented on one of the user devices 220. This may occur by sending/receiving network packets, verifying connections, activating a graphical user interface (GUI), verifying updates, encrypting communications, or any other actions performed to make a table accessible to an end user. At block 2013, a method may involve receiving a first customized access permission that regulates access to information in a particular column. The customized access permissions for a row or column may be received electronically from a user accessing a user device 220. The customized access permissions may be obtained at a server or other remote processor via a network connection. Receipt of the customized access permissions may result in the granting of the permissions. Granting permissions may involve providing instructions to DBMS 235 and respective repositories 230, and/or providing instructions for user device 230, or any other elements of the computing architecture 200. At block 2014, a method may involve receiving a second customized access permission that regulates access to information in a particular row. Receipt of the access permission for a row may occur in the same way access permissions are received for a column. Similarly, granting such permissions for rows may be the same as for columns. Row and column access permissions may enable or restrict any combination of reading, writing, and executing permissions, and may apply to an owner, group, individual, or all users. An ability to grant access to information may be based on a subscriber profile, which may include role management of a user, such as a user who may be appointed as a member or as an administrator.

At block 2015, a method may include regulating an ability to access information in a particular cell of the table when the particular cell is in at least one of the particular column or the particular row. That is, if information stored in the system falls under a particular column or a particular row that is regulated, the system may regulate that same information displayed in a table being accessed by a user. Thus, if a column or row access permission restricts viewing access, cells that fall under that column or within that row may appear blank. Or, in some situations, the entire column or row may be hidden from view, including the column or row headings.

At block 2016, a method may include outputting a signal to display a table with a particular cell regulated. That is, if the permission access only impacts a single cell, for example, access to only that cell may be regulated. And if the permission access impacts an entire row or column of cells, the entire row or column may be regulated. This may occur when a processor outputs a signal to a user device causing the table to render with the customized access permissions in effect.

Figure 21:
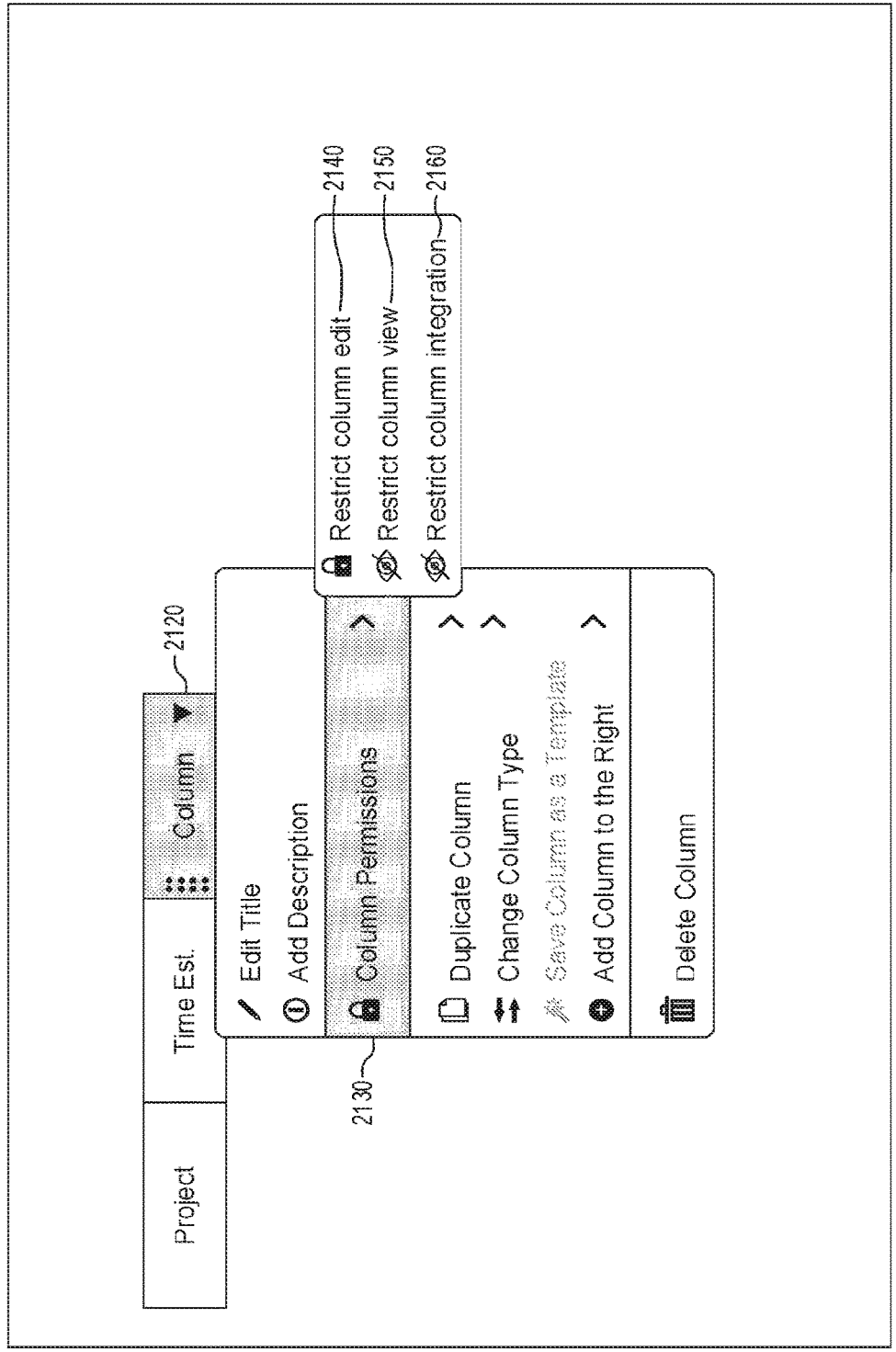
FIG. 21 illustrates an example of a user interface with column permissions, consistent with some embodiments of the present disclosure.
Figure 22:
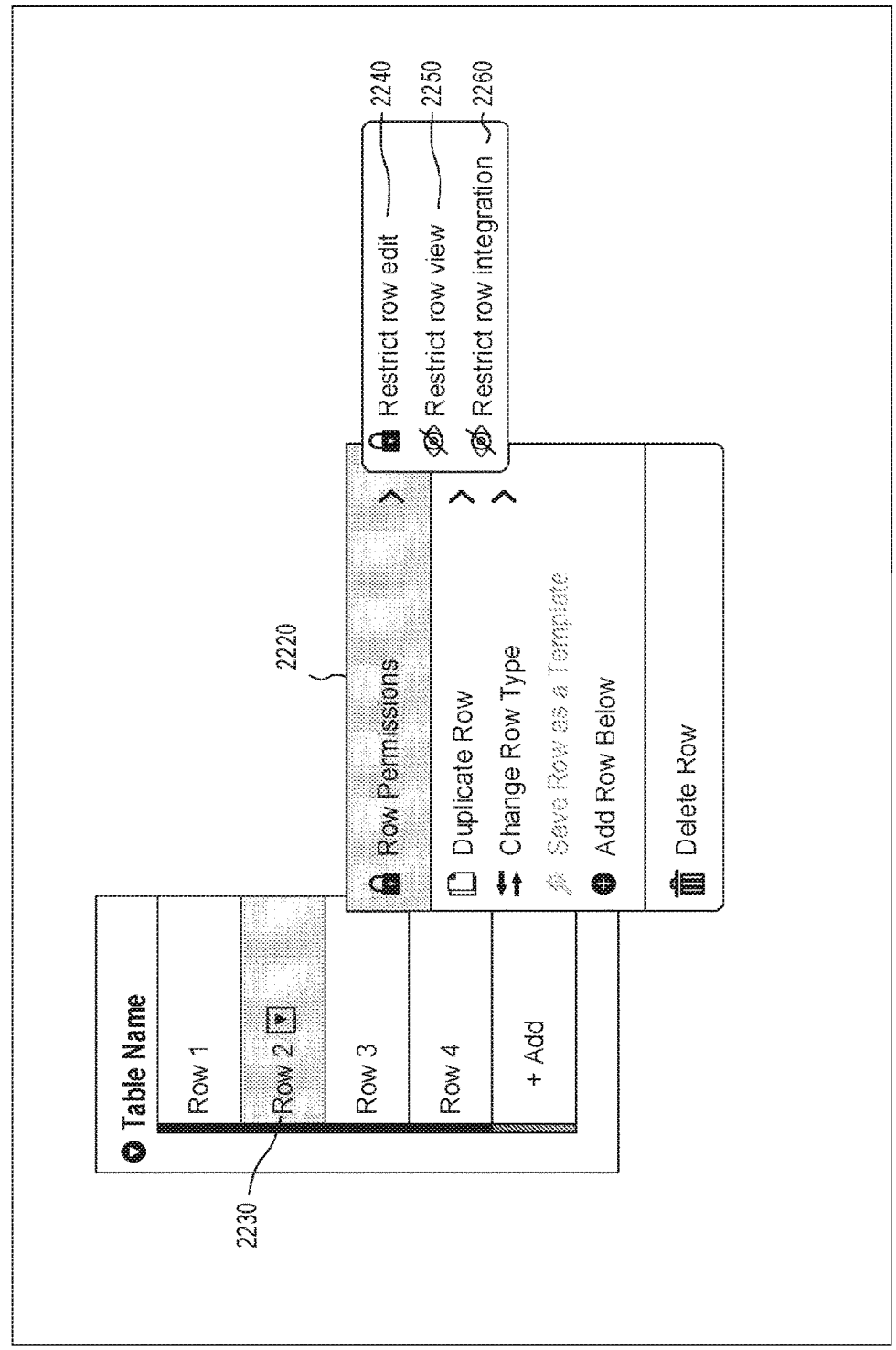
FIG. 22 illustrates another example of a user interface with row permissions, consistent with some embodiments of the present disclosure.

By way of example, FIG. 21 illustrates an exemplary graphical user interface for modifying column permissions of a table 2100, which includes a drop-down menu 2120. In a similar fashion, FIG. 22 illustrates an exemplary graphical user interface for modifying row permissions of a table 2200, which includes a drop-down menu 2220. A drop-down menu may be a graphical control element which may be synonymous to a list box, drop menu, pull-down list, picklist, or another graphical control element that allows the user to choose values from a list. Drop-down menus 2130 and 2230 may include menu items for modifying column permissions 2130 and row permissions 2230. Menu items 2130 and 2230 may be hidden if a user accessing drop-down menu 2120 or 2220 does not have proper role assigned with authorized role permissions. Menu items 2130 and 2230 may include sub-items 2140 to 2160 and 2240 to 2260. The lists of sub-items are illustrative but non-limiting examples that may also include any additional sub-items. Some or all of the menu sub-items 2140 to 2160 and 2240 to 2260 may be hidden based on a user's role. Menu sub-items 2140 and 2240 permit modification of a list of users with edit access for the column and rows respectively. Menu sub-items 2150 and 2250 enable modification of a group of user accounts that may view the columns and rows respectively. Menu sub-items 2160 and 2260 enable modification of a group of user accounts that may have access to integrations for the columns and rows respectively. Modifications of access is consistent with embodiments of the present disclosure. In one exemplary embodiment, a menu sub-item may be used to enable selection of one or more user accounts from a list. This exemplary embodiment may be used by a table owner or an admin to easily set permissions for team members based on who is subscribed to the board, association with a certain department, work location, or any other filtered selection that may assign permissions to team members in bulk.

In some embodiments, regulating the ability to access information in a particular cell may include restricting an ability to view data in the particular cell. The ability to access information, as used herein, may refer to an ability of someone with this access to view or a general user-capability to read the contents of a table, a row, a column, or a particular cell. Restricting an ability to view data may include limited ability to view data by not displaying or obscuring the data from view in a display. Additionally, regulating the ability to access the particular cell may include restricting an ability to alter the particular cell. An ability to alter, as used herein, may refer to an ability of someone with this permission to edit, or a general user capability to write or modify the contents of a table, a row, a column, or a particular cell. Furthermore, regulating the ability to access the particular cell may include restricting an ability to link the particular cell to another table. An ability to link to another table, as used herein, may refer to the capability of someone with this permission to share data within a particular cell of a particular table with other tables that may be associated with other users, or a general user ability to share access to the contents of a particular table, row, column, or particular cell. Moreover, regulating the ability to access the particular cell may include restricting an ability to link the particular cell to a third-party application. An ability to link to a third-party application, as used herein, may refer to the capability of someone with this permission to integrate third-party applications in which data may be shared, such as by enabling a third party app to access, display, or otherwise use restricted data. Such linkages, which may be restricted or permitted through regulation, may access data from a particular cell of a particular table, or provide a general ability to share the data with a third-party application, access the contents of a table, a row, a column, or a particular cell. Additional types of restrictions may be configured. This disclosure is intended to cover any case where a role or a set of permissions in any context may be assigned to a particular cell or a group of cells for any reason.

As described above, disclosed embodiments may involve outputting a signal to cause a plurality of differing selectable permissions settings to be presented in a common view. The selectable permissions settings may provide an ability to grant access permissions such as through establishing a new permission or revoking a previously existing permission. The common view may also enable a user to view existing permissions so that changes can be made, or new permissions added. A common view, as used herein, may refer to a summary or any other organized way of displaying data on the user interface. A common view may be interactive and may enable alteration of the permissions to vary access to information. Interactivity, as used herein, may refer to allowing a user to engage with a GUI and make changes on a computing device, display, or any other interface with the system. Permission alteration, as used herein, may refer to a change, addition, removal, or any other modification of permissions. Permission alteration may affect permissions based on an account type (e.g., admin or subscriber), permissions to access specific information in a particular table, permissions to engage in specific activities (e.g., viewing data, altering data, or sharing data) in relation to a particular table, or any other permissions for interacting with a particular table or across tables. Information, as used herein, refers to data within a cell, row, column, table, or any other data associated with the permissions. Additional common view functions may be added. This disclosure is intended to cover any case where data may be displayed and may be easily modified in any context as assigned to a particular cell or a group of cells for any reason.

Figure 23:
FIG. 23 illustrates an example of a common view board permission user interface consistent with some embodiments of the present disclosure.

By way of example, FIG. 23 illustrates a common view for a board permission user interface 2300. Board permission settings 2320 may list available options to assign permissions to all subscribers of a table in bulk. An "Edit everything" option 2330 may be provided. The "Edit everything" option 2330 may include adding/moving groups, columns, and rows; editing content in all rows/columns; writing updates; or any other modifying change. An "Edit content" option 2340 may also be provided. The "Edit content" option 2340 may include adding/moving rows/columns; editing content in all rows/columns; writing updates; or any other modifications of content. Granular permission assignment 2350 may be provided to edit rows/columns to all users within a specific column such as with an "Edit rows" option 2350, where multiple rows/columns may be selected at once. Granular permission assignment 2350 may be used to specify that members can only edit rows/columns assigned to them in a specified row/column. For example, a member may not edit information in a particular cell unless that cell lies within both a row and a column that the member has permission to edit. A "View only" option 2360 may be also provided. The "View only" option 2360 may include permissions for viewing board content, writing updates, or any other read-only options. Granular permission assignment 2365 may be used to specify that members can only view rows/columns assigned to them. For example, a member may not view information in a particular cell unless that cell lies within both a row and a column that the member has permission to view. In this way, multiple viewers of the same board may view different information based on the granular permission granted to a specific viewer. Options 2330-2365 are provided by way of example only and are not intended to show an exhaustive list of options available in a common view, such as board permission user interface 2300. Additional options may be added and this disclosure is intended to cover any case where, for example, preset permissions are displayed for easy selection in any context and which may be assigned to a particular cell or a group of cells for any reason. Descriptions 2370 (e.g., previews or tutorials) may be shown in response to a selection of one of the options 2330-2365. For example, as shown, in response to interacting with "Edit everything" option 2330, one exemplary description 2370 may explain what "edit everything" option 2330 entails and provide a preview. Hints 2380 may be displayed to advise on related settings. For example, one exemplary hint 2380 may advise a user that regardless of the changes made in a common view, board permission user interface 2300, owners of the board will retain complete access. Descriptions 2370 and hints 2380 are provided by way of example only and are not intended to show an exhaustive list of hints and descriptions available in a board permission user interface 2300. Hints and descriptions may be added or disabled, and this disclosure is intended to cover any situation where a hint or a description may be displayed in any context for any reason.

Figure 24:
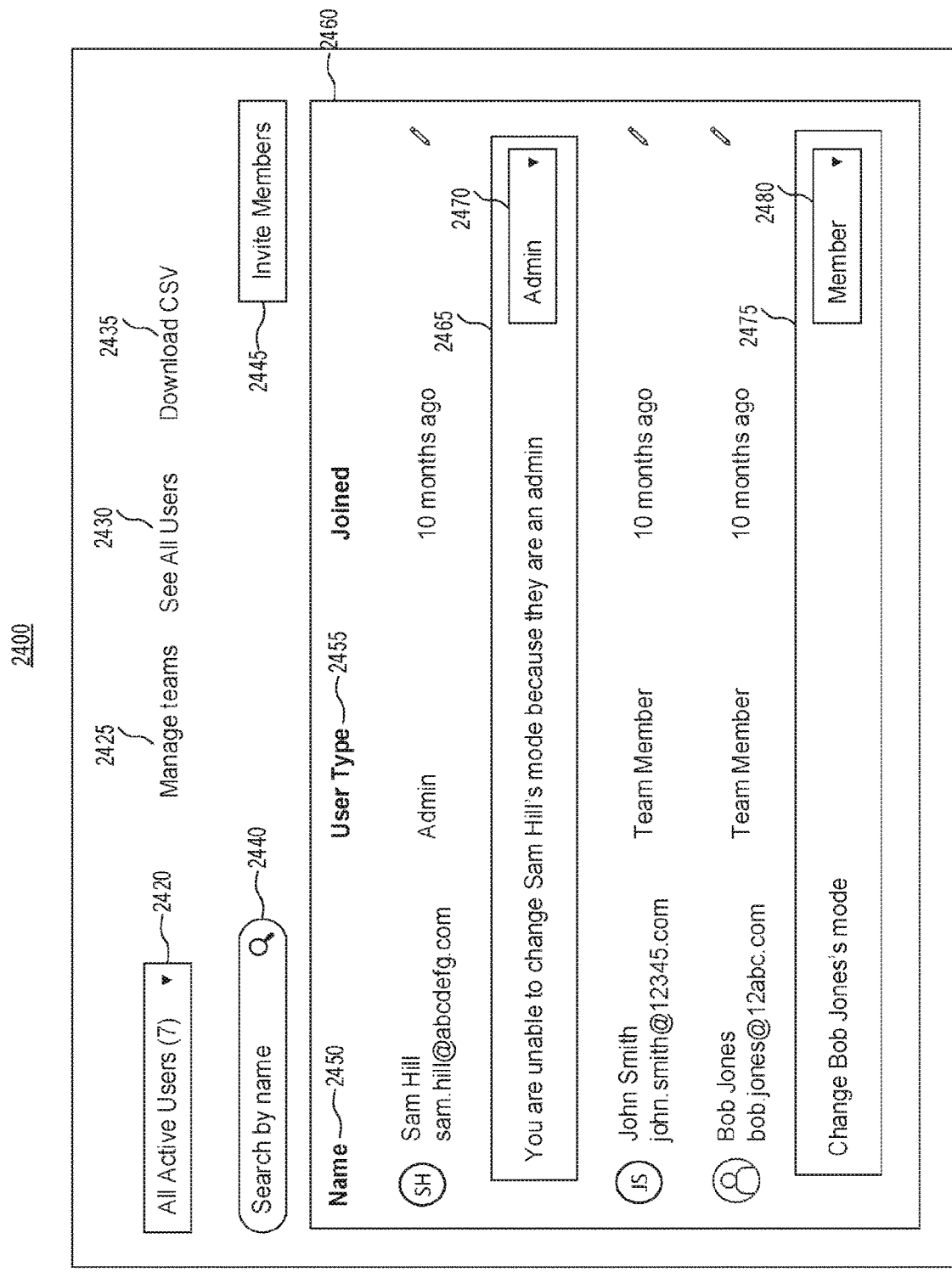
FIG. 24 illustrates an example of a user management interface consistent with some embodiments of the present disclosure.

FIG. 24 illustrates an example of a common view for a user management interface. By way of one example, a user management display 2400 may list available options for managing and assigning roles to all system users. Drop-down menu 2420 may show pre-made lists of users, such as all active users, all admins, all users within a certain domain, all users within a certain team, or any other subset of users who may otherwise be available or subscribed to a particular table. Based on a selection of a list of users in the drop-down menu 2420, different sets of users related to the selected list of users may be displayed in section 2460 of the common view of the user management interface. Subsets of users from the drop-down menu 2120 may be customized by an option for managing teams 2425, where teams may be created, disbanded, or otherwise modified. If a subset of users are selected to filter the individuals, the selections may be cleared with a "See All Users" option 2430. By way of the example, if a filter or selection is set to "all active users" in the drop-down menu 2120, selecting the "See All Users" option 2430 will override the filter and display all active and inactive users. Filtered lists may also be exported from the system in a CSV or any other computer readable format through an export option 2435. A search window 2440 may also be provided for searching particular individuals, groups, or entities. The search window 2440 may enable a search within a subset of users. For example, all user accounts with a Bob label that are active may be displayed by selecting subset of active users in the drop-down menu 2420 and typing "Bob" in the search window 2440. Display section 2460 may include columns identifying the name or label of a user 2450 and a role 2455 assigned to the user 2450. A role assignment may be changed via a drop-down menu such as drop-down menu 2470 or 2480. By way of example, subsection 2465 of the interface shows an admin user account and subsection 2475 of the interface shows a member user account. By way of a few non-limiting examples, a user account attempting to access the user management interface 2400 may lack permissions to remove or otherwise modify permissions for other accounts. In such a situation, the user account may be prompted with a notification that the user accounts lacks the permission to make a modification, as illustrated in subsection 2465 of FIG. 24. Alternatively, if the user account accessing the interface has a proper permission level, a different notification or message may be prompted as illustrated in subsection 2475. Additional functionality may be added, and this disclosure is intended to cover any case where an interactive user management interface is displayed in any context for any reason.

FIG. 25 depicts another example of a common view for a role management user interface 2500. A role management display 2500 may list available options for managing and granting permissions of various roles. By way of example, FIG. 25 only illustrates options for "No one" 2525, "Only admins" 2530, and "Anyone" 2535. This is only intended to illustrate functionality and is not a limiting selection of options for the role management user interface 2500. Similarly, a list of features 2520 is provided by way of example only and does not illustrate an exhaustive list of features. Any other additional features and their permissions may be assigned to the various roles. Additional roles and/or features may be added/created/modified, and this disclosure is intended to cover any case where an interactive role management interface is displayed in any context for any reason. By way of a few non-limiting examples, each role may be configured with various permissions 2540-2575. A permission to upload files 2540 across the system may control whether users assigned to a certain role will be allowed to upload data to the system. Data may include various content that may be used for a variety of reasons, such as user list data or data for adding to a table. In another example, a permission setting 2545 to broadcast boards on the web may control whether users assigned to a certain role will be allowed to share contents of the particular board. Sharing may include sharing data from the particular table to anything external to the particular table such as other tables, social networking sites, emails, blogs, or any other communication or publishing platform.

A set of permission creation options based on a type of table (e.g., a board) 2550-2560 may control whether users assigned to a certain role will be allowed to add various new elements or otherwise access a particular table. For example, if an owner sets a table to be a private board, only the owner may access the table as a default. The owner may grant particular permissions to particular user accounts to access the owner's table. The owner may also reconfigure the owner's table to be a shareable board at a later time to enable other team members to view or otherwise access the owner's table. Various elements may include main boards, shareable boards, private boards, or any other elements of the collaborative system environment. A main board, as used herein, refers to a board that may be visible to anyone who is a team member within one account. A team member can be an admin, a member, or a viewer. Anything created within a main board may be accessible and transparent to all team members. Shareable boards, as used herein, refer to boards that may be shared with outside user accounts such as contractors, clients, freelancers, lawyers, graphic designers, etc. Shareable boards may provide an ability to collaborate on specific projects with outside users without giving them access to other boards and data of the owner. Private boards, as used herein, refer to boards that may only be seen by the board's owner and anyone that s/he invites to the board. Private boards may be useful when a user would like to create a project, to-do list, or plan before presenting it to a team.

Permission settings for creating integrations 2565 may be configured for specific third-party applications, such as third-party application "XXX" 2570 and third party application "YYY" 2575. Permissions for each integration may be configured separately or in bulk. Third-party integrations may involve integrating or otherwise linking various external third-party tools with a particular table of the collaborative work system. Third-party integrations may involve granting access to a third-party application to access data in a particular table. A common view for role management user interface 2500 may control the roles or user accounts that may add an integration to a particular table or across multiple tables. Permission settings for integrations may also specifically restrict certain third-party applications. Additional functionality aside from integration permission settings may be added and this disclosure is intended to cover any situation where an interactive role management interface is displayed in any context for any reason.

Aspects of this disclosure may provide a technical solution to the challenging technical problem of project management and may relate to a system for rendering static and dynamic data in tablature with the system having at least one processor (e.g., processor, processing circuit or other processing structure described herein) in collaborative work systems, including methods, systems, devices, and computer-readable media. For ease of discussion, some examples are described below with reference to methods, systems, devices, and/or computer-readable media, with the understanding that discussions of each apply equally to the others. For example, some aspects of methods may be implemented by a computing device or software running thereon. The computing device may include at least one processor as described herein (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Static data in this disclosure may refer to any data (e.g., any combination of textual, alphanumerical, symbolic, or graphical data) that is not changing, altering, varying, being modified, or transforming during a period (e.g., during when it is being presented). For example, the static data may include any combination of a list, a chart (e.g., a bar chart, a pie chart, or a line chart), a symbol, a picture, a number, a timeline, a word, a word cloud, a calendar, an report, or an information feed. Dynamic data in this disclosure may refer to any data (e.g., any combination of textual, alphanumerical, symbolic, or graphical data) that changes, is altered, varies, is modified, or transforms in any manner of not being static during a period (e.g., during a period when it is being presented). For example, the dynamic data may include any combination of an animation, a graphic interchange format (GIF) picture, a CSS animation, a video clip, a film, a cartoon, an animated sticker, an animated emoji, an animated icon, or a special effect of a text, symbol, or picture. Some portion of the dynamic data may remain static, while other portions may change. For example, an animation may have a static background with a dynamic foreground, or vice versa. Thus, in some embodiments, the dynamic data may be contained in a foreground (e.g., configured to be capable of overlaying static data or other dynamic data) or a background (e.g., configured to be capable of being overlaid by static data or other dynamic data) of the cell.

Tablature as used herein refers to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays.

By way of one example, the collaborative work system may utilize workflow management software that enables members of a team to cooperate via a common online platform (e.g., a website). Aspects of this disclosure may display a table with items on a screen of a computing device. A table may be presented, for example, via a display screen associated with a computing device such as a PC, laptop, tablet, projector, cell phone, or personal wearable device. A table may also be presented virtually through AR or VR glasses, or through a holographic display. Other mechanism of presenting may also be used to enable a user to visually comprehend presented information. Aspects of this disclosure may enable a user (e.g., an individual operating the computing device) to present a table containing first cells enabled to contain static data and second cells enabled to contain dynamic data, provide access to a menu of values for inclusion in the second cells, enable selection of a dynamic data value to specify an associated selectable animation for inclusion in the second cells, and cause the associated selectable animation in the second cells to dynamically display while the first cells display static data.

Aspects of this disclosure may enable presenting dynamic data (e.g., animations) in a table (e.g., in a cell of a table) under user's configuration. For example, a cell may be animated when a user selects a specific animation from a menu associated with the cell. By doing so, the table may provide a technical solution of enhancing displaying more important data in the table, assisting workflow management and content focus for the user, increasing beauty and attractiveness of the table during presentation (e.g., in a report meeting), and improve overall user experience of the table. For example, animating a cell showing a milestone status (e.g., "done") associated with a task may be used as a celebrating trophy awarded to an individual that performs the task, such that the morale of the individual or the individual's team may be raised.

Consistent with disclosed embodiments, at least one processor may carry out operations that may involve outputting a signal for rendering a table containing a plurality of cells. At least a first cell may be enabled to contain static data, and at least a second cell may be enabled to contain dynamic data. Outputting a signal may involve transmitting a signal via a processor, such that the signal is configured to cause a table to be rendered on a display. Rendering in this context refers to transforming code into visual representations for display. For example, a table may be displayed on a screen of a computing device as described above. By way of example, the system may present the object on a screen of the computing device 100 in FIG. 1.

A table in this disclosure includes those items described earlier in connection with the tablature, and may include a form, a sheet, a grid, a list, or any data presentation in horizontal and vertical dimensions (e.g., horizontal rows and vertical columns, horizontal rows and vertical rows, or horizontal columns and vertical columns). The table may be presented on a screen of a computing device as described above. A cell of the table in this disclosure may refer to a unit of the table for storing or presenting data. For example, if the table is two-dimensional (e.g., having one or more rows and one or more columns), a cell may be a unit at an intersection of a row and a column. The "first" cell and "second cell," as used herein, may refer to two different units and does not refer or imply any particular placement or order of the two.

Figure 26:
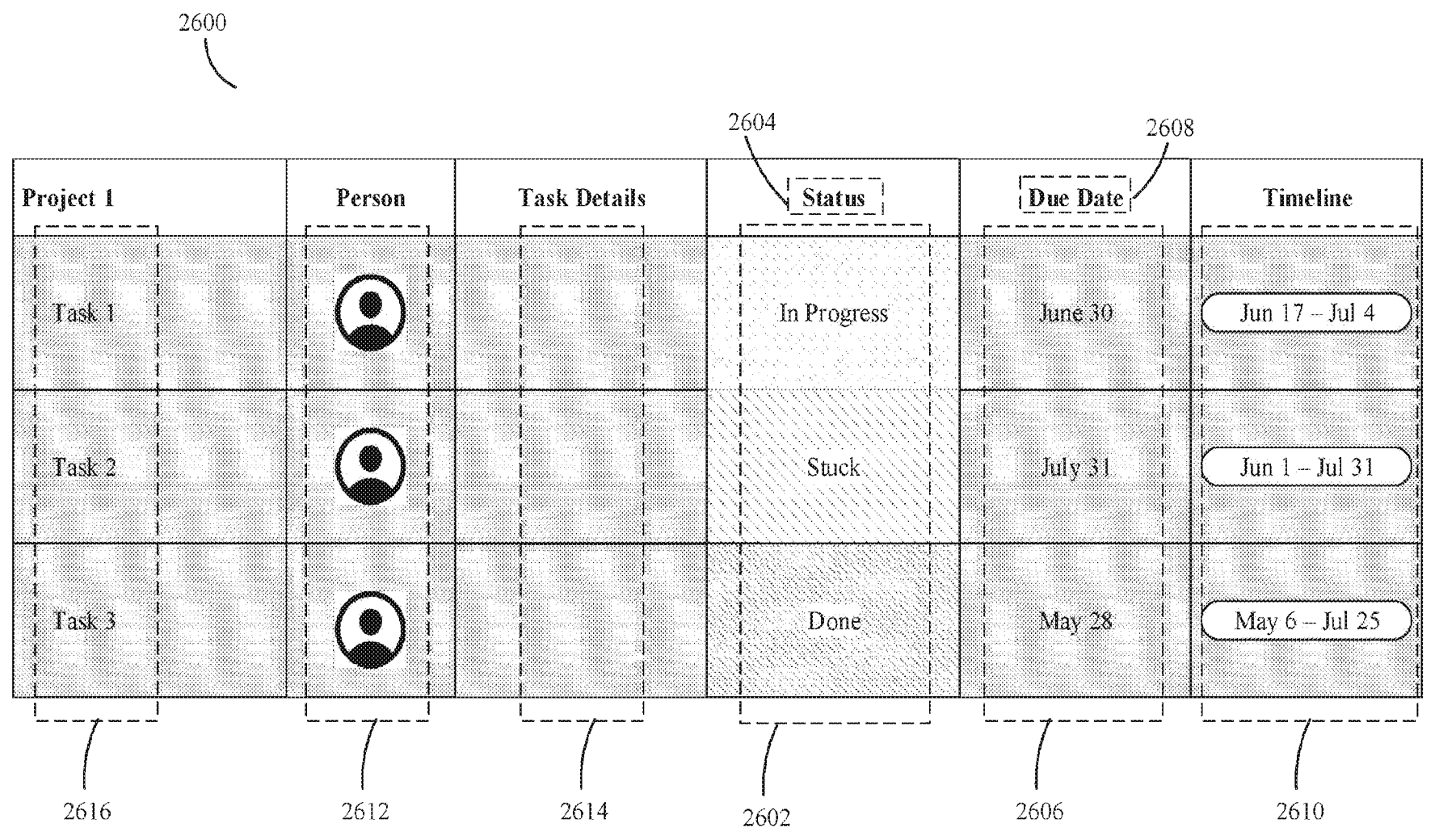

By way of example, FIG. 26 illustrates an example table 2600 that may include multiple columns and rows, consistent with embodiments of the present disclosure. In some embodiments, the table 2600 may be displayed using a computing device (e.g., the computing device 100 illustrated in FIG. 1) or software running thereon. The table 2600 may be associated with a project (i.e., "Project 1") for display and may include, in the multiple rows and columns, tasks (e.g., in rows including "Task 1," Task 2," or "Task 3") included in the project, wherein each task includes indications of persons (e.g., in a column 2612) assigned to the task, details (e.g., in a column 2614) of the task, a status (e.g., in a column 2602) of the task, a due date (e.g., in a column 2606) of the task, a timeline (e.g., in a column 2610) of the task, or any information, characteristic, or associated entity of the project.

A task, as used herein, may refer to a part or a portion of a project, or more generally, any item that may be tracked. A task may be performed by an entity (e.g., a person or multiple persons). In some embodiments, a task may be represented by a row of cells in a task table. In some embodiments, a task may be represented by a column of cells in a task table. An entity, as used herein, may refer to an individual, a team, a group, a department, a division, a subsidiary, a company, a contractor, an agent or representative, or any independent, distinct organization (e.g., a business or a government unit) that has an identity separate from those of its members. For example, an entity may include any indication of any person in the column 2612.

Any column of the table may display cells of a single datatype or of multiple datatypes. A single datatype column may be one where all cells are uniform in at least one aspect or characteristic. The characteristic may be numeric values only, characters only, alphanumeric values, graphic elements only, closed lists of elements, single formatting, a specific value range, or any constraint on the format or type of column data. In some embodiments, a first column may be at least a portion of a single datatype (e.g., texts) column-oriented data structure. A single datatype column-oriented data structure may be a digital data structure of a table that includes columns where all cells of the columns may be programmed to include a single category of data.

In FIG. 26, the table 2600 includes a first column 2602 that has a first column heading 2604 ("Status") and a second column 2606 that has a second column heading 2608 ("Due Date"). A column heading may be associated with a column within a table. The column heading may be default text or may be customized by a user. For example, the first column 2602 may be a status column type of table 2600. Other columns with other characteristics in FIG. 26 may include a due date column type (including a second column 2606), a timeline column type (including the column 2610), a person column type (including the column 2612), and text column types such as the columns 2614 and 2616.

In FIG. 26, a first column 2602 may include three rows, each row including one or more words indicative of a status of each task of the project. A second column 2606 may include three rows, each row including a date indicative of a due date of each task of the project. In some embodiments, the computing device that implements the method may enable a user to select the second column heading in the table or through a user interface such as a column store in a manner similar to that of enabling the user to select the first column heading in the table as described above.

At least one processor of the system may maintain a plurality of task tables (including the table 2600) for a plurality of entities. The table 2600 contains a plurality of tasks (including "Task 1," Task 2," and "Task 3"), and each task may be defined by a row of cells in the table 2600.

The table 2600 includes a presentation of a plurality of cells. In some embodiments, all of the cells of the table 2600 may present static data. In some embodiments, at least a first cell of the table 2600 may contain dynamic data, and at least a second cell of the table 2600 may contain dynamic data. The first cell and the second cell can be any two different cells in the table 2600.

In some embodiments, the dynamic data may be stored in a memory. The memory may be on a computing device or any other user device that may be accessing the collaborative work system. The memory may also be stored in remote servers that may be accessed through a network.

By way of example, the memory may include memory 120 in FIG. 1. In some embodiments, the memory may be associated with a remote server (e.g., a remote repository or database server). The memory may be a non-transitory storage medium in any of repository 230-1 to 230-n in FIG. 2. In some embodiments, the memory may be associated with a local server on a computing device. By way of example, such memory may include memory 120 in FIG. 1 in the computing device 100 of the computing architecture 200 in FIG. 2.

Some disclosed embodiments may involve providing access to a menu of values for inclusion in at least the second cell. The menu of values may identify dynamic data values associated with selectable animations. Providing access to a menu (e.g., a digital data object), as used herein, may refer to any means for the system to offer, supply, furnish, or perform any action to enable access to the object. A menu in this disclosure may include any form of a list, a collection, a set, or a group of selectable elements (e.g., options, commands, or data objects). A menu of values in this disclosure may refer to a menu that presents available values as a default or as defined by a user. A value may refer to any combination of textual, alphanumerical, symbolic, or graphical data. Inclusion of an object (e.g., a digital data object) in a cell, as used herein, may refer to any means for the system to input, insert, add, append, or assign the object (e.g., a number or a text) to the cell. Identifying an object (e.g., a digital data object), as used herein, may refer to any means for recognizing, indicating, presenting, or signaling the object. "Associated" data values as used herein, may refer to processes or procedures of establishing a relationship or connection between a plurality of objects. The relationship or connection may be implemented as a data structure stored in a memory. For example, if the plurality of objects are data objects stored in the memory, associating them may be implemented as processes or procedures to link them or represent them using a data structure (e.g., members of a single class). In some embodiments, at least one of the plurality of data objects may store an indicator (e.g., a flag or a pointer) for representing one or more data objects with which they are associated.

A dynamic data value in this disclosure may refer to a value associated with the dynamic data as described herein. An animation in this disclosure may refer to combination of textual, alphanumerical, symbolic, or graphical data in which elements in such data move. A selectable animation in this disclosure may refer to an animation that that is enabled to be chosen by a user. A dynamic data value associated with a selectable animation, as used herein, may include any dynamic data value (e.g., a selectable menu item) that, if selected by a user, may cause a selection of the selectable animation.

Figure 27:
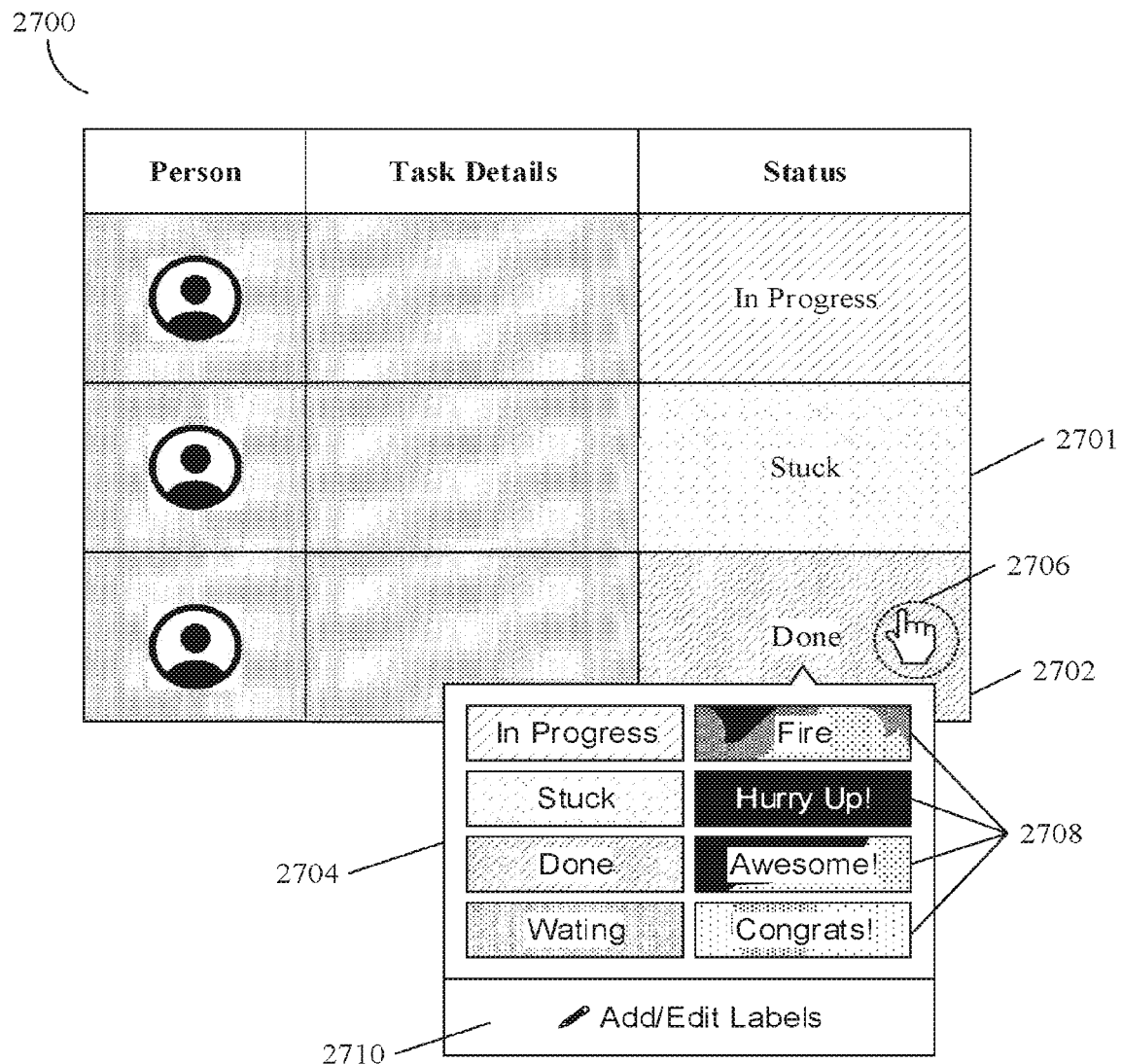
FIG. 27 illustrates an example of a menu of values for inclusion in a cell of a table, consistent with some embodiments of the present disclosure.

By way of example, FIG. 27 illustrates an example of a menu 2704 of values for inclusion in a cell 2702 of the table 2600, consistent with embodiments of the present disclosure. FIG. 27 shows a portion of the table 2600 in FIG. 1, which includes a cell 2702 in a first column 2602. The cell 2702 shows a status value of "Done" and is associated with Task 3 in the table 2600. In FIG. 27, all the illustrated cells in the table 2600 contain static data, such as avatars representing persons, texts representing task details, and status values (e.g., words) representing progress of the tasks.

A status value of a task in this disclosure may include a value indicative of a progress or status of the task. For example, the status may be "done," "in progress," "stuck," "waiting," "delayed," or any combination of textual, alphanumerical, symbolic, or graphical representation. A status value of "done" may include any indication of a progress or status of the task to indicate the task is completed, such as labels that are alphanumeric, graphical, or a combination. "Done" status values may include similar alphanumeric labels such as "Completed," "Finished," "Accomplished," or any other customized text that indicates that the progress of a task has concluded. Similar graphical indications may include examples such as a representation of a check sign, a green traffic light, an "0" mark, or any other indication that a task progress may be completed.

In some embodiments, all the illustrated cells in the table 2700 are enabled to contain static data or dynamic data. For example, in FIG. 27, the cell 2701 contains static data, the status value "Stuck," and cell 2702 contains static data, the status value "Done," which may also be enabled to contain dynamic data (e.g., an animation). As an example, the second cell enabled to contain dynamic data may include the cell 2702.

An interactive element in this disclosure may refer to any element in a user interface, which may be interacted with through a mouse cursor, a touchable area (as on a touchscreen our touchpad), eye movement (such as with eye trackers), a gesture (such as may be detected by a camera), an application program interface (API) that receives a keyboard input, or any hardware or software component that may receive user inputs. A user interface in this disclosure may be a web page, a mobile-application interface, a software interface, or any graphical user interface (GUI) that enables interactions between a human and a machine via the interactive element. Activating a user interface (e.g., a menu), as used herein, may include any process or procedure to cause the system to display, show, or any perform any action to engage the user interface. For example, the user interface may be activated from a cell, board, workplace, account, or any other level of access. Updating a presentation of an object (e.g., a cell), as used herein, may refer to any procedure or process of changing a visual presentation form of the object. The procedures or processes for updating the presentation may involve, for example, any combination of modification, addition, or removal operated on a color, a font, a typeface, a shape, a size, a column-row arrangement, or any visual effect of a visible object in the table. The visible object may include a cell border line, a cell background color, a cell foreground element (e.g., a text, a symbol, a number, or a picture), or any cell elements, and may further include a number, a text, a symbol, a mark, a character, a date, a time, an icon, an avatar, a hyperlink, a picture, a video, an animation, or any visible item included in any table element.

As illustrated in FIG. 27, the system provides access to the menu 2704 that includes values for inclusion in at least the second cell (e.g., the cell 2702). The menu 2704 may be associated with the cell 2702. The values for inclusion in the menu 2704 may include one or more interactive elements for updating the presentation of the cell 2702.

By way of example, the menu 2704 may be a user interface, and the interactive elements in the menu 2704 includes multiple buttons, including the button with labels "In Progress," "Stuck," "Done," "Waiting," "Fire," "Hurry Up!," "Awesome!," and "Congrats!." For example, if a user selects (e.g., by clicking a mouse button or tapping or gesturing on a touchscreen) one of the above-described buttons in the menu 2704, the system may update the presentation of the cell 2702 to be a new presentation associated with the selected button. As an example, if the user selects the button with the label "Stuck," the system may update the status value "Done" in the cell 2702 with a status value "Stuck" and update the background (e.g., a cross-shape pattern) of the cell 2702 with a new background (e.g., a backslash-type pattern) associated with the selected button.

The menu 2704 includes dynamic data values associated with selectable animations. For example, the dynamic data values may include the buttons with labels "Fire," "Hurry Up!," "Awesome!," and "Congrats!," which are associated with animations 2708. Animations 2708 has a dynamic background (e.g., a GIF dynamic picture or a video clip) and a textual foreground. For example, the button with the label "Fire" in the animations 2708 has a dynamic background showing a burning flame and a textual foreground of the word "Fire." In some embodiments, the textual foreground, such as the word "Fire," may also be dynamic in addition to the background being dynamic. In some embodiments, the system may activate the menu 2704 by receiving data representing that a cursor 2706 is hovering over the cell 2702 and clicks the cell 2702.

Disclosed embodiments may involve enabling selection of a dynamic data value to specify an associated selectable animation for inclusion in the second cell. Specifying an object (e.g., a digital data object), as used herein, may refer to any processes or procedures for identifying, designating, or particularizing the object in any explicit, clear, and definite manner. This may include, for example, presenting a pick list or other menu of dynamic data values to a user (e.g., designations of animations) so that the user may choose a particular animation for inclusion in a cell.

In some embodiments, the associated selectable animation includes moving graphics. A moving graphic in this disclosure may include any graphic or picture that has a moving element when being presented. For example, the moving graphic may be dynamic data and include an animation, a GIF picture, a video clip, a film, a cartoon, an animated sticker, an animated emoji, or an animated icon. In some embodiments, the system may display the moving graphic in a loop (e.g., automatically restarting the displaying of its animation when the animation ends). In some embodiments, the system may stop playing the moving graphic when its animation ends. In some embodiments, the system may stop playing the moving graphic and only display its first frame in a static state, and provide an interactive element (e.g., a button) for starting the playing the moving graphic.

By way of example, as illustrated in FIG. 27, the system enable selection of a dynamic data value (e.g., the button with label "Congrats!") to specify an associated selectable animation (e.g., a moving graphic in the button with the label "Congrats!" as one of the animations 2708) for inclusion in the second cell (e.g., the cell 2702). For example, the system may enable a user to move the cursor 2706 over the button with the label "Congrats!" and click it as a manner of selection.

In some embodiments, the associated selectable animation is dynamic custom text. A dynamic custom text in this disclosure may include any text that is customizable and is changing, altering, varying, being modified, transforming or in any manner of not being static during a period (e.g., during a period when it is presented). For example, the dynamic custom text may include a special effect (e.g., a wobbling or vibrating effect) of text (e.g., the label "Congrats!" in FIG. 27) or symbol that is customizable by a user. A dynamic custom graphic may include a predefined animation, with definable words. For example, a dynamic graphic may include images of rising balloons, and the user may be enabled to specify the word, "Congratulations!" to be presented either statically or dynamically in the foreground. In some embodiments, the associated selectable animation may be a custom graphic. A custom graphic in this disclosure may include any graphic that is customizable, such as enabling movement. For example, a user might select or input a static image of a car, which may be customizable to cause the car to move across a cell in a quasi-animated manner. Alternatively, the custom graphic may include a moving graphic that is customizable by a user. Both custom text and custom graphics for either static or dynamic display may be stored in memory as described above, and may be predefined in a movable manner (e.g., a GIF) and a user might customize it through selection of a duration of play, speed of play, or in any other manner.

In some embodiments, the dynamic custom text may be based on an input. The input may be enabled to cause an update to the menu of values for inclusion in the plurality of cells. For example, the menu of available values may be stored in memory, and an addition of a custom text may be added to the menu of available values in memory such that the system may access this menu for presentation on a computing or other user device. In some embodiments, the custom graphic may be based on an input. The input may enable an update to the menu of values for inclusion in the plurality of cells. For example, the input may be provided by a user and received by a user interface (e.g., a pop-up window, a webpage, or a drop-down menu) of the system. Based on the input, the system may determine the dynamic custom text or the custom graphic, and further update the presentation of the menu of values.

In some embodiments, the system may enable customizing the associated selectable animation (e.g., the dynamic custom text or the custom graphic). For example, the system may provide a user interface to change a size (e.g., to expand or to shrink) or a shape (e.g., a circle, a rectangular, a square, or any shape) of the associated selectable animation. In another example, the system may provide a user interface to flip, rotate, skew, mirror, crop, or repeat the associated selectable animation. It should be noted that the system may provide the user interface to perform any action to change the size, shape, color, or any other characteristic or feature of the associated selectable animation, and is not limited to the examples as described herein.

By way of example, as illustrated in FIG. 27, the menu 2704 includes an interactive element 27010 (e.g., a button or a hyperlink) having a label "Add/Edit Labels." If a user moves cursor 2706 over the interactive element 27010 and clicks it, the system may activate a new user interface for updating the menu 2704.

Figure 28:
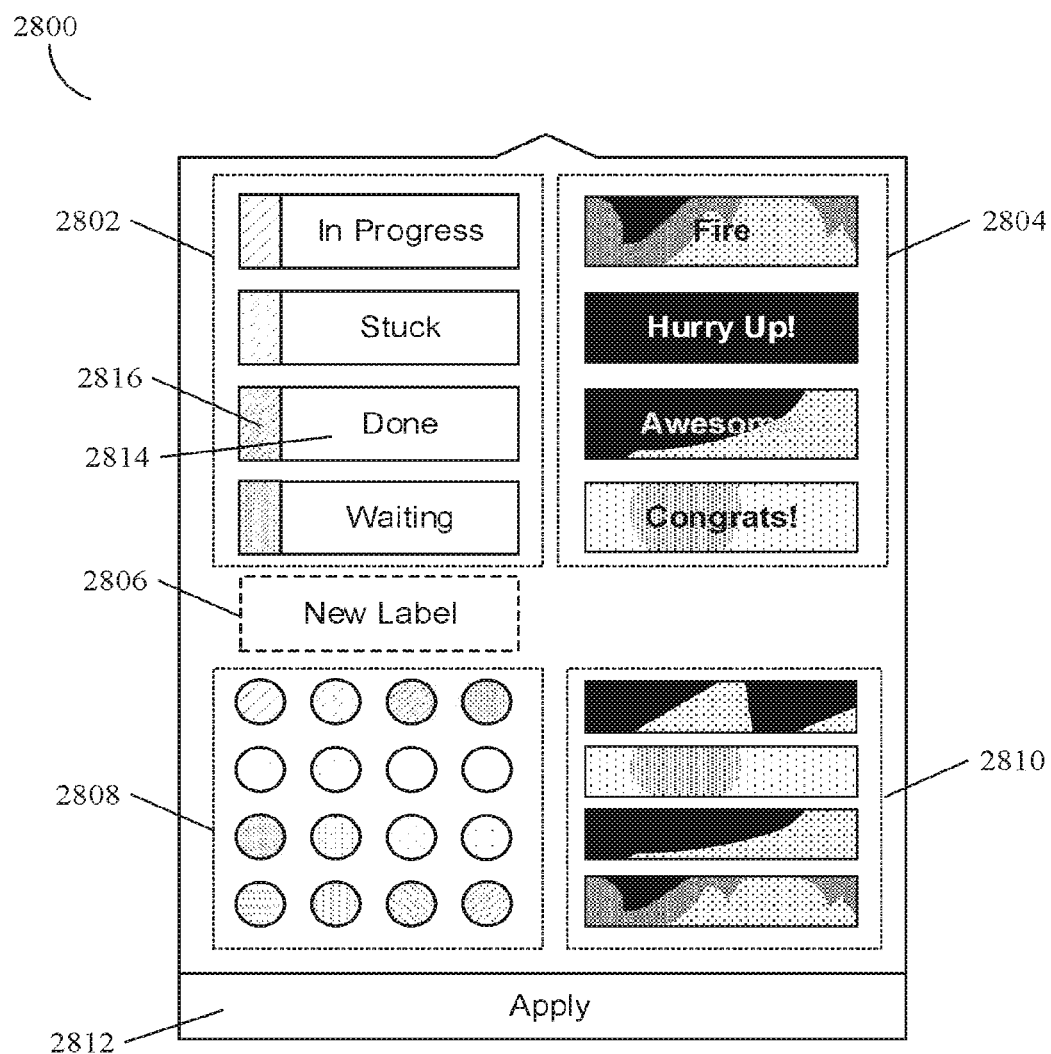
FIG. 28 illustrates an example of a user interface for updating the menu in FIG. 27, consistent with some embodiments of the present disclosure.

FIG. 28 illustrates an example of a user interface 2800 for updating the menu 2704 in FIG. 27, consistent with embodiments of the present disclosure. For example, the user interface 2800 may be a pop-up menu activated by the system after a user moves cursor 2706 over the interactive element 27010 and clicks it or performs any other interaction such as a continued cursor hover. The user interface 2800 includes multiple interactive elements, including interactive elements 2802 (e.g., buttons or hyperlinks) associated with static data (e.g., labels representing status values of "In Progress," "Stuck," "Done," and "Waiting,"), and interactive elements 2804 (e.g., buttons or hyperlinks) associated with dynamic data (e.g., labels "Fire," "Hurry Up!," "Awesome!," and "Congrats!"). The interactive elements 2802 and 2804 may correspond to the buttons in the menu 2704. The user interface 2800 also includes an interactive element 2806 (e.g., a button or a hyperlink) with a label "New Label" for creating a new value (e.g., a value in the menu 2704) for inclusion in a cell (e.g., the cell 2702 in FIG. 27). The user interface 2800 further includes multiple interactive elements 2808 (e.g., buttons or hyperlinks) for selecting colors or patters as backgrounds of a cell (e.g., the cell 2702). The user interface 2800 further includes multiple interactive elements 2810 (e.g., buttons or hyperlinks) for selecting moving graphics as backgrounds of a cell (e.g., the cell 2702). The user interface 2800 further includes an interactive element 2812 (e.g., a button or a hyperlink) with a label "Apply" for committing any of the above-described operations and cause an update to the menu 2704.

In an example, a user may modify a value (e.g., the button with label "Done") in the menu 2704 by selecting (e.g., by clicking or tapping) a corresponding one of the interactive elements 2802 (e.g., a button with a label "Done"). If the user selects an input field 2814, the input field 2814 may become editable, and the user may add, delete, or revise any text (e.g., "Done") inside the input field 2814. For example, the user may revise the text "Done" to be "Completed." If the user selects a background edit field 2816, the background field 2816 may become editable (e.g., by popping up a list of colors or patterns for selection, or enable selecting colors or patterns from interactive elements 2808), and the user may change or remove any color or pattern inside the background edit field 2816. After that, the user may click the interactive element 2812 for committing the above-described changes. For example, after clicking the interactive element 2812, the system may update the button with the label "Done" in the menu 2704 to be a button with a label "Completed" with a new color or pattern as its background.

As another example, the user may modify a selectable animation (e.g., the button with label "Fire") in the menu 2704, which includes a dynamic custom text, by selecting (e.g., by clicking or tapping) a corresponding one of the interactive elements 2804 (e.g., a button with a label "Fire"). If the user selects the interactive element with the label "Fire" in the interactive elements 2804, the interactive element may become editable, and the user may add, delete, or revise any text (e.g., "Fire") inside the interactive element. For example, the user may revise the text "Fire" to be "Water." As a result of the text change, the system may perform a look up in a memory and may enable the user to select a new moving graphic for the background of the new text "Water" with associated animations of water. For example, the system may enable the user to select the new moving graphic from the interactive elements 2810. After that, the user may click the interactive element 2812 for committing the above-described changes. For example, after clicking the interactive element 2812, the system may update the button with the label "Fire" in the menu 2704 to be a button with a label "Water" with a new moving graphic as its background.

In yet another example, the user may create a selectable animation in the menu 2704, which includes a custom graphic, by selecting (e.g., by clicking or tapping) the interactive element 2806. If the user selects the interactive element 2806, the interactive element 2806 may become editable, and the user may add, delete, or revise any text (e.g., "Fire") inside the interactive element 2806. For example, the user may leave the text empty inside the interactive element 2806. Also, the system may enable the user to select a moving graphic as a background for the interactive element 2806. For example, the system may enable the user to select the moving graphic from the interactive elements 2810. After that, the user may click the interactive element 2812 for committing the above-described changes. After clicking the interactive element 2812, for example, the system may add a button with the selected moving graphic into the menu 2704 as a new button with no label.

In some embodiments, the user interface 2800 may enable modifying or creating any value or selectable animation in the menu 2704 using elements outside of those provided in the interactive elements 2808 or 2810. For example, the user interface 2800 may allow a user to define any color or pattern, or input (e.g., by uploading) any static picture or moving graphic (e.g., a GIF animated picture or a video clip). In another example, the user interface 2800 may retrieve, automatically or under an instruction received from a user, any color, pattern, static picture, or moving graphic from an external source (e.g., a website, an email, or a database). As another example, the user interface 2800 may also provide an option for the user to fuse, combine, or remix the available resources (e.g., uploaded or retrieved) to recreate a new color, pattern, static picture, or moving graphic.

Consistent with disclosed embodiments, at least one processor of the system may carry out operations that may involve causing the associated selectable animation in the second cell to dynamically display while the first cell displays static data. Causing a display may involve outputting a single that results in the occurrence of visual information either on a physical or virtual display. Displaying, as used herein, may refer to presenting a visual representation, or changing or adding a visual effect of a visual object. The visual effect may include a change in a color, a font, a typeface, a shape, a size, a column-row arrangement, or any characteristic in visual presentation. The visual object may include a table cell, a table border line, a table header, or any table elements, and may further include a number, a text, a symbol, a mark, a character, a date, a time, an icon, an avatar, a hyperlink, a picture, a video, an animation, or any visible item. "Dynamically displaying" in this disclosure may refer to displaying in a manner where visibly perceptible changes occurs during display (e.g., animations, movement, etc.).

Figure 29:
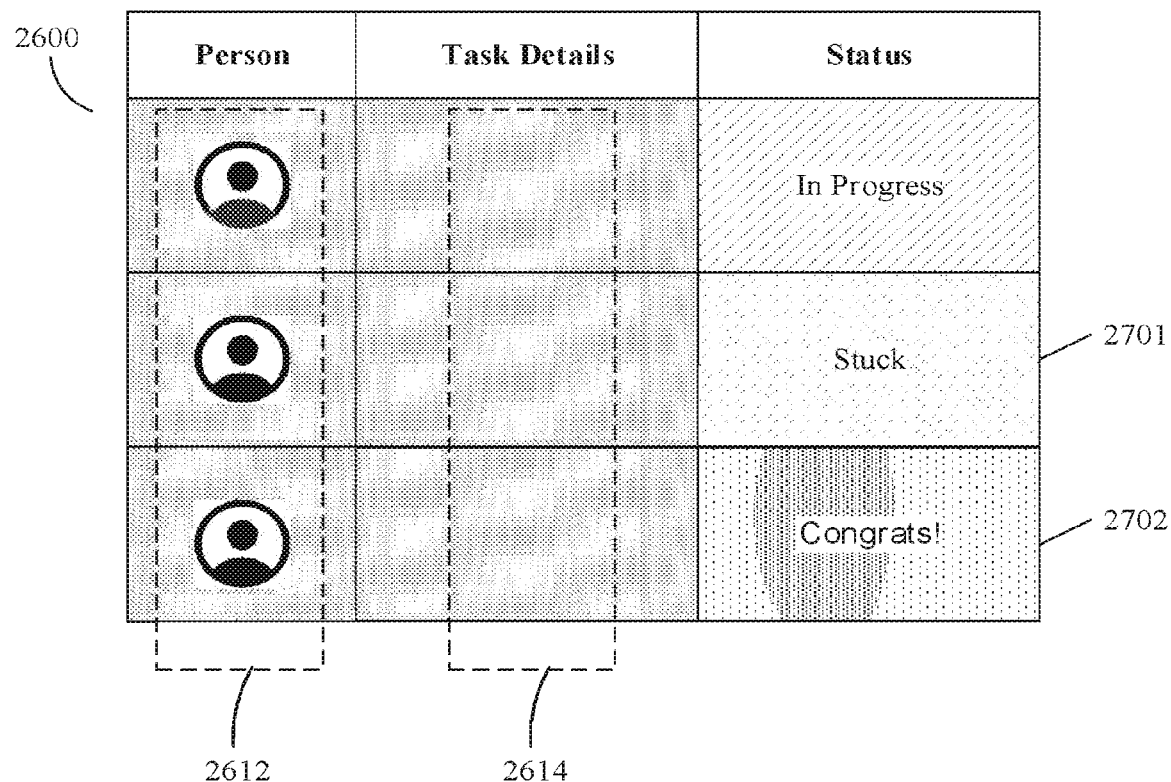
FIG. 29 illustrates an example of a table having a cell displaying dynamic data, consistent with some embodiments of the present disclosure.

By way of example, with reference to FIG. 27, a second cell may include the cell 2702, and the first cell may include cells in the table 2600 other than the cell 2702. If the user moves the cursor 2706 over the button with the label "Congrats!" and selects it by clicking the button, the system may cause the associated selectable animation (e.g., the animation in the button with the label "Congrats!" as one of the animations 2708) in the cell 2702 to dynamically display while the first cells display static data (e.g., avatars representing persons, texts representing task details, and status values representing progresses of the tasks). By way of example, FIG. 28 illustrates an example of the table 2600 having the cell 2702 displaying dynamic data, consistent with embodiments of the present disclosure. As illustrated in FIG. 29, after the user selects the button with the label "Congrats!" in FIG. 27, the cell 2702 in FIG. 29 displays the associated selectable animation in the cell 2702 while the first cells (e.g., the cells in the columns 2612 and 2614) display the static data.

In some embodiments, the second cell used for dynamic display may be enabled to simultaneously display static data together with dynamic data. By way of example, as illustrated in FIG. 29, the second cell may include the cell 2702, the static data may be the text "Congrats!," and the dynamic data may be the moving graphic in the background of the text "Congrats!." Alternatively, the static data may be the background of the text while the dynamic data may be the text "Congrats!" of cell 2702. In FIG. 29, the system may enable the cell 2702 to simultaneously display the static data together with the dynamic data. Consistent with embodiments of the disclosure, cell 2702 may display dynamically adjacent other cells displaying static data, such as cell 2701 or other cells from other vertical rows 2612 and 2614.

In typical spreadsheets, for example, all data is static. Static columns of numbers or text may be displayed adjacent other static columns of numbers or text. In contrast, in some embodiments herein, static cells of text, numbers, or graphical information may be displayed alongside cells containing dynamic information. The dynamic motion may be confined to or associated with only a dynamic cell, while an adjacent cell remains unchanged. In this way, for example, a first cell may display static information that a goal was reached, and a second associated dynamic cell may display animated information such as fireworks and the flashing word "congrats!"

Figure 30:
FIG. 30 illustrates an example of a table having a cell simultaneously displaying static data together with dynamic data, consistent with some embodiments of the present disclosure.

In some embodiments, when the second cell is enabled to simultaneously display the static data together with the dynamic data, the associated selectable animation may be dynamically displayed adjacent a display of the static data in the second cell. By way of example, FIG. 30 illustrates an example of the table 2600 having the cell 2702 simultaneously displaying static data together with dynamic data, consistent with embodiments of the present disclosure. In FIG. 30, the second cell may include the cell 2702, the static data may be the text "Done" in the cell 2702, and the dynamic data may be an associated selectable animation 3002 that includes a moving graphic in the background of the text "Congrats!." Selectable animation 3002 may appear as an individual option, or may also appear in any other format such as a selectable animation in a comment, a message in a conversation thread, as an animation in a list, or any other additional display of information. As illustrated in FIG. 30, the associated selectable animation 3002 is dynamically displayed adjacent a display of the static data (e.g., the text "Done") in the cell 2702. In other exemplary embodiments, when selectable animation 3002 is adopted for cell 2702, cell 2702 could incorporate the selected animation 3002 within the cell next to the previously incorporated static data (e.g., the text "Done") to contain both static and dynamic displays of information.

In some embodiments, when the associated selectable animation is dynamically displayed adjacent the display of the static data in the second cell, the dynamic display of the associated selectable animation in the second cell may be enabled via an action. The action may be any action operating on or interacting with the second cell. For example, the action may be a user action such as a cursor selection, a cursor gesture, a gesture, selection via eye tracking, a keystroke, a cursor hover, or any other interaction with an interface.

By way of example, as shown in FIG. 30, initially, the associated selectable animation 3002 may be hidden from the display of the table 2600. When a user hovers the cursor 2706 over the cell 2702, the system may enable the dynamic display of the associated selectable animation 3002 in the cell 2702 adjacent the display of the static data (e.g., the text "Done") in the cell 2702. It should be noted that the action may include any combination of any actions, such as a click on the second cell, a tap on the second cell, or a specific cursor gesture or path over the second cell, and this disclosure does not limit the action to the example embodiments described herein.

Consistent with disclosed embodiments, the at least one processor of the system may further carry out operations that may involve enabling customization of a plurality of cells in differing rows or columns to include the dynamic data. The table may include a plurality of second cells enabled to contain the dynamic data. Such second cells may be in differing rows or columns, and may include any datatype (e.g., a status, a person, a task description, a timeline, a due date, a country, a location, a clock, an email address, a timestamp, a tag, a ile, a number, or any other information). Customization, as used herein, may refer to an ability to create, change, modify, or take any action of altering information. The system may enable customizing a plurality of cells in the table to be the plurality of second cells.

Consistent with disclosed embodiments, the at least one processor of the system may further carry out operations that may enable selective inclusion of static data in some of the plurality of cells and selective inclusion of dynamic data in others of the plurality of cells. Selective inclusion of data (e.g., an object such as a digital object), as used herein, may involve inclusion of information in a discriminating manner. For example, a user may be presented with choices of information to include in specific cells of a table. The table may include a plurality of first cells enabled to contain the static data and a plurality of second cells enabled to contain the dynamic data. Such first cells and second cells may be in differing rows or columns, and may include any datatype (e.g., a status, a person, a task description, a timeline, a due date, a country, a location, a clock, an email address, a timestamp, a tag, a file, a number, or any other information). The system may enable customizing a plurality of cells in the table to be the first cells and the second cells. Some of the plurality of cells (e.g., the first cells) may be selectively enabled to include the static data, and others of the plurality of cells (e.g., the second cells) may be selectively enabled to include the dynamic data.

Consistent with disclosed embodiments, the at least one processor of the system may further carry out operations that may involve enabling designating a column or row as accepting either dynamic data or static data. Designating a column or row as used herein, may refer to any process or procedure of choosing, selecting, determining, indicating, specifying, marking, or signaling the object. Enabling such activity may involve presenting a user interface where choices may be made by a user. Accepting data, as used herein, may refer to receiving, taking in, admitting, gaining, acquiring, retrieving, obtaining, reading, accessing, collecting, or any operation for inputting data.

By way of example, as illustrated and described in association with FIGS. 26 to 30, the system may enable designating the first column 2602 as accepting either dynamic data (e.g., the associated selectable animation 3002 in FIG. 30) or static data (e.g., the text "Done" in the cell 2702).

Figure 31:
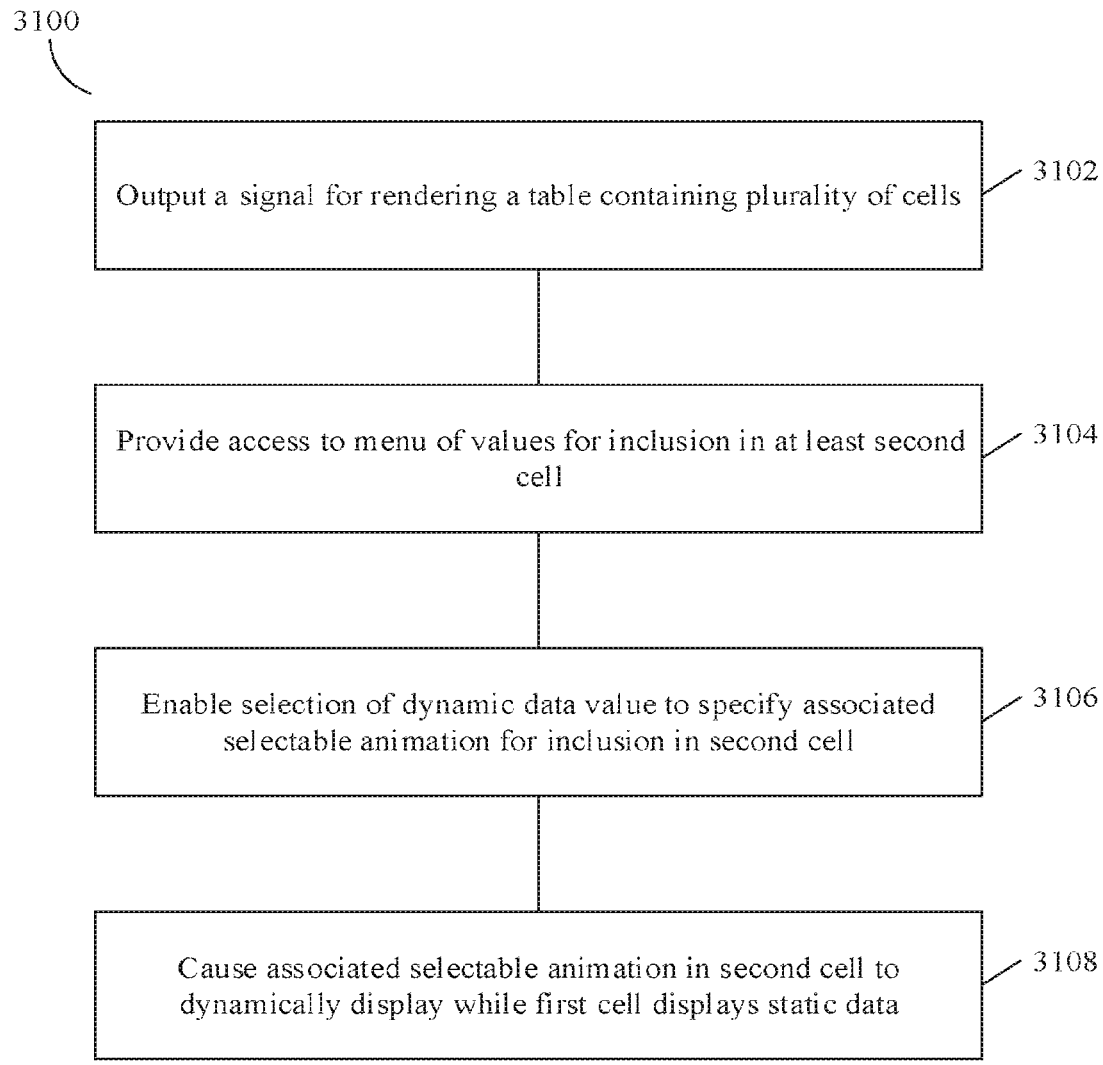
FIG. 31 is a block diagram of an example process for rendering static and dynamic data in tablature, consistent with some embodiments of the present disclosure.

FIG. 31 illustrates a block diagram of an example process 3100 for enabling display of static and dynamic data in tablature, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 3100 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 26 to 30 by way of example. In some embodiments, some aspects of the process 3100 may be implemented as software (e.g., program codes or instructions) that are stored in a memory (e.g., the memory portion 122 in FIG. 1) or a non-transitory computer-readable medium. In some embodiments, some aspects of the process 3100 may be implemented as hardware (e.g., a specific-purpose circuit). In some embodiments, the process 3100 may be implemented as a combination of software and hardware.

FIG. 31 includes process blocks 3102 to 3108. At block 3102, a table may be presented containing a plurality of cells. The presentation may occur on a real or virtual display. This may occur for example, using processing means (e.g., the processing circuitry 110 in FIG. 1) to present a table (e.g., the table 2600 in FIG. 26) containing a plurality of cells. This may occur when the processing means outputs a single for rendering such a table. In the table, at least a first cell may be enabled to contain static data, and at least a second cell may be enabled to contain dynamic data. In some embodiments, the dynamic data may be stored in a memory (e.g., the memory 120 in FIG. 1). In some embodiments, the memory may be associated with a remote server (e.g., a non-transitory storage medium in any of repository 230-1 to 230-n in FIG. 2). In some embodiments, the memory may be associated with a local server on a computing device, such as the memory 120 in FIG. 1 in the computing device 100 of the computing architecture 200 in FIG. 2.

At block 3104, access may be provided to a menu (e.g., the menu 2704 in FIG. 27) of values for inclusion in at least the second cell. The menu of values may identify dynamic data values associated with selectable animations (e.g., the animations 2708 in FIG. 2). This too may occur using processing means.

At block 3106, a dynamic data value may be selected to specify an associated selectable animation for inclusion in the second cell (e.g., the cell 2702 in FIGS. 27 and 29 to 30). This may be enabled by processing means that presents selection options to a user by, for example, a GUI. In some embodiments, the associated selectable animation may be dynamic custom text. In some embodiments, the associated selectable animation may be a custom graphic. In some embodiments, the dynamic custom text may be based on an input (e.g., an input received from the user interface 2800). The input may be enabled to cause an update to the menu of values for inclusion in the plurality of cells. In some embodiments, the custom graphic may be based on an input (e.g., an input received from the user interface 2800). The input may enable an update to the menu of values for inclusion in the plurality of cells.

At block 3108, an associated selectable animation in the second cell may be dynamically displayed while the first cell displays static data. Thus, they table may be hybrid, with some cells remaining static while other cells in the same row or column present changing information, such as changing graphics. In some embodiments, the second cell may be enabled to simultaneously display static data (e.g., the text "Congrats!" in the cell 2702 in FIG. 29) together with dynamic data (e.g., the moving graphic as the background of the text "Congrats!" in the cell 2702 in FIG. 29). In some embodiments, when the second cell is enabled to simultaneously display the static data together with the dynamic data, the associated selectable animation (e.g., the associated selectable animation 3002 in FIG. 5) may be dynamically displayed adjacent a display of the static data (e.g., the text "Done" in the cell 2702 in FIG. 5) in the second cell (e.g., the cell 2702).

In some embodiments, when the associated selectable animation is dynamically displayed adjacent the display of the static data in the second cell, the dynamic display of the associated selectable animation in the second cell may be enabled via an action. In some embodiments, the action may include a cursor hover (e.g., the cursor 2706 hovering over the cell 2702 as shown in FIG. 30).

Consistent with disclosed embodiments, the processing means may further enable customization of a plurality of cells in differing rows or columns to include the dynamic data. Consistent with disclosed embodiments, the processing means may further enable selectively including static data in some of the plurality of cells and selectively including dynamic data in others of the plurality of cells, and may further enable designating a column or row as accepting either dynamic data or static data.

Aspects of this disclosure may relate to display of graphs in tablature, including methods, systems, devices, and computer readable media. For ease of discussion, a system is described below, with the understanding that aspects of the system apply equally to non-transitory computer readable media, methods, and devices. For example, some aspects of such a system may enable display of graphs in tablature. Such a system may include at least one processor configured to display a table of items (rows or columns) including a plurality of cells, where at least some of the plurality of cells include item-associated alphanumeric data (text and/or numbers associated with the row or column). As used herein, the term "tablature" may refer to a tabular space, surface, or structure. Such spaces, surfaces, or structures may include a systematic arrangement of rows, columns, and/or other logical arrangement of regions or locations for presenting, holding, or displaying information. The information displayed in the tablature may include, for example, mixtures of graphical, numeric, and alphanumeric information.

Tablature may take the general form of a two-dimensional table that may be presented or displayed to a user in any manner in which the user is capable of viewing information associated with the table. A table may be presented, for example, via a display screen associated with a computing device such as a PC, laptop, tablet, projector, cell phone, or personal wearable device. A table may also be presented virtually through AR or VR glasses, in more than two dimensions. Other mechanism of presenting may also be used to enable a user to visually comprehend presented information. Such information may be presented in cells.

In some embodiments, tablature may involve a table having various cells. The cells may be arranged in horizontal and vertical rows (also referred to as rows and columns). Cells may be defined by intersections of rows and columns. A cell may include any area, region or location in which information may be held, displayed, or otherwise presented. Values contained in the cells may include numeric, alphanumeric, or graphical information. The cells may be arranged in the table in vertical and horizontal rows (e.g., rows and columns), or in any other logical fashion. Various rows or columns of the table may be defined to represent different projects, tasks, objects or other items, as well as characteristics of such items. For example, a horizontal row may represent an item and a vertical row may represent a status (which is a characteristic associated with the item.). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. The table may also include a sub-board that may have a different structure from the table. The sub-board may contain sub-items that may be related to the items within the table. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. The items described above may contain cells with item-associated alphanumeric data. Alphanumeric data may include text or numbers but not necessarily graphics. The alphanumeric data may include text or numbers in various fonts, colors, backgrounds, displays, or different languages. While alphanumeric data does not necessarily include graphics, alphanumeric data may be associated with graphical representations or displayed next to graphical representations. The alphanumeric data may be associated with an item by being included in a cell of an item row or may be associated with an item through a link.

Figure 32:
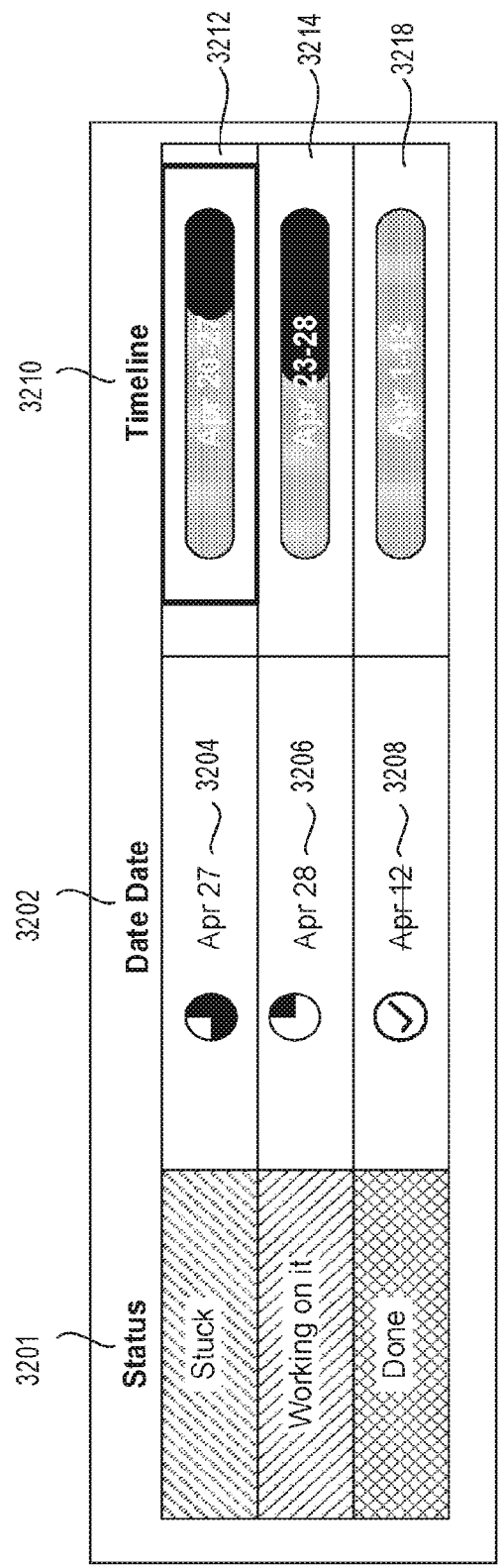
FIG. 32 illustrates an example of an interface containing various cells including cells with item-associated alphanumeric data, consistent with some embodiments of the present disclosure.

For example, the various statuses 3201 in table 3200 of FIG. 32 may include alphanumeric data "stuck," "working on it," and "done." Similarly, the various due dates 3202 of FIG. 32 may include alphanumeric data "April 27" 3204, alphanumeric data "April 30" 3206, and alphanumeric data "April 12" 3208. In some embodiments, any text or number presented in a row or column (other than graphics) may be item-associated alphanumeric data.

According to some embodiments, at least one of the plurality of cells may include an item-associated variable time-based graphic representing item progress. It is referred to as "item-associated" in that it is tied in some way to an item. For example, a cell that appears in a row, may be said to be "associated" with the item defined by that row. A variable time-based graphic may be a visual depiction that may change over time, by way of a few examples herein. Thus, an item-associated variable time-based graphic may be an indicator of data related to an item and shown in a graphical representation that is time-related. It may employ, for example visual images/designs, or any representation other than strict alphanumeric text. The time-based graphic may be updated in relation to a calendar date or time, in real-time, or on a periodic basis. In some embodiments, the time-based graphic may be any indication of time passing such as a line graph that visualizes trends, a scatter chart, an area chart, a counter, a stacked bar graph, or any graphic capable of presenting information. Additionally, the item-associated variable time-based graphic representing item progress may be a graphic indicating progress. For example, the item-associated variable time-based graphic may include a progress bar or pie chart showing time or percent completion, or any other graphic showing progress in a graphical way. The item-associated variable time-based graphic may be depicted in any shape. Item progress may be reflected as a continuous indicator, which changes over time as, item-related progress changes. As time passes, the item progress may increase to indicate that a certain amount of time has passed within a time frame associated with an item.

By way of example, table 3200 includes a display of a plurality of cells, at least two of which contain differing examples of item-associated variable time-based graphics. Timelines in column 3210, for example, are item-associated variable time-based graphics depicting elapsed time on a project. In the example depicted, the current date is midday on April 25. The timeline 3212 indicates that a project, which started on April 20 and is scheduled for completion on April 27, is three-quarters of the way to its due date. Similarly, the timeline 3214 illustrates a project that is about halfway to its scheduled completion date. The timelines are variable in that, as days pass, the timelines 3212 and 3214 will change to reflect time remaining to scheduled completion. The timeline 3218 indicates a project that is complete. That timeline 3218 was variable during the progress of the project, but once it reached its scheduled completion date of April 12, it ceased to be variable and will remain as illustrated, pending a change in the completion date of that item. The time-based graphics in column 3210 may be based on data in another cell such as cells containing alphanumeric data (as illustrated in column 3202) or may be based on data within the cell containing the time-based graphic (as illustrated in column 3210).

Column 3202 also contains a mixture of alphanumeric and graphical data. In that column, the time to completion is represented as pie charts, with the completed item in the third row reflected by a check mark. The graphical depictions in column 3202 are other examples of item-associated variable time-based graphics.

The first column in table 3200 is a status column that may change either automatically or based on user input. For example, if a user is unable to make further progress, the user may manually change the status to "stuck." When work is in progress, the user may manually change the status to "working on it." Or, upon completion the status may be changed to "done." In each such instance, the status change may occur manually or automatically. Automatic status changes may occur upon detection of an event (e.g., due to other data received) that reflects a status change and causes an automatic status update.

Figure 33:
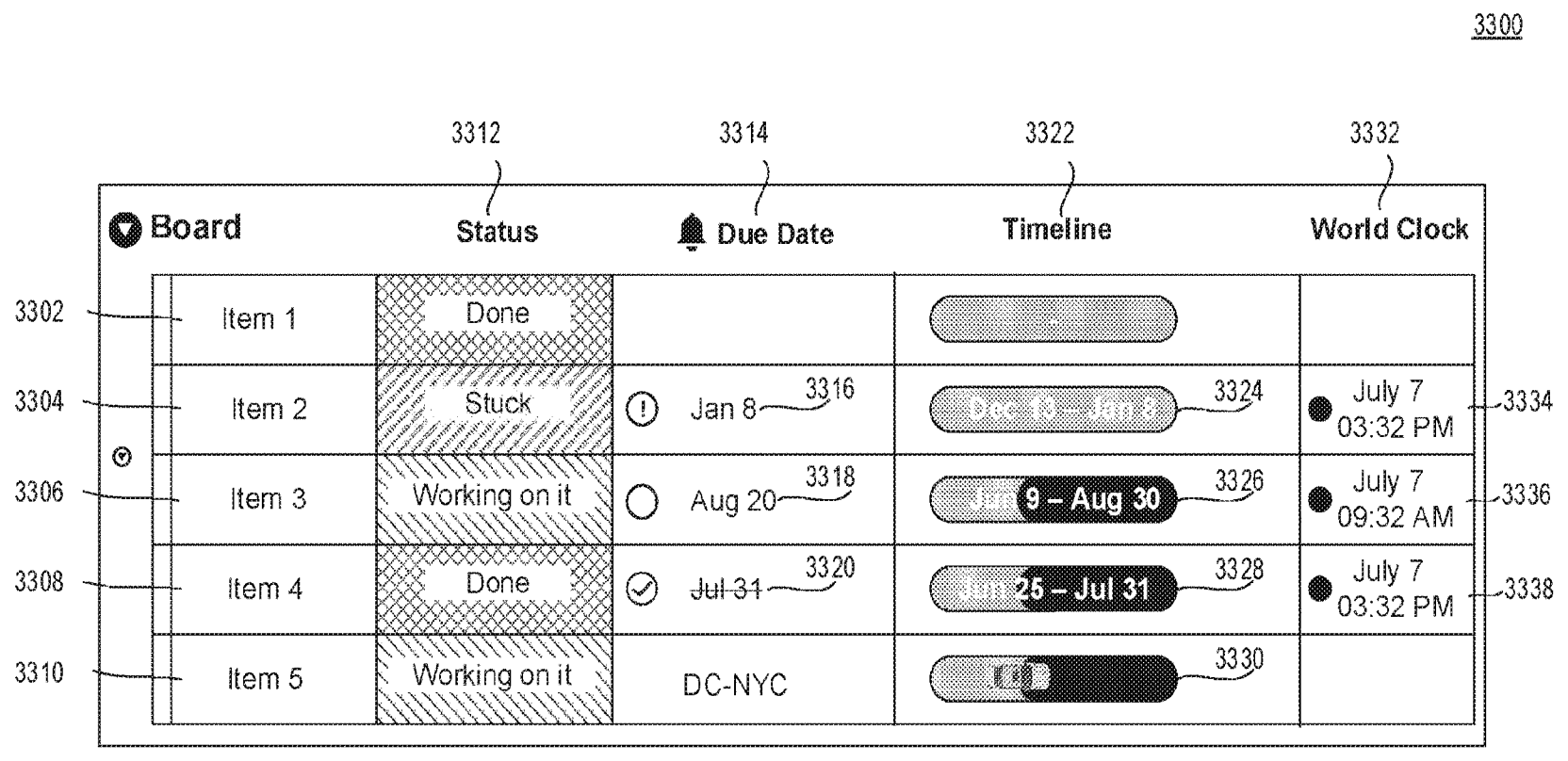

By way of one example, a table containing cells for holding values may include board 3300 in FIG. 33. As illustrated in this example, cells are defined by intersections of vertical rows 3302, 3304, 3306, 3308, and 3310 and horizontal rows (columns) 3312, 3314, 3322, and 3332. The values represented in the cells may include alphanumeric item designations such as in the first column 3334, graphical information such as illustrated in cell 3330, dates such as illustrated in column 3314, times as illustrated in column 3332, and combinations of graphics as alphanumerics, such as illustrated in column 3312. In one embodiment, in an item which may be an assigned task, the item may have a "status" cell containing alternative designation values such as "done", "stuck", "working on it", or any other alphanumeric value that conveys information.

FIG. 33 illustrates similar examples of item-associated variable time-based graphics. While the example of FIGS. 32 and 33 illustrate timelines, any other graphical format could be used or differing, customized timeline depictions may be employed. By way of one example where an item represents a truck delivery, the item-associated variable graphic may represent a distance and the graphic (such as 3330), may reflect how far the truck is from its destination. Alternatively, such information may be graphically represented in geographical map, or path. The data might be gleaned from GPS data derived from a GPS unit in the truck that reports the truck's location. In such embodiments, the time-based graphic may show a truck moving on a cell in accordance with the truck's actual progress in the journey. In such instances, the graphic is time-based because the distance changes as a function of time.

In another example, a construction project (item) may be required to be completed by a certain date. In such an embodiment, the time-based graphic may show a cell 30% filled-in to depict that the time until the due date is a third of the way done as illustrated by time-based graphic. With each passing day, the time-based graphic may change the percent fill of the cell.

In another example, a cell may show a graphical indication of a stock's relative price to a baseline purchase price. In such an embodiment, the cell may be considered time-based, as the price fluctuates over time, and as a result, the graphic is variable over time.

In some embodiments as discussed, the item-associated variable time-based graphic may represent item progress. Item progress may refer to the progress of an item such as a project or task. As discussed, representation of progress may be reflected as a progress bar within a cell. As discussed, the progress bar may change in length as a function of time elapsed. Elapsed time may be determined using a clock within the system and may be calculated using start dates. Time to completion may be calculated using completion dates entered into the system.

By way of other examples, if the due date for a project is 10 days from a present time, a cell may contain a 10 day indicator in a graphical form. Each day, the cell may present a new graphic reflecting the remaining days to completion. Additionally, when a time based graphic reaches its endpoint, a display of the graphic may change. For example, a cell may change in graphical appearance or color to reflect the fact that the item has reached its end. When an item is completed after its scheduled completion date, the graphical representation may have a different appearance than would occur if the item was completed on time. Such difference in appearance may be reflected in color, style, image, or any other manner.

Aspects of this disclosure may include accessing an indicator of a current point in time. A measure of a current point in time may vary depending on a project. For projects spanning years, a current point in time may be a month. For other projects, a current point in time may be reflected in days, hours, minutes, or even seconds or fractions of seconds. For example, if used in connection with securities transactions, seconds and fractions of seconds may make a difference and the current point in time may be accordingly reflected. A current point in time may be derived from any data source, including, for example, an internal system clock or an external clock. Accessing an indicator of a current point in time may include performing a look up of data from a local or remote repository based on real-time or a calculated time. An indicator of a current point in time may include a current date or current time in a local or selected time zone according to user preference or as a default. In some embodiments, time may be pulled from the New York Stock Exchange database or may be available in any computer operating system. Additionally, the time used for the time-based graphic may be accessed from a centralized time management system (query for time in different time zones) such as on a user's computing device.

For example in FIG. 32, the time-based graphic 3212 is illustrated as a progress bar of the time elapsed between April 20-27. In order to determine the progress of the time elapsed, the embodiment may access a centralized time management system to perform a lookup that the current date is April 25 in order to determine the progress and alter the display of the time-based graphic 3212 to show the item progress.

In some embodiments, accessing an indicator of a current point in time may occur in real time. For example, changes to a time-based graphic may be made in real time with a progress bar updated live, based on the current date and time. In some embodiments, the graphic such as a progress bar may update in real time based on a GPS location. In other embodiments, the graphic may update in real time based on a real time indication of a stock price. In yet other embodiments, the graphic may update in real time based on a real time indication of any external or internal changing parameter.

In other embodiments, accessing an indicator of a current point in time may occur on a periodic basis. For example, the timeline of a time-based graphic may increment by second, minute, 10-minute increment, hour, day, 2-day increment, month, year, or any other periodic increment determined by a user or pre-determined by a system depending on the project. In some embodiments, the graphic such as a progress bar may be updated every mile, ten miles, one hundred miles, or any other mileage, based in part on a GPS location, a starting location, and a destination location. In other embodiments, distance may be updated based on time. For example, every hour, the system might update the GPS location of a truck on a cross country journey. In other embodiments, the graphic may update by a currency amount such as dollars and cents, or any other monetary increment suitable for a particular application. In yet other embodiments, the graphic may update on a periodic basis based on an indication of any external or internal changing parameter.

Aspects of this disclosure may include determining an extent of progress at the current point in time. The current point in time may be precise (to the second or fraction of a second) or may be based on a predefined increment (day, week, month, year) as discussed earlier. An extent of progress may be an amount of completion done on an item such as a project or the amount of time elapsed within a timeframe. Determining may include performing a look up of data within a table or in a repository or may include performing a calculation. In some embodiments, because the system may pull the current time and the user may enter a start date and end date of the item, the system may determine the extent of progress of time-elapsed at the current point in time.

As described above in connection with FIG. 32, the time-based graphic 3212 illustrates an example embodiment of a progress bar reflecting the time elapsed since the start of an item on April 20. In order to determine the progress of the time elapsed, the embodiment may access a current time by performing a lookup or calculation that the current date is April 25 and alter the display of the time-based graphic 3212 to show the item progress.

In some embodiments, determining an extent of progress at the current point in time may occur in real time. For example, changes to a time-based graphic may be made in real time with a progress bar updated live, based on a present date and exact or near real time as described herein.

In other embodiments, determining an extent of progress at the current point in time may occur on a periodic basis. A periodic basis may be having or occurring in repeated periods or cycles as described herein. The periodic basis may be predefined by the system or may be selected by a user. For example, the timeline of a time-based graphic may increment by second, minute, 10-minute increments, hour, day, 2-day increments, month, year, or any other periodic increment determined by a user or pre-determined by a system depending on the project.

Aspects of this disclosure may include altering, in a display of the table, the item-associated variable time-based graphic to correspond to the current point in time, to thereby reflect within the at least one of the plurality of cells adjacent to at least one cell containing the item-associated alphanumeric data, a graphical indication of the extent of progress at the current point in time. Altering may include changing the representation of the item-associated variable time-based graphic in the table to be up-to-date. For example, as shown on board (also referred to as table) 3300 in FIG. 33, various projects including item 1, 3302; item 2, 3304; item 3, 3306; item 4, 3308; and item 5, 3310 may have been entered by a user. Each of these items has a status 3312, a due date 3314, a timeline 3322, and a world clock time 3332 reflecting the local time associated with the item.

Item 1 (3302) is marked as "done" with no timeline or world clock because the due date, beginning and end dates were not entered by the user. In some embodiments, however, if the user does not indicate a due date, the system may automatically include a default or calculated due date for the item. In such embodiments, the system may determine a due date based on the item description. For example, if the item is a patent application, the system may enter a date one month from the current date as the automatically populated due date for the item. Alternatively, the system may use historical data associated with similarly titled items to estimate the amount of time to completion and the due date. In such instances, the system may take into account the workload of individuals assigned to the item. Whether set automatically or manually, an authorized user may, at any time, update the due date.

As illustrated in FIG. 33, Item 2 (3304) is marked as "stuck." While due date "January 8" (3316) has passed, the project is not complete. Even so, the item-associated variable time-based graphic 3324 representing item progress shows a greyed-out progress bar because the selected completion date has passed. In some embodiments, the item-associated variable time-based graphic 3324 may indicate (using graphics) that the due date has passed and that the project is not complete. In some embodiments, the item-associated variable time-based graphic 3324 may be altered on board 3300 to correspond to the current point in time as shown by world clock 3334, to reflect a graphical indication of the extent of progress at the current point in time.

The item-associated variable time-based graphic, in this case progress bar 3324, may be located adjacent to at least one cell containing the item-associated alphanumeric data such as the cell containing due date "January 8" (3316). In some embodiments, the item-associated variable time-based graphic 3324 may be adjacent to at least one cell containing another item-associated variable time-based graphic.

Item 3 (3306) is marked as "working on it." Due date "August 20" (3318) has not yet passed and the project is not complete. The item-associated variable time-based graphic 3326 representing item progress shows a partially greyed-out progress bar depicting progress as of the current date, July 7, at 9:32 AM shown on world clock 3336. Greyed out portion of progress bar 3326 may indicate number of days since project has started and blacked out portion of progress bar 3326 may indicate number of days until due date 3318. In some embodiments, the item-associated variable time-based graphic 3326 may indicate (using graphics) that the due date has not passed and that the project is not complete.

Item 4 (3308) is marked as "done." Due date "July 31" (3320) has not yet passed but the project is already complete as stated in the status column 3312. The item-associated variable time-based graphic 3328 representing item progress shows a partially greyed-out progress bar depicting progress as of the current date, July 7, at 9:32 AM shown on world clock 3338. Greyed out portion of progress bar 3328 may indicate number of days since project has started and blacked out portion of progress bar 3328 may indicate number of days until due date "July 31" 3320. In some embodiments, the item-associated variable time-based graphic 3328 may indicate (using graphics) that the due date has not passed and that the project is complete.

Item 5 (3310) is marked as "working on it." While there is no due date listed in the column for due date 3314, the user entered a journey spanning from Washington, D.C. to New York City (not depicted in the illustrated view). Item-associated variable time-based graphic 3330 of board 3300 indicates the project is still being worked on. Additionally, the item-associated variable time-based graphic 3330 representing item progress shows a progress bar that is one-third greyed-out, indicating that at present, the GPS of the truck is ⅓ the distance between DC and NYC. Item 5 (3310) indicates two-thirds of a journey left between DC and NYC before the item can be considered completed. As shown in FIG. 33, the item-associated variable time-based graphic 3330 may depict, using graphics such as a vehicle, the vehicle's relative progress on the journey.

In some embodiments, the blacked-out portion of item-associated variable time-based graphic 3330 (representing part of the journey that is left), may be split into sections (not illustrated). Each of the sections may provide graphical data such as traffic indications, weather indications, or any other indications associated with the item.

In some embodiments, altering in a display of the table the item-associated variable time-based graphic to correspond to the current point in time may occur in real time. For example, changes to a time-based graphic may be made in real time with a progress bar updated live based on a current date and exact or near real time as described herein.

In other embodiments, altering, in a display of the table, the item-associated variable time-based graphic to correspond to the current point in time occurs on a periodic basis. For example, the timeline of a time-based graphic may increment by second, minute, 10-minute increments, hour, day, 2-day increments, month, year, or any other periodic increment determined by a user or pre-determined by a system depending on the project.

In some embodiments, a scale of graphical indication reflects that the extent of progress at the current point in time is at least one of a minute, an hour, a day, a week, a month, or a combination of any of the foregoing. A scale of graphical indication of the extent of progress may include regular intervals or increments in which the graphical indication may progress. The regular increments may be set at a default or by user selection, and the increments may be based on a time-frame to determine the increments.

For example, time-based graphic 3212 in FIG. 32 illustrates a scale of the extent of progress by day through the use of a day-increment progress bar. As such, as each day passes, the bar progresses in one-day increments towards completion, with each increment representing one-eighth of the eight day time frame. However, the progress bar 3212 may progress towards completion in finer increments proportional to the scale if the extent of progress is measured in a lesser increment.

In some embodiments, the at least one processor is further configured to alter the display of the item-associated variable time-based graphic in response to an action, or to more generally alter a display of a cell in response to an action. An action may include any action act a user may make. For example, user actions may include a cursor hover, a cursor click, a movement of the cursor, a right or left click, a multi click, a VR action, operation by voice, or any other user interaction. Altering a display may include presenting new data, replacing a display of data, or presenting the same data in a different format.

Figure 34:
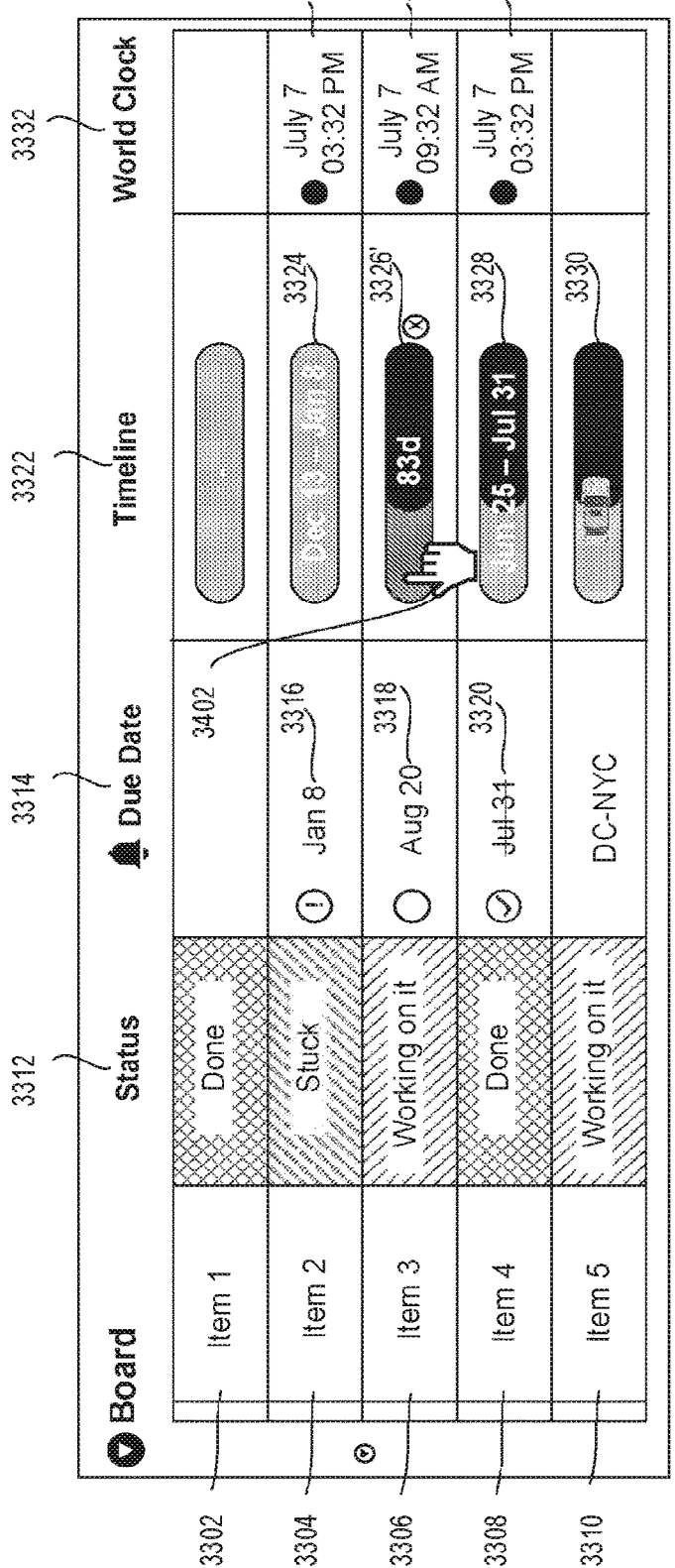
FIG. 34 illustrates an example of the interface of FIG. 33, modified in response to a user-action, consistent with some embodiments of the present disclosure.
Figure 35:
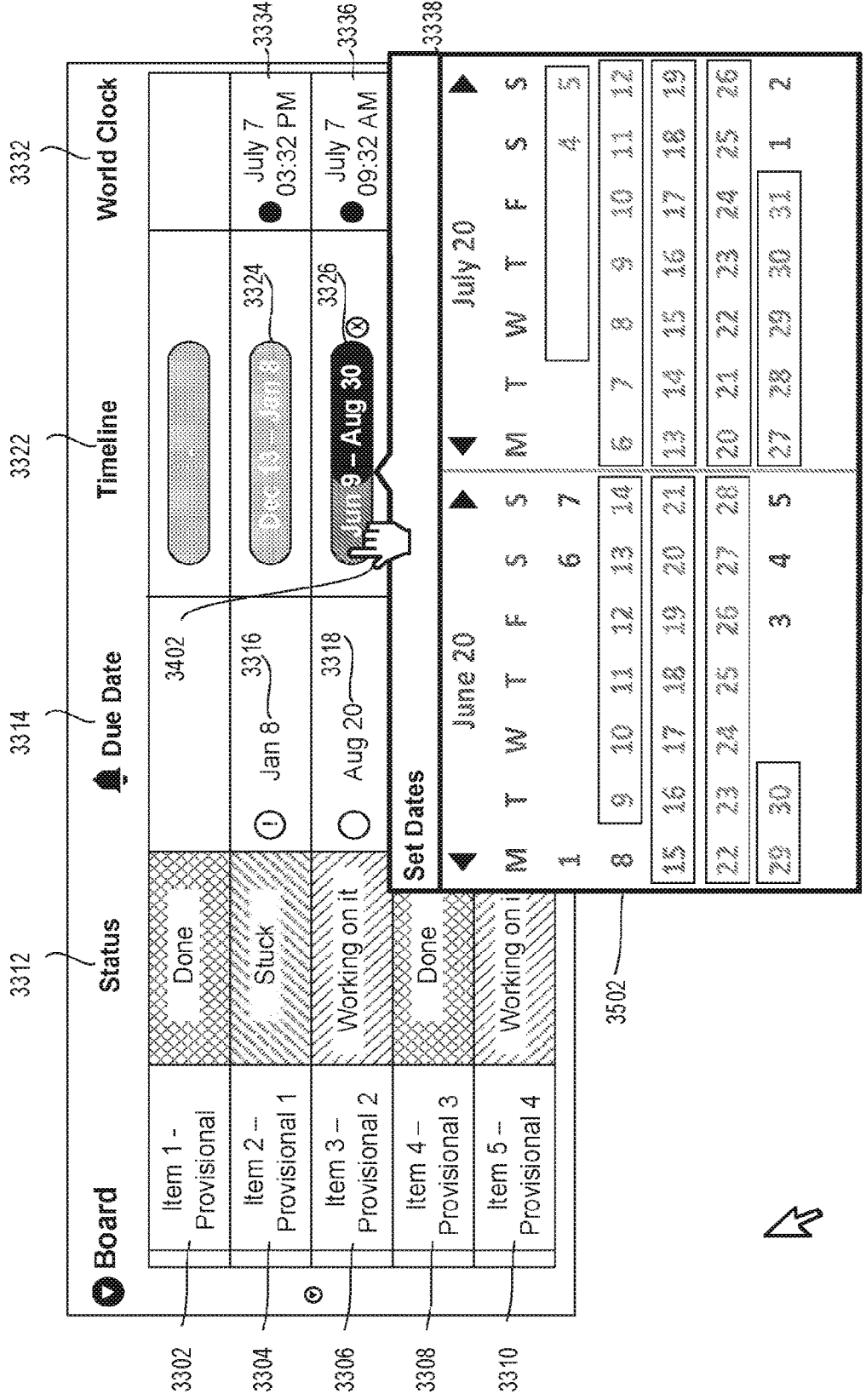
FIG. 35 illustrates an example of the interface of FIG. 33, modified in response to another user-action, consistent with some embodiments of the present disclosure.

FIGS. 34 and 35 illustrate two non-limiting examples of altering a display of time-based graphics in response to a user action by replacing data and by presenting data over the original data. In FIG. 34, the action of a hover of cursor 3402 causes an alteration of timeline 3322 from a date range format, as is illustrated in timeline 3326 in FIG. 33, to a days remaining format, as illustrated in timeline 3326' in FIG. 34. Specifically, in this example, altered timeline 3326' depicts days remaining (83 days) until scheduled completion of Item 3. In some embodiments, the system may display a completely different graphic in response to a user action. The options are limitless. If a cell tracks traffic, a graphical depiction of a car accident may replace a prior graphic. If a cell tracks weather conditions, a graphical depiction of a weather condition might appear (rain or sun depiction). If a cell tracks the stock market, a blinking icon might appear in response to a precipitous drop in a stock price.

FIG. 35 illustrates another example of an alteration that may occur in response to a user action. In this instance, if a user clicks on an item-associated variable time-based graphic 3326 with cursor 3402 (or takes any other action), calendar 3502 may appear. In this example, calendar 3502 may be interactive, permitting the user to change the date range of the associated timeline 3326.

An item-associated variable time-based graphic may reflect multiple types of information (qualitative or quantitative) in the same cell based on outside triggers. In some embodiments, in response a user action (e.g., cursor hover), the system may provide an audio indication in conjunction with, or in place of, a graphical indication. For example, a message such as "three stuck items may be holding up this project" may be presented in response to a timeline click. Or, the sound of rain or "It will begin raining in Washington at 8 PM this evening" may be presented in response to a click on a cell that tracks local weather.

Additionally, in some embodiments, the item-associated variable time-based graphic 3326' may alternate automatically based on a variable such as time, location, or other condition. For example, as a tracked vehicle moves, a map associated with a cell may change, or as a stock price changes, a price indicator in a cell that tracks the stock may change. In some embodiments, the at least one of the plurality of cells may further include item-associated alphanumeric data. Item-associated alphanumeric data may include text or numerics that provide additional information. For example, in FIG. 35, timelines 3324 and 3326 are graphical, but also include superimposed alphanumeric date ranges.

Figure 36:
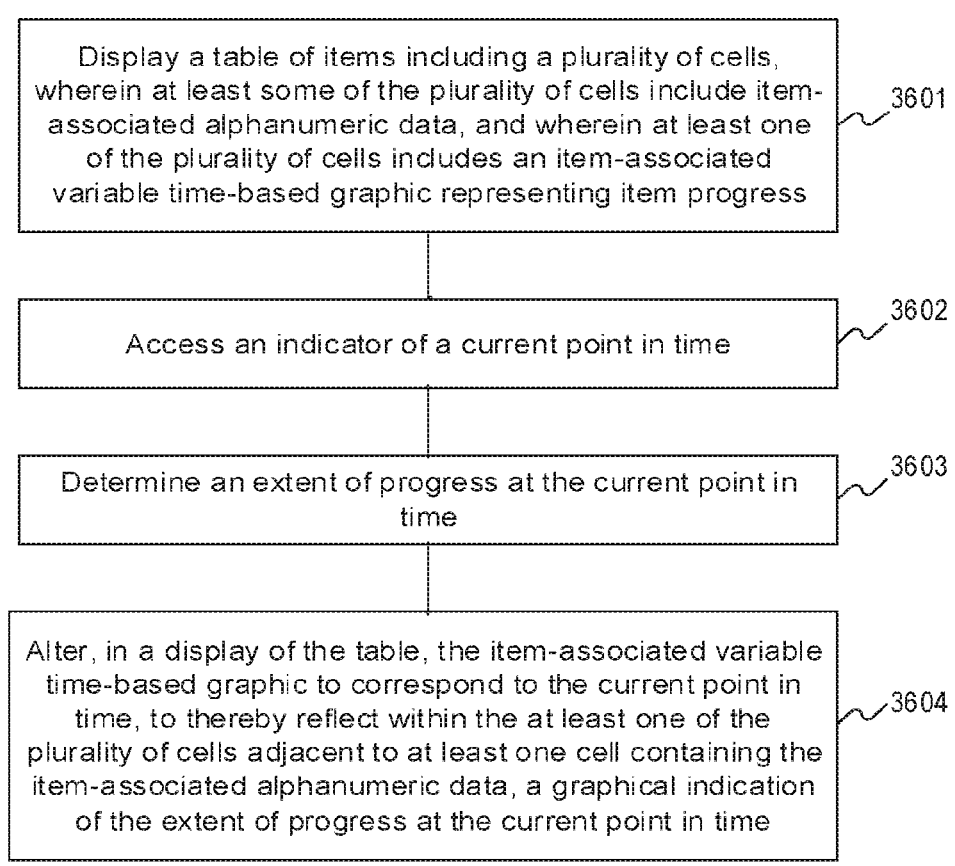
FIG. 36 is a block diagram of an exemplary method, consistent with some embodiments of the present disclosure.

FIG. 36 is a block diagram of an exemplary method 3600 consistent with disclosed embodiments. The method may be implemented via computer readable media and may be performed with the aid of at least one processor.

Block 3601: Display a table of items including a plurality of cells, wherein at least some of the plurality of cells include item-associated alphanumeric data, and wherein at least one of the plurality of cells includes an item-associated variable time-based graphic representing item progress. In some embodiments, a table may be a board that includes various cells. Various rows of cells on the board may refer to different items or projects. As previously discussed, some of the cells may contain alphanumeric data, such as item designations in the left-most column of FIG. 33, and the current world clock time in column 3332 of FIG. 33. Other cells may include item-associated variable time-based graphics such as those depicted in column 3322 of FIG. 33.

Block 3602: Accessing an indicator of a current point in time. In some embodiments, the system may access a current point in time from an internal or external source, as previously discussed.

Block 3603: Determining an extent of progress at the current point in time. As previously discussed, in some embodiments, the system may determine the amount of progress based on the entered start and end dates of an item and the accessed current time. In addition or alternatively, determining an extent of progress may involve counting a number of tasks completed or left to be completed.

Block 3604: Altering, in a display of the table, the item-associated variable time-based graphic to correspond to the current point in time, to thereby reflect within the at least one of the plurality of cells adjacent to at least one cell containing the item-associated alphanumeric data, a graphical indication of the extent of progress at the current point in time. As previously discussed, in some embodiments, the system may alter the item-associated variable time-based graphic (e.g., progress bar) to reflect the extent of progress based on the accessed current time and determined extent of progress. The progress bar may be presented adjacent to a at least one cell containing the item-associated alphanumeric data.

Aspects of this disclosure may provide a technical solution to the challenging technical problem of project management and may relate to a system for automating tablature with the system having at least one processor (e.g., processor, processing circuit, or other processing structure described herein) in collaborative work systems, including methods, systems, devices, and computer-readable media. For ease of discussion, example methods are described below with the understanding that aspects of the example methods apply equally to systems, devices, and computer-readable media. For example, some aspects of such methods may be implemented by a computing device or software running thereon. The computing device may include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Tablature as used herein refers to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays. Altering tablature displays, as used herein, may refer to any procedure or process of changing a visual presentation form of a display of a table in a collaborative work system. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

By way of one example, the collaborative work system may utilize workflow management software that enables members of a team to cooperate via a common online platform (e.g., a website). Aspects of this disclosure may display a table with items on a screen of a computing device. A table may be presented, for example, via a display screen associated with a computing device such as a PC, laptop, tablet, projector, cell phone, or personal wearable device. A table may also be presented virtually through AR or VR glasses, or through a holographic display. Other mechanism of presenting may also be used to enable a user to visually comprehend presented information. Aspects of this disclosure may enable a user (e.g., an individual operating the computing device) to maintain a plurality of logical templates, enable formation of a table, enable selection of a logical template, enable input for user-definable requirements into the selected logical template, enable association of the selected logical template with a row, and execute logic operations defined by the selected logical template to operate on the row in response to the association of the selected logical template with the row.

Consistent with disclosed embodiments, at least one processor of the system may carry out operations that may involve maintaining a plurality of logical templates, each logical template of the plurality of logical templates including predefined requirements and user-definable requirements. A logical template (or referred to as a "recipe") as used herein may include a logical organization of elements for implementing a conditional action. In some embodiments, the logical organization of elements may be a semantic statement or a rule (e.g., a sentence). An instance of the logical template may be referred to as an "automation" herein.

In some embodiments, the logical template may be implemented as program codes or instructions stored in a non-transitory computer-readable medium of the system. The at least one processor of the system may execute the program codes or instructions to perform the conditional action in accordance with the logical template. Maintaining the plurality of logical templates, as used herein, may refer to any means for the system to store (or store a link to) the plurality of logical templates. For example, the system may store the plurality of logical templates in the non-transitory computer-readable medium. By way of example, the system may maintain the plurality of logical templates by storing them in the memory 120 in FIG. 1, the storage 130 in FIG. 1, or both.

In some embodiments, the logical template may be displayed in a user interface. The user interface as used herein may be a web page, a mobile-application interface, a software interface, or any graphical interface that enables interactions between a human and a machine via the interactive element. The user interface may include, for example, a webpage element that overlays an underlying webpage. In some embodiments, a computing device that implements the operations may provide the user interface that includes an interactive element. The interactive element as used herein may be a mouse cursor, a touchable area (as on a touchscreen), an application program interface (API) that receives a keyboard input, or any hardware or software component that may receive user inputs.

By way of example, the computing device (e.g., the computing device 100 in FIG. 2) may provide the user interface (e.g., a web page or a column store) to a user device (e.g., any of the user device 220-1, 220-2, or 220-*m* in FIG. 2) over a network (e.g., the network 210 in FIG. 2).

A logical template may include one or more triggering elements (referred to as "triggers" hereinafter) and one or more action elements (referred to as "actions" hereinafter). A trigger of the logical template, as used here, may refer to an event or a condition, the occurrence or satisfaction of which may cause another event in the system that implements the logical template. An action of a logical template as used herein may refer to a change of one or more components of the system. For example, the change may include adding, deleting, altering, converting, or any manner of manipulating data stored in the system.

In some embodiments, the at least one processor of the system may maintain one or more of the plurality of logical templates as predetermined, unconfigurable logical templates, in which the system may only select or deselect those logical templates as a whole but cannot alter any element thereof. In some embodiments, the at least one processor of the system may maintain one or more of the plurality of logical templates as configurable logical templates, in which the system may enable the user not only to select or deselect, but also to configure one or more elements thereof. For example, the system may enable the user to configure a maintained logical template in a dynamic manner that will be detailed in later description of this disclosure, in which the user may create a new logical template that might not preexist in the system. In some embodiments, the system may enable the user to store the configured logical template in the system for future configurations or uses.

Figure 37:
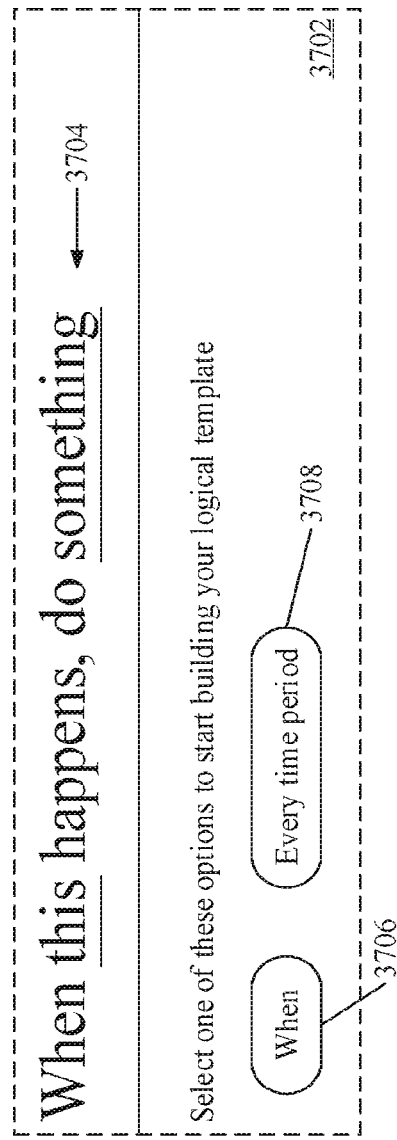
FIG. 37 illustrates an example of a logical template displayed in a user interface, consistent with some embodiments of the present disclosure.

By way of example, FIG. 37 illustrates an example of a logical template 3704 displayed in a user interface 3702, consistent with embodiments of the present disclosure. As illustrated in FIG. 37, the user interface 3702 is represented as a dash-line box that does not represent its boundary. In some embodiments, the user interface 3702 may be displayed using a computing device (e.g., the computing device 100 illustrated in FIG. 1) or software running thereon. For example, the user interface 3702 may be a portion of a graphical user interface (GUI), such as a webpage or a mobile application GUI displayed on a screen of the computing device 100.

As illustrated in FIG. 37, the user interface 3702 displays the logical template 3704 ("When this happens, do something") as a whole or a partial sentence. The logical template 3704 may include a trigger "when this happens" and an action "do something." In accordance with the logical template 3704, when the condition "this" is satisfied or the event "this" occurs, the system may cause "something" to occur (i.e., a change of a component of the system).

A logical template may include one or more predefined requirements and one or more user-definable requirements. A requirement of the logical template as used herein may include an element that limits the logical template. The element may be of any datatype. In some embodiments, the requirement may have a default value. A predefined requirement may be a requirement that cannot be configured or altered, and may only be activated or deactivated as a whole. In some embodiments, if the logical template is a conditional statement, the predefined requirement may include a verb-like, a preposition-like, or conjunction-like element. A user-definable requirement may be a requirement that may be configured or altered based on a user input. The user-definable requirement may be activated or deactivated as a whole, or may be activated with configuration or alternation in accordance with user inputs.

By way of example, in FIG. 37, the logical template 3704 includes predefined requirements "when," "happens," and "do," and user-definable requirements "this" and "something." For example, the predefined requirement "when" may only be activated as a whole by receiving a user input indicating that a user selects an interactive element 3706 (e.g., a button). In another example, the predefined requirement "when" may only be deactivated as a whole by receiving a user input indicating that a user clicks an interactive element 3708 (e.g., a button) so that the predefined requirement may be removed and may be replaced.

Figure 39:
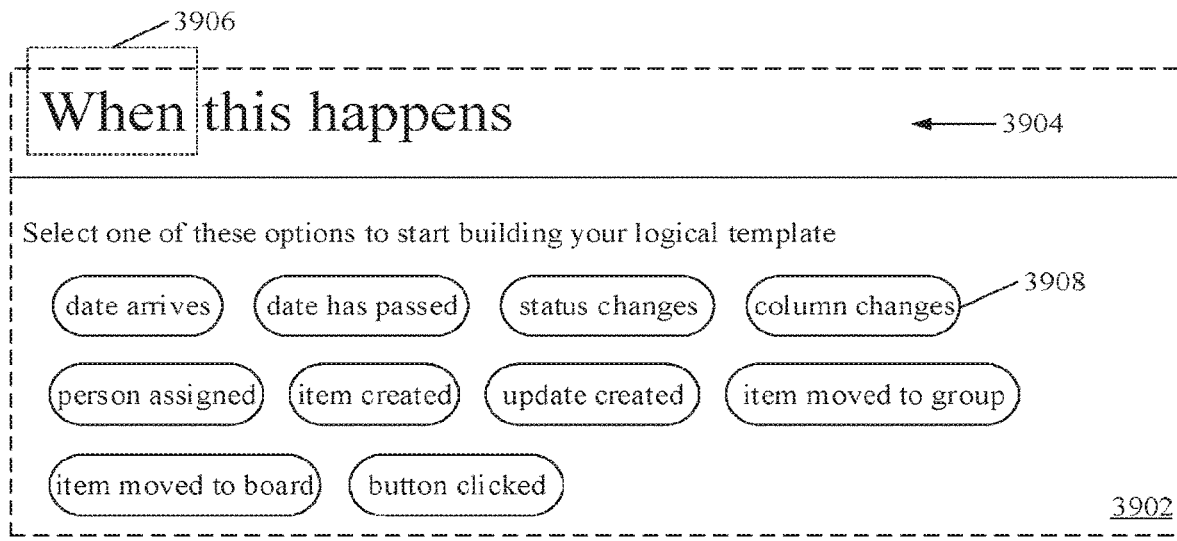
FIG. 39 illustrates an example of a logical template showing a predefined requirement in a user interface, consistent with some embodiments of the present disclosure.

By way of example, FIG. 39 illustrates an example of a logical template 3908 showing a predefined requirement 3906 in a user interface 3902, consistent with embodiments of the present disclosure. In some embodiments, the system may display the user interface 3902 after receiving data indicating that the interactive element 3706 of the user interface 3702 of FIG. 37 is activated (e.g., selected by a user). The user interface 3902 displays the logical template 3908 ("when this happens") that may include the predefined requirement 3906 ("when"). As illustrated in FIGS. 37 and 39, through interaction with the interactive element 3706, the predefined requirement 3906 may be activated, as a whole, by invoking the display of the user interface 3902, in which the predefined requirement 3906 cannot be configured or altered by any user input.

Figure 40:
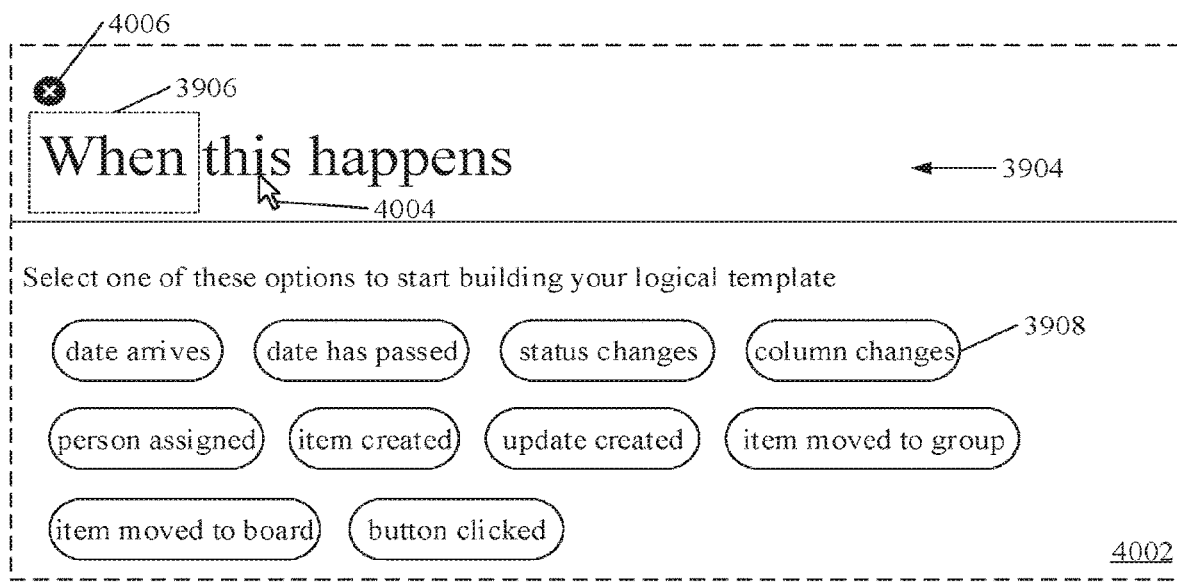
FIG. 40 illustrates another example of a logical template showing a predefined requirement in a user interface, consistent with some embodiments of the present disclosure.

By way of example, FIG. 40 illustrates another example of the logical template 3908 showing the predefined requirement 3906 in a user interface 4002, consistent with embodiments of the present disclosure. In some embodiments, the system may display the user interface 4002 after receiving data indicating that a cursor 4004 is hovering over (e.g., as a result of a user operation) or has clicked on the logical template 3908 (e.g., over the predefined requirement 3906) in the user interface 3908 of FIG. 39. The user interface 4002 may include an interactive element 4006 above the predefined requirement 3906. For example, the interactive element 4006 may be a clickable button floating above the predefined requirement 3906. If the user clicks the interactive element 4006, the predefined requirement 3906 may be deactivated, as a whole, by invoking the display of the user interface 3702 in FIG. 37, in which the predefined requirement 3906 cannot be configured or altered by any user input.

The activation, deactivation, and configuration of the user-definable requirements "this" and "something" will be detailed in association with FIGS. 41 to 44.

Consistent with disclosed embodiments, the at least one processor of the system may carry out operations that may involve enabling formation of a table having a plurality of horizontal and vertical rows. A table as used herein includes the those items described earlier in connection with the tablature, and may include a form, a sheet, a grid, a list, or any data presentation in horizontal and vertical dimensions (e.g., horizontal rows and vertical columns, horizontal rows and vertical rows, or horizontal columns and vertical columns). The table may be presented on a screen of a computing device (e.g., a personal computer, a tablet computer, a smartphone, or any electronic device having a screen).

In some embodiments, the system may store the table as data in a non-transitory computer-readable medium. The at least one processor of the system may access the table from the non-transitory computer-readable medium and perform operations to the table. Formation of the table as used herein may refer to any process, procedure, or manner for the system to build up the table. For example, the system may receive data from user inputs or from other components of the system and organize them into the plurality of horizontal and vertical rows to form the table. By way of example, the system may form the table and store it in the memory 120 in FIG. 1, the storage 130 in FIG. 1, or both.

Figure 38:
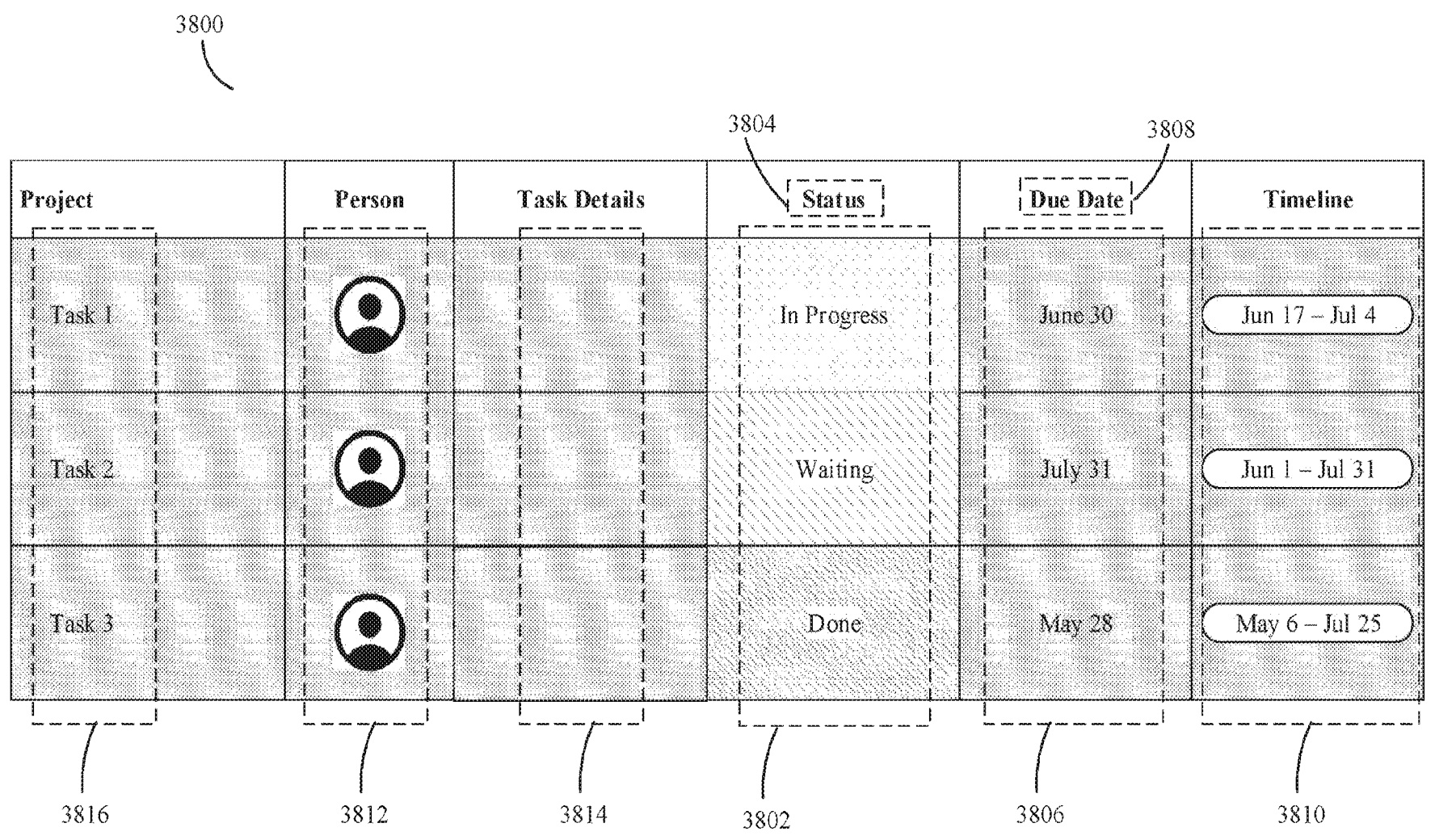

By way of example, FIG. 38 illustrates an example of a table 3800 that may include multiple columns, consistent with embodiments of the present disclosure. In some embodiments, the table 3800 may be displayed using a computing device (e.g., the computing device 100 illustrated in FIG. 1) or software running thereon. The table 3800 may be associated with a project to display and may include, in the multiple rows and columns, tasks (e.g., in rows including "Task 1," Task 2," or "Task 3") included in the project, persons (e.g., in a column 3812) assigned to the tasks, details (e.g., in a column 3814) of the tasks, statuses (e.g., in a column 3802) of the tasks, due dates (e.g., in a column 3806) of the tasks, timelines (e.g., in a column 3810) of the tasks, or any information, characteristic, or associated entity of the project.

Any column of the table may display cells of a single datatype or of multiple datatypes. A single datatype column may be one where all cells are uniform in at least one aspect or characteristic. The characteristic may be numeric values only, characters only, alphanumeric values, graphic elements only, closed lists of elements, formatting, a specific value range, or any constraint on the format or type of column data. In some embodiments, the first column may be at least a portion of a single datatype (e.g., texts) column-oriented data structure. A single datatype column-oriented data structure may be a digital data structure of a table that includes columns where all cells of the columns may be programmed to include a single category of data.

In FIG. 38, the table 3800 includes a first column 3802 that has a first column heading 3804 ("Status") and a second column 3806 that has a second column heading 3808 ("Due Date"). A column heading may be associated with a column within a table. The column heading may be a default text or may be customized by a user. For example, a first column 3802 may be a status column type of table 3800. Other columns with other characteristics in FIG. 38 may include a due date column type (including a second column 3806), a timeline column type (including the column 3810), a person column type (including the column 3812), and text column types such as the columns 3814 and 3816.

In FIG. 38, a first column 3802 includes three rows, each row including one or more words indicative of a status of each task of the project. A second column 3806 includes three rows, each row including a date indicative of a due date of each task of the project. In some embodiments, the computing device that implements the method may enable the user to select the second column heading in the table or through a user interface such as a column store in a manner similar to that of enabling the user to select the first column heading in the table as described above.

Consistent with disclosed embodiments, the at least one processor of the system may carry out operations that may involve enabling selection of a logical template. In some embodiments, the logical template may be one of the plurality logical templates maintained by the system. In some embodiments, the system may enable forming the logical template dynamically and selecting the same.

By way of example, with reference to FIGS. 37 and 38, the system may enable selection of the logical template 3704 by providing an interactive element (not shown in FIGS. 37 and 38) associated with the table 3800 such that when a user interacts with the interactive element, the logical template 3704 may be selected. For example, the interactive element may be a button or a menu on a webpage that displays the table 3800. When the user clicks or interacts with the button or the menu, the webpage may display the user interface 3702 for enabling the user to select the logical template 3704.

Consistent with disclosed embodiments, the at least one processor of the system may carry out operations that may involve enabling input for the user-definable requirements into the selected logical template. An input for a user-definable requirement, as used herein, may refer to any data, information, or indication to be used for configuring the user-definable requirement.

Figure 41:
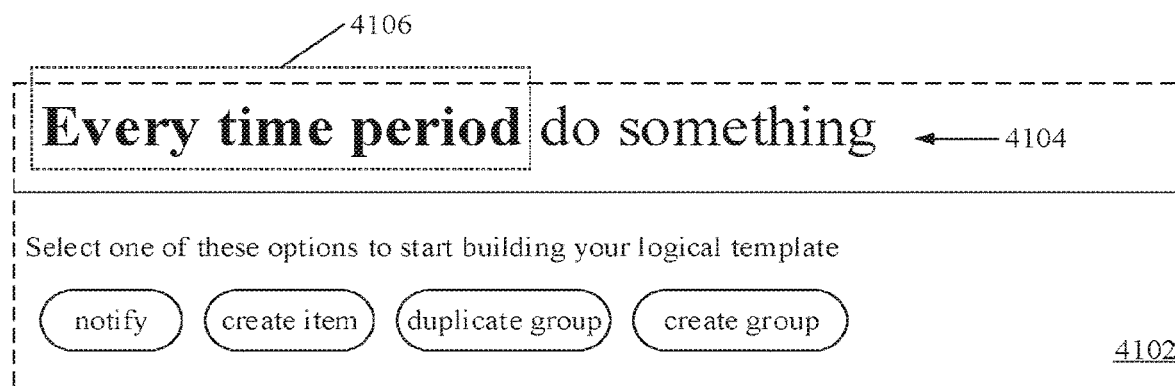
FIG. 41 illustrates an example of a logical template showing a user-definable requirement in a user interface, consistent with some embodiments of the present disclosure.

By way of example, FIG. 41 illustrates an example of a logical template 4104 showing a user-definable requirement 4106 in a user interface 4102, consistent with embodiments of the present disclosure. In FIG. 41, the user-definable requirement 4106 may be displayed in bold, underlining, or any other differentiating manner, representing that it is user-definable. In some embodiments, the system may display the user interface 4102 after receiving data indicating that the interactive element 3708 of the user interface 3702 in FIG. 37 is activated (e.g., selected by a user). The user interface 4102 displays the logical template 4104 ("every time period do something") that includes the user-definable requirement 4106 ("every time period"). As illustrated in FIGS. 37 and 41, through interaction with the interactive element 3708, the user-definable requirement 4106 may be activated, as a whole, and invoke the display of the user interface 4102.

Figure 42:
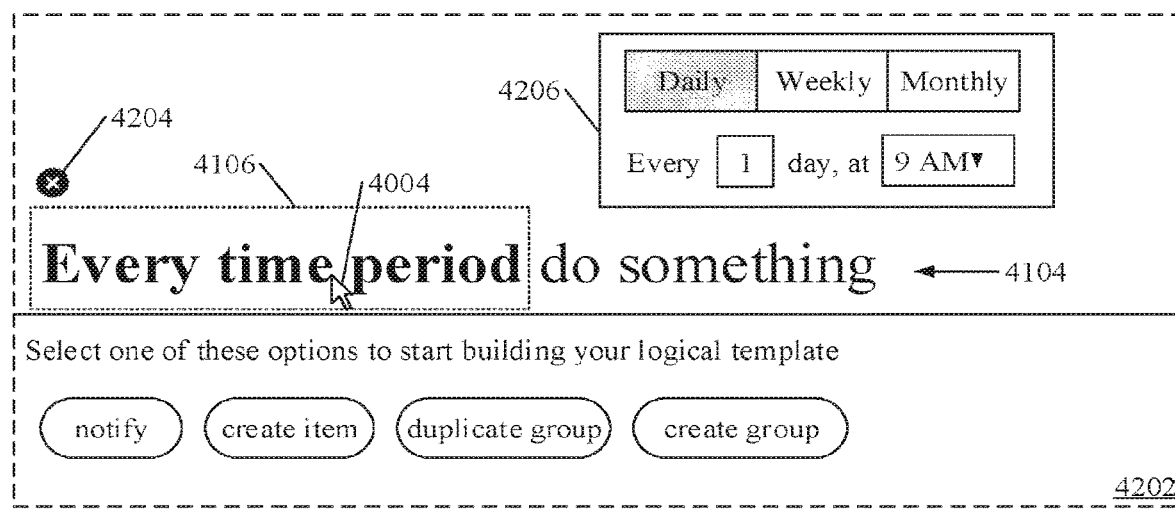
FIG. 42 illustrates another example of a logical template showing a user-definable requirement in a user interface, consistent with some embodiments of the present disclosure.

By way of example, FIG. 42 illustrates another example of the logical template 4104 showing the user-definable requirement 4106 in a user interface 4202, consistent with embodiments of the present disclosure. In some embodiments, the system may display the user interface 4202 after receiving data indicating that the cursor 4004 is hovering over (e.g., as a result of a user operation) or having clicked on the logical template 4104 (e.g., over the user-definable requirement 4106) in the user interface 4104 of FIG. 41. The user interface 4202 may include an interactive element 4204 above the user-definable requirement 4106, but may generally be located adjacent the user-definable requirement 4106. For example, the interactive element 4204 may be a clickable button floating above the user-definable requirement 4106. If the user clicks the interactive element 4204, the user-definable requirement 4106 may be deactivated, as a whole, by invoking the display of the user interface 3702 in FIG. 37.

As illustrated in FIG. 42, if the user clicks the interactive element 4204, the user interface 4202 may further display an interactive element 4206 (e.g., a pop-up GUI element) for receiving user inputs to configure the user-definable requirement 4106. The interactive element 4206 may provide buttons, text input boxes, drop-down menus, or any combination thereof, for receiving user inputs. For example, in FIG. 42, a user may select a button "daily" (represented as a shaded box), input "1" in a text input box, and select "9 AM" in a drop-down menu, to configure the user-definable requirement 4106 as "every 1 day at 9 AM." In another example, the user may input other data in the interactive element 4206 to configure the user-definable requirement 4106 as every N days (N being an integer) at any time, every N weeks at any time on any day of week, or every N months at any time on any date of month.

In some embodiments, the user-definable requirements of the selected logical template may be dynamic such that input of at least one user-definable requirement is configured to cause a change in the logical template. A dynamic user-definable requirement of a logical template as used herein may include a user-definable requirement, that when altered, can cause a change in the logical template. A change of the logical template as used herein may refer to a change in structure or elements (e.g., triggers and actions, or pre-defined requirements and user-definable requirements).

Figure 43:
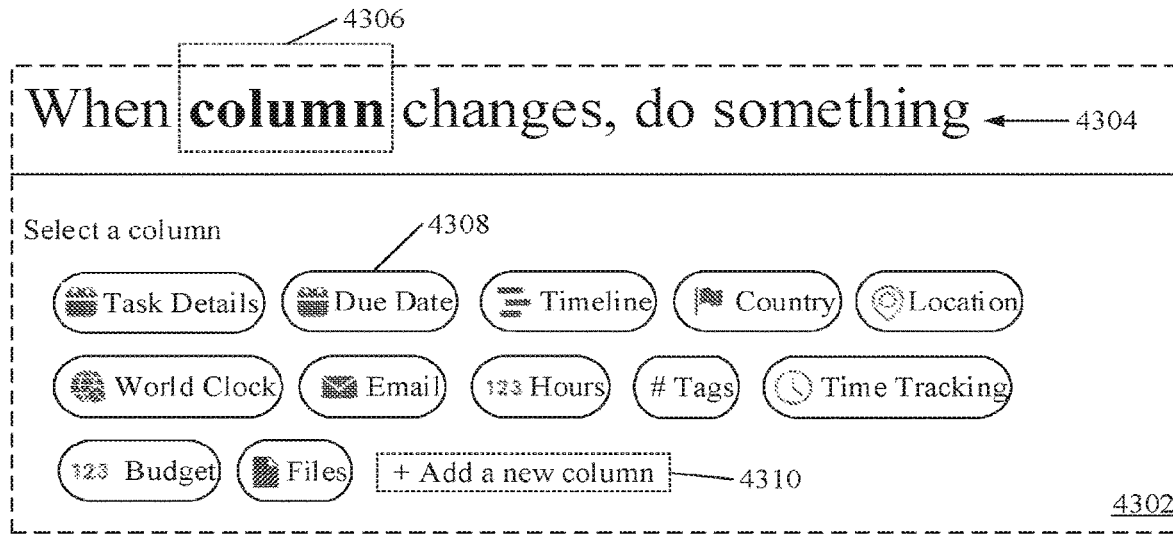
FIG. 43 illustrates an example of a logical template showing a dynamic user-definable requirement in a user interface, consistent with some embodiments of the present disclosure.

By way of example, FIG. 43 illustrates an example of a logical template 4304 showing a dynamic user-definable requirement 4306 in a user interface 4302, consistent with embodiments of the present disclosure. In FIG. 43, the dynamic user-definable requirement 4306 may be displayed in bold or in any other differentiating manner, representing that it is user-definable. Referring back to FIGS. 39 and 40, the user interfaces 3902 and 4002 display multiple interactive elements (e.g., buttons) below the logical template 3908, including an interactive element 3908 ("column changes"). For example, the system may retrieve the multiple interactive elements from a repository (e.g., any of data repositories 230-1 through 230-n) and display them in the user interface 3902 in FIG. 39 or the user interface 4002 in FIG. 40. In some embodiments, the system may select the logical template 4304 and display it in the user interface 4302 as illustrated in FIG. 43 after receiving data indicating that the user selected the interactive element 3908 in the user interface 3902 or the user interface 4002. The user interface 4302 may display the logical template 4304 ("when column changes, do something") that may include the dynamic user-definable requirement 4306 ("column").

As illustrated in FIG. 43, the user interface 4302 further displays multiple interactive elements (e.g., buttons) for receiving user inputs to configure the dynamic user-definable requirement 4306, including an interactive element 4308 ("Due Date"). For example, the system may retrieve the multiple interactive elements from a repository (e.g., any of data repositories 230-1 through 230-n) and display them in the user interface 4302. If the system receives an input (e.g., a clicking or tapping of a user) for any of the multiple interactive elements, the system may cause a change in the logical template 4304. For example, if the system receives data indicating that the interactive element 4308 is selected, the system may change the logical template 4304 and display it in another user interface described as follows.

Figure 44:
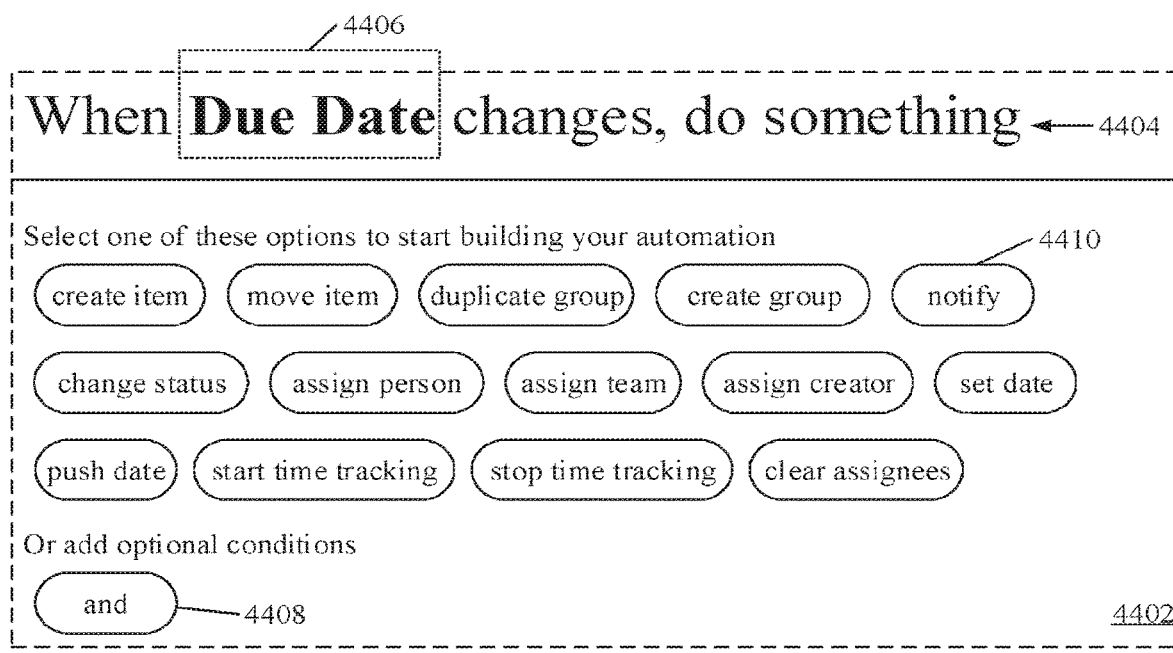
FIG. 44 illustrates another example of a logical template showing a dynamic user-definable requirement in a user interface, consistent with some embodiments of the present disclosure.

FIG. 44 illustrates an example of a logical template 4404 showing a dynamic user-definable requirement 4406 in a user interface 4402, consistent with embodiments of the present disclosure. In FIG. 44, the dynamic user-definable requirement 4406 are display in bold, representing that it is user-definable. In some embodiments, the system may change the logical template 4304 to the logical template 4404 and display the logical template 4404 in the user interface 4402 after receiving data indicating that the user selects the interactive element 4308 in the user interface 4302. Further, the system may also change the multiple interactive elements associated with the dynamic user-definable requirement 4306, as illustrated in FIG. 43, to multiple interactive elements (e.g., buttons) associated with the action "do something" of the dynamic user-definable requirement 4406, as illustrated in FIG. 44, which are displayed under the dynamic user-definable requirement 4406.

In some embodiments, if the user interface displays multiple interactive elements (e.g., buttons) for receiving user inputs to configure the dynamic user-definable requirement, the user interface may further include an interactive element (e.g., a button or a hyperlink) for adding additional interactive elements other than those displayed. For example, after receiving data indicating that a user selects such an interactive element, the system may display (e.g., in a popup window, a drop-down menu, a new webpage, or any GUI element) options for the user to select the additional interactive elements other than those displayed for configuring the dynamic user-definable requirement.

The additional interactive elements may be of any datatype (e.g., a date, a person, a number, a timeline, a text, a status), in any form (e.g., a checkbox, a link, a clock, an address, a menu, a button, a file, a tag), for any purpose (e.g., for voting, rating, time tracking, calling a phone number, sending an email). In some embodiment, the system may provide the additional interactive elements in combinations, such as a date plus a status, or a timeline plus a status. In some embodiments, the system may acquire (e.g., via an API) the additional interactive elements from an external service provider (e.g., an external email server, an external instant message server, or an external map server) and provide it for the user to select, such as via a "marketplace" user interface.

By way of example with reference to FIG. 43, the user interface 4302 includes an interactive element 4310 ("add a new column") for adding additional interactive elements other than those displayed.

In some embodiments, the change in the logical template may include a presentation of at least one option for an additional user-definable requirement. For example, the presentation of the at least one option may include displaying the at least one option in a user interface. If a user selects the at least one option displayed in the user interface, the system may enable adding an additional user-definable requirement to the selected logical template.

By way of example, with reference to FIG. 44, after changing the logical template 4304 to the logical template 4404, the system may present (e.g., display) an option for adding an additional user-definable requirement in the user interface 4402 as an interactive element 4408 ("add"). For example, if the user selects the interactive element 4408, the system may directly add the additional user-definable requirement (e.g., "status") to the logical template 4404 such that changing "when due date changes, do something" to "when due date and status changes, do something" (not shown in FIG. 44).

In some embodiments, a change in the logical template may include a presentation of at least one additional predefined requirement. For example, the change in the logical template may include a change in its logic structure that may add the additional predefined requirement (e.g., a verb-like, proposition-like, or conjunction-like element) to the logical template.

Figure 45:
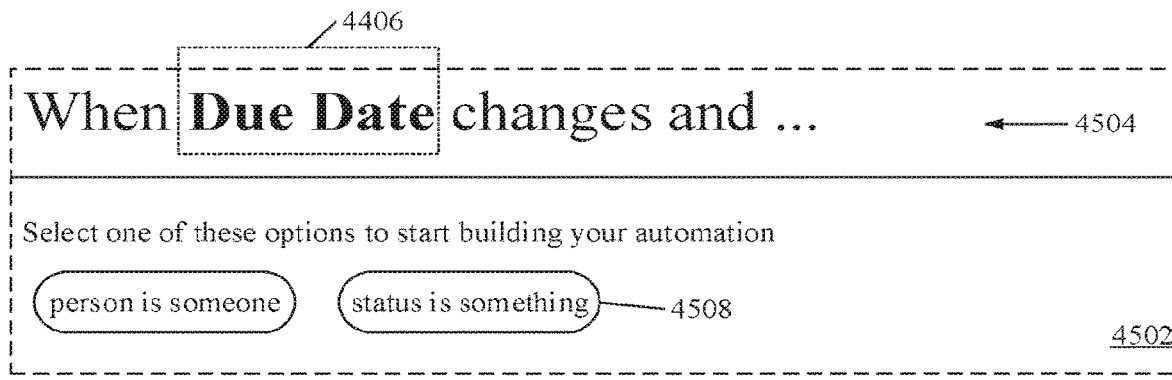
FIG. 45 illustrates another example of a logical template showing a dynamic user-definable requirement in a user interface, consistent with some embodiments of the present disclosure.

FIG. 45 illustrates an example of a logical template 4504 showing a dynamic user-definable requirement 4406 in a user interface 4502, consistent with embodiments of the present disclosure. In some embodiments, the system may display the logical template 4504 in the user interface 4502 after receiving data indicating that the user selects the interactive element 4408 in the user interface 4402. As illustrated in FIG. 45, the system presents (e.g., displays) an additional predefined requirement "and" (and no longer displays "do") in the logical template 4504, compared with the logical template 4404 in FIG. 44.

In some embodiments, if the change in the logical template includes a presentation of the at least one first additional predefined requirement, the change in the logical template may further include a presentation of at least one option for an additional user-definable requirement. For example, the presentation of the at least one option may include displaying the at least one option in a user interface. If a user selects the at least one option displayed in the user interface, the system may enable adding an additional user-definable requirement to the selected logical template.

In some embodiments, the change in the logical template may further include a presentation of at least one second additional predefined requirement. For example, if a user selects the at least one option displayed in the user interface, the system may enable adding a second additional predefined requirement to the logical template in addition to adding the additional user-definable requirement to the logical template.

Figure 46:
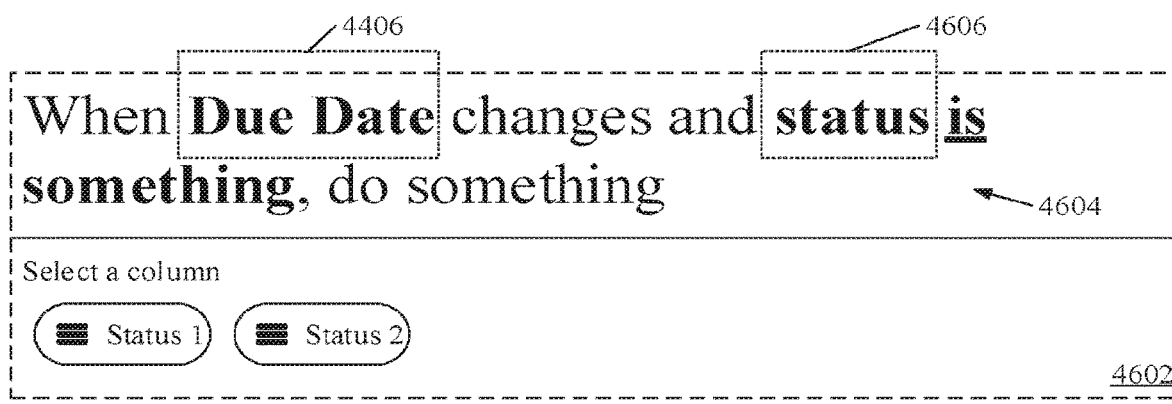
FIG. 46 illustrates an example of a logical template in a user interface showing multiple user-definable requirements, consistent with some embodiments of the present disclosure.

FIG. 46 illustrates an example of a logical template 4604 in a user interface 4602 showing multiple user-definable requirements, consistent with embodiments of the present disclosure. In FIG. 46, the user interface 4602 includes multiple user-definable requirements, including the user-definable requirement 4406 ("Due Date"), the user-definable requirement 4606 ("status"), and "something." The multiple user-definable requirements in the user interface 4602 may be displayed in bold or in any other manner, representing that they are user-definable. Compared with the logical template 4504, the user-definable requirement 4606 ("status") and "something" are additional user-definable requirements.

Referring back to FIG. 45, the user interface 4502 displays multiple interactive elements (e.g., buttons) below the logical template 4504, including an interactive element 4508 ("status is something"). For example, the system may retrieve the multiple interactive elements from a repository (e.g., any of data repositories 230-1 through 230-n) and display them in the user interface 4502. In some embodiments, the system may dynamically change the logical template 4504 to the logical template 4604 and display the logical template 4604 in the user interface 4602 after receiving data indicating that the user selected the interactive element 4508 in the user interface 4502. Further, the system may also change the multiple interactive elements associated with the user-definable requirement 4406, as illustrated in FIG. 45, to multiple interactive elements (e.g., buttons) associated with the user-definable requirement 4606 (e.g., "Status 1" and "Status 2"), as illustrated in FIG. 46, which are displayed under the user-definable requirement 4606. For example, the system may retrieve the multiple interactive elements from a repository (e.g., any of data repositories 230-1 through 230-n) and display them in the user interface 4602.

By way of example, the user-definable requirement 4606 may be dynamic. For example, similar to the user interface 4302 of FIG. 43, the user interface 4602 further displays multiple interactive elements (e.g., "Status 1" and "Status 2") for receiving user inputs to configure the user-definable requirement 4606. If the system receives data indicating that the user selected the interactive element "Status 1" in the user interface 4602, the system may change the logical template 4604 to be "when Due Date changes and Status 1 is something, do something" (not shown in FIG. 46).

As illustrated in FIG. 46, the logic template 4604 dynamically changed from the logical template 4504 and includes an additional predefined requirement "is" (shown as a bold text with an underline in FIG. 46). In some embodiments, the additional predefined requirement "is" can be deactivated, such as by replacing it with another predefined requirement (e.g., "is not"). For example, if a user clicks on the additional predefined requirement "is", the system may display an interactive element (e.g., a popup window, a drop-down menu, a new webpage, or any GUI element, not shown in FIG. 46) that may provide a list of predefined requirements (e.g., "is" and "is not") for the user to select. By enabling the user to select from the list, the system may change the additional predefined requirement "is."

Consistent with disclosed embodiments, the at least one processor of the system may carry out operations that may involve enabling association of the selected logical template with a row. "Associating," as used herein, may refer to processes or procedures of establishing a relationship or connection between at least one thing and at least one other thing. The relationship or connection may be implemented as a data structure stored in a memory or through any other linking mechanism. In some embodiments, at least one of the plurality of data objects or columns may store an indicator (e.g., a flag, a pointer, or a shading) for representing that specific data object(s) are associated in some way. For example, if the plurality of objects are data objects or "things" stored in the memory, associating them may be implemented as processes or procedures to link them or represent them using a data structure (e.g., members of a single class). For example, if the two or more things are stored as digital data in a non-transitory computer-readable medium (e.g., a memory or a storage device), the relationship or connection may be established by linking the two or more things, or by assigning a common code, address, or other designation to the two or more things in the non-transitory computer-readable medium. In this example, the two or more things may include a selected logical template and the row.

The row enabled to be associated with the selected logical template may be a row of the table having a plurality of horizontal and vertical rows enabled to be formed by the system. In some embodiments, the user-definable requirements of the selected logical template may be associated with one or more portions (e.g., columns or rows) of the table having a plurality of horizontal and vertical rows enabled to be formed by the system.

By way of example, the table may be the table 3800 in FIG. 38, and the selected logical template may be the logical template 3704 in FIG. 37. The system may associate the selected logical template 3704 with one or more rows in the table 3800. For example, the logical template 3704 includes a user-definable requirement "this" that may be associated with one or more rows or columns of the table 3800, such as any combination of the rows that includes "Task 1," "Task 2," or "Task 3." In an example, "this" may be associated with the first column 3802 such that "when this happens" in the logical template 3704 may be defined as a status change in any row of table 3800 (e.g., "when a status of any row changes").

By way of example, a table 3800 in FIG. 38, may be associated with selected logical template 4304 in FIG. 43. The multiple interactive elements in the user interface 4302 may be column headings of the table 3800. For example, the interactive element 4308 may be the second column heading 3808 of the table 3800 as illustrated in FIG. 38. After receiving data indicating that any of the multiple interactive elements is selected by a user, the system may enable input into the selected logical template 4304 of a column associated with the column heading represented by the selected interactive element for the dynamic user-definable requirement 4306, enabling association of the selected logical template 4304 with a row of the table. For example, if the system receives data indicating that the interactive element 4308 is selected, the system may enable input into the selected logical template 4304 of the second column 3806 of the table 3800 for the dynamic user-definable requirement 4306, enabling association of the selected logical template 4304 with one or more rows (e.g., any combination of the rows that includes "Task 1," "Task 2," or "Task 3") of the table 3800. The result of the association may be the logic template 4404 as illustrated and described in FIG. 44.

Consistent with disclosed embodiments, the at least one processor of the system may carry out operations that may involve executing logic operations defined by the selected logical template to operate on the row in response to the association of the selected logical template with the row. For example, the logic operations defined by the selected logical template may be any combination of a trigger or an action.

In some embodiments, the system may monitor the plurality of horizontal and vertical rows of the formed table to determine whether a trigger of the logic operations is met in the row associated with the selected logical template. If the trigger is met, the system may execute an action of the logic operations. Monitoring, as used herein, may refer to any process or procedure of inspecting, checking, or keeping track of statuses or changes of an object. For example, if the object is a computer data object stored in the memory, monitoring the computer data object may be implemented by inspecting it (e.g., continuously or periodically) to determine whether the is any change in the memory space where it is stored. The inspection may be implemented via an API (e.g., a periodic polling API or a timer).

By way of example, with reference to FIG. 37, the selected logical template 3704 may define logic operations that includes the trigger "when this happens" and the action "do something." The system may associate the logical template 3704 with the table 3800 in FIG. 38. The system may monitor (e.g., via an API, such as a periodic polling API) one or more rows (e.g., any combination of the rows that includes "Task 1," "Task 2," or "Task 3") of the table 3800 to determine whether "this" happens in one of the rows. If "this" happens, the system may execute "something" as defined in the logical template 3704.

Figure 47:
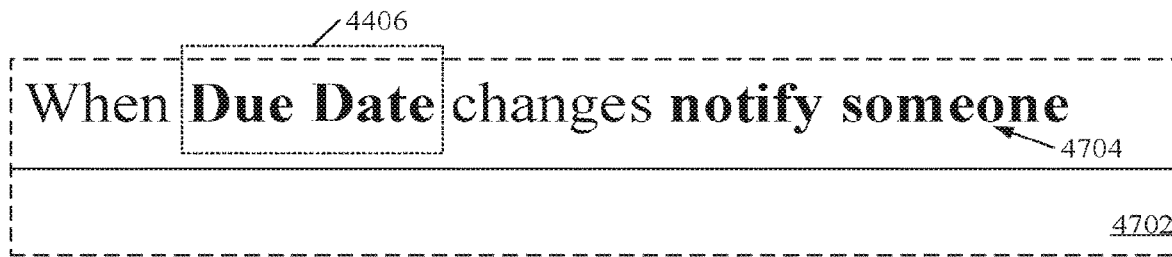
FIG. 47 illustrates an example of a logical template showing a logic operation in a user interface, consistent with some embodiments of the present disclosure.

FIG. 47 illustrates an example of a logical template 4704 showing a logic operation in a user interface 4702, consistent with embodiments of the present disclosure. Referring back to FIG. 44, the user interface 4402 displays multiple interactive elements (e.g., buttons) below the logical template 4404, including an interactive element 4410 ("notify"). For example, the system may retrieve the multiple interactive elements from a repository (e.g., any of data repositories 230-1 through 230-*n*) and display them in the user interface 4402. In some embodiments, the system may change the logical template 4404 to the logical template 4704 and display the logical template 4704 in the user interface 4702 after receiving data indicating that the user selects the interactive element 4410 in the user interface 4402.

As illustrated in FIG. 47, the logic template 4704 includes a trigger "when Due Date changes" and an action "notify someone." For example, the logic template 4704 may be associated with one or more rows of the table 3800 in FIG. 38. In this example, the system may monitor (e.g., via an API, such as a periodic polling API) the table 3800, and if a due date (e.g., in the second column 3806) of a row (e.g., the row including "Task 1") changes (e.g., from "June 30" to "August 31"), the system may execute the logic operations defined in the logic template 4704 to operate on the row by notifying someone (e.g., sending an email to a person supervising Task 1).

"Notify" and "someone" in FIG. 47 are user-definable requirements (represented as bold texts) in the logic template 4704. For example, if a user selects "notify," the system may display a first interactive element (e.g., a popup window, a drop-down menu, a new webpage, or any GUI element, not shown in FIG. 47) for the user to configure the manner of notifying (e.g., to type a text message). In another example, if a user selects "someone," the system may display a second interactive element (e.g., a popup window, a drop-down menu, a new webpage, or any GUI element, not shown in FIG. 47) for the user to configure a person (e.g., the user, a team member of the user, a person included in the table 3800, a subscriber to Task 1, the user's entire team, or a guest) to receive the notification.

Consistent with disclosed embodiments, the at least one processor of the system may further carry out operations that may involve recognizing the user-definable requirements from the table, and displaying the recognized user-definable requirements for selection. Recognizing a user-definable requirement from the table, as used herein, may refer to an operation of determining a row or a column of the table as an interactive element in a user interface for configuring the user-definable requirement in a logical template. For example, the system may determine a column heading associated with a column of the table and display the column heading as an interactive element in a user interface, in which, if a user selects the interactive element to configure the user-definable requirement, the system may associate the logical template with the column. In some embodiments, the system may store the interactive element to a repository (e.g., any of data repositories 230-1 through 230-*n*) after determining the row or the column of the table as the interactive element.

By way of example, with reference to FIG. 43, the user interface 4302 displays multiple interactive elements (e.g., buttons) for receiving user inputs to configure the dynamic user-definable requirement 4306, including an interactive element 4308 ("Due Date"), "Timeline," "Task Details," and so on. The system may recognize some or all of the multiple interactive elements from the table (e.g., the table 3800 in FIG. 38). For example, the system may recognize the interactive element 4308, "Timeline," and "Task Details" from column headings of the second column 3806, the column 3810, and the column 3814 of the table 3800, respectively. Further, the system may display the interactive element 4308, "Timeline," and "Task Details" as interactive elements for selection in the user interface 4302. If a user selects the interactive element 4308 to configure the dynamic user-definable requirement 4306, the system may associate the logic template 4304 with the second column 3806.

Consistent with disclosed embodiments, the at least one processor of the system may further carry out operations that may involve recognizing the user-definable requirements from a plurality of tables, and displaying the recognized user-definable requirements for selection. For example, the system may recognize a user-definable requirement from multiple tables rather than a single table. By doing so, the system may expand the application scope of the logical template beyond a single table.

Consistent with disclosed embodiments, the system may dynamically change the logical template based on the change of the dynamic user-definable requirement in accordance with a dynamic decision tree. For example, the system may receive a user input for a dynamic user-definable requirement, based on which the system may predict (e.g., based on statistics of past user operations or a prediction model determined by a machine learning technique) a next element (e.g., a predefined requirement or another user-definable requirement) for the logical template. Based on the prediction, the system may provide options to change the logical template (e.g., by including the next element as an additional or replacement element). In some embodiments, the change in the logical template may include a change of its presentation, such as a change of the display of the logical template in a user interface.

By way of example, with reference to FIGS. 44 and 47, the system may change the logical template 4404 to the logical template 4704 in accordance with a decision tree. For example, based on statistics of past user behaviors, the system may determine that when a user selects the interactive element 4308 ("Due Date") from the user interface 4302 to configure the dynamic user-definable requirement 4306

("column"), the probable actions (e.g., determined based on frequencies of past user selections) the user intends to do may include notifying someone, changing a status, pushing a date, and starting time tracking. The system may then predict that a next element (e.g., an action) for the logic template 4404 to possibly include such as "notify," "change status," "push date," and "start time tracking." Based on the prediction, the system may display the interactive elements 4410 "notify", "change status," "push date," and "start time tracking," among other interactive elements, in the user interface 4402 for the user's selection to change the logical template 4404. For example, if the user selects the interactive element 4410, the system may change the logical template 4404 to the logical template 4704.

Consistent with disclosed embodiments, before executing the logic operations defined by the selected logical template to operate on the row, the system may enable the user to re-configure or change any of the elements (e.g., a pre-defined requirement or a user-definable requirement) of the logic template in any order. For example, the system may dynamically determine a logic template in a decision tree manner, in which the system may determine a first element and then determine a second element based on a user input for the first element. After determining the second element, the system may still enable the user to change the first element by changing the previous user input.

Figure 48:
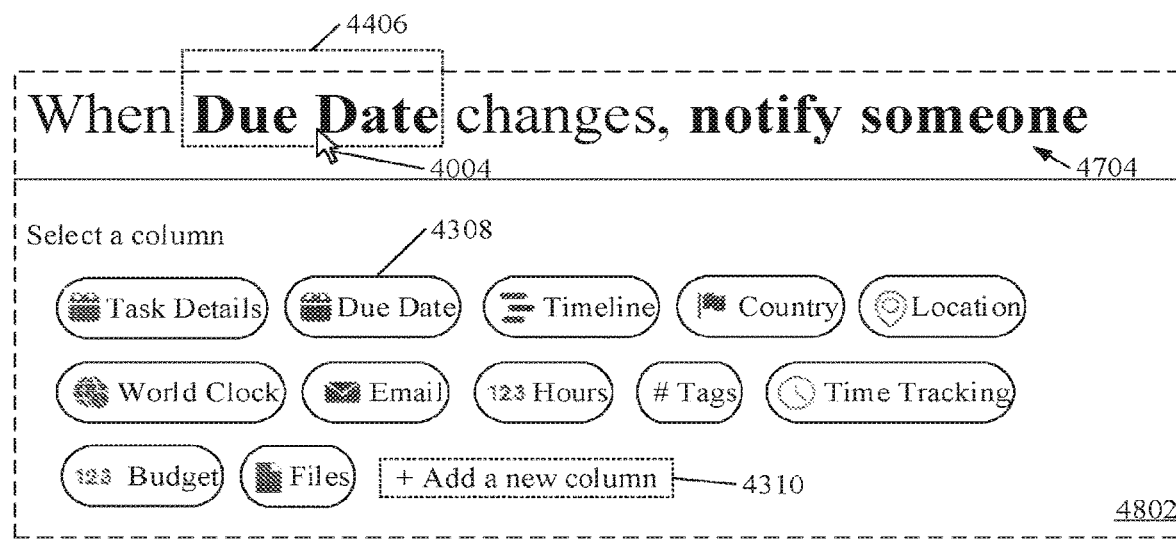
FIG. 48 illustrates an example of re-configuring a logical template in a user interface, consistent with some embodiments of the present disclosure.

FIG. 48 illustrates an example of re-configuring the logical template 4704 in a user interface 4802, consistent with embodiments of the present disclosure. The logical template 4704 is illustrated and described in FIG. 47. In some embodiments, the system may change from displaying the user interface 4702 to displaying the user interface 4802 after receiving data indicating that the cursor 4004 is hovering over (e.g., as a result of a user operation) or having clicked on the dynamic user-definable requirement 4406 of the logical template 4704 in the user interface 4702. Similar to the user interface 4302 in FIG. 43, the user interface 4802 displays multiple interactive elements (e.g., buttons) for receiving user inputs, including the interactive element 4308 ("Due Date") and the interactive element 4310 ("add a new column"). The user may select a different interactive element to re-configure the dynamic user-definable requirement 4406. For example, if the user selects "Timeline" from the user interface 4802, the system may update the logical template 4704 as "when Timeline changes, notify someone" (not shown in FIG. 48).

Consistent with disclosed embodiments, the at least one processor of the system may further carry out operations that may enable creating a logical template in a free-form textual manner.

Different from the selection manner for creating or configuring a logical template as illustrated and described in association with FIGS. 37 and 39 to 48, the system may further enable the user to type free-form text in a user interface from scratch to create a logical template. As the user types the free-form text in the user interface, the system may recognize a word (e.g., by comparing with a keyword list) from the typed text, regardless of its location in the typed text, to determine whether the recognized word is a predefined requirement or a user-definable requirement. Based on the recognized word, the system may predict a next element (e.g., in accordance with a decision tree technique) for the typed text and provide options for the user to select. In some embodiments, the system may recognize one or more synonyms of the recognized word such that any synonym of the word will not change the functional behavior of the system.

Figure 49:
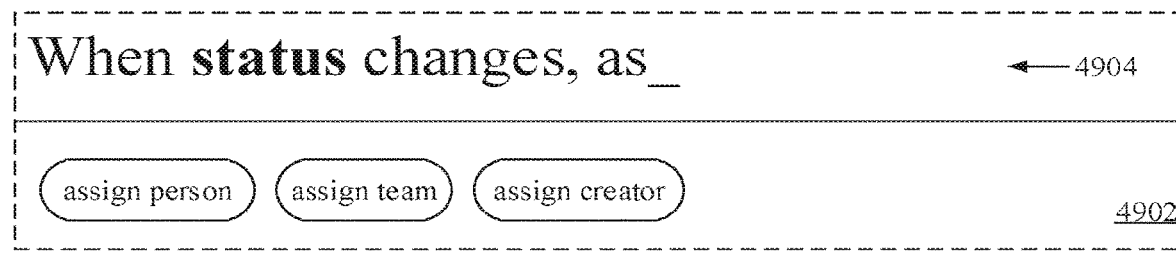
FIG. 49 illustrates an example of creating a logical template with free-form texts in a user interface, consistent with some embodiments of the present disclosure.

FIG. 49 illustrates an example of creating a logical template 4904 with free-form text in a user interface 4902, consistent with embodiments of the present disclosure. As illustrated in FIG. 49, the system may enable a user to type free-form text in the user interface 4902. In FIG. 49, the user types "when status changes, as" with the underscore "_" indication representing a typing cursor. Represented by its bold text, the system may have correctly recognized the word "status" and provided options (not shown in FIG. 49) to the user for selection. For example, the provided options may include an interactive element named with the first column heading 3804 ("Status") in the table 3800 of FIG. 38. If the user selects the interactive element or complete typing the name of the interactive element, the system may associate the first column 3802 with the logical template 4904.

As illustrated in FIG. 49, although the user has not completed typing "assign," the system may predict that the next intended element of the logical template 4904 may include a word "assign," and provide three options (i.e., "assign person," "assign team," and "assign creator") for the user to select for completing the typing. The user may select from one of the three options, or continue typing such that the system may continue predicting what the next element will be.

Figure 50:
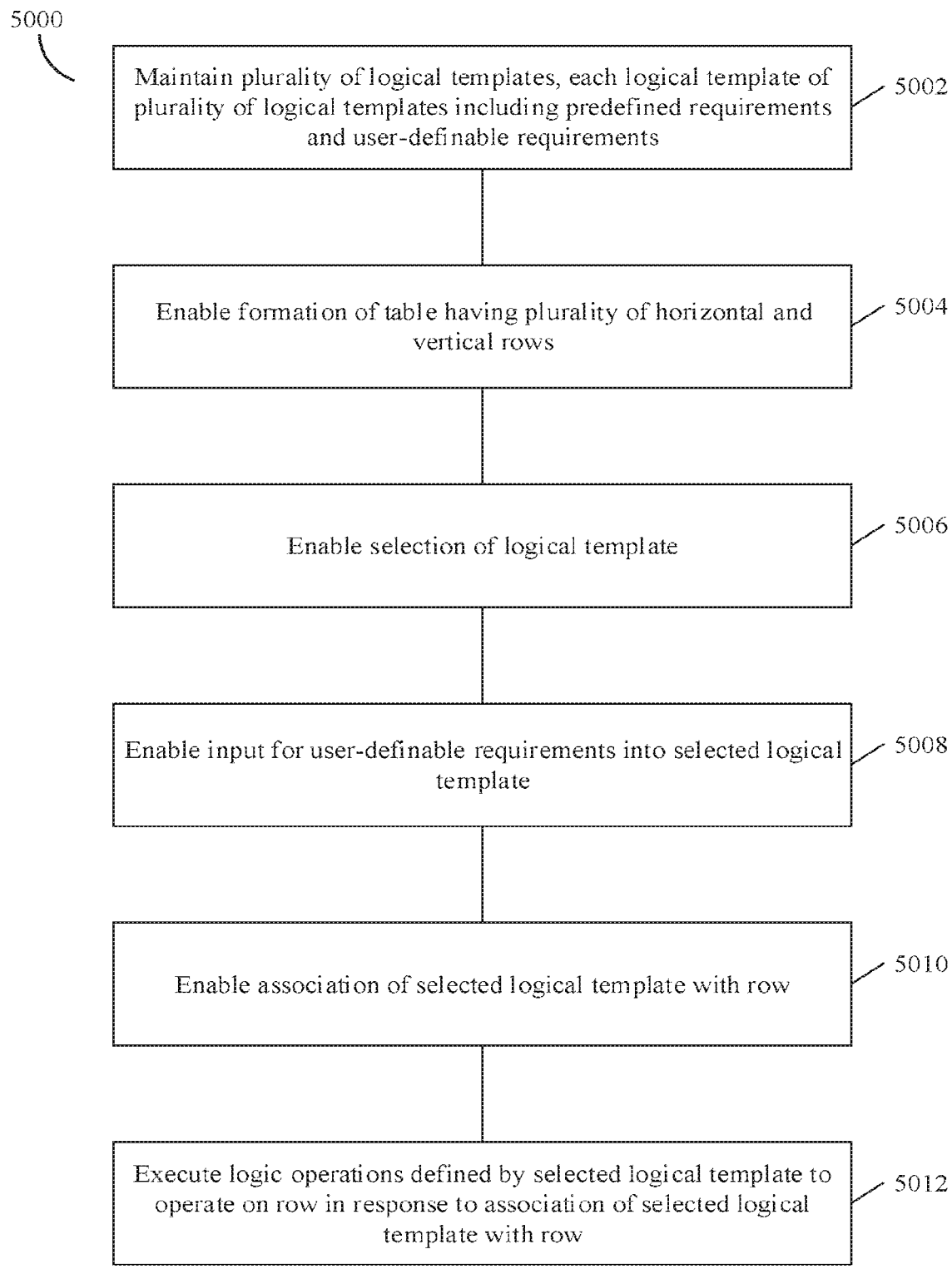
FIG. 50 is a block diagram of an exemplary process for automating tablature, consistent with some embodiments of the present disclosure.

FIG. 50 illustrates a block diagram of an example process 5000 for automating tablature, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 5000 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 37 to 49 by way of example. In some embodiments, some aspects of the process 5000 may be implemented as software (e.g., program codes or instructions) that are stored in a memory (e.g., the memory portion 122 in FIG. 1) or a non-transitory computer-readable medium. In some embodiments, some aspects of the process 5000 may be implemented as hardware (e.g., a specific-purpose circuit). In some embodiments, the process 5000 may be implemented as a combination of software and hardware.

FIG. 50 includes process blocks 5002 to 5012. At block 5002, a processing means (e.g., the processing circuitry 110 in FIG. 1) may maintain a plurality of logical templates. Each logical template of the plurality of logical templates may include predefined requirements (e.g., the predefined requirement 3906 in FIG. 39 or 40) and user-definable requirements (e.g., the user-definable requirement 4106 in FIG. 41 or 42).

At block 5004, the processing means may enable formation of a table (e.g., the table 3800 in FIG. 38) having a plurality of horizontal and vertical rows. For example, the horizontal and vertical rows may include columns 3802, 3806, 3810, 3812, 3814, and 3816, and rows the include "Task 1," "Task 2," and "Task 3" in the table 3800.

At block 5006, the processing means may enable selection of a logical template. For example, the selected logical template may be one of the plurality of logical templates. By way of example, the selected logical template may be any of the logical template 3704 in FIG. 37, the logical template 3908 in FIG. 39 or 40, the logical template 4104 in FIG. 41 or 42, the logical template 4304 in FIG. 43, the logical template 4404 in FIG. 44, the logical template 4504 in FIG. 45, the logical template 4604 in FIG. 46, the logical template 4704 in FIG. 47 or 48, or the logical template 4904 in FIG. 49.

At block 5008, the processing means may enable input for the user-definable requirements into the selected logical template (e.g., the logical template 4304 in FIG. 43). In some embodiments, the user-definable requirements may be dynamic such that input of at least one user-definable requirement is configured to cause a change in the logical template. For example, the dynamic user-definable requirement may be the dynamic user-definable requirement 4306 in FIG. 43.

In some embodiments, the change in the logical template may include a presentation of at least one option (e.g., the interactive element 4408 in FIG. 44) for an additional user-definable requirement (e.g., the user-definable requirement 4606 in FIG. 46). In some embodiments, the change in the logical template may include a presentation of at least one additional predefined requirement (e.g., the additional predefined requirement "and" in the logical template 4504 in FIG. 45).

In some embodiments, if the change in the logical template includes a presentation of the at least one additional predefined requirement (e.g., the additional predefined requirement "and" in the logical template 4504 in FIG. 45), the change in the logical template further may include the presentation of at least one option for an additional user-definable requirement (e.g., the user-definable requirement 4606 in FIG. 46).

At block 5010, the processing means may enable association of the selected logical template with a row (e.g., a row of the table 3800 in FIG. 38). At block 5012, the processing means may execute logic operations defined by the selected logical template (e.g., the logic operations defined by the logic template 4704 in FIG. 47) to operate on the row in response to the association of the selected logical template with the row.

Consistent with disclosed embodiments, the processing means may further recognize the user-definable requirements from the table (e.g., the table 3800 in FIG. 2), and display the recognized user-definable requirements for selection. Consistent with disclosed embodiments, the processing means may recognize the user-definable requirements from a plurality of tables (e.g., including the table 3800 in FIG. 2), and display the recognized user-definable requirements for selection.

Aspects of this disclosure may relate to integrated and automated communications modules in tables of collaborative work systems, including methods, systems, devices, and computer readable media. For ease of discussion, a non-transitory computer readable medium is described below, with the understanding that aspects of the non-transitory computer readable medium apply equally to systems, methods, and devices. For example, some aspects of such a non-transitory computer readable medium may contain instructions that when executed by at least one processor, causes the at least one processor to perform a communications method via tablature. As used herein, the term "tablature" may refer to a tabular space, surface, or structure. Such spaces, surfaces, or structures may include a systematic arrangement of rows, columns, and/or other logical arrangement of regions or locations for presenting, holding, or displaying information.

In some embodiments, tablature may involve a table of various cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item.). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons.

Aspects of this disclosure may include generating a table containing cells for holding values. A table may be generated and may be presented to a user in any manner in which the user is capable of viewing information associated with the table. A table may be generated, for example, via a display screen associated with a computing device such as a PC, laptop, tablet, projector, cell phone, or personal wearable device. A table may also be generated virtually through AR or VR glasses. Other mechanism of generating may also be used to enable a user to visually comprehend presented information. Such information may be generated in cells. A cell may include any area, region or location in which information may be held, displayed, or otherwise presented. Values contained in the cells may include numeric, alphanumeric, or graphical information. The cells may be arranged in the table in vertical and horizontal rows (e.g., rows and columns), or in any other logical fashion.

By way of one example, a table containing cells for holding values may include board 3300 in FIG. 33. As illustrated in this example, cells are defined by intersections of horizontal rows 3302, 3304, 3306, 3308 and 3310 and vertical rows (columns) 3312, 3314, 3322, and 3332. The values represented in the cells may include alphanumeric item designations such as in column 3332, graphical information such as illustrated in cell 3330; dates such as illustrated in column 3314, times as illustrated in column 3332, and combinations of graphics as alphanumerics, such as illustrated in column 3312. In one embodiment, in an item which may be an assigned task, may have a "status" cell containing alternative designation values such as "done", "stuck", "working on it", or any other alphanumeric value that conveys information.

Aspects of this disclosure may include enabling association of a communications rule with a specific cell of the table. A communications rule may include any direction, command, or logical set of steps that causes a transmission, relay, reporting, or routing of information in response to a condition. In some embodiments, a communications rule may allow for automations of various tools within a collaborative work system. Additionally, in some embodiments, a communications rule may allow for integrations of various external third-party tools with a collaborative work system (e.g., inputting and/or exporting data from/to the third-party provider to the board).

The system be enabled to associate a communications rule with a specific cell of a table by linking the rule to the specific cell. In some embodiments, the system may be enabled to associate a communications rule with a column in a first table or in a second table. For example, a communications rule may be associated with a column containing telephone numbers and link the communications rule to every cell within the column. Such a linkage may occur, for example, via a graphical user interface that enables a cell to be selected and a conditional action to be associated with the cell. Numerous interfaces might be alternatively provided to enable a user to associate a communications rule with a specific cell. Such interfaces may include drop down lists, pick lists, logical statement construction tools, if-then or if-then-else branching and/or logical tools, or any other mechanism that allows a cell to be selected and rule associated with it.

According to some aspects of this disclosure, a communications rule may include a trigger that activates when a specific value in the specific cell meets a criterion. A trigger may include an aspect of the rule (e.g., code) that recognizes a specific value in a cell, determines that it meets a criterion, and causes a resulting event, circumstance, action, process, or situation to occur as a result. A specific value contained in cells may include numeric, alphanumeric, or graphical information. Similarly, a criterion associated with a communications rule may contain numeric, alphanumeric, or graphical information, or a range of such information (e.g., a range bounded on one or more ends by at least one boundary defining more than one specific value that may activate the trigger, such as a numeric range, a region, a category, a class, or any other criterion that defines multiple values.) When a match is detected between information in the cell and a criterion associated with the trigger, the criterion of the trigger may be met, and a result of the communications rule may be triggered.

The specific value contained in cells may be input or updated manually or automatically and may also be updated through a recalculation as a result of another value in the same table, in another table, or from information derived from another source. A criterion which may be static or variable, may include a standard or threshold on which a judgment or decision (such as a trigger) may be based. In some embodiments, when a specific value in the specific cell meets a criterion, a trigger may automatically activate. In some embodiments, the specific value may be compared to the criterion continuously or periodically to determine whether the criterion is met and whether the trigger should be activated. In other embodiments, the comparison may occur periodically, or only after a precursor condition is met.

Figure 51:
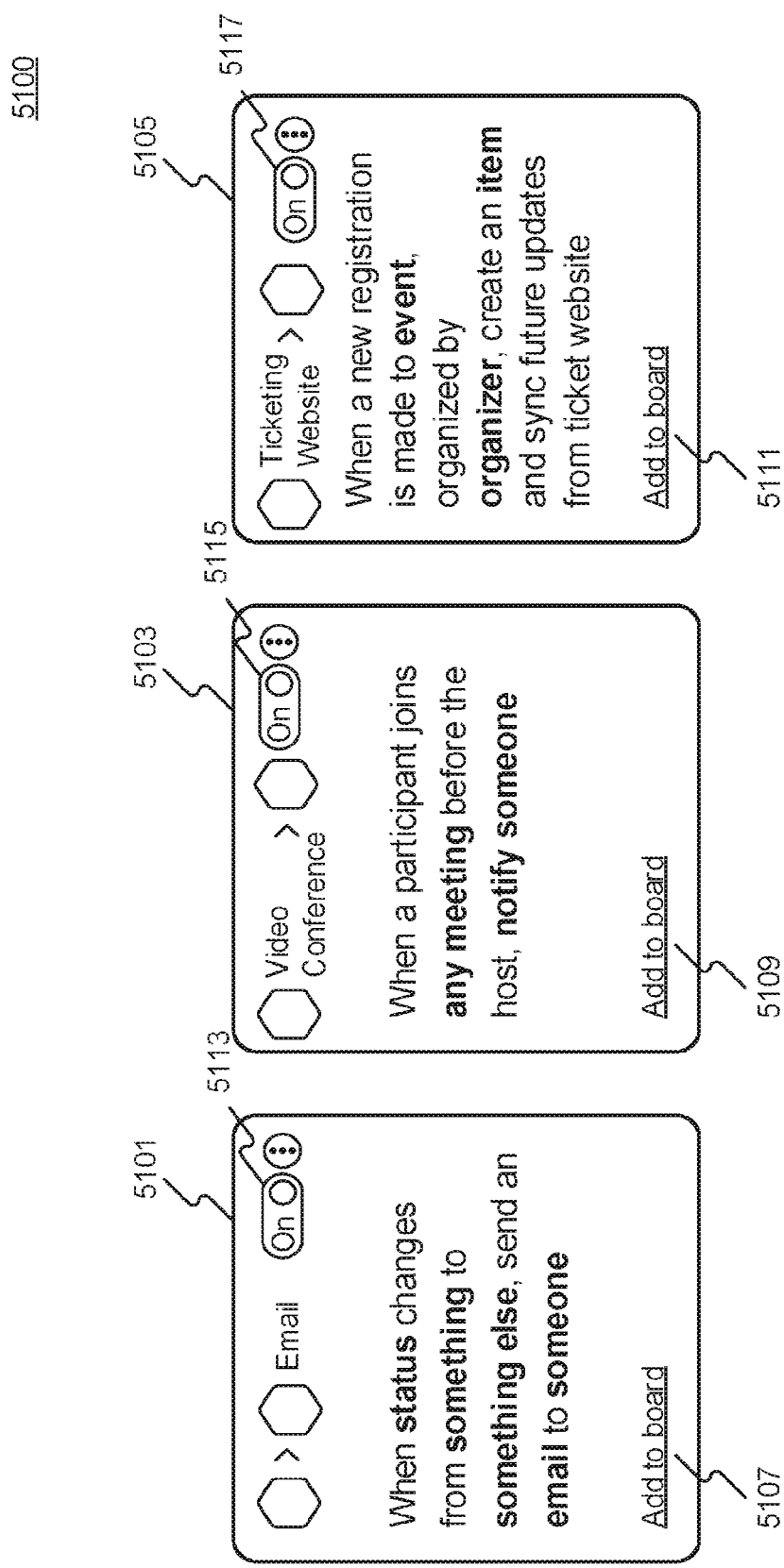
FIG. 51 illustrates three alternative examples of interfaces for enabling association of a communications rule with a cell, consistent with some embodiments of the present disclosure.

For example, FIG. 51 illustrates three alternative examples of interfaces, generated or presented on a display, that allow communication rules to be associated with cells. The three alternative examples of interfaces include three automated communications rules (rules created by the collaborative work system and which may also be referred to in some instances as logical templates) that may be added to a user's board via a link. Automated communications rule 5101 may integrate a third-party email provider with a collaborative work system. For example, by clicking add to board link 5107, an email may be automatically sent to someone each time a status changes from something to something else on the user's board. Additionally, automated communications rule 5103 may integrate a third-party video conference provider with a collaborative work system. For example, by clicking add to board link 5109, a notification may be automatically sent to someone each time a participant joins any meeting before a host. Additionally, automated communications rule 5105 may integrate a third-party ticketing website with a collaborative work system. For example, by clicking add to board link 5111, an item may be automatically created and future updates from the ticketing website may be synced to the user's board each time a new registration is made to an event organized by a specific organizer. FIG. 51 includes three types of automated communications rules for three third-party providers. However, many types of communications rules may be possible using any cells on a user's board, cells on another board, or any functionality the third-party provider may provide.

In some embodiments, communications rule 5101 may automate internal tools within a collaborative work system. For example, a communications rule may be "when status changes from something to something else, add a new column." In this example, when the condition is met, a new column may be added to either the board on which the user is currently operating, or on some other specified board.

In some embodiments, communications rules, whether automating internal tools or integrating third-party platforms, may be completely automated by the collaborative work system. In some embodiments, communications rules, whether automating internal tools or integrating third-party platforms, may be presented in a phrasal template with phrases editable by the user, as shown and discussed in connection with FIG. 52 through FIG. 57. In some embodiments, communications rules, whether automating internal tools or integrating third-party platforms, may be built by a user typing a sentence or filling in blanks in a predefined sentence. Additionally, the collaborative work system may populate word suggestions for the communications rules as the user types.

In some embodiments, the communication rule may be constructed so that if a cell value matches one or more criterion defined in the communications rule, the trigger will be activated to conduct the action or other result defined by the communications rule. Additionally, automatic triggering may occur as in response to an active or passive input to the board. For example, if a status within an item is manually or automatically changed to "stuck," the board may trigger an associated message to, for example, a predefined address or group of addresses. That message may be sent, for example, via Zoom™, Slack™, Teams™, Outlook™, SMS, Whatsapp™, Facebook Messenger™, or any other third-party platform/integrated communications module. Similarly, in another example, a communication rule may be triggered when a status is manually or automatically changed to "notify" by a user when a particular item is "stuck."

In some embodiments, various applications or third-party provider websites may be used for integrated communications. Such currently available applications may include Twilio™, Typeform™, Mailchimp™, Zendesk™, Jira™, PagerDuty™, Trello™, GitHub™, Slack™, Gmail™, Shopify™, Google Drive™, Drophox™, Google Calendar™, Outlook™, Asana™, Basecamp™, Clearbit™, Todoist™, Box™, Microsoft Teams™, OneDrive™, :Copper™, Woo Commerce™, Facebook™, GitLab™, JotForm™, Stripe™, LinkedIn™, HubSpot™, Pipedrive™, Togg™, SurveyMonkey™, Harvest™, Eventbrite™, Zoom™, or any other external application.. These are just examples, and it is contemplated that over time, additional third-party communications tools will be developed that could also be integrated.

By way of further non-limiting examples, a value in the cell may be any value that is defined in the communications rule. "Done," "stuck," "overdue," "item created," or "every time period" are just a few examples, of values in a status cell that may cause a trigger to automatically activate.

In some embodiments, criterion within the communications rule may be the same as the value in the cell. For example, a communications rule may be configured to trigger when a specific value appears in the cell matching the criterion of the communications rule. Continuing with the status example, the criterion may include "done," or "stuck," or "overdue." and the communications rule may trigger when one of those specific terms appear in a cell. By way of a few other non-limiting examples, the criterion of a communications rule may be the addition of a comment in a cell, the addition of a new item, the addition of a new link, or a change in information previously in the cell. Regardless of the substance, the communications rule might be set to trigger based the addition of or change in information in a cell. Thus, rather than being a specific value, a criterion might trigger the communications rule when someone adds something to conversation, when a file has been added, when a new item has been created, or when someone finished everything in task list.

By way of a few examples, a communication rule may be: when "status" changes to "Notify", send "SMS" to "host". In such an example, "status," "Notify," "SMS," and "host" may all be chosen by the user. In this instance, the criterion that needs to be met is a status change to "Notify," which automatically activates the rest of the communication rule to send an SMS to a host. The specific value in the specific cell in this example is may be the term "notify" within a cell of a status column.

By way of another example, a communications rule may be: when "status" changes, "call" "Host" and "say phrase". In such an example, "status," "call," and "host" may all be chosen by the user. In this instance, the criterion that needs to be met is a status change, which automatically activates the rest of the communication rule to call a host and say a phrase. As implemented, the system may not only record data in a cell, but also may record data when the data in the cell was added and/or last changed. In this way, the system may distinguish new from old and only trigger communication rules that are tied to changes in the first instance that the change is detected.

An example of a numerical threshold communications rule might be: when "Total Hours Invested" exceeds a "Threshold" send an "SMS" to the "Board Owner." An example of a date-based communications rule threshold might be: when "Completion Date" is beyond "Specific Date" send an email to "Supervisor." An example of a numerical threshold rule tied to other boards might be: when "Sales Volume Total" on "Board ID" is below "Sales Volume Threshold" update "Product Review Status Indicator" and send email to "Product Manager." These are but a few examples to indicate that triggers can be based on information on a current board or on another board, the criteria can be any value. Some or all of the values might be static, user definable, or a combination.

Figure 52:
FIG. 52 illustrates a first view of an example of an interface for enabling selection of various prompts in a communications rule to associate the communications rule with a cell, consistent with some embodiments of the present disclosure.

FIG. 52 illustrates an example of a communications rule 5201 which may be defined by a user by clicking various prompts. For example, a user may click on any of the various criterion (may be referred to as user-definable requirements) including Status criterion 5203, Something criterion 5205, email criterion 5207, or someone criterion 5209 to define a communications rule. In this example, the Something 5205 may be considered the criterion used by the trigger of the communications rule to cause a result. The result itself in this example is defined by the Email 5207 and Someone 5209 variables that follow the criterion that serves to trigger the rule. In communications rule 5201, a status change automatically activates the rest of the communication rule to send a message to someone." The Something 5205, Email 5207 and Someone 5209 may be user definable. For example, the user may define the criterion "Done" for Something 5205 and a message for Email 5207. These variables may be selectable via a pick list, or they may be completely definable by a user. Additionally, while this particular example is defined to send an email message, other communications platforms may be either selectable or predefined. Such communications platforms may include, for example, email, SMS, Whatsapp™", Slack™, or any other tool or platform used for communication.

In some embodiments, the criterion may include a permission setting set by the user for enabling transmission of the message. A permission setting may include one or more controls a that allow users to limit who can access information and what information others can see, access, use, transmit, or manipulate. The permission setting may limit access to general communication rules, access to specific third-party communication platforms or applications, and may also limit access to communication rules on a user to user basis. The permission setting may be assigned to specific entities such as individuals or groups of individuals or may also be assigned to specific tables. An exemplary permission setting may involve a prompt to a user when the user does not have permission to access a communication rule or when the user does not have permission to access a specific third-party communication platform. In such instances, the permission setting may trigger a notification to an administrator of the attempted access to allow the administrator to either allow or deny the user access to the communication rule. In another example, a permission setting may restrict the ability for a user to associate a communication rule with a specific cell of a table. The permission setting may require the user to request access from an administrator to access the specific communication rule or a specific third-party communication platform.

In some embodiments, there may also user-specific or board-specific permission settings. Additionally, a user may predefine whether third-party providers may have access to data from the user's board. Any of the toggle buttons in FIG. 51 (toggle button 5113, toggle button 5115, or toggle button 5117) may be toggled to an "off-state" in order to turn off a permission setting associated with a specific communications rule or toggled to an "on-state" in order to turn on a permission setting associated communications rule.

Figure 53:
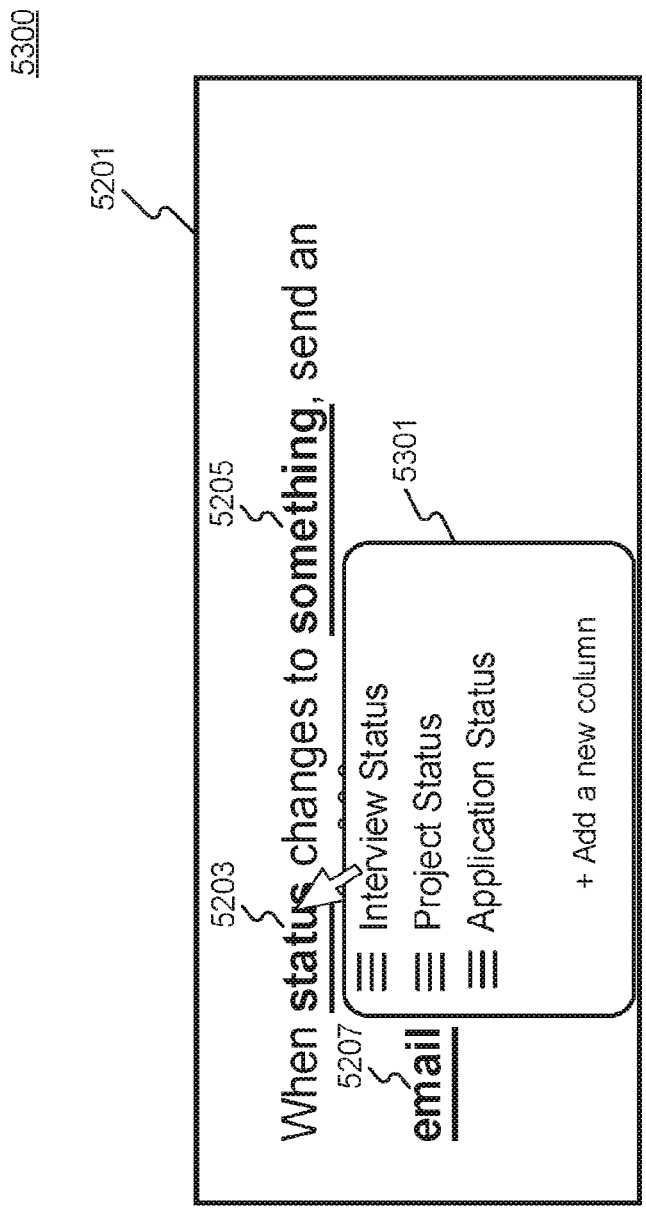
FIG. 53 illustrates a second view of an example of an interface for enabling selection of various prompts in a communications rule to associate the communications rule with a cell, consistent with some embodiments of the present disclosure.

As shown in FIG. 53, communications rule 5201 may be defined by the user clicking various prompts. For example, a user may click on status criterion 5203 to populate a status criterion selection window 5301. The user may select any of the listed statuses (interview status, project status, application status) or select a new status by adding a new column and, as a result, partially define communications rule 5201. In this instance, the status selection may be considered together with the something selection as collectively defining the criterion of communications rule 5201. Specifically, the communications rule 5201 includes a trigger that automatically activates when a specific value in the specific cell meets a criterion. In the case of communications rule 5201, the trigger is activated when a status cell changes to something as defined in the communications rule).

Figure 54:
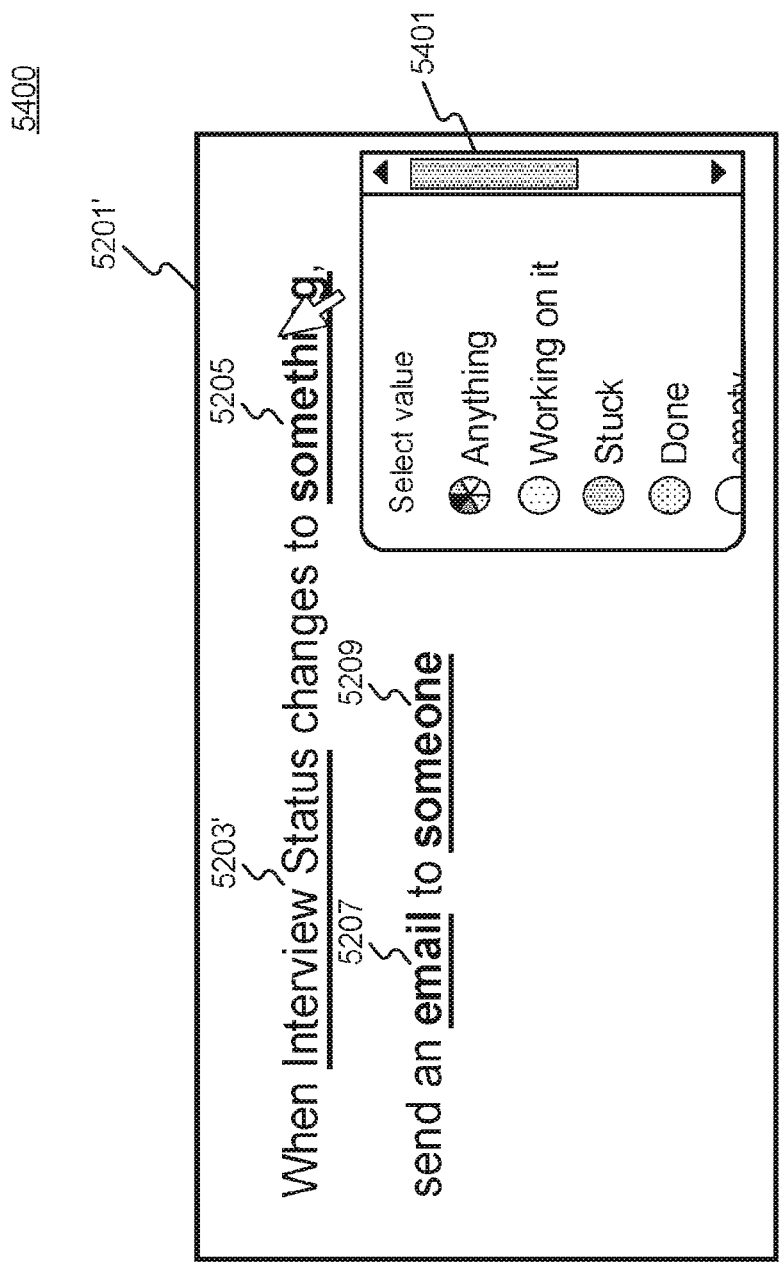
FIG. 54 illustrates a third view of an example of an interface for enabling selection of various prompts in a communications rule to associate the communications rule with a cell, consistent with some embodiments of the present disclosure.

As shown in FIG. 54, updated communications rule 5201' may be further defined by the user clicking various remaining prompts. For example, a user may click on something criterion 5205 to populate a something criterion selection window 5401. The user may select any of the listed something values (anything, working on it, stuck, done, or empty) or select a new something value by adding a new value and, as a result, partially define updated communications rule 5201'. When a user selects "interview status" as the criterion value for status 5203 in FIG. 53, the field is updated with the selected interview status value 5203' as illustrated in FIG. 55.

Figure 55:
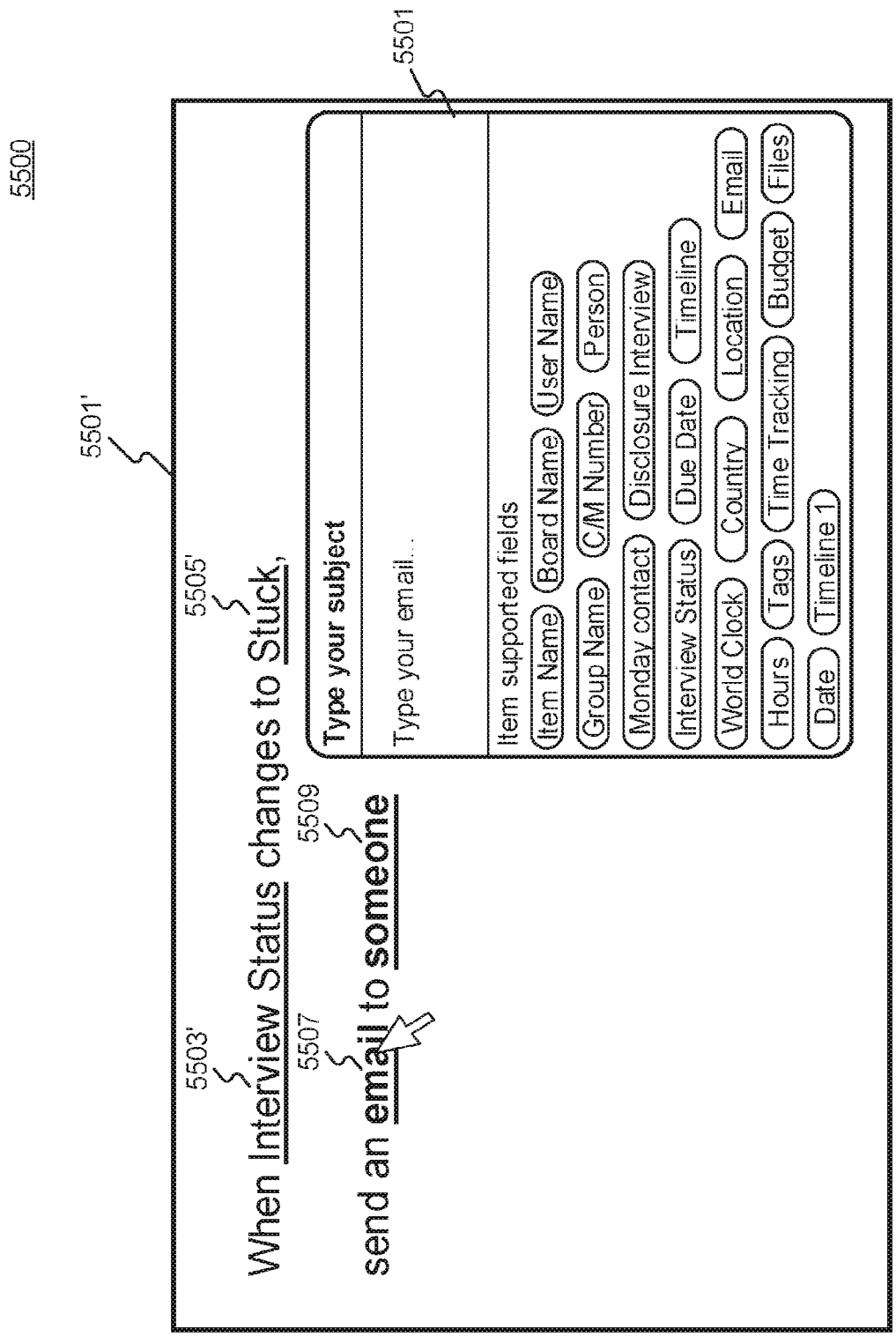
FIG. 55 illustrates a fourth view of an example of an interface for enabling selection of various prompts in a communications rule to associate the communications rule with a cell, consistent with some embodiments of the present disclosure.

As shown in FIG. 55, updated communications rule 5201' may be further defined by the user clicking various remaining prompts. For example, a user may click on email criterion 5207 to populate an email criterion selection window 5501. The user may select any of the listed item supported fields to fill in the email and subject of the email with up-to-date data from the board (in this particular example, such fields include item name, board name, user name, group name, C/M number, person, Monday (platform) contact, disclosure interview, interview status, due date, timeline, world clock, country, location, email, hours, tags, time tracking, budget, files, date, and timeline) or select a new item value by adding a new item and, as a result, partially define updated communications rule 5201'.

Updated status criterion 5203' lists "interview status" as the user already selected the interview status criterion in FIG. 53, updated something criterion 5205' lists "stuck" as the user selected the stuck criterion in FIG. 54.

Figure 56:
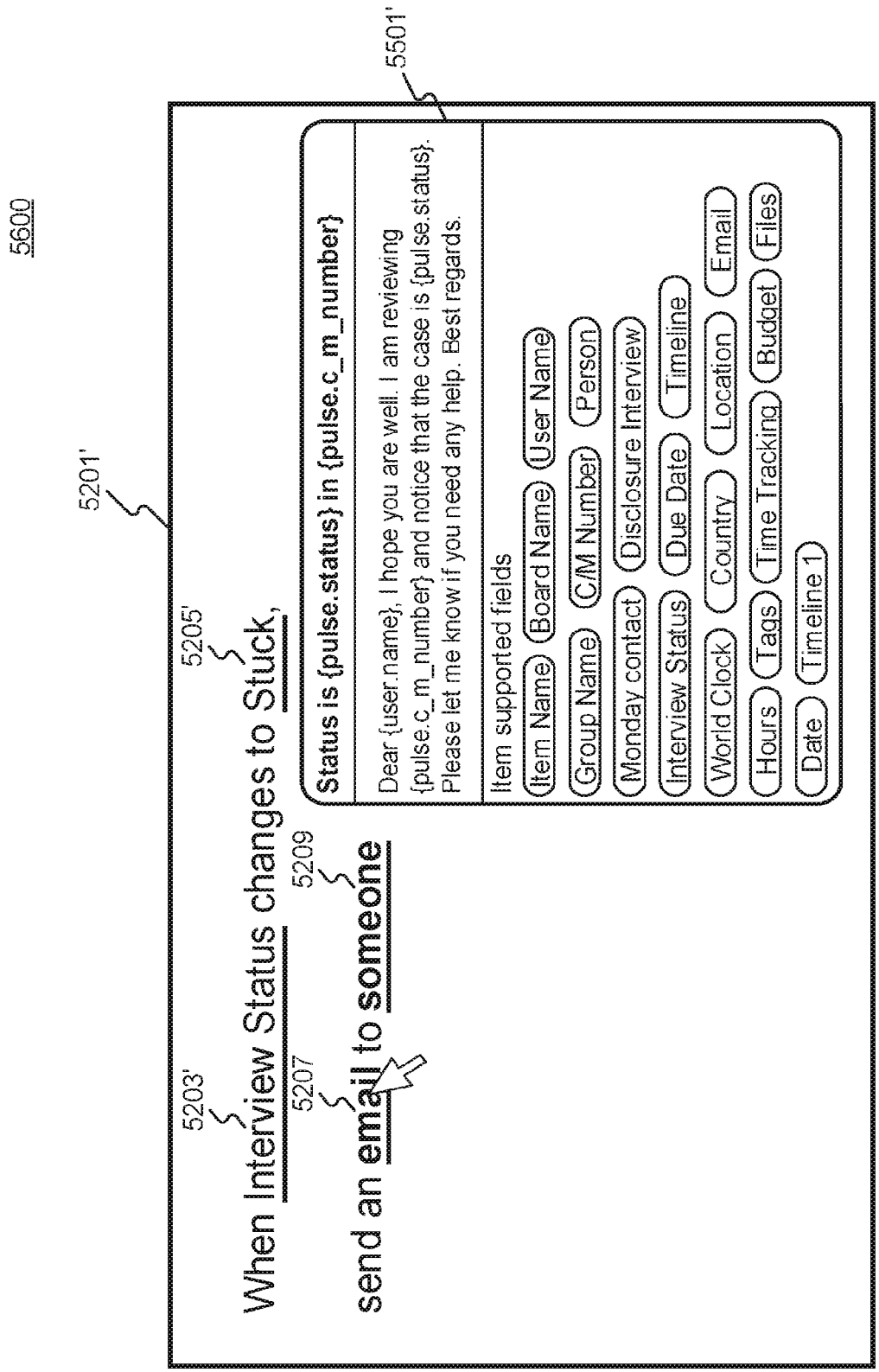
FIG. 56 illustrates a fifth view of an example of an interface for enabling selection of various prompts in a communications rule to associate the communications rule with a cell, consistent with some embodiments of the present disclosure.

As shown in updated email criterion selection window 5501' of FIG. 56, a user may define communications rule 5201' by clicking on item supported fields "interview status," "C/M number," and "user name" to include data from the user's board when typing an email to be sent to someone when an interview status changes to stuck.

Figure 57:
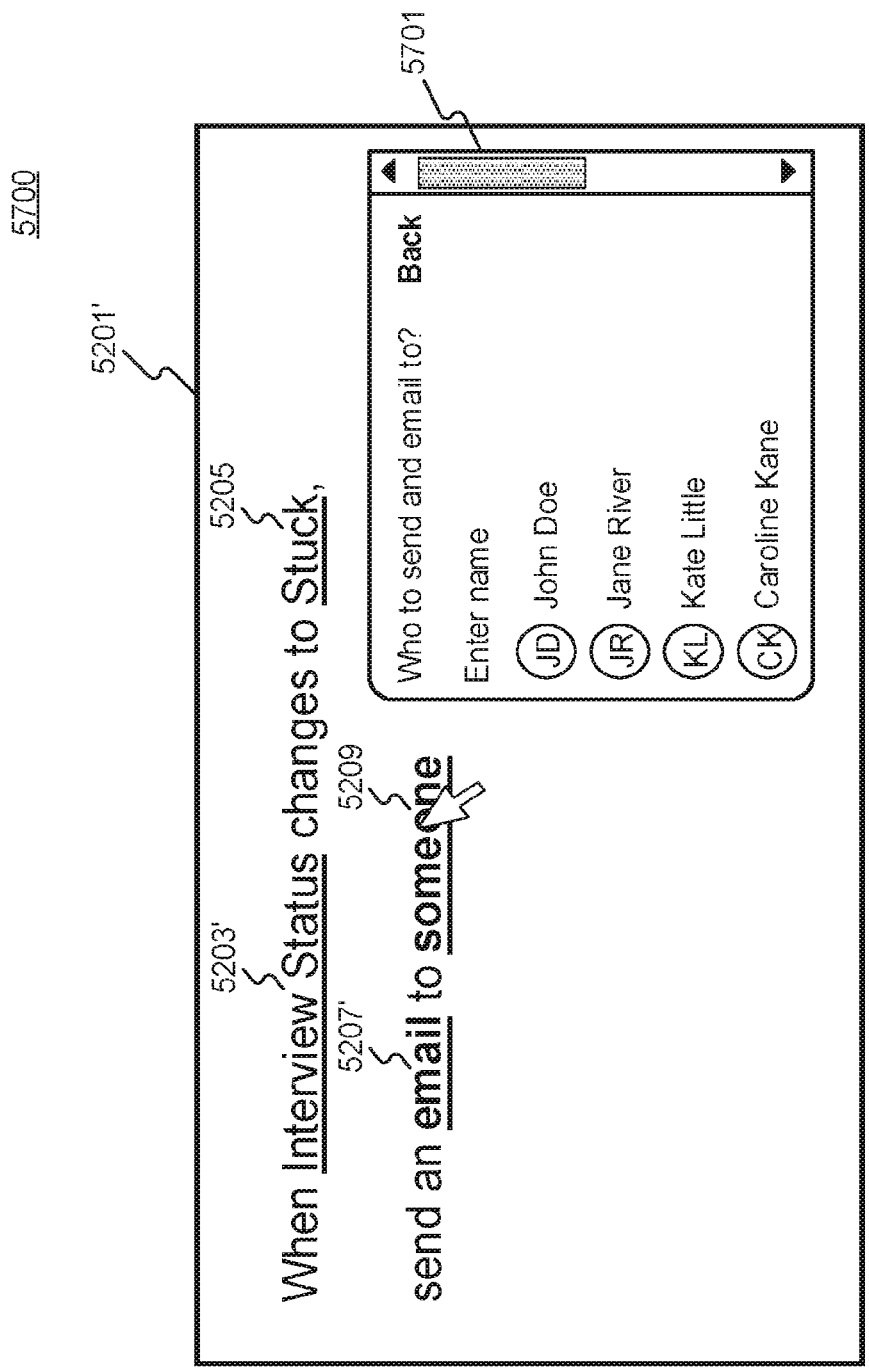
FIG. 57 illustrates a sixth view of an example of an interface for enabling selection of various prompts in a communications rule to associate the communications rule with a cell, consistent with some embodiments of the present disclosure.

As shown in FIG. 57, updated communications rule 5201' may be further defined by the user clicking the remaining prompt. For example, a user may click on someone criterion 5209 to populate a someone criterion selection window 5701. The user may select any of the listed names (in this example, John Doe, Jane River, Kate Little, Caroline Kane) or may select a new name by adding an individual from the board or entering a new email address and, as a result, complete the definition of communications rule 5201'. Updated communications rule 5201' may be added to a list of integrations and automations associated with one or more boards.

Updated status criterion 5203' identifies "interview status," as the user already selected that criterion in FIG. 53, updated something criterion 5205' identifies "stuck" as the user selected that criterion in FIG. 54, and updated email criterion 5207' contains the embedded text of a drafted email as the user defined that text in FIG. 55 and drafted the email in FIG. 56.

Figure 58:
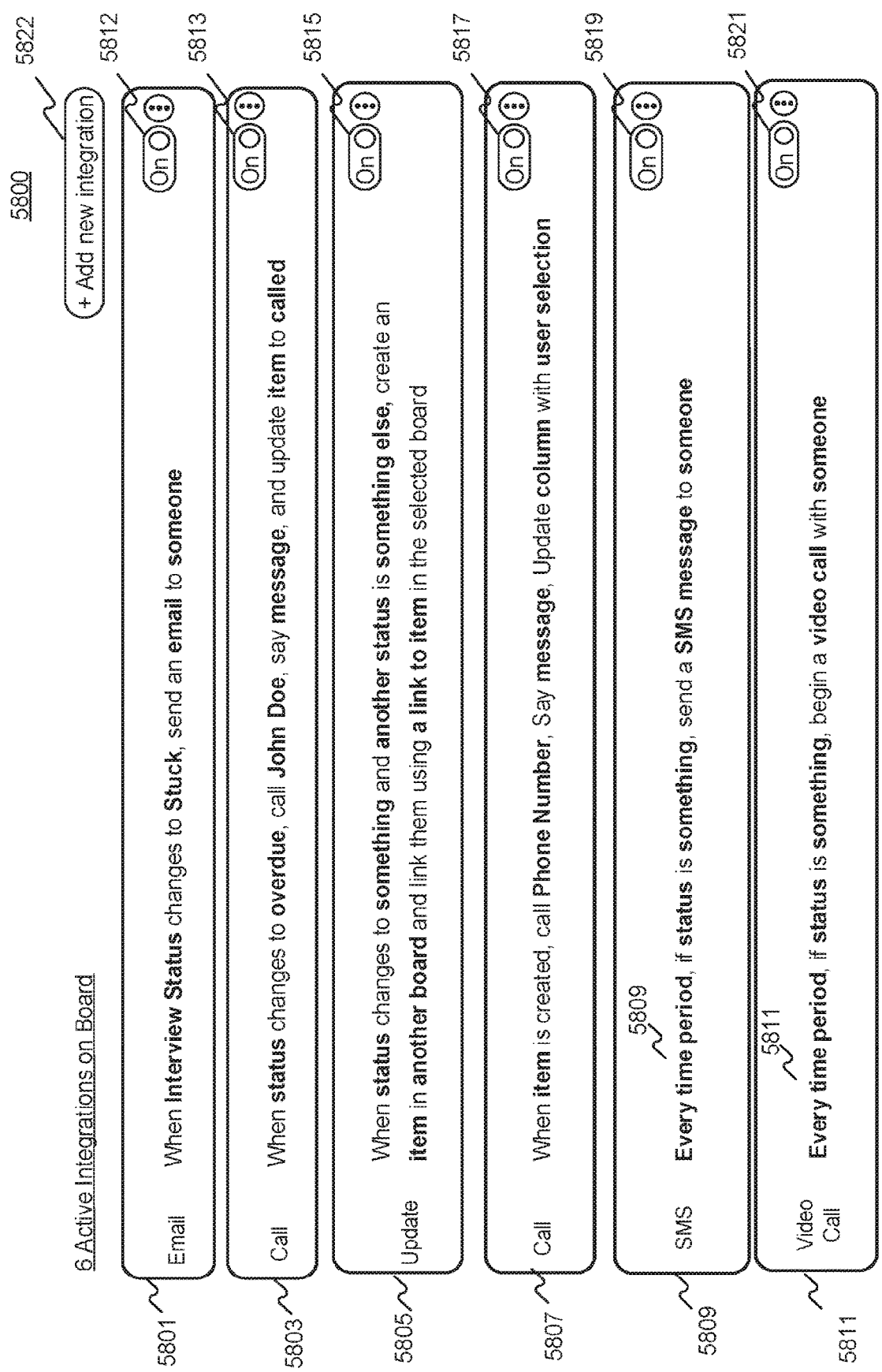
FIG. 58 illustrates an example of an interface listing various active integrations utilizing communications rules associated with one or more cells, consistent with some embodiments of the present disclosure.

FIG. 58 portrays five communication rules (which may also be referred to as logical templates) defined by a user and associated with specific cells in a table. For example, personalized communications rule 5801 may enable an email to be automatically be sent to someone through a third-party provider like Outlook™ or Gmail™ when an interview status changes to stuck in a collaborative work system. When setting up this communications rule, the user may have defined the interview status, stuck, email, and someone. In some embodiments, the user may have included a specific email as shown in FIG. 56 and included a specific recipient as shown in FIG. 57. In communications rule 5801, the communications rule includes a trigger that automatically activates when a specific value in the specific cell meets the criterion of interview status changing to stuck.

FIG. 58 also illustrates personalized communications rule 5803 which may enable the collaborative work system or a third-party provider like WhatsApp™ or Viber™ to automatically call John Doe when a status changes to overdue in the collaborative work system, say a message and update an item to "called" in the collaborative work system. When setting up this communications rule, the user may have defined the status, timeline to be overdue, person to be called, message, item to be updated, and an updated value for the item. In some embodiments, the user may have included a specific message to leave for the person. In some embodiments, the user may select a specific person's voice, select an accent, and select a tone of voice. In such embodiments, the user may type a message and preview the message being read in the specific voice/accent/tone combination.

Communications rule 5803 includes a trigger that automatically activates when a specific value in the specific cell meets a criterion. In this case, the rule is triggered when a status cell changes to overdue (the specific status cell and overdue value may be defined in the communications rule).

Personalized communications rule 5805 in FIG. 58 may enable a collaborative work system or a third-party provider to automatically create an item in another board and link it to an item in a selected board when a status changes to something and another status is something else. When setting up this communications rule, the user may have defined the status, what the status changes to, the other status, what the other status is, the item, and the linked board.

The trigger in communications rule 5805 automatically activates when the specific values in the specified cells meet predefined criteria.

Communications rule 5807 in FIG. 58 may enable the collaborative work system or a third-party provider like WhatsApp™ or Viber™ to automatically call Phone Number, say a message, and update a column with a user selection when an item is created in the collaborative work system. When setting up this communications rule, the user may have defined the item, the phone number, the message, the column, and the user selection. In some embodiments, the user may have included a specific message to leave for the person.

For example, in some embodiments, a user may create a form within the collaborative work system or with a third-party application (such as with SurveyMonkey™) and send out the form to various recipients. The form may request an RSVP to an event as well as additional information from the recipients. The form may also request other information (such as which meal the attendee would like to order). The form may also request the attendees' names and phone numbers. Upon the form being submitted, a new item may be created on the board with cells for attendance, name, phone number, and meal. The RSVP in the form may correspond to a newly created column labeled as "Attending" and may be filled with values (yes or no). Each cell may have values associated with them, such as, yes, Alice Jackson, 301-555-1234, and Salmon Dinner. Having a new item created on the board may then trigger the customizable rule "whenever a new item is created through the form, call the phone number (number entered in form), say (Please confirm that you will you attend the conference on Apr. 1, 2022. Press 1 for yes, press 2 for no). The user's selection may then be included in the update column on a specified board. If the recipient says yes, the board may be updated with the conformation information (including date/time of call, recording of call, transcription of call), for example. The collaborative work system may enable a third-party application (such as Twilio™) to make the call, collect the information, and provide the data back to the board.

The trigger in communications rule 5807 in FIG. 58, may automatically activate when a specific value in the specific cell meets a specified criterion. In this example, trigger activates when an item is created (the item cell may be defined in the communications rule).

Personalized communications rule 5809 in FIG. 58 may enable the periodic transmission of an SMS message to someone via a third-party provider when a status has a certain value. When setting up this communications rule, the user may have defined the time period (such as every day, two-weeks, or month), the status value, the message, and the person. In some embodiments, the user may have included a specific SMS message as shown in FIG. 56 and included a specific recipient as shown in FIG. 57.

Communications rule 5809 may trigger when specific values in the specified cells meet specified criteria. In the case of communications rule 5809, when the status equals the predefined value and the date or time meets the time period criterion, the trigger is activated.

Personalized communications rule 5811 in FIG. 58 may enable the automatic initiation of a periodic video call via a third-party provider when a status has a predefined value. When setting up this communications rule, the user may have defined the time period (such as every day, two-weeks, or month), the status value, the type of videocall, and the one or more persons to whom the call should be placed. In some embodiments, the user may have specified a videocall third-party provider and one or more recipients as shown in FIG. 57.

The trigger of communications rule 5811 may automatically activate when specific values in the specific cells meet their respective criterion. In the case of communications rule 5811, a video call is triggered when the status equals the predefined value for that status, and the time period criterion is met.

Any of the toggle buttons in FIG. 58 (toggle buttons 5812, 5813, 5815, 5817, 5819, or 5822) may be toggled to an "off-state" in order to turn off a specific communications rule or toggled to an "on-state" in order to turn on a specific communications rule. In some embodiments, any of the toggle buttons in FIG. 58 may be permission settings as described above with reference to FIG. 51. Additionally, add new integration button 5821 (or "add new automation" in other embodiments) may be used to add a new integration or automation communication rule to the user's board or to another user's board. In this way, a user may manage a plurality of communication rules by adding, removing, enabling, or disabling communication rules in one common view. The management of communication rules may be in one common view for a specific table, or may also be managed in multiple views such as in a dashboard view of multiple communication rules across multiple tables.

Aspects of this disclosure may include triggering a communications rule when the specific value in the specific cell meets the criterion. Triggering refers to the initiation of an action when a criterion of the rule is met. For example, upon recognition that at least one criterion condition is met (e.g., at least one specific value in at least one specific cell meets at least one criterion), the communications rule may be considered automatically triggered.

Triggering may occur as the result of a continuous or periodically comparing the specific value in the specific cell and in response to a specific value in a specific cell meeting a criterion or threshold, execute an associated communications rule of the specific cell. A specific value contained in cells may include numeric, alphanumeric, or graphical information. A criterion may include a standard or threshold on which a judgment or decision (such as a trigger) may be based.

In some embodiments, a trigger may automatically cause a communications rule to be initiated. In some embodiments, the triggering may occur unknowingly when a value in one or more cells is matter-of-factly updated by a user, when a combination of criterion is met, or when an automatically calculated value is automatically updated. In other embodiments, the trigger may occur knowingly when a user purposefully updates one or more values in a cell to cause initiation of a communications rule. For example, the trigger in communications rule 5801 in FIG. 58, automatically activates when an interview status cell changes to Stuck (the specific status cell and stuck value may be defined in the communications rule).

In some embodiments, the triggering of the communications rule may initiate an accessing of a communications application. A communications application may include an internal or external website or program that performs a particular task or set of tasks. (e.g., Outlook™, Gmail™, SMS, Whatsapp™, Slack™, Facebook Messenger™, a proprietary application of the system, or any other medium that enables communication. In other words, the communications application may be an integrated (or accessed) third-party-provider application or an internal automated application. The communications application may be predefined or may be selected by a user. For example, the rule may provide the user with access to picklist permitting the user to specify, in defining the rule, which communications application will serve as the transmission mechanism for the message. Or, the rule template may predefine the communications application that may be used. In either scenario, automatic triggering may include accessing the defined communications application.

A rule may be configured to transmit a message. Such transmitting may occur directly or indirectly. Direct transmission might occur if the transmission mechanism is incorporated into the rule itself. Indirect transmission may occur if the rule links to a proprietary or third-party communications application, and through the link relays information for the communications application for transmission. In either scenario, the rule is considered to be configured to transmit a message. Such transmissions may be carried out through a local or remote network and/or through wired or wireless connections. Some portions of the transmissions or data transfers might occur within the platform that hosts the communications rule. Data may include any information that may be identified, processed, or sent from one place to another. In some embodiments, the transmitted data may be the values in the cells, metadata such as time stamps, and/or any other data or characterizations associated with the specific value or specific cell such as a column type or heading such as headings 3312 and 3314 in FIG. 33.

In some embodiments, the communications application may be a third-party application accessed by the communications rule. A third-party may include any entity that is separate from or external to a provider of the platform hosting the communications rule. A third-party application may include any internal or external website or program that performs a particular task or set of tasks. In some embodiments, a third-party application may be provided by a vendor who provides software compatible with the products of another vendor.

For example, in FIG. 51, each of communications rules 5101, 5103, 5105 may access third-party email, video conference, and ticketing platforms. Alternatively, in FIG. 58, communications rule 5805 accesses internal platforms to update separate boards and does not access any third-party platforms.

Aspects of this disclosure may include communicating, upon triggering of the communications rule, a message relating to the specific value in the specific cell meeting the criterion. Communicating may also include transmitting data relating to the specific value to a communications application for transmission. A message, in this context may include any type of information that relates to the specific value in a specific cell meeting a criterion. The message may include the specific value itself and/or may include information relating to that specific value. For example, if the criterion is a threshold (e.g., a budget) and the specific value is a number (e.g., a specific dollar amount), the message might include the specific value (e.g., the dollar amount) and/or it might include information related to the specific value, such as an indication that the specific value surpasses a threshold (e.g., an indication that a project is overbudget). The examples are infinite. By way of another example, a criterion might be a due date, might also define a trigger that is based on any value other than an indication of project completion in a status cell. The communications rule might be set up to trigger when the current date surpasses the due date and the status indicates anything other than a completed project. In this example, the message might simply be that the project is past due. Or, the message might be that the project is a specific number of days past due.

Sending a message may include directing, ordering, or requesting something to be transmitted somewhere. For example, it might include directly sending the message to one or more designated recipients or addresses, or it may include accessing a third-party communications platform such as an email, SMS, or other communications application, and causing the message to be sent via that third-party communications platform. The communication need not be with a particular individual or group of individuals. For example, the communications rule may cause information to be transmitted to another board, to another cell in the same board, or to a third-party application.

In some embodiments, the message may include at least one of a text message, email message, video message, or voice message. These alternative forms of messages may be selected by a user when defining a communications rule or may be predefined as part of the rule template. For example, in the communications rules of FIG. 58, rule 5801 may be predefined to enable the sending of an email; rule 5803 may be predefined to enable an automatic phone call to be made; rule 5805 may be predefined to enable linking to another board; and rule 5809 may be predefined to enable transmission of an SMS message. In some embodiments, the type of message to be sent may be chosen by the user during definition of a communications rule. For example, upon selecting a type of message to send (e.g. email), the user may select which third-party email integration may be used for the communications rule (e.g. Outlook™ or Gmail™).

In some embodiments, a message may include a notice that a specific value meets a criterion. As previously discussed, such a notice may indicate both the criterion and the specific criterion. A notice may include an announcement, notification, or prompt. In this way, information associated with a specific cell may be conveyed to a user or any entity. The message may be configurable to display specific information about the cell such as a specific value or may also be configured to include information that a trigger has been activated. By way of example, if the criterion is a budget threshold of 300 hours and the specific value for the hours is 310, the notification may be "Your project has surpassed its 300 hour budget by 10 hours."

In some embodiments, the notice may be fully configurable by the user that defines the communications rule. The user may access item-supported fields as shown in FIG. 55 and subitem-supported fields in messages as shown in 5501. While some item supported fields may be always available (Item Name, Board Name, User Name, and Group Name), other supported fields may be personalized based on the user's personalized board.

In some embodiments, a message may include a specific value. This value may be obtained from a cell in the board (e.g., in a status cell if the value is "overdue" the message may say "Your project is overdue," or "Your project has an overdue status." The specific value may be derived from default values or custom values entered by the user.

FIG. 54 illustrates an example embodiment of an updated communication rule 5201', where the specific value options 5401 may be available to be sent within a message via email 5207. Specific value options 5401 may be presented to the user based on default values or custom values previous stored by a user.

In some embodiments, a message may be configured to trigger transmission of an additional message. For example, in addition to the original message, the collaborative work system may send additional messages (e.g., send a message to a group manager, a second user on the board, or any other individual). These configurations may be selected in a number of ways through a communications rule by selecting specific individuals or specific groups as entities that receive the message. In one example, when a message is received by a recipient, the receipt of the message may cause a chain reaction message to be sent by the recipient. That additional message may convey information back to the sender or may convey information (or derivative information) to a different person.

FIG. 55 shows an exemplary embodiment where the communications rule may be configured to send an email 5207 to an entity 5209. The entity may be sent to a person, group, or location such as another cell in a board, as shown in the email criterion search window 5501 which would general a single message. The communication rule 5201' may allow another message to be sent by selecting another individual from the email criterions search window 5501.

An additional message may include data sent to a table. In one embodiment, data may be sent to a third-party application and additional data may be sent back to the table. For example, once a video call in a third-party application is completed, a new row may be added to the table to indicate new information that a video call has been completed. Or, if the row previously existed, a cell in that row may be populated with an indication that the call was completed. Such a message might include the date and time associated with the call. In another example, when a video call in a third-party application is completed, the value in a specific cell may be altered to indicate that a video call had taken place, such as changing a status from "stuck" to "working on it" or "done." according to user preferences.

FIG. 55 shows an exemplary embodiment where data may present to a table. In email search criterion window 5501, a user may select specific items, boards, and groups for data to which data is designated for sending in response to a triggering of communication rule 5201'. In this example, when an Interview Status 5203' changes to Stuck 5205', an email 5207 may be sent to a specific board 5209 to generate new information for users to see or to keep a log of messages sent to specific entities.

In some embodiments, a message may transmit a specific value to a separate application for use in a calculation by the separate application. A calculation may include a use, adaption, or assessment of the specific value in some process. An application may include a website or program that performs a particular task or set of tasks. Numerous applications may be third-party applications or internal application that may receive information via a message for use. For example, boards may be established for subparts of a project and a master board may track values from the subparts. When milestones are reached on a board associated with a subpart, a message containing an associated value may be sent to the master board which then may use the value as part of a calculation. The calculation may be, for example, a tabulation, an estimation, an assessment, or any other process or derivation using the value. In this way, applications may interface with a table to make use of information in the table or to make alterations to data within the table. For example, if a communications rule triggered an SMS message upon completion of an item, a specific value ('done' value) may be transmitted to a third-party application, and the third party application may then combine that data with other data and through a calculation determine a percentage of an overall project that is complete A user may manipulate anything on the board via the third-party application. If a user or permitted individual edits the specific value ('done' value) within the third-party application, the board may change by saving those edits on the board. (e.g. a user may manipulate/calculate the data on the board in the third-party app (recalculation)). Additionally, data from the third-party application may be collected on the board. For example, with a Zoom™ integration, each time a meeting is started, the collaborative work system may create a new item and sync meeting details (tracking the calls). The board may sync data from the call to columns on the board saving information including the name of meeting, participants, link to recording, transcription, and any other meeting information. Additionally, the collaborative work system may track information pulling data from various boards and various cells. e.g., average duration of all Zoom™ meetings, average number of participants on all Zoom™ meetings, or any other analysis of the data save on the board.

Figure 59:
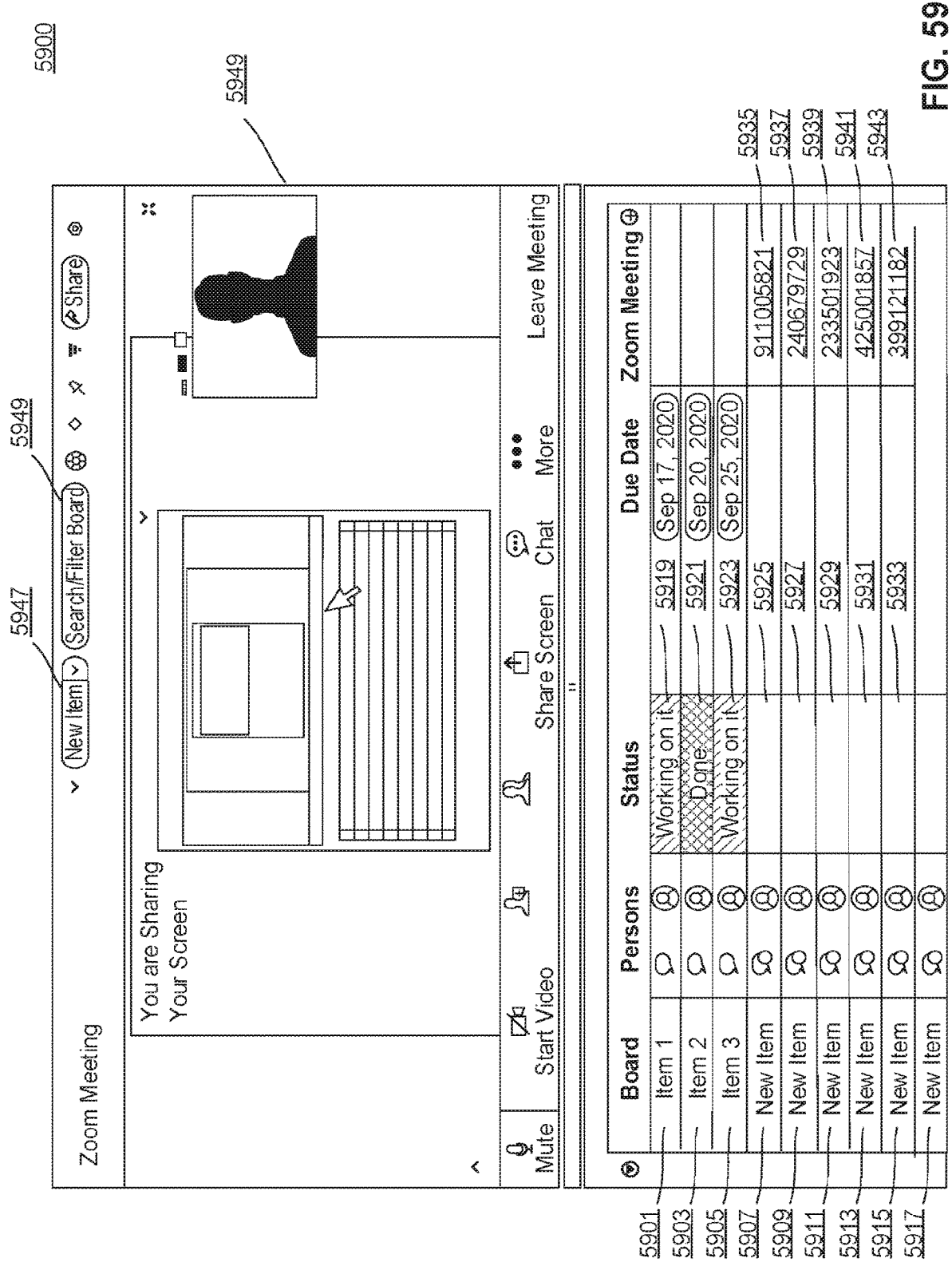
FIG. 59 illustrates an example of an interface with active integrations to third-party applications that may recalculate and transmit values to a table, consistent with some embodiments of the present disclosure.

In some embodiments, for example, communication rule 5811 in FIG. 58, may be triggered to begin a video call on a periodic basis, such as for a weekly meeting. To that end, a videocall such as a Zoom™ video call may be started with someone when the specific value for interview status becomes "done" to trigger the communication rule. Additionally, as shown in FIG. 59, in some embodiments, an interface may have active integrations to third-party applications that may recalculate and transmit values back to a table. For example, FIG. 59 illustrates a third-party application integration (i.e. with Zoom™) where videocall 5945 is taking place within the collaborative work system. The third-party application integration may be displayed in a common view with the collaborative work system or may be displayed in a separate view from the collaborative work system. Interface 5900 includes new item button 5947 and search/filter board button 5949 to alter a display in the table, which may also be accessed from the third-party application integration. Data from the table may be sent to the third-party integrated application (i.e. with Zoom™) so that a user may view and alter specific data in the table from within the third-party integrated application during the videocall 5945. Then, the third-party integrated application (e.g., Zoom™) may transmit the altered specific data back to table 5901. For example, any of items 5903, 5905, 5907, 5909, 5911, 5913, 5915, or 5917 may be altered (or recalculated) via the third-party integrated application. Additionally, the third-party integrated application may alter (or recalculate) specific data on the table by adding a new item via the third-party integrated application via new item button 5947 or automatically through an exemplary communication rule 5109 as discussed above in FIG. 51. Furthermore, any of statuses 5919, 5921, 5923, 5925, 5927, 5929, 5931, or 5933 may be altered (or recalculated) via the third-party integrated application. For example, a user may change "working on it" status of status 5919 to "done" status via the third-party integrated application. Additionally, links 5935, 5937, 5939, 5941, and 5943 may be used to link to the third-party integrated application (i.e. the Zoom™ videocall) via the board. Additionally, links 5935, 5937, 5939, 5941, and 5943 may be used to sync any data associated with to the third-party integrated application (i.e. the Zoom™ videocall) to the board (such as the name of meeting, participants, link to recording, transcription, and any other meeting information).

In some embodiments, an additional message may include data sent to another table. In such embodiments, data/communications may be transmitted to other boards and other users (cross board integration). For example, in some embodiments, when a status changes to something in one board, a communications rule may be defined to create an item in another board. In some embodiments, communication rules may be set up on multiple boards or on one board.

In one embodiment, a communications rule may be set up using a third-party application such as Gmail™. For example, a first communications rule may be: when a new item is created, send an email (via Gmail™) to someone. The body of the email may request or provide a reminder for the recipient to send in an application, for example. A second communications rule may be: when an email is received from someone (specific email address may be pulled from the item in the first communication rule), add the body of the responsive email as an update to the item. When the recipient responds, "Hi, my application is attached below," the user's text in the email may be saved in one cell associated with the item and the attachment saved in another cell associated with the item (in the same board or a different board). When a user clicks on the item and/or the associated cells, all emails and attachments may be visible. In some embodiments, interacting with a cell of an item may trigger an additional view (e.g., a pop-up, prompt, page, module, additional information in a pre-existing view) that may contain data associated with a communication, consistent with this disclosure.

Figure 60:
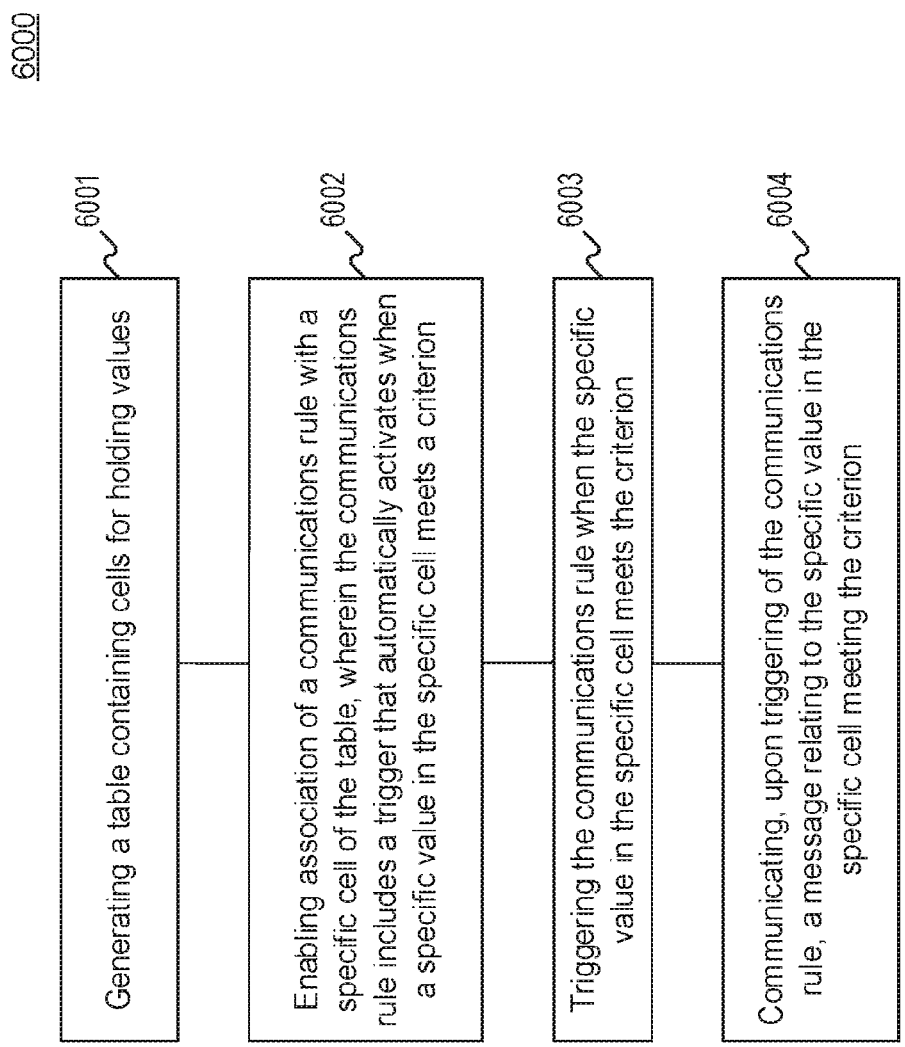
FIG. 60 illustrates a block diagram of method performed by a processor consistent with some embodiments of the present disclosure.

FIG. 60 is a block diagram of method 6000 performed by a processor of a computer readable medium containing instructions, consistent with disclosed embodiments. In some embodiments, the method may include the following four blocks:

Block 6001 Generating a table (or board) containing cells for holding values. Such a presentation may occur on a pc, mobile communications device, laptop, tablet, VR or AR headset, or other display. For example, board 3300 in FIG. 33 may contain various cells holding various values that may be displayed to the user through any such display.

Block 6002: Enabling association of a communications rule with a specific cell of the table, wherein the communications rule includes a trigger that automatically activates when a specific value in the specific cell meets a criterion.

In some embodiments, the rule may be partially or wholly predefined and in other embodiments the system may enable a user to build a customized communications rule, as previously discussed. The communications rule may be associated with one or more cells in the table, when the user selects the cell and a communications rule to be associated with that cell. For example, a communications rule may be that when a status cell changes from "working on it" to "stuck," send an email to the person listed in the person cell associated with the status cell. "Working on it" and "stuck" are criterion defined in the communications rule. When the value in the cell matches the criterion, the trigger may be initiated.

Block 6003 Triggering the communications rule when the specific value in the specific cell meets the criterion. The automatic trigger may be defined in the rule such that when the criterion is met and the trigger is initiated the response automatically follows. For example, the system may automatically trigger the communications rule exactly when a "working on it" value of a cell in the board changes to a "stuck" value in the board.

Block 6004: Communicating, upon triggering of the communications rule, a message relating to the specific value in the specific cell meeting the criterion. The direction for automatic sending may be contained in the communications rule such that once the rule is triggered the sending occurs automatically. For example, an email may be sent to the person that is "stuck" on a project as a reminder that the person needs to resolve the issue. Or, a message may be sent to a supervisor, alerting the supervisor to the stuck status.

Aspects of this disclosure may provide a technical solution to the challenging technical problem of project management and may relate to a system for organizing status-based tasks in tablature with the system having at least one processor (e.g., processor, processing circuit or other processing structure described herein) in collaborative work systems, including methods, systems, devices, and computer-readable media. For ease of discussion, some examples are described below with reference to methods, systems, devices, and/or computer-readable media, with the understanding that discussions of each apply equally to the others. For example, some aspects of methods may be implemented by a computing device or software running thereon. The computing device may include at least one processor as described herein (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Tablature as used herein refers to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays.

By way of one example, the collaborative work system may utilize workflow management software that enables members of a team to cooperate via a common online platform (e.g., a website). Aspects of this disclosure may display a table with items on a screen of a computing device. A table may be presented, for example, via a display screen associated with a computing device such as a PC, laptop, tablet, projector, cell phone, or personal wearable device. A table may also be presented virtually through AR or VR glasses, or through a holographic display. Other mechanism of presenting may also be used to enable a user to visually comprehend presented information. Aspects of this disclosure may enable a user (e.g., an individual operating the computing device) to maintain a plurality of task tables for a plurality of entities, configure a cell associated with each task in each task table to maintain a status value, and display an aggregate table consolidating a list of tasks that share a common status value.

Consistent with disclosed embodiments, at least one processor of the system may carry out operations that may involve maintaining a plurality of task tables for a plurality of entities. Each task table of the plurality of task tables may contain a plurality of tasks, each task being defined by a row of cells. Maintaining an object (e.g., a digital data object such as a task table, a task, or a cell within a task), as used herein, may refer to any means to store or link the object. For example, a system may store an object or the link to an object in a non-transitory computer-readable medium. By way of example with reference to FIG. 1, the system may maintain the object by storing it in memory 120, in storage 130, or both.

A table in this disclosure includes those items described earlier in connection with tablature, and may include a form, a sheet, a grid, a list, data for inclusion in the foregoing, or any data presentation of a multi-dimensional nature (e.g., horizontal rows and vertical columns, horizontal rows and vertical rows, or horizontal columns and vertical columns). The table may be presented on a screen of a computing device as described above. An entity, as used herein, may refer to an individual, a team, a group, a department, a division, a subsidiary, a company, a contractor, an agent or representative, or any independent, distinct organization (e.g., a business or a government unit) that has an identity separate from those of its members.

A task table in this disclosure may refer to a table that includes one or more tasks. A task, as used herein, may refer to a part or a portion of a project. A task may be performed by an entity (e.g., an individual or a team). In some embodiments, a task may be represented by a row of cells in a task table. In some embodiments, a task may be represented by a column of cells of a task table.

Figure 61:
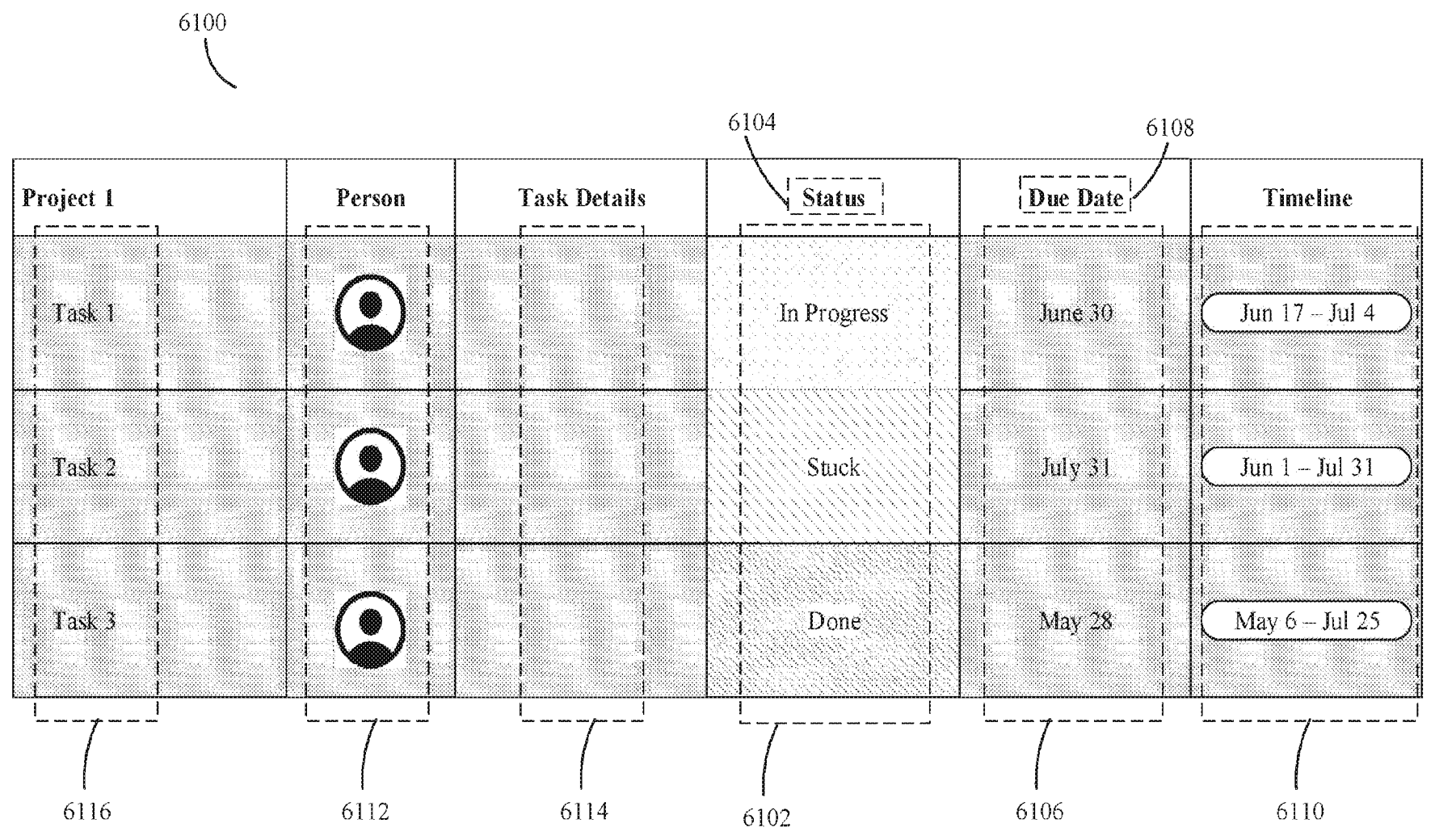

By way of example, FIG. 61 illustrates an example table 6100 that may include multiple columns and rows, consistent with embodiments of the present disclosure. In some embodiments, the table 6100 may be displayed using a computing device (e.g., the computing device 100 illustrated in FIG. 1) or software running thereon. The table 6100 may be associated with a project (i.e., "Project 1") and may include, in the multiple rows and columns, tasks (e.g., in rows including "Task 1," Task 2," or "Task 3") included in the project, persons (e.g., in a column 6112) assigned to the tasks, details (e.g., in a column 6114) of the tasks, statuses (e.g., in a column 6102) of the tasks, due dates (e.g., in a column 6106) of the tasks, timelines (e.g., in a column 6110) of the tasks, or any information, characteristic, or associated entity of the project.

Any column of the table may display cells of a single datatype or of multiple datatypes. A single datatype column may be one where all cells are uniform in at least one aspect or characteristic. The characteristic may be numeric values only, characters only, alphanumeric values, graphic elements only, closed lists of elements, single formatting, a specific value range, or any constraint on the format or type of column data. In some embodiments, the first column may be at least a portion of a single datatype (e.g., texts) column-oriented data structure. A single datatype column-oriented data structure may be a digital data structure of a table that includes columns where all cells of the columns may be programmed to include a single category of data.

In FIG. 61, the table 6100 includes, among other columns, a first column 6102 that has a first column heading 6104 ("Status") and a second column 6106 that has a second column heading 6108 ("Due Date"). A column heading may be associated with a column within a table. The column heading may be a default text or may be customized by a user. For example, the first column 6102 may be a status column type of table 6100. Other columns with other characteristics in FIG. 61 may include a due date column type (including a second column 6106), a timeline column type (including the column 6110), a person column type (including the column 6112), and text column types such as the columns 6114 and 6116.

In FIG. 61, the first column 6102 includes three rows, each row including one or more words indicative of a status of each task of the project. The second column 6106 includes three rows, each row including a date indicative of a due date of each task of the project. In some embodiments, the computing device that implements the method may enable the user to select the second column heading in the table or through a user interface such as a column store in a manner similar to that of enabling the user to select the first column heading in the table as described above.

As illustrated in FIG. 61, the at least one processor of the system may maintain a plurality of task tables (including the table 6100) for a plurality of entities. The table 6100 contains a plurality of tasks (including "Task 1," Task 2," and "Task 3"), and each task may be defined by a row of cells in the table 6100.

Consistent with disclosed embodiments, the at least one processor of the system may carry out operations that may involve configuring a cell associated with each task in each task table to maintain a status value. Configuring an object, as used herein, may refer to a process or procedure to set up the object for operating in a particular way. For example, if a user selects a date-related heading for a column, the system may configure the column to accept and/or recognize dates within that column. By way of another example, when a user establishes a column with a status heading, the system might thereafter recognize entries in the cells of that column as an indicator of the status of the associated task. "Associating," as used herein, may refer to processes or procedures of establishing a relationship or connection between at least one thing and at least one other thing. A cell may be considered associated with a task if it contains data that relates to the task. A status value of a task in this disclosure may include a value indicative of a progress or status of the task. For example, the status may be "done," "in progress," "stuck," "waiting," "delayed," or any combination of textual, alphanumerical, symbolic, or graphical representation. In some embodiments, the at least one processor of the system may further configure the cell associated with each task in each task table to maintain a value representing information other than the status, such as a person, a task description, a timeline, a due date, or any other information.

In some embodiments, the status value maintained by the at least one processor in each task table may indicate that an associated task is stuck. A status value of "stuck" may include any indication of a progress or status of the task to indicate the task is not progressing for any reason, such as labels that are alphanumeric, graphical, or a combination. "Stuck" status values may include similar alphanumeric labels such as "Waiting," "Paused," "Halted," "Stopped," "Pencils Down," or any other customized text that indicates that the progress of a task is not progressing. Similar graphical indications may include examples such as a representation of a stop sign, a red or yellow traffic light, an "X" mark, or any other indication of lack of progress.

By way of example, the at least one processor of the system may configure a cell in a first column 6102, which is associated with one of the "Task 1," "Task 2," or "Task 3," to maintain a status value (e.g., "Done," "In Progress," or "Stuck"). As illustrated in FIG. 61, the at least one processor maintains a status value "Stuck" in the table 6100, which indicates that "Task 2" is stuck. While FIG. 61 and FIG. 62A illustrate a shading and alphanumeric status value of "Stuck," these examples are non-limiting and may be represented in any number of ways. For example, the status value of "Stuck" may contain only alphanumerics, only a graphical indication, a fill color in a cell, or a combination thereof as illustrated in FIG. 61. While FIG. 62A illustrates an example embodiment of a uniform status value of "Stuck" across multiple tasks, multiple tasks may include different representations of "Stuck" as described above (e.g., a table aggregating stuck tasks may include tasks that have statuses such as "Waiting," "Paused," "Halted," "Stopped," "Pencils Down," or any other customized text that indicates that the progress of a task is not progressing).

Consistent with disclosed embodiments, the at least one processor of the system may carry out operations that may involve outputting a signal to display an aggregate table consolidating, from the plurality of task tables of the plurality of entities, a list of tasks that share a common status value. A signal may be output, for example, by computing device 100 in FIG. 2, or via any other processor in the system of FIG. 2, to cause an aggregate table to be rendered by the computing device 100 or any user device such as one or more of user devices 220-1 to 220-m. An aggregate table, as used herein, may refer to a table that aggregates information obtained from one or more task tables. Consolidating, as used herein, may refer to an operation to combine, unify, unite, merge, or solidify multiple objects into a larger object. For example, consolidating a list of tasks may refer to combining multiple tasks into the list of tasks. A common status value of tasks in this disclosure may refer to a status value that is associated with the tasks. In some embodiments, the aggregate table may enable viewing of stuck tasks across the task tables of the plurality of entities. Stuck tasks may include any task with an indication that the task may be stuck as described above.

By way of example, FIG. 62A illustrates an example aggregate table 6200 that consolidates tasks sharing a common status value from multiple tables, consistent with embodiments of the present disclosure. In some embodiments, the aggregate table 6200 may be displayed using a computing device (e.g., the computing device 100 illustrated in FIG. 1) or software running thereon. The computing device 100 may send an output signal to one or more of user devices 220-1 to 220-m to enable viewing of the aggregate table. In FIG. 62A, the aggregate table 6200 consolidates three tables 6202, 6204, and 6206 associated with three projects (i.e., "Project 1," "Project 2," and "Project 3"), respectively. The tables 6202, 6204, and 6206 may be associated with different entities (e.g., different teams of a company). The tables 6202, 6204, and 6206 may have the same or different columns and may have the same or different column organization or format. In FIG. 62A, the aggregate table 6200 displays the same columns of the tables 6202, 6204, and 6206. It should be noted that, in some embodiments, the aggregate table 6200 may display different columns for the tables that the aggregate table 6200 consolidates.

The sub-table 6202 is part of the table 6200 in FIG. 62A, which includes only the row of "Task 2." The sub-table 6204 includes two rows associated with two tasks (i.e., "Task 6" and "Task 8").

The sub-table 6206 includes three rows associated with three tasks (i.e., "Task 9," "Task 13," and "Task 25"). In FIG. 62A, each of the tasks (rows) of the aggregate table 6200 is different from each other, as represented by the different due dates and timelines. All of the tasks in the aggregate table 6200 show a common status value "Stuck." As illustrated in FIG. 62A, the aggregate table 6200 consolidates, from a plurality of tables (i.e., the tables 6202, 6204, and 6206), a list of tasks (i.e., "Task 2," "Task 6," "Task 8," "Task 9," "Task 13," and "Task 25") that share a common status value (i.e., "Stuck"). While aggregate table 6200 organizes tasks in sub-tables by project, this is just an example. An aggregate table can arrange data in any manner within the scope of this disclosure. For example, the aggregate table may arrange items sorted by due date, start date, responsible person, or any other value.

In some embodiments, the status value may indicate that an associated task is stuck, and the output signal may be configured to cause an aggregate table that presents stuck tasks across the task tables of the plurality of entities. By way of example, the aggregate table 6200 enables viewing of stuck tasks (i.e., "Task 2," "Task 6," "Task 8," "Task 9," "Task 13," and "Task 25") across the task tables 6202, 6204, and 6206. An output signal from a processor may cause an aggregate table to render where the aggregate table presents stuck tasks across the task tables of the plurality of entities. In this way, a project manager may be enabled to quickly obtain a top-down view of all stuck tasks, regardless of the sources from which the stuck tasks are presented. In some embodiments, at least one processor may be configured to receive a selection of a subset of the plurality of task tables of the plurality of entities for consolidation in the aggregate table. A selection of a subset of task tables may occur through a user selection on an interactive element of a GUI or computing device to select particular task tables from a list of task tables that may be available for consolidation. All of the task tables may be selected, or any combination of less than all of the task tables may be selected for consolidation. After consolidation, the at least one processor may further carry out operations to enable a different selection of a subset of the plurality of task tables for consolidating to output a signal to display an updated consolidation of task tables.

By way of example, the plurality of task tables (including the tables 6202, 6204, and 6206) may include more than three tables (not shown), and the at least one processor may enable selection of the tables 6202, 6204, and 6206 as a subset for consolidating for the aggregate table 6200. After consolidation, the at least one processor may further enable a different selection of tables for consolidation for the aggregate table 6200 and re-render the aggregate table 6200 to include the new selection of tables.

In some embodiments, the output signal may be configured to cause the aggregate table to display summary information for every common status value consolidated from the plurality of task tables. Summary information of a group of values (e.g., common status values), as used herein, may include information that presents representative characteristics or features of the group of values but not all of their details. For example, the summary information may include any combination of a list, a chart (e.g., a bar chart, a pie chart, or a line chart), a symbol, a picture, a number, a timeline, a word cloud, a calendar, an report, an information feed, an animation, or any other representation of representative characteristics or features.

Figure 63:
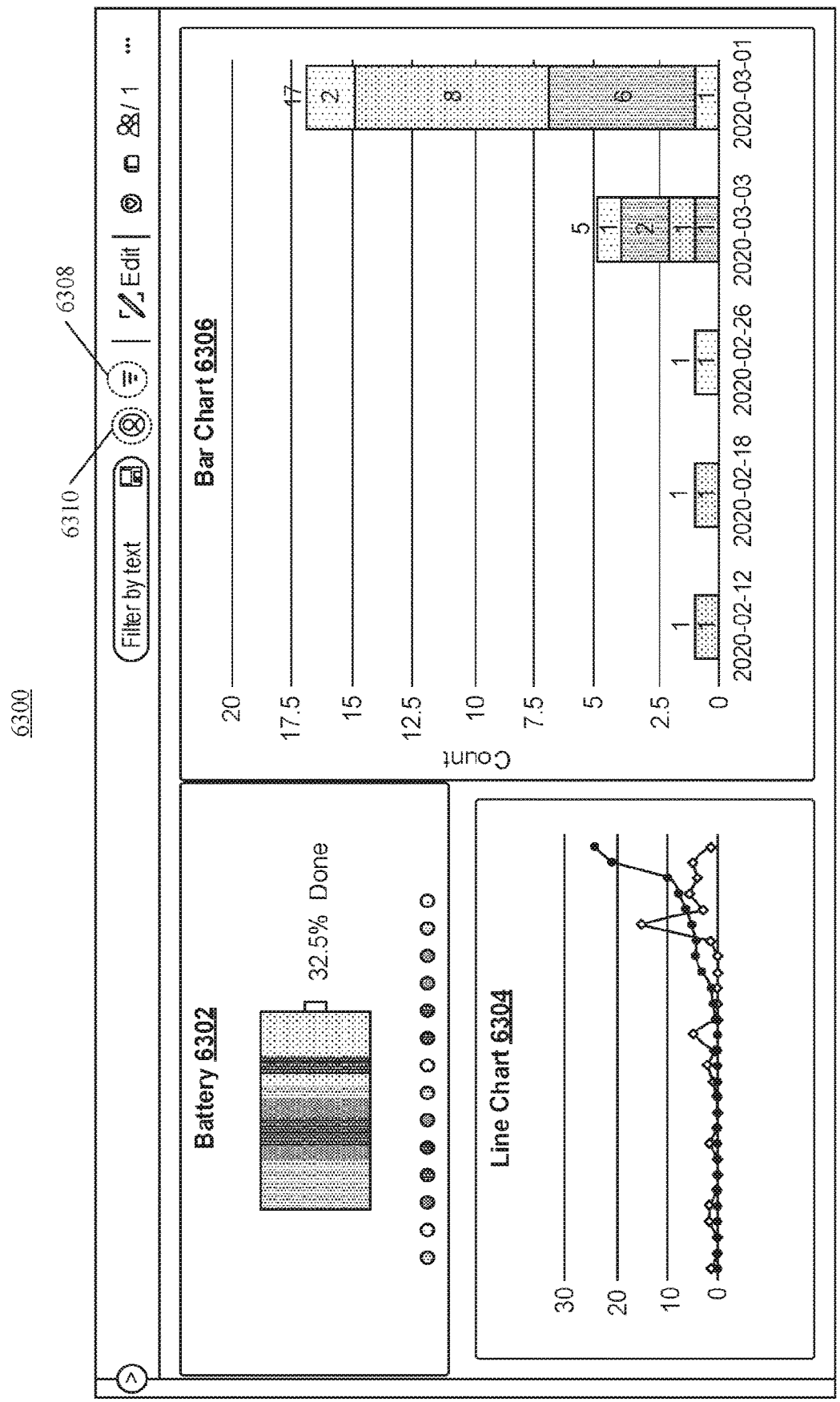
FIG. 63 illustrates an example of summary information of an aggregate table, consistent with some embodiments of the present disclosure.

By way of example, FIG. 63 illustrates an example of summary information 6300 of an aggregate table, consistent with embodiments of the present disclosure. In some embodiments, the table 6300 may be displayed using a computing device (e.g., the computing device 100 illustrated in FIG. 1) or software running thereon. The presentation may occur via a display associated with computing device 100 or one or more of the user devices 220-1 to 220-m in FIG. 2. Summary information 6300 includes a depiction of a battery 6302 that represents overall progress information of an aggregate table (not shown in FIG. 63), a line chart 6304 that represents information of planned progress versus actual progress extracted from the aggregate table, and a bar chart 6306 that represents information of status by week extracted from the aggregate table. As illustrated in FIG. 63, summary information 6300 is displayed for every common status value in the aggregate table consolidated from the plurality of task tables.

The depiction of a battery 6302 shows a battery-shape representation that consolidates all of the statuses of the tasks included in the aggregate table, such as "done," "in progress," "stuck," "waiting," "delayed," or any other status value in the aggregate table. Also, the depiction of a battery 6302 includes the text "32.5% done" reflecting that 32.5% of the tasks associated with the statuses are "Done." That is, of all the tasks included in the aggregate table, 32.5% are completed. This text may be a default or may be configured to present the percentage makeup or any of the status values in the aggregate table.

The line chart 6304 shows two lines, a line of black dots and a line of circle dots. Each black dot of the line of black dots may represent a planned progress of a task included in the aggregate table, and each circle dot of the line of circle dots may represent an actual progress of a task included in the aggregate table. The line chart may be a default or may be configured according to user preference.

The bar chart 6306 shows five bars, each bar including one or more statuses included in one week (e.g., the week of "2020 Feb. 12," the week of "2020 Feb. 18," and so on). That is, each bar may represent all of the statuses updated or changed within one week for their associated tasks. The bar chart may be a default or may be configured according to user preference.

As illustrated in FIG. 63, the summary information may pull data from multiple sources that are included in the aggregate table. The multiple sources may be selected as a subset of available task tables. In some embodiments, the summary information may pull data from all tables associated with a user account in the system. By doing so, in a single place or screen, the user may be provided a quick overview of summary information of all the tasks associated with the user. Some embodiments may involve generating an output signal to cause similar status columns to be consolidated as a common status value in an aggregate table. Similar status columns, as used herein, may refer to two or more status columns that include two or more status values sharing at least some common information (e.g., common key words or meaning). For example, similar status columns may include status columns having status values of "stuck," "stuck in progress," "being stuck," or any status value having a common word "stuck." The at least one processor of the system may consolidate all those status columns as a common status value (e.g., "stuck") in the aggregate table. Other status values of "stuck" may be recognized for consolidation such as a graphical icon of a stop sign, other similar status values that do not contain the word "stuck" such as "Pencils Down" or "Freeze," or any other status values that provide a similar meaning for "stuck."

Some embodiments may involve updating the output signal when a cell with the common status value is updated with a different status value, to thereby cause a display change. Updating the output signal, as used herein, may refer to any change in the signal to cause a commensurate change in a visual presentation of the table. Updating a status value in a cell may include adding, altering, or removing the status value of a cell from the aggregate table or from the task tables. Updating the status value may be carried out in response to a condition or may be updated manually by a user through a selection or interaction. The display change may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

For example, a change of display of the table may include deleting a row from the table, adding a row to the table, or changing a visual object in a row of the table. As an example, in FIG. 62A, when a cell with the common status value "Stuck" in the row of "Task 9" of the table 6206 is updated with a different status value "Done," the at least one processor may delete the row of "Task 9" from the aggregate table 6200. In another example, when a cell with a different status value "In Progress" in a row of "Task 1" of the table 6100 in FIG. 61 is updated with the common status value "Stuck," the at least one processor may add the row of "Task 1" to the table 6202.

In some embodiments, to change the display of the aggregate table, the at least one processor of the system may carry out operations that involve recording the update to the cell in an activity log. Recording an update, as used herein, may refer to a process or procedure of preserving or storing an object in a permanent manner, such as storing the object in a non-transitory computer-readable medium. An activity log in this disclosure may include data that represents a record or account of performances or progresses of an undertaken activity. For example, an activity log may include data representing any changes or updates made to values of cells of the aggregate table or within the task tables.

By way of example, the at least one processor may implement recording the update to the cell by storing the update to the cell to an activity log maintained in storage 130 in FIG. 1. The activity log may also be stored in a repository 230 and may be updated when a cell or table is updated from a computing device 100 or user device 220. A computing device 100 or user device 220 may access the activity log and may display information in the activity log to view a history of updates made to cells, rows, or tables and any other information associated with the change such as user information associated with each of the changes or a timestamp for each of the updates.

Consistent with some disclosed embodiments, an output signal is configured to render in the aggregate table at least one interactive cell in the row of cells associated with at least one task, and upon receipt of an activation of the at least one interactive cell, contact may be initiated with an entity associated with the at least one task. An interactive cell, as used herein, may refer to any element in a user interface such as a button or simply a cell that may respond to a user action. The output signal may be configured to cause a table to render with such an interactive cell, to enable a user to interact with the interactive element within the cell or the cell itself. A table is rendered when a signal causes it to be displayed. In this case, an output signal may be received by a user device, thereby causing an actual or virtual display associated with the user device to present the information. When the information includes an interactive cell, the interactive cell is rendered with an appropriate linkage so that activation of the cell results in the initiation of a communication. An interactive element/cell in this disclosure may be interacted with through a mouse click or other mouse action, a touch on a display, a gesture, through an application program interface (API) that receives a keyboard input, or via any hardware or software component that may receive user inputs. A user interface in this disclosure may be a web page, a mobile-application interface, a software interface, or any graphical user interface (GUI) that enables interactions between a human and a machine via the interactive element. Activating the interactive cell, as used herein, may include any process or procedure to cause the system to engage the interactive cell, such as the actions previously discussed. Contacting an entity may refer to any means of sending a notification or communication to an entity such as by email, text messaging, phone call, videoconference, an alert, a prompt, or any other means of sending a communication to an entity.

In some embodiments, the interactive cell may include a GUI element (e.g., a floating card, a popup window, a drop-down menu, or a new webpage) that overlays an underlying table cell and displays information of the entity (e.g., an avatar and a name of an individual), and one or more buttons for initiating a communication with the entity, such as sending an email, sending an instant message, sending a mobile text message, or making a call. For example, when a user moves a mouse cursor over a cell in the aggregate table showing a stuck status value, the at least one processor may activate to display an interactive cell that has a button to initiate contacting the entity (e.g., a teammate who is in charge of the stuck task) associated with the stuck status value.

Disclosed embodiments may also include transmitting a single communication to the entity associated with the common status value, the single communication reflecting the common status value for multiple tasks. The at least one processor of the system may carry out operations that may transmit such a single communication. A single communication, as used herein, may refer to any single-action or one-time communication, such as a single email, a single instant message, a single mobile text message, or a single phone call. For example, after activating the interactive cell that includes a button to initiate contacting the entity associated with the common status value (e.g., "Stuck"), a user may click the button to send a single email to the entity (e.g., to ask for an update or an explanation). This may cause at least one system processor to undertake the communication.

For example, in FIG. 62B, a user may interact with aggregate table 6200 by moving a mouse cursor over a stuck status cell associated with Task 8 in table 6204. In response to this user action, the user interface may display a prompt 6210 that includes contact information or any means of sending a communication to a user associated with Task 8 such as by email. If multiple users are associated with a task, the communication may be sent to all of the users at the same time or may be sent individually. Upon activation of an associated button, a predefined (or custom) message may be transmitted to a responsible entity.

Some disclosed embodiments may involve detecting when a status value for a particular task is empty, and sending a notification of the empty status value to an associated entity. This may occur via at least one processor of the system. For example, the aggregate table may display tasks having an empty status value (e.g., no information being provided for the statuses) as the common status value, and the at least one processor may send an email, send an instant message, send a mobile text message, or make a call to the associated entities of those tasks to request that the associated entities provide status values.

For example, if all of the tasks illustrated in FIG. 62B contained an empty or unpopulated status cell in an alternative embodiment, the system might automatically notify the associated entities to provide a status value. Further, a user may manually send a notification to each of the associated entities individually to provide a status value because the status values are empty. The notification may include a default or definable message regarding providing a status value and may include a link to the cell without a status value.

Consistent with disclosed embodiments, the at least one processor of the system may apply a filter to create an aggregate table, the summary information of the aggregate table, or both. The filter may be used to select specific status values, projects, countries, persons, teams, progresses, or any information, features, or characteristics associated with tasks. By using the filter, the at least one processor may receive data, create the aggregate table, and update the summary information automatically, rather than retrieve the data separately and have a user aggregate them manually.

Figure 64:
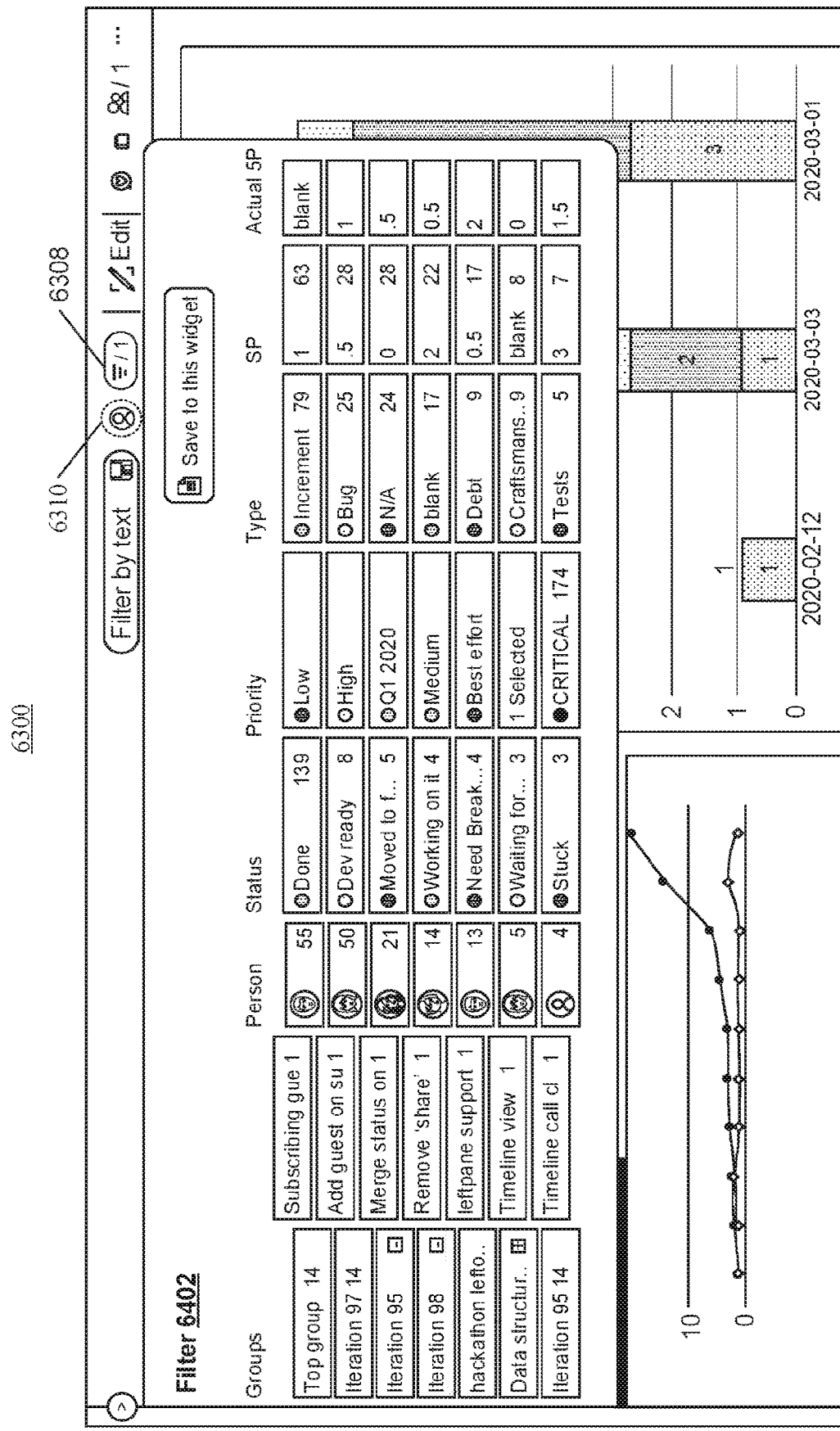
FIG. 64 illustrates an example of a filter for updating summary information of an aggregate table, consistent with some embodiments of the present disclosure.

By way of example, FIG. 64 illustrates an exemplary filter 6402 for updating the summary information 6300, consistent with embodiments of the present disclosure. In some embodiments, the filter 6402 may be displayed using a computing device (e.g., the computing device 100 illustrated in FIG. 1) or software running thereon. The summary information 6300 in FIG. 63 includes an interactive element 6308 (e.g., a button). By clicking the interactive element 6308, as illustrated in FIG. 64, the at least one processor may cause to display an interactive element (e.g., a floating GUI element overlaying the summary information 6300) showing the filter 6402. The filter 6402 may include multiple buttons, each button representing a feature or a characteristic (e.g., specific cell values) in the aggregate table associated with the summary information 6300. By clicking on one or more of the buttons, the filter 6402 may activate the features or characteristics associated with the clicked buttons for generating filtered summary information. For example, by clicking on a button "CRITICAL 174" (representing that 174 tasks having the status "CRITICAL" in the aggregate table) in the "Priority" column of the filter 6402, the at least one processor may update the summary information 6300 to display only summary information of tasks having the status "CRITICAL."

Figure 65:
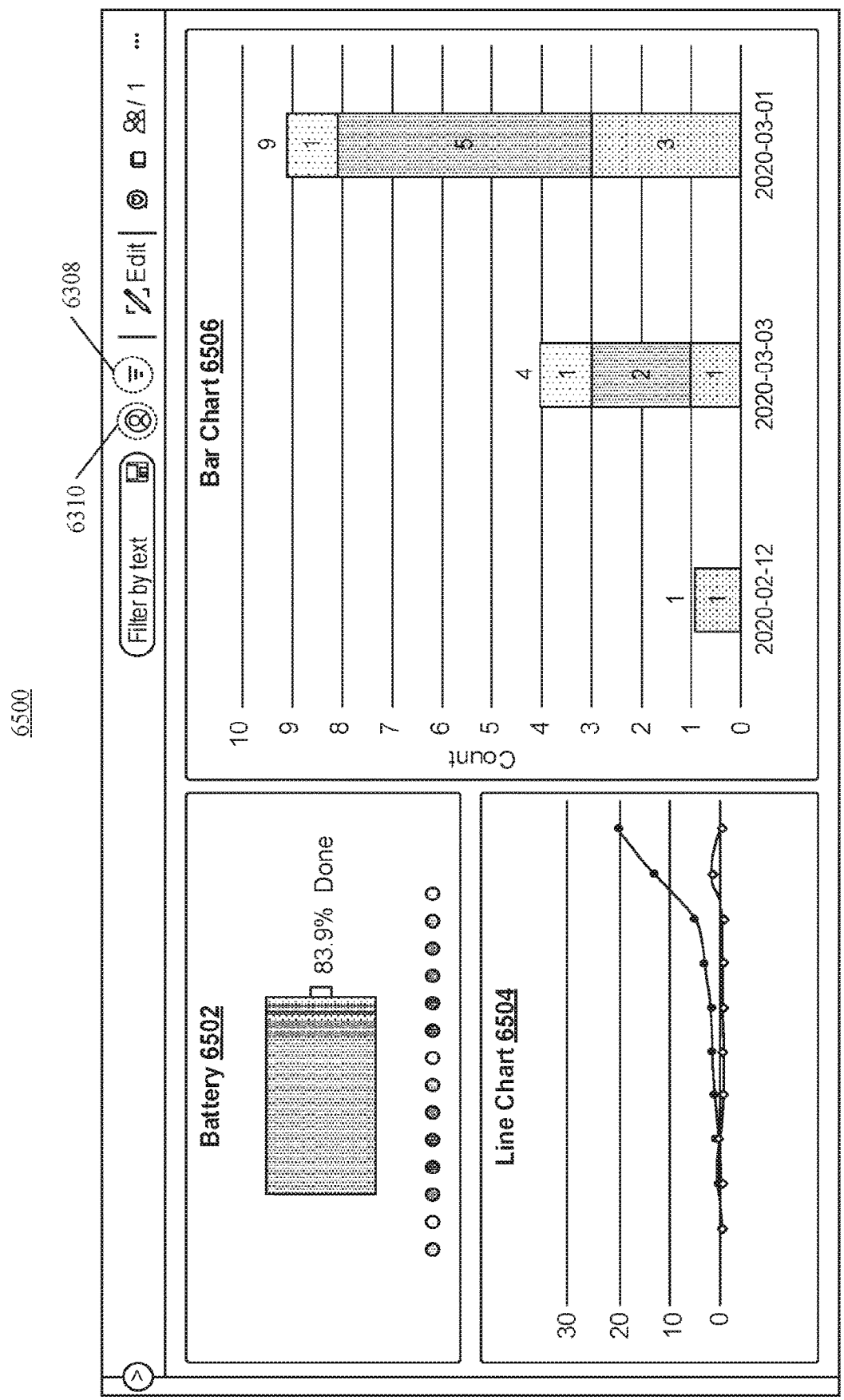
FIG. 65 illustrates an example of filtered summary information of an aggregate table, consistent with some embodiments of the present disclosure.

FIG. 65 illustrates an example of filtered summary information 6500, consistent with embodiments of the present disclosure. In some embodiments, the filtered summary information 6500 may be displayed using a computing device (e.g., the computing device 100 illustrated in FIG. 1) or software running thereon. For example, the filtered summary information 6500 may be the summary information 6300 after applying the filter 6402 (e.g., by clicking one or more buttons therein) as illustrated and described in association with FIG. 64. The filtered summary information 6500 of FIG. 65 includes a depiction of a battery 6502 that represents filtered overall progress information of the battery depiction 6302 of FIG. 63, a line chart 6504 that represents filtered information of planned progress versus actual progress of the line chart 6304, and a bar chart 6506 that represents filtered information of status by week of the bar chart 6306. Compared with the summary information 6300 in FIG. 63, the battery 6502 shows "83.9% Done" representing that 83.9% of the tasks included in the aggregate table associated with the filtered summary information 6500 are completed, because the filter 6402 excludes some of the tasks from the aggregate table associated with the summary information 6300. Similarly, the line chart 6504 and bar chart 6506 are also updated accordingly with respect to the line chart 6304 and bar chart 6306.

Figure 66:
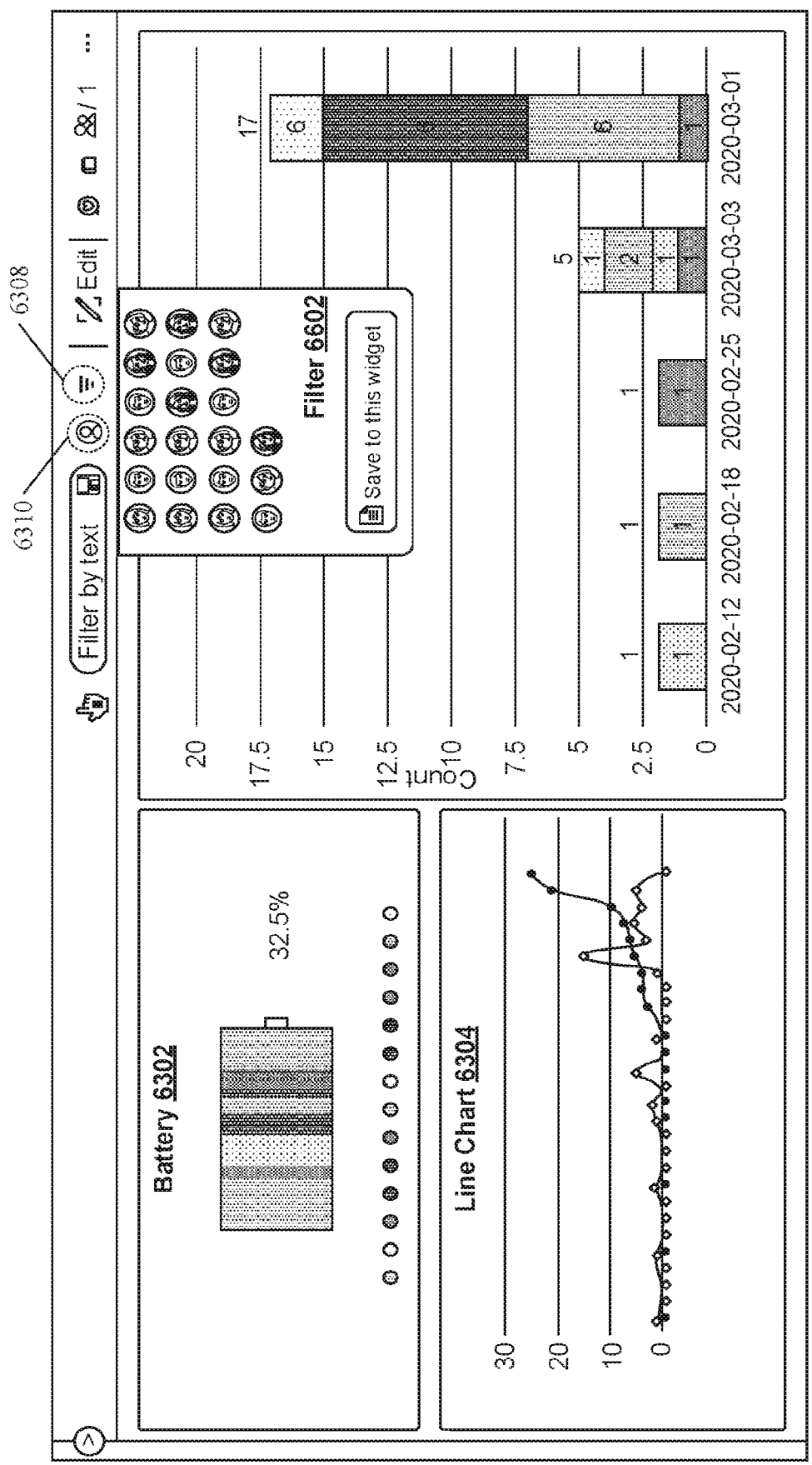
FIG. 66 illustrates an example of a filter on entities for updating summary information of an aggregate table, consistent with some embodiments of the present disclosure.

In some embodiments, the summary information may be filtered by entities (e.g., persons) associated with the tasks. By way of example, FIG. 66 illustrates an example of a filter 6602 on entities for updating summary information of an aggregate table, consistent with embodiments of the present disclosure. In some embodiments, the filter 6602 may be displayed using a computing device (e.g., the computing device 100 illustrated in FIG. 1) or software running thereon. The summary information 6300 in FIG. 63 includes an interactive element 6310 (e.g., a button). By clicking the interactive element 6310, as illustrated in FIG. 66, the at least one processor may cause to display an interactive element (e.g., a floating GUI element overlaying the summary information 6300) showing a filter 6602. The filter 6602 may include multiple avatars (or other indications such as alphanumerics, graphics, colors, or a combination thereof) associated with multiple entities (e.g., persons of teams). Each avatar may represent an entity (e.g., a person or a group) in the aggregate table associated with the summary information 6300. By clicking on one or more of the avatars, the filter 6602 may generate filtered summary information only associated with the entities represented by the clicked avatars.

Figure 67:
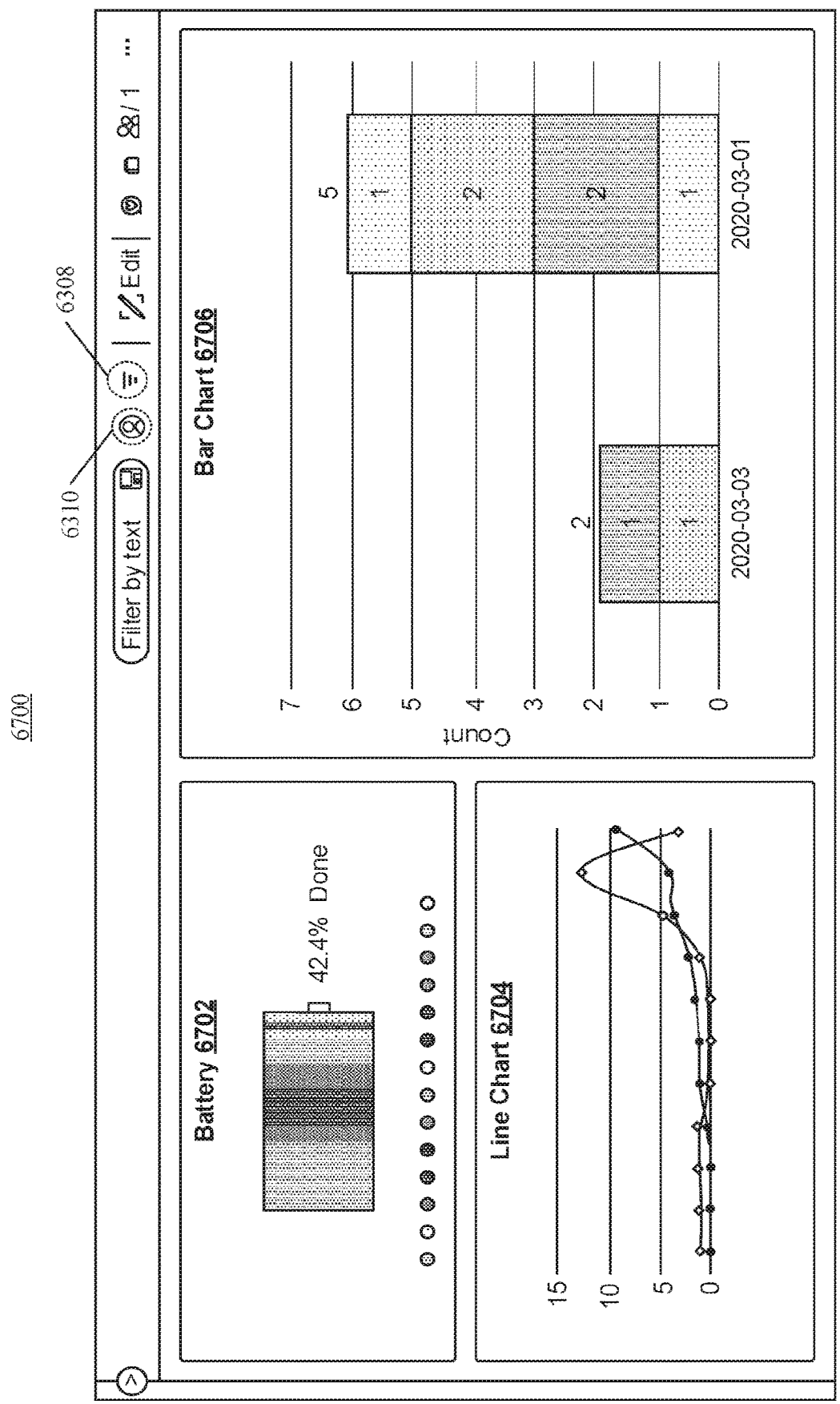
FIG. 67 illustrates an example of filtered summary information of an aggregate table, consistent with some embodiments of the present disclosure.

FIG. 67 illustrates an example of filtered summary information 6700 of an aggregate table, consistent with embodiments of the present disclosure. In some embodiments, the filtered summary information 6700 may be displayed using a computing device (e.g., the computing device 100 illustrated in FIG. 1) or software running thereon. For example, the filtered summary information 6700 may be the summary information 6300 after applying the filter 6602 (e.g., by clicking one or more avatars therein) as illustrated and described in association with FIG. 66. The filtered summary information 6700 includes a depiction of a battery 6702 that represents filtered overall progress information of the battery 6302, a line chart 6704 that represents filtered information of planned progress versus actual progress of the line chart 6304, and a bar chart 6706 that represents filtered information of status by week of the bar chart 6306. Compared with the summary information 6300 in FIG. 63, the battery 6702 shows "42.4% Done" representing that 42.4% of the tasks included in the aggregate table associated with the filtered summary information 6700 are completed, because the filter 6602 excludes some of the entities from the aggregate table associated with the summary information 6300. Similarly, the line chart 6704 and bar chart 6706 are also updated accordingly with respect to the line chart 6304 and bar chart 6306, respectively.

Figure 68:
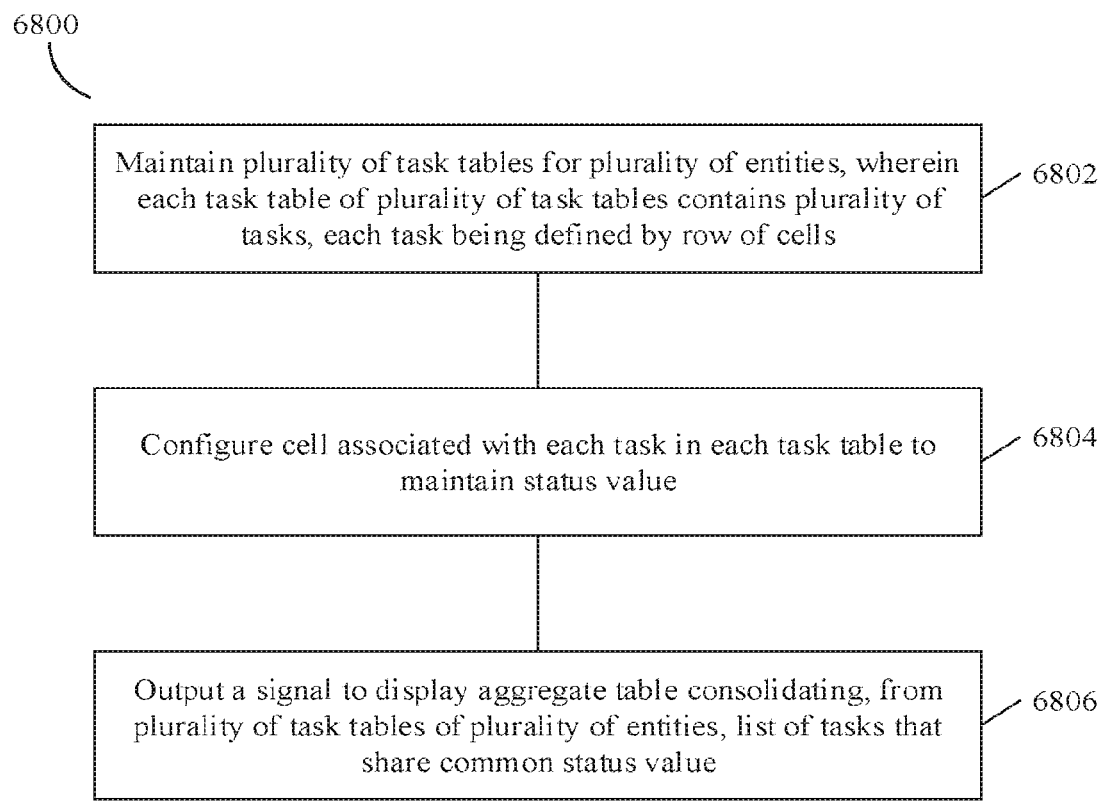
FIG. 68 is a block diagram of an example process for organizing status-based tasks, consistent with some embodiments of the present disclosure.

FIG. 68 illustrates a block diagram of an example process 6800 for organizing status-based tasks in tablature, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 6800 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 61 to 67 by way of example. In some embodiments, some aspects of the process 6800 may be implemented as software (e.g., program codes or instructions) that are stored in a memory (e.g., the memory portion 122 in FIG. 1) or a non-transitory computer-readable medium. In some embodiments, some aspects of the process 6800 may be implemented as hardware (e.g., a specific-purpose circuit). In some embodiments, the process 6800 may be implemented as a combination of software and hardware.

FIG. 68 includes process blocks 6802 to 6806. At block 6802, plurality of task tables may be maintained for a plurality of entities (e.g., persons, teams, or organizations). Each task table of the plurality of task tables may contain a plurality of tasks (e.g., "Task 1," "Task 2," and "Task 3" in the table 6100), each task being defined by a row of cells.

At block 6804, a cell (e.g., a cell in a column 6102 in FIG. 61) associated with each task may be configured to maintain a status value (e.g., the status values "In Progress," "Stuck," or "Done" in the table 6100). In some embodiments, the status value (e.g., the status value "stuck" in a column 6102 of the table 6100) may be maintained by the at least one processor in each task table to indicate that an associated task is stuck.

At block 6806, an output signal may be generated to display an aggregate table (e.g., the aggregate table 6200 in FIG. 62A) consolidating, from the plurality of task tables (e.g., the tables 6202, 6204, and 6206 in FIG. 62A) of the plurality of entities, a list of tasks (e.g., "Task 2," "Task 6," "Task 8," "Task 9," "Task 13," and "Task 25" in FIG. 62A) that share a common status value (e.g., the common status value "Stuck" in FIG. 62A). In some embodiments, the aggregate table may enable viewing of stuck tasks across the task tables (e.g., the tables 6202, 6204, and 6206 in FIG. 62A) of the plurality of entities.

In some embodiments, to display the aggregate table, the processing means may enable a selection of a subset of the plurality of task tables of the plurality of entities for consolidating. By way of example, the plurality of task tables (e.g., including the tables 6202, 6204, and 6206 in FIG. 62A) may include more than three tables, and the at least one processor may enable selection of the tables 6202, 6204, and 6206 as a subset for consolidating.

In some embodiments, the aggregate table may display summary information (e.g., the summary information 6300 in FIG. 63) for every common status value consolidated from the plurality of task tables. In some embodiments, to display the aggregate table, the processing means may consolidate similar status columns (e.g., status columns having a common word "stuck") as a common status value in the aggregate table.

In some embodiments, to display the aggregate table, the processing means may update the display of the aggregate table when a cell with the common status value is updated with a different status value (e.g., from "Stuck" to "Done"). In some embodiments, to update the display of the aggregate table, the processing means may record (e.g., by storing in the storage 130 in FIG. 1) the update to the cell in an activity log.

Consistent with disclosed embodiments, the processing means may further activate an interactive cell to contact (e.g., by sending an email, sending an instant message, sending a mobile text message, or making a call) the entity associated with the stuck status value. Consistent with disclosed embodiments, the processing means may further transmit a single communication (e.g., a single email, a single instant message, a single mobile text message, or a single phone call) to the entity associated with the common status value. Consistent with disclosed embodiments, the processing means may further notify an associated entity to provide a status value when a status value is empty.

Aspects of this disclosure may provide a technical solution to the challenging technical problem of project management and may relate to a system for project time tracking. A project may include a task, an enterprise, a goal, an assignment, a job, a chore, a duty, a labor, a function, a commission, a mission, an occupation, an undertaking, a responsibility, an errand, a venture, a burden, a quest, an item, or any other piece of work to be done. Additionally, as used within a collaborative work system, a project may be designated by a subject of work to be done, such as an address, an item, a post, an article, a written work, a design, a person, a patient, a group, a meeting, a call, an animal, an object, a date, a vehicle or any other representation of a project as received from a user that may be stored in a table. For example, a project may be an article to be written. In another example, a project may be a rental property to be managed which is referenced and represented as an address in a table.

Projects may be accomplished, managed, or overseen by an individual or group of individuals. In some circumstances, it may be desirable to track or measure the amount of time devoted to the project. Project time tracking may include one or more of measuring, storing, managing, analyzing, prioritizing, recording, allocating, and organizing time, or any other mechanism for capturing of time. The time may be measured on an individual basis in order to capture the effort, costs, or workload of a particular individual or group of individuals. The time may also be measured and associated with an individual project to capture the effort, costs, or workload required by a particular project. Additionally, the time may be measured on an individual basis and then aggregated in order to capture the effort, costs, or workload of a group of individuals as required by a particular project or projects, as disclosed herein.

For ease of discussion, example systems are described below with the understanding that aspects of the example systems apply equally to methods, devices, and computer-readable media. For example, some aspects of such systems may be implemented by a computing device or software running thereon. The computing device can include at least one processor (e.g., a CPU, GPU, DSP, FPGA, ASIC, or any circuitry for performing logical operations on input data as described herein) to perform the methods described herein. Other aspects of such methods may be implemented over a network (e.g., a wired network, a wireless network, or both).

As another example, some aspects of such methods may be implemented as operations or program codes in a non-transitory computer-readable medium. The operations or program codes can be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the examples described herein are not limited to particular physical or electronic instrumentalities, but rather may be accomplished using many differing instrumentalities.

Consistent with disclosed embodiments, the at least one processor may be configured to maintain a plurality of timers for a plurality of individuals working on a plurality of projects. A plurality of individuals may include one or more persons, representatives, agents, entities, or other parties. The plurality of individuals may be associated with a plurality of projects. A plurality of timers may be associated with the plurality of projects. A plurality of timers may include one or more displays of numbers, words, symbols, objects, or other digital or analog representations of an amount of time. The display of time measured may indicate an increasing amount of time (such as a stopwatch), or a decreasing amount of time (such as a count-down timer). For example, a timer may include a digital representation of days, hours, minutes, seconds, or other duration elapsed since a project has started. In another example, a timer may represent the passage of time by the movement of one or more hands on a clock, watch, or stopwatch. For example, the movement of a first hand may represent the passage of hours, the movement of a second hand may represent the passage of minutes, and the passage of a third hand may represent the passage of seconds. Additionally or alternatively, a symbol, object, or combination of objects and/or symbols may be used to represent the passage of time or an amount of time remaining. For example, a depiction of an hour-glass may represent the passage of time using falling sand, may represent the amount of time remaining by the amount of sand in an upper glass, and may represent the amount of time passed by the amount of sand in the lower glass. In another example, a depiction of an object travelling a path may also represent the passage of time, where the object's movement may correspond to the passage of time, the object's location may correspond to the amount of time recorded, and the end points of the path may correspond to a total amount of time, an amount of time remaining, or a subset thereof.

Consistent with disclosed embodiments, maintaining a plurality of timers may include saving, storing, recording, updating, tracking, counting, starting, stopping, editing, viewing, displaying, aggregating, combining, or otherwise making the plurality of timers current and available. For example, a computer system may display a digital timer that may count up (increasing) by showing the hours, minutes, and seconds devoted to a project when an input to "start" may be received until an input to "stop" may be received. When the "stop" input is received, the timer may display a static or unchanging amount of time that was devoted to the project. When the "start" input is received again, the timer may continue to count up and record the additional time devoted to the project. Maintaining a plurality of timers for a plurality of individuals working on plurality of projects may increase efficiency of individual workers, may provide more accurate estimates of the time necessary to complete a project, and may help to maintain timelines or meeting deadlines associated with the project.

Figure 69:
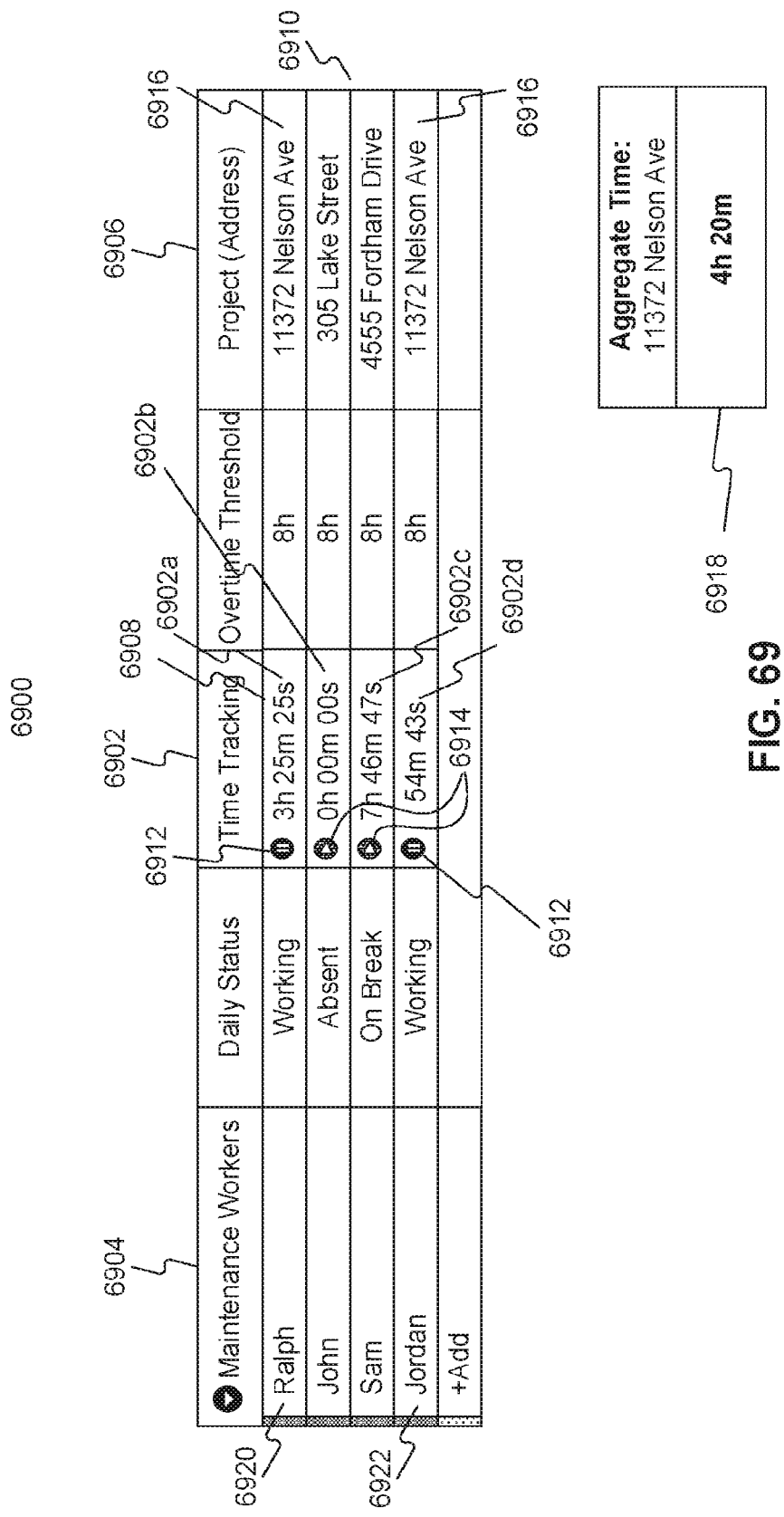
FIG. 69 illustrates a first view of an example of a user interface that may enable project time tracking, consistent with some embodiments of the present disclosure.

By way of example, FIG. 69 illustrates a first view of an example of a user interface 6900 that may enable project time tracking. The user interface 6900 may maintain multiple timers 6902 in order to track multiple individuals 6904 working on multiple projects 6906. FIG. 69 illustrates an exemplary embodiment of timers 6902 presented in a numerical format showing the hour, minutes, and seconds tracked. However, timers 6902 may also show less information such as displaying only the hours and minutes, displaying only the hours, displaying a percentage of a day, or any other measure of time. In some embodiments, timers 6902 more also show more information by displaying milliseconds or by additionally displaying the number of days elapsed. In other embodiments, timers 6902 may display the time tracked through a graphical indication such as a depiction of a clock or a depiction of an hour-glass as described herein.

In some embodiments, maintaining the plurality of timers may include displaying the plurality of timers in a plurality of cells in a table. A table may include a structure of rows and columns consisting of cells, as disclosed herein. Cells may include a box or other space reserved to display information or the absence of information within the table as delineated by the intersection of a horizontal row and a vertical row. Displaying a plurality of timers in a plurality of cells in a table may include designating cells in the table to display the value of one or more timers. A single timer may be designated to a single cell, or a plurality of timers may also be designated to a single cell.

By way of example, FIG. 69 illustrates a first view of an example of a user interface 6900 that may enable project time tracking. The user interface 6900 may display multiple timers 6902 in cells, such as cell 6908 within table 6910. While FIG. 69 illustrates a single timer in each cell 6908, other embodiments may include multiple timers in each cell 6908.

Disclosed embodiments may further include displaying an active session timer associated with an active timer of a particular cell in the table in response to an action. An active session timer may be a separate timer from the plurality of timers in the plurality of cells. The active session timer may include a timer reflecting, reproducing, or otherwise displaying the contents of a separate active timer displayed within a table that may be currently counting (up or down). In an example embodiment where a cell may contain a particular or active timer for total time tracked, an active session timer may be a separate timer that tracks time for an active session before the active session is terminated. An active session may include the time elapsed since activation of the active timer. Whenever the active timer is paused or stopped, the active session timer may reset to zero. The active session timer may capture the same amount of time as an individual timer or may capture less than an individual timer for a project.

An active session timer may be displayed in response to an action. An action may include a user action, such as a mouse click, a cursor hover, a mouseover, a button selection, a keyboard input, a voice command, an interaction performed in virtual or augmented reality, or any other action by a user received via a computer system. A cursor hover may include moving a mouse cursor over a clickable object, button, or other interactive feature, without clicking a mouse button. An action may include selecting the active timer in a table. The selection may be accomplished through any of the mechanisms discussed above.

Figure 72:
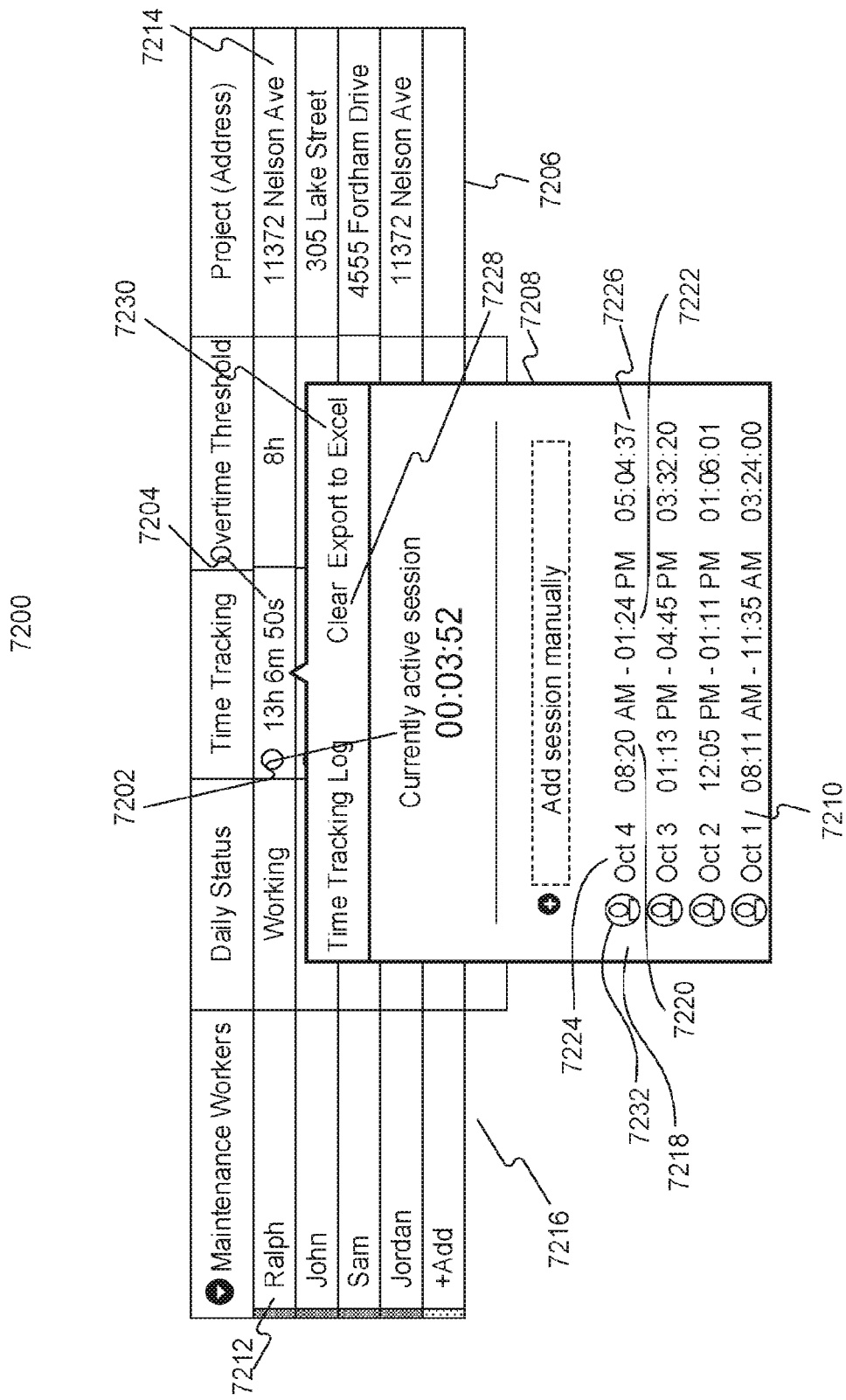
FIG. 72 illustrates a fourth view of an example of a user interface that may enable project time tracking, consistent with some embodiments of the present disclosure.

By way of example, FIG. 72 illustrates a fourth view of an exemplary user interface that may enable project time tracking. The user interface 7200 may display an active session timer 7202 of a cell containing active timer 7204 in table 7206. The display of the active session timer 7202 may be presented in response to an action such as a cursor hover over the cell containing active timer 7204 or any other selection through any user interface. In this example, the active session timer 7202 may represent the amount of time spent by maintenance worker Ralph 7212 working on repairs at a rental property 7214. While Ralph 7212 may have tracked a total of 13 hours, 6 minutes and 50 seconds so far on active timer 7204, the current active session timer 7202 has tracked 3 minutes and 52 seconds of time elapsed since the current active session timer 7202 was initiated.

In some embodiments, displaying the active session timer may further include presenting a first display module for the active session timer adjacent to a second display module for the active timer, such that the active session timer and the active timer are both displayed. In one embodiment, the active timer and active session timer may be presented in one or more display modules as a component of a graphical user interface. Advantageously, this may allow a user to view the active session timer and the active timer simultaneously and/or in relation to one another. In additional embodiments, the action may further include changes to the information represented in a cell associated with the project as an indirect result of a user action or input, such as a change in timer status from stopped, paused, or inactive, to running, counting or active. In another example, an active session timer may be displayed when a new project is created. The use of an active session timer may allow a user to quickly identify which project may currently be worked on by that user or another individual. For example, in a table of projects representing houses under construction, the active session timer may show which house or houses are currently having worked performed on them. Additionally or alternatively, an active session timer may indicate to a user the amount of uninterrupted time devoted to a project.

By way of example, FIG. 72 illustrates a fourth view of an example of a user interface 7200 that may enable project time tracking. The user interface 7200 may include a first display module 7216 containing active timer 7204 and a second display module 7208 containing the active session timer 7202. First display module 7216 may be adjacent to the second display module 7208 and may be displayed in a common view.

In some embodiments the active session timer may include a time tracking log for the active timer. A time tracking log may include a history of time entries of past active session timers that may indicate an individual associated with the time entry, a date of the time entry, a start time, an end time, a total time of the past active session, and any other information relevant to the past active sessions. For example, an active session timer may record the time invested by an individual in a project starting when the user initiated the active session timer and until the user ends the active session timer. Once the active session timer is ended, the time tracked for that active session is then recorded in a log.

By way of example, in FIG. 72, a user interface 7200 that may enable project time tracking. The user interface 7200 may include a time tracking log 7210 for active timer 7204. The time tracking log 7210 may include one or more past active sessions 7218 and display additional information such as a session start time 7220, a session stop time 7222, a total duration of the past active session 7226, and a date of the past active session 7224. The time tracking log 7210 may also display additional information such as a representation of the user 7232 associated with the past active session. The time tracking log 7210 may be reset with Clear button 7228 and may also be exported to a third-party application such as Excel, via the Export button 7230.

In some embodiments, the at least one processor may be configured to enable the plurality of individuals to simultaneously run timers reflecting current work time of each individual. Timers may be simultaneously run by one or more individuals, such that the timers run concurrently. The current work time of each individual may include the total amount of time spent by that individual on a specified project as captured by the timer associated with that project. The system may enable the one or more individuals to run timers separately and simultaneously, which may allow multiple timers to individually capture the current work time of each individual who may be working on each project. The multiple timers may each correspond to the same project for different individuals or may correspond to different projects for a single individual. For example, multiple individuals may each run their own timer to capture the amount of time spent by each of them for common projects across different products. The system may be capable of maintaining multiple individual timers corresponding to each individual working on each common project. The individual timers may run at the same time or independently at different times. Additionally or alternatively, the individual timers may start and stop simultaneously or independently.

FIG. 69 illustrates a first view of an example of a user interface 6900 that may enable project time tracking. The user interface 6900 may include multiple timers 6902 associated with multiple individuals 6904. The multiple timers 6902 may run simultaneously or independently. In this example, timer 6902a and timer 6902d may run simultaneously. The user interface 6900 may include a pause icon 6912 indicating that the timer 6902a and time 6902d are actively running (e.g., when the timer is running, the pause icon is displayed to enable a user to pause the timer). A running icon 6914 may indicate that a timer is static or paused (e.g., when the timer is not running, the play button enables a user to restart the timer). In this example, the pause icon 6912 and running icon 6914 indicate a timer action that may be activated by a next user interaction. The time displayed by the multiple timers 6902 may correspond to a current work time of each individual. In this example, timer 6902a may display the current work time for maintenance worker Ralph 6920.

Various embodiments may further include identifying at least one common project being worked on by the plurality of individuals for aggregate real time work tracking. A common project may include any task with which any number of individuals may be associated. As multiple individuals may work on one or more common projects either simultaneously or at differing times, it may be advantageous to combine or aggregate the amount of time captured by their individual timers. This may occur, for example, in real time, so that the total time invested in a project by multiple individuals may be monitored. Thus, multiple individual timers may be aggregated into a group timer, to track the total amount of time devoted by a group to a common project. The aggregated time may be calculated by adding together the amount of time captured by each individual timer (active or otherwise) associated with a project. In some cases, the aggregated time may be static, for example, when the individual timers are not running. In other cases, the aggregated time may be active or dynamic, for example, when one or more individual timers are running.

By way of example, in FIG. 69 the user interface 6900 may include a common project 6916 being worked on by both Ralph 6920 and Jordan 6922. The time invested by Ralph 6920 and Jordan 6922, are displayed via timer 6902a and 6902d respectively, and may be aggregated and displayed as a joint work clock 6918. The aggregated timer 6918 may represent the total time investment in common project 6916.

Various embodiments may further include displaying a joint work tracking clock in response to identifying the at least one common project for real time work tracking, wherein the joint work tracking clock runs faster than real time when multiple individuals simultaneously work on at least one project. A joint work tracking clock may represent or display the aggregated into a single timer, time captured by individual timers for a common project. As previously discussed, the aggregated time may represent the total amount of time devoted to or associated with the common project. The time can be represented in any measure, such as days, hours, minutes, seconds, or any other length of time. The joint work tracking clock may display the amount of time aggregated in real time such that the joint work tracking clock may be actively running when at least one individual timer is active. The joint work tracking clock may be static when all of the aggregated individual timers are static. In some embodiments, the joint work tracking clock may run faster than real time when more than one individual timer associated with a common project are actively capturing or recording time. For example, when three individual timers associated with the same project are simultaneously running, the displayed aggregated time may be dynamic and increase at a rate of three times faster than a timer measuring real time. In other embodiments, a highly skilled individual, such as an expert, may be assigned a clock speed faster than others. For example, an expert working on a project may be assigned a clock speed multiplier of 1.5×, such that every two hours of real time work is calculated by the system as three hours.

In some embodiments, a clock speed of the joint work tracking clock may run at a multiple of a number of persons simultaneously working on the at least one common project. Thus, when each individual is assigned a common 1× clock speed, the rate of the clock speed may be calculated by multiplying the number of persons simultaneously working by the duration of work. For example, if five individuals are simultaneously at work on the same project, the clock might run 5 times faster than real time (e.g., aggregate clock runs at 5 seconds per 1 real time second.)

In some disclosed embodiments, at least one processor may be configured to enable identification of a plurality of projects, and the joint work tracking clock may be configured to attribute, in faster than real time, time invested in the plurality of projects. As a company or team may work on multiple projects either simultaneously or independently, it may be helpful to combine or aggregate the amount of time captured by individual timers into a single timer to represent the total amount of time devoted to or associated with the multiple projects. The aggregated time may be calculated by combining the amount of time captured by each individual timer (active or otherwise) associated with the identified multiple projects. Additionally or alternatively, the aggregated time may be calculated by combining the joint work tracking clocks associated with the multiple projects. In some cases, the aggregated time may be static, for example, when the individual timers are not running. In other cases, the aggregated time may be active or dynamic, for example, when one or more individual timers are running. A joint work tracking clock representing time invested in a plurality of projects may run faster than real time, for reasons discussed previously.

In the example of FIG. 70, the user interface 7000 may track multiple projects, such as project 7004 and project 7006. Timers 7002 may represent the time investment of individuals in the multiple projects 7004 and 7006. The joint work tracking clock 7012 may display the time investment of the individuals from project 7004 and project 7006. When both timers 7002 and 7018 are active as illustrated in FIG. 70, joint work tracking clock 7012 may run at twice the speed of real time. In other embodiments, the joint work tracking clock 7012 may be displayed in a dashboard view similar to the view illustrated in FIG. 73.

Figure 73:
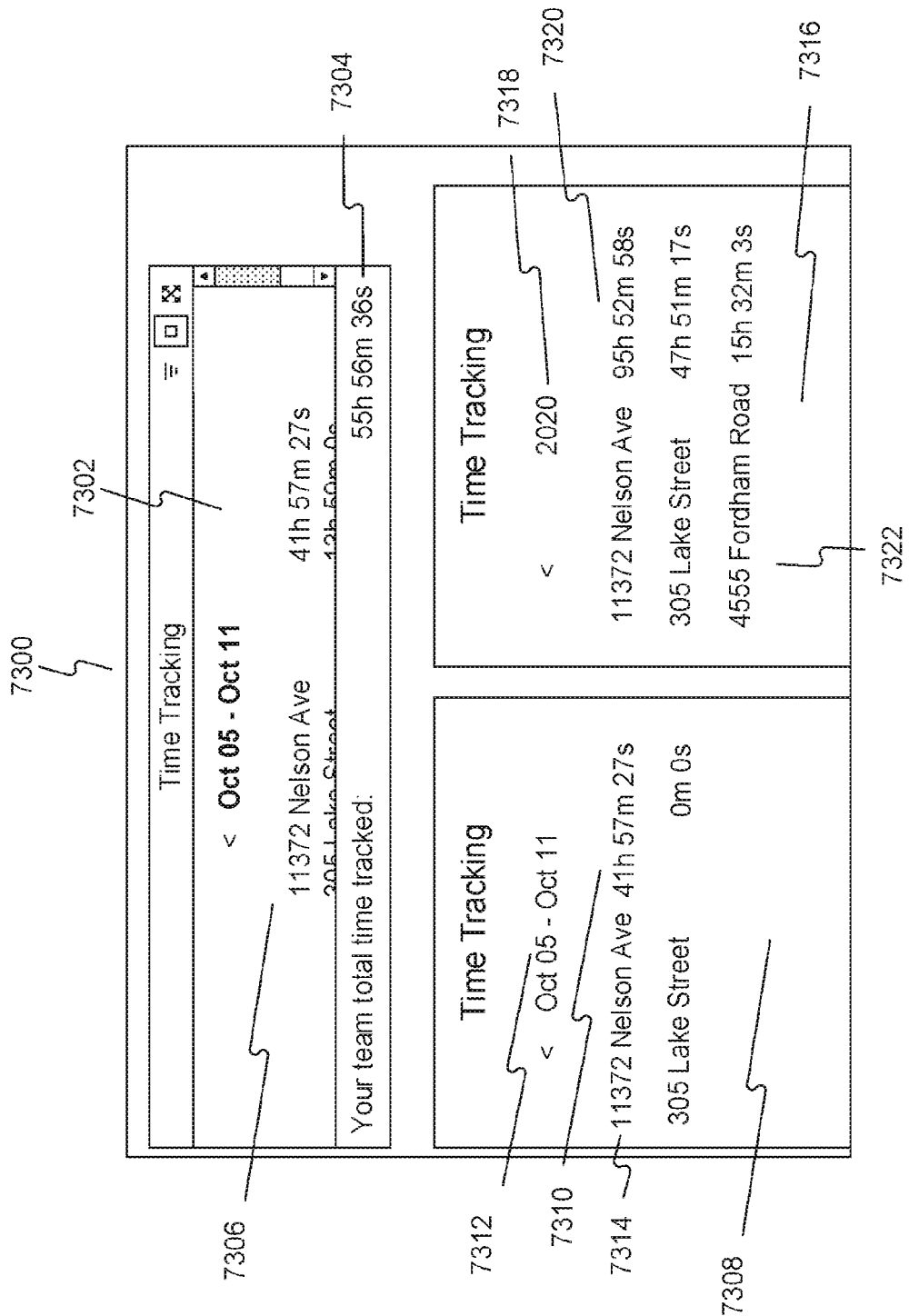
FIG. 73 illustrates a dashboard view of an example of a user interface that enables project time tracking, consistent with some embodiments of the present disclosure.

The dashboard user interface 7300 in FIG. 73 may include a first display module 7302 with joint work tracking clock 7304 which may display an aggregated time for multiple projects itemized in window 7306 within a specified time period. In this instance, as illustrated in display module 7306, the time period is October 05-October 11. A second display module 7308 may include multiple timers which may display aggregated time for multiple common projects over a period of time. For example, timer 7310 may display the aggregated amount of time spend working on a project within the specified time period. In this example, the timer 7310 represents the total amount of time individual maintenance workers spend working on a rental property 7314, identified by address 11372 Nelson Ave, within the week of October 05 through October 11, as reflected in field 7312. A third display module 7316 may include multiple timers which may display aggregated time for multiple common projects over a different period of time. In this example, multiple timers 7320 may represent the total amount of time individual maintenance workers spend working on individual rental properties in fields 7322, within the year 2020, as reflected in field 7318. The dashboard user interface 7300 may be interactive, enabling user input to customize variables such as project identification and time periods.

Disclosed embodiments may enable the exclusion of time associated with specific individuals working on the common project from the joint work tracking clock, and in response to the exclusion, configuring the joint work tracking clock to exclude time investments of the specific individuals from the specific individuals. In some instances, project definitions may require that certain individuals are excluded from time tracking. For example, maintenance workers time may be tracked, the time of administrators or clerical works who also work on a project may be omitted from an aggregate time measure. In such instances, although individuals are associated with a particular project and their time is tracked individually, an aggregate time may be set to exclude investment of those individuals. A graphical user interface enable an administrator or other user to specify particular individuals for exclusion from aggregate time tracking. The joint tracking clock may be configured to exclude the time investments recorded by or attributable to the identified individuals from the calculation of the aggregated time. In another example, individuals, groups of individuals, classifications or roles of individuals, projects, groups of projects, or classifications of projects may be excluded from the aggregate time tracking. Additionally or alternatively, the time of an individual, group of individuals, classifications or roles of individuals, project, groups of projects, or classifications of projects may be weighted to multiply the aggregated time. For example, the time of supervisor may be weighted by a factor of two, such that for every hour a supervisor works, the aggregate timer clocks two hours. In other embodiments, an individual's aggregated time may be based on a ratio for calculation (e.g., a multiplicative factor) assigned to each particular individual or entity. The ratio for calculation may be assigned based on an individual, a status type, or any other information associated with an individual or entity, such that different entities may have their own ratio for calculating their aggregated time. In an exemplary embodiment where entities may represent objects such as machinery, each type of machinery may be associated with an assigned ratio for calculating the aggregated time for a particular piece of machinery. In such an example, every type of machinery (e.g., a packaging machine, a molding machine, a sterilizer, or any other machine) may automatically be assigned a particular ratio associated with that particular machinery type in a table. In another example, if each individual is associated with a different employment status (e.g., full-time versus part time) each employment status type may have an associated ratio to calculate the aggregated time for a particular individual based on their employment status. In this example, a part-time employee status may be associated with a ratio of ½, such that every employee in a table with a part-time status may automatically have their aggregated time calculated based on the ratio of ½.

Figure 71:
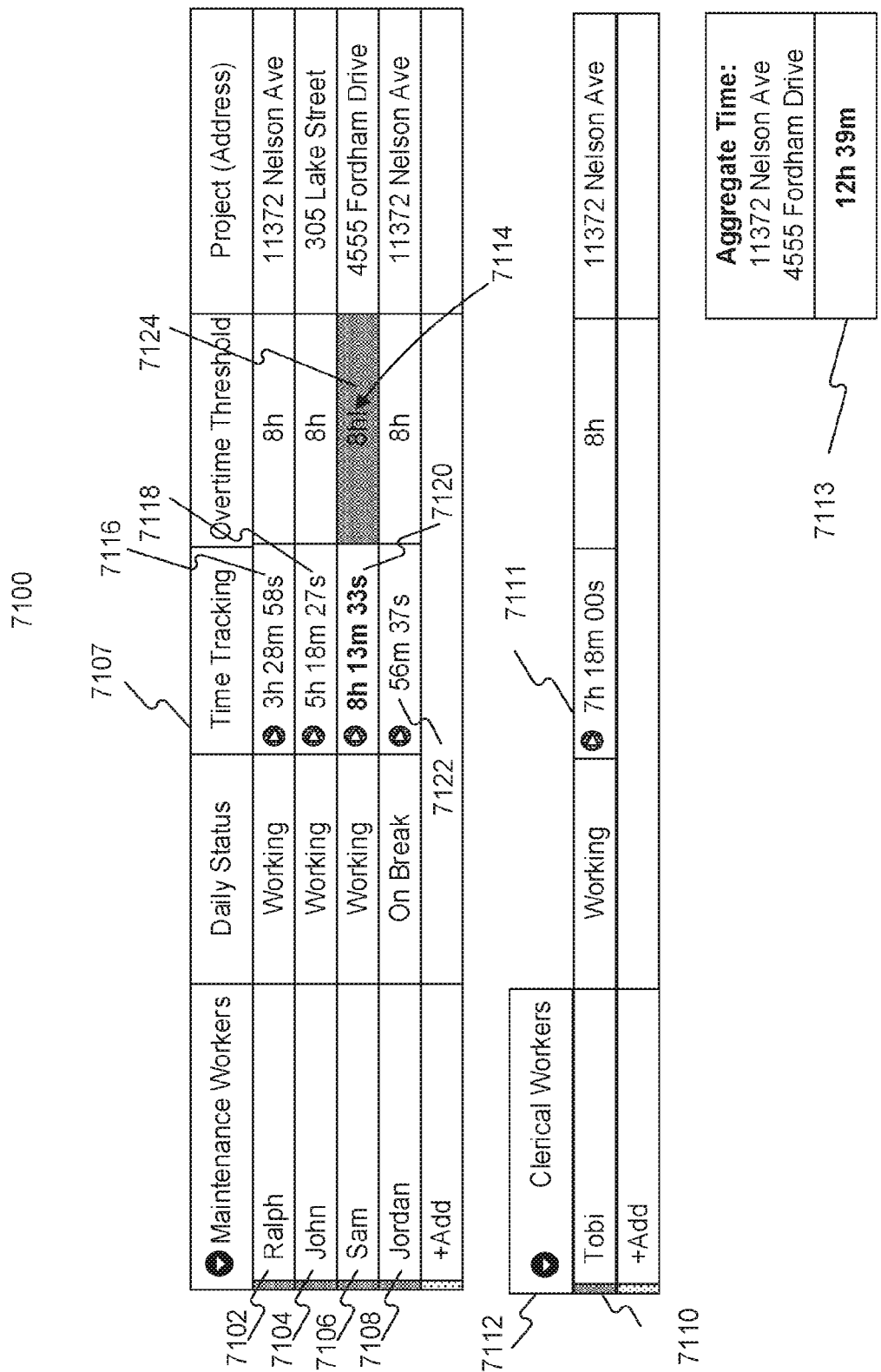
FIG. 71 illustrates a third view of an example of a user interface that may enable project time tracking, consistent with some embodiments of the present disclosure.

FIG. 71 illustrates a third view of an example of a user interface 7100 that may enable aggregate project time tracking while omitting from the aggregate time of certain worker. The user interface 7100 may identify in separate fields multiple individuals, such as Ralph in field 7102, John in field 7104, Sam in field 7106, Jordan in field 7108, and Tobi in field 7110. Each individual's time investment may be displayed as a timer in column 7107. In this example, timer 7116 may represent the time invested by Ralph, timer 7118 may represent the time invested by John, timer 7120 may represent the time invested by Sam, and timer 7122 may represent the time invested by Jordan, and timer 7111 may represent the time invested by Tobi. In this example, since Tobi is a clerical worker, Tobi's time may be excluded from the joint work tracking clock 7113. The joint work clock 7113 may indicate "12 h 39 m" as the time invested by the individual maintenance workers on the Nelson and Fordham projects, excluding Tobi's time on the Nelson project. The exclusion may be custom-set for each project. For example, in this instance, the project requirements exclude the tracking of clerical time. In other instances the tracking of clerical time may be included. In such instances, when the administrator sets up the board, no exclusion would be applied for clerical workers. Disclosed embodiments may enable simultaneous display of a plurality of separate clocks and the joint work tracking clock, each separate clock tracking a time investment of a different individual of the multiple individuals in real time while the joint work tracking clock runs faster than real time. A dynamic graphical user interface may display a plurality of separate clocks corresponding to one or more individual clocks or timers. Each separate clock may represent the time investment of, or time measured and attributed to, a different individual from among multiple individuals. Each clock may display the associated time investment increasing in real time while the joint work tracking clock may run faster than real time, as described earlier. Additionally or alternatively, the specific clock for each of the multiple individuals may run faster than real time, if, for example, a weighting factor of greater than "1" is applied to an individual. Alternatively or additionally, a personal timer may run faster than real time if an individual is permitted to work on multiple projects simultaneously. In this example, when the specific individual works on multiple projects concurrently or runs timers associated with multiple projects at the same time, the timer associated with the individual may run faster than real time (e.g., if a single individual is working on two projects simultaneously, a timer aggregating the individual's time investment would run twice the speed of a real time clock).

Various embodiments may further enable a time overage threshold received via a graphical user interface. A time overage threshold may include a maximum or minimum boundary associated with an amount of aggregated time, individual time, time attributable to a group of individuals, or other allotment of time. The time overage threshold may serve as a limit, in a specified time period, for the amount of time invested by all individuals on a project, a subset of individuals on a project, or a specific individual on a project. Further embodiments may include outputting an indicator when the time overage threshold is met. An indicator may include a change to the row or cell corresponding to the timer that has exceeded the time overage threshold. The indicator may reflect a change in timer color, bolding of a timer, an animation, a symbol, or any other designation. Further, the indicator may be a change to a board, a change to a widget, or any other change within the graphical user interface which may alert the user. An overage may act as a triggering event that may cause a further action, such as causing a change in another row or cell within the table. Additionally or alternatively, an overage may include notifications outside the graphical user interface such as an email, a text message, a voice call, an alert through an application, a social media alert, an alert through a mobile device, an alert through wearable technology, an alert through a device connected to the internet, or any other mechanism for providing a notification.

Disclosed embodiments may further enable an individual time overage threshold for at least one of the plurality of individuals and causing independent indicators to be displayed when an individual of the plurality of individuals reaches the individual time overage threshold. For example, time overage thresholds may be set on an individualized basis. Some employees, for example, may be authorized to work no more than 8 hours in a given day while others may have a 10 hour threshold. The system may be configured to allow the thresholds to be set on an individualized basis such that alerts will trigger at different times for different individuals. A threshold may be unique to a particular individual, group of individuals, classification of individuals, or may be applied on an ad hoc basis.

By way of example, in FIG. 70, the user interface 7000 may include an overtime threshold column 7008 to designate the overtime threshold for each individual. For example, the overtime threshold for maintenance worker Sam may beset to 8 hours as reflected in cell 7014. When Sam exceeds the overtime threshold of 8 hours, an indicator 7010 may appear in cell 7014. Additionally or alternatively, the indicator may be a change in color of the timer 7018 or a change in appearance such as a shading 7020 of cell 7014.

Figure 74:
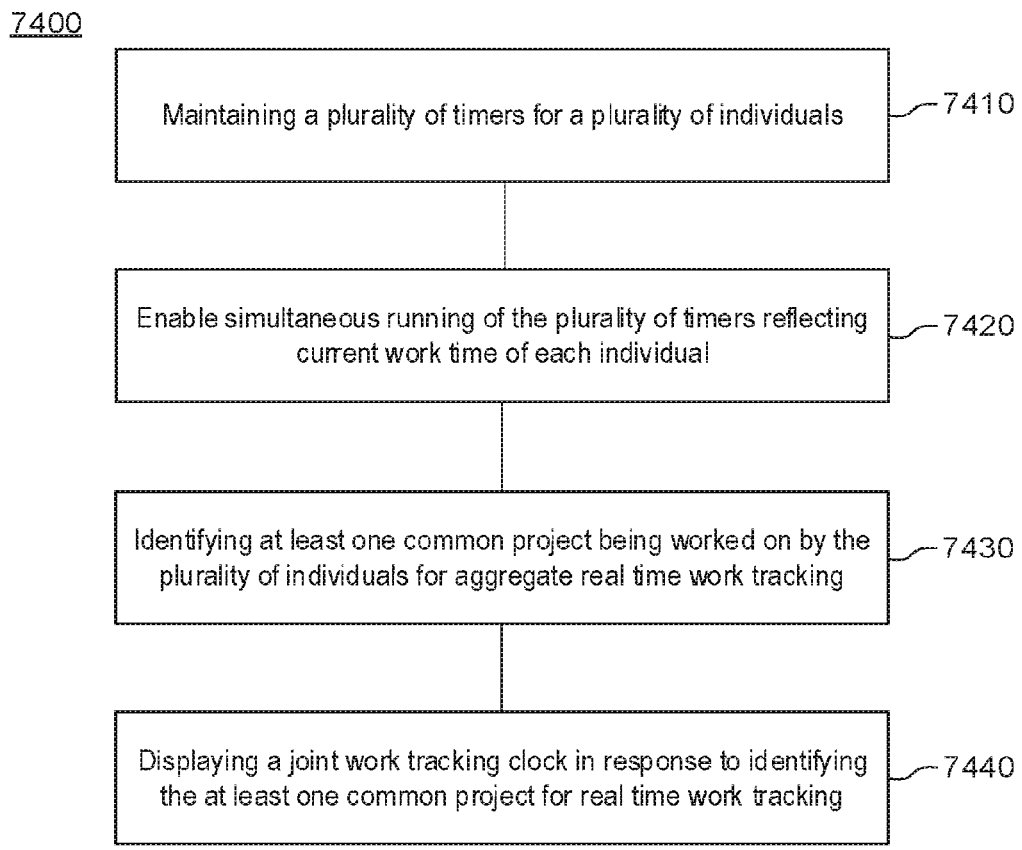
FIG. 74 is a block diagram of an exemplary process for project time tracking, consistent with some embodiments of the present disclosure.

One embodiment may include a method 7400, as shown in FIG. 74, with block 7410 for maintaining a plurality of timers for a plurality of individuals working on a plurality of projects, as previously discussed. At block 7420, the method 7400 may include enabling simultaneously running the plurality of timers reflecting current work time of each individual, as previously discussed. At block 7430, the method 7400 may include identifying at least one common project being worked on by the plurality of individuals for aggregate real time work tracking, as discussed above. At block 7440, the method 7400 may include displaying a joint work tracking clock, in response to identifying the at least one common project for real time work tracking, wherein the joint work tracking clock runs faster than real time when multiple individuals simultaneously work on at least one project, consistent with the disclosure described above.

Aspects of this disclosure may provide a technical solution to the challenging technical problem of project management across multiple geographic locations and time zones and may relate to a system for enabling automatic time zone updates in tablature. A time zone may include a geographic region that observes the same standard time. A local time within a time zone may be represented as an offset from Greenwich Mean Time ("GMT") or Coordinated Universal Time ("UTC"). The offset may be based on the user's geographic location that may either be automatically detected on the user's computing device, such as through GPS tracking, or may be automatically detected through a connection to a network, such as through an assignment of a local IP address. The offset may also be set by the user manually. The offset may be a whole number of hours or an offset of 15, 30, or 45 minutes. For example, the local time in Tel Aviv, Israel may be expressed as "GMT+3," indicating that the local time is 3 hours ahead of GMT or UTC. Additionally, time zones may be referred to by a name or title instead of indicating the offset as a numeric amount. For example, Chicago, Ill., United States is located in the Central Daylight time zone of the United States, indicating a five-hour negative offset from GMT (GMT−5). As time zones may vary across the world, it may be advantageous to automatically update or convert a time expressed or contained in tablature. Automatically updating time zones in tablature may include updating or converting a time, reflecting a local time zone, displayed in tablature based on a geographic location of a user, based on a geographic location of a user device to reflect the location of the user, or based on a change of a geographic location for either the user or the user device. The tablature may also display an indication of a time zone or time offset associated with a user or user device, display an indication of a change to a time zone associated with a user or user device, or display other changes to a time in tablature based on a time zone, as disclosed herein.

A system consistent with disclosed embodiments may include at least one processor and may involve computer readable media. At least one processor may include any circuitry for performing logical operations on input data as described herein. Non-transitory computer-readable media may also be used in connection with disclosed embodiments. Non-transitory computer readable media, as described herein, may be implemented as any combination of hardware, firmware, software, or any medium capable of storing data that is readable by any computing device with a processor for performing methods or operations represented by the stored data. In a broadest sense, the examples described herein are not limited to particular physical or electronic instrumentalities, but rather may be accomplished using many differing instrumentalities.

Consistent with disclosed embodiments, the at least one processor may be configured to maintain a data structure containing information related to a plurality of tasks assigned to a plurality of geographically disbursed individuals. Maintaining a data structure may include saving, storing, recording, writing, overwriting, deleting, moving, relocating, updating, tracking, counting, calculating, locating, editing, viewing, displaying, aggregating, combining, or otherwise preserving information stored in a repository or memory. The repository may be, for example, a local memory associated with a computing device, memory accessible on-site through a local area network, a remote repository accessible via the Internet, or any other location where data may be maintained. A task may include a project, an enterprise, a goal, an assignment, a job, a chore, a duty, a labor, a function, a commission, a mission, an occupation, an undertaking, a responsibility, an errand, a venture, a burden, a quest, an item, or any other piece of work to be done. Additionally, a task may be designated by a subject of work to be done, such as a description, an address, an item (a to-do item), a post, an article, a written work, a design, a person, a patient, a group, a meeting, a call, an animal, an object, a date, a vehicle, or any other representation of a task as received from a user that may be stored in a table. Information related to a task may include a time, a date, a deadline, a timeline, an individual, a trait, a file, a conversation, a graphic, a name, a title, a priority, a subtask, a related task, a location, an address, an email address, a website, a status, a timer, a keyword, a budget, a cost, or any other context or data associated with a task. A plurality of individuals may include one or more persons, representatives, agents, entities, or other parties. Geographically disbursed individuals may include a plurality of individuals in separate locations. Individuals may include entities such as groups of individuals, real estate, vehicles, mail, packages, and any other object or tangible asset. As companies and individuals may participate in the worldwide economy from diverse geographic locations, and may change locations periodically, it may be advantageous to maintain a repository of location information in order to aid in managing, tracking, or otherwise capturing information related to multiple tasks assigned to multiple individuals located in multiple, disbursed geographic locations. Teams may be spread across the world. For example, a team may have members in Dallas, Tex., Sydney, Australia, and London, England, all working together on a common task. And the team members' jobs may involve regular travel to other time zones making it difficult for team members to know when their colleagues are most likely available to communicate. Embodiments disclosed herein may not only help team members collaborate, but also better coordinate global communications.

In some embodiments, the data structure may include indications of tasks, identities of the plurality of geographically disbursed individuals, and geographical locations associated with the plurality of geographically disbursed individuals. An indication of a task may include a name, an abbreviation, a location, a picture, an emoji, a color, a person, or any word, alphanumeric data, graphic element, number, a numeric value, or any designation that may be used to identify a task. An identity of an individual may be represented by alphanumeric data, a graphic element, a name, a title, a position, a location, a photograph, an object, an avatar, a number, a numeric value, a symbol, alphanumerics, characters, or any other visualization capable of identifying a specific individual, multiple individuals, a group of individuals, or an entity.

Multiple individuals may be located in the same location or dispersed across multiple locations. A geographic location may include a physical location on earth as defined by a physical address, longitude and latitude coordinates, a town, a city, a county, a country, or any other means of identifying a position. Additionally or alternatively, a geographic location may be associated with a task to be completed, a real estate property, or an entity.

By way of example, FIG. 75 illustrates an exemplary user interface 7500 that depicts automatic time zone updates in an exemplary use case involving the production of a podcast episode. The table 7502 may include multiple tasks 7504 that need to be accomplished in order to publish an episode of a podcast. The table 7502 may include additional information associated with the multiple tasks 7504 such as a task name, a name of a person 7510 assigned to complete the task, a geographic location 7512 of the individual 7510, and a deadline 7514 by which to complete the task. In this example, Ben 7510b, located in Green Bay, Wis. 7512b, is assigned the task 7504b of finding a "Fun Fact of the Day" to be read as part of the podcast by the deadline 7514b of October 10. As a further example, in FIG. 75, the location 7512 displayed for the task 7504 may represent a geographic location where an individual 7510 must travel in order to complete the task 7504. In this example, Erin 7510e must travel to location 7512e in New York, N.Y., USA in order to record an interview with a guest to be incorporated as part of the podcast. In this particular example, each row of the table 7502 represents a different task assigned to a different individual, each of whom is geographically disbursed from the others. Of course, other examples encompassed within the breadth of this disclosure might involve other types of tasks, and might involve situations where only some of the individuals are geographically disbursed. This example illustrates one of many tables. For instance, in this particular example, the table relates to podcast episode 24, implying that there are many separate tables, each for a different episode.

In some embodiments, the at least one processor may be configured to retrieve from the data structure, and display in each of a plurality of tables, at least one task assigned to a particular individual from the plurality of geographically disbursed individuals, together with a display of a subgroup of the plurality of tasks assigned to others of the plurality of geographically disbursed individuals. Retrieving may include accessing a location in a repository or memory (data structure) storing data associated with a task. Data associated with a task may include a time, a date, a deadline, a timeline, an individual, a file, a conversation, a graphic, a name, a title, a priority, a subtask, a related task, a location, an address, an email address, a website, a status, a timer, a keyword, a budget, a cost, a trait, or any other context or information associated with a task. Displaying may include visually representing the retrieved representation of the at least one task across designated cells within a plurality tables in any 2D or 3D display. The tasks of different tables need not be displayed simultaneously. For example, displaying tasks in each of a plurality of tables may involve displaying at least one task and at least one other task sequentially in different tables, or in different tables at disparate times separated by periods of non-display. In some cases, the retrieved representation of the at least one task may be displayed across multiple cells within the same table, in different tables, or any other combination thereof. Additionally or alternatively, a subgroup of tasks may be displayed within a table, on top of a table, or in a separate table. A subgroup may include one or more tasks grouped by a common trait or shared information associated with the task such as a common time, date, deadline, timeline, individual, file, conversation, graphic, name, title, priority, location, address, email address, website, status, timer, keyword, budget, cost, trait, or any other common context or information associated with a task. In yet another example, a subgroup may be any number of tasks other than the particular task. For example, in FIG. 75, the News Update task 7504a may be considered a particular task, and all the remaining tasks 7504b-7504h in the table may be considered a subgroup of tasks. In addition, displaying in each of a plurality of tables at least one task assigned to a particular individual does not necessarily mean that the same task is displayed in each table. While displaying the same task in multiple tables is certainly one possibility within the scope of this disclosure, each of the plurality of tables may display non-overlapping tasks.

In the example of FIG. 2, each geographically disbursed individual may be associated with a separate device, such as user device 220-1 to 220-m of FIG. 2. A task and data associated with the task may be stored in a data structure on a computing device 100 or in a repository 230 that may be accessed via network 200. The task and its associated data may be retrieved from data repository 230 by a computing device 100 via communicating with DBMS 235 over network 200. The computing device 100 may retrieve a task from the data structure along with data associated with the task indicating at least one assigned individual associated with the task. Computing device 100 may further display the task and the at least one assigned individual in one or more tables based on a common trait or shared information associated with the task.

In a further embodiment, the at least one task assigned to the particular individual may be displayed together with a subgroup of the plurality of tasks assigned to others of the plurality of geographically distributed individuals. For example, at least one task assigned to a particular individual may be displayed in a table separately or adjacent to other tasks assigned to other individuals that may be geographically distributed. The table may display the at least one task assigned to the particular individual in addition to a subgroup of the plurality of tasks consisting of a group of tasks assigned to other geographically distributed individuals. The subgroup of the plurality of tasks may be less than or equal to the entirety of tasks represented in the table.

Figure 76B:
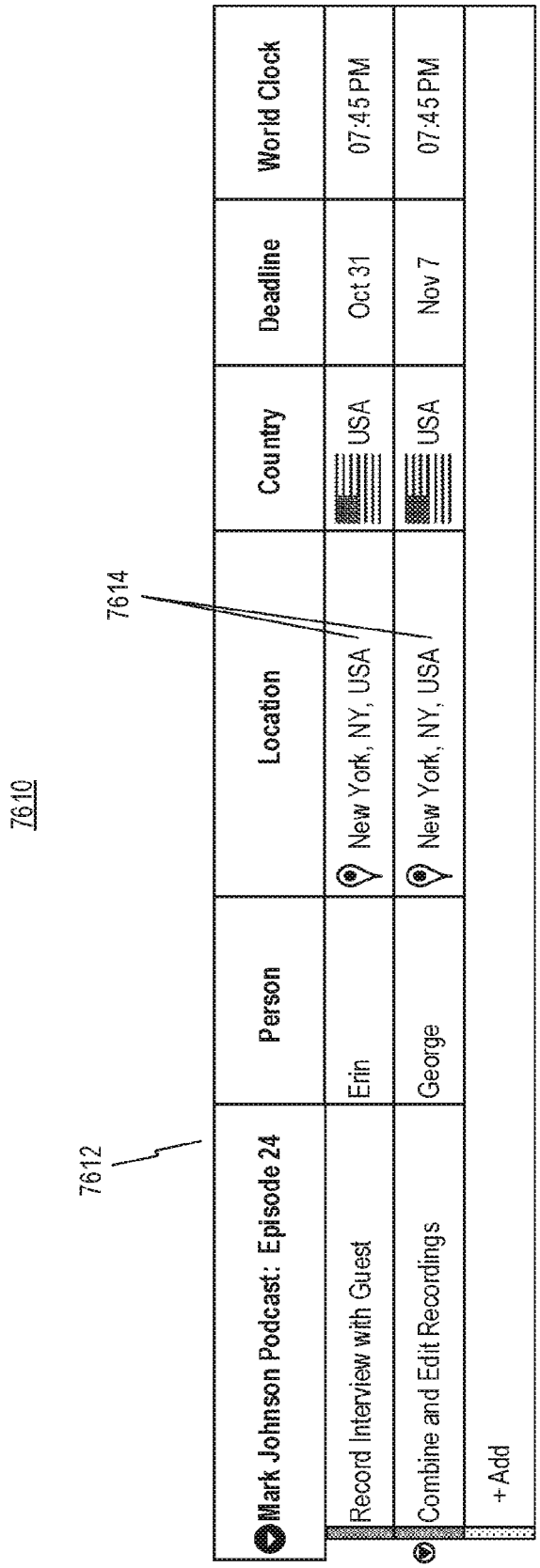
FIG. 76B illustrates a second view of an example user interface that may display a second subgroup of tasks, consistent with some embodiments of the present disclosure.
Figure 76C:
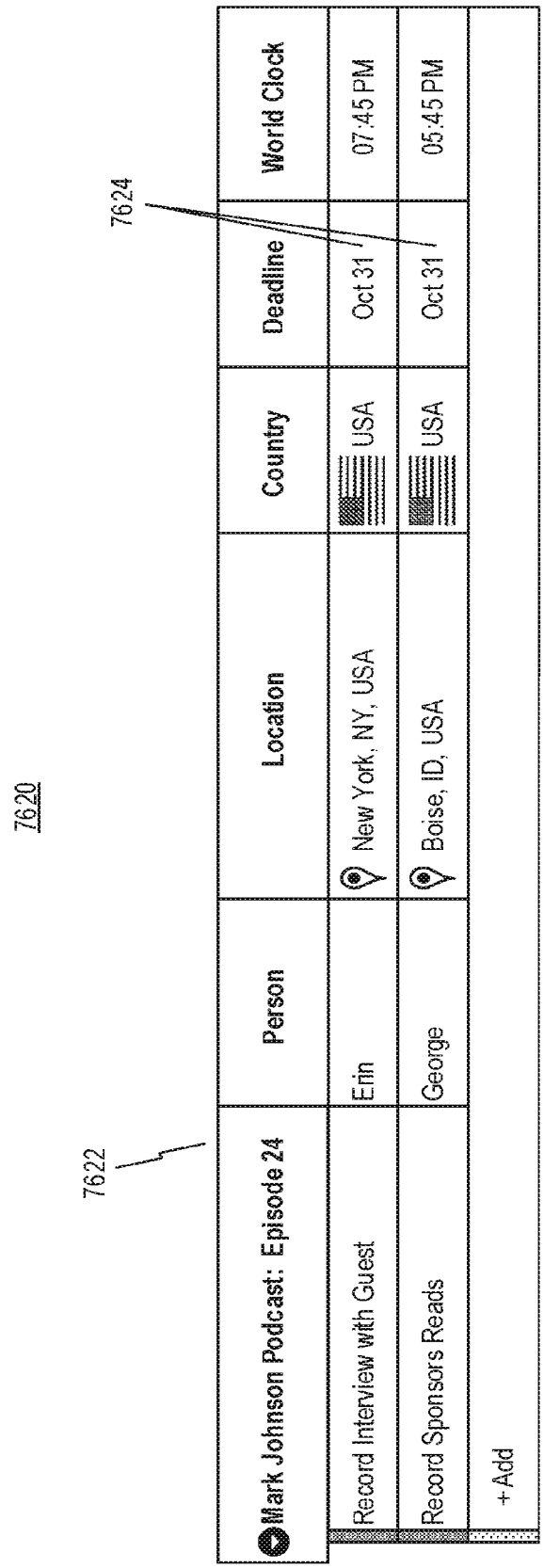
FIG. 76C illustrates a third view of an example user interface that may display a third subgroup of tasks, consistent with some embodiments of the present disclosure.

By way of example, FIG. 76A illustrates a first view of an example user interface 7600 that may display a first subgroup of tasks. Example user interface 7600 may include a table 7602 of a group of subtasks associated with production of a podcast assigned to multiple individuals located within the United States in different time zones. FIG. 76B illustrates a second view of an example user interface 7610 that may display a second subgroup of tasks that are located in the same time zone. Example user interface 7610 may include a table 7612 of a group of subtasks assigned to multiple individuals in the same geographic location. In this example, both individuals are located in the same location 7614 of New York, N.Y., USA. FIG. 76C illustrates a third view of an example user interface 7620 that may display a third subgroup of tasks sorted by a common deadline. Example user interface 7620 may include a table 7622 of a group of subtasks assigned to multiple individuals, but sorted by deadline 7624 so that the third subgroup of tasks includes tasks that are all due on October 31.

In some embodiments, the identities of the plurality of geographically disbursed individuals may be graphically depicted. A graphical depiction may include displaying identifiers associated with each of the multiple individuals on a map or any other representation of each individual's location. The image or location of the identifiers associated with each individual displayed on a map or any other representation may correspond with each individual's geographic location. The image may identify a geographic location with symbolic representations, such as a flag, monument, food items, colors, or other visual displays of objects, symbols, or visual representations typically associated with the geographic location.

Figure 77A:
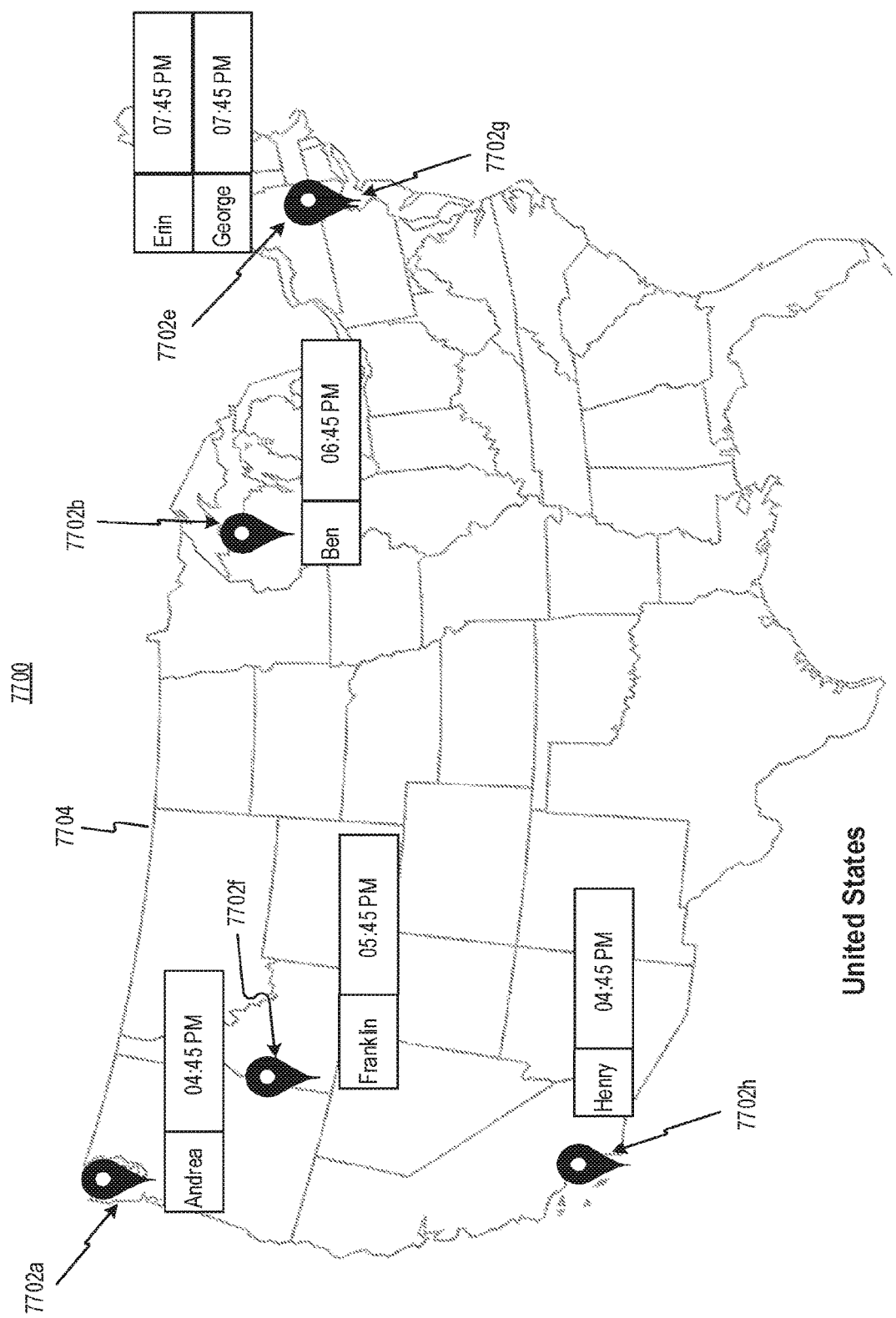
FIG. 77A illustrates a first view of an example user interface that may depict geographically disbursed individuals, consistent with some embodiments of the present disclosure.
Figure 77B:
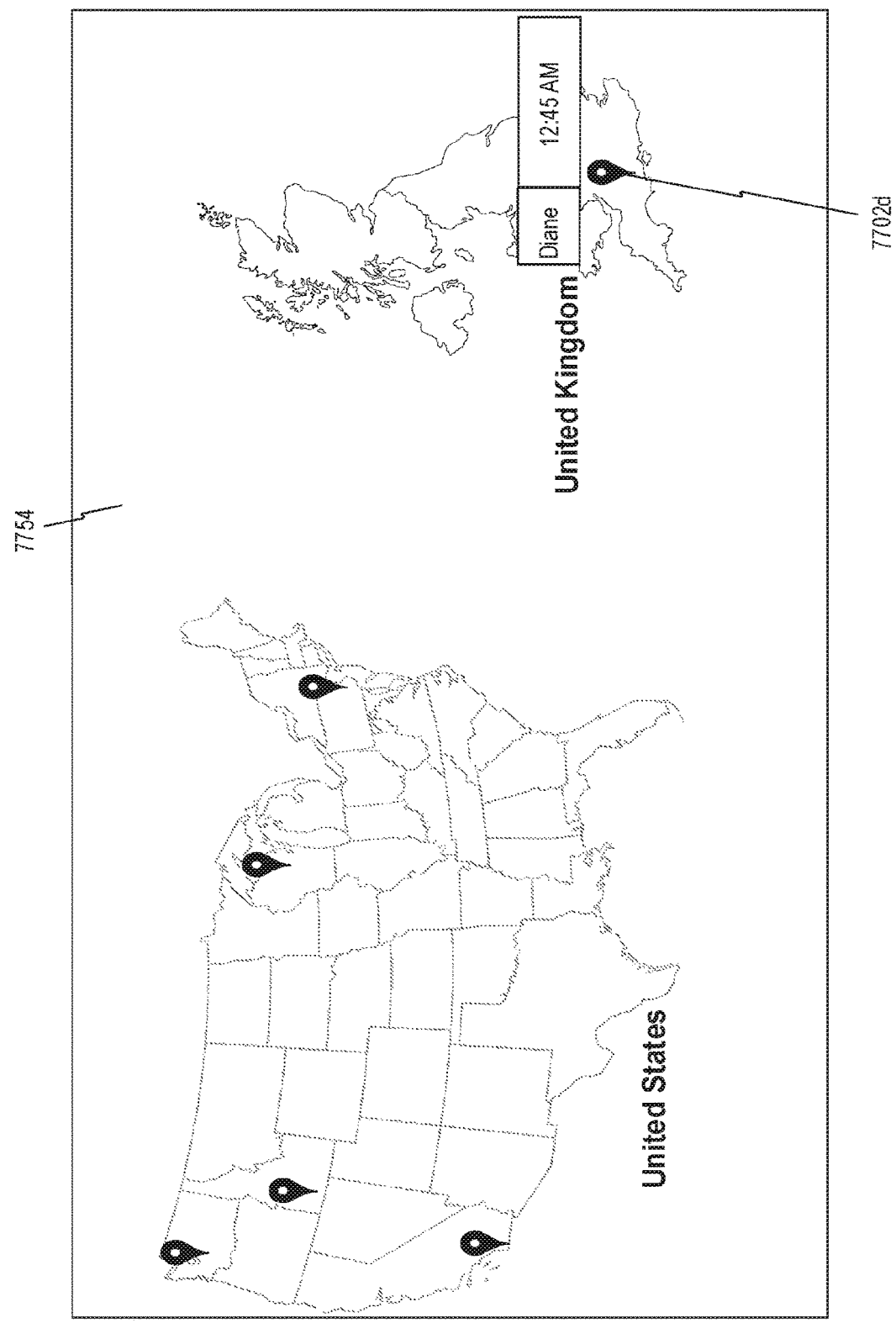
FIG. 77B illustrates a second view of an example user interface that may depict geographically disbursed individuals, consistent with some embodiments of the present disclosure.

In FIG. 75, flags are used in country column 7516 to graphically depict the locations of individuals. In FIG. 77A user interface 7700 graphically depicts geographically disbursed individuals across different time zones in a single country using location pointers on a map. Identifiers associated with individual 7702*a-g* may be located on a map 7704 at locations corresponding to each individual's known geographic location. As illustrated in FIG. 75, individual 7510*f* (Franklin) may be located in Boise, Id. 7512*f*. In FIG. 77A, the identifier 7702*f* associated with individual 7510*f* (Franklin) may be located on the map 7704 in a position associated with Boise, Id. In another example, FIG. 77B illustrates a second view of an example user interface 7750 that may graphically depict geographically disbursed individuals across multiple time zones and across multiple countries. As illustrated in FIG. 75, individual 7510*d* (Diana) may be in a location 7512*d* in London, England. In FIG. 77B, the identifier associated with individual 7702*d* (Diana) may be located on the map 7754 in a position associated with London, England.

In some embodiments, the at least one processor may be configured to, for each task of the plurality of tasks in each of the plurality of tables, retrieve from the data structure and display an indication identifying an assigned individual. An identity of an individual may be represented by indicators as described herein. For example, when a task is assigned to an individual, the assignment may be maintained and stored in a repository. An identifier representing the individual may also be associated with the task and maintained and stored in the repository. The at least one processor may retrieve the identifier of the individual and display that identifier in a table in order to provide a visual representation of the assignment of the task to the individual. Additionally or alternatively, the visual representation may include an indication that a task is assigned to an individual without displaying an individual's identifier. For example, an indicator associated with a task may indicate the task as "assigned" and omit, withhold, or maintain confidential the identity of the individual to whom the task is assigned. A task may be displayed in a horizontal row in a table. The indicator identifying an individual assigned to each task may be displayed in the same horizontal row as the particular task. As discussed previously, retrieving and displaying an indication of the assigned individual may occur at differing times for differing tables. Moreover, the individuals displayed in the differing tables may be the same, completely different, or a mix of overlapping and non-overlapping individuals.

As in FIG. 75, the indication identifying the assigned individuals 7510 may be the name of the individuals. The user interface 7500 may indicate that individual 7510*a* (Andrea) has been assigned to accomplish the "News Update" task 7504*a* by displaying her name in the same horizontal row as the indicator of the task 7504*a*.

In some embodiments the at least one processor may be configured to, for each individual assigned to each task in each table, retrieve from the data structure and display an indication identifying an assigned current geographical location associated with the assigned individual. An indication identifying a current geographical location may include any indicators such as alphanumerics, graphics, a combination thereof, or any other visual indication as described herein. The indication for the current geographical location may be displayed in an adjacent cell next to a cell containing an indicator for the individual, or may be displayed anywhere in the same row. The indication for the current geographical location may also be displayed in the same cell as the indicator for the individual. For example, a task may be displayed in a horizontal row in a table. An indication of the geographic location of the individual assigned to the particular task may be displayed in the same horizontal row. The geographic location may be indicated by an address, a miniature graphic of the geographic location in a portion of a representation such as a map, or may be indicated by a symbolic representation such as a flag. An indication of the geographic location may also be time-based, presenting a local time associated with the geographic location. The local time associated with the geographic location may also include a graphical indication of the local time, such as graphics or shading indicating daytime or nighttime for the local time. In some embodiments, the indication of the current geographical location and time zone may be displayed in other user interfaces such as a pop-up, a prompt, a module, an adjacent display, a user identifier interface (e.g., a user profile), a discussion interface (e.g., a conversation thread user profile), or any other manner of presenting an indication of the current geographical location.

Figure 79:
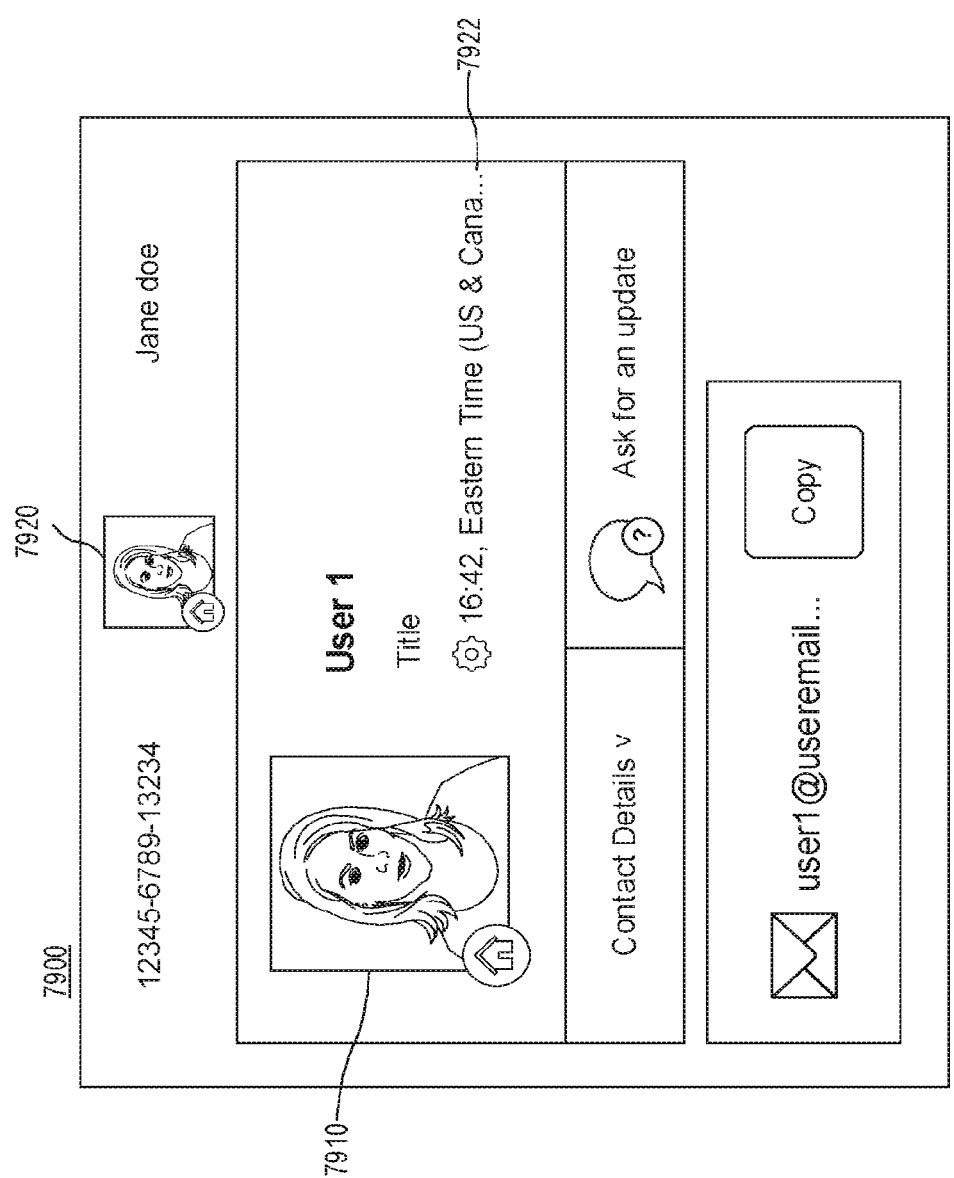
FIG. 79 illustrates another example of a user interface that may display a geographic location, consistent with some embodiments of the present disclosure.

For example, in FIG. 75, table 7502 may include an indication of a geographic location by displaying a location 7512 with alphanumeric text specifying the city and/or country associated with an individual 7510. The indication of a geographic location may also include representing a country 7516 with a depiction of a graphical flag associated with the country in which an individual 7510 may be located. In this example, a geographic location 7512*h* associated with individual 7510*h* (Henry) may be displayed with alphanumeric text of the location, "San Diego, Calif., USA" and with a graphical flag of the United States 7516*h*. The geographical indicator may be a combination of alphanumeric text "US" and a graphical element (flag) as shown in country cell 7516*h*. A geographic location associated with individual 7510*d* (Diana) may be displayed with alphanumeric text of the location 7512*d* as London, England and with a graphical flag of Great Britain 7516*d*. The geographical indicator may be a combination of alphanumeric text "GB" and a graphical element (flag) as shown in country cell 7516*d*. An indication of the geographic location may also be time-based such as with world clock information 7518, presenting a local time associated with a time zone of the geographic location 7512. The local time associated with the geographic location may also include a graphical indication of the local time, such as graphics or shading indicating daytime or nighttime for the local time (not shown). Any of the geographical indicators described above may be displayed in a table, as shown in FIG. 75, or may be displayed in any other manner such as in a user identifier interface 7900, as shown in FIG. 79. The user identifier interface 7900 may include the geographic identifier 7922 for an exemplary user associated with user avatar 7910. User identifier interface 7900 may be displayed in any form, such as a pop-up or module over a display of pre-existing data, a display in a common view with a display of pre-existing data, as a user profile, a discussion interface associated with a conversation thread, or any other manner of presenting the information.

In some embodiments the at least one processor may be configured to receive, via a computing device of the particular individual an indication that the assigned current geographical location of the particular individual has changed to a new location. A computing device associated with an individual may include, for example, a cell phone, tablet, laptop, electronic wearable device, or any device capable of transmitting (or causing a transmission), directly or indirectly, over a network. The computing device might transmit its location determined via a GPS chipset within the computing device. Or, the location might be manually entered by a user or determined using cell towers or other mechanisms for identifying a location of a mobile device. Regardless of how determined, the system processor may receive an indication of location. In some instances, the current location may be compared with a prior known location to determine that a location change has occurred. The indication may include a difference in position address or in position data, which may be used to detect the difference in geographic location. As mentioned, the computing device may determine a geographic location using a relative location to a cell phone tower or to multiple cell phone towers, wi-fi, Bluetooth, GPS, or any other technology capable of providing a location of or by using the device. The computing device may determine and indicate a first geographic location. The first geographic location may be received by the system and may be stored by the computing device and/or the system in local memory or in a remote server. The computing device may continually or periodically determine the computing device's location and indicate a second geographic location when the computing device detects the second graphic location. The computing device and/or the system may compare the second geographic location to the first geographic location. When the second geographic location is different than the first geographic location, the system may receive an indication that the location of an individual associated with the computing device has changed to the second geographic location. In some embodiments, the computing device may be a communications device. A communications device may include any device that enables data or voice exchanges over a network, including the aforementioned examples of a mobile phone, a tablet, a laptop, a wearable device, or any other device capable of transmitting and receiving data.

For example, in FIG. 2, a user device 220 may detect a geographic location of an individual and associate an indication of the geographic location for storage in a repository 230. The user device 220 may further store the geographic location as a first geographic location in an internal memory associated with the user device 220. As the user device 220 continually or periodically determines the geographic location, the user device 220 may associate an indication of a second geographic location. The user device 220 and/or computing device 100 may compare the indication of the second geographic location to the stored indication of the first geographic location. When the indication of the second geographic location is different than the stored indication of the first geographic location, the computing device 100 may receive a new indication that the stored indication of location of an individual associated with user device 220 has changed. The computing device 100 may store the indication of the second geographic location in the repository 230. Additionally or alternatively, the computing device may simply transmit its location over a network to a system processor which makes a determination of location change based on past location data. Determining location does not necessarily involve a step of comparing. For example, regardless of a prior known location, the system may current location data and may simply write the current location to memory regardless of whether the current location is the same or different from a prior known location.

In further embodiments, the new location may be based on a manual selection by the particular individual. Manual selection of a geographic location may include receiving text input, receiving a selection of a geographic location on a map, or any other input from a user that provides a geographic location. For example, a user may select from options of geographic locations displayed in a drop-down menu based on historical geographic locations associated with the user or other users commonly associated with the same task to which the user is currently assigned. Additionally or alternatively, a user may enter the geographic location by selecting a location, on a graphical user interface illustrating a map, that may correspond to the current geographic location of the user.

By way of example, FIG. 78 illustrates a user interface 7800 that may depict manual selection of a geographic location. The user interface 7800, in response to a user action, may prompt the user to select a current geographic location 7802 associated with and individual from among options 7804 of geographic locations. The options 7804 may include geographic locations previously selected by the user or geographic locations previously provided by other users.

In various embodiments, the communication device may have GPS capabilities, wherein receiving the indication that the assigned current geographical location of the particular individual has changed to a new location includes receiving a GPS location from the communications device, the GPS location reflecting the new location, wherein updating the data structure to reflect the new location of the particular individual is configured to occur automatically based on the received GPS location, and wherein displaying the new location in the plurality of tables occurs automatically based on the received GPS location. GPS or Global Positioning System capabilities may include the ability to receive signals from global positioning satellites for determining a geographic position expressed as a GPS location. The communication device may determine a geographic position and send a signal to the system to display an indication of the current geographic location of the communication device that is associated with the particular individual. This current geographic location may be stored in a repository or in local memory. The system may then receive a signal from the communication device indicating a change in the geographic location and compare the new geographic location with the previous geographic location that was stored in the repository. When the new geographic location received is determined to be different from the previous geographic location, the system may automatically update the geographic location of the computing device and update the geographic location of the computing device stored in the repository automatically. The system may display the updated geographic location in a table. For example, a table may indicate that an individual is assigned to a task by displaying an identifier associated with the individual in the same horizontal or vertical row as the task. The table may further include a display of an indicator of the geographic location of the computing device associated with the individual assigned to the task in the same horizontal or vertical row.

For example, in FIG. 2, a user device 220 may detect a geographic location of an individual via GPS and associate an indication of a geographic location for storage in a repository 230. The user device 220 may further store the geographic location as a first geographic location in an internal memory associated with the user device 220. As the user device 220 continually or periodically receives GPS signals indicating a geographic location, the user device 220 may associate an indication of a second geographic location.

The user device 220 and/or computing device 100 may update the indication of geographic location in the repository 230 as disclosed herein.

In some embodiments, the at least one processor may be configured to receive from the particular individual a request to mask the new location, and in response to the request to mask, omit a display of the new location from the plurality of tables. A request to mask may include any indication of information to be withheld from view. The request may be activated by the user or may be set as a default in the system. Masking may include obscuring information associated with the new location, omitting display of such information, or completely removing any indication of such information in the system. When a request to mask is received, the system may omit the new location from display in tables associated with the tasks assigned to the individual. The system may display a previous geographic location associated with the individual instead of the new geographic location. Further, the system may also remove any display of any geographic location associated with the individual. The decision to mask may be made by the individual. For example, for individuals who are on vacation and prefer not to have their whereabouts known, a setting may enable selective masking. The mask may automatically expire after a period of time or after the individual's location has again changed. Masking may be complete or partial. For example, the city or country may be masked while keeping the time zone displayed. Alternatively, all information about a location may be replaced with an indicator like "Unavailable," as noted in pop-up menu 7804 in FIG. 78.

This optional feature is further illustrated in FIG. 75, where a geographic location associated with individual 7510*c* (Charlie) is displayed as "unavailable" in location cell 7512*c*. The indication includes a combination of the text, "unavailable" along with a location graphical icon of a different format. Further, the indication of geographic location may be completely removed, as shown in country cell 7516*c*.

Aspects of disclosed embodiments may further include configuring the at least one processor to update the data structure to reflect the new location of the particular individual. When an indication is received that the current geographical location of the particular individual assigned to a task has changed to a new location, the system may send an update to the repository to reflect a new, current location of the computing device associated with the particular individual. Updating may include saving, storing, writing, overwriting, deleting, moving, relocating, tracking, counting, calculating, locating, editing, viewing, displaying, aggregating, combining, replacing, or otherwise recording replacement or new information in the repository.

For example, in FIG. 2, the computing device 100 may receive an indication that the stored indication of location of an individual associated with user device 220 has changed. The computing device 100 may store the indication of the second geographic location in the repository 230 as the current geographic location of the user device 220 associated with a user assigned to a task.

In some embodiments, updating the data structure may be based on a last usage location associated with the particular individual. The system may store last usage data based on a computing device associated with a particular individual and store the last usage data in a repository. The last usage data may be stored in addition to, or separately from, the current geographic location information for the particular individual. Last usage data may include previous geographic locations and dates and times associated with the previous geographic locations, such as the time and date and a duration of time that the particular individual was last at the previous geographic location. The system may update the stored last usage data in the repository to reflect the current geographic location based on the most recent usage location data. For example, if a last usage location associated with a particular user is Washington, D.C., when the system does not receive a new geographic location or does not receive an indication of a current geographic location, the system may update the data structure to indicate that the current geographic location of the particular user is Washington, D.C. since it remains the last usage location that is stored in the repository.

In FIG. 75, for example, the indication of geographic location 7512*d* for individual 7510*d* (Diane) may refer to a last usage location associated with individual 7510*d* (Diane). While individual 7510*d* (Diane) may currently be traveling from London, UK to New York, N.Y., USA by plane, the system may display the geographic location 7512*d* associated with individual 7510*d* (Diane) as London, UK because of a lack of communication between a computing device associated with individual 7510*d* (Diane) and the repository.

In various embodiments, the last usage location may be determined based on an IP address associated with the particular individual. An IP address may include a unique string of numbers separated by periods that may identify a computing device using internet protocols to communicate over a network. The IP address may be assigned by a network and may be dependent on the network's address. As such, an IP address may be used to determine a geographic location of the device. The system may store last usage data indicating a previous IP address and the associated geographic location in a repository.

In further embodiments the last usage location may be based on GPS data of the computing device associated with the particular individual. GPS data may include previous geographic locations associated with an individual, where those locations are determined using GPS satellites. The GPS data may additionally include a time associated with the previous geographic locations. The system may store in a repository, GPS data associated with an individual.

As a separate example, in FIG. 75, the geographic location 7512*d* for individual 7510*d* (Diane) may refer to Diane's last known usage location as determined using GPS. While Diane may currently be traveling from London, UK to New York, N.Y., USA by plane, the system may display her location as London, UK because of a lack of communication between GPS satellites and Diane's mobile phone.

In some embodiments the at least one processor may be configured to retrieve from the data structure and display in the plurality of tables the new location associated with the tasks of the particular individual. For example, depending on how a system is configured, when an indication is received that the current geographic location of the particular individual has changed to a new or updated location, the system may look up all of the tasks associated with the particular individual (e.g., in multiple tables where location is displayed) and update the location in each table. Or the system may record the new location and each time thereafter that a table calling for the new location is displayed, the new location may be displayed in the table. Regardless, as described herein, the geographic location may be displayed in the same horizontal or vertical row as the task and/or an indicator of the individual assigned to the task.

According to some embodiments, displaying in the plurality of tables the new location associated with the tasks of the particular individual may include displaying a variable time-based graphic associated with the new location. A variable time-based graphic may include a graphic indicating a clock, a time of day, a time zone, a timeline, a calendar, a deadline, or any other dynamic graphic for indicating information based on a relationship between a current time and time-based characteristic. For example, the system may display a running clock with the current time, an AM/PM indicator, a sun/moon graphic, or any other indicator that changes as a function of time.

For example in FIG. 75, individual 7510d (Diane) may have a time-based indicator reflecting her location in London, UK with a local time according to world clock 7518d. World Clock 7518d may automatically update when Diane travels to New York, USA to reflect an East Coast local time. In exemplary timeline graphics disclosed in other embodiments (not shown), a timeline may reduce the progression of time in a time frame as a result of Diane traveling from London, UK to New York, USA as a result of traveling to a time zone that is behind her previous location.

Additionally or alternatively, as briefly described above, the variable time-based graphic graphically may change over time to represent daytime and nighttime in the new location. Displaying a time associated with a geographic location of an individual may include a visual indication of time of day (such as AM or PM) associated with the displayed time. A visual indication of time of day may include using color, images, font, graphics, or any other changes in appearance to the cell to associate a time with a time of day, or a combination thereof. For example, a graphic of a sun may be included to indicate that a time displayed is during daylight hours (AM) or a graphic of a moon and/or stars may be included to indicate that a time displayed is during nighttime or dark hours (PM).

By way of example, in FIG. 75 user interface 7500 may include a world clock column 7518 to display the current time based on a geographic location 7512 of an individual 7510. The current time 7518 may include an indication 7520 of the time of day at the corresponding geographic location 7512. In this example, an indication 7520 may be a sun to correspond with daytime in San Diego, Calif., USA 7512h or a moon to correspond with nighttime, as exemplified by indication 7522 for location 7512g in New York, N.Y. USA.

In some embodiments the at least one processor may be further configured to receive from the particular individual, an indication that the particular individual may be unavailable, and to display an unavailability indicator in each of the plurality of tables. Unavailable, as used herein, may indicate that information associated with a particular individual is withheld by the individual, or by someone else, or is otherwise not presented by the system. An indication that an individual is unavailable may include a lack of data regarding the individual's geographic location, status, or other information from the individual. In other embodiments, the individual may enable a setting to refuse to transmit data regarding the individual's geographic location, status, or other information associated with the individual. For example, an individual may not wish to provide their current location to the system at all times of a day and may, through settings on a computing device or settings within the system, refuse to provide a current geographic location at particular times, such as when the individual is on vacation or when the current time is outside of regular working hours.

For example, in FIG. 75, user interface 7500 may include location information 7512 for multiple individuals 7510. Individual 7510c (Charlie) may be on vacation and may not wish to share his location with the other individuals 7510 in the table 7502. Individual 7510c (Charlie) may indicate that he is unavailable, which may cause the user interface 7500 to omit a location associated with individual 7510c (Charlie) from the table 7502. The table may indicate that a location associated with individual 7510c (Charlie) is "unavailable" or may display nothing in the table 7502 corresponding to Charlie's location (not shown).

Figure 80:
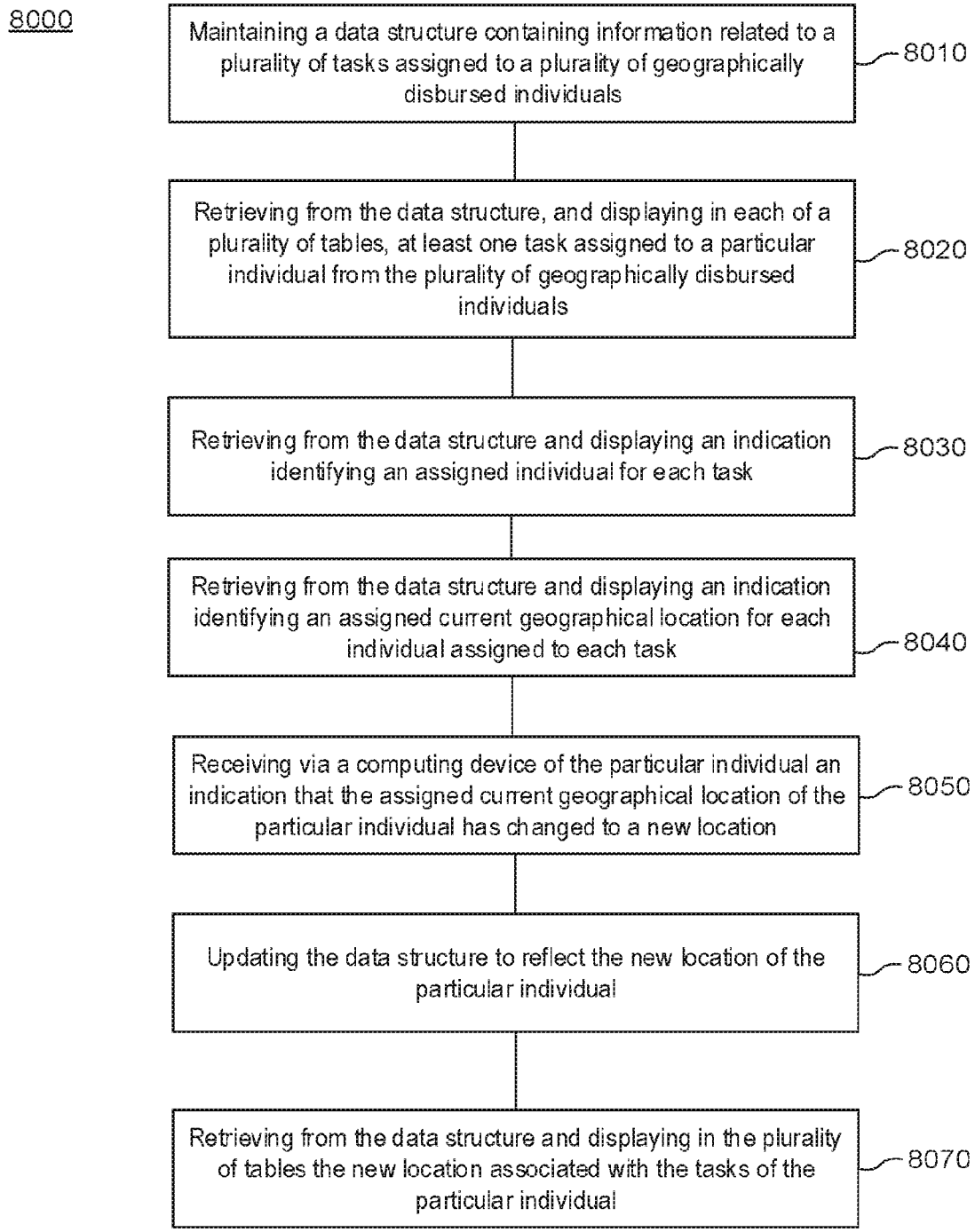
FIG. 80 is a block diagram of an exemplary process for enabling automatic time zone updates in tablature, consistent with some embodiments of the present disclosure.

One embodiment may include a method 8000, as shown in FIG. 80, with block 8010 reflecting maintenance of a data structure containing information related to a plurality of tasks assigned to a plurality of geographically disbursed individuals, as previously discussed. The data structure may include indications of tasks, identities of the plurality of geographically disbursed individuals, and geographical locations associated with the plurality of geographically disbursed individuals, consistent with the disclosed described above. At block 8020, the method 8000 may include retrieving from the data structure, and displaying in each of a plurality of tables, at least one task assigned to a particular individual from the plurality of geographically disbursed individuals, together with a display of a subgroup of the plurality of tasks assigned to others of the plurality of geographically disbursed individuals, as previously discussed. At block 8030, the method 8000 may include retrieving from the data structure and displaying an indication identifying an assigned individual for each task of the plurality of tasks in each of the plurality of tables, as discussed above. At block 8040, the method 8000 may include retrieving from the data structure and displaying an indication identifying an assigned current geographical location for each individual assigned to each task in each table, as discussed above.

At block 8050, the method 8000 may include receiving, via a computing device of the particular individual, an indication that the assigned current geographical location of the particular individual has changed to a new location consistent with the disclosure described above. At block 8060, the method 8000 may include updating the data structure to reflect the new location of the particular individual. At block 8070, the method 8000 may include retrieving from the data structure and displaying in the plurality of tables the new location associated with the tasks of the particular individual, consistent with the disclosure described herein.

Aspects of this disclosure may provide a technical solution to the challenging technical problem of project management and may relate to a dynamic system for converting data from tablature into moving objects. Converting may involve changing a form of information. For example, data represented in numbers, may be converted into moving graphical depictions, with the numbers correlating to the graphical depiction (e.g., magnitude of numbers may correlate to size of graphical depiction, color of graphical depiction or some other visible characteristic). If the data is represented in words, the words may be converted into a moving graphical depiction where the words correlate to the graphical depiction (e.g., different categories defined by the words may correlate to color, size, or movement speed or other visible characteristic.) The data type might also correlate in some examples to the selection of a graphical depiction. For example, if the data represents a number of people, the graphical depiction may be of people (or even different types of people represented by differing graphics), and if the data represents a number or type of delivery vehicle for example, the data may be reflected in either the size of the graphical depiction, the color of the graphical depiction, the type of the graphical depiction (e.g., box truck, van, tractor trailer), or in any other visible characteristic of the graphical depiction. In addition, the relative speed with which the graphical depictions move may be indicative of underlying data. For example, items designated with higher urgency may move faster than items with lower urgency. In some embodiments, some graphical depictions might be stagnant while others move. For example, completed items might be stagnant while graphical depictions representing work in progress might move.

The converted data may be represented by illustrating, portraying, showing, or otherwise depicting information. Moving objects may be dynamic in that they move relative to each other. They may also be dynamic in that they change in characteristic (e.g., grow, change color, change speed, or change any other physical appearance. Such changes may occur in real time, near real time, or periodically as the underlying data changes. Tablature as used herein refers to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays. Altering tablature displays, as used herein, may refer to any procedure or process of changing a visual presentation form of a display of a table in a collaborative work system. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

By way of one example, a collaborative work system may utilize workflow management software that enables members of a team to cooperate via a common online platform (e.g., a website). Aspects of this disclosure may display a table with items on a screen of a computing device. A table may be presented, for example, via a display screen associated with a computing device such as a PC, laptop, tablet, projector, cell phone, or personal wearable device. A table may also be presented virtually through AR or VR glasses. Other mechanisms of presenting may also be used to enable a user to visually comprehend presented information.

A system consistent with disclosed embodiments may include at least one processor and may involve computer readable media. At least one processor may include any circuitry for performing logical operations on input data as described herein.

Non-transitory computer-readable media may also be used in connection with disclosed embodiments. Non-transitory computer readable media, as described herein, may be implemented as any combination of hardware, firmware, software, or any medium capable of storing data that is readable by any computing device with a processor for performing methods or operations represented by the stored data. In a broadest sense, the examples described herein are not limited to particular physical or electronic instrumentalities, but rather may be accomplished using many differing instrumentalities.

Consistent with disclosed embodiments, at least one processor may be configured to maintain a table, the table having vertical rows and horizontal rows, and a cell at an intersection of each vertical row and horizontal row, wherein each cell contains a value. Such tables may be presented in two dimensions, three dimensions, or more. In some embodiments, maintaining a table may include storing a form of table, with vertical and/or horizontal row headers defining information to be contained in cells of such rows. Maintaining a table may also include storing values associated with the cells of such rows. In some embodiments, maintaining a table may include one or more of saving, storing, recording, updating, tracking, counting, editing, viewing, displaying, aggregating, combining, or otherwise retaining in a repository information for representation in a table. A "table" as used herein includes those items described herein in connection with the term "tablature," and may include horizontal and vertical rows for presenting, displaying, or enabling access to information stored therein. A table may be presented on a screen associated with a computing device or any electronic device that displays or projects information on a surface or virtually. An intersection of multiple rows (e.g., a horizontal row and a vertical row) may represent a cell. A cell may contain a value, a color, a word, a graphic, a symbol, a GIF, a meme, any combination thereof, or any other data.

In some embodiments, the at least one processor may be configured to receive a selection of a row of cells for alternative display. Alternative display may include representing data contained in a cell or row of cells in a manner different from how the information is displayed in the row or cell. As with the table, the alternative display may occur via any electronic device that causes information to be presented on a screen, a surface, or virtually. The alternative display may occur on the same screen, surface or space as the table, either at the same time or a different time. The alternative display may occur graphically, visually, symbolically, or any other manner representing the data from a row in a different location or form. The alternative display of the data in a cell or row of cells may additionally include dynamic or static representations of information. For example, a row of dates may be alternatively displayed visually on a calendar or a time-line. In another example, a row indicating the status of tasks may be graphically represented as a pie-chart.

Receiving a selection may occur in a processor or computing device in response to a user input, such as a selection of a horizontal row, a vertical row, a row heading, a cell or any other interactive component as described herein. Additionally or alternatively, the user may select one or more boards and the at least one processor may automatically receive a selection of information for alternative display. A processor may automatically identify a selection of a row by determining a row that represents a specified cell type, such as a status or by associating a cell type with a desired manner of alternative display. Even in embodiments where information for conversion to graphical objects may occur automatically, in the event the system cannot automatically identify a selection for alternative display, the system may prompt the user for further input. For example, a user may select a board that includes rows of addresses, rental values, availability dates, statuses, and supervisors and indicate a map as a desired alternative display. The system may then automatically identify the row of addresses for alternative display on a map. In an alternate example using the board described above, the user may indicate an alternative display containing moving objects that represent data. The system may then automatically identify the row containing statuses for the alternative display as an aspect of each of the moving objects.

By way of example, in FIG. 81, the user interface 8100 may provide available rows for alternate display, such as vertical Status row (column) 8104 or vertical Priority row (column) 8108. In FIG. 82, a graphical user interface 8200 may enable identification of a row from user interface 8100 in FIG. 81 for alternative display. In this example, possible row selections for Priority 8204 and Status 8206 correspond to Priority row 8108 and Status row 8104 of FIG. 81. In FIG. 82, the user interface 8200 may display available rows from table 8102 in FIG. 81 and display a prompt 8202 to a user to select a row for alternate display.

Various embodiments may further include, in response to the selection, displaying data from the selected row of cells in a dynamic manner. Displaying data may include presenting data stored in a table to a user graphically, visually, symbolically, or a combination thereof via, for example, a display screen associated with a computing device as described herein. A dynamic manner of display may include any animated display (a presentation with some form of movement or dynamic presentation) that represents the data from a selected row in some way. As discussed earlier, such a dynamic display may include objects that move at a constant speed, at a variable speed, in a predetermined manner and/or in a random manner. The data may additionally or alternatively be dynamic through a change in size, color, visual texture, or any other visible characteristic. The dynamic animation of the data may be continuous or periodic, in that data may remain static and then move, or vice versa. The dynamic manner may include dynamically displaying data randomly or according to a pattern. For example, an alternative display may present moving objects, that correspond to data in a table, that move randomly relative to each other. As the moving objects continue to be displayed dynamically, the system may adjust the display of the moving objects to reflect changes made to the corresponding data in the table periodically or in real time.

Figure 83A:
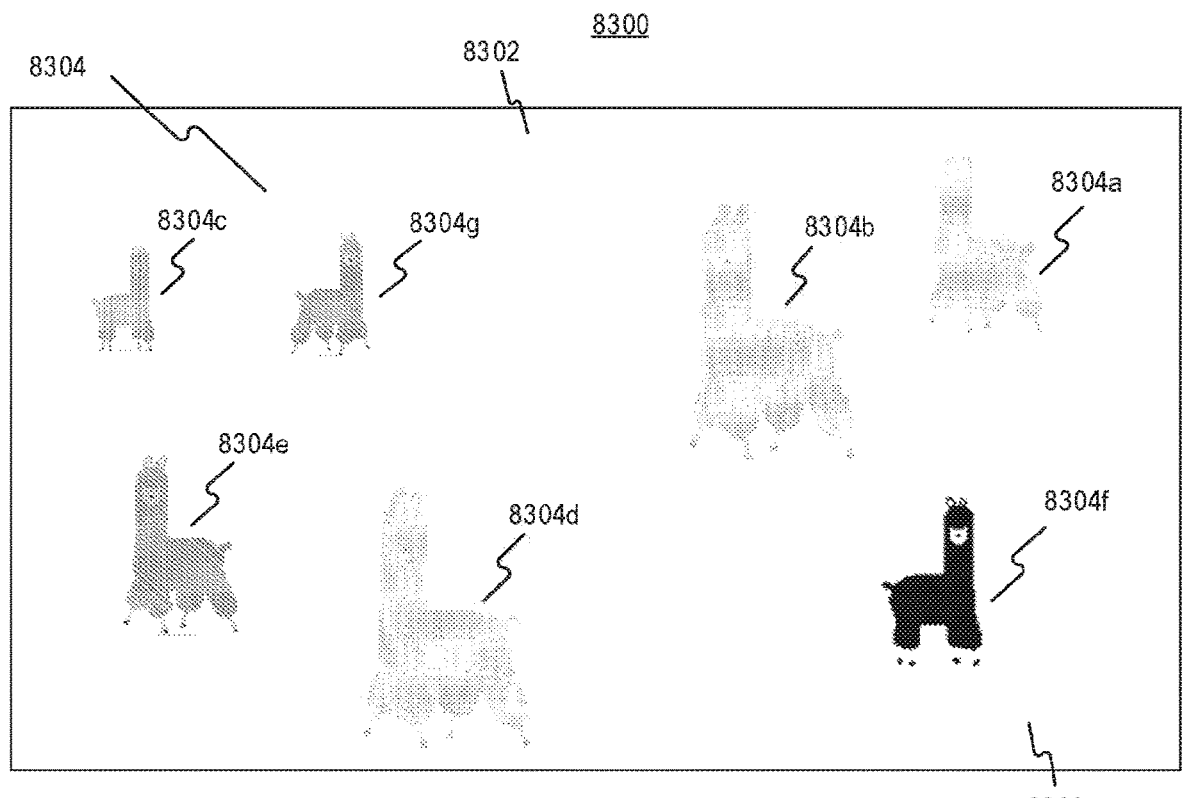
FIG. 83A illustrates a first view of an example user interface that may display one or more selected rows of cells in a dynamic manner, consistent with some embodiments of the present disclosure.

By way of example, in FIG. 83A, graphical user interface 8300 may include a display area 8302 in which depictions of llamas 8304 may be displayed dynamically. Over time, the position of each llama 8304 may change such as through one or more of horizontal, vertical, or diagonal movement or any other positional change, such that the position of one or more individual llamas may move to a different position in FIG. 83B than their original positions in FIG. 83A. Llamas are illustrated by way of example only. Any graphical depiction of an object may be used, as discussed earlier. Graphical depictions of objects may be stored in a repository, and a user may be enabled to select a depiction most suitable to a user's interest. Alternatively, users might be permitted to upload their own graphical depiction of objects, and the system processor may be configured to generate varying versions (differing in or more of size, color, visual texture, or any other visible characteristic). In another embodiment, the graphical depiction of objects may be automatically selected based on a software package version or preselected template. For example, when employed in a real estate context, the objects may be buildings, and when employed in a transportation context the objects may be vehicles. The objects might also change within any particular platform depending on context. A manufacturer with five products might employ five different graphical objects to represent each separate product. Multiple different classes of objects might appear on a common display, or each form of display might be reserved for a particular object. Thus, object movement may include a change in orientation, location, movement along a path, position relative to other objects (e.g., on a screen). Object movement may also include an animation of the object (e.g., an avatar or animal with moving legs "walking" or a vehicle with wheels spinning), a change in animation, a change in color, or any other change relative to the object or the object's environment.

In some embodiments, the value from each cell in the selected row is represented by a moving object. As referred to in this context, a row can be a vertical row (column) or a horizontal row. In many traditional tables, the vertical row defines a common characteristic shared by the horizontal rows in the table, and therefore, the common characteristic can be represented by moving objects for comparing how that characteristic varies across items. While every cell in a vertical row may be represented by a moving object, each cell in a row may also refer to each cell in a subset of an entire vertical row. A value from each cell may include a number, a color, a word, a graphic, a symbol, a GIF, a meme, any combination thereof, or any other representation of data contained in a cell.

Selected values may be dynamically displayed as moving objects in a user's dashboard view via a widget as described herein. A widget may be a non-table form of presenting data with static or dynamic graphical representations. Widgets may also include the presentation of tablature in addition to static or dynamic graphical representations. Software links may interconnect one or more values stored in tablature with one or more widgets, thereby enabling the widgets to reflect data presented in tablature. This may allow, for example, data from multiple boards to be displayed and/or managed from a common location. Widgets may provide interactive visualizations that enable a user to directly or indirectly update the associated data derived from one or more boards.

In some embodiments, the moving object may include a depiction of an animated animal. The depiction of an animated animal may include, by way of example, a llama, a penguin, a shark, a chicken, a monkey, a unicorn, or any other real or imagined creature. The depictions of animals may be retrieved from a repository with a predefined collection of animals, or may be retrieved in response to a look-up in other repositories, such as accessing an image or object via a network. The depictions of animals may be customized and stored in the repository for later use and may be accessed by other users. Additionally or alternatively, the data from each cell may be represented by the same animal or by various animals. The animals may be uniform or may be different in size, color, or motion.

For example, a row of cells may be represented as fish, differing in size and color according to aspects of the row of cells. In another example, a row of cells may be represented as an elephant, a lion, or a meerkat based on a numerical value of the individual cells within a row. A numerical value may represent a priority level, which may affect the depiction of animal used to represent data in a cell. For example, an important task may be represented as a lion while a minor task may be represented as a kitten.

By way of example, FIG. 2 is a block diagram of computing architecture 200 including a data repository 230. The data repository 230 may store depictions of animals or other objects for dynamic display. When data is identified for dynamic display on a computing device 100, computing device may access the depiction of an animal or other object stored in the repository 230. After the computing device 100 has accessed the depiction of the animal or other object from repository 230, the user interface 8300 may be displayed from the computing device 100 to represent as objects the data from one or more selected rows of cells (in the example of FIG. 83A, the objects depicted are llamas 8304.

In various embodiments the moving objects may be configured to move randomly relative to each other. "Random" movement may include random or pseudorandom variation of movement parameters such as the moving object's path, speed, pace, animation, location, or other display characteristic. The moving objects may be configured to vary the movement parameters of individual objects, subgroups of objects, or all objects. The movement parameters may vary such that some parameters remain constant while changes to other movement parameters are randomized. For example, all objects may follow the same movement path while the pace of each individual object may be randomized. The randomization of movement may randomize the movement parameters of the objects relative to each other such that a single object moves independent of any other object. Additionally or alternatively, the randomization of movement parameters may occur at random time intervals that are individualized to each object. This may prevent objects from hiding or obscuring other objects so that at least of portion of each object is visible at all times.

Figure 83B:
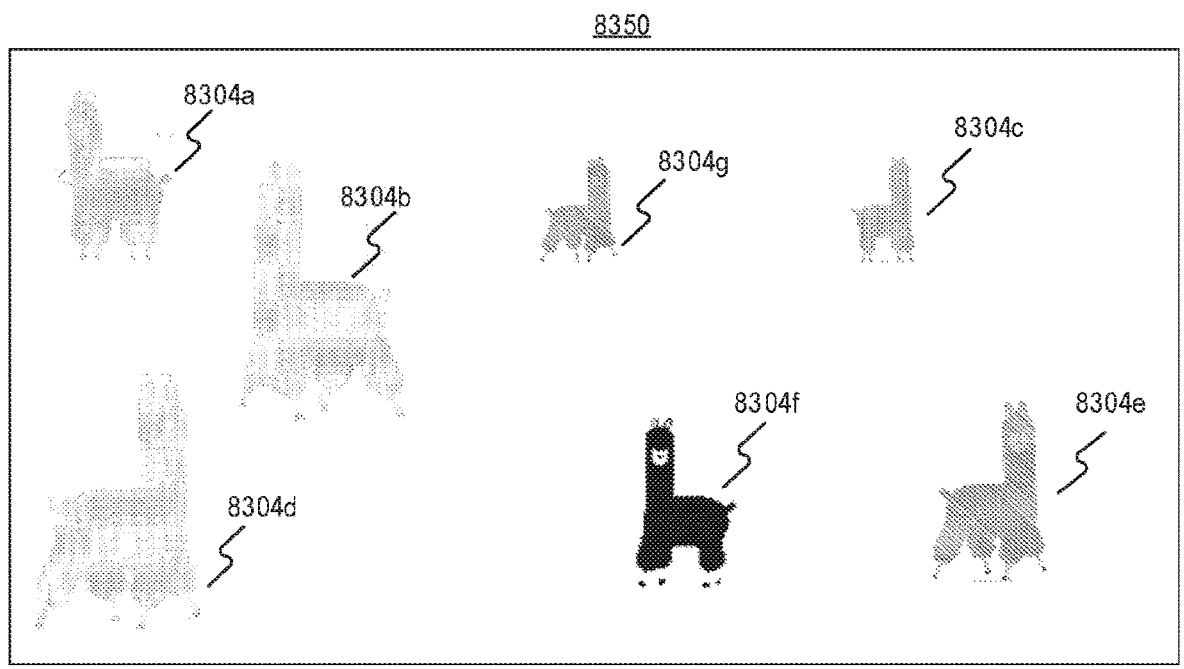
FIG. 83B illustrates a second view of an example user interface that may display one or more selected rows of cells in a dynamic manner, consistent with some embodiments of present disclosure.

By way of example, in FIG. 83A, the llamas 8304 may be randomly assigned a height within the display area 8302. In this example, the height at which the llamas 8304 are displayed may remain constant while the direction of movement (left/right) may be random. FIG. 83B illustrates a random change in the animation of a llama 8304a. In FIG. 83A, llama 8304a may be depicted with a walking animation. In FIG. 83B, llama 8304a may be depicted as performing an action such as hula hooping, while the other llamas continue to be depicted as walking. In some examples, the llamas 8304 may move at different rates. In another example, the llamas 8304 may follow the same path of motion, such as a circle (not shown) within the display area 8302.

In some embodiments, a size of a moving object may relate to data contained in an associated cell of each cell in the selected row. A size of a moving object may refer to the dimensions, measurements, proportions, or the space occupied by the object in a display. The system may determine a size of the moving object based on data in a table that may be associated with the cell being represented as an object. For example, a vertical row of cells may be identified for alternate display. Cells associated with the cell being represented may be adjacent to the cell being represented in the same row. The associated cell may be in the same horizontal row as the cell being represented, but in a different vertical row than was identified for alternate display.

Byway of example, in FIG. 81, a user interface 8100 may display a table containing tasks 8102 associated with preparing for a dinner party. A user may identify the Status row 8104 for alternate display, such as a llama farm (as shown in FIG. 83A). The depictions of llamas 8304 may correspond to each task 8102 and the size of each depiction of the llamas 8304 may be determined by a priority 8108 associated with the particular task. Specifically, a "high" priority 8108b may correspond to a larger size for the depiction of llama 8304b corresponding to task 8104b in FIG. 83A. In another embodiment, high priority may correlate to the location on the display of the object, with higher placed objects having a higher priority or a higher other status.

In further embodiments, associated cells of each cell in the selected row may contain a numerical value. For example, a vertical row of cells may be identified for alternate display. Cells associated with the cell being represented may be adjacent to the cell being represented as a moving object. Adjacent or associated cells might also impact the display of a moving object. For example a high priority item that is adjacent to or associated with a cell containing data suggesting that the item is running out of budget might be depicted high on the display (high priority) but might move slowly to represent that not much budget is left. The associated cell may be in the same horizontal row as the cell being represented, but in a different vertical row than was identified for alternate display. The associated cell may contain data representing a numeric value such as a number portraying a priority, a budget, a cost, an effort, or an amount of time. Additionally or alternatively, the size of the moving object associated with each cell may correlate to the numerical value associated with each cell. The size of the moving object may increase as the associated numeric value increases or decrease as the associated numeric value decreases. Conversely, the size of the moving object may decrease as the associated numeric value increases or decreases as the associated numeric value decreases (such as numeric value expressing priority, with 1 being the most important). For example, in FIG. 83A, the size of the llamas 8304 may correspond with a numeric value in the "Weight row 8106 in FIG. 81. Specifically, a weight of "3" may be associated with task 8102b ("Reserve Venue") in FIG. 81 and may correspond to a larger size for the llama 8302b representing task 8104b in FIG. 83A.

Disclosed embodiments may further include a color of a moving object that may relate to data contained in an associated cell of each cell in the selected row. A color of a moving object may indicate a status, a priority, an individual, a time zone, a state, or any other characteristic of the cell being represented. In some embodiments the color of the moving object may correlate to a field status. A field status may include an indication of a standing, rank, position, level, estimation, or condition associated with a task or with any other data in a cell. For example, a row of cells may include a field status that associates different colors for different statuses. The color of the moving object in an alternate display may be the same color as the status of the corresponding task. Alternatively, the color of the moving object may represent the same status with a different color, such as to comport with a theme of the dynamic moving object's environment.

In some embodiments during display, the moving objects may be configured to move relative to each other. Moving relative to each other may include synchronized motion sharing common movement parameters with all of the moving objects, such as the same movement path or rate. Moving relative to each other may further include basing the movement of one object on the movement of another object. For example, an object may follow the motion of another object or move on a path parallel to the path of another object. Relative motion may further include moving within a display field such that no object obscures or collides with another object or may include interactive animation between the objects. In another example, the movement parameters may correlate with a common status, such as a celebratory animation by all the moving objects when the status of all tasks represented as objects changes to "completed" or "done." The celebratory animation might include a change in motion of objects (e.g., the llamas dancing) and/or additional graphical depictions presented (e.g., balloons and confetti depicted on the display.

Consistent with disclosed embodiments, at least one processor may be further configured to enable definition of a display time criterion associated with each row of cells. A display time criterion may include a time-based variable for determining the specific data that may be displayed in the alternative display. The time-based variable may be associated with time-based data within tablature. The time display criterion may include a time period determined based on time-based metadata associated with the data stored in tablature or defined by a user via a graphical user interface. The metadata associated with the data stored in tablature may include time information that is recorded and stored for every action taken within tablature such as a time stamp with a date and time whenever a cell value is created, updated, or deleted. In this way, a user may select a display time criterion to filter specific data for alternative display based on the time stamps of data updates or time-based data within tablature.

In some embodiments, a dynamic display may exclude data failing to meet the display time criterion. Data may fail to meet a display time criterion if time-based metadata associated with the data is outside of a time period determined by the time display criterion. When the data is excluded, the corresponding moving object of the data may be excluded from the dynamic display. For example, in a dynamic display of moving llamas representing tasks and their associated statuses in a table, when a display time criterion is set to one month, the dynamic display may exclude any moving llama corresponding to a task where its status has not changed in the last month. If no tasks have had a status update in the last month, then the dynamic display would exclude every moving llama from display. The display time criterion may exclude data based on other criteria than a status change, such as a recent activity related to a particular task or an impending due date. The time-based exclusion may be based on any aspect of the data in tablature according to user preference.

By way of example, in FIG. 84, the user interface 8400 may enable a user to define a display time criterion. The display time criterion may be defined as a time period with a frequency 8402, a length of time 8404, and a beginning date 8406. In this example, beginning May 4, 2020, the dynamic display will omit from display any object representing data which has not changed or updated in the last 1 month.

Figure 85:
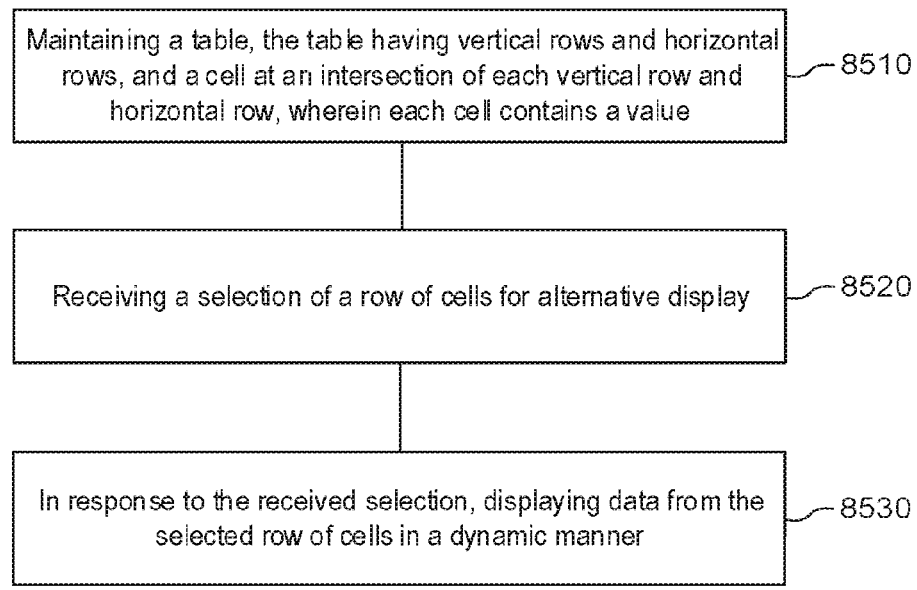
FIG. 85 is a block diagram of an exemplary process for converting data from tablature into moving objects, consistent with some embodiments of the present disclosure.

One embodiment may include a method 8500, as shown in FIG. 85, with block 8510 for maintaining a table, the table having vertical rows and horizontal rows, and a cell at an intersection of each vertical row and horizontal row, as previously discussed. Each cell may contain a value, consistent with disclosed embodiments described above. At block 8520, the method 8500 may include receiving a selection of a row of cells for alternative display, as described above. At block 8530, the method 8500 may include, in response to the received selection, displaying data from the selected row of cells in a dynamic manner, as discussed above. The value from each cell in the selected row may be represented by a moving object, wherein at least one of a size of the moving object and a color of the moving object may relate to data contained in an associated cell of each cell in the selected row, consistent with disclosed embodiments described above. During display, the moving objects may be configured to move relative to each other, as previously discussed above.

Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated and the interested reader is referred to the previously discussed figure(s) for a description of the like element(s).

Aspects of the present disclosure describes technological improvements in devices, systems, methods, and computer readable media for process management platforms that may allow a user to interact with process management information in real time.

Figure 86A:
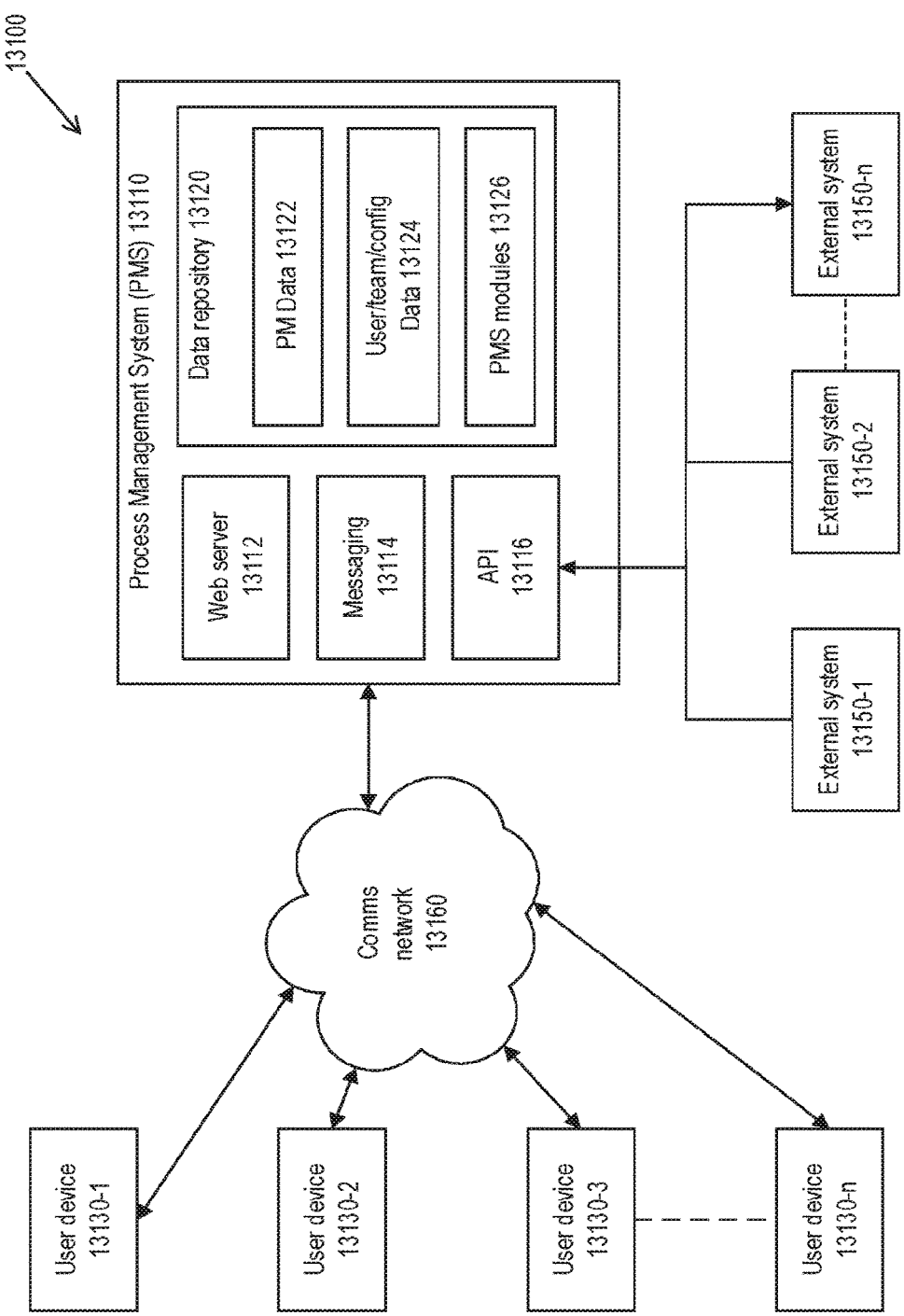
FIGS. 86A-86C are block diagrams illustrating a system for process management consistent with some embodiments of this disclosure.
Figure 86C:
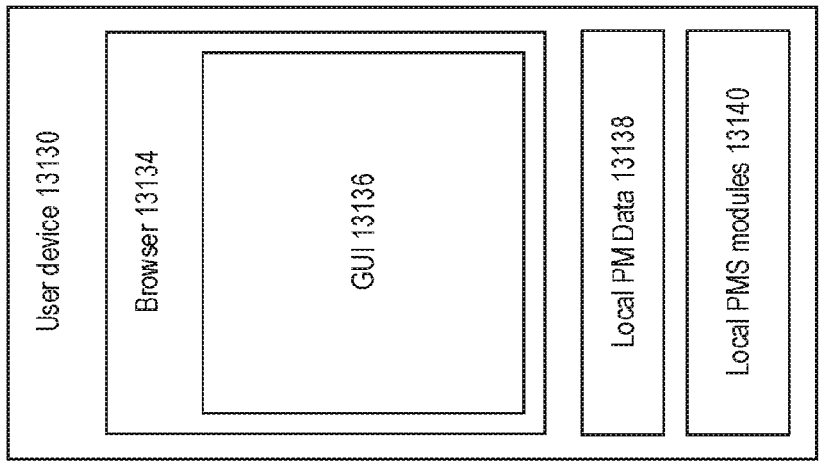
Figure 86B:
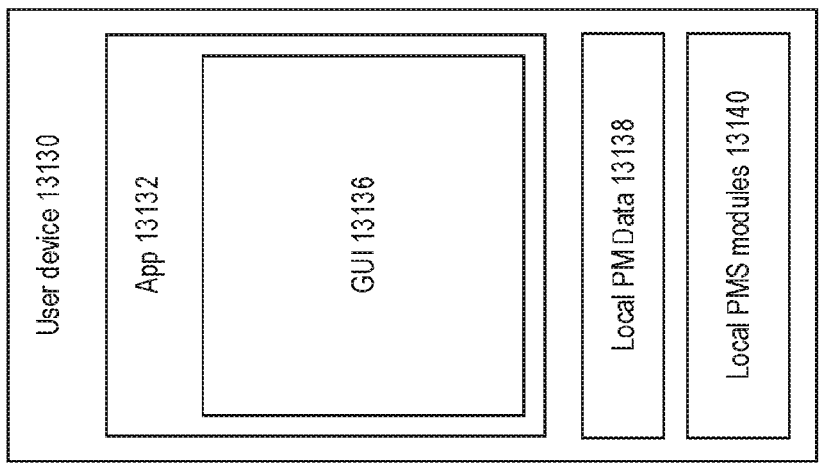

FIGS. 86A-86C are block diagrams illustrating a system 13100 for process management according to an example implementation. In system 13100, users interact with process management system 13110 using user devices 13130-1, 13130-2, 13130-3, to 13130-*n* through communications network 13160 using wired or wireless communication. Communications network 13160 may include a wide variety of network configurations and protocols that facilitate the intercommunication of computing devices. For example, each of the components of system 13100 in FIG. 86A can be implemented in a localized or distributed fashion in a network.

Process management system (PMS) 13110 is referred to herein as a "process" management system but It should be appreciated that PMS 13110 may be used for management of projects, schedules, effort, pricing, risk, inventory, and assets and the term process should not be considered limiting.

PMS 13110 and the modules and components that are included in PMS 13110 can run on a single computing device (e.g., a server) or multiple computing devices (e.g., multiple servers) that are configured to perform the functions and/or operations necessary to provide the functionality described herein. While PMS 13110 is presented herein with specific components and modules, it should be understood by one skilled in the art, that the architectural configuration of system 13100 as shown is simply one possible configuration and that other configurations with more or fewer components are possible.

User devices 13130 can be of varying type, capabilities, operating systems, etc. For example, user devices 13130 may include PCs, tablets, mobile phones, laptops, virtual reality or augmented reality glasses or other wearables, holographic interfaces, or any other mechanism that allows for user interaction with the platform. Furthermore, PMS 13110 can concurrently accept connections from and interact with multiple user devices 13130. A single user may interact with PMS 13110 using multiple different user devices 13130.

PMS 13110 may include a data repository 13120. Although data repository 13120 is shown as a single entity, in practice, data repository 13120 may include one or more databases. Data repository stores process management data 13122, user/team profile and configuration data 13124, and PMS software modules 13126. Other data required for the functioning of PMS 13110 may also be stored in data repository 13120. Users may interact with the process management data 13122 stored in data repository 13120 through user devices 13130. As used herein, the term "interaction" may include but is not limited to adding, retrieving, modifying, browsing, and/or sharing process management data 13122 as well as messaging related to process management data 13122.

In some implementations, users may be grouped into teams or organizations as indicated in the user profile data (a/k/a User/team/config/Data) 13124. User profile data 13124 may include but is not limited to username, contact information, team assignments, and so forth. User profile data 13124 may also include organization/team profile data. User profile data further may include per-user and/or per-team configuration data for operation of PMS modules 13126 on user devices 13130.

PMS 13110 may include a web server 13112 to support connections from a variety of different user devices 13130, such as: desktop computers; mobile computers; mobile communications devices, e.g., mobile phones, smartphones, tablets; and/or any other network enabled computing devices.

In some embodiments, such as shown in FIG. 86B, a user using user device 13130 can interact with PMS 13110 via a PMS application (app) 13132 installed on user device 13130. App 13132 may be a stand-alone application, one or more application plug-ins, and/or a browser extension.

In some implementations, such as shown in FIG. 86C, a user device 13130 can interact with PMS 13110 via a third-party application, such as a web browser 13134 running on user device 13130. For example, the user can navigate in web browser 13134 to a web address provided by PMS 13110 for interacting with PMS 13110. It should be appreciated that some devices 13130 may support both of an app 13132 and a web browser 13134. FIGS. 86B and 86C show separate implantations for simplicity.

In some embodiments, PMS 13110 may provide for user interaction by using a web application model. Although a web application model is described herein, it should be appreciated that other application architectures may be suitable. In response to an interaction by a user using an app 13132 or browser 13134, the app 13132 or browser 13134 may request data from web server 13112 and may be provided with one or more webpage structures (not shown), subsets of process management (PM) data 13122 (herein referred to as local PM data 13138), and relevant PMS modules 13126 (herein referred to as local PMS modules 13140). PMS software modules 13126 may include software modules that may define web application functionality of system 13100 and may be downloaded to user devices 13130 where they may be run as local PMS modules 13140 by app 13132 or browser 13134 to enable interaction with process management data 13122 and local process management data 13138.

Either of app 13132 or browser 13134 may provide a graphical user interface (GUI) 13136 for the user to interact with PMS 13110. References herein to a GUI 13136 and to views of GUI 13136 should be understood as referring to the GUI 13136, generated by app 13132 or browser 13134 based on the webpage structure of the visited webpage, relevant local PMS modules 13140, and local PM data 13138, as provided by web server 13112 and read from data repository 13120. Each PMS module 13126 may provide functionality for different interactive parts of GUI 13136. The battery widget as described below is a non-limiting example of a PMS module 13126, 13140 with specific functionality, GUI 13136, and configuration data 13124. Interaction with GUI 13136 may include viewing or selecting graphical elements using the interface hardware of user devices 13130 including but not limited to a touchscreen, 2D or 3D display, mouse, keyboard, and so forth.

In some implementations, updates of local PMS modules 13140 may happen each time the relevant web page of PMS 13110 is visited. In some implementations, changes made to PM data 13122 that affect local PM data 13138 may be pushed by PMS 13110 to app 13132 or browser 13134 of all users making use of the same local PM data 13138 following the changes. Thus GUI 13136 may reflect updated local PM data 13138 that is the same as the relevant PM data 13122. In some implementations, users may define configurations for specific local PMS modules 13140. Configuration data 13124 may be stored in data repository 13120. Configuration data 13124 may therefor e retrieved by local PMS modules 13140 for every session ensuring a consistent user experience.

PM data 13122 may be stored in linked data structures in data repository 13120. The PM data in these linked data structures may include but is not limited to items, columns, groups, boards, and workspaces. Local PM data 13138 may be stored in linked data structures.

Items as defined herein may be the basic user-defined PM data elements that may be tracked as part of a process in PMS 13110. Non-limiting examples of items include tasks, assets, inventory, clients, sales leads, employees, and so forth. In some implementations, items may include sub-items.

Columns as defined herein describe an aspect of an item and/or sub-item. Each column may be of a single data type such as numeric values only, characters only, alphanumeric values only, graphic elements only, a closed list of elements, particular formatting, values within a specified range only, and so forth. Non-limiting examples of column types may include: related user/s, related resource/s, related team/s, status, priority, timeline (start and/or end dates), date, cost, pricing, tags (a label, a numeric value, a title, a name, a combination thereof, and so on, that may be used to easily identify a descriptive quality of an item), text, number, rating, time zone, checkbox, URLs, item series number, location, vote box, week, progress bar, contact details, item ID, color indicator, last updated, time tracking, related data file, and so forth. A column of status type may include status labels that provide an indicator of the status of a related item. In some implementations, the status labels as stored in data repository 13120 may be defined by a user and are related to the item type. Non-limiting examples of items and related status labels may include:

For projects, status labels may include: "done", "stuck", "working on it", "waiting", and so forth;

For real estate, status labels may include: "sold", "waiting for contract", "stuck" and so forth;

For human resources, status labels may include: "employed", "rejected", "waiting for interview", and so forth.

Groups as defined herein may be user-defined groupings of one or more items. In non-limiting examples, items may be grouped together by a user where they share a common project, process, work period, owner, status, and so forth. In some implementations, groups are displayed in GUI 13136 as tables with items as rows and columns as columns. In some implementations, PMS 13110 maintains items and columns in a table data structure.

Boards may be user-defined collections of one or more groups. In non-limiting examples, groups may be grouped together in a board by a user where they share a common project, process, work period, owner, and so forth. Boards may include a structure with horizontal and vertical rows where the intersection of these rows may define cells that may be configured to contain information. Workspaces may be user-defined collections of boards.

In some implementations, process management data 13122 may further include messaging between users related to one or more of items, projects, boards, and/or workspaces. In some implementations, process management data 13122 may further include documents, audio files, video files, and so forth that may be associated with an item, group and/or board.

In some implementations, PMS 13110 may include a messaging module 13114 for sending messages to users over common messaging formats and/or for providing a messaging interface via a corresponding local PMS module 13140 on GUI 13136 for messaging related to items, groups, boards and/or workspaces.

In some implementations, PMS 13110 may include an application programming interface (API) 13116 for interfacing with various external services and systems 13150-1, 13150-2, to 13150-n.

In some implementations, PMS 13110 may include an authenticator module (not shown), which can verify user credentials, security tokens, API calls, specific user devices, and so forth, to ensure only authorized users and users can access PMS 13110.

In some implementations, PMS 13110 may include a sharing module (not shown) for managing sharing of process management data publicly or privately. For example, the sharing module may be a permission settings module that can grant or restrict permissions to specific cells, rows, boards, dashboards, widgets, or any other structure. The sharing can be performed in a platform agnostic manner. That is, the content can be shared across multiple user devices 13130 of varying type, capabilities, operating systems, etc.

Figure 87A:
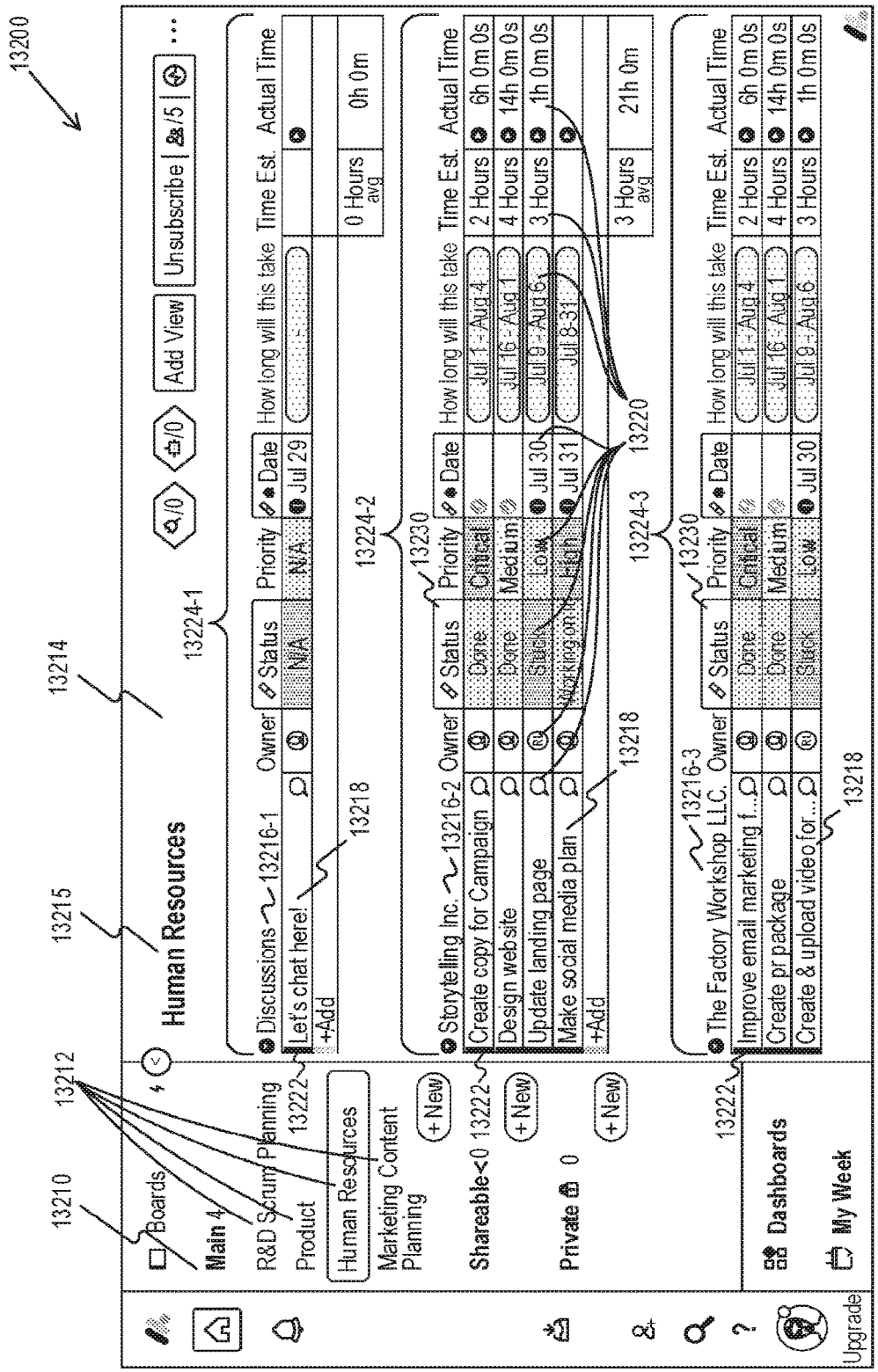
FIGS. 87A-87C illustrate examples of graphical user interface displays for presenting a process management board view consistent with some embodiments of this disclosure.
Figure 87B:
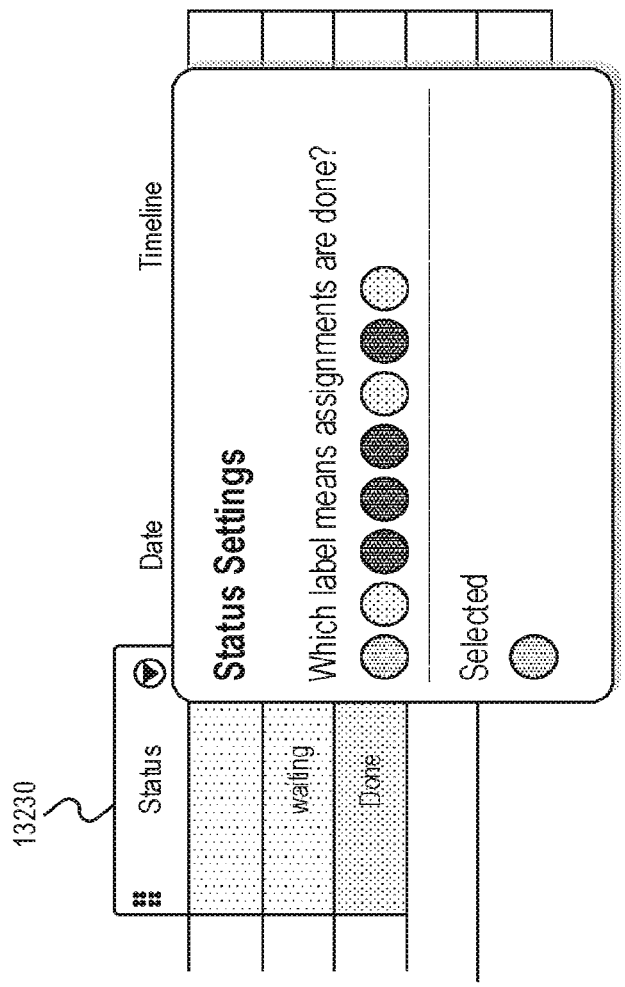
Figure 87C:
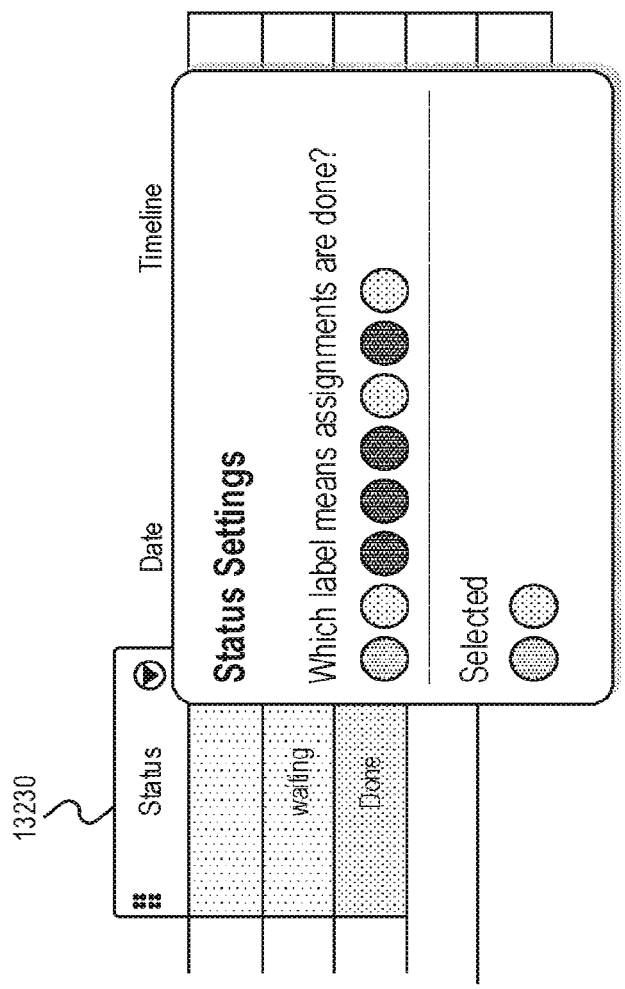

FIGS. 87A-87C illustrate an example graphical user interface 13200 for presenting a process management board view according to an example implementation. For example, app 13132 or browser 13134 can generate GUI 13200 for display on user device 13130 in response to the user selecting a board view 13214. GUI 13200 includes local process management data 13138 retrieved from data repository 13120 including items, columns, groups, boards, and workspaces.

In some implementations, board view 13214 may include multiple items 13218 shown as rows 13222 grouped into groups 13216-1, 13216-2 and 13216-3. Board view 13214 may further include each item 13218 further described by data in multiple columns 13220. As shown, columns 13220 include a status type column 13230. Status type columns include status labels associated with items 13218.

In some implementations, board view 13214 may present rows 13222 of items 13218 intersecting with columns 13220 to form tables 13224-1, 13224-2 and 13224-3. Each of groups 13216 is thus shown as a table 13224. Groups 13216-1, 13216-2 and 13216-3 are collectively part of board 13215. As shown, board 13215 is one of a collection of boards 13212 that form a workspace 13210. The number of items, columns, groups, boards, and workspaces shown in FIG. 87 is illustrative and should not be considered limiting.

In response to receiving a user selection of graphical elements of board view 13214, a user may interact with board view 13214 to add, retrieve, modify, browse, and/or share the process management data as well as messaging related to the process management data. Non-limiting examples of user interaction performed by selection of graphical elements include adding new process management data, modifying the names of items, columns, groups, boards, and workspaces, adding or modifying column values, moving items between groups, and so forth.

Board view 13214 may be one way to view and manage process management data and in some implementations, a user may utilize different views provided by GUI 13136 for adding, retrieving, modifying, browsing, and/or sharing process management data.

In some implementations, such as shown in FIGS. 87B and 87C, in response to a user selection of graphical elements of the status type column 13230, a user may define the status labels that define a status of "done" indicating that an activity related to the item 13218 is completed. A user may be able to define any custom status label through any custom text in this manner and may store the custom status label for application in the future in the board or in any other board.

Figure 88A:
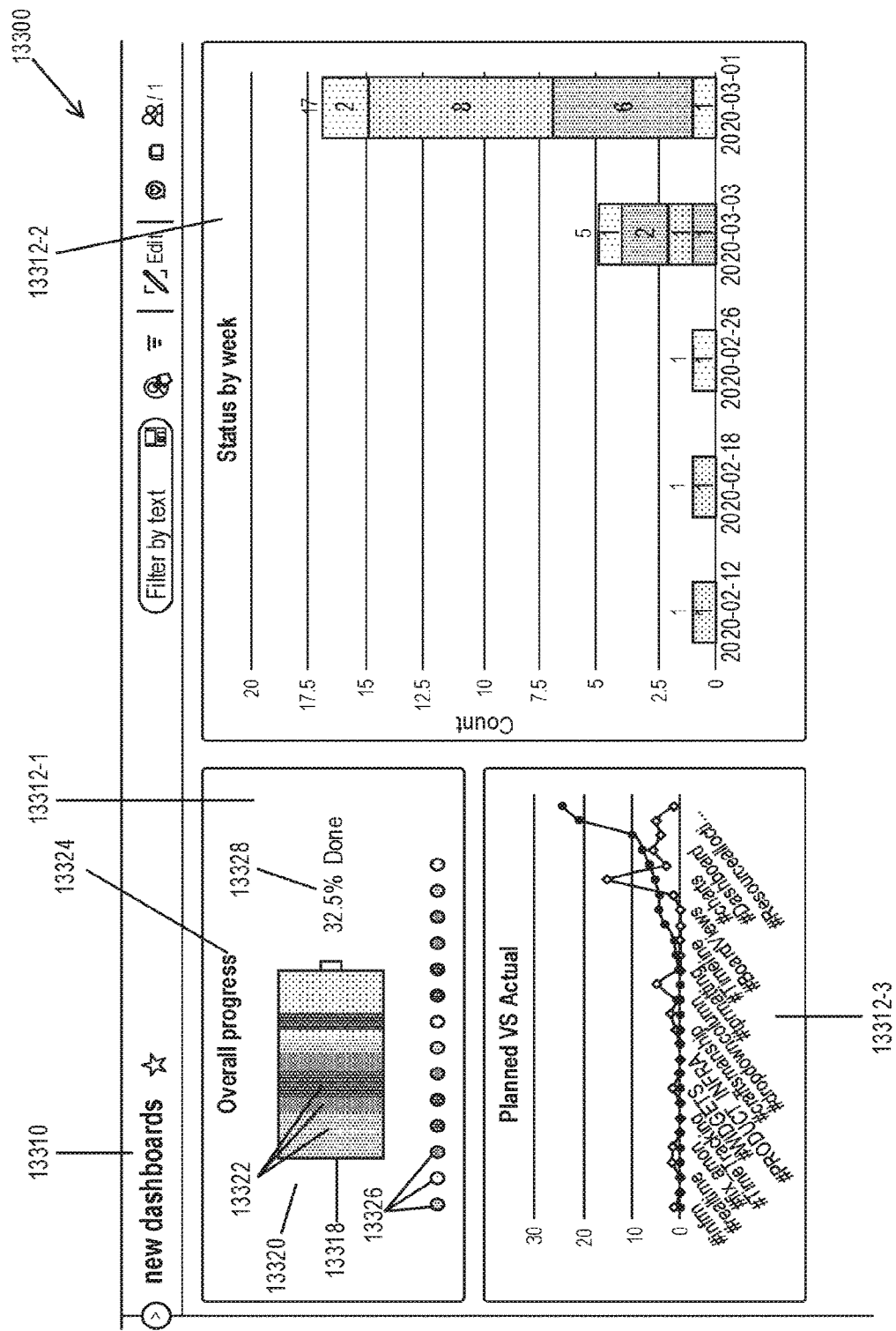
FIGS. 88A and 88B illustrate example graphical user interface displays for presenting a process management dashboard view and widget view consistent with some embodiments of this disclosure.
Figure 88B:
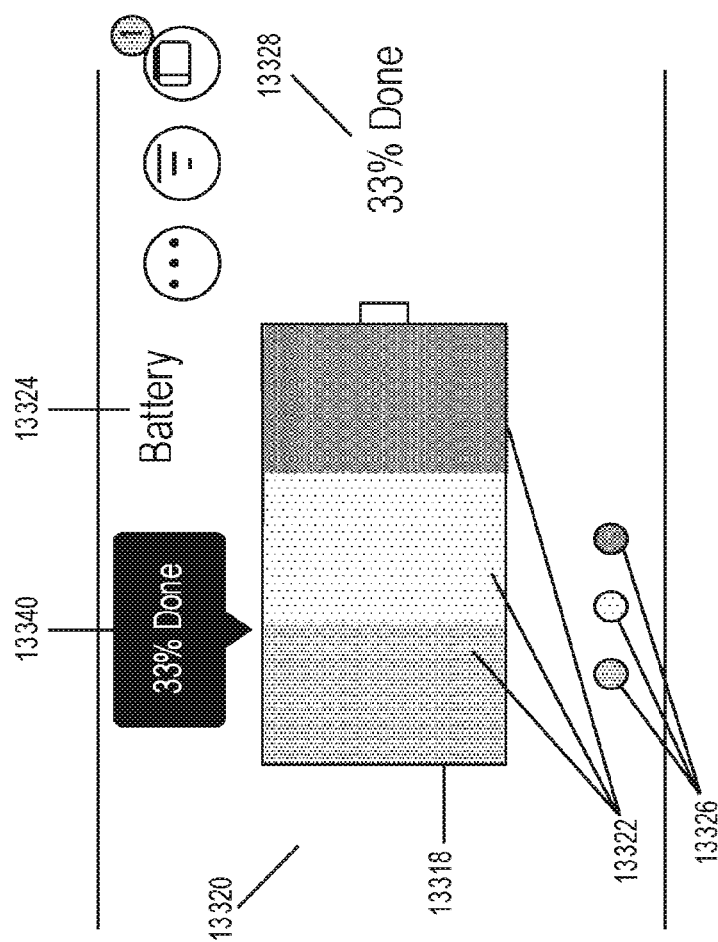

FIGS. 88A and 88B illustrate an example graphical user interface 300 for presenting a process management dashboard view and widget view according to an example implementation. For example, app 13132 or browser 13134 can present GUI 13300 on a display of user device 13130 in response to the user selecting a dashboard view 13310. Dashboard view 13310 may include one or more widgets 13312. In FIG. 88A, three widgets 13312-1, 13312-2, and 13312-3 are shown. Widgets 13312 show process management data 13138 that may be retrieved from data repository 13120 and more specifically from one or more boards accessible by the user interacting with GUI 13300. Widgets 13312 are one or more local PMS modules 13140. In some implementations, a widget 13312-1 may include a graphical indicator 13318 that may have the external shape of a button-top cylindrical battery and is herein referred to as a battery widget 13320. The graphical indicator 13318 may be defined by any shape and may be configurable by a user according to user preference.

In use, a user may wish to view, in a graphical indication, the aggregated distribution of status labels of a status type column related to multiple items in multiple groups where the status label of each item may vary. It should be appreciated that the battery analogy is suitable for such a graphical indicator as the combined status labels of the items in the groups accumulate to"fill the battery" thereby providing a visualization of the total portion of each aggregated status label. The battery widget may also apply to other column types aside from the status column type, such as person, time zone, team, location, or any other column type that may be included with a board.

In a non-limiting example, a user may wish to know what percentage of tasks (items) in several projects (groups) across multiple boards are marked in a status column with the status label "Done". The user may further wish to know the percentages of other status labels aside from "Done" such as "Stuck" to address items that may require immediate attention. In such an example the battery widget 13320 may indicate the proportional percentage of various status labels of tasks across several projects and boards.

In dashboard view 13310, battery widget 13320 may include a battery shaped graphical indicator 13318 divided into segments 13322. Each of segments 13322 is a graphical representation of a status label. In some implementations, the proportional size of a segment 13322 representing a specific status label is determined by dividing the total number of items in the chosen groups by the number of items in the chosen groups having the specific status label to determine a percentage of the specific status label. In some implementations, the proportional size of a segment 13322 representing a specific status label is determined by dividing the total number of items in the chosen groups by the number of items in the chosen groups having the specific status label multiplied by a weighting factor such that status labels with a greater weighting are proportionally bigger. In some implementations, segments 13322 may have the same color as the status labels that each segment 13322 represents.

Battery widget 13320 may further include label key 13326 indicating the status labels represented by segments 13322. Battery widget 13320 may additionally include a configurable title 13324 describing the purpose of battery widget 13320 as defined by a user of PMS 13110, and a configurable completion label 13328 for highlighting the percentage of a chosen segment. The configurations of the title 13324 and the label 13328 may be defined by a user, independent of the labels already assigned to segments 13322 and label key 13326 according to user preference.

In some implementations, such as shown in FIG. 88B, user interaction with battery widget 13320 such as selecting a segment 13322 may cause GUI 13300 to display a callout box 13340 indicting the percentage representation of the selected segment 13322. Other user interactions may include a mouseover event, a click, or a cursor hover.

In some embodiments, the system may maintain for presentation in a first table, a first group of items including a first item with a first status and a second item with a second status, and maintaining for presentation in a second table, a second group of items including a third item with the first status and a fourth item with the second status. In other embodiments, a system may maintain for presentation in a first table form, a first group of items associate with a first project, wherein at least one first item from the first group of items is assigned to an entity and has an associated first status. The system may further maintain for presentation, in a second table form, a second group of items associated with a second project, wherein at least one second item from the second group of items is assigned to the entity and the at least one second item has an associated status different from the first status.

Maintaining for presentation may include storing in memory a table or information sufficient to cause display of a table. A table may include layout. For 2D tables, for example, a table may include a plurality of column headings and/or an arrangement of columns. Depending on implementation, a 2D table may also include horizontal row designations. The table may be configured to enable display of information via at least one computing device. The display, whether 2D or 3D, as described herein may include a graphical user interface (GUI) that may be interactive. A project may include any item or group of items associated with tasks or activities that may be defined by a user, whether the items are within a table or group of tables (a table is synonymously referred to as a "board" herein). Therefore, at any given time, a system may support many projects, each with its own associated tasks, and in appropriate circumstances, with project-associated tasks segregated onto differing boards by project. A user may be an owner/author of a single board or multiple boards. Multiple users may also tie their own individual boards to a common board or to other user's boards to provide meaningful information such as status updates of assignments tasked to each user. Assignments may include associating an entity with a responsibility-based cell for a particular item. Entities may include an individual, a plurality of individuals, or any other responsibility designations. Statuses may be designated to items to reflect the current progress with a particular item.

A first group of items in a table may be related to each other in some way (e.g., they may all relate to the same project), but they may have different statuses. For example, a first item may still be in progress and therefore may have an incomplete status designation such as "in progress," "working on it," "stuck," or "to do." Other items may have completed statuses such as "done," "completed," or "finished." Different tables may host different groups of items that have differing statuses. For example, a first item in a first table and a third item in a second table may both be in progress, while a second item in the first table and a fourth item in the second table are both complete.

Figure 102A:
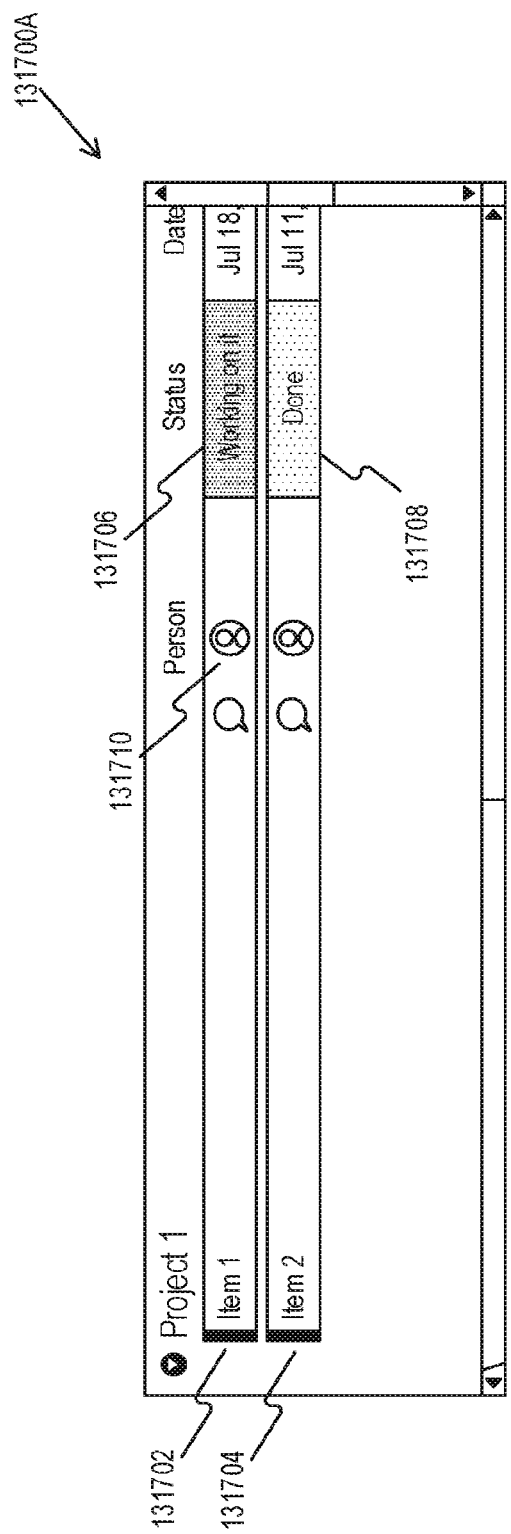
FIG. 102A illustrates a first table consistent with embodiments of this disclosure.
Figure 102B:
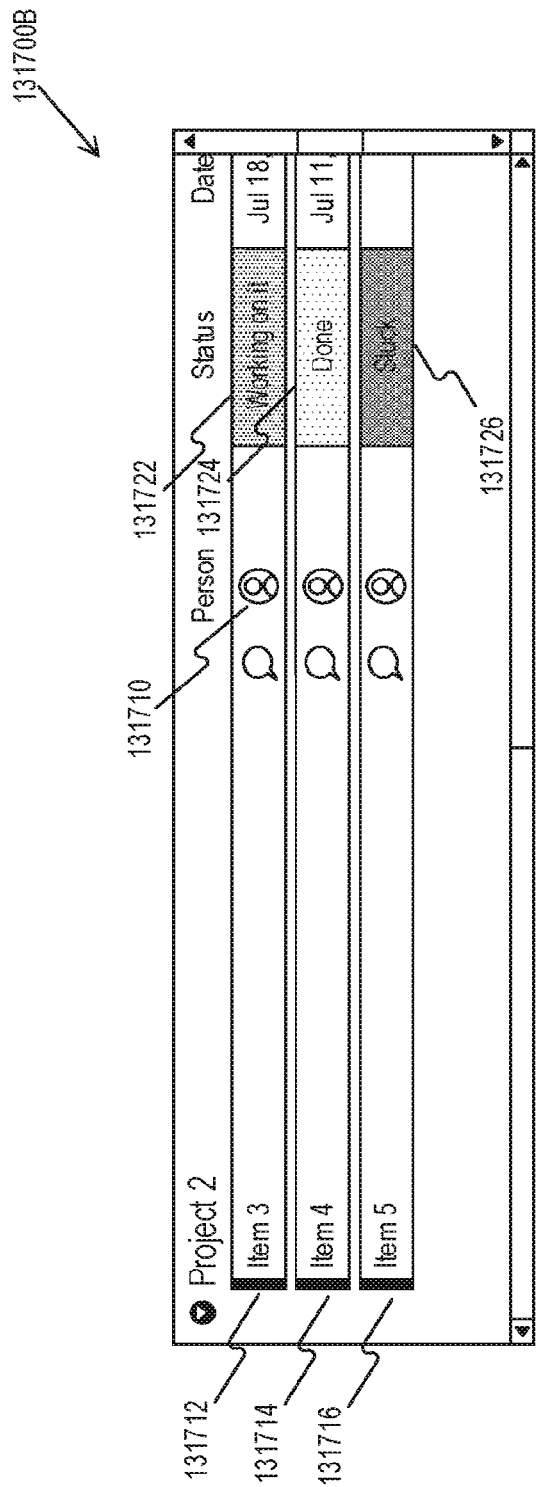
FIG. 102B illustrates a second table consistent with embodiments of this disclosure.

FIG. 102A and FIG. 102B illustrate two tables 131700A and 131700B, for Project 1 and Project 2, respectively. For ease of discussion, Project 1 is illustrated with only two items: Item 1 in row 131702, having the status "working on it" as indicated in field 131706; and Item 2 in row 131704, having a status "Done" as indicated in field 131708.

Similarly, Project 2 is illustrated with three items: Item 3, in row 131712, having the status "working on it" as indicated in field 131722; and Item 4 in row 131714, having a status "Done" as indicated in field 131724; and; and Item 5 in row 131716 having a status "stuck" as indicated in field 131726.

A user may be enabled to select two projects of interest and output a graphical indicator out including a first graphical element aggregating, based on a shared first status, the first item and the third item, and a second graphical element aggregating, based on a shared second status, the second item and the fourth item. The selection of two projects of interest may be a simplification in that a user may select many more projects of interest or boards for aggregation. If so, the graphical indicator may aggregate data from more than two boards or projects. The graphical indicator may be any 2D or 3D graphical representation for summarizing aggregate data. For example, the graphical indicator may be in the shape of a battery, or a representation of any other object. The graphical indicator may include multiple sub-components represented as graphical elements associated with different aspects of the aggregate data. The graphical indicator may be set as a default or may be definable by a user to be any representation. Aggregating may include performing a look up across a single table or multiple tables for a common characteristic, such as a common status indicator and collecting those common characteristics for output and ultimate display.

Figure 102C:
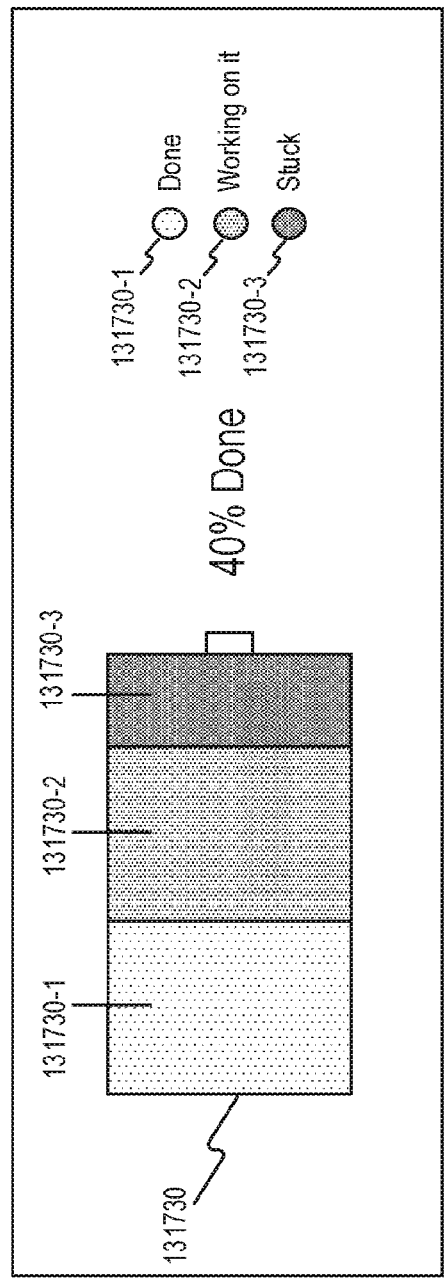
FIG. 102C illustrates a graphical indicator aggregating information from FIGS. 102A and 102B, consistent with embodiments of this disclosure.

If, for example, a user makes a selection to aggregate in a graphical element Projects 1 and 2 from FIGS. 102A and 102B, the output may take the form of the example in FIG. 102C. Among FIGS. 102A and 102B, there are five items in the aggregate. Two items in rows 131702 and 131712 are not completed as they are marked "working on it"; two items in rows 131704 and 131714 are completed as they are marked "done"; and a fifth item in row 131716 is marked "stuck." The graphical indicator 131730 in FIG. 102C, aggregates this information graphically, representing with graphical element 131730-1 40% of the items as "done"; with graphical element 131730-2 40% of the items as "working on it," and with graphical element 131730-3 20% of the items as "stuck."

The selection may be made on-the-fly by any user interested in analyzing aggregate data. Alternatively, the user-selection may be made by an administrator (a user) who predefines dashboards for projects. A graphical element may be any region on a display or in a virtual display where a portion of data is graphically represented. In the example of FIG. 102C, the graphical indicator 131730 (shaped as a battery) has graphical elements 131730-1, 131730-2, and 131730-3 which are portions of the battery and may be distinguishable from each other by differing colors or visual textures. In other embodiments, the graphical indicator may take an infinite number of forms. For example, if the system involves transportation, the graphical indicator may be a truck and the graphical elements may be portions of the truck. If the system involves healthcare, the graphical indicator may depict a human body and the graphical elements may be portions of the body. The alternative forms are infinite, and may vary depending on the use case and the creativity of the designer.

In some embodiments, a selection of a first graphical element may be received, and in response thereto a third table containing representations of the first item and the third item may be generated. Similarly, in some embodiments, a selection of a second graphical element may be received, and in response thereto a fourth table containing representations of the second item and the fourth item may be generated. A selection may be any action taken by a user to choose a graphical element. Such actions may include a mouse click, a mouseover, a hover, a touch on a touch sensitive surface, a keystroke, a movement or gesture in a virtual interface or any other event that indicates a choice by the user.

Figure 102D:
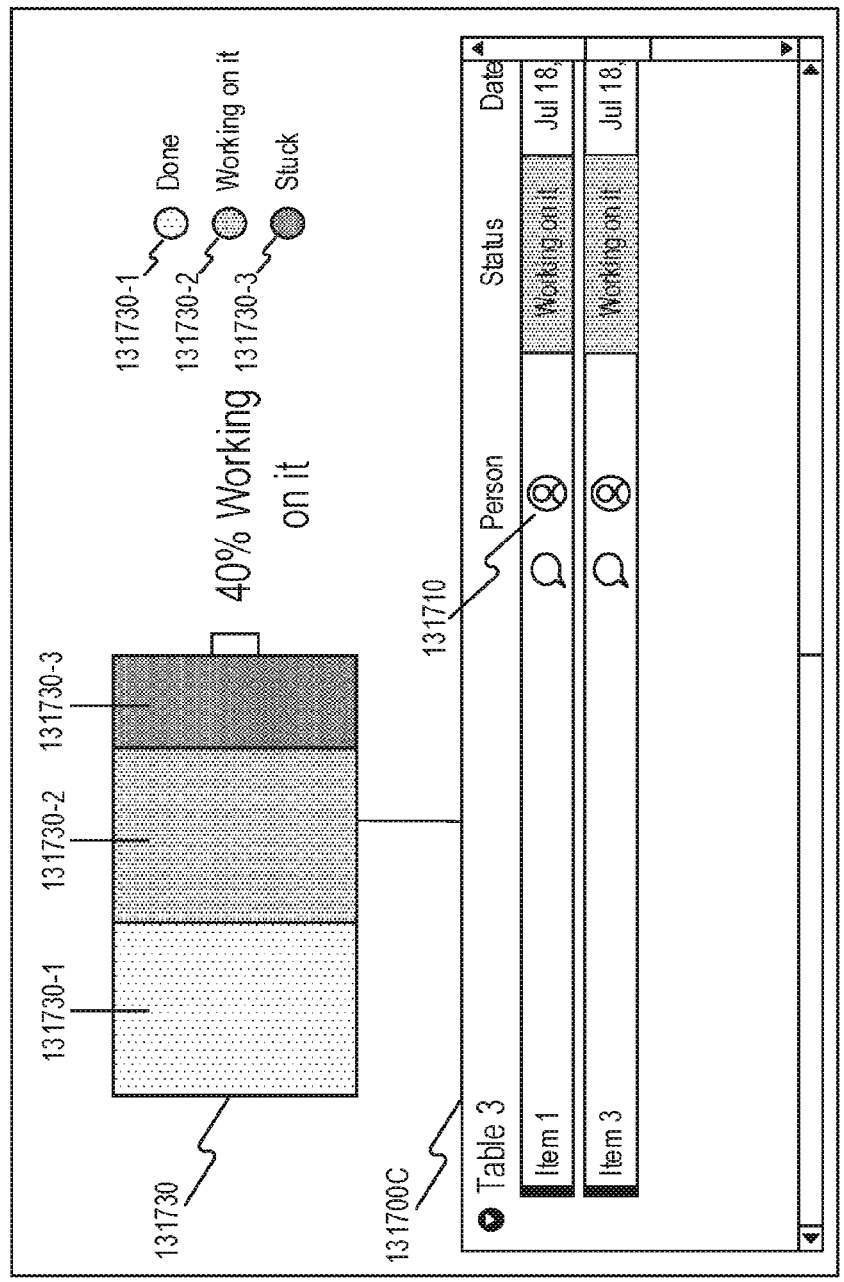
FIG. 102D illustrates a third table parsing first data presented in the graphical indicator of FIG. 102C, consistent with embodiments of this disclosure.

If a user were to make a selection of graphical element 131730-2 in FIG. 102C, a resulting third table 131700C may be generated, as illustrated for example in FIG. 102D. Because graphical element 131730-2 represents non-completed items designated as "Working on it," a system processor may perform a look up for similarly designated items across the aggregated tables, which items share the "Working on it" status indicator. In this example, Item 1 in table 131700A and Item 3 in table 131700B share the "Working on it" status indicator. The system may then generate a third table 131700C aggregating Items 1 and 3, as is illustrated in FIG. 102D.

Figure 102E:
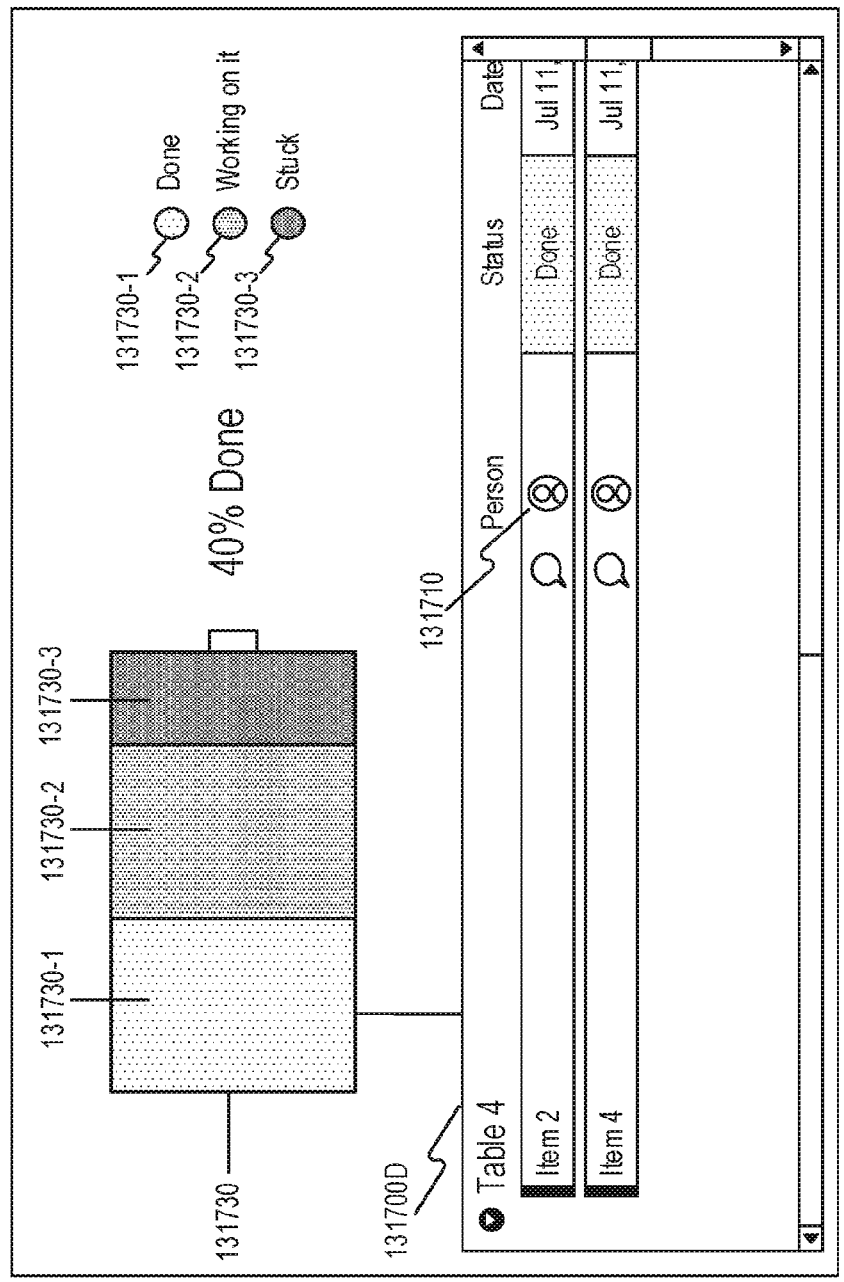
FIG. 102E illustrates a third table parsing second data presented in the graphical indicator of FIG. 102C, consistent with embodiments of this disclosure.

If a user were to make a selection of graphical element 131730-1 in FIG. 102C, a resulting fourth table 131700D may be generated, as illustrated for example in FIG. 102E. Because graphical element 131730-1 represents completed items designated as "Done", a system processor may perform a look up for items across the aggregated tables sharing the "Done" status indicator. In this example, Item 2 in table 131700A and Item 4 in table 131700B are "Done." The system may then generate a fourth table 131700D aggregating Items 2 and 4, as illustrated in FIG. 102D.

The system may be said to generate a table by outputting information for display. The form of the table may be predesigned or may be selected by the user. The table need not include all item columns associated with aggregated items. For example, only a subset of the columns associated with the aggregated items may be displayed in the third and fourth tables.

Look-ups for the generated third and fourth tables may occur only after a selection of a graphical element is made. Alternatively, data may be aggregated in advance and the appropriate table displayed upon user selection of a graphical element of the graphical indicator. Regardless of the alternative, a table is said to be "generated" when the information in the table is caused to be displayed to the user.

The first graphical element may be associated with a completed status and the second graphical element may be associated with an incomplete status. A "completed" status may include a status containing the word "completed" or may include similar language such as "Done," "All set," "Finished," a green color, or any other graphical or textual indication that something is completed. An incomplete status may include a status containing the word "incomplete," but may also include any other status indication that a status is not complete such as "in progress," "working on it," "stuck," "stopped," "awaiting action," "almost complete," a stop sign icon, the color red or yellow, or any other graphical or textual indication that something is incomplete. The complete and incomplete statuses may be predefined in the system or may be customized and saved for later application by a user. The system may perform language processing or perform a look-up of commonly associated status indicators to determine when a similar indication represents a "complete" or "incomplete" status. A user may also manually designate the similar status indicators in "complete" or "incomplete" groupings of statuses based on the user's preference.

In FIG. 102D, a first graphical element may be graphical element 131730-1 that is associated with a "completed" status since the associated status indicator is "Done." A second graphical element may be graphical element 131730-2 that is associated with an "incomplete" status since the associated status indicator is "Working on it." The user may define, or the system may also recognize, that graphical element 131730-3 is also considered "incomplete" because the associated status indicator is "Stuck." Accordingly, the system may also present graphical element 131730-3 as part of the second graphical element associated with an "incomplete" status.

Consistent with some disclosed embodiments, the first item, second item, third item, and fourth item may be assigned to a common entity. A common entity may be any common individual, group of individuals, objects, or any other responsibility designations as described herein. A graphical indicator or text may represent the common entity within the GUI. Further, the graphical indicator may aggregate data based on a shared status while enabling filtering of the aggregated items based on the common entity. The assignment to the common entity may occur before aggregation in Project 1 and Project 2 but may also occur after the third or fourth tables are generated. While the first, second, third, and fourth items may be assigned to a common entity, it is understood that the items may also be assigned to different entities.

By way of example, the assignment to a common entity 131710 may occur before aggregation occurs, in tables 131700A and 131700B of FIGS. 102A and 102B, or may occur after aggregation occurs in tables 131700C or 131700D of FIGS. 102D and 102E. The common entity 131710 may be a responsible entity for the associated first, second, third, and fourth items. The common entity 131710 may also be an entity that receives notifications and updates made to the assigned items. The common entity may be assigned directly in tables 131700A, 131700B, 131700C, and 131700D by interacting with an assignment or responsibility cell associated with each item. Alterations made to the assignment may carry through to all tables 131700A, 131700B, 131700C, or 131700D to reflect the same alterations.

Figure 103:
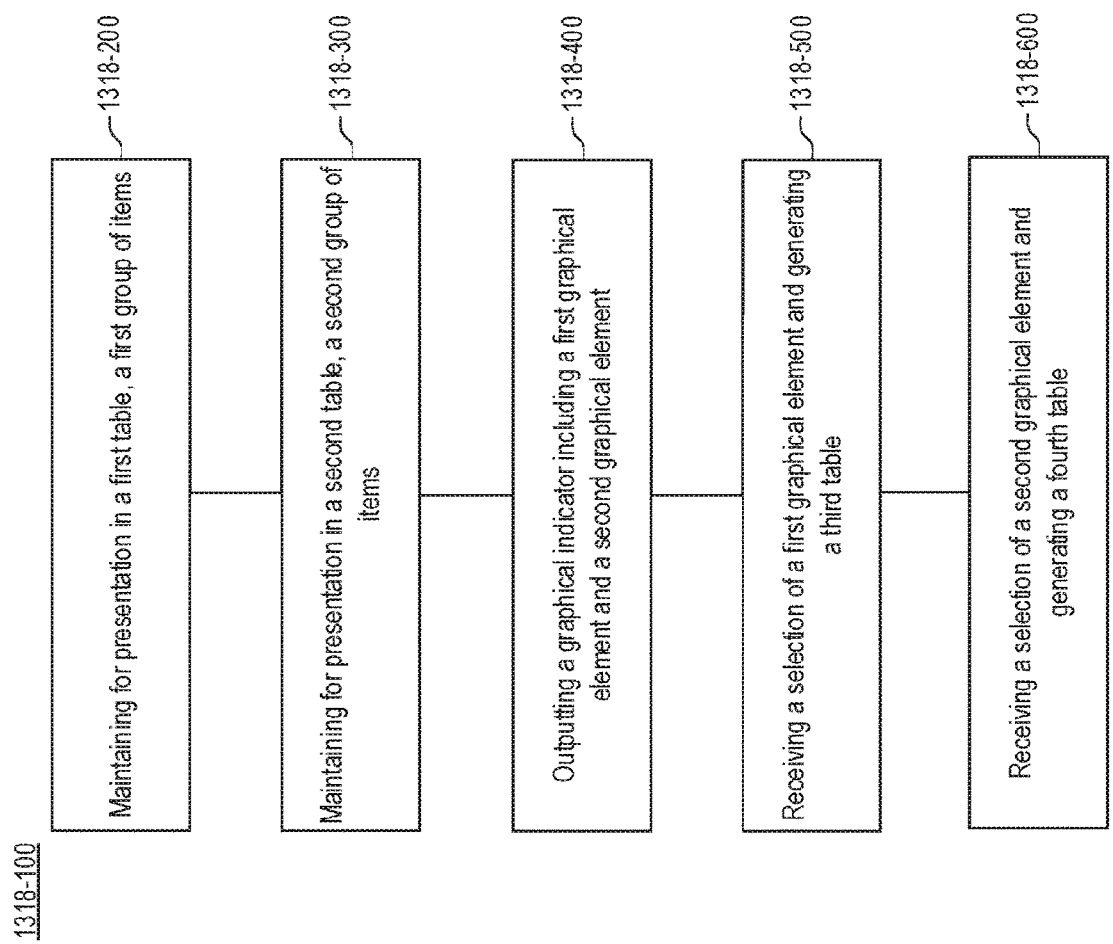
FIG. 103 is a block diagram of an exemplary process for aggregating and parsing data from multiple tables, consistent with embodiments of the present disclosure.

Consistent with the descriptions of FIGS. 102A-102E, one embodiment may include a method 1318-100, as shown in FIG. 103, with block 1318-200 for maintaining for presentation in a first table, a first group of items. The first group of items may include a first item with a first status and a second item with a second status as previously discussed. At block 1318-300, the method 1318-100 may include maintaining for presentation in a second table, a second group of items. The second group of items may include a third item with the first status and a fourth item with the second status as previously discussed.

The method 1318-100 may further include block 1318-400 for outputting a graphical indicator that includes a first graphical element and a second graphical element. The first graphical element may aggregate, based on a shared first status, the first item and the third item consistent with the disclosed descriptions herein. The second graphical element may also aggregate, based on a shared second status, the second item and the fourth item as previously discussed.

At block 1318-500, the method 1318-100 may include receiving a selection of the first graphical element and generating a third table. The third table may contain representations of the first item and the third item as described herein. At block 1318-600, the method 1318-100 may include receiving a selection of the second graphical element and generating a fourth table. The fourth table may contain representations of the second item and the fourth item consistent with the descriptions previously discussed.

In some embodiments, the graphical indicator may include associated status labels such as, for example, a plurality of different status labels. The status labels, may, for example, represent the current status of items associated with one or more projects. Non-limiting examples of status indicator include such designations as "in progress," "awaiting action," almost compete," "complete," "stuck," "done" or any other indication of the status of any item. In some instances, an empty status field may serve as an indicator (e.g., to indicate that the item is not yet active or in progress.) The graphical indicator may also include a plurality of segments, wherein each of the plurality of segments represents a proportion of each of the plurality of different status labels within a total number of associated status labels to form the aggregated view (graphical indicator). For example, to the extent that a group of items share a common status, those items may be aggregated as a segment of the graphical indicator. In one non-limiting example, the graphical indicator may be a battery divided into segments wherein each segment represents a different of statuses. Each segment may be visually differentiated, such as by color or texture. In addition to or alternatively to a status aggregator, a graphical indicator may be used to present other information such as persons, location, time, responsibility, or any other type of information that might be designated a table's column heading. The segments in the graphical indicator may be sized to be proportional to the percentage make up of that respective segment (e.g., the data underlying the segment.) For example, if the segment represents "Stuck" items and 25% of the items in a table contain the "Stuck" status, the graphical indicator may include a segment that spatially corresponds to 25% of the graphical indicator. In other embodiments, the proportional representation of each status label may be weighted by a number associated with each status label. The associated number may be a priority, a relative expected time to completion, a relative expected cost to completion, or any other multiplier depending on the particular implementation. The multiplier can be greater or less than 1. For example, if an item has a number column with the number "2" associated with the item, the item may be given twice the weight in importance or visual representation in a graphical indicator.

Figure 89:
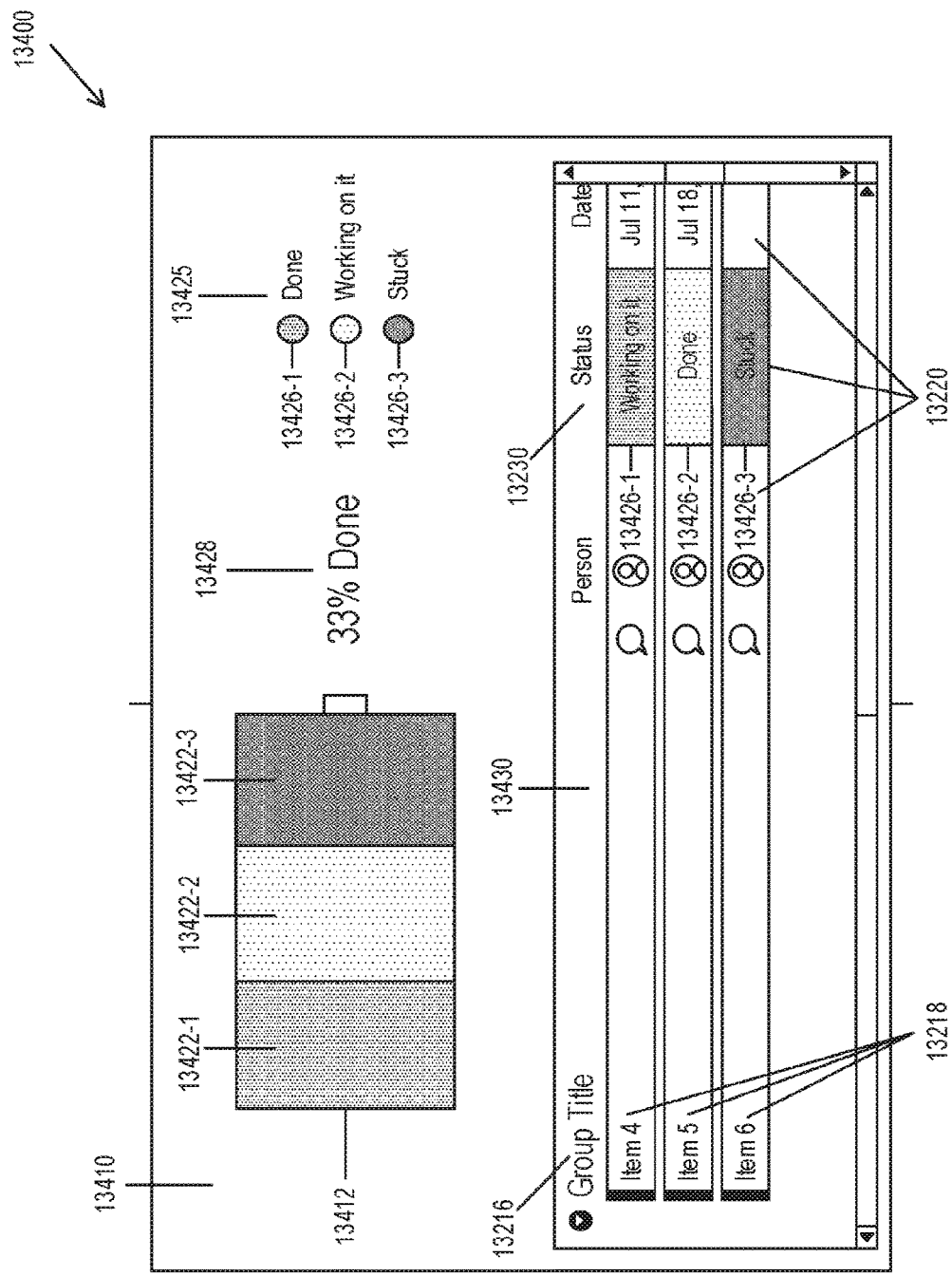
FIG. 89 illustrates another example of a graphical user interface for presenting a process management battery widget view consistent with some embodiments of this disclosure.

FIG. 89 illustrates an example graphical user interface 13400 for presenting a process management battery widget view according to an example implementation. For example, app 13132 or browser 13134 can present GUI 13400 in response to receiving a user selection of the battery widget 13320 in FIG. 88A. In response, the battery widget view 13410 of FIG. 89 may be displayed.

Battery widget view 13410 may include a battery shaped graphical indicator 13412 divided into segments 13422. As illustrated in the example of FIG. 89, each of segments 13422 is a graphical representation of a status label. As illustrated by GUI 13400, three status labels are presented in the three segments 13422-1 to 13422-3. Battery widget view 13410 further includes label key 13425 indicating the status labels 13426 represented by segments 13422. The three segments 13422-1 to 13422-3 correspond with the three status labels 13426-1 to 13426-3 shown in label key 13425.

In some implementations, segments 13422 may have the same color as the status label 13426 that each segment 13422 represents.

Battery widget view 13410 may also include a board view 13430 including those groups 13216 that may be represented in battery graphical indicator 13412. It should be appreciated that the display of the source data (boards, groups, items, columns) in table view 13430 that is used to generate battery graphical indicator 13412 may enable a better understanding by a user of the presentation of graphical indicator 13412. Groups 13216 include items 13218 and item related data in columns 13220. Columns 13220 may include a status type column 13230 or any other type of column containing information relating to person, date, location, time tracking, and any other data that may be included for an item. Each item 13218 has a status label defined in status type column 13230. These status labels 13426 correspond with the status labels 13426 shown in graphical indicator 13412 and label key 13425.

It should be further be appreciated that in response to receiving a user selection of graphical elements of board view 13430 (a first table form), a user may interact with board view 13430 to add, retrieve, modify, browse, and/or share the process management data displayed therein as well as messaging related to the process management data. Thus, using battery widget view 13410 may enable both a high-level view of the status of multiple items across multiple groups and boards using battery graphical indicator 13412. Further, a user may interact with the same battery widget view 13410 to view the underlying data such as items, columns, groups, and boards of board view 13430 without having to open a specific board view 13214. In a non-limiting example, a user may alter the status labels 13426 in status column 13230 to thereby alter the proportional presentation of a status label 13426 in graphical indicator 13412. A user may further alter any other item 13218 related data in columns 13220 without having to open board view 13214 in FIG. 87A.

Battery widget view 13410 may further include a configurable completion label 13428 for highlighting the percentage of a chosen segment. As described above, a user may define the label 13428 with custom text independent of the labels already assigned to the segments 13422 and label keys 13425. Further, a user may configure the label 13428 to represent any label associated with any of the segments 13422 so that the label 13428 may represent "Working on it" 13426-2 or "Stuck" 13426-3 in FIG. 89.

Some embodiments may enable selection of a first graphical element to cause the at least a first item to appear in a first new table form other than the first table form, and enable selection of the second graphical element in order to cause at least a second item to appear in a second new table form other than the second table form. A selection may include a selection made by a user through a user interface such as a touchscreen, mouse, or keystroke. The selection may cause the system to take an action or display an alteration data presented on a screen. When a user selects a graphical element on the graphical indicator, this may aggregate items associated with the graphical element such that only those aggregate items may be displayed on the screen. In other words, the selection of the graphical element may filter a first table view to only include items with an associated status label that may be the same as that of the selected segment. In this way, the items may be displayed in a first new table form that is different from the original table containing other items. A new table form may also include altering the presentation of information from the original table by presenting more or less information than the originating table. Further, the new table form may also alter the structure or layout of the original table.

The graphical indicator may be displayed in a common view with data from the first table form and the second table form. For example, the system may display proximate to the graphical indicator a table view of the groups of items and item associated columns for items with a status label included in the graphical indicator. Proximate may be any location for the table that is near the graphical indicator so that a user is able to discern a logical relationship between the graphical indicator and the table. In other embodiments, the graphical indicator may be presented within a cell of the first table form. Presenting the graphical indicator within a cell may include displaying the entire graphical indicator within the cell or a partial display of the graphical indicator within a cell. For example, if the graphical indicator is a battery with segments displaying different statuses, the graphical indicator may be scaled in size to display all of the status colors and text within a cell. Alternatively, only the status colors within a battery may be displayed within a cell to only partially display the graphical indicator. The graphical indicator may be presented in a cell adjacent a column in which the graphical indicator may be associated with. For example, a graphical indicator for statuses may be displayed in a cell at a header or at a footer of an associated status column.

In some embodiments, the graphical indicator may be interactive, enabling alteration to the items in the first table without viewing the first table in its native form. Interaction with the graphical indicator may include interactive component to the graphical indicator such as a button. A user may interact with the graphical indicator through user actions such as a cursor hover or cursor selection. Such an interaction may cause the system to retrieve new information, display new information, or alter the display of preexisting information on a display. Interaction with the graphical indicator may also cause the system to enable alteration to the selected portion of the graphical indicator. In response to an interaction, the system may present a new table form with the filtered items for alteration without viewing the original table in its original form. Altering the items in the first table may include adding, retrieving, modifying, browsing, or sharing the data associated with the items. Altering may further include updating the data repository according to the interactions made in the table view.

Figure 90:
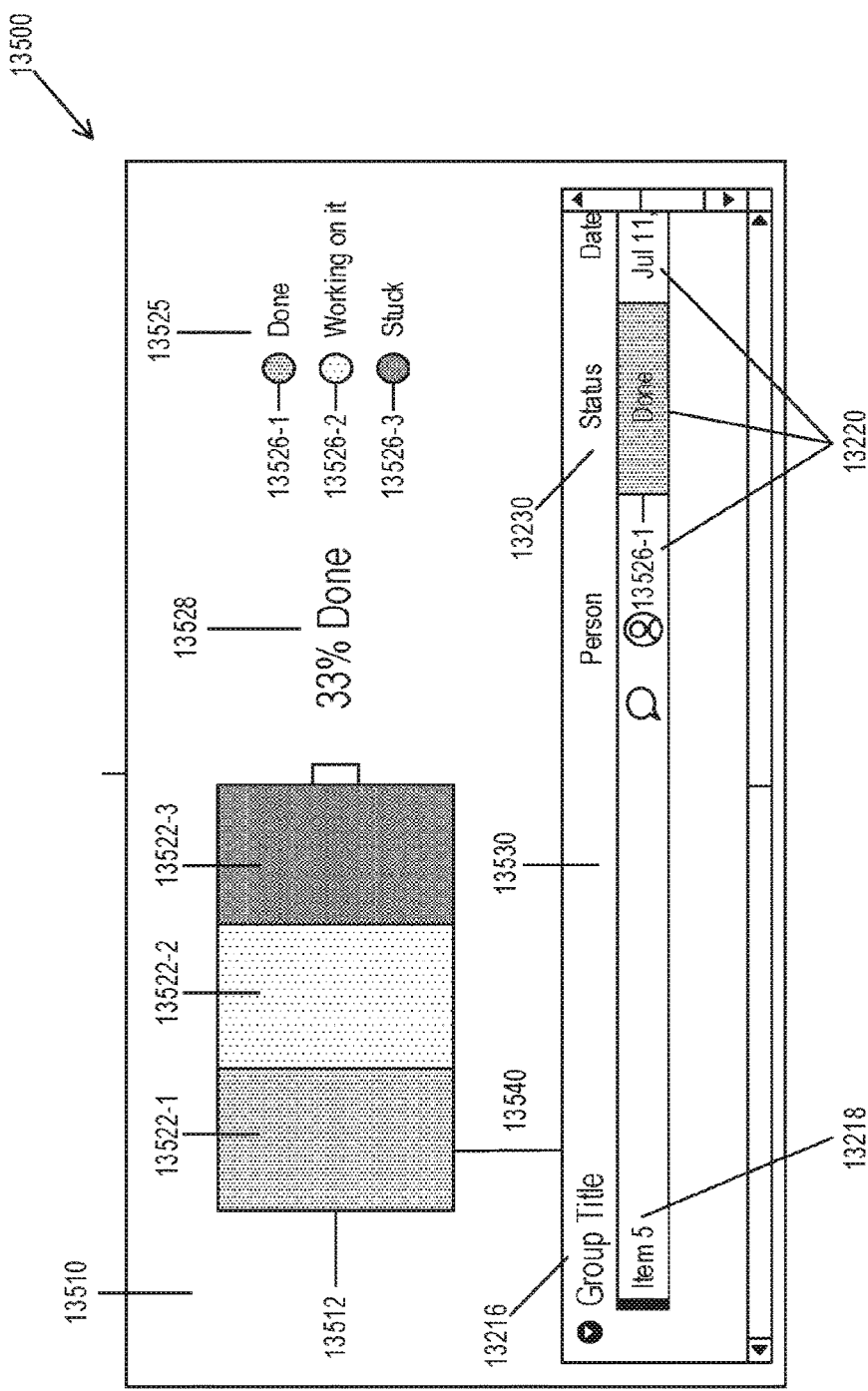
FIG. 90 illustrates an example graphical user interface for presenting a process management battery widget view consistent with some embodiments of this disclosure.

FIG. 90 illustrates an example graphical user interface 13500 for presenting a process management battery widget view according to an example implementation. In response to receiving a user selection of a segment (graphical element) 13522 of battery graphical indicator 13512, battery widget view 13510 may be altered to show a table view 13530 including only those items with a status label 13526 corresponding to the status of the selected segment. Thus, as shown in FIG. 90, since segment 13522-1 is selected, corresponding to status 13526-1, only items having a status of 13526-1 are displayed. Battery widget view 13510 may feature a segment line 13540 connecting the user-selected segment 13522 with board view 13530 for indicating the selected segment 13522. Battery widget view 13510 might not feature any indication that the selected segment 13522 is altering the board view 13530 or may implement any other graphical indication to reflect that the selected segment 13522 is presented in the board view 13530. Further, the selected segment may be highlighted such as shown in FIG. 90 where selected segment 13522-1 is emphasized in comparison the other segments 13522. Selection by a user of a segment 13522 thus may provide an intuitive filtering mechanism of the statuses 13526 represented by battery graphical indicator 13512. Since segment 13522-1 has been selected, completion label 13528 shows the percentage of the chosen segment 13522-1 corresponding to status 13526-1. In other embodiments, filtering mechanism of the statuses 13526 may include other processes that may include consolidating similar statuses through language processing. For example, similar statuses to "Done" status 13526-1 may be considered the same, such as a "Completed" status. The similar statuses would be appropriately calculated for the percentage of tasks that fall under this category in the battery widget view 13510 as described above.

As described above, in response to receiving a user selection of graphical elements of board view 13530, a user may interact with board view 13530 to add, retrieve, modify, browse, and/or share the process management data displayed therein as well as messaging related to the process management data.

Figure 91:
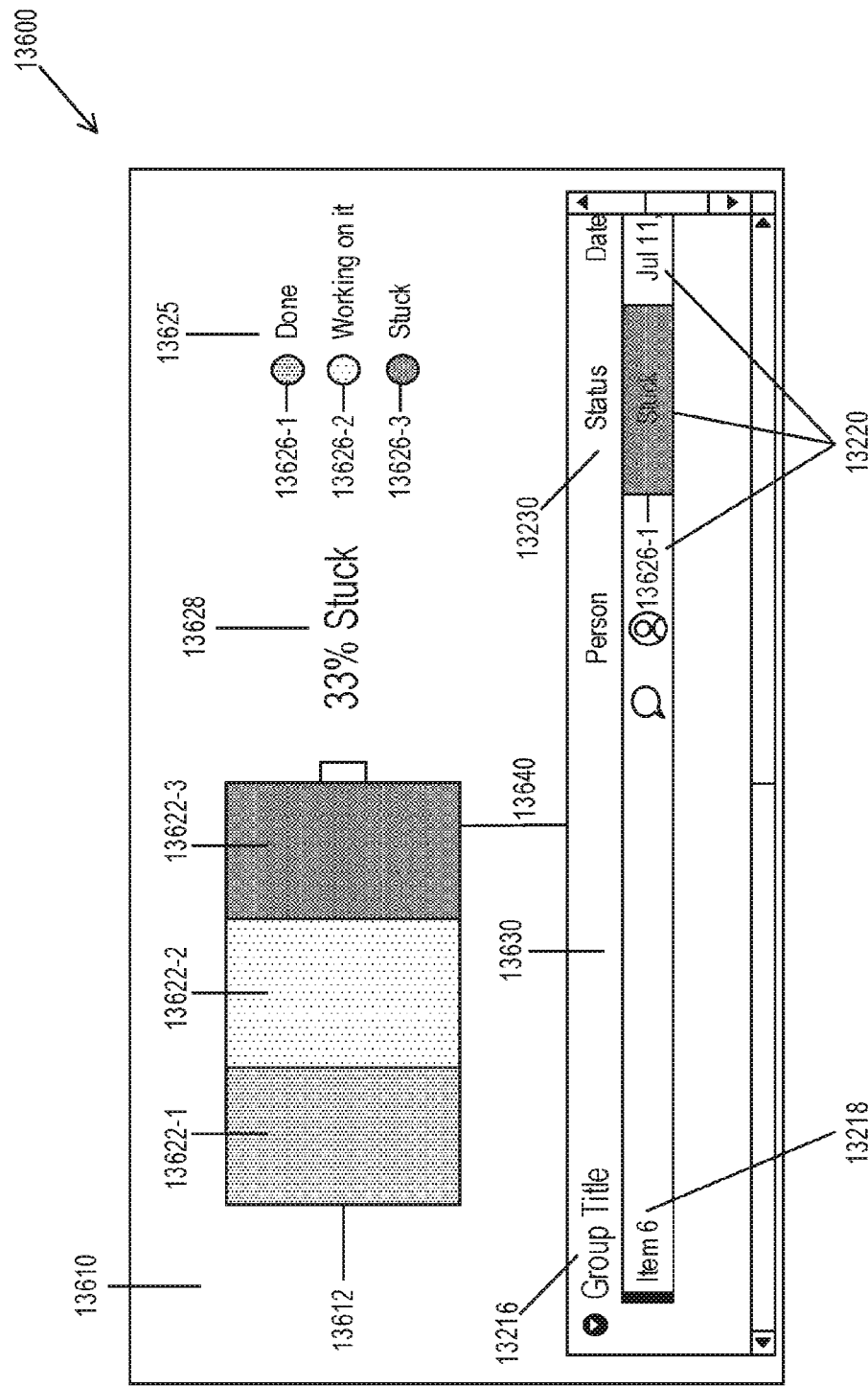
FIG. 91 illustrates an example graphical user interface for presenting a process management battery widget consistent with some embodiments of this disclosure.

FIG. 91 illustrates an example graphical user interface 13600 for presenting a process management battery widget view according to an example implementation. Similarly to the GUI 13500 shown in FIG. 90, in response to receiving a user selection of a segment 13622 of graphical indicator 13612 battery widget view 13610 may be altered to show a table view 13630 including only those items with a status label 13626 corresponding to the status of the selected segment. Thus, as shown in FIG. 91, since segment 13622-3 has been selected, corresponding to status label 13626-3, only items having a status label of 13626-3 are displayed. Battery widget view 13610 may feature a segment line 13640 connecting the user-selected segment 13622-3 with board view 13630 for indicating the selected segment 13622-3. Battery widget view 13610 might not feature any indication that the selected segment 13622 is altering the board view 13630, or may implement any other graphical indication to reflect that the selected segment 13622 is presented in the board view 13530. Further, the selected segment may be highlighted such as shown in FIG. 91 where selected segment 13622-3 is emphasized in comparison the other segments 13622. Since segment 13622-3 has been selected, label 13628 shows the percentage of the chosen segment 13422-3 corresponding to status label 13626-3.

As described above, in response to receiving a user selection of graphical elements of board view 13630, a user may interact with board view 13630 to add, retrieve, modify, browse, and/or share the process management data displayed therein as well as messaging related to the process management data.

Figure 92:
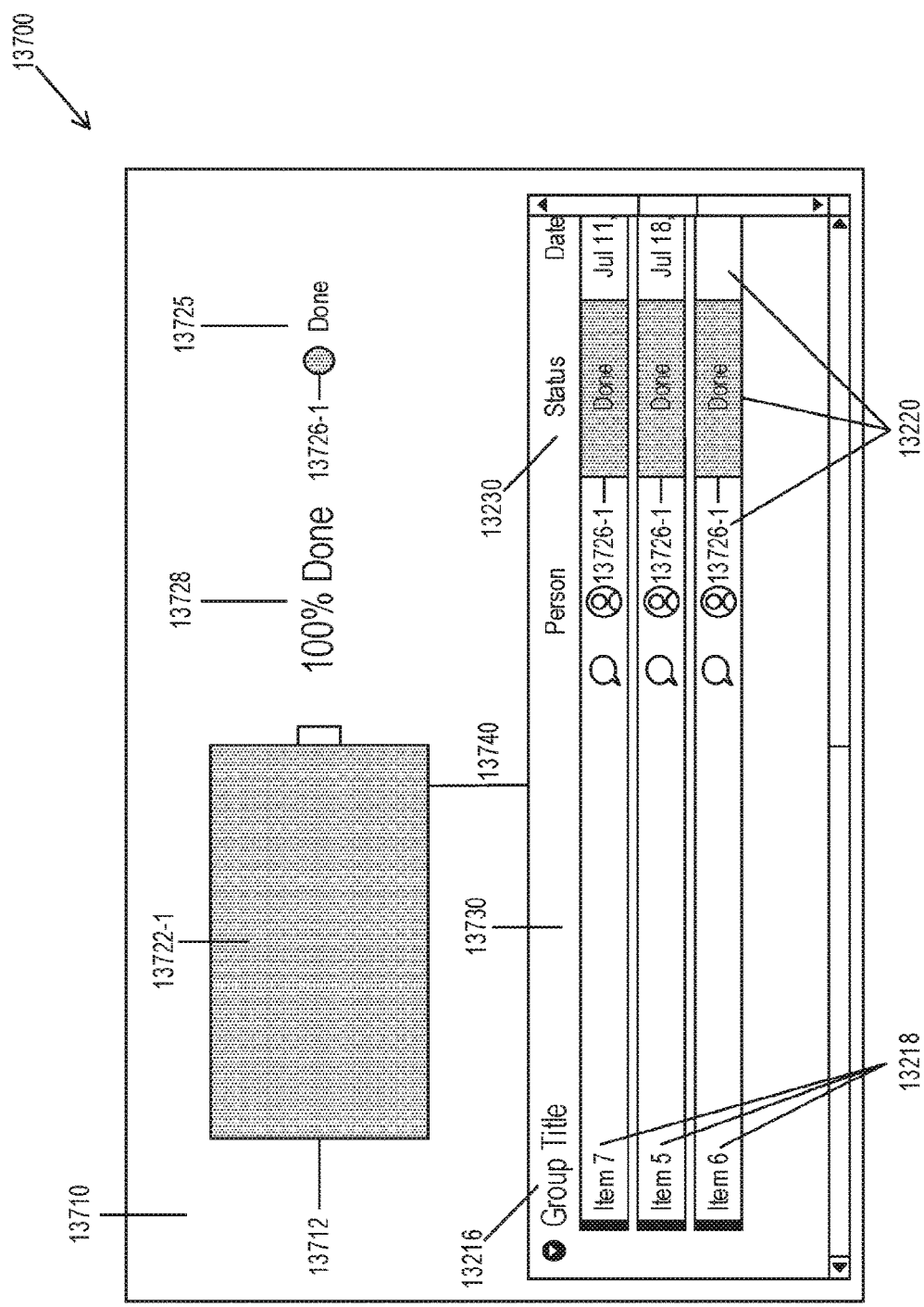
FIG. 92 illustrates an example graphical user interface for presenting a process management battery widget view consistent with some embodiments of this disclosure.

FIG. 92 illustrates an example graphical user interface 13700 for presenting a process management battery widget view according to an example implementation. As shown in FIG. 92, the status label 13726 of all items has been set to "Done" corresponding to status label 13726-1 and segment 13722-1. Thus, in response to editing by a user of the status label 13726 directly in board view 13730, battery graphical indicator 13712 may reflect the change in real time such as showing an increase in the percentage "Done" as additional items are marked with a "Done" status until all items have the status of "Done" as shown in FIG. 92.

Figure 93:
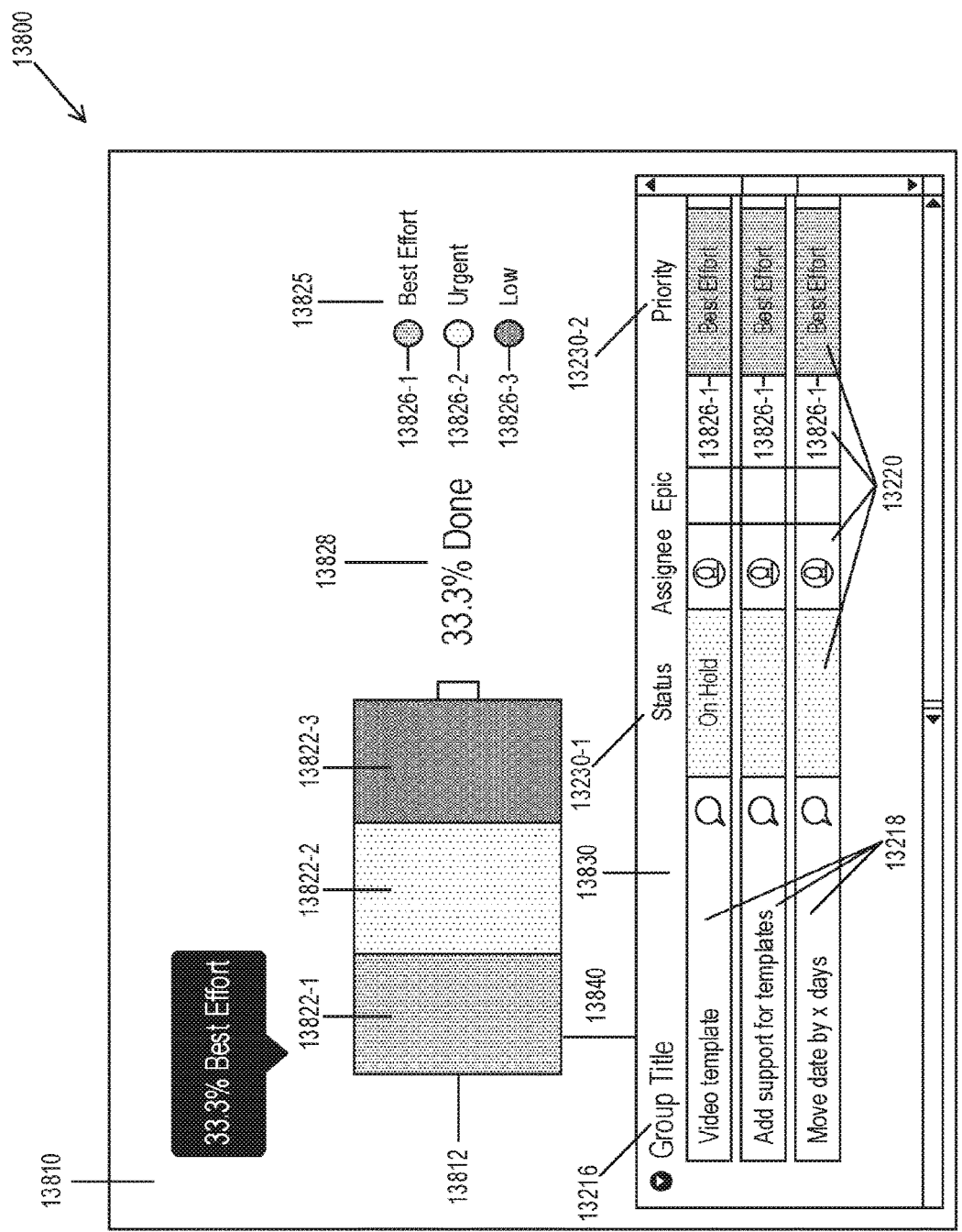
FIG. 93 illustrates an example graphical user interface for presenting a process management battery widget consistent with some embodiments of this disclosure.
Figure 94:
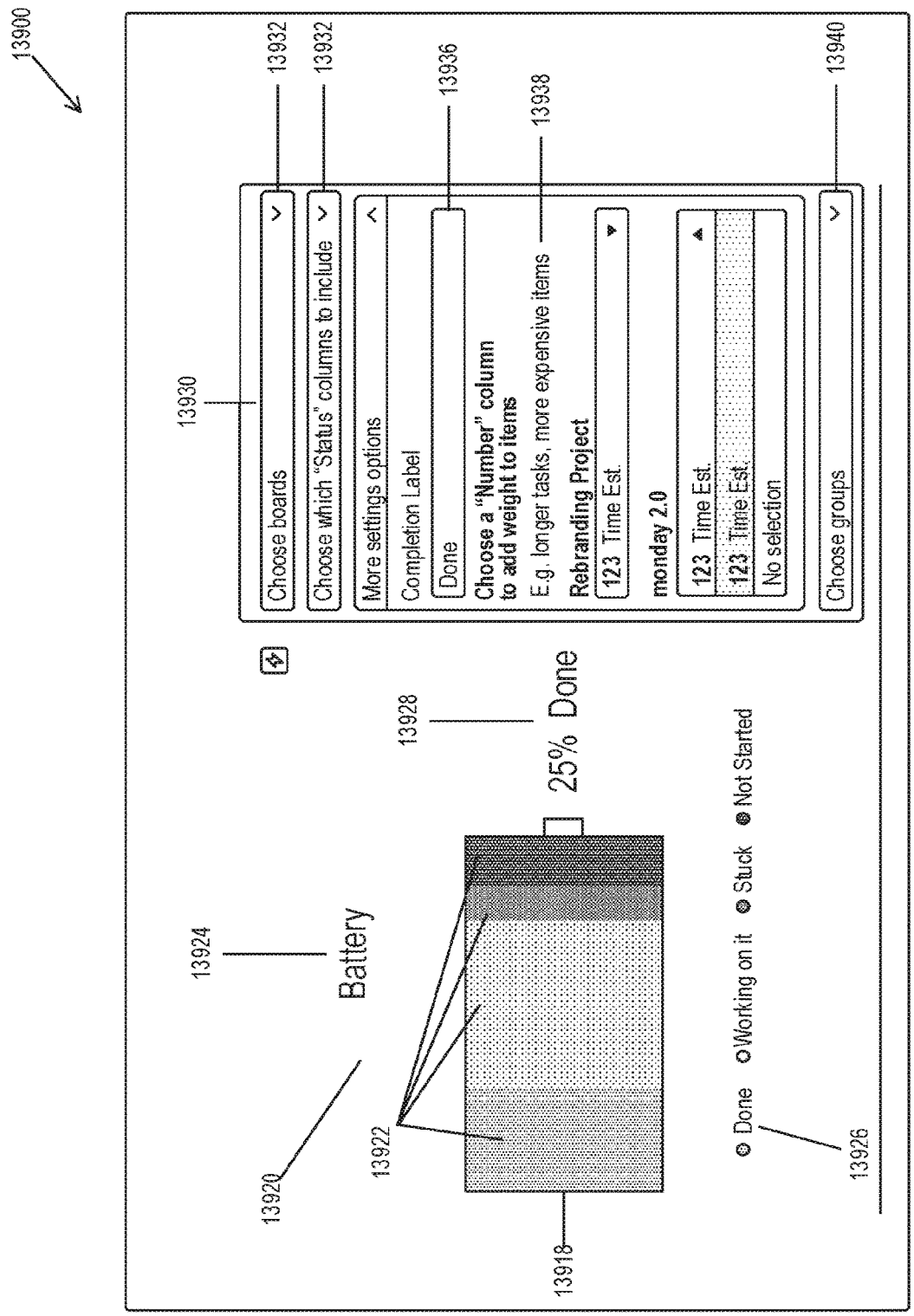
FIGS. 94-100 illustrate an example graphical user interface for presenting a process management battery widget view consistent with some embodiments of this disclosure.

FIG. 93 illustrates an example graphical user interface 13800 for presenting a process management battery widget view according to an example implementation. In response to receiving a user selection of a segment (graphical element) 13822 of battery graphical indicator 13812 battery widget view 13810 may be altered to show a table view 13830 including only those items with a status label 13826 corresponding to the status label of the selected segment.

In the example of GUI 13800, the battery widget source data may include more than one column status type, status column 13230-1 and status column 13230-2. In the example of GUI 13800, battery graphical indicator 13812 may be configured to display segments 13822 from status column 13230-2 (labelled "Priority" in GUI 13800).

Thus, as shown in FIG. 93, since segment 13822-1 has been selected, corresponding to status label 13826-1 (labelled "Best Effort"), only items having a status label of 13826-1 are displayed in board view 13830. Battery widget view 13810 features a segment line 13840 connecting the user-selected segment 13822-1 with board view 13830 for indicating the selected segment 13822-1 and related status labels shown in board view 13830. Since segment 13822-1 has been selected, completion label 13828 shows the percentage of the chosen segment 13822-1 corresponding to status label 13826-1.

As described above, in response to receiving a user selection of graphical elements of board view 13830, a user may interact with board view 13830 to add, retrieve, modify, browse, and/or share the process management data displayed therein as well as messaging related to the process management data.

FIGS. 94-100 illustrate an example graphical user interface 13900 for presenting a process management battery widget view according to an example implementation.

As similarly described above, battery widget 13920 may include a battery shaped graphical indicator 13918 divided into segments (graphical elements) 13922. Each segment 13922 may be a graphical representation of a status label. Battery widget 13920 further includes label key 13926 indicating the statuses represented by segments 13922. Battery widget 13920 may further include a configurable title 13924 describing the purpose of battery widget 13920 as defined by a user of PMS 13110.

In response to receiving a user selection of a configuration options graphical element 13930, GUI 13900 may present options for configuring battery widget 13920.

In response to selecting graphical element 13932, a user may choose the boards for inclusion in the representation of battery widget 13920. In response to selecting graphical element 13934 a user may choose the status type columns for inclusion in the representation of battery widget 13920. In some implementations, battery widget 13920 draws, aggregates and displays information from a single status column from a specific board. In some implementations, battery widget 13920 may draw, aggregate, and display information from a plurality of columns of a status column type from multiple boards.

As described above, in some implementations, the proportional size of a segment 13922 representing a specific status may be determined by dividing the total number of items in the chosen groups by the number of items in the chosen groups having the specific status. In some implementations, the proportional size of a segment 13922 representing a specific status may be determined by dividing the total number of items in the chosen groups by the number of items in the chosen groups having the specific status multiplied by a weighting factor such that statuses with a greater weighting are proportionally bigger. In response to selecting graphical element 13922, a user may define a weight of a status by associating the status with a number type column on the same board, as reflected in weighting section 13938.

In response to selecting a group chooser field 13940, a user may choose the groups for inclusion in the representation of battery widget 13920.

In some embodiments, the graphical indicator may be customizable with labels that differ from associated labels in the first table and the second table. Customization may include the addition, subtraction, or modification of existing data. The graphical indicator may be customized by a user, and may be further customized at a later time. The user may also disable customization after an initial customization according to user preferences. The labels may include text or graphical displays of information associated with an aspect of data such as a category. For example, a label may be associated with a category of a status column and may display the text of the different status categories or a color associated with each respective status category. While the labels may be retrieved from the first and second table forms into an aggregate table or graphical indicator, the user may be enabled to customize these labels according to user preference.

Figure 95:
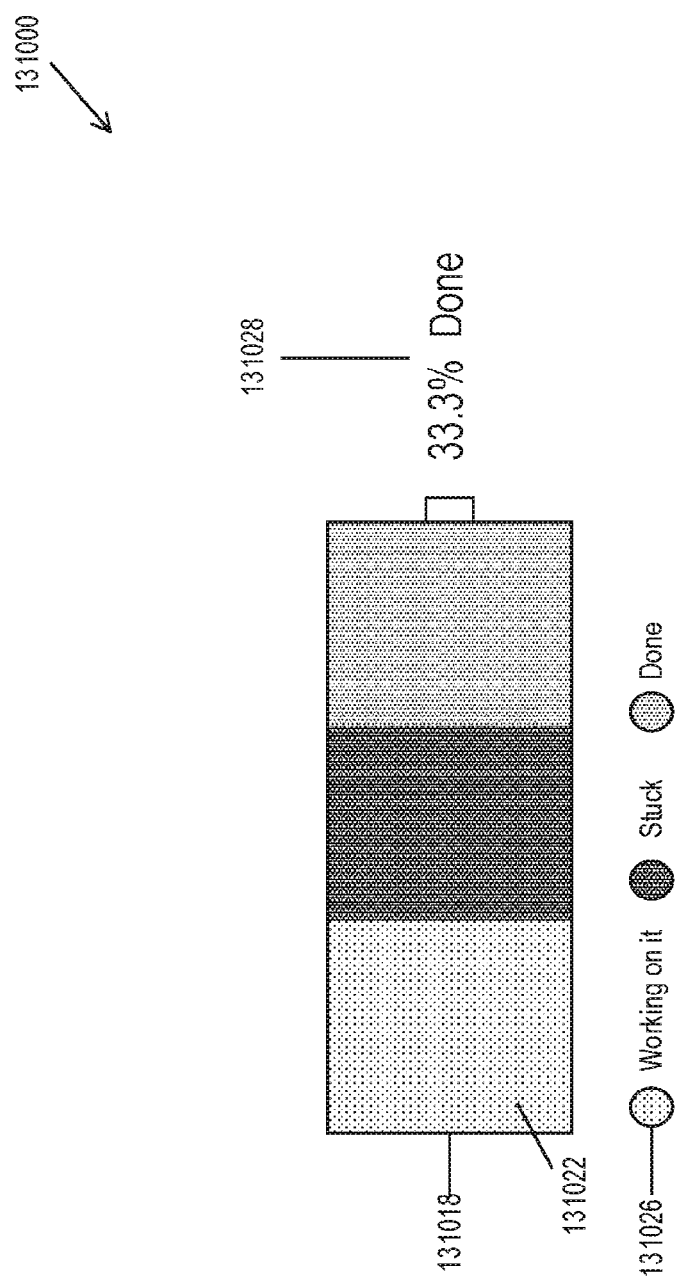

In some embodiments, the graphical indicator may include a configurable completion label and may include a configurable label key. A completion label may be a label category that specifies a percentage makeup of the category associated with the label. A label key may include a representation of all the label categories that may be included in the graphical indicator. "Configurable" as used herein may be synonymous with customizable as described above. For example, a graphical indicator containing status categories (e.g., "Done," "Stuck," "Working on it") may have a label key to represent each of the categories. The completion label may be representative of an associated label category such as "Done" to show the percentage make up of "Done" items in a table. Battery widget 13920 may also be customized in a number of other ways. In some implementations such as shown in FIG. 95, the order of segments 13922 of the battery graphical indicator 13918 may be rearranged from highest to lowest count of each status according to a user's preference.

Figure 96:
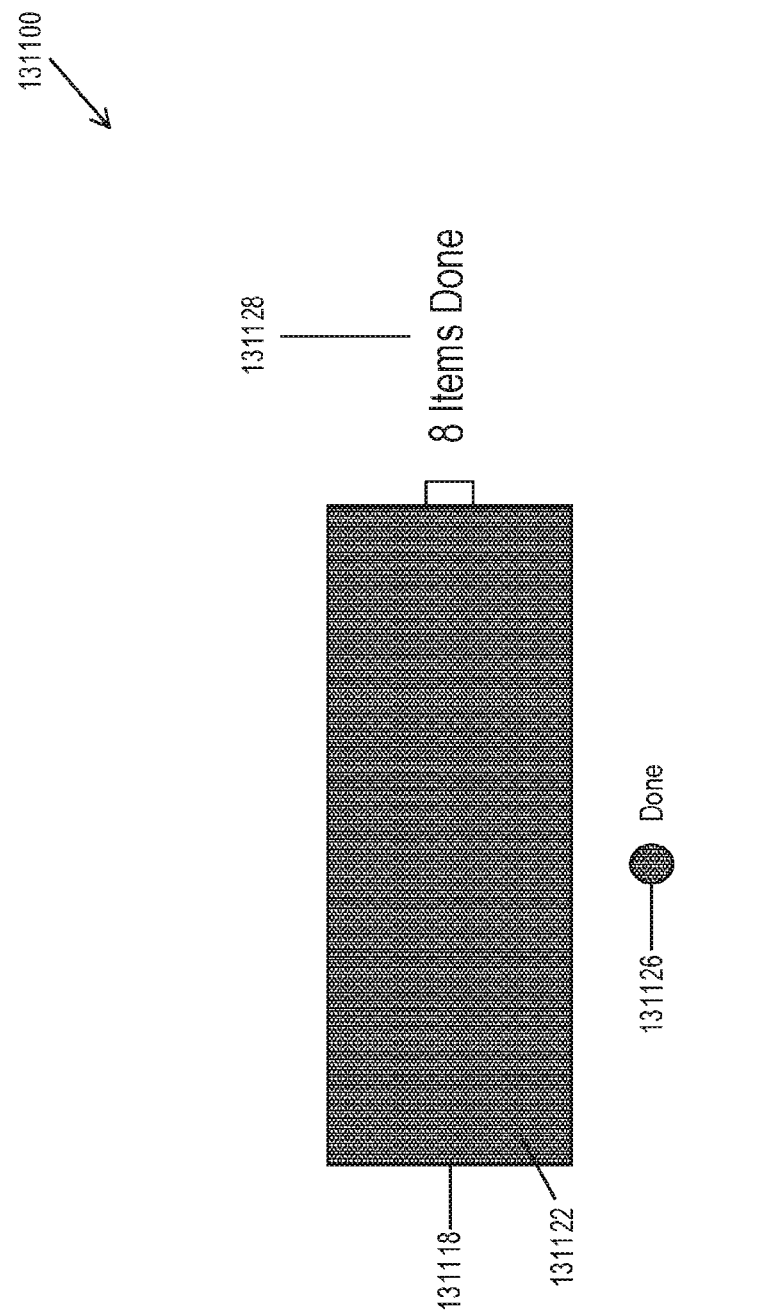
Figure 97:
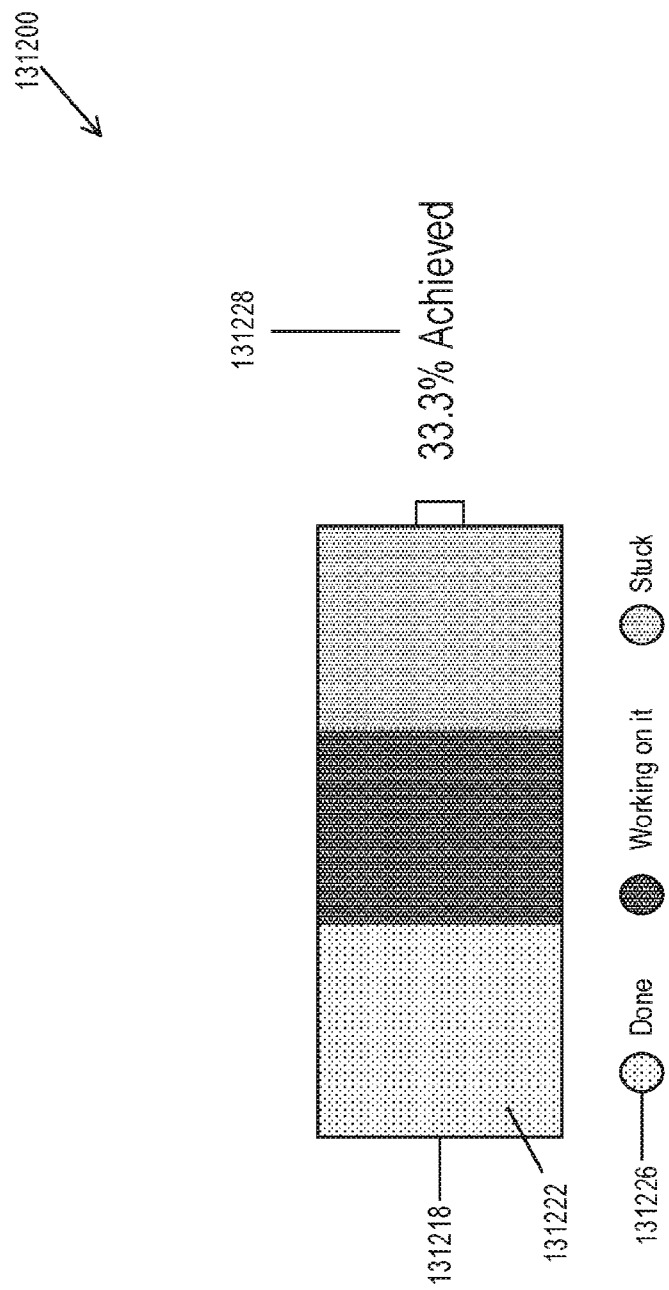
Figure 98:
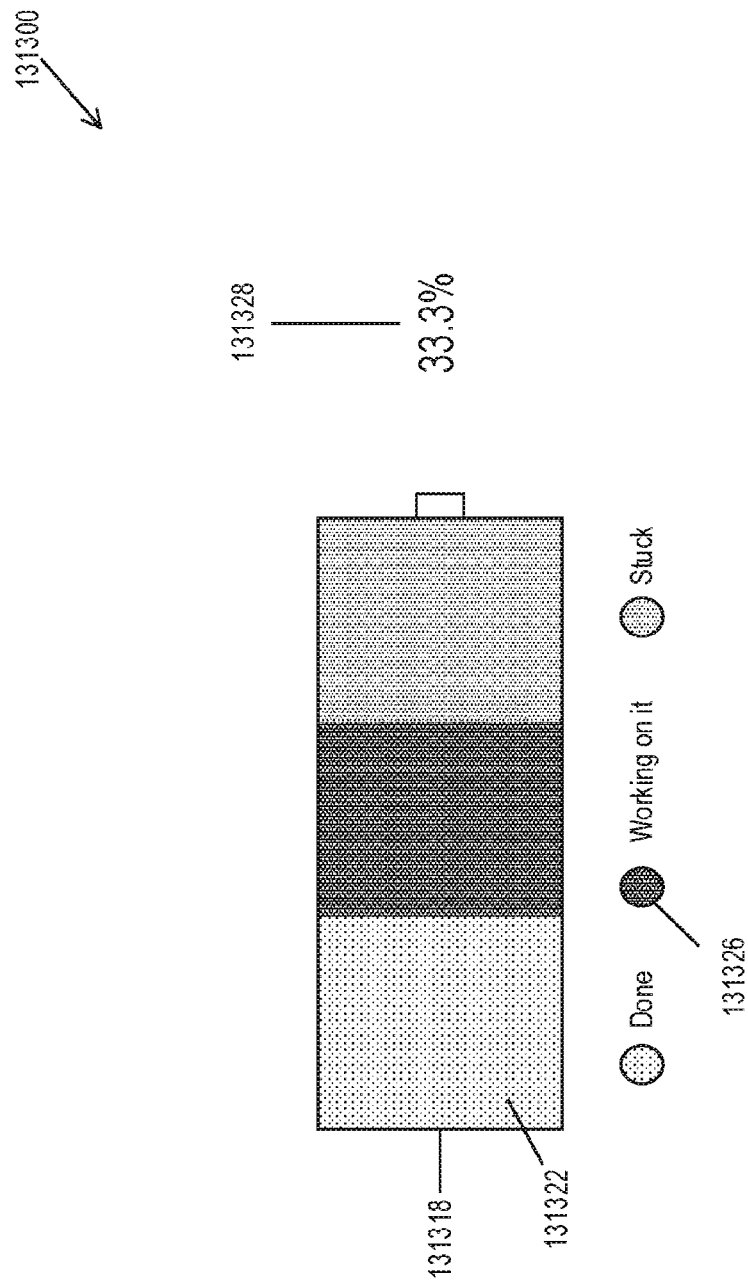

In response to selecting graphical element 13936, a user may change the name of completion label 13928. In some implementations, such as shown in FIG. 96 completion label 131128 may indicate a count of items of a specific status as opposed to a percentage. As illustrated in FIG. 97, completion label 131228 has been changed to a word "achieved" that is not the name of the respective status segment 131226. As illustrated in FIG. 98, completion label 131328 has been changed to show only a percentage with no following text.

Figure 99:
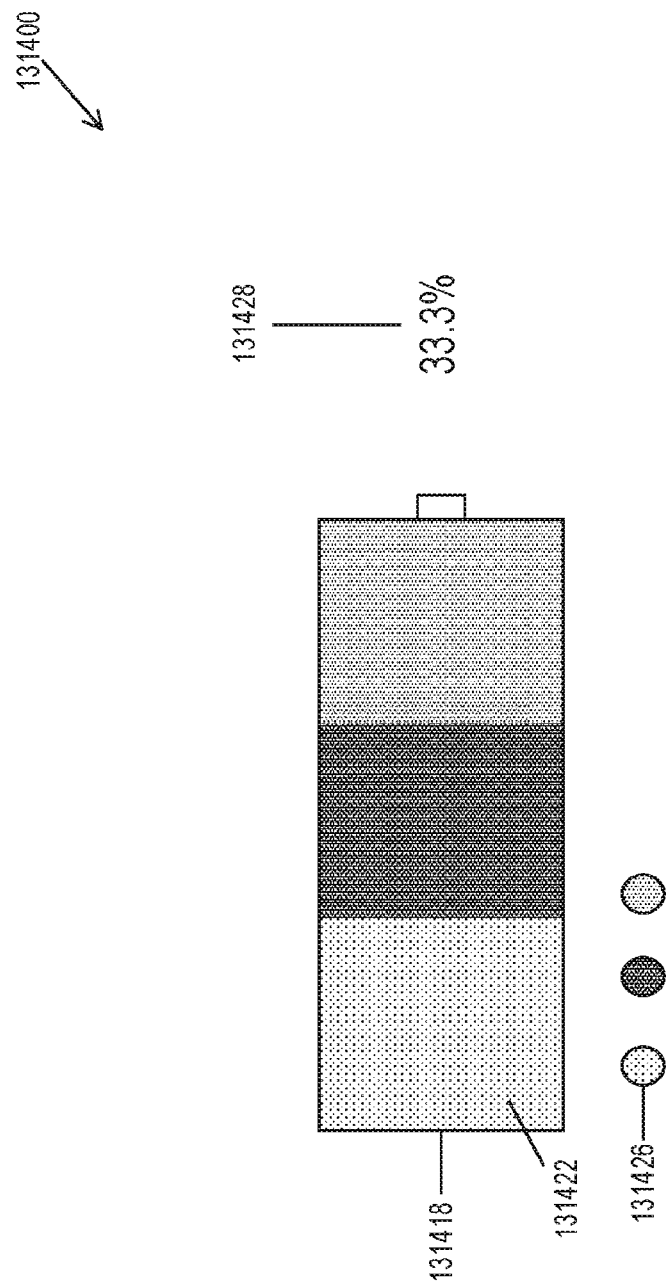
Figure 100:
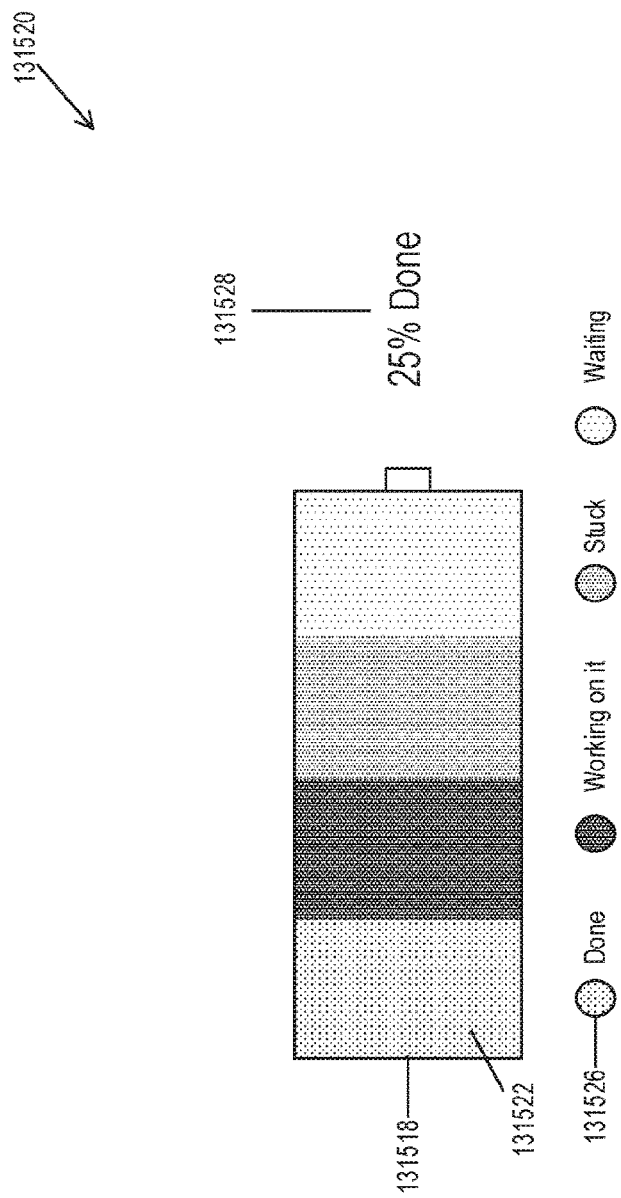

In some implementations, the format of label key 13926 may be customized. As shown in FIG. 99, label key 131426 may include only colored circles without any text. As shown in FIG. 100, label key 131526 may include text status labels.

Figure 101:
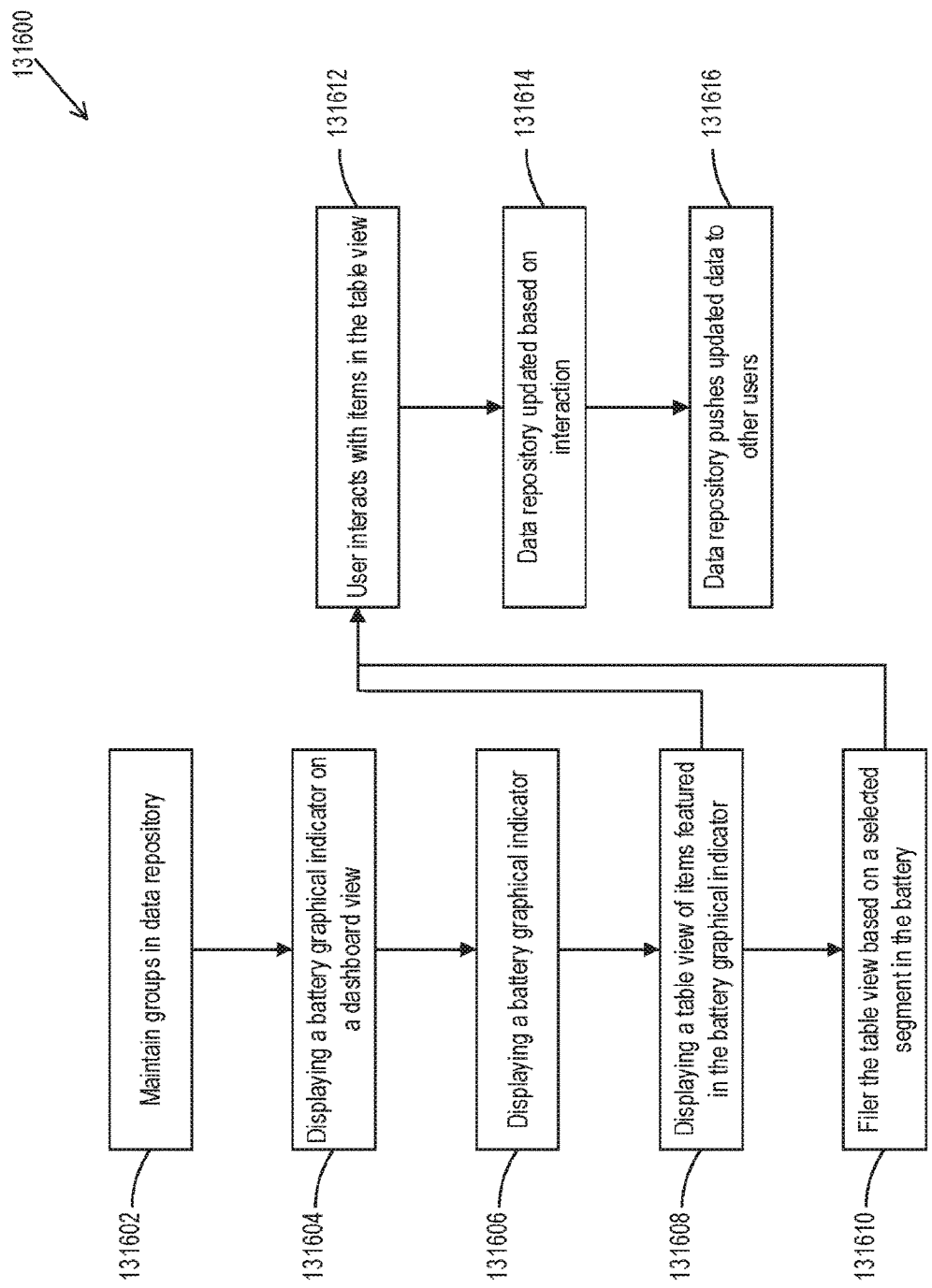
FIG. 101 is a diagram of an example process for displaying a battery widget in accordance with implementations described herein consistent with some embodiments of this disclosure.

FIG. 101 is a diagram of an example process for displaying a battery widget in accordance with implementations described herein. This process 131600 may for example be performed by system 13100 as described above. The steps below are described with reference to a computing device that performs operations described at each step. The computing device can correspond to a computing device corresponding to PMS 13110 and/or user device 13130.

At step 131602, a data repository maintains one or more groups of items, wherein each item of the one or more groups of items has an associated status label stored in a status column. As described above, multiple different status labels may be stored.

At step 131604, in response to a user selecting a dashboard view displaying in a GUI, a graphical indicator aggregates the associated status labels of the items in selected groups of items. At step 131606, in response to a user selecting a battery view, graphical indicator is displayed in the form of a battery aggregating the associated status labels of the items in selected groups of items.

As above, the graphical indicator includes multiple segments each graphically representing a proportion of each of the plurality of different status labels within a total number of associated status labels. In some implementations, the proportional representation of each status label is weighted by a number associated with each item.

At step 131608, displaying a table view of the selected groups of items and item associated columns for items whose status is included in the graphical indicator. At step 131610, in response to a user selecting one of the segments of the graphical indicator, filtering the table view to only include items with an associated status label that is the same as that of the selected segment.

At step 131612, a user interacts with the items in the table view, including one or more of adding items, modifying items, browsing the table view, or sharing item or table data. At step 131614, the related process management data of the items that were added or modified in the data repository is updated. At step 131616, the data repository pushes the updated process management data to users that are interacting with the same process management data.

Aspects of the present disclosure describes technological improvements in devices, systems, methods, and computer readable media for process management platforms that may allow a user to manage location-related items in real time.

Figure 104A:
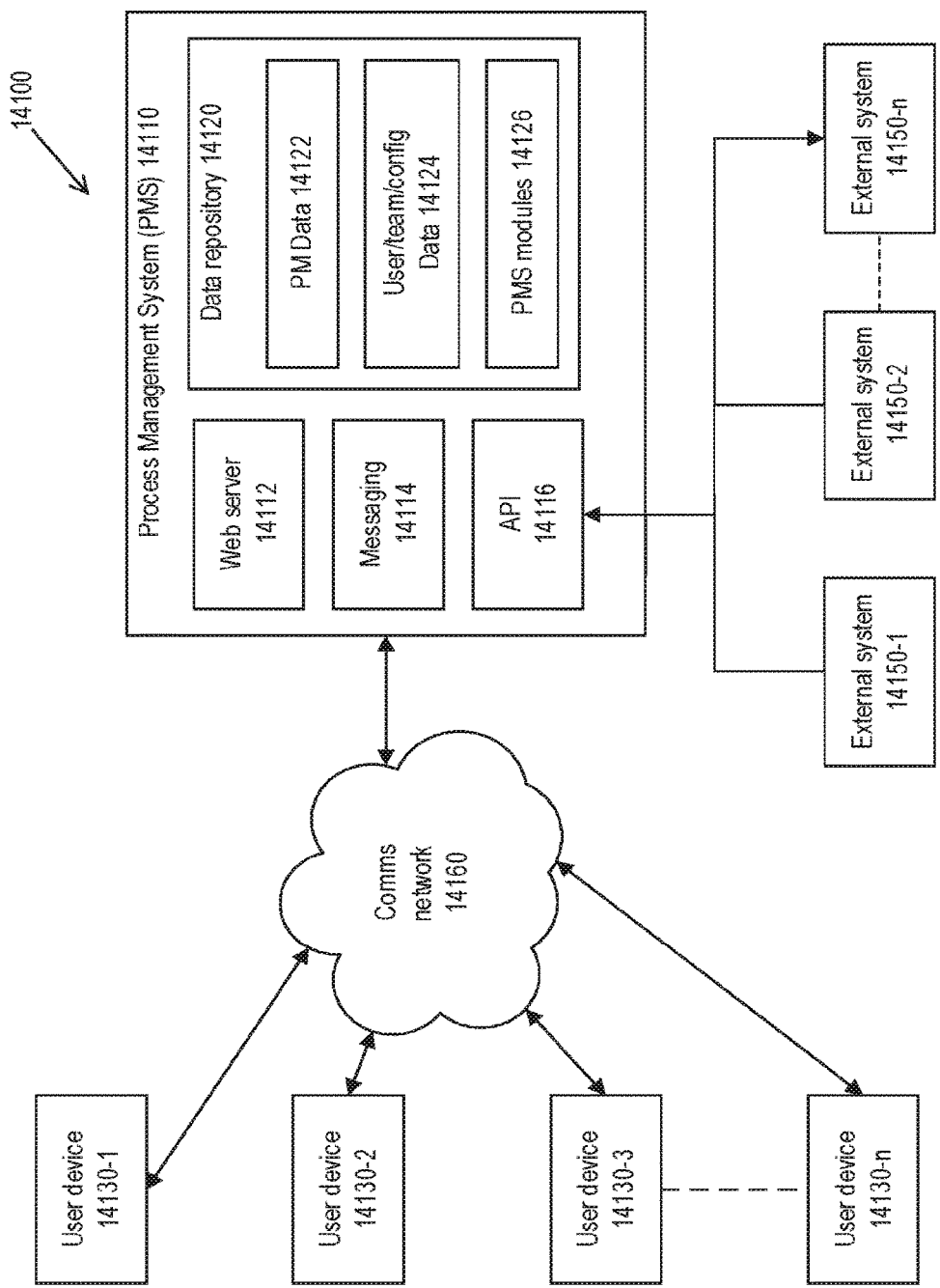
FIG. 104A is a high level network diagram of an exemplary system for process management consistent with some embodiments of this disclosure.

FIG. 104A illustrates a network 14100 for process management according to an example implementation. In system 14100, users interact with process management system 14110 using user devices 14130-1, 14130-2, 14130-3 to 14130-*n* through communications network 14130 using wired or wireless communication. Communications network 14160 may include a wide variety of network configurations and protocols that facilitate the intercommunication of computing devices. For example, each of the components of system 14100 in FIG. 104 can be implemented in a localized or distributed fashion in a network.

Process management system (PMS) 14110 is referred to herein as a "process" management system but it should be appreciated that PMS 14110 may be used for management of projects, schedules, effort, pricing, risk, inventory, and assets and the term process should not be considered limiting.

PMS 14110 and the modules and components that are included in PMS 14110 can run on a single computing device (e.g., a server) or multiple computing devices (e.g., multiple servers) that are configured to perform the functions and/or operations necessary to provide the functionality described herein. While PMS 14110 is presented herein with specific components and modules, it should be understood by one skilled in the art, that the architectural configuration of system 14100 as shown is simply one possible configuration and that other configurations with more or fewer components are possible.

User devices 14130 can be of varying type, capabilities, operating systems, etc. For example, user devices 14130 may include PCs, tablets, mobile phones, laptops, virtual reality or augmented reality glasses or other wearables, holographic interfaces, or any other mechanism that allows for user interaction with the platform. Furthermore, PMS 14110 can concurrently accept connections from and interact with multiple user devices 14130. A single user may interact with PMS 14110 using multiple different user devices 14130.

PMS 14110 may include a data repository 14120. Although data repository 14120 is shown as a single entity, in practice data repository 14120 may include one or more databases. Data repository stores process management data 14122, user/team profile and configuration data 14124, and PMS software modules 14126. Other data required for the functioning of PMS 14110 may also be stored in data repository 14120. Users may interact with the process management data 14122 stored in data repository 14120 through user devices 14130. As used herein, the term "interaction" may include but is not limited to adding, retrieving, modifying, browsing, and/or sharing process management data 14122 as well as messaging related to process management data 14122.

In some implementations, users may be grouped into teams or organizations as indicated in the user profile data (a/k/a User/team/config/data) 14124. User profile data 14124 may include but is not limited to username, contact information, team assignments and so forth. User profile data 14124 may also include organization/team profile data. User profile data may further include per-user and/or per-team configuration data for operation of PMS modules 14126 on user devices 14130.

PMS 14110 may include a web server 14112 to support connections from a variety of different user devices 14130, such as: desktop computers; mobile computers; mobile communications devices, e.g., mobile phones, smartphones, tablets; and/or any other network enabled computing devices.

Figure 104C:
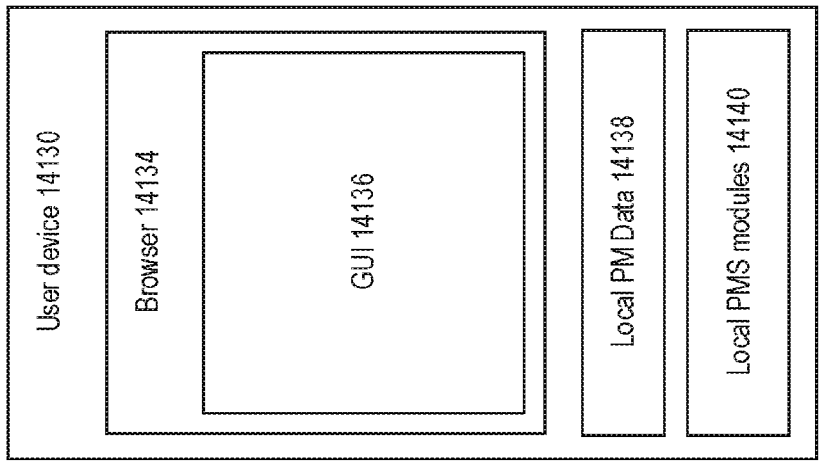
FIGS. 104B-104C are block diagrams of user device implementations consistent with some embodiments of the present disclosure.
Figure 104B:
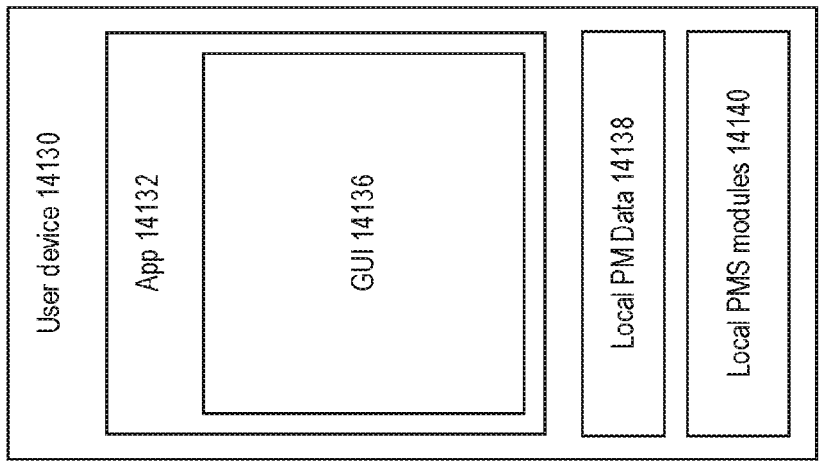

In some embodiments, such as shown in FIG. 104B, a user using user device 14130 can interact with PMS 14110 via a PMS application (app) 14132 installed on user device 14130. App 14132 may be a stand-alone application, one or more application plug-ins, and/or a browser extension.

In some implementations, such as shown in FIG. 104C, a user device 14130 can interact with PMS 14110 via a third-party application, such as a web browser 14134 running on user device 14130. For example, the user can navigate in web browser 14134 to a web address provided by PMS 14110 for interacting with PMS 14110. It should be appreciated that some devices 14130 may support both of an app 14132 and a web browser 14134. FIGS. 104B and 104C show separate implantations for simplicity.

In some embodiments, PMS 14110 may provide for user interaction by using a web application model. Although a web application model is described herein, it should be appreciated that other application architectures may be suitable. In response to an interaction by a user using an app 14132 or browser 14134, the app 14132 or browser 14134 may request data from web server 14112 and may be provided with one or more webpage structures (not shown), subsets of process management (PM) data 14122, herein referred to as local PM data 14138, and relevant PMS modules 14126, herein referred to as local PMS modules 14140. PMS software modules 14126 may define web application functionality of system 14100 and may be downloaded to user devices 14130 where they may be run as local PMS modules 14140 by app 14132 or browser 14134 to enable interaction with process management data 14122 and local process management data 14138.

Either of app 14132 or browser 14134 may provide a graphical user interface (GUI) 14136 for the user to interact with PMS 14110. GUI 14136 may also be referred to herein as a "common visualization". References herein to a GUI 14136 and to views of GUI 14136 should be understood as referring to the GUI 14136 generated by app 14132 or browser 14134 based on the webpage structure of the visited webpage, relevant local PMS modules 14140 and local PM data 14138 as provided by web server 14112 and read from data repository 14120. Each PMS module 14126 may provide functionality for different interactive parts of GUI 14136. The map view as described below is a non-limiting example of a PMS module 14126, 14140 with specific functionality, GUI 14136, and configuration data 14124. Interaction with GUI 14136 may include viewing, or selecting graphical elements using the interface hardware of user devices 14130 including but not limited to a touchscreen, 2D or 3D display, mouse, keyboard and so forth.

In some implementations, updates of local PMS modules 14140 may happen each time the relevant web page of PMS 14110 is visited. In some implementations, changes made to PM data 14122 that affect local PM data 14138 may be pushed by PMS 14110 to app 14132 or browser 14134 of all users making use of the same local PM data 14138 following the changes. Thus GUI 14136 reflects updated local PM data 14138 that is the same as the relevant PM data 14122. In some implementations, users may define configurations for specific local PMS modules 14140. Configuration data 14124 is stored in data repository 14120. Configuration data 14124 may therefore be retrieved by local PMS modules 14140 for every session ensuring a consistent user experience.

PM data 14122 may be stored in linked data structures in data repository 14120. The PM data in these linked data structures may include but is not limited to items, columns, groups, boards, and workspaces. Local PM data 14138 may be stored in linked data structures on user device 14130.

Items as defined herein may be the basic PM data elements that may be tracked as part of a process in PMS 14110. Non-limiting examples of items include tasks, assets, inventory, clients, sales leads, employees, and so forth. In some implementations, items may include sub-items.

Columns as defined herein describe an aspect of an item and/or sub-item represented as a column value. Each column and thus column value may be of a single data type or a combination of data types, such as numeric values only, characters only, alphanumeric values only, graphic elements only, a closed list of elements, particular formatting, values within a specified range only, and so forth. Non-limiting examples of column types may include: related user/s, related resource/s, related team/s, country, geographical location, status, resource unit, priority, timeline (start and/or end dates), date, cost, pricing, text, number, rating, time zone, checkbox, URLs, item series number, location, vote box, week, progress bar, contact details, item ID, color indicator, last updated, time tracking, related data file, tags (a label, a numeric value, a title, a name, a combination thereof, and so on, used to easily identify a descriptive quality of an item), and so forth.

Groups as defined herein may be user-defined groupings of one or more items. In non-limiting examples, items may be grouped together by a user where they share a common project, process, work period, owner, status, and so forth. In some implementations, groups are displayed in GUI 14136 as tables with items as rows and columns as columns. In some implementations, PMS 14110 maintains items and columns in a table data structure.

Boards may be user-defined collections of one or more groups. In non-limiting examples, groups may be grouped together in a board by a user where they share a common project, process, work period, owner, and so forth. Boards may include a structure with horizontal and vertical rows where the intersection of these rows may define cells that may be configured to contain information. Workspaces may be user-defined collections of boards.

In some implementations, process management data 14122 may further include messaging between users related to one or more of items, projects, boards, and/or workspaces. In some implementations, process management data 14122 may further includes documents, audio files, video files, and so forth that may be associated with an item, group and/or board.

In some implementations, PMS 14110 may include a messaging module 14114 for sending messages to users over common messaging formats and/or for providing a messaging interface via a corresponding local PMS module 14140 on GUI 14136 for messaging related to items, groups, boards and/or workspaces.

In some implementations, PMS 14110 may include an application programming interface (API) 14116 for interfacing with various external services and systems 14150-1, 14150-2, to 14150-*n*.

In some implementations, PMS 14110 may include an authenticator module (not shown), which can verify user credentials, security tokens, API calls, specific user devices, and so forth, to ensure only authorized users and users can access PMS 14110.

In some implementations, PMS 14110 may include a sharing module (not shown) for managing sharing of process management data publicly or privately. For example, the sharing module may be a permission settings module that can grant or restrict permissions to specific cells, rows, boards, dashboards, widgets, or any other structure. The sharing can be performed in a platform agnostic manner. That is, the content can be shared across multiple user devices 14130 of varying type, capabilities, operating systems, etc.

Aspects of this disclosure may provide a technical solution to the challenging technical problem of project management and may relate to a system for altering tablature via geographical interfaces with the system having at least one processor (e.g., processor, processing circuit or other processing structure described herein) in collaborative work systems, including methods, systems, devices, and computer-readable media. For ease of discussion, example methods are described below with the understanding that aspects of the example methods apply equally to systems, devices, and computer-readable media. For example, some aspects of such methods may be implemented by a computing device or software running thereon. The computing device may include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Tablature as used herein refers to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays. Altering tablature displays, as used herein, may refer to any procedure or process of changing a visual presentation form of a display of a table in a collaborative work system. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element. Geographical interfaces may include any 2D or 3D interface associated with physical features of an area, such as a visual representation of Earth, a continent, a country, a city, a facility or any other location or combinations of locations. For example, a geographical interface may be a 2D map of a country that may be interactive to cause the geographical interface to display different information.

Consistent with disclosed embodiments, at least one processor of the system may carry out operations that may involve outputting a first signal for rendering a display of a table. The display of the table may include a presentation of a plurality of items, a plurality of columns, and a plurality of values in cells at intersections of items and columns. The table may include information from a single board or may include information from multiple boards. Such information may include geographic location data from a single or multiple boards or sub-boards. For example, the table may aggregate all or some items from a first user's board and a second user's board. In some embodiments, the table may aggregate information from a first user's board and an associated sub-board of the first user. In another example, the table may aggregate information from a first user's board and a second user's sub-board. The table may aggregate information from any number of boards, sub-boards, columns, cells, or a combination thereof, consistent with this disclosure. Outputting a signal may involve transmitting a signal via a processor, such that the signal is configured to cause a table to be rendered on a display. A signal may be any signal that may cause any action within the collaborative work system. The first signal may cause a display of a table to render, but other signals described herein may cause different actions. Rendering in this context refers to transforming code into visual representations for display. For example, a table may be displayed on a screen of a computing device as described herein. Items may be defined by a horizontal or vertical row. A horizontal row may be viewed as a range of cells, nodes, or any other defined length of data types that fully or partially extends across the table. A horizontal row may be referred to as an item row herein. A column may be a vertical row and may be viewed as a range of cells, nodes, or any other defined length of data types that extends transverse to the direction of a row in a table. Items may include any information that may be defined by a user of a table based on the user's preferences and needs. In many implementations, it may be most logical to present items horizontally, and characteristics of the items (such as status, responsible person, due date, etc.) in vertical or otherwise transverse rows (e.g., columns). However, such a format is a matter of aesthetic design and both alternatives are within the scope of this disclosure. An item may contain a task, a client identification, an opportunity, time, date, status information, or any other type of data that defines or provides additional information about an item, as defined by transverse rows. An intersection of a vertical row (e.g., a column) and a horizontal row (e.g., an item) may define a cell that may contain at least a value. Values may be any data input such as alphanumerics, graphics, or a combination thereof that may be set by default or customized by a user.

The system may receive a plurality of values from the cells of a table and cause the plurality of values to be maintained in a data structure. Receiving values from cells may involve receiving inputs from a user through a user interface (e.g., a pop-up window, a webpage, a drop-down menu, keyboard, gesture, or any other data entry). A data structure may involve any data organization stored in memory on a local computing device or in any repository. Memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data.

In some embodiments, one of the columns may be configured to retain geographic location values, where each item may have an associated geographic location value. Geographic location values may include any value associated with a geographic location. For example, geographical location values may include at least one of a street address, map coordinates, or a name or designation of a city, a country, a region, or a facility. While some embodiments may include a manual entry of geographical location values, other exemplary embodiments may involve geographical location values based on user-specific information obtained from devices associated with individuals. For example, user-specific information may include GPS coordinates obtained from the devices associated with individuals, vehicles, or other movable objects (collectively, objects) associated with items. The system may be configured to communicate with the objects associated with such individuals to receive periodic updates of the GPS coordinates, and to update, in the data structure, corresponding geographical location values. The updates may be based on a period set as a default or set by user preference. In other embodiments, the periodic updates may be frequent and may also be updated continuously. In addition to people and vehicles, other examples of objects may include packages, moveable equipment, or other movable resources. While the location information may be based on GPS signals, they may also be based on any signal that provides location information. For example, a delivery person might scan a package when it is loaded onto a delivery vehicle and again when it is delivered. The scans may be transmitted in a manner permitting the location information in tablature to be updated. As another example, medical equipment in hospitals (blood pumps, ventilators, etc.) may be tagged with RFID, WiFi or other location chips, and when the equipment enters a room, its location can be ascertained and used to update location information in tablature. Indeed, location information may be received via the Internet of Things, such that locations of the even smallest moveable objects may be tracked and updated in tablature. The foregoing are just a few examples and it is to be understood that any type of location monitoring technology transmitted in any way may be used to monitor the location of any object whose location may be updated in tablature.

A subgroup of the items may share a common geographic location value that may differ from geographic location values of others of the plurality of items. A subgroup of the items may include any number less than or equal to all of the items available in a table. A common geographic location value may involve determining a shared aspect of a geographic location value, such as a street, city, state, country, continent, or an identical geographic location value. For example, a common geographic location value may include all geographic location values that share a common city in its address. While the system may make a determination of a common geographic location value, this determination may also be made manually by a user such as through a filter. A common geographic location value may compare similar forms of geographic location values (e.g., an address, GPS coordinates, a city and country) and may compare geographic location values with different forms (e.g., identify a shared country based on an address in one value and a GPS coordinate in another value). Some of the plurality of items may be associated with differing individuals in differing locations. The locations may be obtained manually or through updates from an associated device as described above.

In some embodiments, the system may output a second signal to render a common map, including markers associated with the geographically dispersed items. The system may enable an interaction with the common map in order to receive a selection of a specific marker associated with a geographical location of the subgroup. A second signal may be output via a processor to render a common map consistent with the description above. A common map may be any electronic 2D, 3D, or holographic representation of a map of geographic location as discussed previously. The common map may include markers associated with geographically dispersed items in a table. In some embodiments, the items in a table may be associated with different geographic location values and may be said to be geographically dispersed. The markers may include any visual representation such as a graphical icon, alphanumeric text, or a combination thereof. The markers may be static or may be displayed dynamically, such as through motion or an animation. A marker representing an item may be located on the common map corresponding to a geographic location value associated with the item. The common map may be enabled to be interactive through a user interface to cause an action in response to receiving an interaction. An interaction may be any user selection action such as a cursor selection, a hand gesture, a selection via eye tracking, a keystroke, a cursor hover, or any other interaction with an interface. In exemplary embodiments, markers on a common map may be interactive such that selection of a specific marker may cause additional information to display. In some embodiments, the second signal may be configured to cause on the common map, a consolidated cluster marker, grouping together a series of markers associated with locations proximate each other. In this example, if multiple items share a common geographic location value, a common cluster marker corresponding to that geographic location value may represent the subgroup of items that share the geographic location value. Alternatively, any other visual indication may be used to indicate that the marker represents multiple items. The cluster marker may also represent items with geographic locations proximate to each other (e.g., locations in the same city, same general area, or any other area) and may be determined by a scale of the common map. For example, when a common map containing a cluster marker is zoomed in on the cluster marker, the cluster marker may separate into multiple markers as the scale of the common map becomes big enough to separate the cluster marker.

In response to receiving a selection of a specific marker, the system may output a third signal to render the additional information in a manner such as described previously. The third signal may cause the system to render in a common view, column values associated with a plurality of items of a subgroup. The common view may be any visual display that may be interactive to allow a user to view information and modify the information. For example, the common view may appear as a module, a prompt over a pre-existing information, an additional display sharing a common view with pre-existing information, or any other display of information. The common view may include a display of data from an associated table with items, such as values from at least one column associated with particular items. In an example embodiment, a common map may include multiple markers, each corresponding to different items in a table. In response to an interaction (e.g., a cursor selection) with a particular marker, additional information regarding the associated item may appear in a common view. Column values may include any value contained in a cell corresponding to a particular item. In one example, the common view may display all column values associated with an item. In another example, the marker may be a cluster marker as described above. In this example, the cluster marker may be associated with a plurality of items forming a subgroup of items of an associated table. In response to an interaction with the cluster marker, additional information regarding each of the associated items may appear in the common view. In each of the examples described above, the common view may enable a user to modify values associated with each item to directly make the same modifications to the table, as is discussed in more detail below. The system may also be configured to enable automated sequential viewing of items in the subgroup. Automated sequential viewing may involve the system automatically creating a logical order of display of items according to an attribute of the items, such as a due date, a priority, responsible person, or any other attribute associated with the items. For example, the system may render a common view of items associated with a cluster marker and sequentially display the items according to due date (e.g., an item due next in a subgroup may be displayed first on a list and an item with the latest deadline in the subgroup may be displayed last on the list).

The system may receive a fourth signal from a user of the common view, the signal being configured to update a column value for a particular item, and store the updated column value in the data structure. When an update is made to a column value (e.g., through an interaction with a common view), a fourth signal may be received to store the update column value in the data structure as described above. The system may also receive a fifth signal to re-render the table and output, in response to the fifth signal, a sixth signal to cause a re-rendering of the table, where the sixth signal may include the updated value for the particular item. The fifth signal may be received as a result of storing an updated column value or any other value associated with an item as described above. The fifth signal may provide an indication that an update has been made to the table in the data structure. As a result, the system may output a sixth signal to re-render the table so that the update to the column value or any value associated with an item is reflected in the display of the table on any display as described above.

Figure 105:
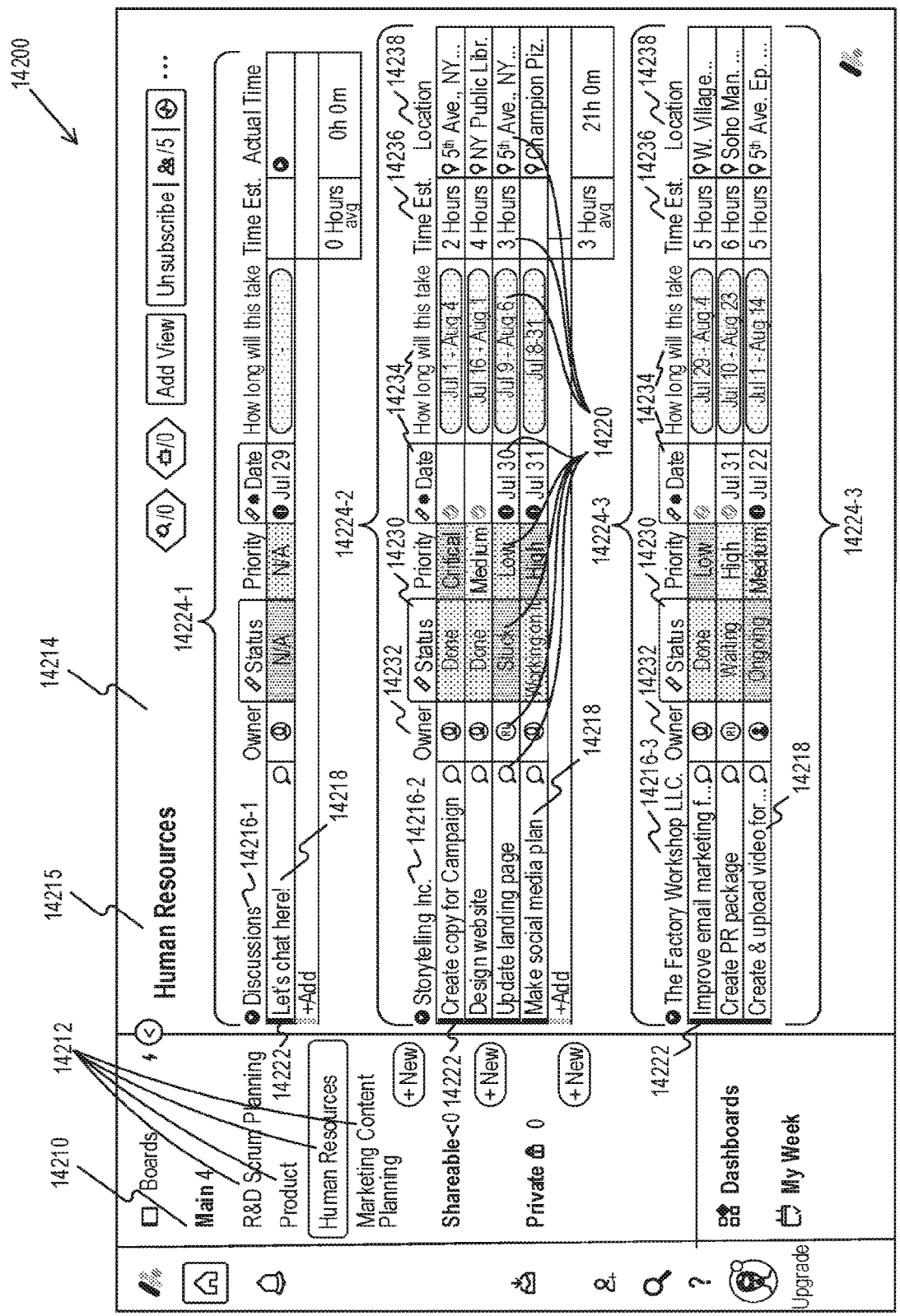

FIG. 105 illustrates an example graphical user interface 14200 for presenting a process management board view according to an example implementation. For example, app 14132 or browser 14134 can generate GUI 14200 for display on user device 14130 in response to the user selecting a board view 14214. GUI 14200 includes local process management data 14138 retrieved from data repository 14120 including user-defined items, columns, groups, boards, and workspaces.

In some implementations, board view 14214 may include multiple items 14218 shown as rows 14222 grouped into groups 14216-1, 14216-2 and 14216-3. Board view 14214 may further include each item 14218 further described by PM data 14122 in multiple columns 14220. The PM data 14122 associated with each item 14218 is also referred to herein as column values. As shown, in some implementations, columns 14220 may include a status type column 14230. In status type columns the column value is a status label associated with items 14218.

As shown, in some implementations, columns 14220 may include a resource column 14232 where the column value indicates one or more resources that are associated with an item 14218. In some implementations, users may define more than one resource column for associating different kinds of resources with an item 14218. Non-limiting examples of resources include individuals (users, employees, team members, contractors, and so forth), assets (vehicles, property, meeting rooms, factory machines, function venue tables, hand tools, and so forth), countries, and/or organizations.

Further, in some implementations, columns 14220 may include a date column and/or or timeline column 14234 where the column value indicates the period wherein the item is to be processed by the resource/s. These date columns and/or or timeline columns 14234 are referred to herein as "resource period" columns 14234.

Further, in some implementations, columns 14220 may include one or more resource unit columns 14236 where the column value provides a numerical measure of the utilization of the resource needed for processing an item 14218. Non-limiting examples of resource units include, time measures, task measures, volume measures, distance measures or object measures.

Further, in some implementations, columns 14220 may include one or more geographical location type columns 14238 where the column value may be a geographical location indication. Non-limiting examples of geographical location indications include at least one of a street address, map coordinates, a city, a country, a region, or a facility. In some implementations, a geographical location indication may be entered into column 14238 by users. In some embodiments, a geographical location indication may include user-specific information obtained from mobile user devices 14130. In some implementations, the user-specific information may include GPS coordinates obtained from the mobile user devices 14130.

In some implementations, board view 14214 may present rows 14222 of items 14218 intersecting with columns 14220 to form tables 14224-1, 14224-2 and 14224-3. Each of groups 14216 is thus shown as a table 14224. Groups 14216-1, 14216-2 and 14216-3 are collectively part of board 14215. As shown, board 14215 is one of a collection of boards 14212 that form a workspace 14210. The number of items, columns, groups, boards, and workspaces shown in FIG. 105 is illustrative and should not be considered limiting.

In response to receiving a user selection of the graphical elements of board view 14214, a user may interact with board view 14214 to add, retrieve, modify, browse, and/or share the process management data as well as messaging related to the process management data. Non-limiting examples of user interaction performed by selection of graphical elements include adding new process management data, adding or deleting items, modifying the names of items, columns, groups, boards, and workspaces, adding or modifying column values, moving items between groups, selecting views, and so forth.

Board view 14214 may be one way to view and manage process management data and in some implementations, a user may utilize different views provided by GUI 14136 for adding, retrieving, modifying, browsing, and/or sharing process management data.

FIG. 106A illustrates an example graphical user interface 14300 for presenting a process management board view according to an example implementation. For example, app 14132 or browser 14134 can present GUI 14300 on a display of user device 14130 in response to the user selecting a board view 14310. GUI 14300 includes local process management data 14138 retrieved from data repository 14120 including user-defined items, columns, and groups.

In some implementations, board view 14310 may present a board 14311 including one or more groups 14313. Groups 14313 include multiple items 14312-1 to 14312-*n* shown as rows. Board view 14310 may further include each item 14312 further described by user-defined PM data 14122 in column values of multiple columns. As shown, in some implementations, columns may include:

- a status type column 14314, where the column values are status labels associated with items 14312;
- a resource type column 14316, where the column values are human resource icons corresponding to human resources allocated to items 14312;
- a geographical location type column 14318, where the column values are geographical location indications 14318-1 to 14318-*n*.
- a number type column 14320, where the column values are number values associated with each item 14312;
- a file type column 14322, where the column values are image files associated with each item 14312.

Figure 106B:
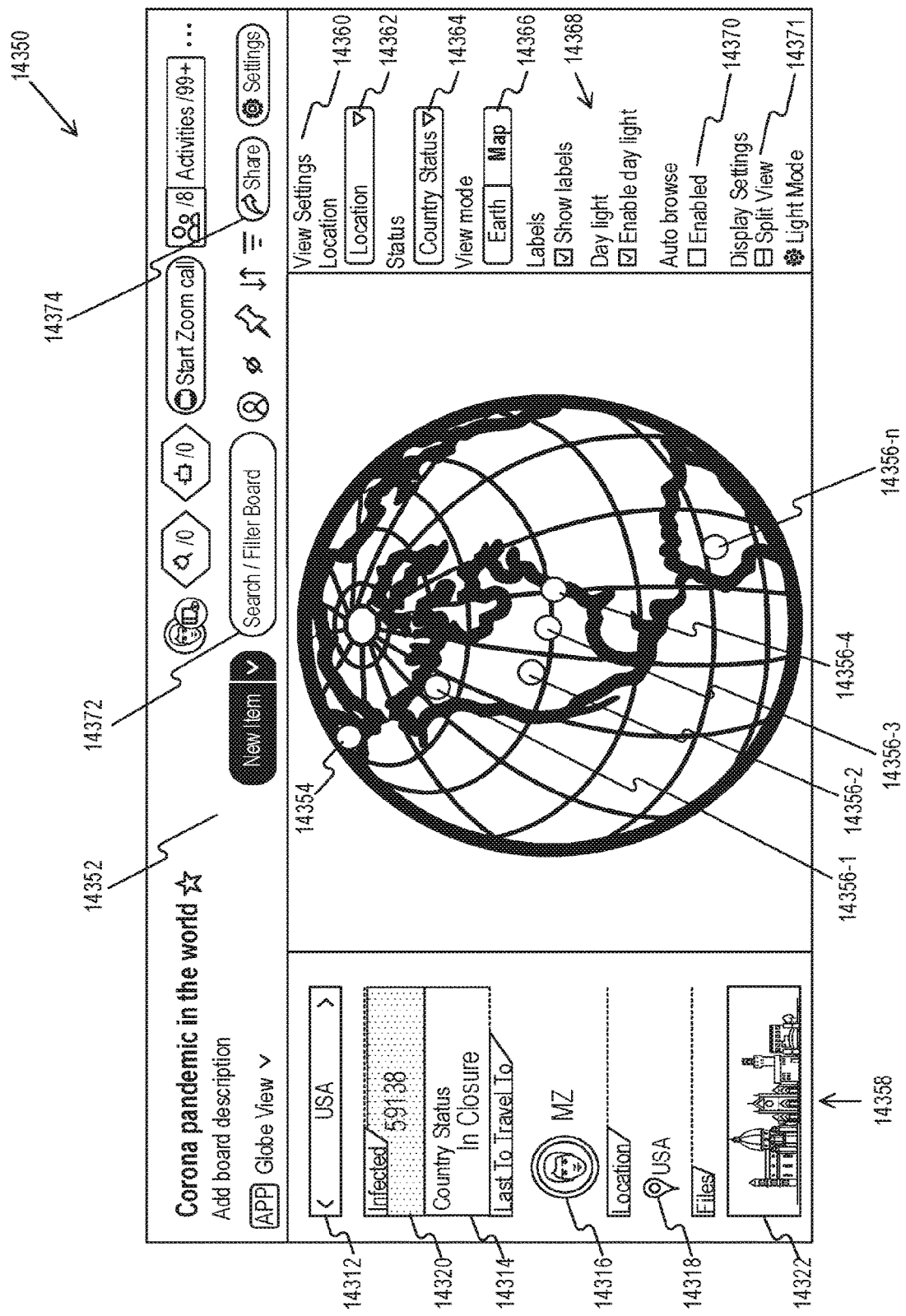

FIG. 106B illustrates an example graphical user interface 14350 for presenting a map view according to an example implementation. For example, app 14132 or browser 14134 can present GUI 14350 on a display of user device 14130 in response to the user selecting a map view 14352. Alternatively, app 14132 or browser 14134 can present GUI 14350 on a display of user device 14130 in response to the user selecting a map widget view 14352 selected from a dashboard view (not shown). GUI 14350 may be generated based on user-selected local process management data such as board 14311. Items 14312 selected for visualization in map view 14352 may be from one group (such as group 14313) or from multiple groups on a single board or from multiple groups from multiple boards. In some implementations, the groups are maintained by a of different users.

Map view 14352 provides visualization of the geographical location indications 14318 associated with items 14312. In some implementations, map view 14352 may provide a view based on a street map (such as FIG. 107A described below). In some implementations, map view 14352 may provide a view based on an Earth globe 14354 or any other 3D map as shown in FIG. 106B.

In map view 14352 the geographical location indications 14318 associated with items 14312 may be displayed on a common map as markers 14356, here shown as markers 14356-1 to 14356-*n*. In some implementations, where a subgroup of items share a common geographical location indication 14318, markers 14356 may be sized according to the number of occurrences of the geographical location indications in the subgroup. In some implementations, markers 14356 may be sized based on the relative numeric value in a number type column of the items associated with the geographical location indications. In some implementations, markers 14356 may have the color of the status column 14314 of item 14312 associated with the selected geographical location indication 14318.

It should thus be appreciated that map view 14352 may provide a quick graphical map overview of the locations and relative locations of the items that are part of the process management. It should further be appreciated that the map view 14352 is part of the PMS 14110 and is therefore continually updated with the same underlying PM data 14122.

In some implementations, a user may interact with map view 14352, such as by selecting a specific marker 14356 associated with a geographical location indication or geographical location indication subgroup. Upon selecting the specific marker 14356 (here, 14356-3 is selected), an item listing 14358 is displayed including column values (such as columns, 14314, 14316, 14318, 14320, 14322) of item 14312 associated with the selected geographical location indication 14318. In some implementations, the displayed column values in item listing 14358 may be modified directly in map view 14352. It should be appreciated that changes made to the PM data 14122 from the map view 14352 are reflected in all other views of the PM data 14122 without the need for data exports and imports thus simplifying process management for items with a location component.

Further user interaction is required for defining the view settings 14360 of map view 14352. In some implementations, view settings 14360 may include:

- Board/group selection (not shown): a choice of one or more of the boards and groups accessible to the user such as board 14311 that may be visualized in map view 14352;
- Location column selection 14362: a choice of one of the location type columns from the selected board/s such as location column 14318 (here shown as selected);
- Status column selection 14364: a choice of one of the status type columns from the selected board/s such as status column 14314 (here shown as selected). As described above, in some implementations, markers 14356 may be colored with the color of an associated status value in status column 14314;
- View mode selection 14366: As above, map view 14360 may provide a view based on a street map (such as FIG. 107A described below) or map view 14352 may provide a view based on an Earth globe 14354 as shown here;
- Display settings 14368: Further display settings are shown here in the illustrative GUI 14350 including: label show selection for selecting display of the geographical location indication of column 14318 next to markers 14356, day/light view for showing current day/night status on the globe view, and light mode for changing the globe view color scheme;
- Enable auto-browse setting 14370 for automatic shifting by GUI 14350 of the selected marker 14356 and thus item listing 14358 display (such as used in an unmanned status display). This feature may enable automated sequential viewing of multiple location related items and/or multiple location-related subgroups of items;
- Split view setting 14371 enables showing of related groups (such as group 14313) on the bottom half of GUI 14350 to enable modifying of the shown groups while viewing the map view 14352 visualization.

In some implementations, a filter 14372 may be used to filter through the visualized board data to be displayed, based on columns on the board. In non-limiting examples, a user may filter the map view 14352 to show locations by a rating column, by a status column, by labels on the board, by numbers on the board or any other column type on the board.

In some implementations, the map view 14352 may be shared with other users using the share button 14374 so that the map including the location data in the map may be shared including with users who are not users of the PMS 14110. This may allow better tracking of scattered resources such as staff deliveries, service providers, sites and more.

Figure 107A:
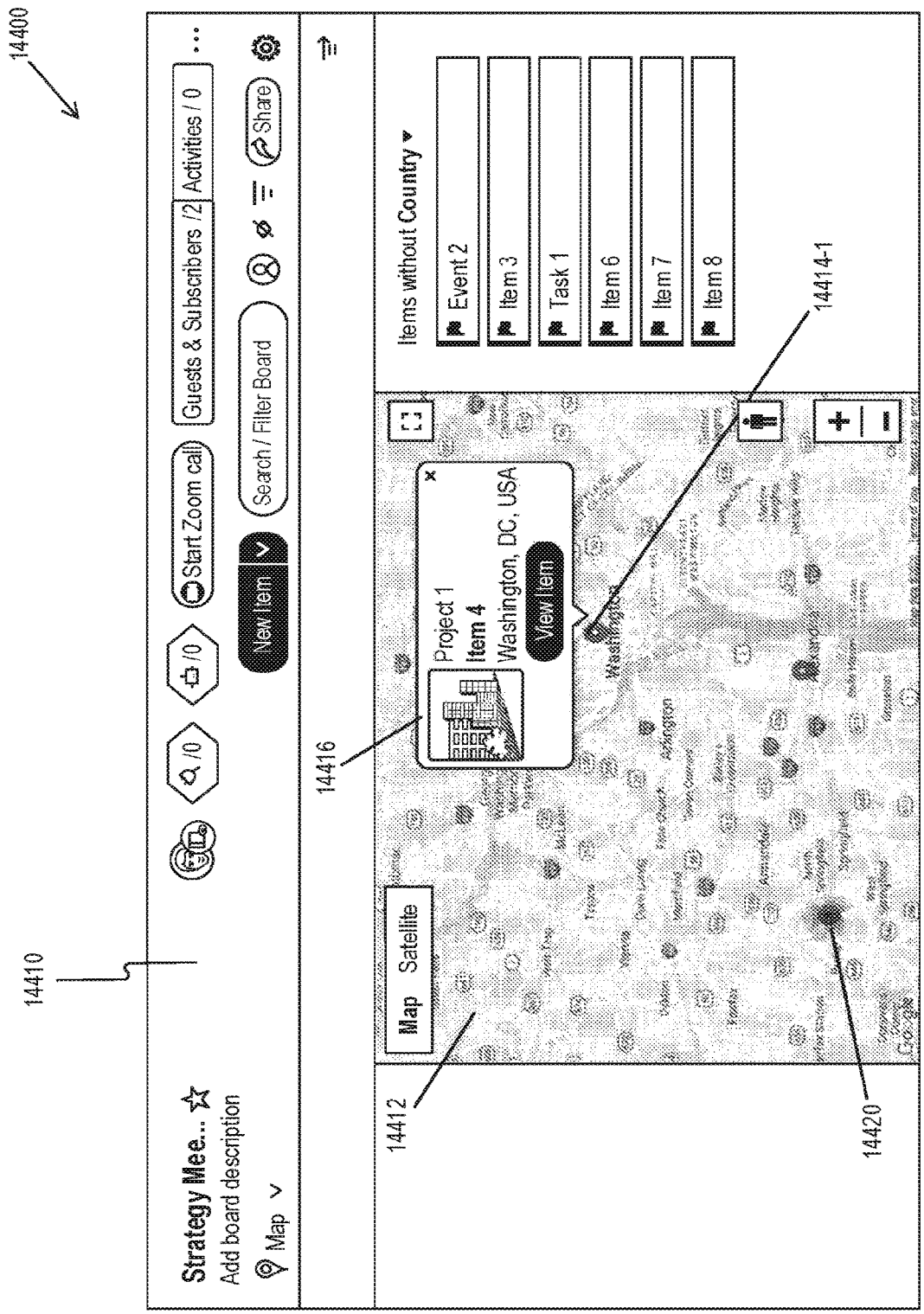
Figure 107B:
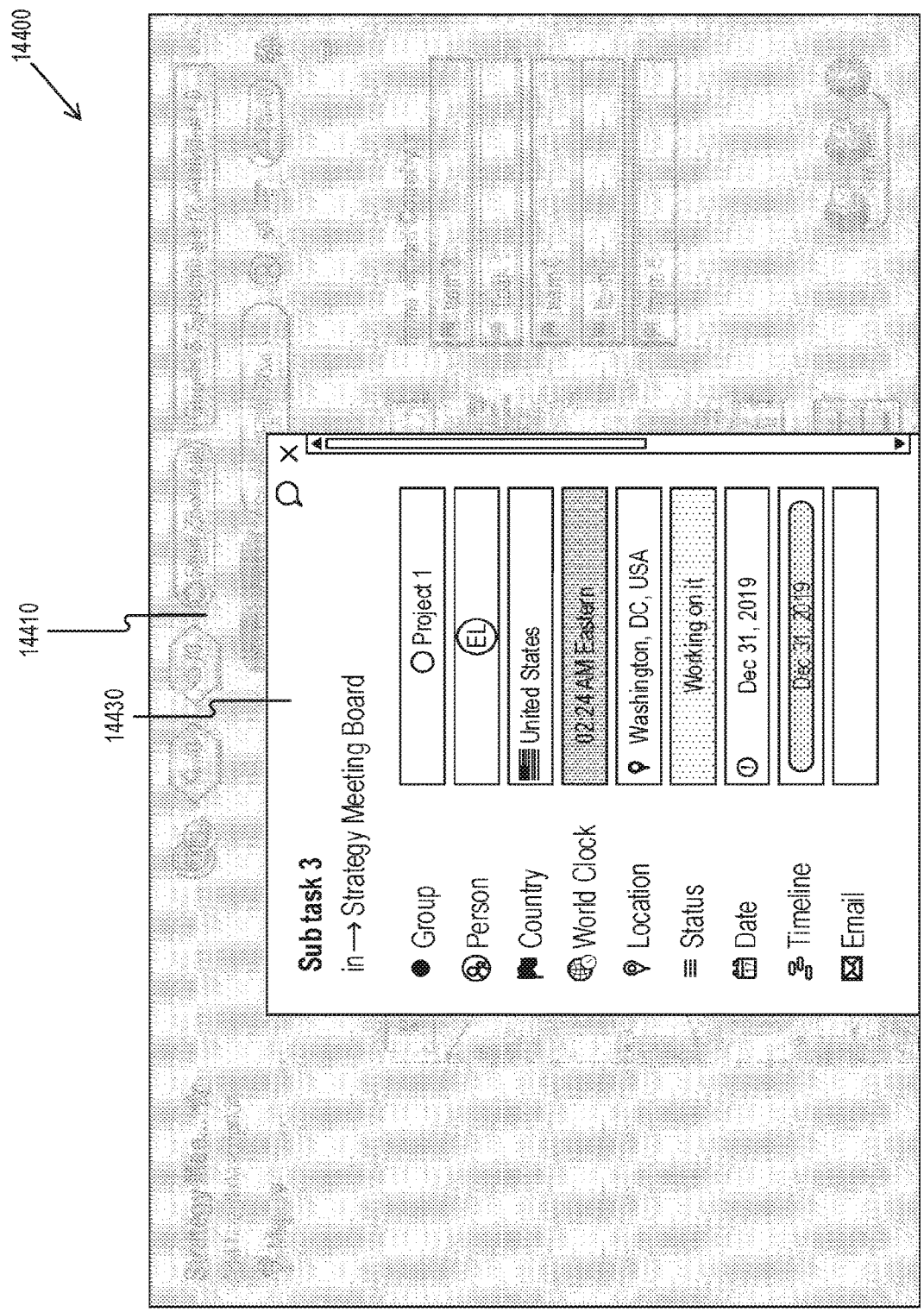
Figure 107C:
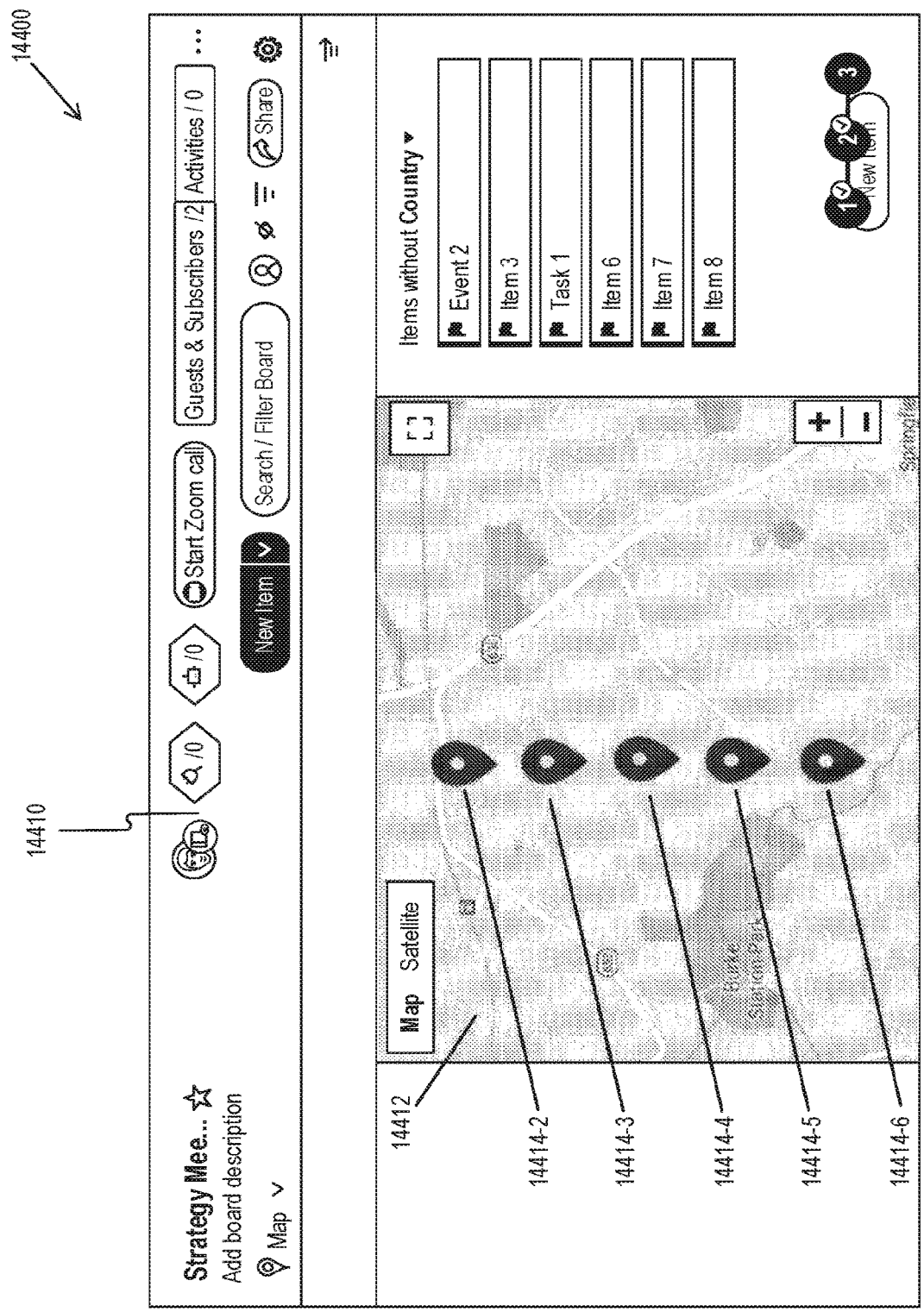

FIGS. 107A-107C illustrate an example graphical user interface 14400 for presenting a map view according to an example implementation. For example, app 14132 or browser 14134 can present GUI 14400 on a display of user device 14130 in response to the user selecting a map view 14410. Alternatively, app 14132 or browser 14134 can present GUI 14400 on a display of user device 14130 in response to the user selecting a map widget view 14410 selected from a dashboard view (not shown).

GUI 14400 is generated based on user-selected local process management data such as board 14311. Items, such as items 14312 selected for visualization in map view 14410 may be from one group or from multiple groups on a single board or from multiple groups from multiple boards.

Map view 14410 provides visualization of the geographical location indications associated with items. In some implementations, map view 14410 may provide a location visualization based on a street map 14412 or any other 2D or 3D map.

In map view 14410 the geographical location indications associated with items may be displayed on a common map 14412 as markers 14414. In some implementations, a user may interact with map view 14410, such as by mousing over or otherwise interacting with a specific marker 14414-1 associated with a geographical location indication. Upon interacting with marker 14414, an item summary 14416 may be displayed including some column values of the item associated with the selected geographical location indication in order to provide a brief indication of the main column values of the associated item.

In some implementations, a user may interact with map view 14410, such as by selecting a specific marker 14414 associated with a geographical location indication. Upon selecting the specific marker 14414, an item listing 14430 may be displayed including column values of the item associated with the selected geographical location indication. In some implementations, marker 14414 may be the same color as the color of the group on the table where the item is listed.

In some implementations, the displayed column values in item listing 14430 may be modified directly in map view 14410. It should be appreciated that changes made to the PM data 14122 in item listing 14430 from the map view 14410 are reflected in all other views of the PM data 14122 without the need for data exports and imports, thus simplifying process management for items with a location component.

In map view 14410, when a number of location indications are in close proximity to one another (where proximity is dependent on the map scale), markers 14414 are grouped together and may be marked on map 14412 as a cluster marker 14420. Cluster marker 14420 may display a numeral indicating the number of proximal markers 14414 grouped together as cluster marker 14420. In some embodiments, as shown in FIG. 107C, when zooming in (decreasing the scale) to the area on map 14412 of the cluster marker 14420, cluster marker 14420 may separate to display each of markers 14414 (here shown as markers 14414-2 to 14414-6) that were grouped into cluster marker 14420 each associated with an item or multiple items on the mapped board.

Figure 108:
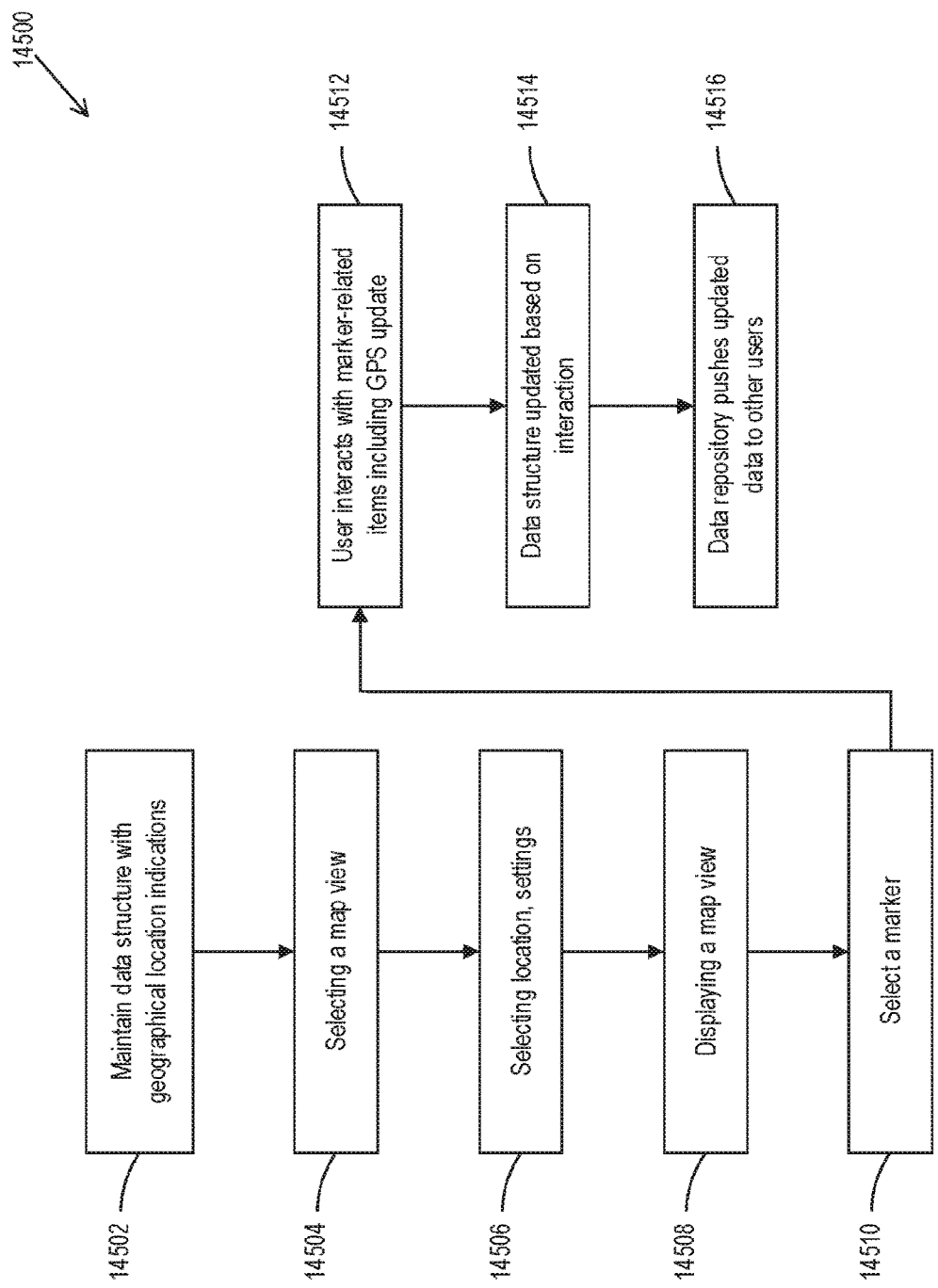

FIG. 108 is a diagram of an example process for displaying a map view in accordance with implementations described herein. This process 14500 may for example be performed by system 14100 as described above. The steps below are described with reference to a computing device that performs operations described at each step. The computing device can correspond to a computing device corresponding to PMS 14110 and/or user device 14130.

At block 14502, a data repository maintains one or more user-defined groups of items, wherein each item of the one or more groups of items has an associated geographical location indication stored in a location column type. Additionally, the group of items has column values of other types associated with the item.

At block 14504, in response to a user selecting a map view, a GUI displays a map view showing the geographical location indications as markers on the map view. At step 14506, a user interacts with the map view settings to choose the groups, location column, map view type and other display settings for displaying in the map view.

At block 14508, in response to the selected user settings, a GUI displays a map view based on the selected settings. It should be appreciated that step 14506 may be skipped if the map view of step 14504 is considered sufficient by the user.

At block 14510, a user selects a marker on the map view to thereby cause the GUI to display item listings associated with the geographical location indication. At step 14512, a user interacts with one or more of the markers, items, and/or related column values to modify the items.

In some implementations, when the GUI is accessed from a user device 14130 with a location sensing component, such as but not limited to a GPS receiver, the user may choose to modify the geographical location indication of one or more items with user-specific information, where the user-specific information includes GPS coordinates obtained from the user device 14130. In some implementations, the GPS coordinates are periodically updated, such as when the user device changes location thus modifying the geographical location indication of the related items.

At block 14514, the related process management data of the items that were modified is updated in the data repository. At block 14516, the data repository pushes the updated process management data to users that are interacting with or are affected by the same process management data.

Figure 109:
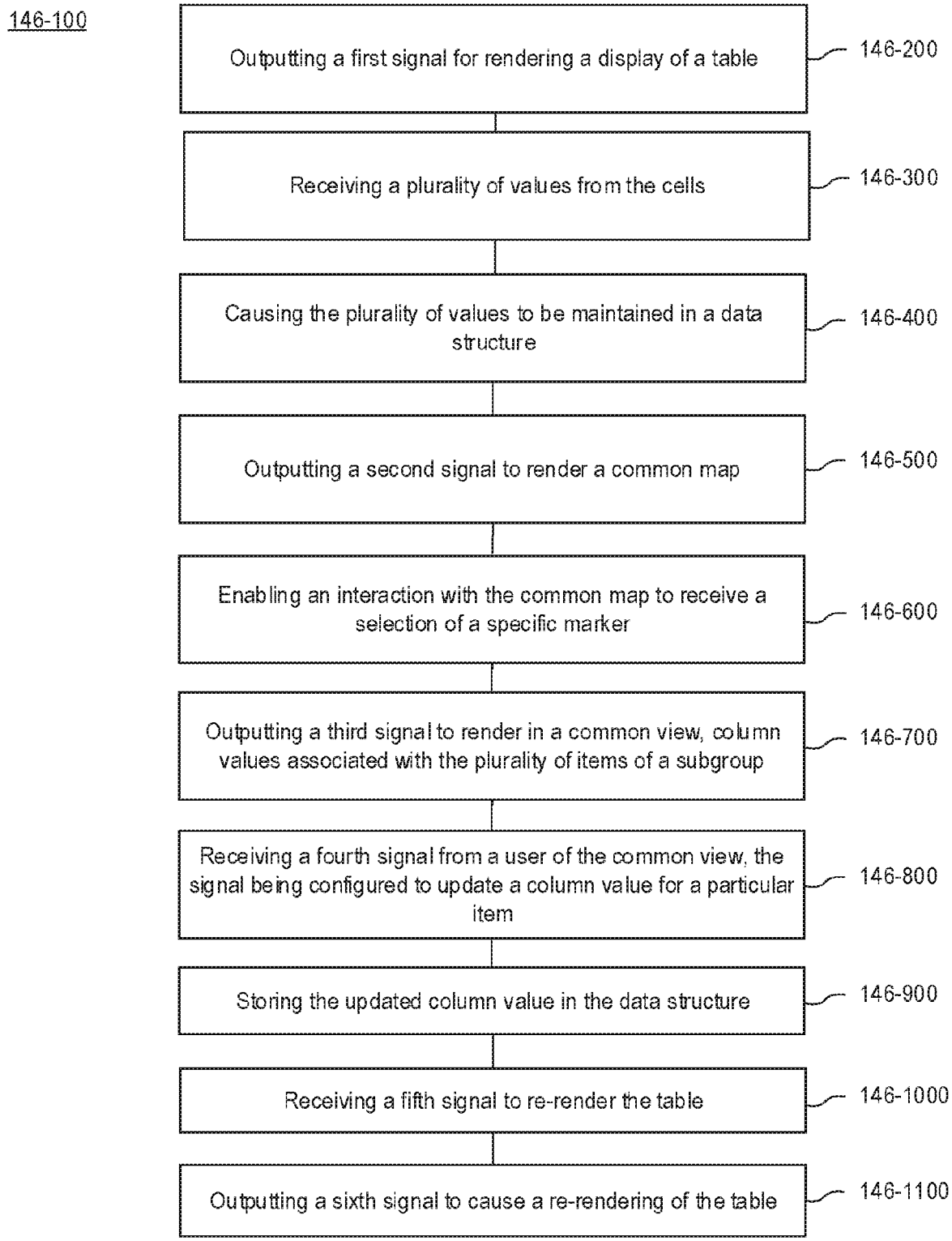

One embodiment may include a method 146-100, as shown in FIG. 109, with block 146-200 for outputting a first signal for rendering a display of a table. The display of the table may include a presentation of a plurality of items, a plurality of columns, and a plurality of values in cells at intersection of items and columns, as previously discussed. One of the columns may be configured to retain geographic location values, where each item may have an associated geographic location value, and a subgroup of the items may share a common geographic location value that may differ from geographic values of others of the plurality of items, consistent with the disclosure described herein. At block 146-300, the method 146-100 may include receiving a plurality of values from the cells, as previously discussed. At block 146-400, the method 146-100 may also include causing the plurality of values to be maintained in a data structure, as discussed above. At block 146-500, the method 146-100 may include outputting a second signal to render a common map, which may include markers associated with the geographically dispersed items as previously discussed. At block 146-600, the method 146-100 may also include enabling an interaction with the common map in order to receive a selection of a specific marker associated with a geographical location of the subgroup, as discussed above. At block 146-700, the method 146-100 may include outputting a third signal to render in a common view, column values associated with the plurality of items of the subgroup, following receipt of the specific marker, consistent with the disclosure described above.

At block 146-800, the method 146-100 may include receiving a fourth signal from a user of the common view, the signal being configured to update a column value for a particular item as discussed above. At block 146-900, the method 146-100 may include storing the updated column value in the data structure, as previously discussed. At block 146-1000, the method 146-100 may include receiving a fifth signal to re-render the table, as discussed above. At block 146-1100, the method 146-100 may include outputting in response to the fifth signal a sixth signal to cause a re-rendering of the table, wherein the sixth signal includes the updated value for the particular item, consistent with the disclosure described herein.

The present disclosure describes technological improvements in devices, systems, computer readable media, and methods for process management platforms that may allow a user to manage resource utilization in real time.

Figure 110A:
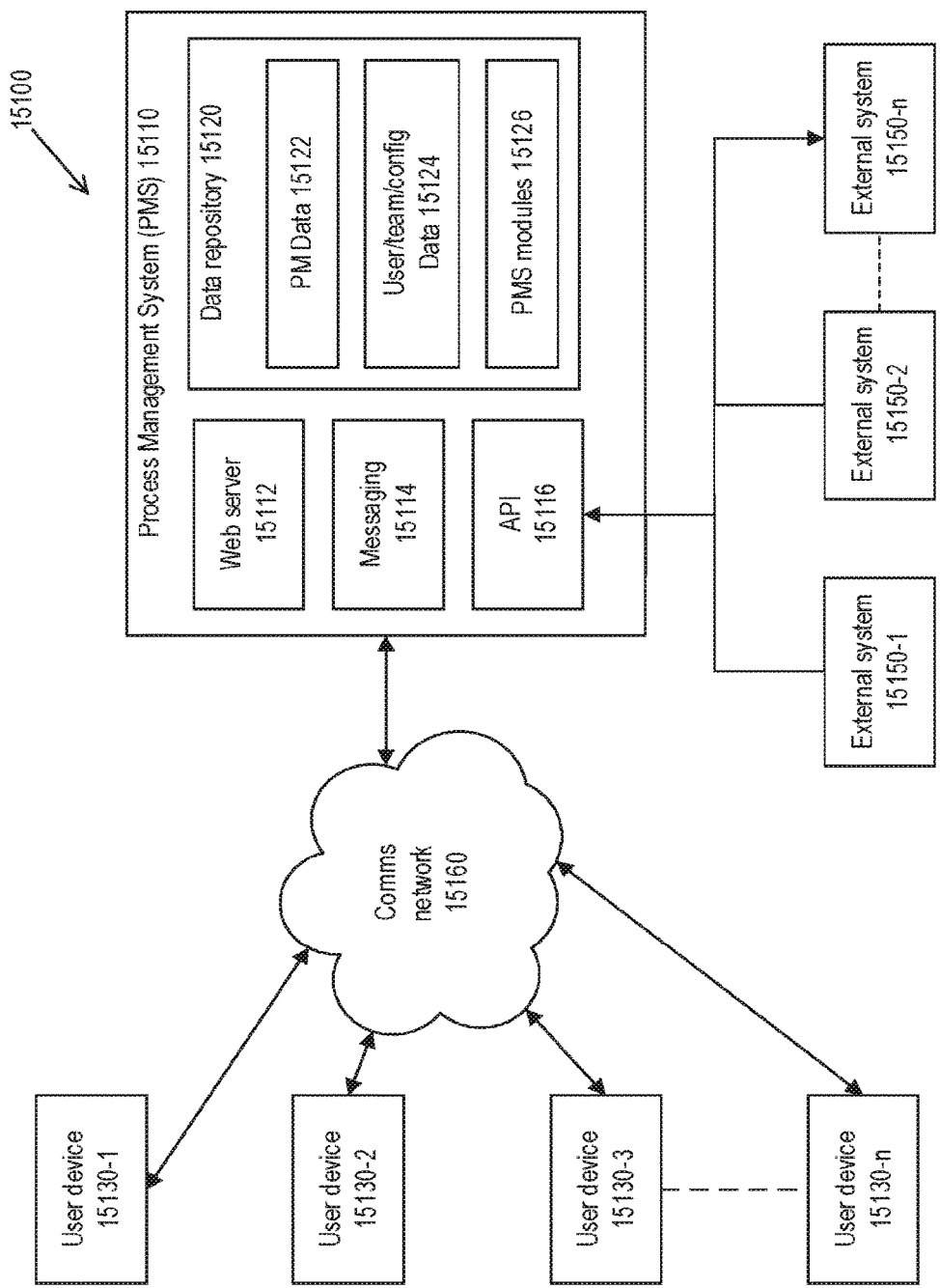

FIG. 110A illustrates a network 15100 for process management according to an example implementation. In system 15100, users interact with process management system 15110 using user devices 15130-1, 15130-2, 15130-3 to 15130-n through communications network 15160 using wired or wireless communication. Communications network 15160 may include a wide variety of network configurations and protocols that facilitate the intercommunication of computing devices. For example, each of the components of system 15100 in FIG. 110 can be implemented in a localized or distributed fashion in a network.

Process management system (PMS) 15110 is referred to herein as a "process" management system but it should be appreciated that PMS 15110 may be used for management of projects, schedules, effort, pricing, risk, inventory, and assets and the term process should not be considered limiting.

PMS 15110 and the modules and components that are included in PMS 15110 can run on a single computing device (e.g., a server) or multiple computing devices (e.g., multiple servers) that are configured to perform the functions and/or operations necessary to provide the functionality described herein. While PMS 15110 is presented herein with specific components and modules, it should be understood by one skilled in the art, that the architectural configuration of system 15100 as shown is simply one possible configuration and that other configurations with more or fewer components are possible.

User devices 15130 can be of varying type, capabilities, operating systems, etc. For example, user devices 15130 may include PCs, tablets, mobile phones, laptops, virtual reality or augmented reality glasses or other wearables, holographic interfaces, or any other mechanism that allows for user interaction with the platform. Furthermore, PMS 15110 can concurrently accept connections from and interact with multiple user devices 15130. A single user may interact with PMS 15110 using multiple different user devices 15130.

PMS 15110 may include a data repository 15120. Although data repository 15120 is shown as a single entity, in practice data repository 15120 may include one or more databases. Data repository stores process management data 15122, user/team profile and configuration data 15124, and PMS software modules 15126. Other data required for the functioning of PMS 15110 may also be stored in data repository 15120. Users may interact with the process management data 15122 stored in data repository 15120 through user devices 15130. As used herein, the term "interaction" may include but is not limited to adding, retrieving, modifying, browsing, and/or sharing process management data 15122 as well as messaging related to process management data 15122.

In some implementations, users may be grouped into teams or organizations as indicated in the user profile data (a/k/a User/team/config/data) 15124. User profile data 15124 may include but is not limited to username, contact information, team assignments and so forth. User profile data 15124 may also include organization/team profile data. User profile data may further include per-user and/or per team configuration data for operation of PMS modules 15126 on user devices 15130. PMS 15110 may include a web server 15112 to support connections from a variety of different user devices 15130, such as: desktop computers; mobile computers; mobile communications devices, e.g., mobile phones, smartphones, tablets; and/or any other network enabled computing devices.

Figure 110C:
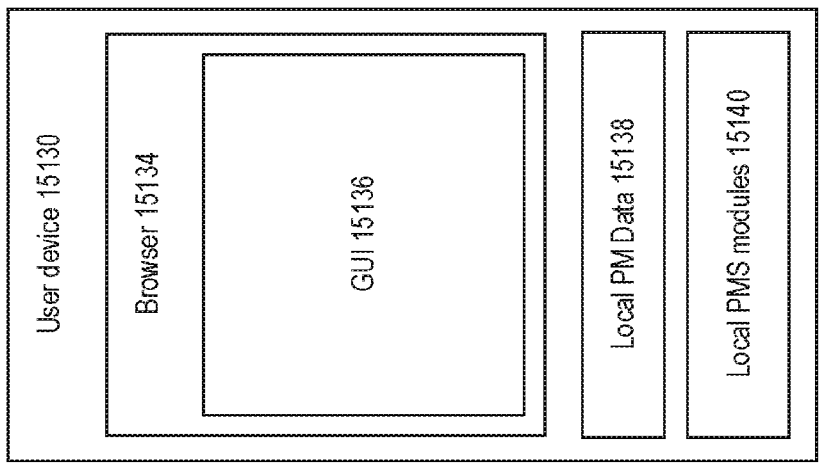
Figure 110B:
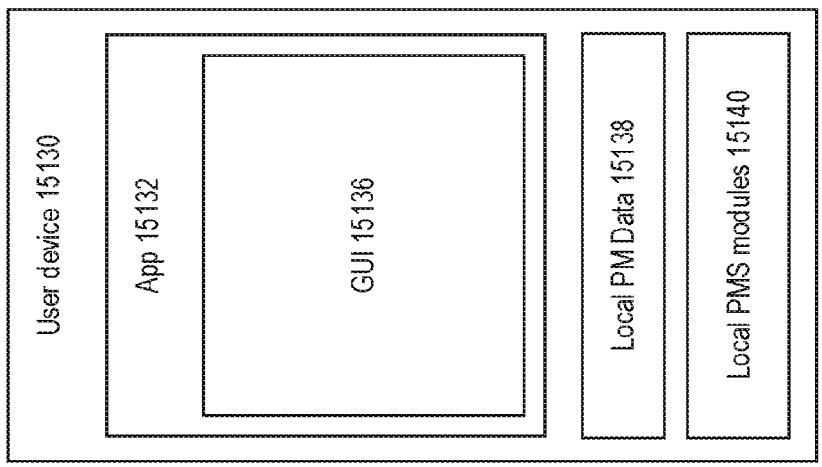

In some embodiments, such as shown in FIG. 110B, a user using user device 15130 can interact with PMS 15110 via a PMS application (app) 15132 installed on user device 15130. App 15132 may be a stand-alone application, one or more application plug-ins, and/or a browser extension.

In some implementations, such as shown in FIG. 110C, a user device 15130 can interact with PMS 15110 via a third-party application, such as a web browser 15134 running on user device 15130. For example, the user can navigate in web browser 15134 to a web address provided by PMS 15110 for interacting with PMS 15110. It should be appreciated that some devices 15130 may support both of an app 15132 and a web browser 15134. FIGS. 110B and 110C show separate implantations for simplicity.

In some embodiments, PMS 15110 may provide for user interaction by using a web application model. Although a web application model is described herein, it should be appreciated that other application architectures may be suitable. In response to interaction by a user using an app 15132 or browser 15134, the app 15132 or browser 15134 may request data from web server 15112 and may be provided with one or more webpage structures (not shown), subsets of process management (PM) data 15122, herein referred to as local PM data 15138, and relevant PMS modules 15126, herein referred to as local PMS modules 15140. PMS software modules 15126 may define web application functionality of system 15100 and may be downloaded to user devices 15130 where they may be run as local PMS modules 15140 by app 15132 or browser 15134 to enable interaction with process management data 15122 and local process management data 15138.

Either of app 15132 or browser 15134 may provide a graphical user interface (GUI) 15136 for the user to interact with PMS 15110. GUI 15136 may also be referred to herein as a "common visualization." References herein to a GUI 15136 and to views of GUI 15136 should be understood as referring to the GUI 15136 generated by app 15132 or browser 15134 based on the webpage structure of the visited webpage, relevant local PMS modules 15140 and local PM data 15138 as provided by web server 15112 and read from data repository 15120. Each PMS module 15126 may provide functionality for different interactive parts of GUI 15136. The resource view as described below is a non-limiting example of PMS modules 15126, 15140 with specific functionality, GUI 15136, and configuration data 15124. Interaction with GUI 15136 may include viewing, or selecting graphical elements using the interface hardware of user devices 15130 including but not limited to a touchscreen, 2D or 3D display, mouse, keyboard and so forth.

In some implementations, updates of local PMS modules 15140 may happen each time the relevant web page of PMS 15110 is visited. In some implementations, changes made to process management (PM) data 15122 that affect local PM data 15138 may be pushed by PMS 15110 to app 15132 or browser 15134 of all users making use of the same local PM data 15138 following the making of the changes. Thus GUI 15136 may reflect updated local PM data 15138 that is the same as the relevant PM data 15122. In some implementations, users may define configurations for specific local PMS modules 15140. Configuration data 15124 may be stored in data repository 15120. Configuration data 15124 may therefore be retrieved by local PMS modules 15140 for every session ensuring a consistent user experience.

PM data 15122 may be stored in linked data structures in data repository 15120. The PM data in these linked data structures may include but is not limited to items, columns, groups, boards, and workspaces. Local PM data 15138 may be stored in linked data structures on user device 15130.

Items as defined herein may be the basic PM data elements that may be tracked as part of a process in PMS 15110. Non-limiting examples of items include tasks, assets, inventory, clients, sales leads, employees, and so forth. In some implementations, items may include sub-items.

Columns as defined herein describe an aspect of an item and/or sub-item. Each column may be of a single data type or a combination of data types, such as numeric values only, characters only, alphanumeric values only, graphic elements only, a closed list of elements, particular formatting, values within a specified range only, and so forth. Non-limiting examples of column types may include: related user/s, related resource/s, related team/s, status, resource unit, priority, timeline (start and/or end dates), date, cost, pricing, text, number, rating, time zone, checkbox, URLs, item series number, location, vote box, week, progress bar, contact details, item ID, color indicator, last updated, time tracking, related data file, tags (a label, a numeric value, a title, a name, a combination thereof, and so on, that may be used to easily identify a descriptive quality of an item), and so forth.

Groups as defined herein may be user-defined groupings of one or more items. In non-limiting examples, items may be grouped together by a user where they share a common project, process, work period, owner, status, and so forth. In some implementations, groups are displayed in GUI 15136 as tables with items as rows and columns as columns. In some implementations, PMS 15110 maintains items and columns in a table data structure.

Boards may be user-defined collections of one or more groups. In non-limiting examples, groups may be grouped together in a board by a user where they share a common project, process, work period, owner, and so forth. Boards may include a structure with horizontal and vertical rows where the intersection of these rows may define cells that may be configured to contain information. Workspaces may be user-defined collections of boards.

In some implementations, process management data 15122 may further include messaging between users related to one or more of items, projects, boards, and/or workspaces. In some implementations, process management data 15122 may further includes documents, audio files, video files, and so forth that may be associated with an item, group and/or board.

In some implementations, PMS 15110 may include a messaging module 15114 for sending messages to users over common messaging formats and/or for providing a messaging interface via a corresponding local PMS module 15140 on GUI 15136 for messaging related to items, groups, boards and/or workspaces.

In some implementations, PMS 15110 may include an application programming interface (API) 15116 for interfacing with various external services and systems 15150-1, 15150-2, to 15150-n.

In some implementations, PMS 15110 may include an authenticator module (not shown), which can verify user credentials, security tokens, API calls, specific user devices, and so forth, to ensure only authorized users and users can access PMS 15110.

In some implementations, PMS 15110 may include a sharing module (not shown) for managing sharing of process management data publicly or privately. For example, the sharing module may be a permission settings module that can grant or restrict permissions to specific cells, rows, boards, dashboards, widgets, or any other structure. The sharing can be performed in a platform agnostic manner. That is, the content can be shared across multiple user devices 15130 of varying type, capabilities, operating systems, etc.

Figure 111:
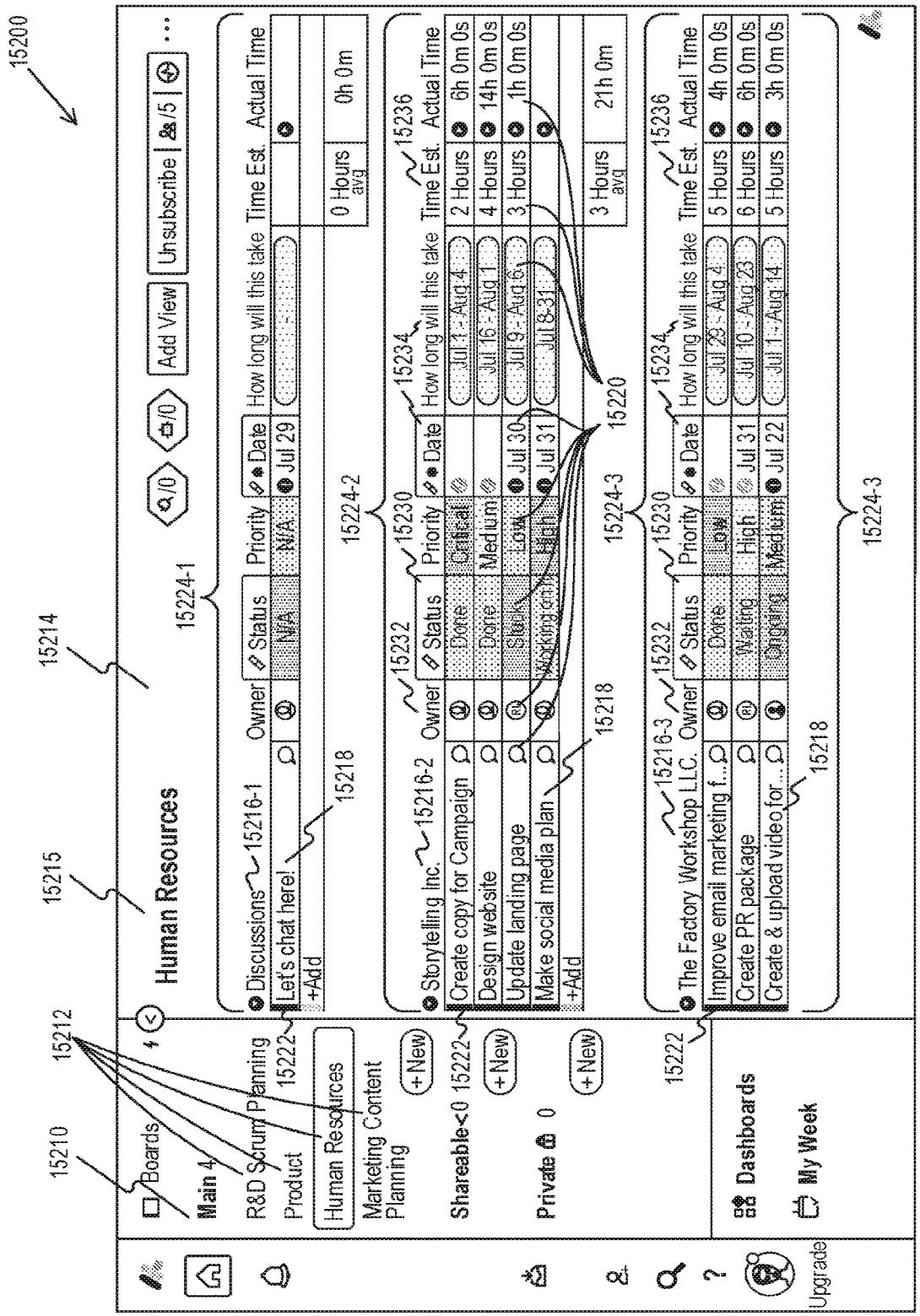

FIG. 111 illustrates an example graphical user interface 15200 for presenting a process management board view according to an example implementation. For example, app 15132 or browser 15134 can generate GUI 15200 for display on user device 15130 in response to the user selecting a board view 15214. GUI 15200 includes local process management data 15138 retrieved from data repository 15120 including user-defined items, columns, groups, boards, and workspaces.

In some implementations, board view 15214 may include multiple items 15218 shown as rows 15222 grouped into groups 15216-1, 15216-2, and 15216-3. Board view 15214 may further include each item 15218 further described by PM data 15122 in multiple columns 15220. As shown, in some implementations, columns 15220 may include a status type column 15230. Status type columns include status labels associated with items 15218.

In some embodiments, a system may receive an association of a unit capacity per time period to each of a plurality of resources. A resource may be any material, staff, service, and/or other assets that can be drawn on by a person or organization in order to achieve a result. For example, a resource may be an individual or group of individuals (e.g., employee, team member, agents, teams, groups, or any singular or collective person); a material (e.g., fuel, construction material, components, or any other matter); machinery (e.g., vehicles, robots, equipment, or other operational components, means or systems), real estate (e.g., properties, rooms within properties such as offices, conference rooms, hotel room, manufacturing lines, or any other land, building or portion thereof); natural resources (minerals, water, plants such as fruit trees or other food-producing plants); organizations such as companies, vendors, associations or any other organized body of people: or any other resource. In some embodiments, the system may receive an input for selecting a particular plurality of resources, and in response to receiving the input, output a second display signal to re-render a display of the resource utilization according to the particular plurality of resources selected, as described in further detail below. Selecting a particular plurality of resources may include an initial selection of a plurality of resources, or may involve changing a plurality of resources to a different plurality of resources. For example, the system may display the resource utilization for a plurality of resources (e.g., individuals), and the system may receive a selection to display the resource utilization for a different plurality of resources (e.g., machinery). In response to receiving the selection, the system may re-render the display so that the resource utilization corresponds to the selected plurality of resources (e.g., machinery). In this way, a user may view resource utilization based on any resource type that may be included in a table. A unit capacity may involve measure for quantifying any resource. For example, unit capacity may be known measures (e.g., gallon, hour, pound, gigabits, dollar, etc.) or may be measures designed for a particular resource. For example, if a unit is measured in hours for an employee, a unity capacity may be a number of hours for a work day (e.g., 8 hours a day for a full-time employee, 4 hours for a part-time employee, or any other designated capacity). If a unit is measured by a count for an employee who may work on a production basis, such as producing 15200 items in a factory per day, items/day may be the associated unit capacity. The unit capacity may be a default or may be defined by a user according to any situation. The unit capacity may be defined per time period (e.g., a day, week, month, year, or any other time period) so that resource utilization may be measured over any time period according to user preference. An association of a unit capacity to a resource may include linking or relating a unit capacity to any resource described above based on an input as a default or from a user, or may occur through an input made via an interface, such as a touchscreen, GUI, mouse, touchpad, keystroke, a gesture, or any other manner of receiving an input or selection to result in an association. The association may be a default or may be configurable by a user according to user preference.

The system may further receive an assignment of a plurality of items to each of the plurality of resources and receive an assignment of units to each of the plurality of items. An assignment may include an association of one object to another either as a default or according to a user preference through any input means as described above. Items may include any task, work to be done, object, project, or any other thing, whether animate or inanimate to be monitored or followed. The items may be associated with units as a default or may be defined. Units associated with an item may be an estimate of measure that the item may be worth. The units may include a time measure, a task measure, a volume measure, a distance measure, or any other measure related to a particular item. For example, an item may be a task that typically takes 10 hours to complete, which may be said to be a time measure. In such a scenario, the item may be associated with a time measure of 10 hours. In another example, if an item is a task worth 4 credits (e.g., academic class credits), the unit measure may be credits. In other exemplary embodiments, a task measure may be any form of measurement associated with the task, such as a count of units produced. A volume measure may also include any measurement of space such as a measurement of physical space (e.g., cubic feet) or virtual space (e.g., gigabytes for data). A distance measure may include any measurement of length between at least two points in space, such as a measure of distance to travel, a distance to arriving at a destination, a distance in altitude, or any other measurement of distance.

The system may output a display signal for presenting in a common visualization, a resource utilization indicator for each of the plurality of resources, wherein each displayed resource utilization indicator compares aggregated assigned units to the unit capacity of the resource. By assigning units to an item and assigning items to a resource, resource's assigned units may be tracked and totaled to aggregate the assigned units for a particular resource. As a result, a resource's utilization may be calculated by comparing the aggregated assigned units in a time period to the resource's unit capacity in the time period. Comparing the aggregated assigned units to the unit capacity may include a determination that the aggregated assigned units are less than the unit capacity (e.g., under-utilization), determining that the aggregated assigned units are equal the unit capacity (e.g., at-capacity), or determining that the aggregated assigned units exceed the unit capacity (e.g., overcapacity). In this way, a resource utilization may be determined or calculated by the system. The comparison may be carried out by the at least one processor as a look up in a repository or as a direct comparison within tablature. A resource's utilization may be represented by an indicator in a display (e.g., in alphanumeric or graphical form). A common visualization may be any rendered presentation of information or data in a common display from a device with a screen in 2D or 3D or from a virtual display and/or from a projector. The common visualization may include displaying resource utilization within tablature, adjacent a display of tablature, or may be displayed in a module over tablature in the common display.

A resource utilization indicator may include any visual indication that represents a resource's utilization in a defined time period. When capacity is a measure, a resource's utilization may be one of overcapacity, under-utilization, or at-capacity as described above, and the respective resource utilization indicator may show and accurately reflect the resource's utilization in a given time period. The resource utilization indicator may include graphics, alphanumerics, GIFs, emojis, colors, or a combination thereof. The indicator may also include a representation of the resource itself as a resource shaped indicator such a building, a person, a vehicle, or any other entity. The resource shaped indicator may be presented automatically as a result of the system performing a look up or may be selected manually be a user from available depictions of various resources that may be stored in a repository or online. The resource utilization indicator may be static or may be dynamic animations. The indicator may be updated in real time or may be updated periodically. Exemplary resource utilization indicators may include a graphical indication such as through the use of colors associated with different utilization levels, differing sizes of a graphical indication (e.g., the bigger a graphical icon is displayed, the more assigned units the resource has in a given time period), graphical gauges, depictions of metered gauges (e.g., a fuel tank, thermometer, battery, or any other metered measuring tool), or dynamic animations (e.g., objects moving at a high speed at overcapacity and at a slow speed at under-utilization). The resource utilization indicator may include alphanumerics such as a display of text or numbers to indicate a utilization compared to the resource's capacity such as "overcapacity," "at-capacity," "under-utilized," "50% utilization," or any other alphanumeric indication of resource utilization.

The resource utilization indicator may be configured to change and reflect a resource's particular utilization according to a particular time period. The change may be a result of reassignment of items and units in a particular time period, such as the addition, removal, or alteration of items and units in the particular time period for a particular resource. For example, a resource's utilization may be at-capacity in a given week, and the resource utilization indicator may reflect that the resource is at-capacity for the given week. If the resource were to then have an item disbursed to a different time period or added to the given week, the resource utilization indicator may change to reflect an overcapacity or under-utilization depending on the change. The change may be in real time or may be updated at a later time. The change may be any visual change such as a change in color, in graphical representation, or a change in size of animation of the graphical representation as described above.

The assignment of units may include enabling at least one entity or a plurality of entities to assign units to a common resource, wherein outputting the display signal for presenting may include updating the resource utilization indicator on multiple displays of at least one entity or the plurality of entities when one entity assigns units to a resource. Enabling assignment of units to a resource may include providing an interface for a user to associate units to a resource. For example, if the resource is an individual and the units is hours, one supervisor might assign the individual four hours on a given day and another supervisor might assign the same individual three hours on the same day. This is but one example. Assignment of units may be assigned by multiple entities (e.g., individuals, groups of individuals, or users) in a collaborative work system. For example, team members of a team may assign items or units to a particular team member or asset as described above. Or, an individual may self-assign units. In response to each assignment of units to the common resource (e.g., the assigned team member), the resource utilization indicator may be updated and a display signal may be output by at least one processor to present the updated resource utilization indicator for the particular resource on a display of a computing device and/or the other user devices (e.g., devices of the team members) as described above. Thus, when multiple users assign units to the same individual in the same time period, signals output to the displays of the multiple users may reflect the others' assignment of units to the same resource. The display signal that is output may also include presenting a plurality of resources in a table where the resource utilization indicator includes a graphical gauge in a resource-associated cell of the table. A resource-associated cell of the table may include a cell that may be dedicated to include information regarding a particular resource, such as in a common row or column of the particular resource. The resource-associated cell may include information such as a resource utilization indicator, which may include a graphical gauge representing the resource utilization as previously discussed. A user may be able to view a particular resource's utilization in comparison to other resources. This may enable a user to view relevant information and manage resource utilization to help decide whether to disburse a particular item or unit to a different resource as discussed below.

With reference to FIG. 111, for example, columns 15220 may include a resource column 15232 indicating one or more resources that are associated with an item 15218. In some implementations, users may define more than one resource column for associating different kinds of resources with item 15218. Non-limiting examples of resources include individuals (users, employees, team members, contractors, and so forth), assets (vehicles, property, meeting rooms, factory machines, function venue tables, hand tools, and so forth), countries, and/or organizations.

Further, in some implementations, columns 15220 may include a date column and/or or timeline column 15234 for indicating the period wherein the item is to be processed by the resource(s).

These date columns and/or or timeline columns 15234 are referred to herein as "resource period" columns 15234.

Further, in some implementations, columns 15220 may include one or more resource unit columns 15236 providing a numerical measure of the utilization of the resource needed for processing an item 15218. Non-limiting examples of resource units include, time measures, task measures, volume measures, distance measures or object measures.

Non-limiting examples of resources and corresponding resource periods and resource units include:
- For a project task item, the resource may be a team member, the resource period may be the timeline for performing the task, and the resource units may be a time measure of the length of time that the task may take the team member to accomplish the task;
- For a delivery route item, the resource may be a vehicle, the resource period may be the date of the delivery and the resource units may be a distance measure of the distance that the vehicle may need to cover to complete the delivery route;
- A delivery route item may further include a driver resource where the resource units may be the hours needed to complete the delivery route; and
- For a meeting task item, the resource may be a meeting room, the resource period may be the date/time of a meeting, and the resource units may be the meeting durations.

In some implementations, board view 15214 may present rows 15222 of items 15218 intersecting with columns 15220 to form tables 15224-1, 15224-2, and 15224-3. Each of the groups 15216 is thus shown as a table 15224. Groups 15216-1, 15216-2, and 15216-3 may be collectively part of board 15215. As shown, board 15215 may be one of a collection of boards 15212 that form a workspace 15210. The number of items, columns, groups, boards, and workspaces shown in FIG. 111 is illustrative and should not be considered limiting.

In response to receiving a user selection of the graphical elements of board view 15214, a user may interact with board view 15214 to add, retrieve, modify, browse, and/or share the process management data as well as messaging related to the process management data. Non-limiting examples of user interaction performed by selection of graphical elements include adding new process management data, adding or deleting items, modifying the names of items, columns, groups, boards, and workspaces, adding or modifying column values, moving items between groups, selecting views, and so forth.

Board view 15214 may be one way to view and manage process management data and in some implementations, a user may utilize different views provided by GUI 15136 for adding, retrieving, modifying, browsing, and/or sharing process management data.

Figure 112A:
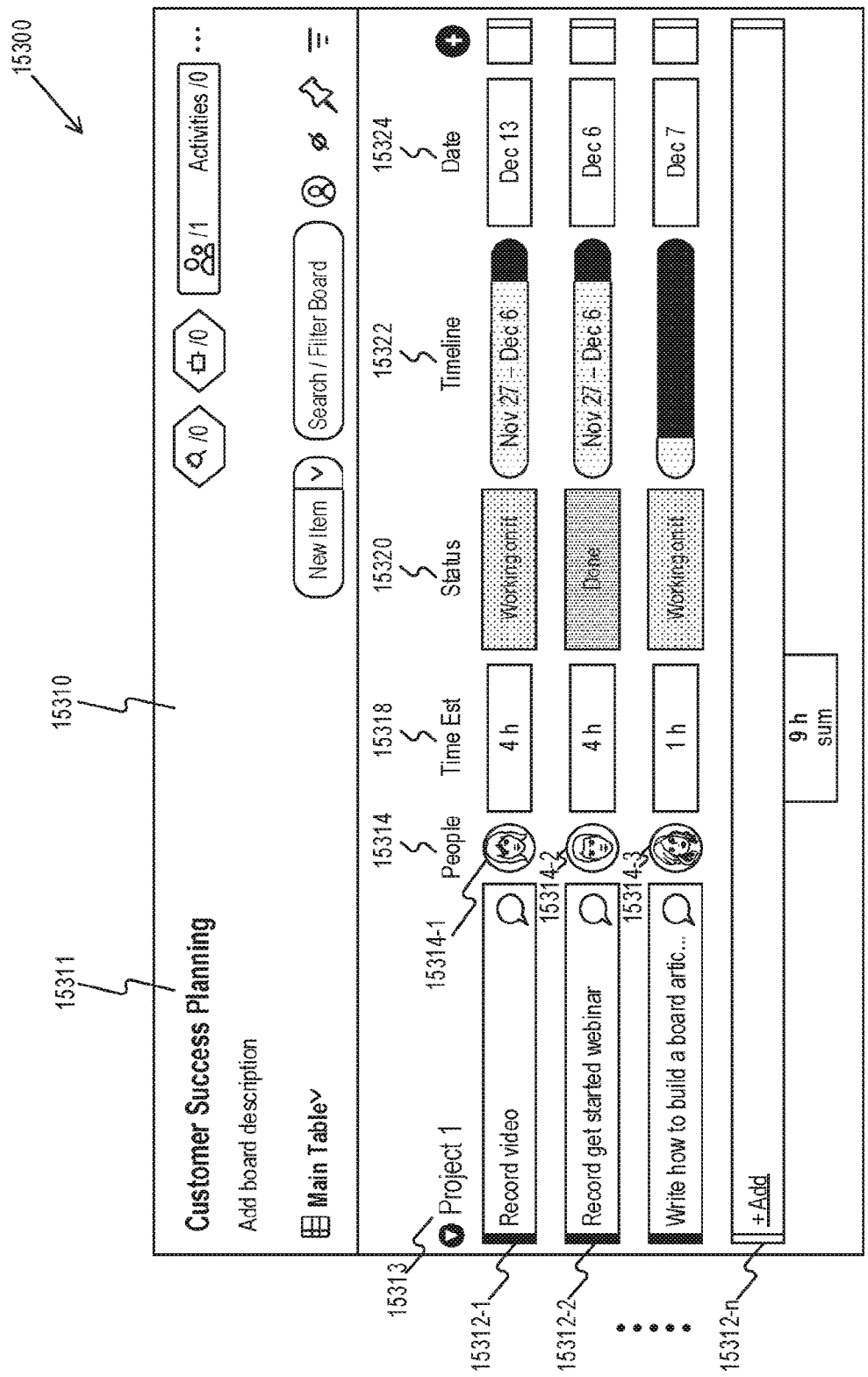

FIG. 112A illustrates an example graphical user interface 15300 for presenting a process management board view according to an example implementation. For example, app 15132 or browser 15134 can present GUI 15300 on a display of user device 15130 in response to the user selecting a board view 15310. GUI 15300 may include local process management data 15138 retrieved from data repository 15120 including user-defined items, columns, and groups.

In some implementations, board view 15310 may present a board 15311 including one or more groups 15313. Groups 15313 include multiple items 15312-1 to 15312-n shown as rows. Board view 15310 may further include each item 15312 further described by user-defined PM data 15122 in multiple columns. As shown, in some implementations, columns may include:
- a resource type column 15314 here showing human resource icons 15314-1, 15314-2, and 15314-3, corresponding to human resources allocated to items 15312;
- a resource unit type column 15318 showing the number of hours that each item 15312 may be expected to take to be processed:
- a status type column 15320 showing status labels associated with items 15312;
- a resource period type column 15322 showing a timeline of start and end dates for the period during which the item 15312 is to be processed;
- a resource period type column 15324 showing a specific date for processing the item 15312 (as an alternative to the timeline column 15322).

Figure 112B:
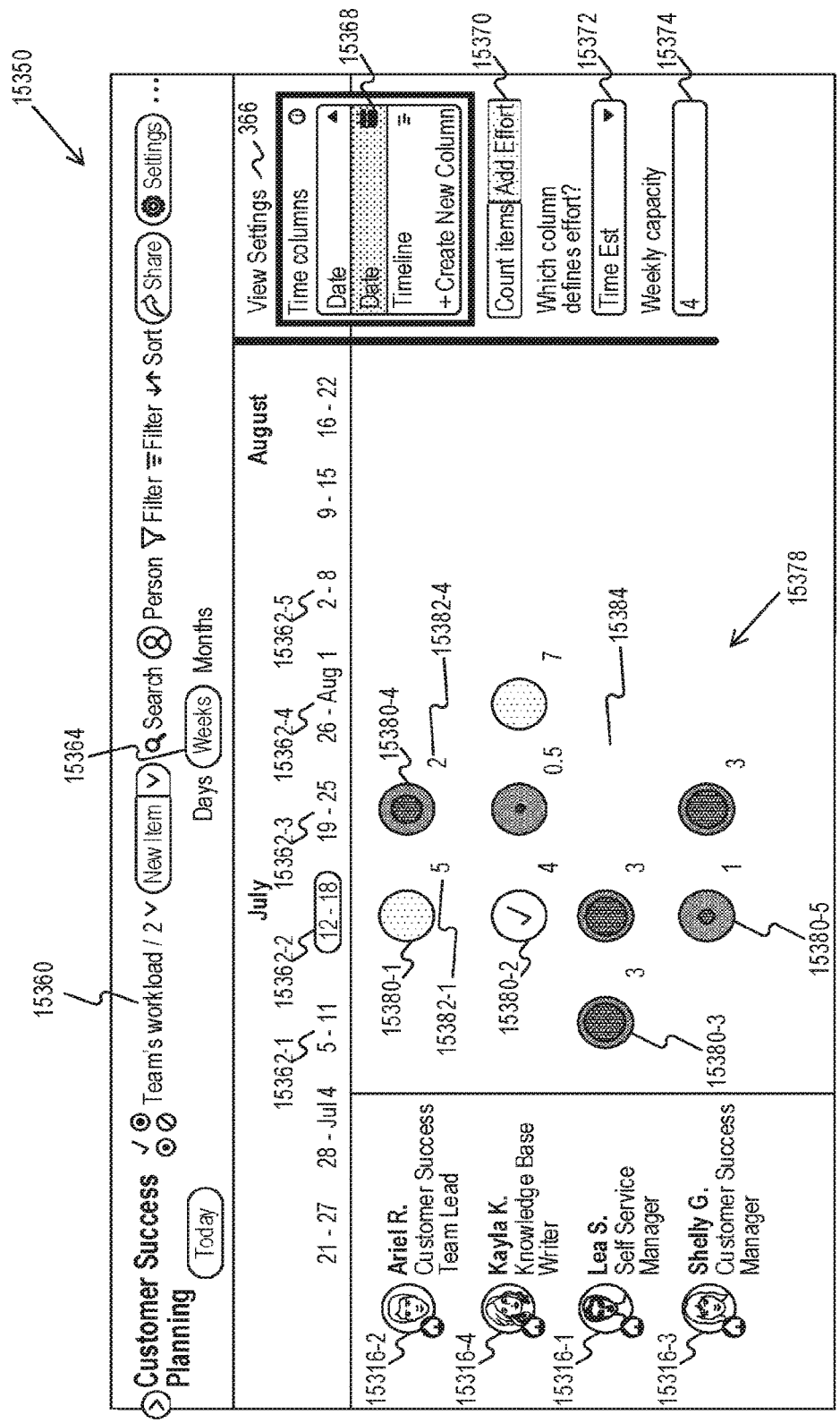
Figure 112C:
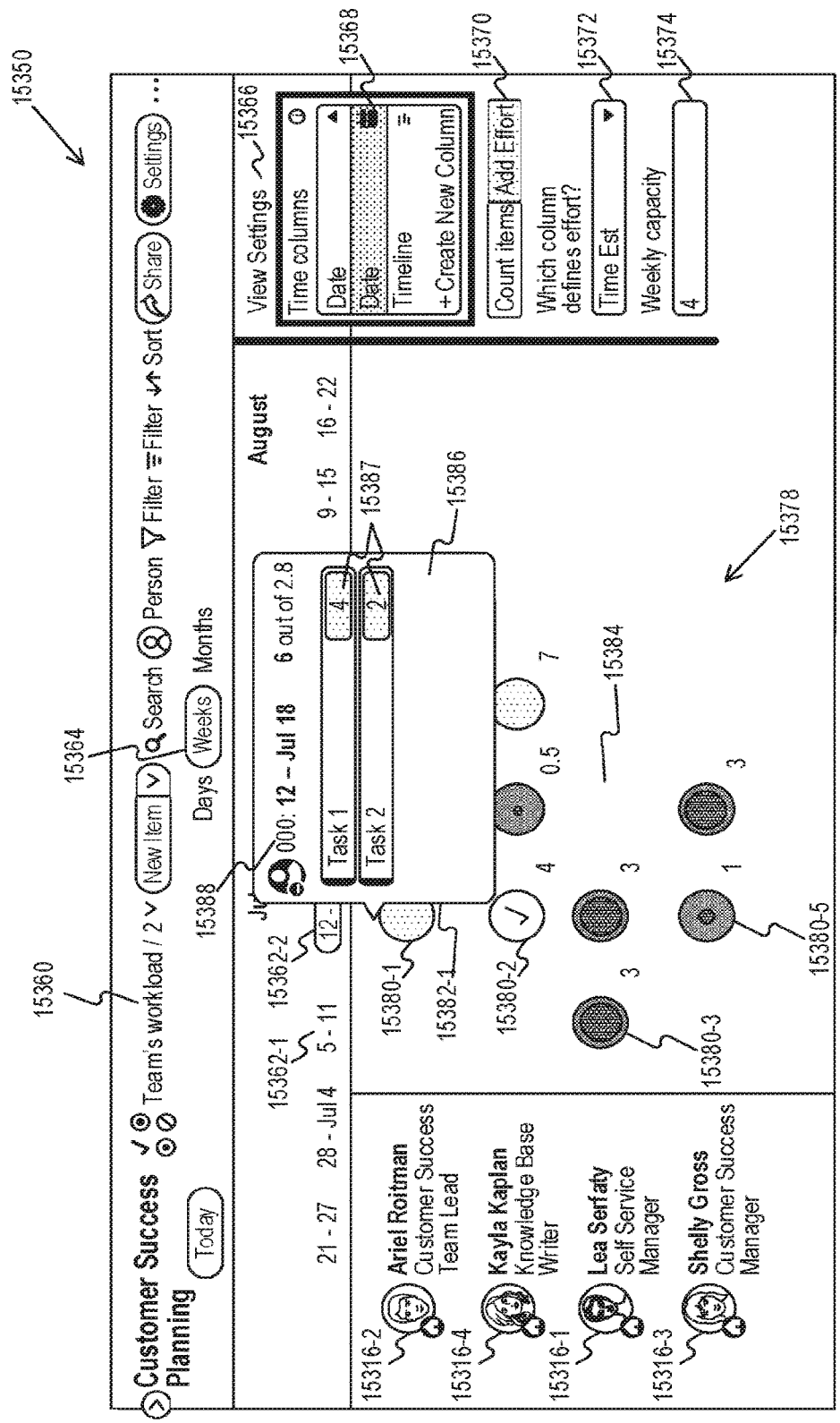

FIGS. 112B-112C illustrate an example graphical user interface 15350 for presenting a process management resource utilization view according to an example implementation. For example, app 15132 or browser 15134 can present GUI 15350 on a display of user device 15130 in response to the user selecting a resource utilization view 15360. Alternatively, app 15132 or browser 15134 can present GUI 15350 on a display of user device 15130 in response to the user selecting a resource utilization widget view 15360 selected from a dashboard view (not shown). GUI 15350 is generated based on user-selected local process management data such as board 15311.

Resource utilization view 15360 provides a visualization for a specific time period of the aggregated utilization of resources 15316 assigned to items 15312. In some implementations, resource utilization view 15360 is in the form of a resource utilization table 15378 where rows represent the resources 15316 and columns represent time period columns 15362. Users may interact with GUI 15350 such as by altering the time period scale 15364, for example, by selecting one of "days", "weeks", or "months." In exemplary view 15360, "weeks" has been selected and time period columns 15362 each represent a week-long period.

Further user interaction may be required for defining the view settings 15366 of resource utilization view 15360. In some implementations, view settings 15366 may include:
- Board selection (not shown): a choice of one or more of the boards accessible to the user such as board 15311;
- Time column selection 15368: a choice of one of the resource period type columns from the selected board such as timeline column 15322 or date column 15324. Date column 15324 is shown here as selected;
- Resource unit aggregate method 15370: This setting defines how the resource units of separate items 15312 are aggregated per resource to determine the total resource units associated with a resource for a chosen period. In some implementations, the aggregated assigned resource units are a count of the number of items assigned to each resource. In some implementations, the aggregated assigned resource units are a sum of the resource units of each item assigned to each resource. In the exemplary resource utilization view 15360, the time estimation column (15318) is selected in the selection box 15372;

Resource unit capacity per time period 15374: In some implementations, the resource unit capacity per time period is defined individually per each resource. In some implementations, the resource unit capacity per time period is defined globally for each resource—such as shown in FIG. 112B where each resource has been allocated a weekly capacity of 4 hours. The resource unit capacity is defined for the same resource unit as selected in the resource unit aggregate method 15370.

Resource utilization indicators 15380 may be graphical gauges that populate the cells of table 15378 and each indicator 15380 provides an indication of the aggregated assigned resource units as compared to the resource unit capacity for a resource 15316 during a time period 15362. In some implementations, resource utilization indicators 15380 may have the form of a graphical gauge such a colored circle. In some implementations, a numeric indicator 15382 may also be provided. As in the exemplary view 15360: indicator 15380-1 is of a single color and indicates that the resource 15316-2 is over capacity for the period 15362-2 since the time estimations 15318 of items 15312 add up to more than the exemplary 4 hour capacity per week of resource 15316-2; indicator 15380-2 is of a single color with a checkmark indicating that resource 15316-4 is at full capacity for the period 15362-2; indicator 15380-3 includes a smaller inner circle of a different color indicating that resource 15316-1 is at an almost full capacity for the period 15362-1; indicators 15380-4, 15380-5 and 15380-6 indicate decreasing capacity utilizations. Blank cells such as cell 15384 indicate no utilization of the resource 15316 during the time period 15362. Blank circles or indicators may also be used to indicate no utilization of the resource 15316 during the time period 15362. In some implementations, the shape and colors of indicators 15380 may be altered according to the user preference.

It should thus be appreciated that resource utilization view 15360 provides a quick graphical overview of the utilization per resource per time period relative to the resource capacity. It should further be appreciated that the graphical gauge version of indicator 15380 represents one option for representing utilization versus capacity and that other representations are possible, such as a meter, a metric gauge, a depiction of the resource, numerical representation, or any other visual indication of utilization.

FIG. 112C illustrates graphical user interface 15350 showing pop-up box 15386 that may appear when a user selects a resource indicator such as resource indicator 15380-1. Box 15386 indicates the items 15387 allocated to the resource 15316 during the resource period. As also shown, resource 15316-1 is unavailable during the selected resource period as resource 15316-1 has been defined in an availability setting GUI (not shown) as out of office (OOO) during the resource period, as indicated by availability indicator 15388 (graphical or alphanumeric indicator), and therefore has no available capacity during that resource period. In some implementations, resource availability and/or unavailability may be defined for complete periods (such as but not limited to weeks, days, or between specific dates), portions of days (such as but not limited to hours in a specific day), or open-ended periods (such as but not limited to a start date with no end date).

Figure 112D:
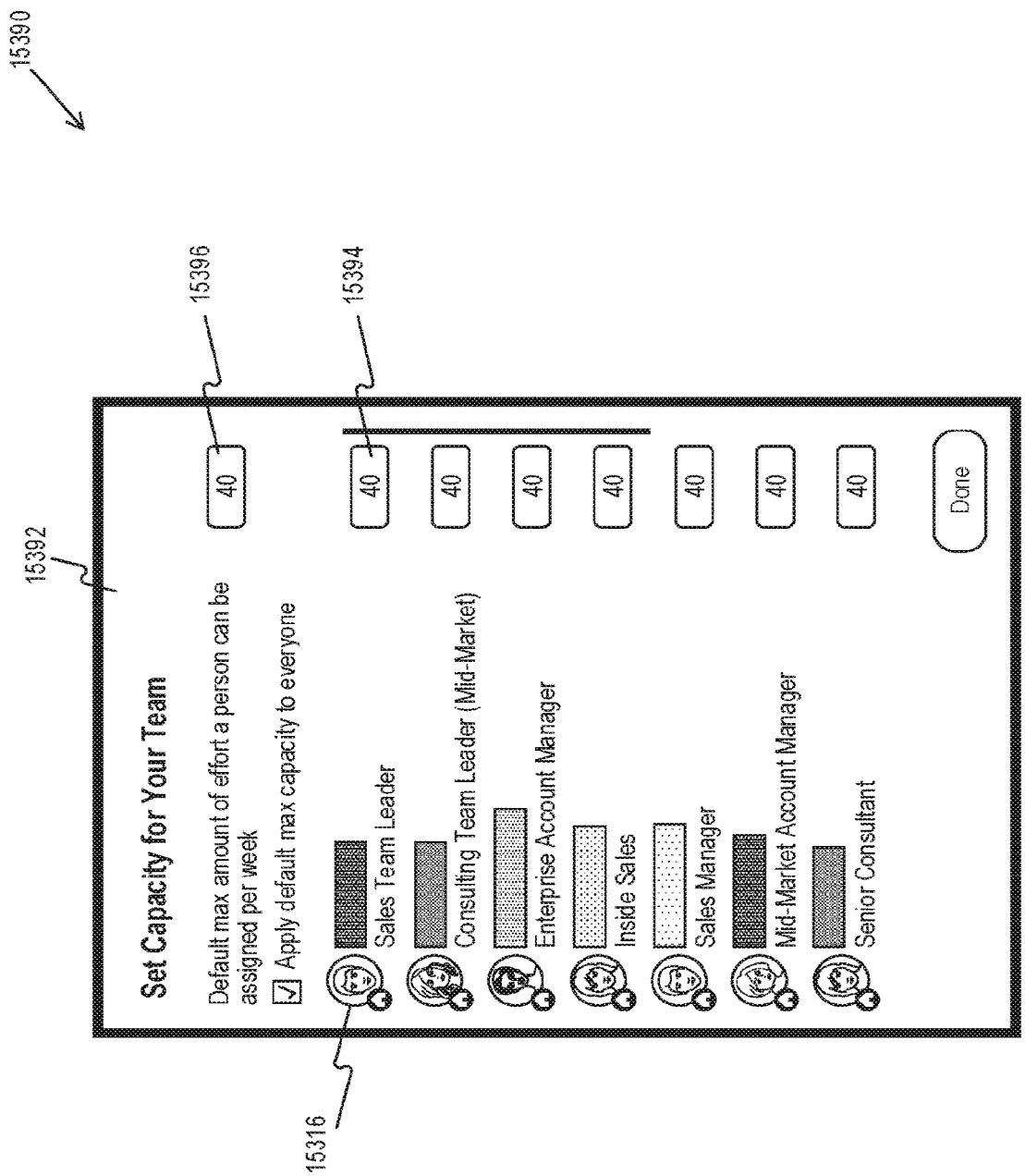

FIG. 112D illustrates an example graphical user interface 15390 for presenting resource unit capacity settings according to an example implementation. For example, app 15132 or browser 15134 can present GUI 15350 on a display of user device 15130 in response to the user selecting a resource unit capacity settings view 15392. In some implementations, in settings view 15392, a user may define resource unit capacity 15394 per time period individually per each resource 15316. Alternatively, in some implementations, in settings view 15392, a user may define resource unit capacity 15396 per time period globally for each resource 15316.

In some embodiments, at least one processor of the system may be further configured to enable selection of specific assigned units associated with a particular resource, and in response to the selection, may disburse the selected specific assigned units to resources other than the particular resource. Enabling selection may involve providing a user interface that permits a user to select particular units assigned to a resource. (e.g., if the resource is "Eric" and the assigned units are "hours," a user interface may enable "Eric" to be selected and some or all of his assigned hours to be disbursed to other resources.) Thus, disbursing the selected specific assigned units to the particular resource may include enabling reassignment of units to a different resource. Alternatively, the units may be disbursed to the same resource but in a different time period. Disbursement may include disassociating an assignment and reassigning particular items to other resources or to other time periods. Disbursement may occur when a user interacts with a user interface to disburse items and associated units. The disbursement may also occur automatically, through a logical rule or other configuration, such that the system may attempt to reallocate items to avoid under-utilization or overcapacity. For example, if an employee is assigned a task that is estimated to take 20 hours in a particular week, disbursement may involve a manager reassigning that task to a different employee, or reassigning that task to a different week for the same employee. In this example, the manager may also configure the system to automatically disburse the task to a different employee or different week when it recognizes that the employee is over capacity. The system may instead also automatically prompt an additional display or alert to the manager that the employee is either at overcapacity or under-utilized and may make recommendations for how to optimize the employee's workload by either reassigning a task to a different time period or to a different employee.

Aspects of this disclosure may include receiving a selection of a particular resource indicator associated with a particular resource to cause an output of a second display signal for presenting information associated with underlying assigned items and units. Presenting information associated with underlying assigned items and units may include drilling down to display the item and unit make up of a particular resource indicator as previously described. The presentation of information may be interactive such that a user may select specific items and units for disbursement so that units may be reassigned to a different time period associated with a particular resource or to a different resource as previously discussed.

FIG. 113 illustrates an example graphical user interface 15400 for presenting a process management resource utilization view according to an example implementation. For example, app 15132 or browser 15134 can present GUI 15400 on a display of user device 15130 in response to the user selecting a resource utilization view 15410.

Resource utilization view 15410 may be in the form of a resource utilization table 15412 where rows may represent the resources 15414-1 to 15414-*n* and columns may represent time period columns 15416-1 to 15416-*n*. Resource utilization indicators 15418-1 to 15418-*n* populate the cells of table 15412 where each indicator 15418 provides an indication of the aggregated assigned resource units as compared to the resource unit capacity for a resource 15414 during a time period 15416.

In the exemplary resource utilization view 15410, user selection of one of indicators 15418 causes GUI 15400 to display the resource periods 15420-1 to 15420-*n* that are combined with the associated resource units and compared to the resource unit capacity to determine resource utilization for a resource. In some implementations, where a resource unit is defined across a resource period, the resource unit may be evenly distributed across the resource period. In a non-limiting example, a task having a time estimate of 12 hours allocated to a timeline (time period) of 3 days may be divided into three parts of 4 hours per each day of the 3 days. In some implementations, when more than one resource is allocated to an item, the resource unit may be evenly distributed across the resource period and may be evenly divided between the allocated resources. In some implementations, more than one resource may be allocated to an item, the resource unit may be evenly distributed across the resource period, and may be divided between the allocated resources according to a user-defined division between the resources.

It should be appreciated that the display of the PM data (resource periods 15420) that is the source for indicators 15418 enables a user to quickly understand which items are causing situations of overcapacity or underutilization of a resource 15414. Advantageously, a user may interact with GUI 15400 such as by dragging a resource period 15420-3 in a direction shown by arrow 15422 to a later date ending at period 15416-*n*, to thereby better balance the workload of resource 15414-1. Additionally or alternatively, a resource period such as resource period 15420-3 may be extended such as by dragging a resource period so as to further spread the resource utilization of a resource over a greater time period.

In some implementations, a user may select to "balance" a resource resulting in the redistribution, as determined by a local PMS module 15140, of the items assigned to a resource such that the resource utilization is more evenly spread out and to prevent periods of overcapacity. In some implementations, automatic balancing of resource utilization may be determined based on analysis of the historical utilization of the particular resource and/or of similar resources.

In some implementations, resource unit capacity per time period may also exclude hours in a day and/or specific days and/or specific dates where the resource is not available. As illustrated in view 15410, time periods 15416-6 and 15416-7 are weekend days and none of resources 15414 may be available during this period. Thus, resource unit capacity might not be allocated on excluded periods.

FIG. 114 illustrates an example graphical user interface 15500 for presenting a process management resource utilization view according to an example implementation. For example, app 15132 or browser 15134 can present GUI 15500 on a display of user device 15130 in response to the user selecting a resource utilization view 15510.

Resource utilization view 15510 may be in the form of a resource utilization table 15512 where rows may represent the resources 15514-1 to 15514-*n* and columns may represent time period columns 15516-1 to 15516-*n*. Resource utilization indicators 15518-1 to 15518-*n* may be graphical gauges that populate the resource-associated cells of table 15512 where each indicator 15518 provides an indication of the aggregated assigned resource units as compared to the resource unit capacity for a resource 15514 during a time period 15516.

In the exemplary resource utilization view 15510, user selection of one of indicators 15518, including such as by mousing-over an indicator 15518, may cause GUI 15500 to display the items 15520-1 to 15520-*n* and associated resource units 15522-1 to 15522-*n* that may be combined with the associated resource periods and compared to the resource unit capacity to determine resource utilization for a resource.

It should be appreciated that the display of the PM data (resource units 15522 per item 15520) that is the source for indicators 15518 may enable a user to quickly understand which items 15520 are causing situations of overcapacity or under-capacity for a resource 15514. A user may interact with GUI 15500 such as by altering a resource unit 15522 and/or assigning an item 15520 to another resource and/or moving the item resource period and/or extending the item resource period to thereby better balance the workload of a resource 15514. Changes made in resource utilization view 15510 may automatically also be made in the underlying PM data such as boards, groups, items, and columns in both of local PM data 15138 and PM data 15122.

FIGS. 115A and 115B illustrate an example graphical user interface 15600 for presenting a process management resource utilization view according to an example implementation. For example, app 15132 or browser 15134 can present GUI 15600 on a display of user device 15130 in response to the user selecting a resource utilization view 15610.

Resource utilization view 15610 may be in the form of a resource utilization table 15612 where rows represent the resources 15614-1 to 15614-*n* and columns represent time period columns 15616-1 to 15616-*n*. Resource utilization indicators 15618-1 to 15618-*n* may be graphical gauges that populate the resource-associated cells of table 15612 where each indicator 15618 provides an indication of the aggregated assigned resource units as compared to the resource unit capacity for a resource 15614 during a time period 15616.

In the exemplary resource utilization view 15610, indicators 15618 have a graphical gauge form of a colored circle as described above with reference to FIG. 112B. In the exemplary resource utilization view 15630 of FIG. 115B, indicators 15618 have a graphical emoji form for conveying that a resource is overcapacity (15618-1, 15618-2), at-capacity (15618-3), under-capacity (15618-4, 15618-5), or not utilized at all (15618-6). Indicators 15618 may alternatively be images, alphanumerics, animated GIFs, shaped according to the type of resource, or any other visual indication as described above.

It should thus be appreciated that resource utilization views 15610 and 15630 both provide a quick graphical overview of the utilization per resource per time period relative to the resource capacity. It should further be appreciated that the graphical gauge version or the emoji version of indicator 15618 represent possible options for representing utilization versus capacity and that other representations are possible.

Figure 116B:
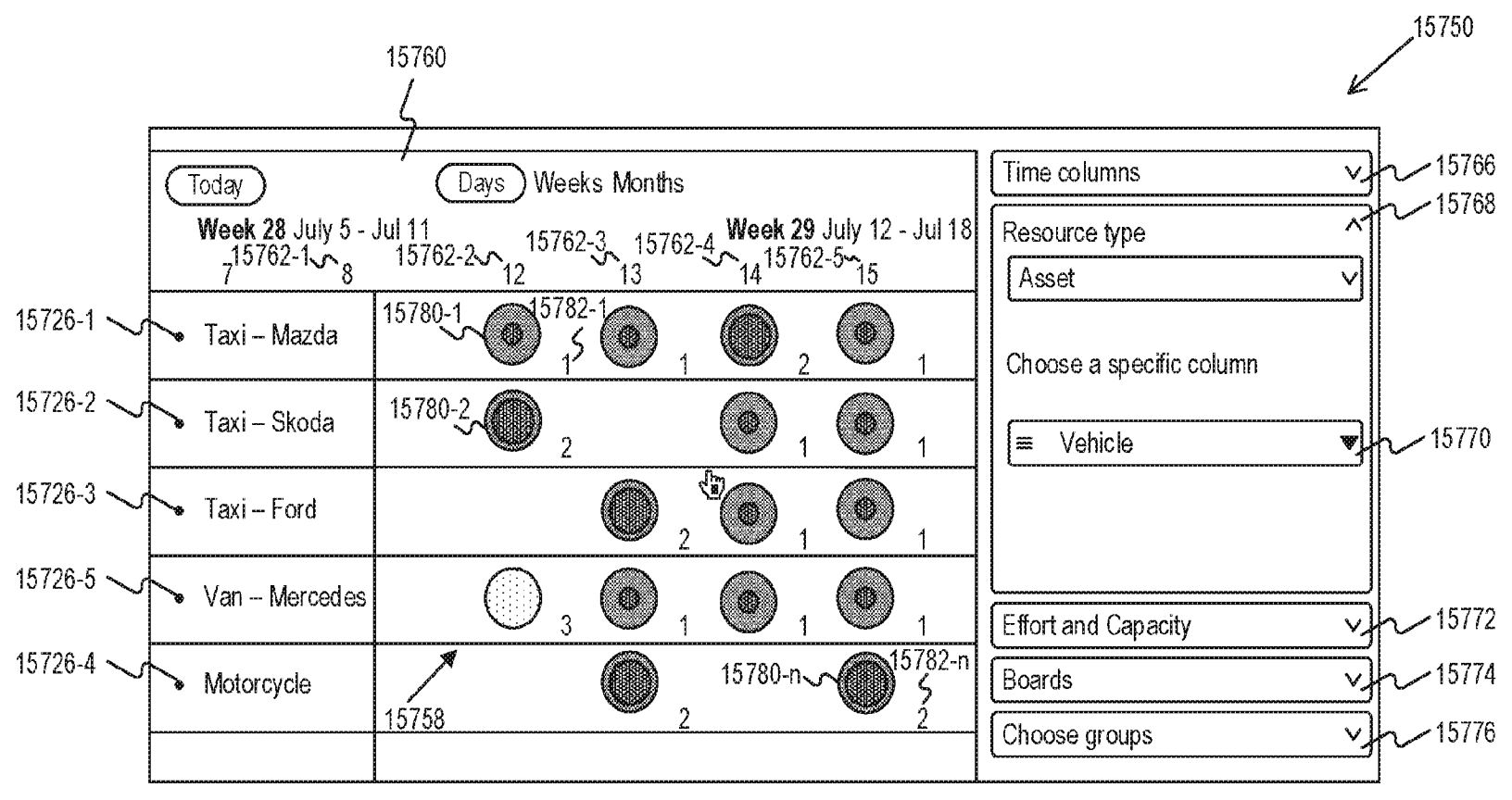
Figure 116C:
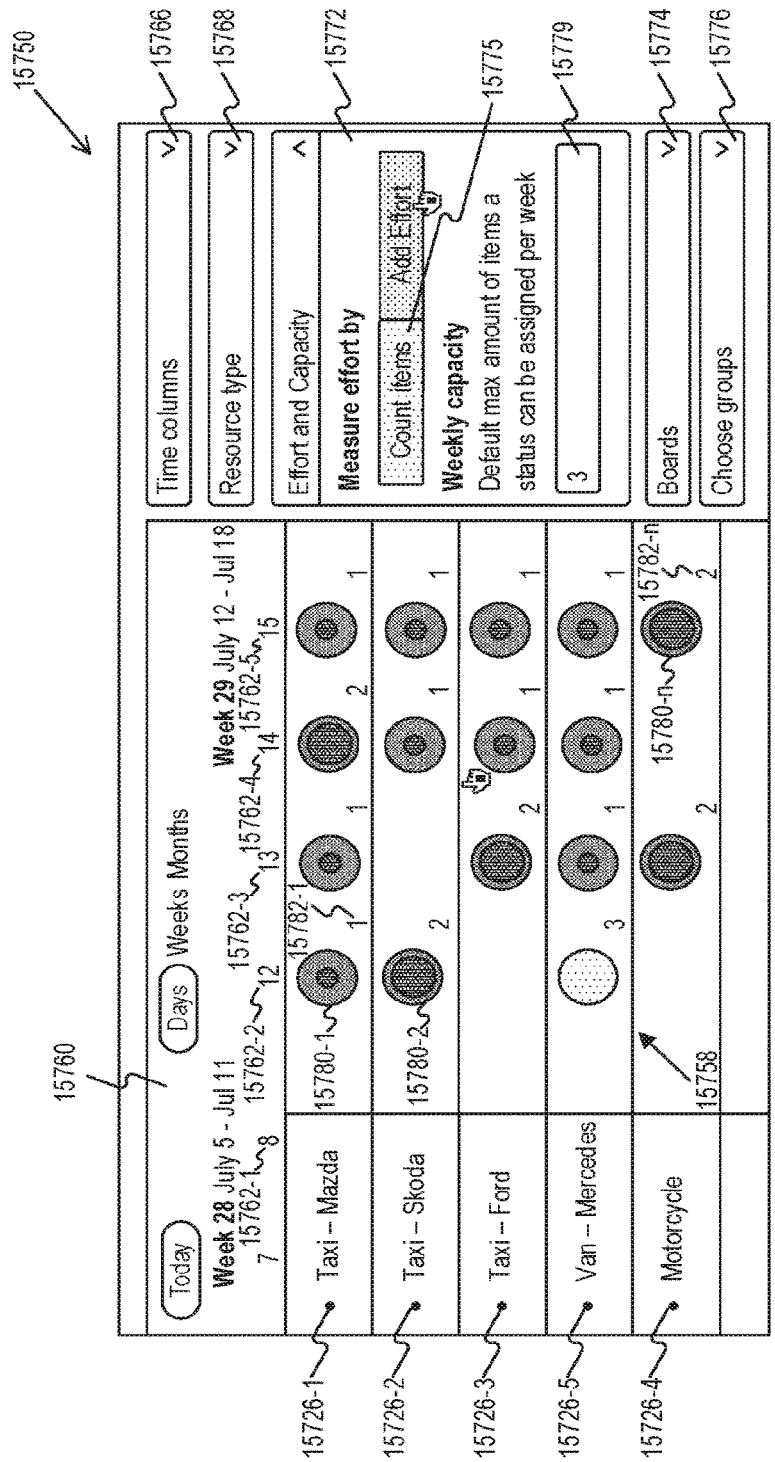

FIG. 116A illustrates an example graphical user interface 15700 for presenting a process management board view according to an example implementation. For example, app 15132 or browser 15134 can present GUI 15700 on a display of user device 15130 in response to the user selecting a board view 15710. GUI 15700 includes local process management data 15138 retrieved from data repository 15120 including user-defined items, columns, and groups. The illustrative views of FIGS. 116A-116D show use of the resource utilization functionality as disclosed herein for the purpose of viewing and managing utilization of assets such as a vehicle fleet. It should be appreciated that any other form of asset may be managed using the system as disclosed herein and the example of a vehicle fleet should not be considered limiting.

In some implementations, board view 15710 may present a board 15711 including one or more groups 15713. Groups 15713 include multiple items 15712-1 to 15712-*n* (shown in FIG. 116A for example as rows). Board view 15710 may further include each item 15712 further described by user-defined PM data 15122 in multiple columns. As shown, in some implementations, columns may include:

- a human resource type column 15714 showing human resource icons 15716-1 to 15716-*n* corresponding to human resources allocated to items 15712;
- an asset resource type column 15718 showing vehicle resources 15726-1 to 15726-5 corresponding to vehicle resources allocated to items 15712. In some implementations, asset resource column uses a status column. In some implementations, asset resource type column uses a country type column;
- a resource period type column 15720 showing a date during which the item (ride or delivery) 15712 is to take place;
- a resource unit type column 15722 showing the number of hours that each ride or delivery item 15712 is expected to take;
- a resource unit type column 15724 here showing the distance (km) that each ride or delivery item 15712 may be expected to cover.

FIGS. 116B-116E illustrate example graphical user interfaces 15750 for presenting a process management resource utilization view according to an example implementation. For example, app 15132 or browser 15134 can present GUI 15750 on a display of user device 15130 in response to the user selecting a resource utilization view 15760. GUI 15750 is generated based on user-selected local process management data such as board 15711.

Resource utilization view 15760 provides a visualization for a specific time period of the aggregated utilization of resources 15726 assigned to items 15712. In some implementations, resource utilization view 15760 is in the form of a resource utilization table 15758 where rows represent the resources 15726 and columns represent time period columns 15762.

Figure 116D:
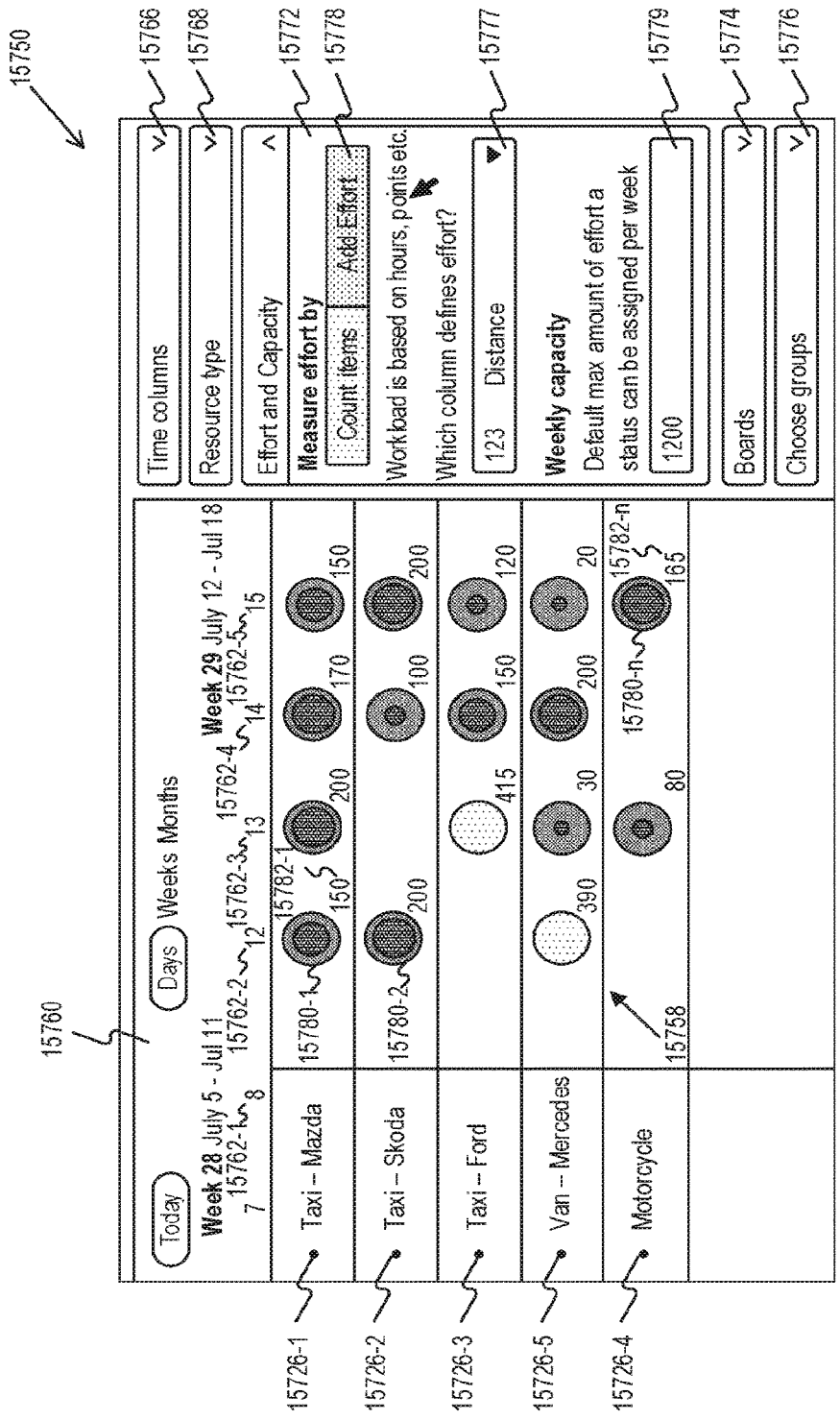
Figure 116E:
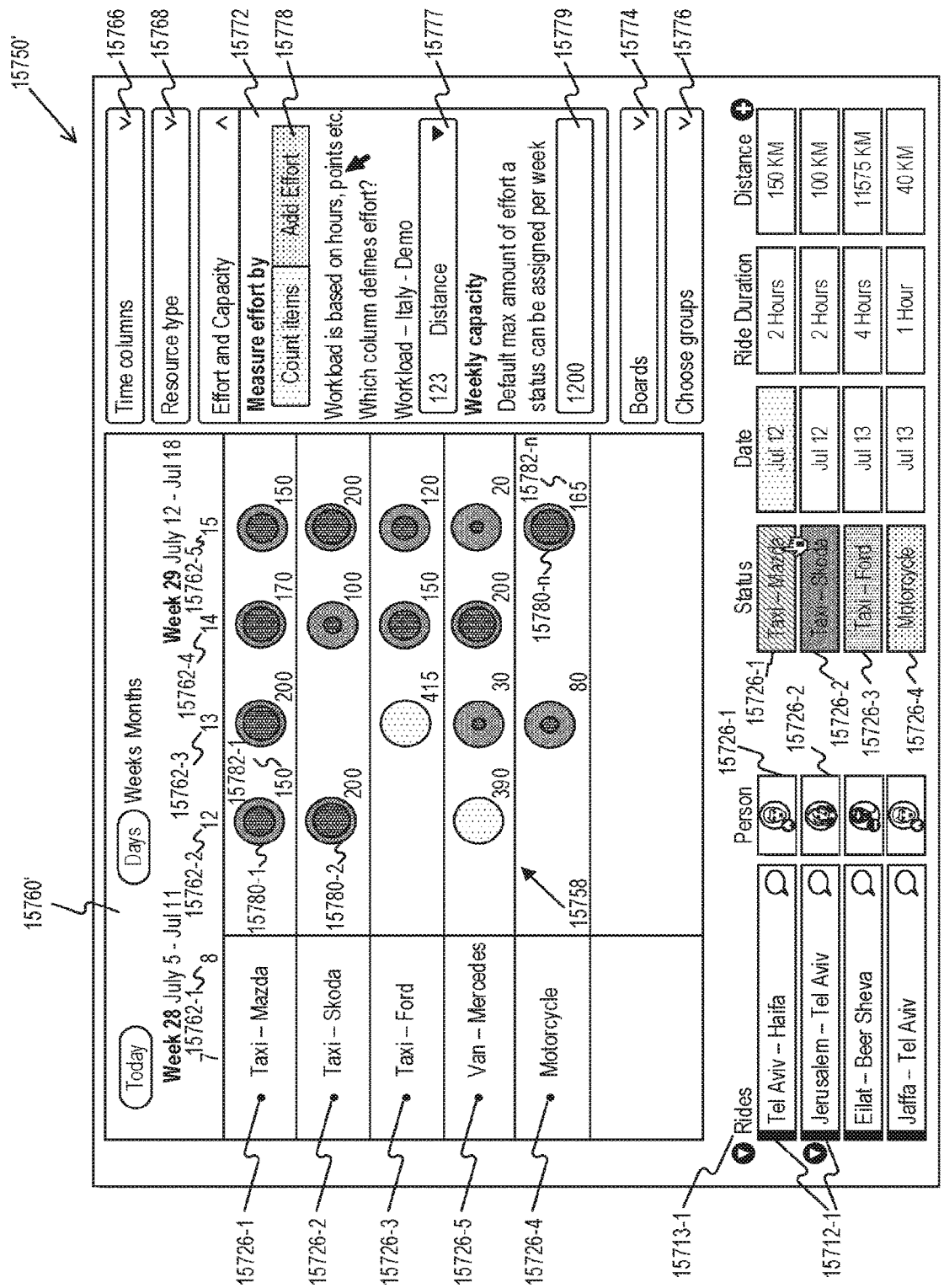

Further user interaction may be required for defining the view settings 15766 of resource utilization view 15760 in FIG. 116B. In some implementations, view settings 15766 may include:

- Board selection 15774: a choice of one or more of the boards accessible to the user such as board 15711;
- Group selection 15776: a choice of one or more of the groups accessible to the user on the chosen board such as groups 15713;
- Resource type selection 15768: Resource type selection provides a choice between the resource type columns in the chosen board/s. As in board view 15710, both of a human resource type column 15714 and an asset resource type column 15718 have been defined by a user. View 15760 shows choice of an asset type column such as column 15718.
- Resource selection 15770: Provides a choice between different resources defined in the chosen board/s within the chosen resource type column. View 15760 shows choice of the asset resource "vehicle" column 15718.
- Time column selection 15766: a choice of one of the resource period type columns from the selected board such as date column 15720;
- Resource unit aggregate method 15772: This setting defines how the resource units of separate items 15712 may be aggregated per resource to determine the total resource units associated with a resource for a chosen period. In some implementations, such as shown in FIGS. 116B and 116C, the aggregated assigned resource units may be a count of the number of items assigned to each resource per resource period. As shown in FIG. 116C, the "count items" selection box 15775 is active such that the aggregate count (as shown in numeric indicators 15782) is a sum of the number of items per resource per date. In some implementations, such as shown in FIG. 116D the aggregated assigned resource units are a sum of the resource units of each item assigned to each resource per resource period. In the exemplary resource utilization view 15760 of FIG. 116D, the "add effort" selection box 15778 is active, and the "distance" column 15724 is selected in the resource unit column selection box 15777, such that the aggregate count (as shown in numeric indicators 15782) is a sum of the resource unit (distance) per resource per date;
- Resource unit capacity per time period 15779: In some implementations, the resource unit capacity per time period is defined individually per each resource. In some implementations, the resource unit capacity per time period is defined globally for each resource—such as shown in FIGS. 116C-116D. In FIG. 116C each resource has been allocated a weekly capacity of 3 items. In FIG. 116D each resource has been allocated a weekly capacity of 1200 km since the resource unit capacity is defined for the same resource unit as selected in the resource unit aggregate method 15777 (a distance in km as shown in FIG. 116D).

Resource utilization indicators 15780 are graphical gauges that populate the resource-associated cells of table 15758 and each indicator 15780 provides an indication of the aggregated assigned resource units as compared to the resource unit capacity for a resource 15716 during a time period 15762. In some implementations, resource utilization indicators 15780 have the form of a graphical gauge such a colored circle. In some implementations, a numeric indicator 15782 is also provided. In some implementations, indicators 15780 may have the shape of the resource shown. In a non-limiting example, vehicle resources may be illustrated with vehicle shaped resource indicators of different colors and/or sizes depending on the capacity utilization of the resource.

In some implementations, example graphical user interface 15750' can be presented such as by app 15132 or browser 15134 on a display of user device 15130 in response to the user selecting a resource utilization split view 15760'. GUI 15750' includes resource view 15760 and board 15711 presented on the same GUI 15750' enabling direct interaction with the PM data of board 15711 to immediately view the effects of the interaction on the resource view 15760 above. It should thus be appreciated that resource utilization view 15760 provides a quick graphical overview of the utilization per resource per time period relative to the resource capacity for any of the defined resources. It should further be appreciated that the graphical gauge version of indicator 15780 represents one option for representing utilization vs. capacity and that other representations are possible.

FIG. 117 is a diagram of an example process for displaying a resource utilization view in accordance with implementations described herein. This process 15800 may for example be performed by system 15100 as described above. The steps below are described with reference to a computing device that performs operations described at each block. The computing device can correspond to a computing device corresponding to PMS 15110 and/or user device 15130.

At block 15802, a data repository maintains one or more user-defined groups of items, wherein each item of the one or more groups of items has an associated resource stored in a resource column. Additionally, the group of items has associated resource periods, and resource units. Additionally, each resource has a defined resource unit capacity or alternatively each resource inherits a global resource unit capacity per resource.

At block 15804, in response to a user selecting a resource utilization view, a GUI displays resource utilization per time period. The GUI may display a default view where the view may be empty if there is insufficient data. The GUI may also display a default view of resource utilization when there is sufficient data. The GUI may display a view that is configurable and definable by a user. At block 15806, a user interacts with the resource view settings to choose the resource type, resource units, resource period, and/or resource unit capacity for display in the resource utilization view.

At block 15808, in response to the user settings, a GUI displays resource utilization per time period for each of the resources, based on the items allocated to the resources and the aggregated assigned resource units associated with the items as compared to the resource unit capacity. As shown above, the resource utilization is presented graphically using resource utilization indicators.

At block 15810, a user selects a resource utilization indicator to thereby cause the GUI to display items associated with the resource for the selected resource period. At block 15812, a user interacts with one or more of items, resources, resource periods, and/or resource units to modify the resource utilization of the selected resource.

At block 15814, the related process management data of the items that were modified is updated in the data repository. At block 15816, the data repository pushes the updated process management data to users that are interacting with or are affected by the same process management data.

One embodiment may include a method 159-100, as shown in FIG. 118, with block 159-200 for receiving an association of a unit capacity per time period to each of a plurality of resources as previously discussed. At block 159-300, the method 159-100 may include receiving an assignment of a plurality of items to each of the plurality of resources, as previously discussed. At block 159-400, the method 159-100 may include receiving an assignment of units to each of the plurality of items, also as previously discussed. At block 159-500, the method 159-100 may include outputting a display signal for presenting in a common visualization, a resource utilization indicator for each of the plurality of resources. Each displayed resource utilization indicator may be rendered as a result of comparing aggregated assigned units to the unit capacity of the resource consistent with the disclosure described herein.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

- storing a customized template in a repository;
- integrating the customized template into the user-facing applications;
- wherein the integrated customized template enables tailoring of data associated with the user-facing applications into which the template is integrated;
- updating the customized template;
- pushing the updated customized template to the user-facing applications in which the customized template was integrated;
- enabling, via the pushed update, a simultaneous change in tailoring of data within each of the user-facing applications in which the customized template was integrated;
- wherein the customized template includes a plurality of columns with linkages between at least two of the plurality of columns;
- wherein the linkages are rules that associate at least two of the plurality of columns with each other;
- wherein the customized template is a single column;
- storing rules that associate at least two customized templates together;
- wherein the simultaneous change in tailoring of data includes a recalculation of data within each of the user-facing applications in which the customized template was integrated;
- wherein the customized template includes a plurality of columns and the integrated customized template includes at least one column;
- wherein the tailoring of data results in a display of the updated customized template;
- rejecting the updated customized template in response to an input;
- wherein the tailoring of data results in a display of an authentication input field to each of the user-facing applications;
- identifying an authentication for the authentication input field;
- comparing identified authentication with predefined authentication inputs contained in the repository to determine whether the identified authentication corresponds to a predefined authentication input contained in the repository;
- wherein the customized template includes a plurality of columns and a display aggregation of the plurality of columns;
- wherein pushing the updated customized template to the user-facing applications occurs within a predetermined time after storing the updated customized template in the repository;
- wherein the update includes a linkage between a first column of the customized template and a second column of the customized template;
- wherein the update includes a display aggregation of the plurality of columns;
- identifying a first column heading selection for a first column in a table and identifying a second column heading selection for a second column in the table;
- defining a column combination based on the identified first column heading selection and identified second column heading selection;
- analyzing a plurality of predefined column heading combinations contained in a memory to determine when the defined column combination corresponds to a predefined column heading combination from among the plurality of predefined column heading combinations contained in the memory;
- associating a predefined logical combination rule with the first column and the second column in the table based on a determination that the defined column combination corresponds to the predefined column heading combination;
- monitoring entries in the first column and the second column for a triggering event when the predefined logical combination rule is triggered:
- altering a display in the table using the predefined logical combination rule based on the triggering event;
- wherein the predefined logical combination rule is configured to trigger a display change in the table in response to two differing value entries in two differing columns;
- wherein the predefined logical combination rule between the first column and the second column is enabled to be altered;

wherein after creation of the predefined logical combination rule, the predefined logical combination rule is enabled to be cancelled;
wherein altering the display in the table includes automatically establishing a third column for storing data associated with a trigger of the predefined logical combination rule;
wherein altering the display in the table includes altering a display of the second column;
wherein altering the display in the table includes altering a display of the first column and a display of the second column:
wherein altering the display of the first column and the display of the second column includes presenting an indication that the first column and the second column are linked;
enabling replacement of the identified first column heading for the first column with an updated column heading for the first column;
defining an updated column combination based on the updated column heading and the identified second column heading selection;
analyzing the plurality of predefined column heading combinations contained in the memory to determine when the updated defined column combination corresponds to a predefined column heading combination from among the plurality of predefined column heading combinations contained in the memory;
disassociating the predefined logical combination rule with the first column and the second column in the table upon determination that the updated defined column combination does not correspond to any predefined combination contained in the memory;
further altering the display in the table;
wherein further altering the display in the table includes unlinking the first column and the second column;
wherein the indication is an icon;
sending a notification when the predefined logical combination rule is triggered;
presenting a table with cells defined by horizontal rows and vertical rows;
wherein one of said horizontal rows and vertical rows defines items and another of said horizontal rows and vertical rows defines persons;
wherein a responsibility cell at an intersection of a vertical row and a horizontal row associates at least one particular person with a particular item;
receiving an input, associated with the responsibility cell, of at least one address linked to an account of at least one person associated with the item;
receiving a change made in an item row;
in response to the change in the item row, automatically accessing the at least one address in the responsibility cell, and automatically sending a notification via the link to the at least one address;
wherein the at least one address includes at least one of an email address, a phone number, a text message address, or a communications application address;
accessing a communications rule for sending the notification;
wherein receiving of the at least one address into the responsibility cell causes an avatar to be displayed for the at least one person associated with the entered address;
enabling reallocation of the at least one person;
wherein the responsibility cell is configured to permit removal of the at least one person;
wherein permission settings for the particular item are automatically applied to the at least one person in the responsibility cell associated with the particular item;
wherein the change includes a status change for the item;
wherein the change includes a modification based on a messaging vertical row;
wherein the responsibility cell associates a plurality of persons with the item;
in response to the change in the item row, send the notification to the plurality of persons in the responsibility cell;
wherein a drop-down menu is associated with the responsibility cell;
wherein a drop-down menu enables selection of one or more persons from a predetermined set of available individuals;
wherein the predetermined set of available individuals is determined by permission settings for each of the available individuals;
wherein the communications rule is configured to apply only to the item row;
wherein the communications rule is configured to apply to multiple items in the table;
wherein the avatar is associated with information from at least one other vertical row;
wherein the information from the at least one other vertical row includes contact information and a local time associated with the at least one person associated with the entered address;
presenting the local time and contact information associated with the avatar in response detecting a mouseover event;
wherein the responsibility cell of the item automatically applies to sub-items associated with the item;
associating a sub-item row with the item row;
enabling a change in the sub-item row; and
sending a notification to the at least one person when the change is made in the sub-item row;
maintaining a table having a plurality of rows and columns;
receiving a first customized access permission that regulates access to information in a particular column;
receiving a second customized access permission that regulates access to information in a particular row;
regulating an ability to access information in a particular cell of the table when the particular cell is in at least one of the particular column or the particular row;
outputting a signal to display the table with the particular cell regulated;
wherein regulating the ability to access information in the particular cell includes restricting an ability to view data in the particular cell;
wherein the output signal omits data from the particular cell;
wherein regulating the ability to access the particular cell includes restricting an ability to alter the particular cell:
wherein regulating the ability to access the particular cell includes restricting an ability to link the particular cell to another table;
wherein regulating the ability to access the particular cell includes restricting an ability to link the particular cell to a third-party application:
outputting a signal to cause a plurality of differing selectable permissions settings to be presented in a common view;
receiving and implementing selected permission settings;

outputting a signal for rendering a table containing a plurality of cells;
wherein at least a first cell is enabled to contain static data and at least a second cell is enabled to contain dynamic data;
providing access to a menu of values for inclusion in at least the second cell;
wherein the menu of values identifies dynamic data values associated with selectable animations:
enabling selection of a dynamic data value to specify an associated selectable animation for inclusion in the second cell;
causing the associated selectable animation in the second cell to dynamically display while the first cell displays static data;
wherein the associated selectable animation includes moving graphics;
wherein the associated selectable animation is dynamic custom text;
wherein the dynamic data is stored in a memory;
wherein the memory is associated with a remote server;
wherein the memory is associated with a local server on a computing device;
enabling customization of a plurality of cells in differing rows or columns to include the dynamic data;
wherein the second cell is enabled to simultaneously display the static data together with dynamic data;
wherein the associated selectable animation is dynamically displayed adjacent a display of the static data in the second cell;
wherein the dynamic display of the associated selectable animation in the second cell is enabled via an action;
wherein the action includes a cursor hover;
wherein the dynamic custom text is based on an input;
wherein the input is enabled to cause an update to the menu of values for inclusion in the plurality of cells;
wherein the associated selectable animation is a custom graphic;
wherein the custom graphic is based on an input that enables an update to the menu of values for inclusion in the plurality of cells;
enabling selective inclusion of static data in some of the plurality of cells and selective inclusion of dynamic data in others of the plurality of cells;
enabling designating a column or row as accepting either dynamic data or static data;
displaying a table of items including a plurality of cells;
wherein at least some of the plurality of cells include item-associated alphanumeric data;
wherein at least one of the plurality of cells includes an item-associated variable time-based graphic representing item progress;
accessing an indicator of a current point in time;
determining an extent of progress at the current point in time;
altering, in a display of the table, the item-associated variable time-based graphic to correspond to the current point in time to thereby reflect, within the at least one of the plurality of cells adjacent to at least one cell containing the item-associated alphanumeric data, a graphical indication of the extent of progress at the current point in time;
wherein the graphical indication includes a progress bar that changes in length as a function of time elapsed;
wherein the accessing, the determining, and the altering occur in real time;
wherein the accessing, the determining, and the altering occur on a periodic basis;
wherein a scale of graphical indication reflects that the extent of progress at the current point in time is at least one of a minute, an hour, a day, a week, a month, or a combination of any of the foregoing;
wherein the altering occurs at a selectable time interval;
altering the display of the item-associated variable time-based graphic in response to an action;
wherein the action includes a cursor hover;
wherein the at least one of the plurality of cells further includes item-associated alphanumeric data;
altering a display of the at least one of the plurality of cells in response to an action;
maintaining a plurality of logical templates, each logical template of the plurality of logical templates including predefined requirements and user-definable requirements;
enabling formation of a table having a plurality of horizontal and vertical rows;
enabling selection of a logical template;
enabling input for the user-definable requirements into the selected logical template;
enabling association of the selected logical template with a row;
executing logic operations defined by the selected logical template to operate on the row in response to the association of the selected logical template with the row;
wherein the user-definable requirements are dynamic such that input of at least one user-definable requirement is configured to cause a change in the logical template;
wherein the change in the logical template includes a presentation of at least one option for an additional user-definable requirement;
wherein the change in the logical template includes a presentation of at least one additional predefined requirement;
wherein the change in the logical template further includes a presentation of at least one option for an additional user-definable requirement;
recognizing the user-definable requirements from the table;
recognizing the user-definable requirements from a plurality of tables;
displaying the recognized user-definable requirements for selection;
generating a table containing cells for holding values;
enabling association of a communications rule with a specific cell of the table;
wherein the communications rule includes a trigger that automatically activates when a specific value in the specific cell meets a criterion;
triggering the communications rule when the specific value in the specific cell meets the criterion;
communicating, upon triggering of the communications rule, a message relating to the specific value in the specific cell meeting the criterion;
wherein the message includes a notice that the specific value meets the criterion;
wherein the message includes at least one of a text message, email message, video message, or voice message;
wherein the message includes the specific value;
wherein the message transmits the specific value to a separate application for use in a calculation by the separate application;

wherein the triggering of the communications rule initiates an accessing of a communications application;
wherein the communicating includes transmitting data relating to the specific value to the communications application for transmission:
wherein the communications application is a third-party application accessed by the communications rule;
wherein the triggering of the communicants rule occurs periodically;
wherein the message is configured to trigger transmission of an additional message;
wherein the additional message includes data sent to the table;
wherein the additional message includes data sent to another table;
wherein the criterion includes a permission setting for enabling transmission of the message;
maintaining a plurality of task tables for a plurality of entities;
wherein each task table of the plurality of task tables contains a plurality of tasks, each task being defined by a row of cells;
configuring a cell associated with each task in each task table to maintain a status value;
outputting a signal to cause a display of an aggregate table consolidating, from the plurality of task tables of the plurality of entities, a list of tasks that share a common status value;
receiving a selection of a subset of the plurality of task tables of the plurality of entities for consolidation in the aggregate table;
wherein the status value indicates that an associated task is stuck;
wherein the output signal is configured to cause an aggregate table that presents stuck tasks across the task tables of the plurality of entities;
wherein the output signal is configured to render in the aggregate table at least one interactive cell in the row of cells associated with at least one task;
receiving an activation of the at least one interactive cell and to initiate a contact with an entity associated with the at least one task;
transmitting a single communication to the entity associated with the common status value, the single communication reflecting the common status value for multiple tasks;
detecting when a status value for a particular task is empty, and to send a notification of the empty status value to an associated entity;
updating the output signal when a cell with the common status value is changed to a different status value;
recording the update in an activity log;
wherein the output signal is configured to cause the aggregate table to display summary information for every common status value consolidated from the plurality of task tables;
generating the output signal to cause similar status columns to be consolidated as a common status value in the aggregate table;
maintaining a plurality of timers for a plurality of individuals working on a plurality of projects;
enabling simultaneously running the plurality of timers reflecting current work time of each individual;
identifying at least one common project being worked on by the plurality of individuals for aggregate real time work tracking;
displaying a joint work tracking clock, in response to identifying the at least one common project for real time work tracking;
wherein the joint work tracking clock runs faster than real time when multiple individuals simultaneously work on at least one project;
wherein a clock speed of the joint work tracking clock runs at a multiple of a number of persons simultaneously working on the at least one common project;
enabling identification of a plurality of projects, and the joint work tracking clock is configured to attribute, in faster than real time, time invested in the plurality of projects;
enabling exclusion of time associated with specific individuals working on the common project from the joint work tracking clock and, in response to the exclusion, configuring the joint work tracking clock to exclude time investments of the specific individuals from aggregate time tracked;
enabling simultaneous display of a plurality of separate clocks and the joint work tracking clock, each separate clock tracking a time investment of a different individual of the multiple individuals in real time while the joint work tracking clock runs faster than real time;
wherein the specific clock for each of the multiple individuals runs faster than real time;
enabling a time overage threshold received via a graphical user interface;
outputting an indicator when the time overage threshold is met;
enabling an individual time overage threshold for at least one of the plurality of individuals and causing independent indicators to be displayed when an individual of the plurality of individuals reaches the individual time overage threshold;
wherein maintaining the plurality of timers includes displaying the plurality of timers in a plurality of cells in a table;
displaying an active session timer associated with an active timer of a particular cell in the table in response to an action;
wherein the action includes a cursor hover;
wherein the action includes selecting the active timer in the table;
wherein the displaying of the active session timer includes presenting a first display module for the active session timer adjacent to a second display module for the active timer;
wherein the active session timer includes a time tracking log for the active timer;
maintaining a data structure containing information related to a plurality of tasks assigned to a plurality of geographically disbursed individuals;
wherein the data structure includes indications of tasks, identities of the plurality of geographically disbursed individuals, and geographical locations associated with the plurality of geographically disbursed individuals;
retrieving from the data structure, and displaying in each of a plurality of tables, at least one task assigned to a particular individual from the plurality of geographically disbursed individuals, together with a display of a subgroup of the plurality of tasks assigned to others of the plurality of geographically disbursed individuals;
for each task of the plurality of tasks in each of the plurality of tables, retrieving from the data structure and displaying an indication identifying an assigned individual:

for each individual assigned to each task in each table, retrieving from the data structure and displaying an indication identifying an assigned current geographical location associated with the assigned individual;

receiving via a computing device of the particular individual an indication that the assigned current geographical location of the particular individual has changed to a new location;

updating the data structure to reflect the new location of the particular individual;

retrieving from the data structure and displaying in the plurality of tables the new location associated with the tasks of the particular individual;

wherein the computing device is a communications device associated with the particular individual;

wherein the communications device has GPS capabilities;

wherein receiving the indication that the assigned current geographical location of the particular individual has changed to a new location includes receiving a GPS location from the communications device, the GPS location reflecting the new location;

wherein updating the data structure to reflect the new location of the particular individual is configured to occur automatically based on the received GPS location;

wherein displaying the new location in the plurality of tables occurs automatically based on the received GPS location;

wherein updating the data structure is based on a last usage location associated with the particular individual;

wherein the last usage location is determined based on an IP address associated with the particular individual;

wherein the last usage location is based on GPS data of the computing device associated with the particular individual;

wherein the identities of the plurality of geographically disbursed individuals are graphically depicted;

wherein the new location is based on a manual selection by the particular individual;

receiving from the particular individual an indication that the particular individual is unavailable, and to display an unavailability indicator in each of the plurality of tables;

receiving from the particular individual a request to mask the new location, and in response to the request to mask, omit a display of the new location from the plurality of tables;

wherein displaying in the plurality of tables the new location associated with the tasks of the particular individual includes displaying a variable time-based graphic associated with the new location;

wherein the variable time-based graphic graphically changes over time to represent daytime and nighttime in the new location;

maintaining a table, the table having vertical rows and horizontal rows, and a cell at an intersection of each vertical row and horizontal row;

wherein each cell contains a value;

receiving a selection of a row of cells for alternative display;

in response to the received selection, displaying data from the selected row of cells in a dynamic manner;

wherein the value from each cell in the selected row is represented by a moving object;

wherein at least one of a size of the moving object and a color of the moving object relates to data contained in an associated cell of each cell in the selected row;

wherein during display, the moving objects are configured to move relative to each other;

wherein the color of the moving object correlates to a field status;

wherein associated cells of each cell in the selected row contain a numerical value;

wherein the size of the moving object associated with each cell correlates to the numerical value associated with each cell;

wherein the moving object is a depiction of an animal;

wherein the animal is a llama;

enabling definition of a display time criterion associated with each row of cells;

wherein the dynamic display excludes data failing to meet the display time criterion;

wherein the moving objects are configured to move randomly relative to each other;

maintaining for presentation in a first table, a first group of items including a first item with a first status and a second item with a second status;

maintaining for presentation in a second table, a second group of items including a third item with the first status and a fourth item with the second status;

outputting a graphical indicator including a first graphical element aggregating, based on a shared first status, the first item and the third item, and a second graphical element aggregating, based on a shared second status, the second item and the fourth item;

receiving a selection of the first graphical element and in response thereto generate a third table containing representations of the first item and the third item;

receiving a selection of the second graphical element and in response thereto generate a fourth table containing representations of the second item and the fourth item;

wherein in response to receiving the selection of the first graphical element the at least one processor initiates a look-up in a data structure for items from the first table and the second table that share the first status associated with the first graphical element;

wherein in response to receiving the selection of the second graphical element the at least one processor initiates a look-up in the data structure for items from the first table and the second table that share the second status associated with the second graphical element;

wherein the first graphical element is associated with a completed status and the second graphical element is associated with an incomplete status;

wherein the first item, the second item, the third item, and the fourth item are assigned to a common entity;

wherein the graphical indicator is customizable with labels that differ from associated labels in the first table and the second table;

wherein the graphical indicator is interactive, enabling alteration of the items in the first table without viewing the first table;

wherein the graphical indicator is presented within a cell of the first table;

outputting a first signal for rendering a display of a table:

wherein the display of the table includes a presentation of a plurality of items, a plurality of columns, and a plurality of values in cells at intersections of items and columns;

wherein one of the columns is configured to retain geographic location values, each item having an associated geographic location value;

wherein a subgroup of the items share a common geographic location value that differs from geographic location values of others of the plurality of items;
receiving the plurality of values from the cells;
causing the plurality of values to be maintained in a data structure;
outputting a second signal to render a common map, including markers associated with the geographically dispersed items;
enabling an interaction with the common map in order to receive a selection of a specific marker associated with a geographical location of the subgroup;
following receipt of the specific marker, outputting a third signal to render in a common view, column values associated with the plurality of items of the subgroup;
receiving a fourth signal from a user of the common view, the signal being configured to update a column value for a particular item;
storing the updated column value in the data structure;
receiving a fifth signal to re-render the table;
outputting in response to the fifth signal a sixth signal to cause a re-rendering of the table, wherein the sixth signal includes the updated value for the particular item;
wherein the geographical location values include at least one of a street address, map coordinates, a city, a country, a region, or a facility;
wherein some of the plurality of the items are associated with differing individuals in differing locations;
wherein the geographical location values include user-specific information obtained from devices associated with individuals;
wherein the user-specific information includes GPS coordinates obtained from the devices associated with the individuals;
communicating with the devices associated with the individuals, receiving periodic updates of the GPS coordinates, and updating in the data structure corresponding geographical location values;
enabling automated sequential viewing of items in the subgroup;
wherein the second signal is configured to cause on the common map, a consolidated cluster marker, grouping together a series of markers associated with locations proximate each other;
receiving an association of a unit capacity per time period to each of a plurality of resources;
receiving an assignment of a plurality of items to each of the plurality of resources;
receiving an assignment of units to each of the plurality of items;
outputting a display signal for presenting in a common visualization, a resource utilization indicator for each of the plurality of resources;
wherein each displayed resource utilization indicator compares aggregated assigned units to the unit capacity of the resource;
enabling selection of specific assigned units associated with a particular resource;
in response to the selection, disbursing the selected specific assigned units to resources other than the particular resource;
wherein disbursing the selected specific assigned units to the particular resource includes enabling reassignment of units to a different time period associated with the particular resource;
wherein the unit is at least one of a time measure, a task measure, a volume measure, a distance measure, or an item measure;
receiving a selection of a particular resource utilization indicator associated with a particular resource;
upon selection, outputting a second display signal for presenting information associated with underlying assigned items and units;
reassigning units to a different time period associated with the particular resource;
wherein receiving the assignment of units includes enabling a plurality of entities to assign units to a common resource:
wherein outputting the display signal for presenting includes updating the resource utilization indicator on multiple displays of the plurality of entities when one entity assigns units to a resource;
wherein receiving the assignment of units includes enabling at least one entity to assign units to a common resource;
wherein outputting the display signal for presenting includes updating the resource utilization indicator on multiple displays of the at least one entity when at least one entity assigns units to a resource;
wherein outputting the display signal for presenting includes presenting the plurality of resources in a table;
wherein the resource utilization indicator includes a graphical gauge in a resource-associated cell of the table;
wherein the resource utilization indicator is configured to change depending on a resource utilization of a resource in a particular time period;
wherein the change is a change in color;
wherein the change is a change in a graphical representation;
wherein the change is a change in size of a graphical representation;
wherein the resource utilization indicator is at least one of an emoji, a GIF, or a resource shaped indicator;
wherein the resource utilization indicator shows one of overcapacity, under-utilization, and at-capacity;
receiving an input for selecting a particular plurality of resources;
in response to receiving the input, outputting a second display signal to re-render the resource utilization indicators for each of the selected plurality of resources.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A dynamic system for converting data from tablature into moving objects, the system comprising:
    at least one processor configured to:
        maintain a table, the table having vertical rows and horizontal rows, and a cell at an intersection of each vertical row and horizontal row, wherein each cell contains a value;
        receive a selection of a row of cells for alternative display; and
        in response to the received selection, display data from the selected row of cells in a dynamic manner, wherein the value from each cell in the selected row is represented by a moving object, wherein at least one of a size of the moving object and a color of the moving object relates to data contained in an associated cell of each cell in the selected row, and wherein during display, the moving objects are configured to move relative to each other.

2. The system of claim 1, wherein the color of the moving object correlates to a field status.

3. The system of claim 1, wherein associated cells of each cell in the selected row contain a numerical value.

4. The system of claim 3, wherein the size of the moving object associated with each cell correlates to the numerical value associated with each cell.

5. The system of claim 1, wherein the moving object is a depiction of an animal.

6. The system of claim 5, wherein the animal is a llama.

7. The system of claim 1, wherein the at least one processor is further configured to enable definition of a display time criterion associated with each row of cells.

8. The system of claim 7, wherein the dynamic display excludes data failing to meet the display time criterion.

9. The system of claim 1, wherein the moving objects are configured to move randomly relative to each other.

10. A non-transitory computer readable medium for converting data from tablature into moving objects, the computer readable containing instructions that when executed by at least one processor, cause the at least one processor to perform operations, the operations comprising:
    maintaining a table, the table having vertical rows and horizontal rows, and a cell at an intersection of each vertical row and horizontal row, wherein each cell contains a value;
    receiving a selection of a row of cells for alternative display; and
    in response to the received selection, displaying data from the selected row of cells in a dynamic manner, wherein the value from each cell in the selected row is represented by a moving object, wherein at least one of a size of the moving object and a color of the moving object relates to data contained in an associated cell of each cell in the selected row, and wherein during display, the moving objects are configured to move relative to each other.

11. The non-transitory computer readable medium of claim 10, wherein associated cells of each cell in the selected row contain a numerical value, and wherein the size of the moving object associated with each cell correlates to the numerical value associated with each cell.

12. The non-transitory computer readable medium of claim 10, wherein the operations further comprise enabling definition of a display time criterion associated with each row of cells.

13. The non-transitory computer readable medium of claim 12, wherein the dynamic display excludes data failing to meet the display time criterion.

14. The non-transitory computer readable medium of claim 10, wherein the moving objects are configured to move randomly relative to each other.

15. A dynamic method for converting data from tablature into moving objects, the method comprising:
   maintaining a table, the table having vertical rows and horizontal rows, and a cell at an intersection of each vertical row and horizontal row, wherein each cell contains a value;
   receiving a selection of a row of cells for alternative display; and
   in response to the received selection, displaying data from the selected row of cells in a dynamic manner, wherein the value from each cell in the selected row is represented by a moving object, wherein at least one of a size of the moving object and a color of the moving object relates to data contained in an associated cell of each cell in the selected row, and wherein during display, the moving objects are configured to move relative to each other.

16. The method of claim 15, wherein associated cells of each cell in the selected row contain a numerical value, and wherein the size of the moving object associated with each cell correlates to the numerical value associated with each cell.

17. The method of claim 15, wherein the method further comprises enabling definition of a display time criterion associated with each row of cells.

18. The method of claim 17, wherein the dynamic display excludes data failing to meet the display time criterion.

19. The method of claim 15, wherein the moving objects are configured to move randomly relative to each other.

20. The method of claim 15, wherein the moving object is a depiction of an animal.

* * * * *

UNITED STATES PATENT AND TRADEMARK OFFICE
CERTIFICATE OF CORRECTION

PATENT NO. : 11,030,556 B1  
APPLICATION NO. : 17/143462  
DATED : June 8, 2021  
INVENTOR(S) : Roy Mann et al.

Page 1 of 1

It is certified that error appears in the above-identified patent and that said Letters Patent is hereby corrected as shown below:

In the Claims

Claim 10 in Column 212, Lines 52-53 recites "computer readable containing instructions" which should read -- computer readable medium containing instructions --

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*